United States Patent
O'Donnell et al.

(10) Patent No.: US 11,598,226 B2
(45) Date of Patent: Mar. 7, 2023

(54) THERMAL ENERGY STORAGE ASSEMBLAGE WITH ENERGY COGENERATION

(71) Applicant: Rondo Energy, Inc., Alameda, CA (US)

(72) Inventors: John Setel O'Donnell, Oakland, CA (US); Peter Emery von Behrens, Oakland, CA (US); Chiaki Treynor, Berkeley, CA (US); Jeremy Quentin Keller, Seattle, WA (US); Matthieu Jonemann, Redwood City, CA (US); Robert Ratz, San Jose, CA (US); Yusef Desjardins Ferhani, Menlo Park, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 17/668,327

(22) Filed: Feb. 9, 2022

(65) Prior Publication Data

US 2022/0259987 A1  Aug. 18, 2022

Related U.S. Application Data

(63) Continuation of application No. 17/537,407, filed on Nov. 29, 2021.
(Continued)

(30) Foreign Application Priority Data

Nov. 29, 2021 (WO) ................ PCT/US2021/061041

(51) Int. Cl.
*H02J 3/00* (2006.01)
*H02J 3/04* (2006.01)
(Continued)

(52) U.S. Cl.
CPC ................ *F01K 3/02* (2013.01); *B63H 11/00* (2013.01); *F01K 3/08* (2013.01); *F01K 3/186* (2013.01);
(Continued)

(58) Field of Classification Search
CPC . F01K 3/08; F01K 3/186; F01K 17/00; F01K 17/02; F01K 17/04; F01K 17/06;
(Continued)

(56) References Cited

U.S. PATENT DOCUMENTS

| 1,700,542 | A | 1/1929 | O'Donnell |
| 2,833,532 | A | 5/1958 | Ries |

(Continued)

FOREIGN PATENT DOCUMENTS

| AU | 2012292959 B2 | 2/2016 |
| AU | 2016204109 B2 | 5/2018 |

(Continued)

OTHER PUBLICATIONS

Translations of CN-108362151-A and CN-107246732-A.*
(Continued)

*Primary Examiner* — Mickey H France
(74) *Attorney, Agent, or Firm* — Procopio, Cory, Hargreaves & Savitch LLP

(57) ABSTRACT

An energy storage system converts variable renewable electricity (VRE) to continuous heat at over 1000° C. Intermittent electrical energy heats a solid medium. Heat from the solid medium is delivered continuously on demand. An array of bricks incorporating internal radiation cavities is directly heated by thermal radiation. The cavities facilitate rapid, uniform heating via reradiation. Heat delivery via flowing gas establishes a thermocline which maintains high outlet temperature throughout discharge. Gas flows through structured pathways within the array, delivering heat which
(Continued)

may be used for processes including calcination, hydrogen electrolysis, steam generation, and thermal power generation and cogeneration. Groups of thermal storage arrays may be controlled and operated at high temperatures without thermal runaway via deep-discharge sequencing. Forecast-based control enables continuous, year-round heat supply using current and advance information of weather and VRE availability. High-voltage DC power conversion and distribution circuitry improves the efficiency of VRE power transfer into the system.

33 Claims, 107 Drawing Sheets

Related U.S. Application Data

(60) Provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | |
|---|---|
| *H02M 1/00* | (2006.01) |
| *B63H 11/00* | (2006.01) |
| *F01K 13/02* | (2006.01) |
| *F01K 15/00* | (2006.01) |
| *F01K 3/02* | (2006.01) |
| *F01K 3/08* | (2006.01) |
| *F01K 3/18* | (2006.01) |
| *F03G 6/00* | (2006.01) |
| *F22B 29/06* | (2006.01) |
| *F22B 35/10* | (2006.01) |
| *F28D 20/00* | (2006.01) |
| *H01M 8/04007* | (2016.01) |
| *H01M 8/04014* | (2016.01) |
| *H01M 8/04029* | (2016.01) |
| *H02J 1/10* | (2006.01) |
| *B63H 11/12* | (2006.01) |
| *B63H 11/14* | (2006.01) |
| *B63H 11/16* | (2006.01) |
| *F01K 11/02* | (2006.01) |
| *F01K 19/04* | (2006.01) |
| *F03D 9/18* | (2016.01) |

(52) U.S. Cl.
CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC ............... F03D 9/18; F28D 2020/0021; F28D 2020/0004; F28D 2020/0013; F28D 20/0056; F28D 20/00
See application file for complete search history.

(56) References Cited

U.S. PATENT DOCUMENTS

| | | |
|---|---|---|
| 3,381,113 A | 4/1968 | Jacques et al. |
| 4,110,987 A | 9/1978 | Cahn et al. |
| 4,124,061 A | 11/1978 | Mitchell et al. |
| 4,127,161 A | 11/1978 | Clyne et al. |
| 4,146,057 A | 3/1979 | Friedman et al. |
| 4,172,442 A | 10/1979 | Boblitz |
| 4,222,365 A | 9/1980 | Thomson |
| 4,438,630 A | 3/1984 | Rowe |
| 5,154,224 A | 10/1992 | Yasui et al. |
| 5,384,489 A | 1/1995 | Bellac |
| 5,416,416 A | 5/1995 | Bisher |
| 5,553,604 A | 9/1996 | Frei |
| 7,693,402 B2 | 4/2010 | Hudson et al. |
| 8,544,275 B2 | 10/2013 | Shinnar |
| 8,701,773 B2 | 4/2014 | O'Donnell et al. |
| 8,960,182 B2 | 2/2015 | Magaldi et al. |
| 9,370,044 B2 | 6/2016 | McDonald |
| 9,512,826 B2 | 12/2016 | Rodinov et al. |
| 9,816,490 B2 | 11/2017 | Conlon |
| 9,948,140 B2 | 4/2018 | Pietsch et al. |
| 9,989,271 B1 | 6/2018 | Becker |
| 10,113,535 B2 | 10/2018 | Conlon |
| 10,345,050 B2 | 9/2019 | Pietsch et al. |
| 10,775,111 B2 | 9/2020 | Kerth |
| 10,876,521 B2 | 12/2020 | Anderson et al. |
| 2004/0062063 A1 | 4/2004 | Siri |
| 2004/0182081 A1 | 9/2004 | Sim et al. |
| 2006/0174622 A1 | 8/2006 | Skowronski |
| 2006/0211777 A1 | 9/2006 | Severinsky |
| 2006/0266039 A1 | 11/2006 | Skowronski et al. |
| 2008/0127647 A1 | 6/2008 | Leitner |
| 2009/0038668 A1 | 2/2009 | Plaisted |
| 2009/0090109 A1 | 4/2009 | Mills et al. |
| 2009/0117633 A1* | 5/2009 | Bradley ............... C12P 7/10 |
| | | 435/256.1 |
| 2009/0320828 A1 | 12/2009 | Koketsu et al. |
| 2010/0132391 A1 | 6/2010 | Barot |
| 2010/0178156 A1* | 7/2010 | Rivas Cortes .......... F01K 17/02 |
| | | 415/13 |
| 2010/0229523 A1 | 9/2010 | Holt et al. |
| 2010/0251711 A1 | 10/2010 | Howes et al. |
| 2010/0295306 A1 | 11/2010 | Ridnik et al. |
| 2011/0226440 A1 | 9/2011 | Bissell et al. |
| 2011/0289924 A1 | 12/2011 | Pietsch |
| 2012/0102950 A1 | 5/2012 | Turchi |
| 2012/0131898 A1 | 5/2012 | Mokheimer et al. |
| 2012/0255309 A1 | 10/2012 | Venetos et al. |
| 2013/0118169 A1 | 5/2013 | Milam et al. |
| 2013/0175006 A1 | 7/2013 | Robinson et al. |
| 2014/0074314 A1* | 3/2014 | Niknafs ............. F28D 20/0056 |
| | | 700/300 |
| 2014/0102073 A1 | 4/2014 | Pang et al. |
| 2014/0190469 A1* | 7/2014 | O'Donnell ............. F22B 1/006 |
| | | 126/609 |
| 2014/0216717 A1 | 8/2014 | O'Donnell et al. |
| 2014/0223906 A1 | 8/2014 | Gee et al. |
| 2014/0224469 A1 | 8/2014 | Mirmobin et al. |
| 2015/0033740 A1 | 2/2015 | Anderson et al. |
| 2015/0053266 A1 | 2/2015 | Chen et al. |
| 2015/0143806 A1 | 5/2015 | Friesth |
| 2015/0276234 A1 | 10/2015 | Muro et al. |
| 2015/0354545 A1 | 12/2015 | Conlon |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner |
| 2016/0214910 A1 | 7/2016 | King |
| 2017/0093163 A1 | 3/2017 | Johnson et al. |
| 2017/0204741 A1* | 7/2017 | Hogen .................... F01D 25/10 |
| 2017/0241669 A1 | 8/2017 | von Behrens |

(56) References Cited

U.S. PATENT DOCUMENTS

| | | |
|---|---|---|
| 2018/0003445 A1 | 1/2018 | Bergan et al. |
| 2018/0038352 A1 | 2/2018 | Conlon |
| 2018/0073777 A1 | 3/2018 | O'Donnell et al. |
| 2018/0163574 A1* | 6/2018 | Bailey ............... F01K 3/186 |
| 2018/0179955 A1 | 6/2018 | Apte et al. |
| 2018/0207557 A1* | 7/2018 | Nellis ............... B01D 46/681 |
| 2018/0216010 A1* | 8/2018 | Hong ............... C10G 7/00 |
| 2018/0231316 A1 | 8/2018 | Watremetz et al. |
| 2018/0245485 A1 | 8/2018 | Conlon |
| 2018/0292097 A1 | 10/2018 | Specter |
| 2018/0372420 A1 | 12/2018 | Ahadi et al. |
| 2019/0043624 A1 | 2/2019 | Fork et al. |
| 2019/0045617 A1 | 2/2019 | Fork et al. |
| 2019/0226462 A1 | 7/2019 | Conlon |
| 2019/0331098 A1 | 10/2019 | von Behrens et al. |
| 2019/0359894 A1 | 11/2019 | Heidel et al. |
| 2020/0346165 A1 | 11/2020 | Lu et al. |
| 2020/0386447 A1 | 12/2020 | Wang |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0328544 A1 | 10/2021 | Johnson et al. |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0228271 A1 | 7/2022 | Ashok et al. |
| 2022/0228772 A1 | 7/2022 | Murata et al. |

FOREIGN PATENT DOCUMENTS

| | | | |
|---|---|---|---|
| CN | 1559893 A | | 1/2005 |
| CN | 101592439 B | | 4/2011 |
| CN | 105948037 A | | 9/2016 |
| CN | 107246732 A | * | 10/2017 |
| CN | 107872196 A | | 4/2018 |
| CN | 108204760 A | | 6/2018 |
| CN | 108362151 A | * | 8/2018 |
| CN | 210802160 U | | 6/2020 |
| CN | 111655989 A | | 9/2020 |
| CN | 212157096 U | | 12/2020 |
| DE | 19808810 C1 | | 6/1999 |
| DE | 102009020531 B3 | | 4/2011 |
| DE | 102017212684 A1 | | 1/2019 |
| EP | 0794161 B1 | | 7/1996 |
| EP | 1930587 A2 | | 6/2008 |
| EP | 2372116 A1 | | 10/2011 |
| EP | 2722496 A2 | | 4/2014 |
| EP | 3486594 A1 | | 5/2019 |
| EP | 2837086 B1 | | 11/2019 |
| EP | 3245388 B1 | | 11/2019 |
| EP | 3725917 A1 | | 10/2020 |
| EP | 2909547 B1 | | 9/2021 |
| EP | 3642296 A1 | | 1/2022 |
| GB | 2109026 A | | 5/1983 |
| GB | 2477801 A | | 8/2011 |
| IL | 284451 | | 8/2021 |
| JP | 2006145200 A | | 6/2006 |
| KR | 102308531 B1 | | 10/2021 |
| MA | 40029 A | | 12/2015 |
| TW | 202100240 A | | 1/2021 |
| WO | 1980000170 | | 2/1980 |
| WO | 2007/108014 A1 | | 9/2007 |
| WO | 2008052249 A1 | | 5/2008 |
| WO | 2008/108870 A1 | | 9/2008 |
| WO | 2009152562 A1 | | 12/2009 |
| WO | 2011/077248 A2 | | 6/2011 |
| WO | 2011/109514 A1 | | 9/2011 |
| WO | 2012/123853 A1 | | 9/2012 |
| WO | 2012/127178 A1 | | 9/2012 |
| WO | 2012/150969 A1 | | 11/2012 |
| WO | 2013020176 A1 | | 2/2013 |
| WO | 2014063191 A1 | | 5/2014 |
| WO | 2014151843 A2 | | 9/2014 |
| WO | 2015/149124 A1 | | 10/2015 |
| WO | 2015/187423 A2 | | 12/2015 |
| WO | 2016065191 A1 | | 4/2016 |
| WO | 2016150455 A1 | | 9/2016 |
| WO | 2017049320 A1 | | 3/2017 |
| WO | 2017147022 A1 | | 8/2017 |
| WO | 2018/011363 A1 | | 1/2018 |
| WO | 2018/101989 A1 | | 6/2018 |
| WO | 2019020562 A1 | | 1/2019 |
| WO | 2019149623 A1 | | 8/2019 |
| WO | 2019/224538 A1 | | 11/2019 |
| WO | 2020/068758 A1 | | 4/2020 |
| WO | 2020254001 A1 | | 12/2020 |
| WO | 2022086630 A1 | | 4/2022 |
| ZA | 201603514 B | | 11/2018 |

OTHER PUBLICATIONS

Elliott Group, "Materials for Hydrogen Compression", Thermo-Mechanical-Chemical Energy Storage Workshop, Elliott, Aug. 10-11, 2021, Total pp. 25.

Ben Bollinger, "Malta Pumped Heat Energy Storage", Malta, Aug. 10, 2021, Total pp. 9.

Tony Bowdery et al., "Heat Exchangers for Thermal Energy Storage: Challenges and Mitigation", Meggitt, Aug. 2021, Total pp. 20.

Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.

Trevor Brown, "Ammonia: the other hydrogen", Energy Storage for Manufacturing and Industrial Decarbonization Workshop "Energy StorM", Feb. 9, 2022, Total pp. 13.

Thomas A. Buscheck, "Hybrid-energy technology enabled by heat storage and oxy-combustion for power and industrial-heat applications with near-zero or negative $CO_2$ emissions", Thermal-Mechanical-Chemical Energy Storage Workshop, San Antonio, Texas, Total pp. 22.

Pintail Power LLC, "Liquid Air Combined Cycle Hybrid Energy Storage", Pintail Power LLC, TMCES Workshop, Aug. 10-11, 2021, San Antonio, TX, Total pp. 12.

Christopher Fraughton, "Electro-Thermal Energy Storage General Presentation", MAN Energy Solutions, Aug. 2021, Total pp. 23.

Mike Gravely, "The Role of Energy Storage in Helping California Meet the State's Future Zero Carbon Energy Goals", Energy Research and Development Division, California, Total pp. 23.

Echogen, "CO2-Based Pumped-Thermal Energy Storage Technical Overview & Status", Echogen Power System, Total pp. 20.

Clifford K . Ho, "High-Temperature Thermal Storage in Moving and Fixed Particle Beds", Thermal-Mechanical-Chemical Energy Storage (TMCES) Workshop, San Antonio, TX, Total pp. 13.

Scott Hume, "Mid-Duration Energy Storage (MDES) Benefits and Challenges", 3rd TMCES Workshop, Aug. 10, 10 2021, Total pp. 11.

Revterra, "Revterra Company Overview", TMCES 2021, Total pp. 14.

Todd Brix, "Converting Carbon. Storing Energy", Richland, Washington U.S.A, Total pp. 13.

Rainer Kurz, "Hydrogen Pipelines & Storage", Mar. 8, 2021, Total pp. 16.

R. B. Laughlin, "Variable Blading in Closed-Cycle Brayton Energy Storage", TMCES, Aug. 10, 2021, San Antonio, Total pp. 26.

Storworks Power, 3rd Thermal-Mechanical-Chemical Energy Storage Workshop, Aug. 10, 2021, Total pp. 8.

Jeff Moore, "Oxygen Storage Incorporated into the Allam OxyFuel Power Cycle", Southwest Research Institute, Total pp. 8.

Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.

Michael Pesin, "The Office of Electricity Grid Modernization R&D Portfolio", Aug. 2, 2021, Total pp. 18.

(56) References Cited

OTHER PUBLICATIONS

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.
Joshua Schmitt, "Development of an Advanced Hydrogen Energy Storage System Using Aerogel in a Cryogenic Flux Capacitor (Cfc)", Southwest Research Institute, Total pp. 8.
Natalie Smith et al., "Integration of Pumped Heat Energy Storage with a Fossil-Fired Power Plant", U.S. Department of Energy, Total pp. 6.
Joe Stekli, "LCRI Update TMCES 2021", Low-Carbon Resources Initiative, Electric Power Research Institute, Aug. 2021, Total pp. 31.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Russ Weed, "Market Needs & Technology Overview", Thermal-Mechanical-Chemical Energy Storage Workshop—Storage Deployment, Aug. 11, 2021, Total pp. 20.
Sempra Energy Utility, "SoCalGas", Total pp. 6.
Joe Cresko, "Energy Storage for Manufacturing", Energy Storage for Manufacturing & Industrial Decarbonization Workshop, Feb. 8-9, 2022, Total pp. 11.
Dr. Avi Shultz, "Industrial Decarbonization:Renewable Process Heating from Concentrating Solar Thermal", U.S. Department of Energy, Total pp. 6.
Joe Paladino, "Transformation of the Electric Grid", Energy StorM Workshop, Feb. 4, 2022, Total pp. 5.
Dr. Eric L. Miller, "The Hydrogen Energy Earthshot and H2@Scale:Importance to Industrial Decarbonization", Energy StorM Panel, Feb. 8, 2022, Total pp. 9.
Jay Fitzgerald, "Bioenergy and Chemical Energy Storage", Energy Storage for Manufacturing & Industrial Decarbonization Workshop, Feb. 8-9, 2022, Total pp. 6.
Dr. Avi Shultz, "Concentrating Solar-thermal Power and Thermal Energy Storage", U.S. Department of Energy, Total pp. 7.
Alexis McKittrick, "Low Temperature & Coproduced Resources Reservoir Thermal Energy Storage (RTES) Portfolio", Geothermal Technologies Office, U.S. Department of Energy, Total pp. 4.
Lori Schaefer-Weaton, "Solar & Battery Energy Solution Agri-Industrial Plastics Co.", Agri-Industrial Plastics Company, Total pp. 12.
Elizabeth Endler, "Energy Storage for Manufacturing Petrochemical Industry Perspective", Feb. 8, 2022, "Energy StorM" Workshop, US Department of Energy, Total pp. 14.
Hélder Da Silva, "Energy Storage for Manufacturing and Industrial Decarbonization Workshop "Energy StorM"", Feb. 8, 2022, Total pp. 11.
Dr. Gianluca Ambrosetti et al., "Cement Production", Energy Storage for Manufacturing and Industrial Decarbonization Workshop "Energy StorM", Feb. 8, 2022, Total pp. 10.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Reyad Sawafta, "Thermal Energy Storage—Cold Storage", Energy Storage for Manufacturing and Industrial Decarbonization Workshop, Feb. 9, 2022, Total pp. 11.
Bao Truong, "Malta Pumped Heat Energy Storage System Green Heat & Power Application", Energy Storage for Manufacturing and Industrial Decarbonization Workshop, Feb. 9, 2022, Total pp. 5.
Torbjörn Lindquist, "Powering the evolution of a renewable society, by redefining energy infrastructure", Azelio, Total pp. 10.
Siemens Gamesa, "Electric Thermal Energy Storage (ETES)—Industrial Decarbonization", Siemens Gamesa Renewable Energy, Total pp. 9.
David Bierman, "Clean, affordable, and reliable heat & electricity", Antora Energy, Total pp. 9.
Travis McLing et al., "Dynamic Earth Energy Storage: Grid Scale Energy Storage using Planet Earth as a Thermal Battery (RTES)", Total pp. 7.
Daniel C Stack et al., "Performance of firebrick resistance-heated energy storage for industrial heat applications and round-trip electricity storage", Applied Energy, vol. 242, May 15, 2019, pp. 782-796, Total pp. 15.
Soteris Kalogirou, "The potential of solar industrial process heat applications", Applied Energy, vol. 76, Issue 4, Dec. 2003, pp. 337-361, Total pp. 25.
Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.
Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2019, Total pp. 7.
D Ilievski, "New Two-Stage Calcination Technology", Proceedings of the 9th International Alumina Quality Workshop, Alcoa World Alumina, Technology Delivery Group, Western Australia, 2012, Total pp. 7.
Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.
Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.
Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.
Veera Gnaneswar Gude, "Energy storage for desalination processes powered by renewable energy and waste heat sources", Applied Energy, vol. 137, Jan. 1, 2015, pp. 877-898, Total pp. 22.
"Grid Energy Storage", U.S. Department of Energy, Dec. 2013, Total pp. 67.
Charles Forsberg, "Hybrid systems to address seasonal mismatches between electricity production and demand in nuclear renewable electrical grids", Energy Policy, vol. 62, Nov. 2013, pp. 333-341, Total pp. 9.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Mathieu Hubert, "Lecture 3:Basics of industrial glass melting furnaces", IMI-NFG Course in Processing of Glass, Spring 2015, Total pp. 75.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Vishal Sardeshpande, "Performance analysis for glass furnace regenerator", Applied Energy, vol. 88, Issue 12, Dec. 2011, pp. 4451-4458, Total pp. 8.
Cédric Philibert, "Renewable Energy for Industry", Renewable Energy Division, International Energy Agency, Nordic Pavillion, COP23, Fidji-Bonn, Nov. 15, 2017, Total pp. 7.
Haisheng Chen et al., "Progress in electrical energy storage system: A critical review", Progress in Natural Science, vol. 19, Issue 3, Mar. 10, 2009, pp. 291-312, Total pp. 22.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.

(56) References Cited

OTHER PUBLICATIONS

Hitesh Bindra et al., "Sliding flow method for exergetically efficient packed bed thermal storage", Applied Thermal Engineering, vol. 64, Issues 1-2, Mar. 2014, pp. 201-208, Total pp. 8.

Daniel Christopher Stack, "Conceptual Design and Performance Characteristics of Firebrick Resistance—Heated Energy Storage for Industrial Heat Supply and Variable Electricity Production", Thesis, Master of Science in Nuclear Science and Engineering, Massachusetts Institute of Technology, Feb. 2017, Total pp. 166.

Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.

Swagelok Energy Advisors Inc, "Steam Quality—Plant Operations Require a High Steam Quality", Steam Systems Best Practices, Document No. 23, 2009, Total pp. 3.

S. W. Sucech et al., "Alcoa Pressure Calcination Process for Alumina", Light Metals 1986, R.E. Miller, 669-674, Total pp. 6.

Lion Hirth, "The market value of variable renewables: The effect of solar wind power variability on their relative price", Energy Economics, vol. 38, Jul. 2013, pp. 218-236, Total pp. 19.

Lion Hirth, "The Optimal Share of Variable Renewables: How the Variability of Wind and Solar Power affects their Welfare-optimal Deployment", The Energy Journal, vol. 36, No. 1, p. 149-184, Total pp. 36.

Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.

T. Fiedler et al., "Thermal capacitors made from Miscibility Gap Alloys (MGAs)", WIT Transactions on Ecology and the Environment, vol. 186, 2014, Total pp. 8.

D. Fernandes et al., "Thermal energy storage: How previous findings determine current research priorities", Energy, vol. 39, Issue 1, Mar. 2012, pp. 246-257, Total pp. 12.

CK-12 Foundation, "Saturated Hydrocarbon", Apr. 2, 2022, Total pp. 8.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

"Matching Time of Use Periods With Grid Conditions Maximizes Use of Renewable Resources", California ISO, Outcropping Way, Folsom, 2015, Total pp. 2.

Gregory C Staple, "California's Grid Geeks: Flattening the 'duck curve'", Jan. 25, 2017, www.greenbiz.com, Total Page Count 9.

Richard T. Ibekwe, "Induction Heating of Firebricks for the Large-Scale Storage of Nuclear and Renewable Energy", Massachusetts Institute of Technology, Jun. 2018, Total pp. 40.

Cowper Stove—An overview, ScienceDirect Topics, Sep. 13, 2021, Total pp. 25.

Industrial Decarbonization using Electric Thermal Energy Storage (ETES), Jan. 25, 2022, Total pp. 11.

"Ethylene Production via Cracking of Ethane-Propane", Chemical Engineering, Nov. 1, 2015, Total pp. 4.

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

Stefica Nicol Bikes, "Australian engineers patent thermal block to store renewable energy", www.reuters.com, Oct. 27, 2021, Total pp. 6.

David Roberts, "Solar power's greatest challenge was discovered 10 years ago. It looks like a duck", www.vox.com, Aug. 29, 2018, Total pp. 19.

Daniel Stack et al., "Joule Hive-Replacing fire with renewable heat", Total pp. 15.

Steffes, ThermElect Hydronic, Demand-Free, Off-Peak Heating, Total pp. 2.

"Miscibility Gap Alloys", University of Newcastle, accessed at https://miscibilitygapalloy.blogspot.com/p/how-did-it-stater-ted.html on Apr. 2, 2022, Total pp. 2.

Emiliano Bellini, "Long-duration thermal storage system based on silica sand", pv magazine International, Nov. 5, 2021, Total pp. 6.

Emiliano Bellini, "Storing wind, solar power with silica sands", pv magazine International, Sep. 1, 2021, Total pp. 10.

Whitlock, "NREL scientists partnering with Antora Energy and MIT on TPV projects" Renewable Energy Magazine, Dec. 10, 2021,https://www.renewableenergymagazine.com/pv_solar/nrel-scientists-partnering-with-antora-energy-and-20211210.

Timothy C. Allison, "Thermal-Mechanical-Chemical Energy Storage Technology Overview and Research Activities", Southwest Research Institute, Aug. 9, 2021, Total pp. 22.

Siemens AG, "Compressed Air Energy Storage (CAES)", 3rd Thermal-Mechanical-Chemical Energy Storage Workshop, Siemens Energy, Aug. 2021, Total pp. 17.

Office Action in U.S. Appl. No. 17/650,519 dated Apr. 20, 2022, 11 pages.

International Search Report dated Sep. 14, 2022 for International Application No. PCT/US2021/061041, 41 pages.

PCT; Invitation to Pay Additional Fees issued in International Patent Application No. PCT/US2021/061041; mailed Mar. 24, 2022; 21 Pages.

Written Opinion of the International Searching Authority dated Sep. 14, 2022 for PCT/US2021/061041, 25 pages.

David L.Chandler "MIT News: Turning desalination waste into a useful resource" MIT News Office, Feb. 13, 2019.

* cited by examiner

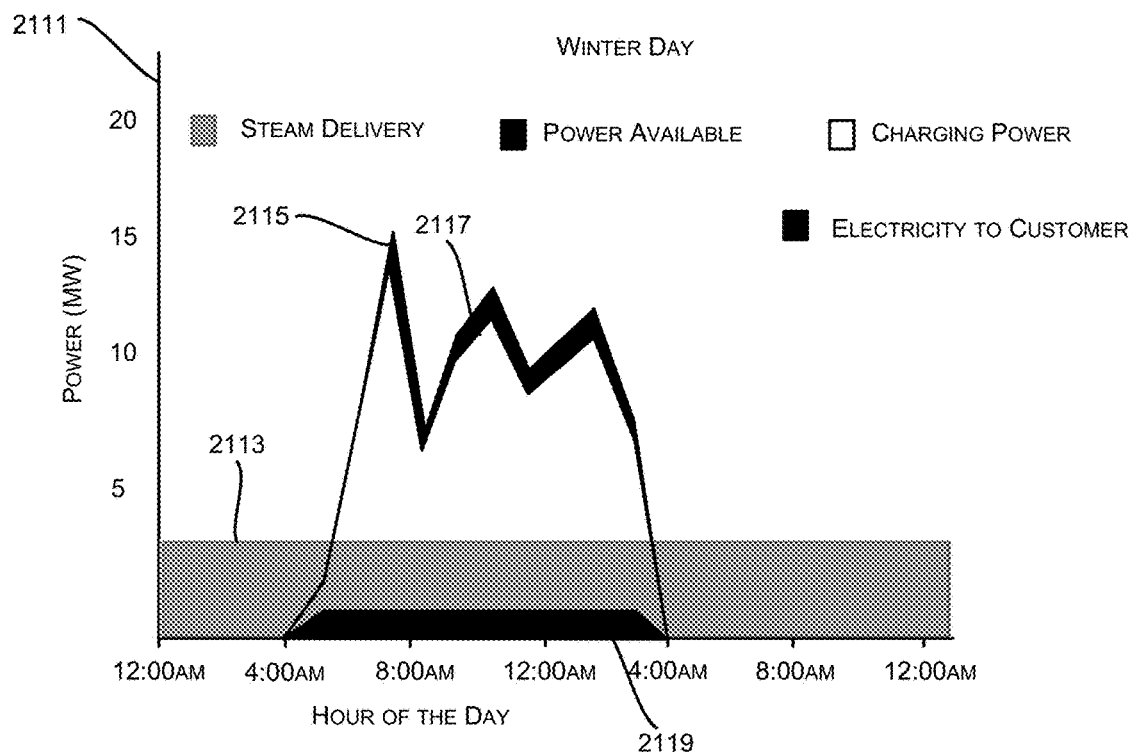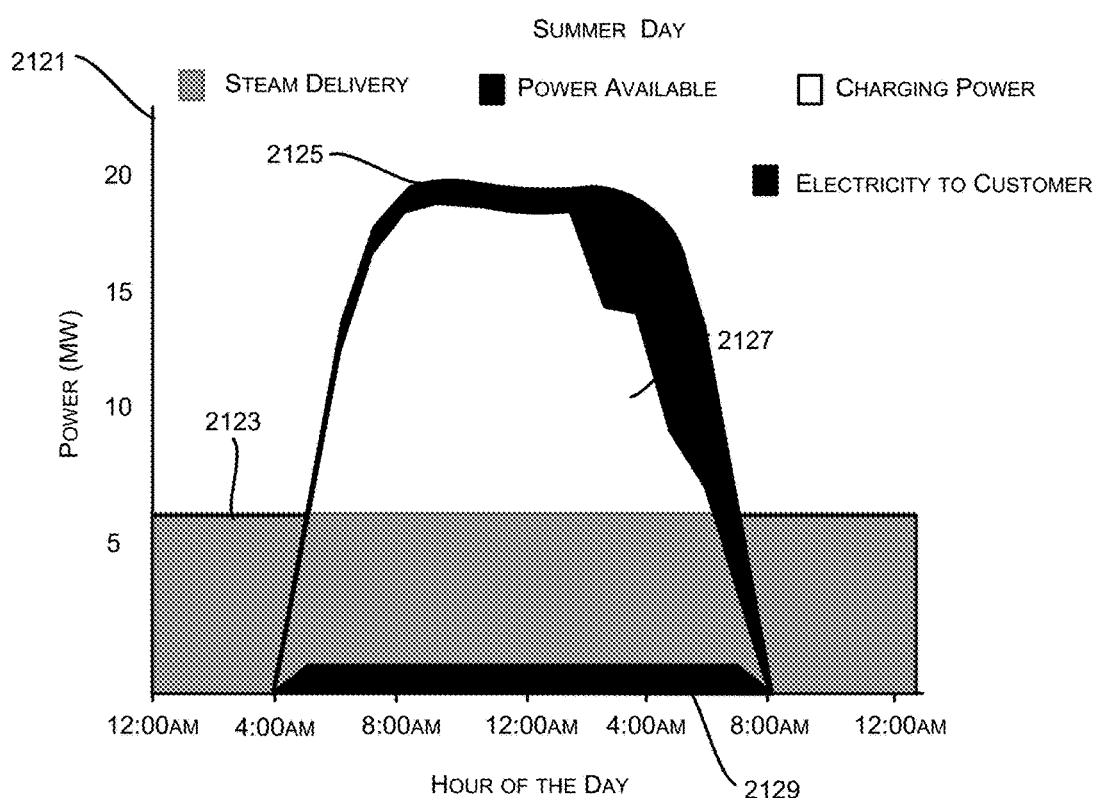
FIG. 34(B)

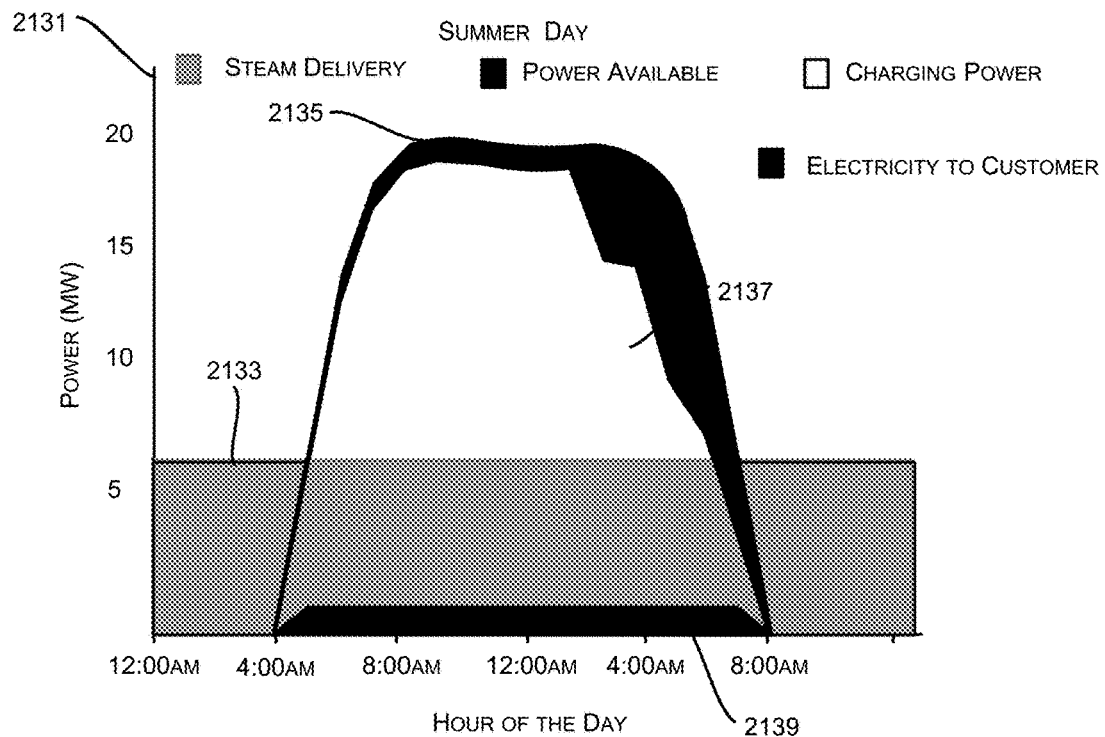
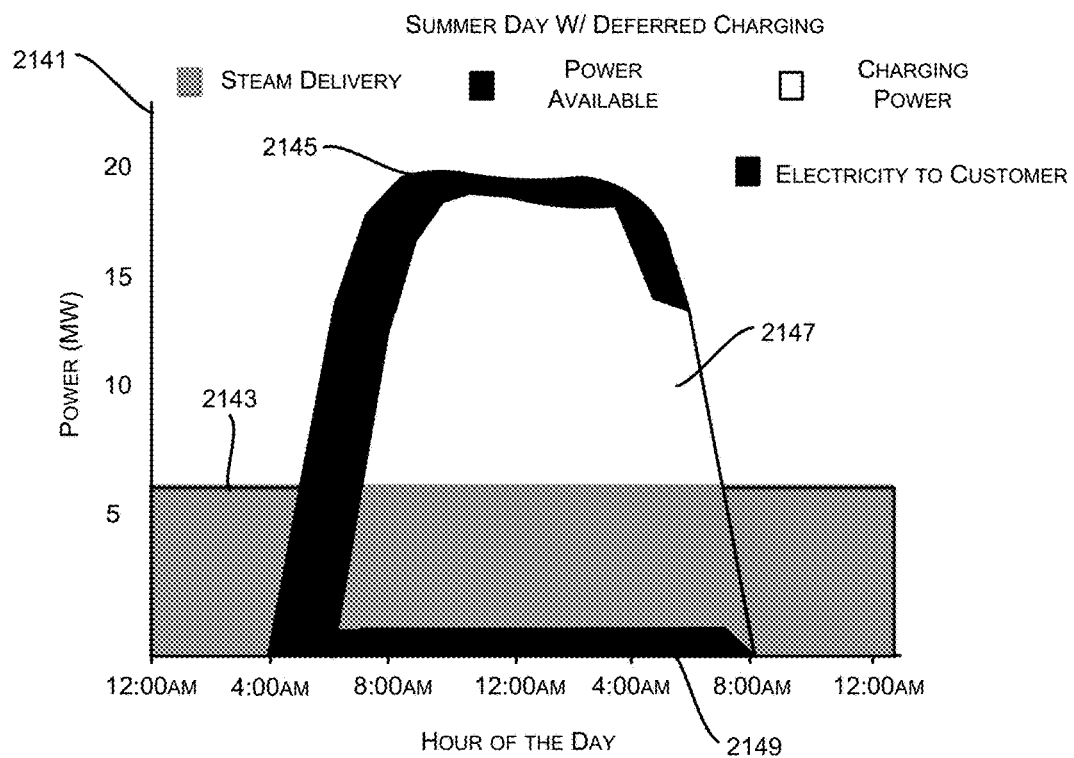
FIG. 34(C)

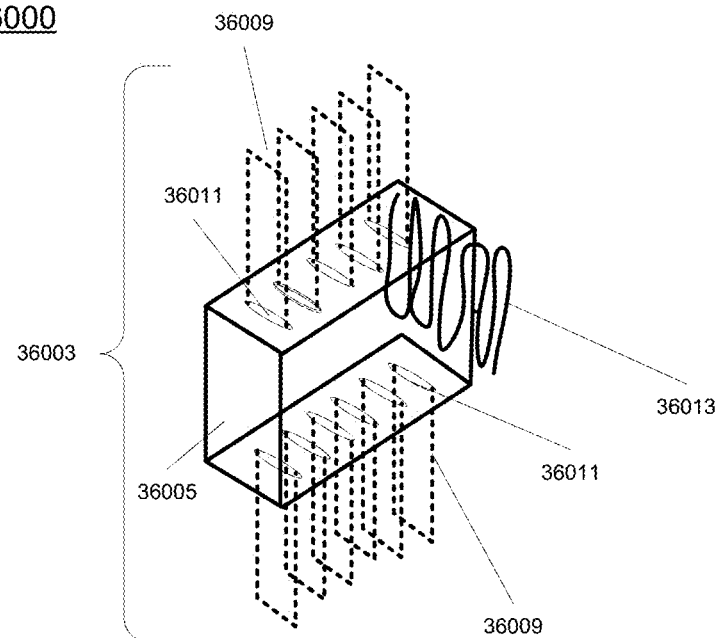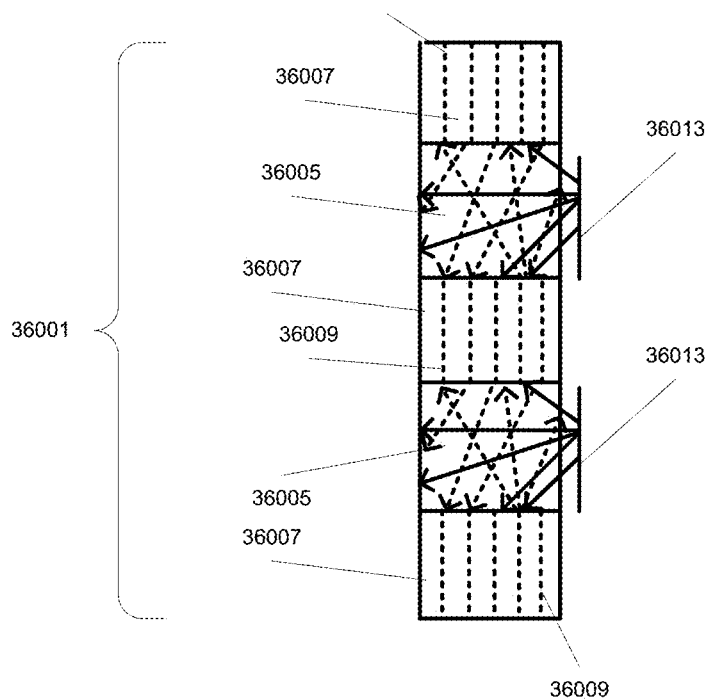
FIG. 36

5100

```
┌─────────────────────────────────────────────────────────────┐
│ Converting, by a thermal energy storage system, input       │
│ electricity from an intermittently availability energy      │
│ supply to stored thermal energy.                            │
│                            5110                             │
└─────────────────────────────────────────────────────────────┘
                              │
                              ▼
┌─────────────────────────────────────────────────────────────┐
│ Providing stored thermal energy from the thermal energy     │
│ storage system to a steam turbine to generate electricity   │
│                            5120                             │
└─────────────────────────────────────────────────────────────┘
                              │
                              ▼
┌─────────────────────────────────────────────────────────────┐
│ Providing the generated electricity and heat from the       │
│ thermal energy storage system to a carbon dioxide capture   │
│ system that separates carbon dioxide from exhaust gases,    │
│ wherein the output electricity and heat is provided at      │
│ least at times when the energy supply is not available.     │
│                            5130                             │
└─────────────────────────────────────────────────────────────┘
```

FIG. 95

THERMAL ENERGY STORAGE ASSEMBLAGE WITH ENERGY COGENERATION

CROSS-REFERENCE TO RELATED APPLICATIONS

The present application claims benefit under 35 USC § 120 to U.S. patent application Ser. No. 17/537,407, filed Nov. 29, 2021, which in turn claims benefit to each of the following applications under 35 USC § 119(e): U.S. Provisional Application No. 63/119,443, filed on Nov. 30, 2020, U.S. Provisional Application No. 63/155,261, filed on Mar. 1, 2021, U.S. Provisional Application No. 63/165,632, filed on Mar. 24, 2021, U.S. Provisional Application No. 63/170,370, filed on Apr. 2, 2021, and U.S. Provisional Application No. 63/231,155, filed on Aug. 9, 2021. The present application also claims benefit under 35 USC § 119(a)-(d) to PCT/US21/61041, filed Nov. 29, 2021, which in turn claims the benefit of the each of the following as priority applications: U.S. Provisional Application No. 63/119,443, filed on Nov. 30, 2020, U.S. Provisional Application No. 63/155,261, filed on Mar. 1, 2021, U.S. Provisional Application No. 63/165,632, filed on Mar. 24, 2021, U.S. Provisional Application No. 63/170,370, filed on Apr. 2, 2021, and U.S. Provisional Application No. 63/231,155, filed on Aug. 9, 2021. The contents of the aforementioned priority applications are all incorporated by reference in their entirety and for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat to industrial processes and/or electrical power generation.

Related Art

I. Description of Art

A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times. Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Electrochemical Energy Storage Systems

Electrochemical energy storage systems such as lithium-ion batteries and other forms of electrochemistry are commonly used for storing electricity and delivering it upon demand, or "dispatch." Electrochemical storage of energy can advantageously respond rapidly to changes in supply and demand. The high cost of this form of energy, however, has limited its wide adoption. These financial barriers pose hurdles to the wider use of electrochemical storage of energy.

C. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Notable thermal energy storage devices include heat recuperation devices such as Cowper stoves in steel blast furnaces and "regenerators" in glass melting furnaces, which absorb heat from exiting gases and return heat by preheating inlet gases. Such devices use "refractory" materials, which are resistant to high temperatures, as their energy storage media. Examples of these materials include firebrick and checkerbrick. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

But each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or conductive cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its full capacity, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important, and may be a higher determinant of total system cost than the discharge rate.

1. Cowper Stoves

Examples of solid-media storage designs that achieve relatively higher isothermal conditions during discharge include Cowper stoves, which arrange a long gas path through successive portions of thermal storage material, and which reverse the flow of heat transfer gases between charging and discharging.

2. Siemens Electric Thermal Energy Storage (ETES)

This system stores energy as heat in a solid medium such as rocks or rubble that form air passages. The material is heated convectively by a heat transfer fluid that is heated externally to the storage system. European Patent 3 245 388 76 discloses such an approach at FIGS. 1 and 3. However, in this approach, the flow of heat transfer fluid, relative temperatures, material surface areas, and heat transfer fluid heaters must all be sufficient to absorb peak incoming energy, and which increases costs over components that do not require such high capacity. The necessity for a convective heating system, including a blower system (e.g., a turbo blower system) or the like, adds further cost. Additionally, the solid medium is not able to be heated and cooled in a uniform thermocline manner, since both the material and internal fluid paths are randomly or nonuniformly arranged, and buoyancy effects result in temperature gradients transverse to the desired gradient. This causes outlet temperatures to rise relatively early during charging, necessitating more expensive air ducts and fans that can handle high temperature fluids; and further causes outlet temperatures to fall relatively early in discharging, limiting the practically achievable delivery temperature to levels significantly below the peak temperature of the storage medium (e.g. rock). Because the conversion of electrical energy is principally via radiation from a resistance heater to adjacent or nearby surfaces, followed by convective heat transfer from the surfaces to air, followed by convective heat transfer from air to solid media; and because each of these heat transfer steps requires a difference in temperature causing heat to flow, the practical peak temperature of the storage medium is significantly (more than 100° C.) below the peak temperature of the electrical heater surfaces. Because the applicability of stored heat varies significantly with temperature—many industrial processes have a minimum temperature required to drive the process at or above 1000°—and because the cost and usable lifetime of electrical resistance heaters varies sharply with temperature, any thermal storage system that employs convective charging has significant disadvantages both in its cost and its field of use. Finally, it is noted that the design disclosed in this reference uses convective heat transfer, rather than radiation of heat (and reradiation of heat from brick to brick), as the primary method of heating, which is slower and less effective at achieving uniform heating.

Further, during operation of a system according to Siemens/ETES, like any system employing packed beds of loose/unstructured solids (whether rocks, gravel, manufactured spheres, or other shapes and methods), the storage media can be expected to expand and contract repeatedly, and repeatedly exert high forces during expansion on the outer container holding the media, and to settle during cooling and shrinking, causing the media and rubble to settle and potentially be crushed into small fragments or powder, diminishing their heat capacity. In addition, the expansion due to heating of bulk, unstructured material as in Siemens can be expected to exert stress on the container for the bulk material, and thus require the use of expensive insulation and container walls.

3. Conlon

Other approaches have described possible thermal energy storage systems in the abstract, without enabled designs described or referred to. US Patent Application US2018/0245485A illustrates using solar thermal energy to heat a liquid storage medium (i.e., molten salt) and refers to the possibilities of storing heat in solids at [0038] and [0039]. However, this approach does not recognize or resolve the problems and disadvantages, or provide enabling disclosure of the solutions necessary to enable such storage of VRE in solid media.

4. Stack

Still other approaches have described VRE storage systems with rapid charging. For example, Stack, in "Performance of firebrick resistance-heated energy storage for industrial heat applications and round-trip electricity storage," describes design concepts using electrical energy as the source energy to heat and store energy in refractory solids (bricks) (https://doi.org/10.1016/j.apenergy.2019.03.100). Stack discloses a primary heating method that includes metallic resistive heating elements embedded within an array of refractory materials that are heated (charged) by radiative heat transfer from such resistive heating elements to surfaces immediately adjacent to the heating elements, and cooled (discharged) primarily by convective heat discharge using flowing air as the heat transfer fluid, and discloses the optional use of resistive heating of conductive refractory materials and heating by means of passing electrical currents through such conductive refractory materials. As discussed below, Stack's primary heating method disclosure has significant disadvantages versus the present inventions, as the proposed designs have high vulnerability to even small nonuniformities in properties of heaters and bricks; high thermal gradients due to reliance on conductive heat transfer and nonuniform heating of surfaces; and high consequences of occurrences of brick failures, including the well-known cracking and spalling modes. Because the heater wires are exposed to a small amount of brick area and heat transfer is by conduction, nonuniformity in the heating of the refractory material and potential thermal stress in that material may result, which would be exacerbated in case of failure of individual heater elements, and because internal cracking changes conductive heat transfer, any cracked areas result in substantially higher surface temperatures near such cracks, which may result in significantly higher local temperatures of heating elements, causing either early-life heater temperatures or significant limits in the practical operating temperatures of such heaters, or both. The present innovations overcome these challenges with both structural and operational features that allow the reliable operation of storage media and heaters at high temperatures and long life by intrinsically assuring more uniformity of temperatures throughout the storage media, even in the presence of nonuniformities of heaters and bricks and cracking and spalling of brick.

5. Others

United States patent application US20180179955A1 is directed to baffled thermoclines in thermodynamic cycle systems. Solid state thermoclines are used in place of heat exchangers in an energy storage system. However, this teaches limiting the conductive and/or radiative transfer of heat within different zones defined by the baffle structure.

U.S. Pat. No. 9,370,044B2 (McDonald) is directed to a thermal storage device controller that load-balances requirements of a user to manage heating, and discloses the use of bricks with heating elements disposed in the bricks. Controllers are disclosed that can have plural operating modes, each operating mode being associated with a default core temperature, such as a first operating mode and a standby operating mode. The operating modes may be set based on a season. The McDonald design may also include a controller that receives information associated with forecasted climatic conditions, and set operational temperatures based on the forecasted climatic conditions. However, this approach does not address the above problems and disadvantages with respect to the charging and discharging of the brick.

II. Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to be increased, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into these factors, maximizing practical utility and economic efficiencies.

III. Unmet Needs

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

SUMMARY

The example implementations advance the art of thermal energy storage and enable the practical construction and operation of high-temperature thermal energy storage systems which are charged by VRE, store energy in solid media, and deliver high-temperature heat.

Aspects of the example implementations relate to a system for thermal energy storage, including an input, (e.g., electricity from a variable renewable electricity (VRE) source), a container having sides, a roof and a lower platform, a plurality of vertically oriented thermal storage units (TSUs), inside the container, the TSUs each including a plurality of stacks of bricks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen and other gases, alone or in combination), and when one is mentioned it should be understood that the others can equally well be used. Thus, for example, "air" can be any suitable fluid or gas or combinations of fluids or gases.

According to another aspect, with regard to the TSUs as explained above, the bricks are configured in arrays. The bricks have elongate channels or slots through them, which are vertically oriented in the stack and induce turbulent flow for effective heat transfer to the fluid flowing through the stack. The arrays of bricks define radiation chambers, either between bricks or formed within the bricks themselves, or both, which enable efficient distribution and absorption of heat energy through the stack by exposing surfaces of bricks directly or indirectly to heat radiation from the heater elements, heating brick throughout the stack more quickly and uniformly than by conduction or convection alone, particularly at high temperatures. The elongate channels have a long axis and a short axis, and may have curved or rounded corners.

The bricks may be stacked in a 3D alternating (e.g., checkerboard) pattern, with alternating brick-chamber-brick, etc. In each dimension (x, y, z). Vertical air flow paths are formed through channels in at least some of the bricks, then through the next radiation chamber, then through the next channels of a subsequent brick, and so on, from the bottom of the stack to the top. Resistive heaters are positioned in gaps formed between bricks, orthogonal to the channels, to heat the stack using incoming electricity (from an energy source, such as solar, wind, etc.). A blower directs air from the bottom of the stack to the top to discharge the stack and provide hot air for industrial use. In some implementations, the stacks are enclosed in a structure that is designed for seismic isolation to avoid damage during a seismic event such as an earthquake. The structure is also designed for the circulation of air from the blower through pathways surrounding the core array structure, to provide dynamic insulation between the stacks, the foundation and the structure. One arrangement provides such circulation to an upper portion of the structure, and then down one or more sides of the structure, and then up through the brick array to heat the air to a desired temperature range for discharge to industrial uses.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, CO2, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g. to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to yet another aspect, an integrated thermal energy storage calciner system is provided. The TES unit delivers a gaseous fluid output connected to a calciner or kiln, wherein the gaseous fluid output provides a first portion of the heat and/or temperature required to drive the calcination process, and an optional second heat source may provide further energy and/or temperature. The TES unit may have a gaseous fluid output directly connected to all or any portion of a material transformation system that includes material drying, preheating or other conditioning, and calcination, wherein the TES provides all or substantially all of the energy required to drive such material transformation processes. The TES unit in some applications has a gaseous fluid output indirectly connected to a calciner/kiln for activation of a material to remove unwanted substances (for example $CO_2$, in a calcination process for cement production), wherein the gaseous fluid output is configured to provide a primary working fluid at a higher temperature that exchanges heat with a secondary working fluid at a lower temperature that in turn heats a solid raw material. The primary working gas is hot gas for convective heat transfer (e.g., at the calcination plant). A feedback system may recirculate the post-process gas to the TES for reheating. Applications may include construction material, biomass and/or food processing.

Additional aspects may include a solid-oxide electrolysis application that includes the TES unit coupled to an electrolysis system. A high-temperature solid oxide electrolyzer converts water into hydrogen and oxygen in a hydrogen generation unit (e.g., for use in a fuel cell). The electrolyzer includes an anode, a cathode and a solid ceramic (oxide) electrolyte, and uses heat (e.g., output of the thermal energy storage (TES)) to decrease the electrical energy needed to be used in the electrolysis process. The heat that flows from the TES stack is received at the solid oxide electrolysis cells (SOEC) as hot air and/or steam, at a rate that is determined by a controller (manual and/or automatic) that sets the flow rate to maintain the SOEC at a desired temperature (e.g., 860° C.). The electricity source may be any of a variety of sources, such as a photovoltaic (PV) cell, an electricity output application associated with the TES, or stored electricity at the SOEC itself. The hydrogen generated by the SOEC by may be used in a wide variety of known applications, including in a hydrogen filling station (e.g., electric vehicle charging station), or other industrial application (e.g., renewable diesel refinery), and the highly oxygenated by-product may also be used for industrial or commercial applications, including power generation. The lower-temperature waste heat released by the SOEC (e.g. at 650° C.) can optionally be directed and optionally supplemented by higher-temperature heat by the TES, and coupled into a steam generator for the use of such heat or used for another industrial process. As an alternative to electrolysis of water to hydrogen, electrolysis of other gases may be performed, such as carbon dioxide to carbon monoxide, either separately or in combination with electrolysis of water.

According to an additional aspect, a DC/DC power conversion system includes an array of galvanically isolated individual converters, each receiving an input from a photovoltaic (PV) array at a primary side, a secondary side of each of the individual converters coupled in series for higher output voltage, and in parallel for higher output current, a combiner coupled to the array and other arrays, and a junction box including a plurality of high voltage switches coupled, by a variable DC line to the combiner, having an output to a thermal storage unit (TSU) or a DC charging system.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

Further aspects include applications associated with a carbon dioxide separator. The separation of carbon dioxide from other gases including ambient air and combustion exhaust gases is often beneficially accomplished by processes that use large amounts of heat to regenerate a chemical that absorbs or reacts with carbon dioxide. Such processes include but are not limited to processes that use a carbonation/calcination reaction cycle, for example using calcium or potassium reactions, or absorption/adsorption/ release cycles, for example using liquid or solid materials including zeolites or amines. The provision of heat to serve these capture processes from VRE may be beneficial in further reducing the emissions and costs such of carbon capture processes. For example, a combustion exhaust gas input from an industrial source, or from a direct air capture (DAC) unit, may require heat to drive a solvent "reboiler,"—a steam generator or a calcium carbonate calciner, to raise the temperature of a reactant that causes the release separation of carbon dioxide. The combustion exhaust gas is received via a heat exchanger and a stripper tower. A carbon dioxide compressor receives power generated by a steam turbine connected to the TES system, and compresses the selectively separated carbon dioxide. Compressed carbon dioxide may be input to a solid oxide electrolysis cell (SOEC), industrial processes, or geologic sequestration.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 34(A)-(C) illustrate power profiles according to the example implementations;

FIGS. 36 and 37 illustrate the structure of the radiation cavity and propagation of thermal radiation and temperature characteristics, and corresponding fluid slot, according to some implementations.

FIG. 95 is a flow diagram depicting an implementation of a method for operating a thermal energy storage system;

DETAILED DESCRIPTION

Figure 1:
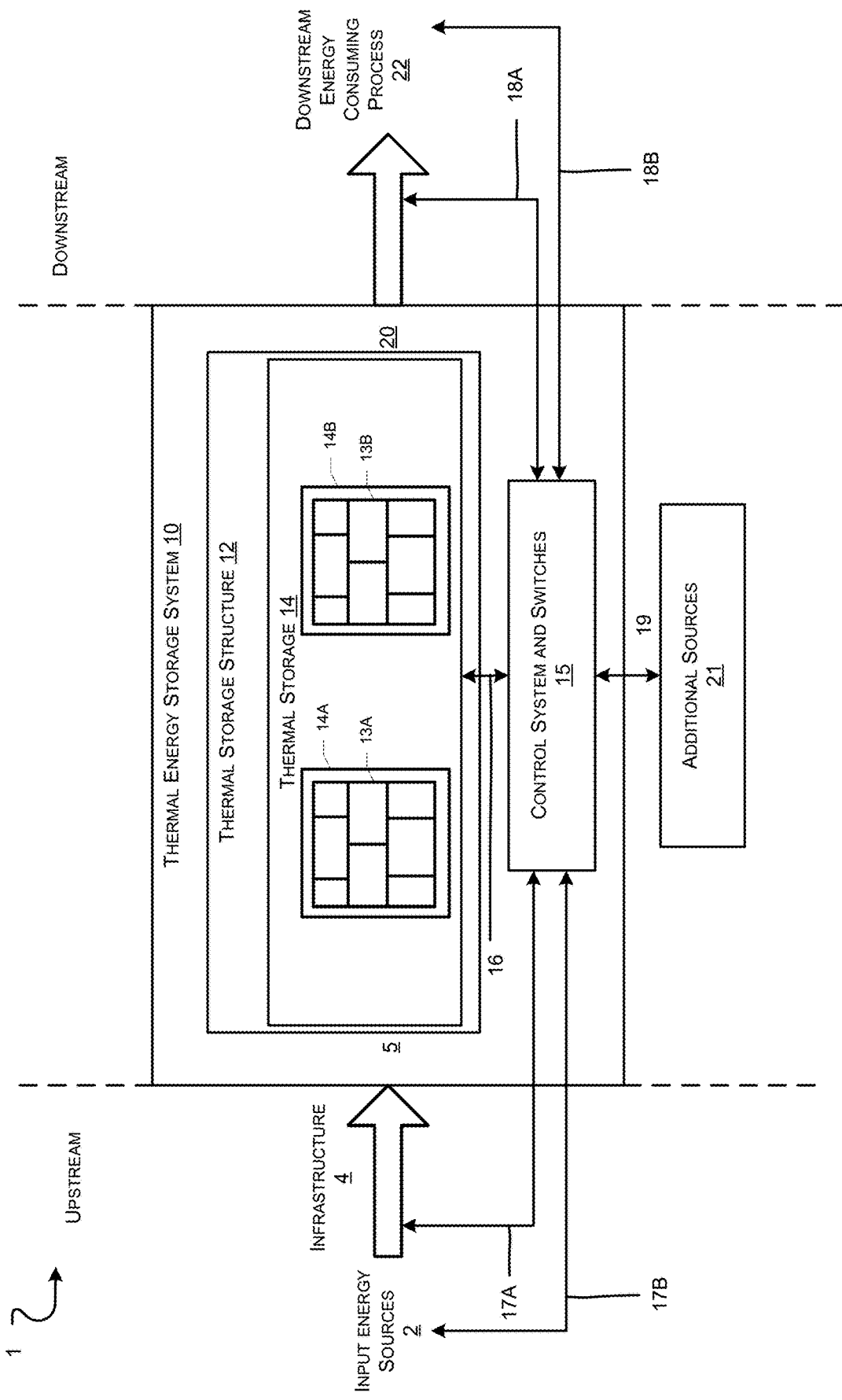
FIG. 1 illustrates a schematic diagram of the thermal energy storage system architecture according to the example implementations.

Aspects of the example implementations, as disclosed herein, relate to systems, methods, materials, compositions, articles, and improvements for a thermal energy storage system for power generation for various industrial applications.

I. Overall System

Problems to be Solved

The present disclosure is directed to effectively storing VRE as thermal energy in solid storage media.

While systems such as Cowper stoves store high-temperature energy in solid media, such units are charged and discharged at similar rates, and are heated and cooled primarily by convection, by flowing heat transfer gases. Pressure differences caused by any combination of buoyancy-mediated draft (the "stack effect") and induced or forced flow (i.e., flow caused by a fluid movement system which may include fans or blowers) moves the heat transfer fluids through the solid media. Approaches such as this use convection for charge and discharge, with the heat transfer fluid being heated externally to the storage media array. But applying this approach to VRE storage disadvantageously requires large surface area and is therefore costly, because such convective heat transfer systems must operate at the much higher rates associated with VRE charging than heat delivery.

Thermal storage systems include various element heaters, storage media, enclosing structures, and heat transfer subsystems, all of which may be affected by temperatures of the storage system and by the rate of change of such temperatures. Excessive temperatures and/or excessive rate of change of temperature can induce failures due to various effects. Some of these effects include material softening, oxide spallation, metal recrystallization, oxidation, and thermal stress-induced cracking and failure.

Rising temperatures within a thermal storage unit cause thermal expansion of the materials that are used for thermal energy storage. Nonuniformities in these temperatures can cause stress in solids. Such temperature nonuniformities may arise during both discharging periods (due to flowing heat transfer fluids that cool the storage media) and charging periods (due to the high heat transfer rate). In general, a heat flux at one surface causes nonuniform temperatures within the solid media; such temperature nonuniformity causes heat to flow by conduction to cooler zones, at a rate determined by the thermal conductivity of the material and the magnitude of the temperature nonuniformity.

Temperature nonuniformities may also be caused by repeated heating and cooling of a thermal storage array that includes heating elements and channels through which the heat transfer fluid flows. These nonuniformities may be amplified in successive cycles of heating and cooling, which in turn causes localized areas of a storage system to become excessively hot or cool during operation. This phenomenon is known as "thermal runaway," and can lead to early-life failure of thermal storage arrays. Nonuniformities in temperature may be exacerbated when individual heating elements fail, resulting in the zone of a storage unit having the failed heating elements being unheated, while another zone of the storage unit continues to have active heating elements and high temperatures.

Finally, VRE storage systems must operate under an exacting set of standards. They should be able to fully charge during periods that the variable energy is available (e.g., during daylight hours in the case of solar energy, as defined by a solar diurnal cycle that begins with the time of sunrise and ends with the time of sunset; it is understood that the time of sunrise and sunset can vary depending on physical location in terms of latitude and longitude, geography in terms of terrain, date, and season). They need to consistently deliver energy, even though their input energy source is not always predictably available. This means that these systems must sometimes be able to deliver output energy during periods that are longer than the periods of input-energy availability. VRE storage systems need to be able to operate under these conditions daily over decades of use.

Overview of Solution

The present disclosure relates to the field of thermal energy storage and utilization systems, and addresses the above-noted problems. A thermal energy storage system is disclosed that stores electrical energy in the form of thermal energy in a charging mode, and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy.

These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. As will be explained in greater detail below, the received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22. More detail regarding steam generation is provided later in this Section, and more detail regarding various potential downstream processes is provided in Section IV.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments. More detail regarding possible implementations of control system 15 is provided below with respect to FIGS. 15 through 17.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. As will be explained in greater detail below, control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22.

Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

As will be described in detail below, thermal energy storage system 10 is configured to efficiently store thermal energy generated from input energy source 2, and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
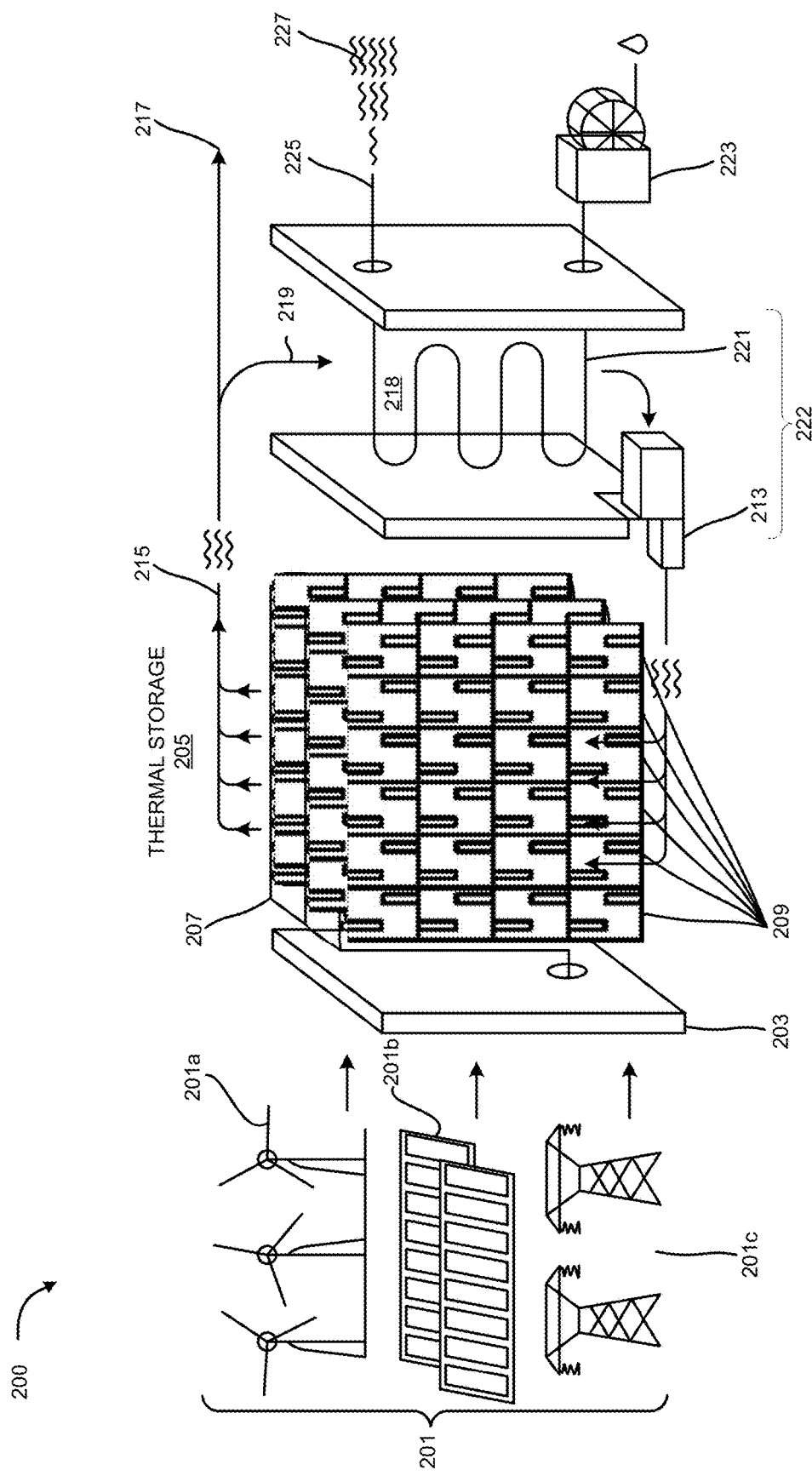
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201*a*, solar energy from photovoltaic cells 201*b*, or other energy sources may provide electricity that is variable in availability or price because the conditions for generating the electricity are varied. For example, in the case of wind turbine 201*a*, the strength, duration and variance of the wind, as well as other weather conditions causes the amount of energy that is produced to vary over time. Similarly, the amount of energy generated by photovoltaic cells 201*b* also varies over time, depending on factors such as time of day, length of day due to the time of year, level of cloud cover due to weather conditions, temperature, other ambient conditions, etc. Further, the input electricity may be received from the existing power grid 201*c*, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. (More details as to the thermal storage structure are provided below with respect to FIGS. 7 through 12.) The input electrical energy is converted to heat within thermal storage 205 via resistive heating elements 207 controlled by switches (not shown). Heating elements 207 provide heat to solid storage media 209. As will be explained in greater detail in Section II, thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers (as shown 1611 in FIG. 18). By the release of heat energy from the resistive heating elements 207, heat is radiatively transferred to arrays 209 of bricks during a charging mode. Relatively hotter brick surfaces reradiate absorbed energy (which may be referred to as a radiative "echo"), and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
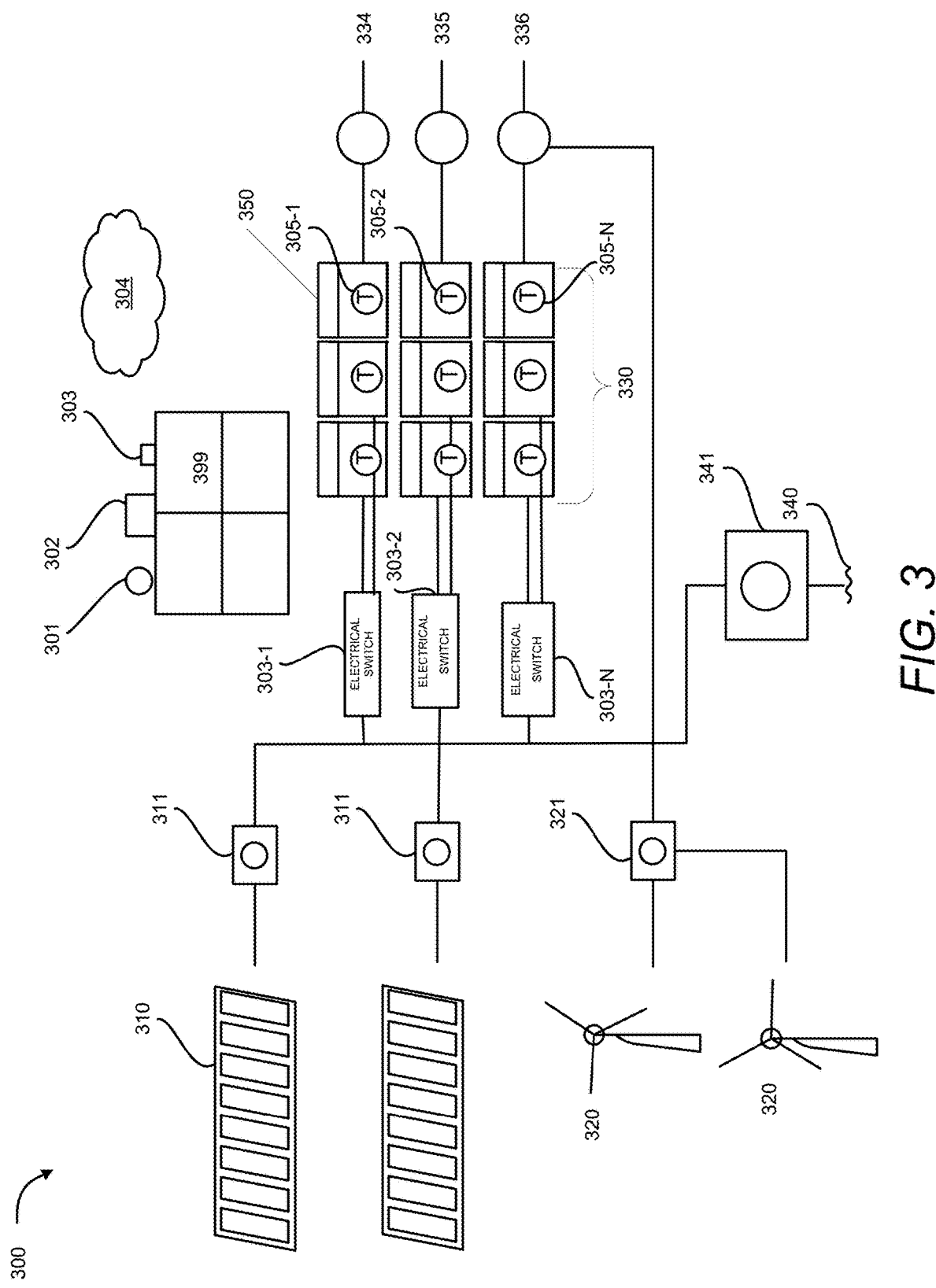
FIG. 3 illustrates a schematic diagram of a system according to the example implementations.

FIG. 3 provides a schematic view of a distributed control system 300 that highlights certain control aspects that may be present in particular implementations of the teachings of the present disclosure. As has been previously described, energy inputs to system 300 may include VRE sources (such as photovoltaic cells 310 and/or wind turbines 320), as well as other sources 340. Control system 300, which may be referred to as a "smart energy controller," is configured to exchange information with a variety of components within system 300, including thermal energy storage control system 399 (also referred to as control system 399 for convenience) to automatically manage the operation of charging, discharging, and maintaining thermal energy storage in an intelligent manner.

Control system 399 may include a variety of sensors/devices, including one or more voltage and current sensors integrated with power conditioning equipment 311 and switching equipment 303, a wind sensor 301, a sky camera 302 that detects passing clouds, and/or solar radiation sensor 303. Control system 399 may also receive data via a network connection from various remote data sources, such as cloud data source 304. Accordingly, control system 399 may access many different forms of information, including, for example, weather forecasts and market conditions such as the availability of electricity, cost of electricity, presence of other energy sources, etc.

Control system 399 is also configured to communicate with input energy sources via power conversion and control devices such as 303, 311, 321, and 341. These controllers may be configured not only to pass data to control system 399, but also to receive commands from control system 399. Control system 399 may be configured in some instances to switch between input power sources in some instances by communicating with these controllers. Accordingly, in one implementation, control system 399 might analyze numerous different external data sources to determine which of several available input energy sources should be utilized, and then communicate with controllers such as 311 and 321 to select an input source. In a similar fashion, control system 399 may also communicate with downstream devices or systems, such as a steam generator 334, a hot air output 335, and an industrial application 336. Control system 399 may use information from such input sensors to determine actions such as selectively activating switches 303-1 through 303-N, controlling heaters within array 330. Such control actions may include rapid-sequence activation of switches 303-1 through 303-N in patterns to present varying total resistive loads in response to varying available power, so as to manage voltage and current levels at controllers 311, 321, and 341 within predetermined ranges.

Information within the thermal storage structure itself may also be used by control system 399. For example, a variety of sensors and communication devices may be positioned within the bricks, arrays, storage units and other locations within the thermal storage structure, as represented as electrical switches, including semiconductor switches, by 303-1 through 303-N. The information may include state of charge, temperature, valve position, and numerous other operating parameters, and the switches may control the operation of the thermal storage system 330, based on a signal received from the control system 399, for example. Such control actions may include activation of switches 303-1 through 303-N so as to manage temperatures and state of charge within array within predetermined ranges.

Control system 399 can communicate with devices such as 303 to perform operations based on received data that may be either internal and/or external to the thermal storage structure. For example, control system 399 may provide commands to heating elements controls, power supply units, discharge blowers pumps, and other components to perform operations such as charging and discharging. Control system 399 may specifically receive data from thermal storage system 330, including from subsections such as 350, and individual bricks or heating elements such as 305-1 through 305-N.

The ability to receive data from numerous locations inside and outside the thermal storage structure permits system 300 to be able to operate in a flexible and efficient manner, which is advantageous given the challenges that arise from attempting to deliver a continuous supply of output energy from a variable source.

Figure 4:
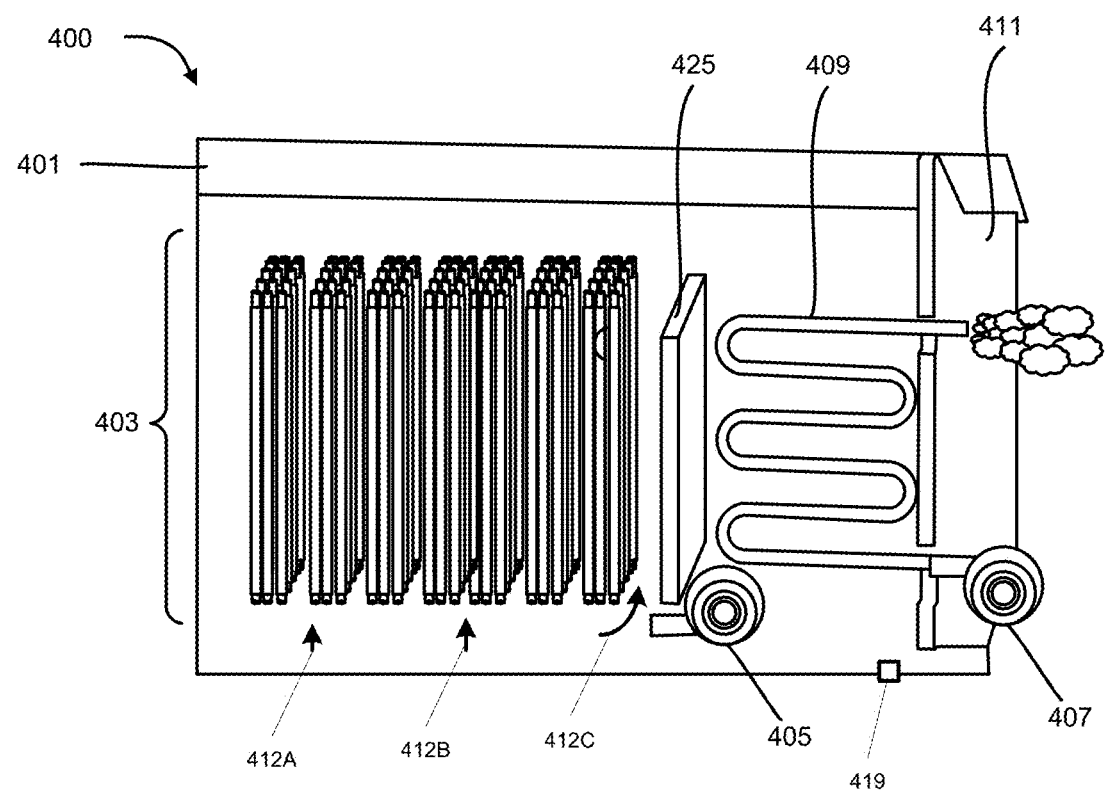
FIG. 4 illustrates a schematic diagram of a storage-fired once-through steam generator (OTSG) according to the example implementations.

A thermal storage structure such as that depicted in FIGS. 1-3 may also include output equipment configured to produce steam for use in a downstream application. FIG. 4, for example, depicts a block diagram of an implementation of a thermal storage structure 400 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 400 to generate steam at output 411.

As has been described, thermal storage structure 400 includes outer structure 401 such walls, a roof, as well as thermal storage 403 in a first section of the structure. The OTSG is located in a second section of the structure, which is separated from the first section by thermal barrier 425. During a charging mode, thermal energy is stored in thermal storage 403. During a discharging mode, the thermal energy stored in thermal storage 403 receives a fluid flow (e.g., air) by way of a blower 405. These fluid flows may be generated from fluid entering structure 400 via an inlet valve 419, and include a first fluid flow 412A (which may be directed to a first stack within thermal storage 403) and a second fluid flow 412B (which may be directed to a second stack within thermal storage 403).

As the air or other fluid directed by blower 405 flows through the thermal storage 403 from the lower portion to the upper portion, it is heated and is eventually output at the upper portion of thermal storage 403. The heated air, which may be mixed at some times with a bypass fluid flow 412C that has not passed through thermal storage 402, is passed over a conduit 409 through which flows water or another fluid pumped by the water pump 407. In one implementation, the conduit forms a long path with multiple turns, as discussed further in connection with FIG. 5 below. As the hot air heats up the water in the conduit, steam is generated at 411. The cooled air that has crossed the conduit (and transferred heat to the water flowing through it) is then fed back into the brick heat storage 403 by blower 405. As explained below, the control system can be configured to control attributes of the steam, including steam quality, or fraction of the steam in the vapor phase, and flow rate.

As shown in FIG. 4, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 5:
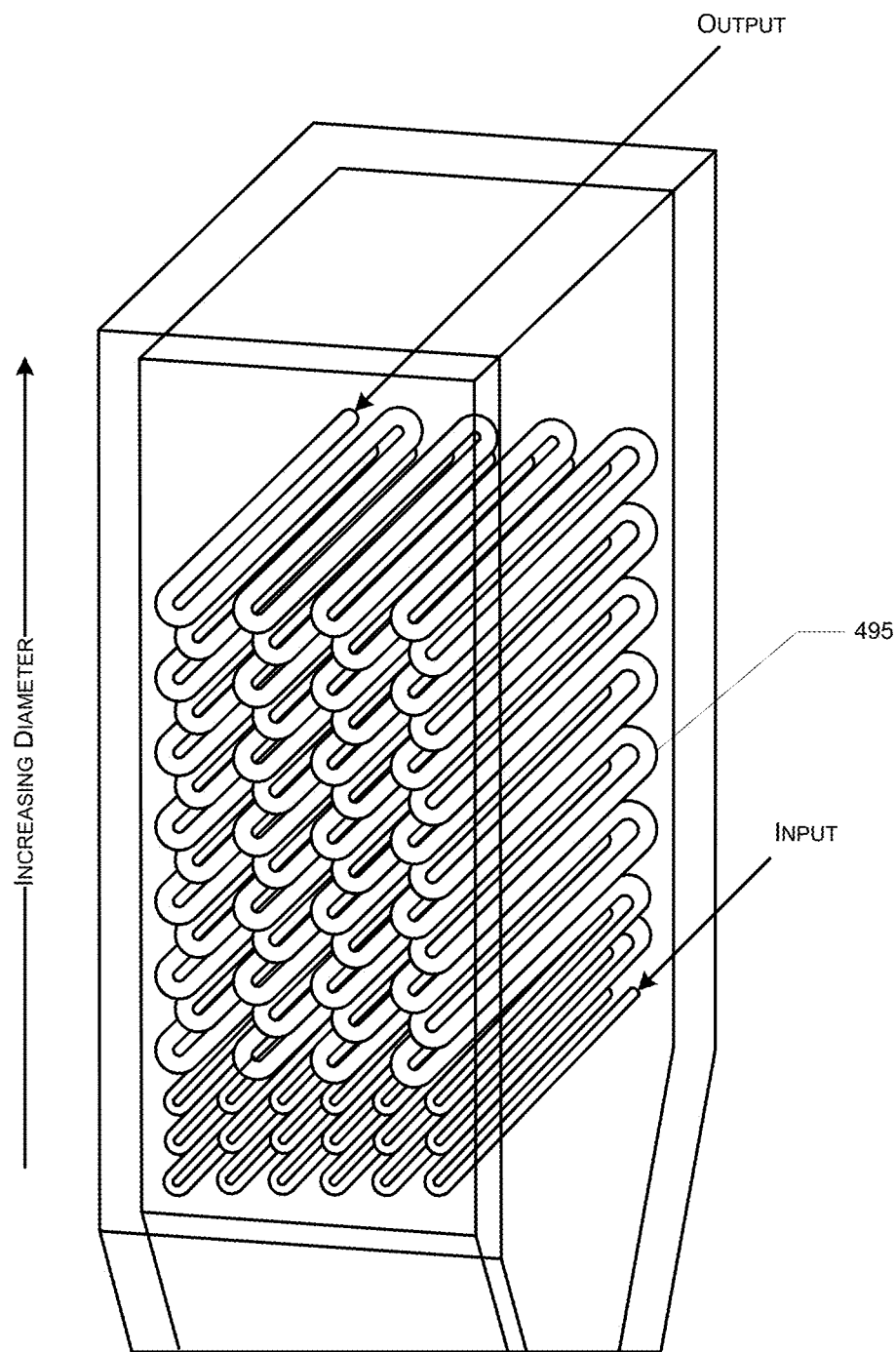
FIG. 5 illustrates a schematic diagram of the pipe of the OTSG according to the example implementations.

FIG. 5 illustrates a cross-section of the piping of an OTSG 490. Continuous serpentine piping 495 is provided having multiple bends, and turnarounds at the end of each piping row. As shown, the flow within the pipe 495 passes through the OTSG and turns around, laterally across a row, and then moves upward one row at a time. The pipe 495 has a smaller diameter near the inlet and a larger diameter in the sections nearer the outlet. The increase in diameter is to enable adequate linear flow velocity of the cooler inlet fluid, which is smaller in volume and higher in viscosity, to enable effective heat transfer, and compensate for the expansion of steam without excessive flow velocities in the later tubing sections. In one implementation, the diameter is changed in a discrete manner, and in another the diameter of the piping may taper from a smaller diameter at the input to larger diameter at the output, or some combination of these two designs, such as a smaller-diameter tapered portion coupled to a larger, fixed-diameter portion of the pipe 495. Openable ports may be provided at the inlet and the outlet of the serpentine tubing to enable the effective introduction, passage and removal of cleaning tools, or "pigs," periodically driven through the piping to remove any internal deposits. It is beneficial for such cleaning or "pigging" for a tubing section being pigged to be of approximately constant inner diameter. Accordingly, openable ports may be positioned at the points where tubing diameter changes so as to enable the effective introduction and removal of pigs of sizes appropriate to each tubing diameter section during pigging operations.

Figure 6:
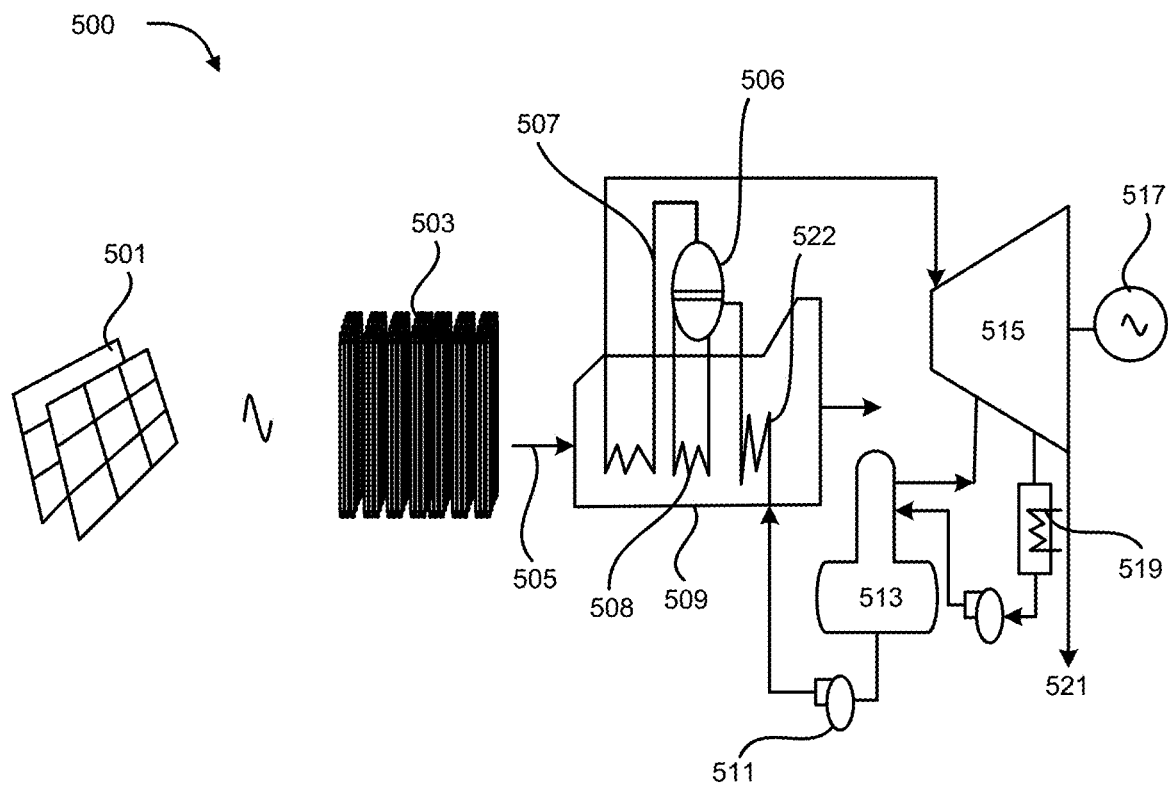
FIG. 6 illustrates an example view of a system being used as an integrated cogeneration system according to the example implementations.

As shown in FIG. 6, the output of the thermal energy storage system may be used for an integrated cogeneration system 500. As previously explained, an energy source 501 provides electrical energy that is stored as heat in the heat storage 503 of the TSU. During discharge, the heated air is output at 505. As shown in FIG. 6, lines containing a fluid, in this case water, are pumped into a drum 506 of an HRSG 509 via a preheating section of tubing 522. In this implementation, HRSG 509 is a recirculating drum type steam generator, including a drum or boiler 506 and a recirculating evaporator section 508. The output steam passes through line 507 to a superheater coil, and is then provided to a turbine at 515, which generates electricity at 517. As an output, the remaining steam 521 may be expelled to be used as a heat source for a process, or condensed at 519 and optionally passed through to a deaeration unit 513 and delivered to pump 511 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g. 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g. 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure, or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

In an OTSG implementation, a first end of the conduit can be fluidically coupled to a water source. The system may provide for inflow of the fluids from the water source into a first end of the conduit, and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

Figure 97:
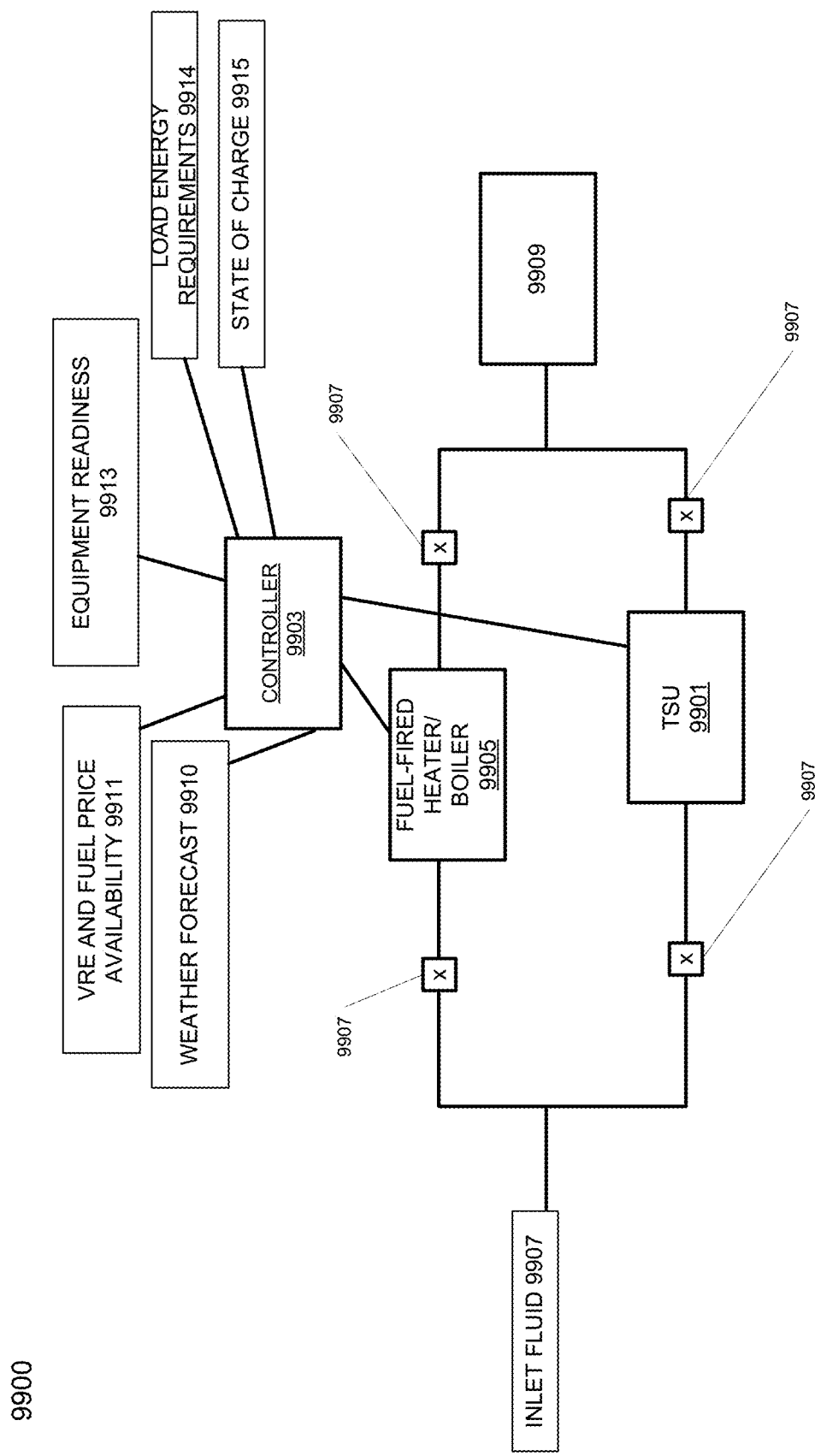
FIG. 97 discloses a system having a fuel-fired heater 9905 and a thermal storage unit according to the example implementations.

In some implementations, the "hybrid" or joint supply of steam or process heat from a thermal storage unit powered by VRE and a conventional furnace or boiler powered by fossil fuel is beneficial. FIG. 97 discloses a system 9900 where a fuel-fired heater 9905 (furnace, boiler, or HRSG) supplies heat in the form of a first flow of hot gas or steam to a use 9909 (e.g. A turbine, an oilfield, a factory), and a thermal storage unit 9901 powered by VRE or intermittent grid power provides heat in the form of a second flow of hot gas or steam to the use. The two sources—fuel-powered (9905) and VRE-powered (9907)—may be fluidically connected to a common supply inlet 9907 of air, $CO_2$, salt, oil, or water to be heated, and fluidically connected to a common outlet or use of heated fluid or steam.

A controller 9903 may control or partially control the operation of the fuel-fired heater 9905 and the VRE storage heater 9901, with inputs to the controller including information derived from forecasts of weather 9910, the pricing and availability of electricity 9911, the pricing and availability of fuel 9911, the state of charge of the TSU 9915, the readiness and state of the equipment 9913, and the current and planned energy requirements of the connected load 9914. The controller may schedule and control the operation of TSU charging, fuel combustion, and TSU output in a means to meet the needs of the use at the lowest possible $CO_2$ emissions and/or the lowest total operating cost.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided further below.

Thermal Storage Structure

Figure 7:
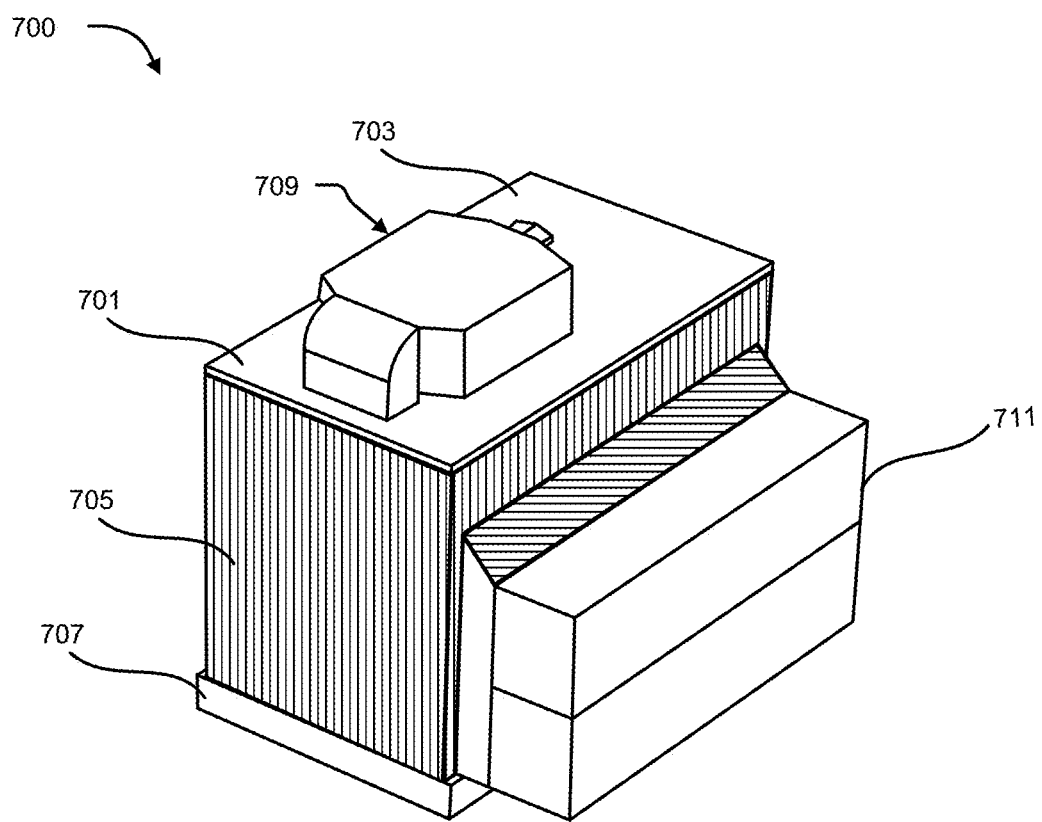
FIG. 7 illustrates an outer view of the thermal energy storage system according to the example implementations.

FIG. 7 illustrates an isometric view 700 of one implementation of a thermal storage structure 701, which is an implementation of thermal storage structure 12 depicted in FIG. 1. More specifically, structure 701 includes a roof 703, sidewalls 705, and a foundation 707. As shown at 709, a blower is provided that may draw air in and out for temperature regulation and safety. At 711, a housing is shown that may house the blower, steam generation unit, and/or other equipment associated with an input or an output to structure 701.

Further, switchgear or other electrical and electronic equipment may be installed at thermal storage structure 701. This is made possible due to the dynamic insulation, which reduces the heat that is transferred to the outer surface of structure 701, which in turn allows for equipment having a limited temperature operating range to be positioned there. Such equipment may include sensors, telecommunication devices, controllers, or other equipment required to operate structure 701.

Figure 8:
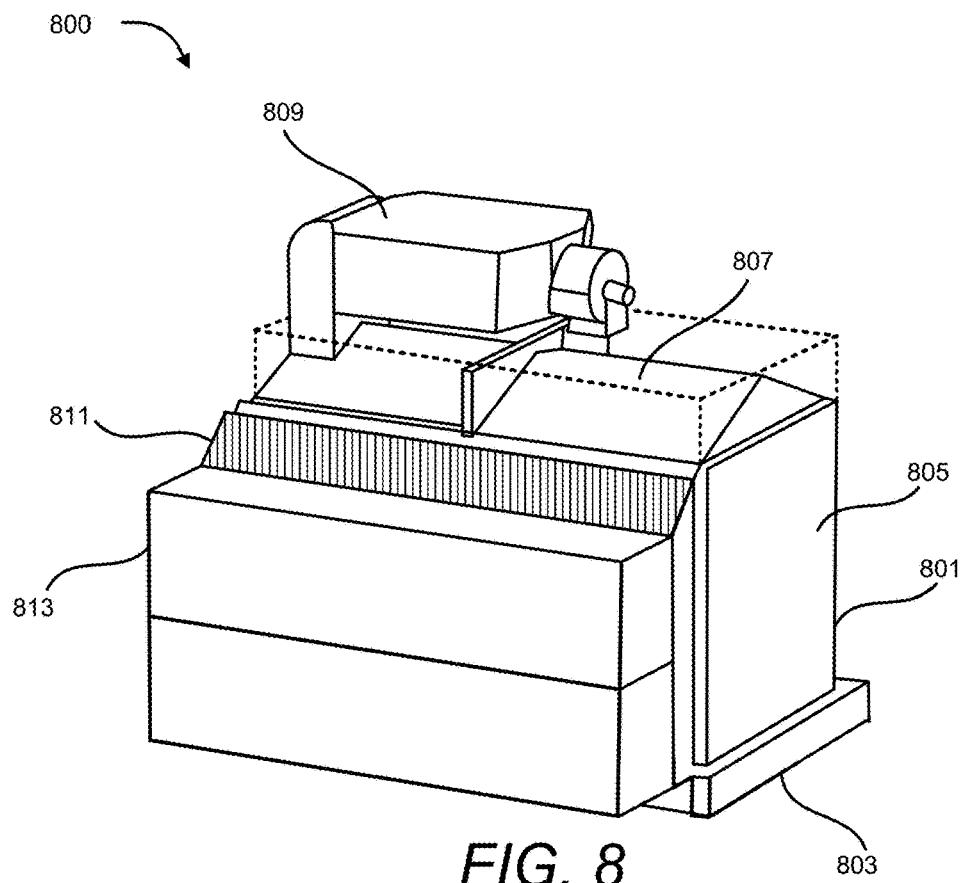
FIG. 8 illustrates an isometric view of the inner roof and storage structure of the thermal energy storage system according to the example implementations.

FIG. 8 illustrates a perspective view 800 of a thermal storage structure 801. As shown above, the plenum near 803 and sidewalls 805 are shown. The inside of the roof includes insulation 807. At 809, the housing may contain the exhaust or blower as explained above. As shown at 811, the passages between the stacks of structure 801 and the outer surface of the sidewalls 805 may be provided as a vertically slotted chamber. Such vertical slots are optional, however, and other configurations may be used, including a configuration that has no slots and forms a chamber. As explained above, the cool air is provided by the blower to a gap between the bricks and the insulation 807, and subsequently flows down the walls of structure 801 to the plenum near 803, where the cool air is warmed by heat from the stacks of bricks as it passes between the stacks of bricks and the insulation 807, and out to a steam generator 813, for example. The somewhat warmed air flows through air flow paths in the stacks of bricks, from below. Further, element 809 may also include the blower. Finally, the system may be an open-loop, as opposed to a closed-loop, configuration. This means, for example, that intake ambient air instead of recirculating air from the industrial application may be used.

Figure 9:
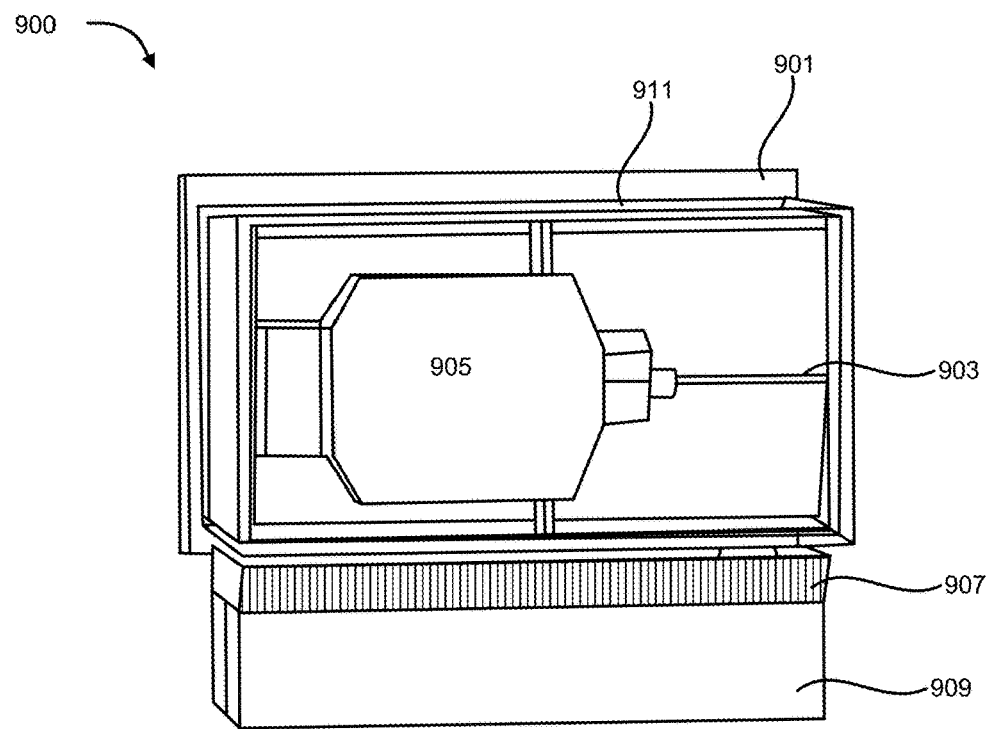
FIG. 9 illustrates a top view of the inner roof of a thermal storage structure according to an example implementation.

FIG. 9 illustrates a top view 900 of the inner roof of a thermal storage structure 901 according to an example implementation. As explained above, an insulating layer 903 surrounds the hot bricks, and provides a heat barrier between the output of the stacks of bricks and the outer structure of the thermal storage structure 901. The incoming air, which may be driven by a blower (such as one in air exchange device 905), flows through the sidewalls to the plenum at the base of foundation 911. Also shown is the slotted portion 907 and the steam generator 909, as explained above. As used in the present disclosure, "cool" air refers to air that is cooler than the discharge air when the TSU is charged, though it may be in fact quite warm, e.g. around 200° C. or more, in the case of return air from a process, or it may be cooler, ambient-temperature outdoor air in the case of air provided from the environment surrounding the thermal storage unit; or at some temperature between these ranges, depending upon the source of the "cool" air.

Figure 10:
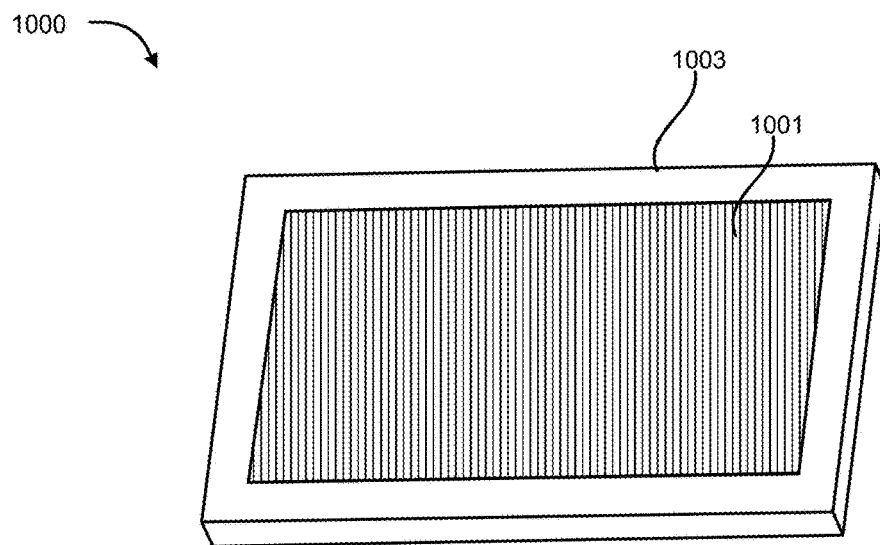
FIG. 10 illustrates a view of a platform at a lower portion of the thermal energy storage system according to the example implementations.

FIG. 10 illustrates a bottom portion 1000 under the stack of bricks. Once the fluid arrives at the bottom of the thermal storage structure described above with respect to FIG. 9, it flows from the edges 1003 lengthwise through channels to a region 1001 underneath the stack of bricks. This fluid, which is significantly cooler than the temperature of the top of the stack when the stack is charged, cools the foundation and the exterior and provides an insulative layer between the stack and the surrounding structure including the foundation, and thus reduces heat losses and allows the use of inexpensive, ordinary insulation materials. This prevents heat damage to the surrounding structure and foundation.

Figure 11:
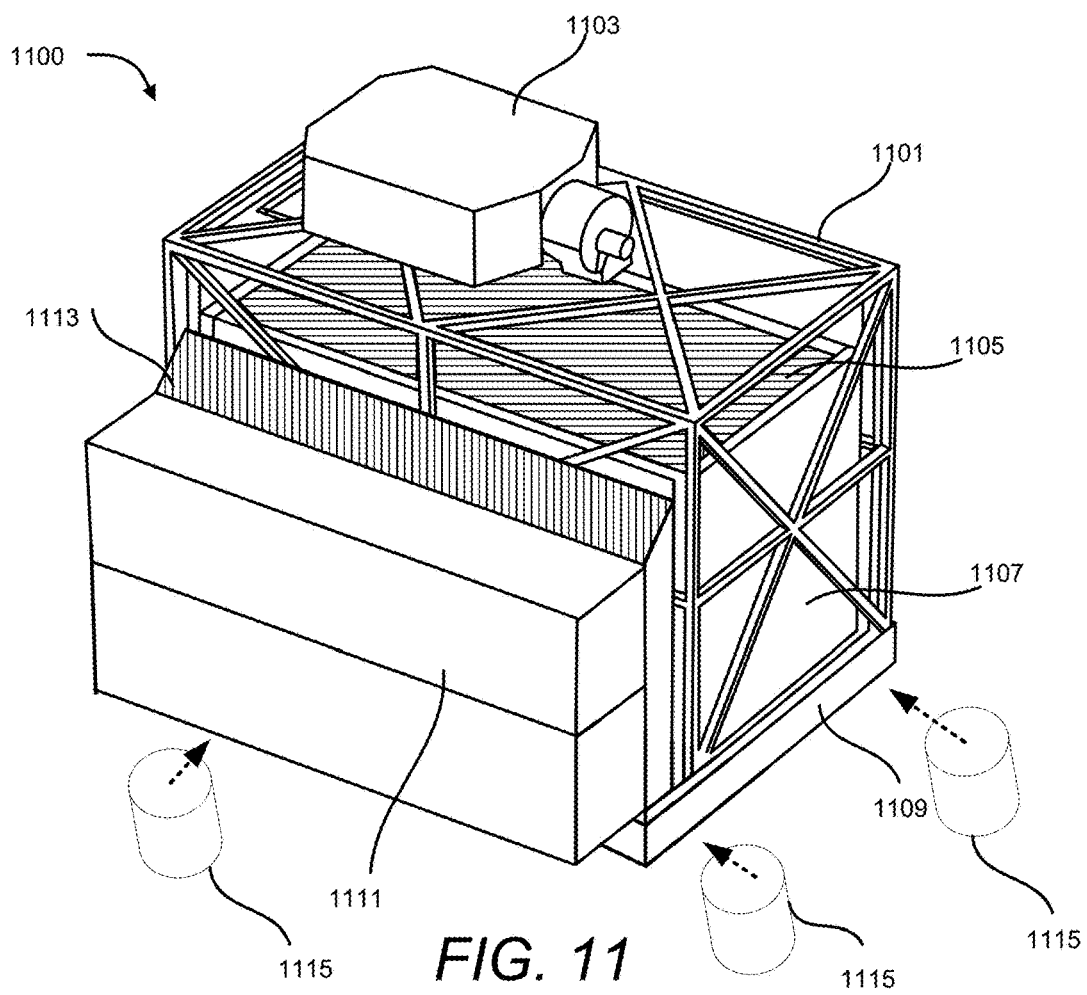
FIG. 11 illustrates a view of the seismic reinforcing structure of the thermal energy storage system according to the example implementations.

FIG. 11 illustrates an isometric view 1100 of a thermal storage structure. As shown, a seismic reinforcing structure 1101 is provided on the outside of an outer surface of the entire structure. The structure 1103, which may house an air exchange device or other equipment as explained above, is formed on top of the seismic reinforcing structure 1101. As shown in 1105, an insulated layer is formed above the stacks of bricks, leaving an air gap for dynamic insulation for the cool air. Sidewalls 1107, foundation 1109, slotted portion 1113 and steam generator 1111 are also included.

Additionally, one or more base isolators 1115 (which may include elastic and/or plastic deformation materials which may act respectively as springs and as energy absorbers) may be provided below the foundation that reduce the peak forces experienced during seismic events. In some implementations, the base isolator may reduce the peak force in an earthquake such that 10% or less of the force from the earthquake is transferred to the structures above the base isolator. The above percentages may vary as a function of relative motion between the ground and base isolator. Just as an example, the thermal energy storage structure may include a space of 45 cm to 60 cm between the ground and the slab to reduce the g-forces transmitted to stack by 90%. By providing the seismic reinforcing structure 1101, the thermal storage structure may be more safely operated in earthquake-prone regions.

Figure 12:
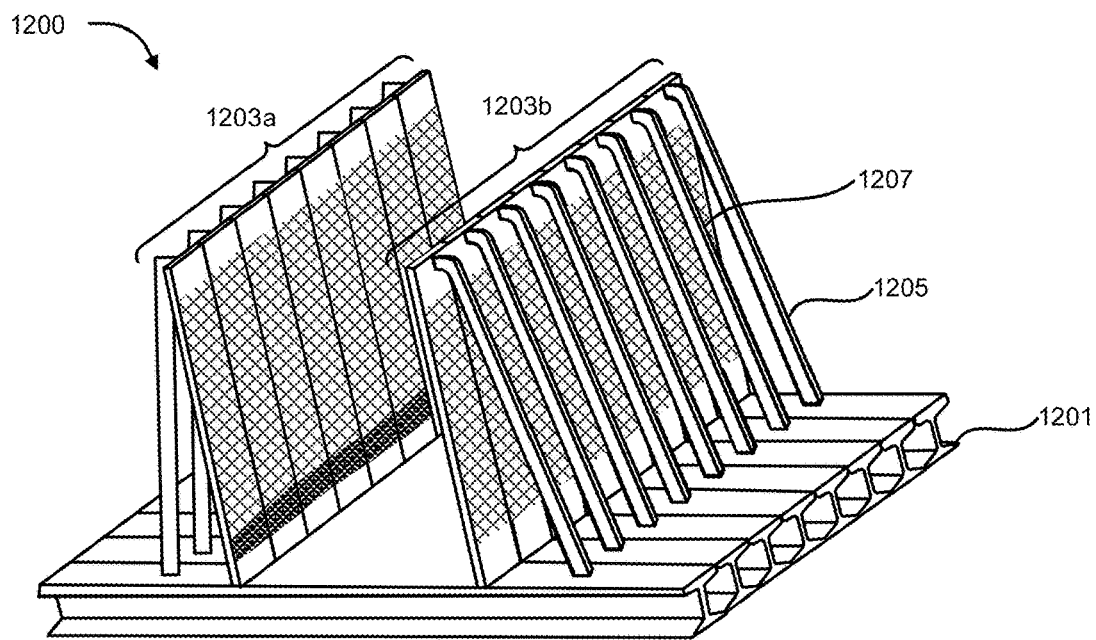
FIG. 12 illustrates a view of the support structure for the bricks of the thermal energy storage system according to the example implementations.

FIG. 12 illustrates an isometric view 1200 of a support structure for bricks in a thermal storage structure according to an example implementation. A foundation 1201, shown as beams attached to one another, forms a base upon which stacks of bricks may be positioned. Structures 1203a, 1203b form a support for the bricks. A vertical support 1207, which may directly interface with the bricks, and a support beam 1205 provide additional support.

Figure 13:
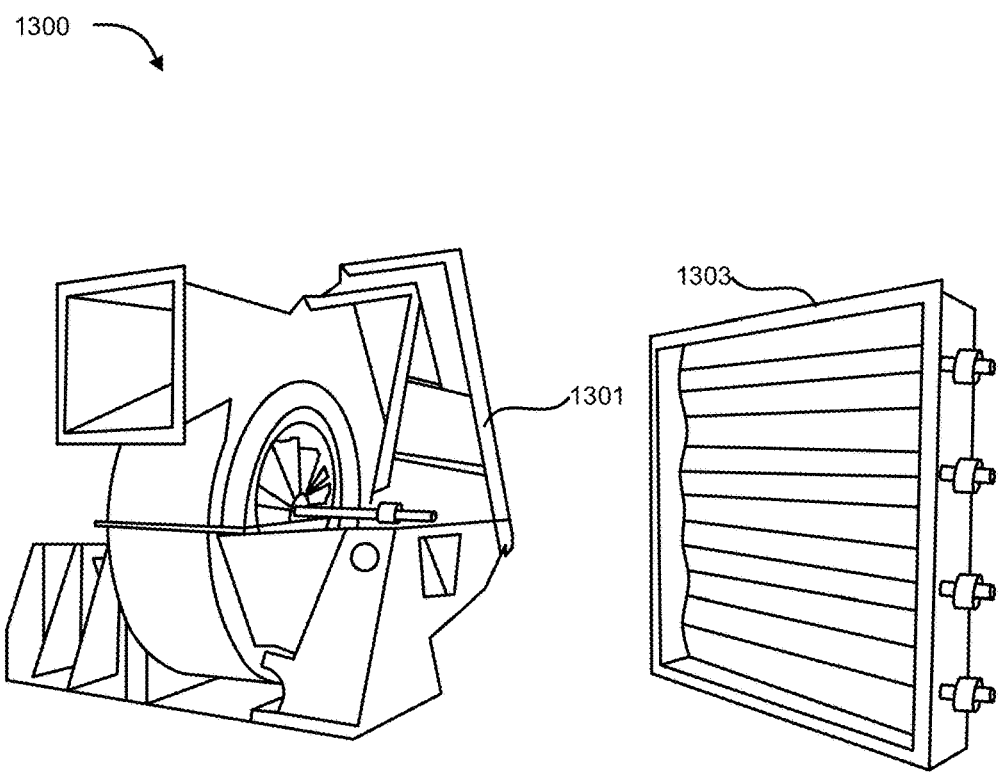
FIG. 13 illustrates the blowers and louvers of the thermal energy storage system according to the example implementations.

FIG. 13 illustrates views 1300 of additional structures that may be associated with a thermal storage structure. For example, a blower 1301 receives air and blows it into the structure. As explained above, the air may, in some cases, be cooled air that has passed through the steam generator. At 1303, louvers are illustrated, which may control the inlet air flowing into the thermal storage elements. Such louvers may be positioned so as to selectively adjust the flow of air through regions of the TSU so as to adjust the discharge of high-temperature air while being positioned in flows of lower-temperature air. Such louvers may incorporate fail-safe controls that set the louvers to a pre-determined position upon the failure of a control system, an actuator, or a supply of electric power, by actuation means that may include springs, weights, compressed air, materials that change dimensions with temperature, and/or other means.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 14:
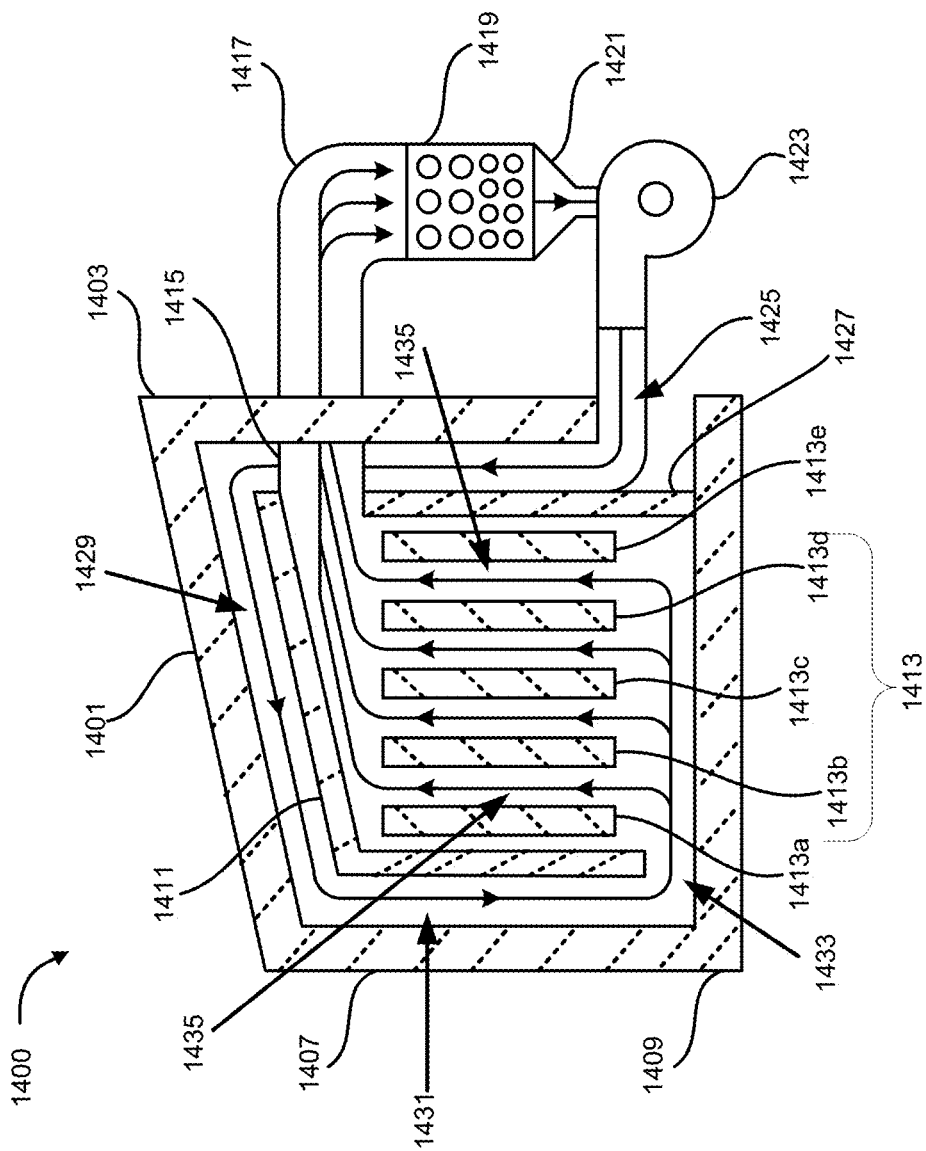
FIG. 14 illustrates dynamic insulation according to the example implementations.

FIG. 14 provides a schematic section illustration 1400 of an implementation of dynamic insulation. Note that while the following discussion of FIG. 14 provides an introduction to dynamic insulation techniques and passive cooling, more detailed examples are provided below with reference to FIGS. 57 through 62.

The outer container includes roof 1401, walls 1403, 1407 and a foundation 1409. Within the outer container, a layer of insulation 1411 is provided between the outer container and columns of bricks in the stack 1413, the columns being represented as 1413a, 1413b, 1413c, 1413d and 1413e. The heated fluid that is discharged from the upper portion of the columns of bricks 1413a, 1413b, 1413c, 1413d and 1413e exits by way of an output 1415, which is connected to a duct 1417. The duct 1417 provides the heated fluid as an input to a steam generator 1419. Once the heated fluid has passed through the steam generator 1419, some of its heat is transferred to the water in the steam generator and the stream of fluid is cooler than when exiting the steam generator. Cooler recycled fluid exits a bottom portion 1421 of the steam generator 1419. An air blower 1423 receives the cooler fluid, and provides the cooler fluid, via a passage 1425 defined between the walls 1403 and insulation 1427 positioned adjacent the stack 1413, through an upper air passage 1429 defined between the insulation 1411 and the roof 1401, down through side passages 1431 defined on one or more sides of the stack 1413 and the insulation 1411, and thence down to a passage 1433 directly below the stack 1413.

The air in the passages 1425, 1429, 1431 and 1433 acts as an insulating layer between (a) the insulations 1411 and 1427 surrounding the stack 1413, and (b) the roof 1401, walls 1403, 1407 and foundation 1409. Thus, heat from the stack 1413 is prevented from overheating the roof 1401, walls 1403, 1407 and foundation 1409. At the same time, the air flowing through those passages 1425, 1429, 1431 and 1433 carries by convection heat that may penetrate the insulations 1411 and/or 1417 into air flow passages 1435 of the stack 1413, thus preheating the air, which is then heated by passage through the air flow passages 1435.

The columns of bricks 1413a, 1413b, 1413c, 1413d and 1413e and the air passages 1435 are shown schematically in FIG. 14. The physical structure of the stacks and air flow passages therethrough in embodiments described herein is more complex, leading to advantages as described below.

In some implementations, to reduce or minimize the total energy loss, the layer of insulation 1411 is a high-temperature primary insulation that surrounds the columns 1413a, 1413b, 1413c, 1413d and 1413e within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including the passages 1425, 1429, 1431 and 1433, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 1421 located within the supports and foundation elements, cooling them and delivering the captured heat back to the input of the storage unit stacks as preheated fluid. The dynamic insulation may be provided by arranging the bricks 1413a, 1413b, 1413c, 1413d and 1413e within the housing so that the bricks 1413a, 1413b, 1413c, 1413d and 1413e are not in contact with the outer surface 1401, 1403, 1407 of the housing, and are thus thermally isolated from the housing by the primary insulation formed by the layer of cool fluid. The bricks 1413a, 1413b, 1413c, 1413d and 1413e may be positioned at an elevated height from the bottom of the housing, using a platform made of thermally insulating material.

During unit operation, a controlled flow of relatively cool fluid is provided by the fluid blowing units 1423, to a region (including passages 1425, 1429, 1431 and 1433) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 1411 such that the cold fluid may provide dynamic insulation passively, even when the fluid blowing units 1423 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment. These features are described in greater detail below in connection with FIGS. 58-62.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Control System

The operation of a thermal storage unit as described herein can be optimized based on factors such as the lifetime of the components (heaters, bricks, structure, electronics, fans, etc.), required temperature and duration of output heat, availability of energy source and cost, among other factors. In some instances, the components exposed to high temperature are limited, using dynamic insulation to reduce temperatures of foundation, walls, etc.).

The control system may use feedback from computer models, weather predictions and sensors such as temperature and airflow to optimize long term performance. In particular, rates of heating and cooling as well as duration at peak temperature can have a detrimental effect on the lifetime of heating elements, bricks and other components. As physical properties of the components and airflow patterns, for example, may change as they age, feedback can be used to inform an artificial intelligence (AI) system to continue to provide high performance for years. Examples of such evolving physical properties and data reflecting such changes may include changing resistance of the heater elements, failure of heaters, changes in airflow behavior, and changes in heat transfer in bricks due to cracks or other damage.

An operational mode that reduces exposure to peak temperature can use data from models, weather predictions, sensors and time of year and location information to intelligently tune charging rates and extent. For example, during peak photovoltaic (PV) production days of summer, the days are relatively long and dark hours are relatively short. If the weather prediction expects multiple sunny days in a row, the thermal storage unit does not need to be charged to a high degree in order for the storage to serve the customer's needs during dark hours. In such an example case, reducing the charging extent and peak temperature reduces the stress on the system so that service life is increased.

Example implementations of the present disclosure may include a smart energy storage controller system 300 as described above with respect to FIG. 3. The system 300 monitors and receives information associates with local parameters such as wind, solar radiation, and passing clouds. The system 300 can also be configured to receive any one or more of network-supplied hourly and multiday forecasts of weather, forecast and current availability and cost of VRE and/or other available energy sources, forecast and current energy demand of load. This includes information on industrial process requirements, current and forecast prices of energy, contractual or regulatory requirements to maintain a minimum state of charge to participate in capacity or resource adequacy transactions and markets. The system 300 further include state of charge and temperature of subsections of the storage media.

Figure 15:
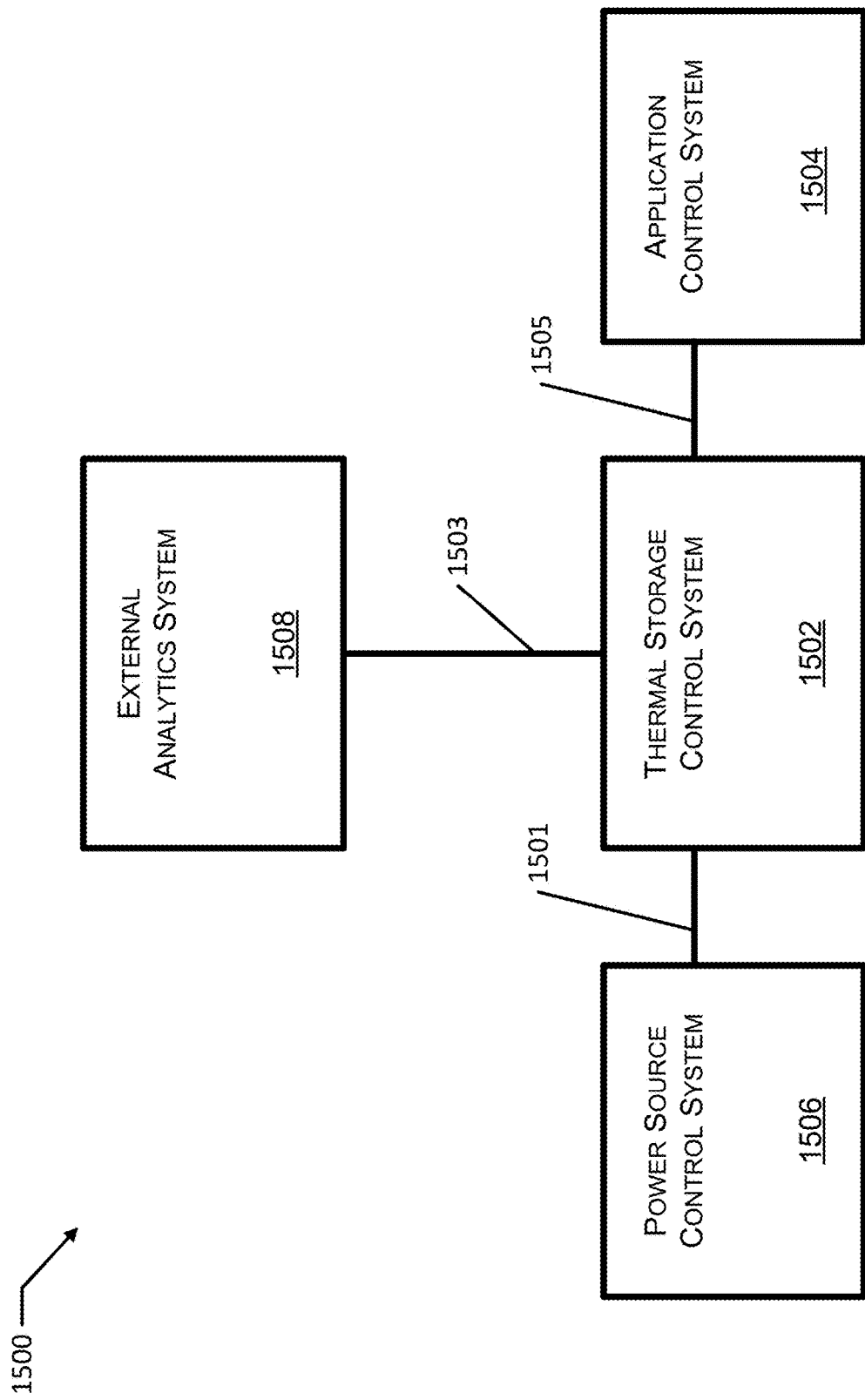
FIG. 15 is a block diagram illustrating an implementation of various control systems.

FIG. 15 is a block diagram illustrating one implementation of various control systems that may be located throughout the system 300. As shown, system 1500 includes several constituent control systems configured to control different portions of distributed control system 300. These control systems include thermal storage control system 1502, application control system 1504, power source control system 1506 and external analysis system 1508. Constituent control systems in system 1500 are interconnected using communication links such as 1501, 1503 and 1505. Links 1501, 1503 and 1505 may be wired, wireless, or combinations thereof. Other implementations of a control system for thermal energy storage and distribution may include different combinations and types of constituent control systems.

Thermal storage control system 1502 is configured to control a thermal energy storage system such as those that have been disclosed herein, and may be an implementation of control system 15 depicted in FIG. 1. Elements controlled by system 1502 may include, without limitation, switches, valves, louvers, heating elements and blowers associated with thermal storage assemblages, including switches for connecting input energy from energy sources such as a solar field or wind farm. Control system 1502 is configured to receive information from various sensors and communication devices within the thermal energy storage system, providing information on parameters that may include state of thermal energy charge, temperature, valve or louver position, fluid flow rate, information about remaining lifetime of components, etc. Control system 1502 may then control system operation based on these parameters. In one implementation, control system 1502 may be configured to control aspects of the upstream energy source and/or the downstream application system.

Power source control system 1506 is configured to control aspects of the energy source for the thermal storage system. In one implementation, the energy source is a source of variable renewable electricity such as a field of photovoltaic panels ("solar field") or a wind turbine farm. Systems 1502 and 1506 are configured to communicate with one another to exchange control information and data, including data relating to the operational status of the thermal energy storage system or energy source, input energy requirements of the thermal energy storage system, predicted future output of the energy source, etc. In one implementation, control system 1506 may be configured to control one or more aspects of the thermal energy storage system relevant to operation of the energy source.

Application control system 1504 is configured to control aspects of a system receiving output energy from the thermal energy storage system controlled by system 1502. Systems 1502 and 1504 are configured to communicate with one another to exchange control information and data, including data relating to the operational status of the thermal energy storage system or application system, amount of energy output from the thermal storage system needed by the application system, predicted future energy output from the thermal storage system, etc. In one implementation, control system 1504 may be configured to control one or more aspects of the thermal energy storage system relevant to operation of the application system.

External analytics system 1508 is configured, in one implementation, to obtain and analyze data relevant to operation of one or more of systems 1502, 1504 and 1506. In one implementation, system 1508 is configured to analyze forecast information such as weather information or energy market information and generate predictions regarding availability or cost of input power to thermal storage control system 1502. System 1508 may then communicate with thermal storage control system 1502 over link 1503 in order to convey information and/or commands, which may then be implemented by system 1502 and/or systems 1506 and 1504.

Figure 16:
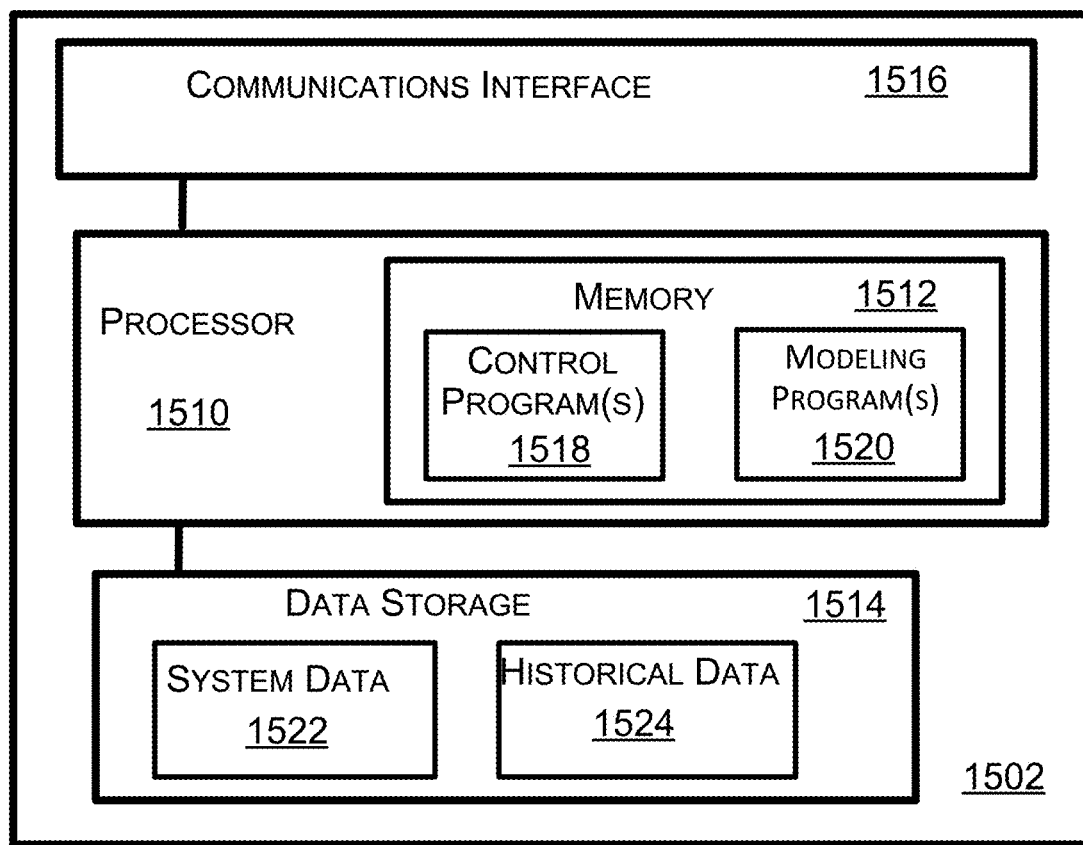
FIG. 16 is a block diagram illustrating an implementation of a thermal storage control system.

FIG. 16 is a block diagram illustrating one implementation of thermal storage control system 1502. As shown, system 1502 includes a processor 1510, memory 1512, data storage 1514 and communications interface 1516. Processor 1510 is a processor configured to execute programs stored in memory 1512, such as control programs 1518 for managing the operation of one or more thermal storage arrays similar to those described herein. In FIG. 16, memory 1512 is shown as being located within processor 1510, but in other implementations external memory or a combination of internal and external memory is possible. Control programs 1518 may include a variety of programs, including those for sending signals to various elements associated with a thermal storage structure, such as switches for heater elements, louvers, blowers, valves for directing and adjusting gas flows, etc. Execution of control programs 1518 can thus effectuate various modes of operation of the thermal storage system, including charging and discharging, as well as coordinated operation of multiple thermal storage arrays to maintain a specified temperature profile (e.g., a constant temperature or a non-constant predefined temperature schedule).

Two potential types of control are sensor-based control and model-based control. In a sensor-based control paradigm, readings from sensors placed throughout system 1500 may be used to determine real-time values that correspond to actual measurements. Thermal storage structures according to this disclosure may be designed in order to limit the exposure of certain components to high, thereby improving reliability. But the use of sensors, while potentially representing the most accurate possible state of system 1500, may be expensive, and also may be prone to malfunction if sensors fail. A model-based control paradigm, on the other hand, provides the ability to control a large complex system with less expense than that associated with deploying a multitude of sensors, and to minimize safety risks that might be associated with undetected sensor failure. A modeling program 1520 within memory 1512 may thus be used to model and predict behavior of the thermal energy storage system over a range of input parameters and operational modes. Control system 1502 may also be configured to combine model-based and sensor-based control of the thermal energy storage system—which may allow for redundancy as well as flexibility in operation. Other programs may also be stored in memory 1512 in some implementations, such as a user interface program that allows for system administration.

Data storage 1514 can take any suitable form, including semiconductor memory, magnetic or optical disk storage, or solid-state drives. Data storage 1514 is configured to store data used by system 1502 in controlling the operation of the thermal storage system, including system data 1522 and historical data 1524. In one implementation, system data 1522 describes the configuration or composition of elements of the one or more thermal storage arrays being controlled. Examples of possible system data include shape or composition of bricks within a thermal storage assemblage, composition of heating elements integrated with an assemblage, and the number of thermal storage assemblages in the thermal storage system. Historical data 1524 may include data collected over time as the thermal storage system is operated, as well as data from other units in some cases. Data 1524 may include system log data, peak heater temperatures, peak output gas temperatures, discharge rates of a thermal storage assemblage, a number of heating and cooling cycles for an assemblage, etc.

Communications interface 1516 is configured to communicate with other systems and devices, such as by sending and receiving data and signals between system 1502 and control systems 1504 and 1506, or between system 1502 and external analysis system 1508. Interface 1516 is also configured to send control signals to controlled elements of the thermal storage system, and receive sensor signals from sensors for the control system, such as sensors 303-1 through 303-N of FIG. 1. Although shown as a single interface for simplicity, interface 1516 may include multiple communications interfaces (e.g., both wired and wireless). Control systems 1502, 1504 and 1506 as illustrated in FIGS. 15 and 16 may be implemented in various ways, including using a general-purpose computer system. Systems 1502, 1504 and 1506 may also be implemented as programmable logic controllers (PLCs) or computer systems adapted for industrial process control. In some cases, systems 1502, 1504 and 1506 are implemented within a distributed control system architecture such as a Supervisory Control and Data Acquisition (SCADA) architecture.

Figure 17:
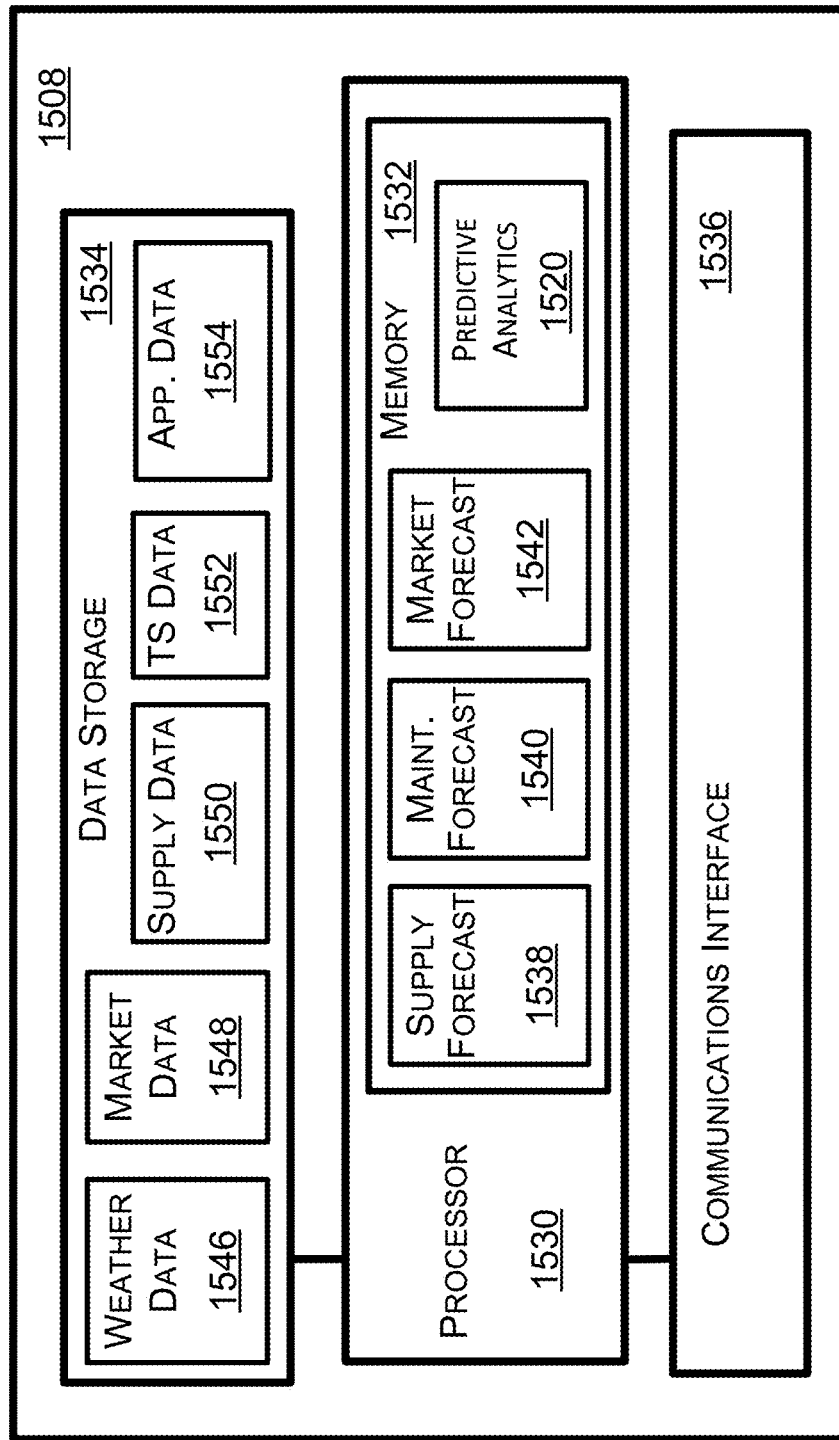
FIG. 17 is a block diagram illustrating an implementation of an external analytics system.

FIG. 17 is a block diagram illustrating an implementation of external analytics system 1508. System 1508 is configured to provide forecast-based predictions to thermal storage control system 1502. System 1508 includes a processor 1530, memory 1532, data storage 1534 and communications interface 1536. In one implementation, system 1508 is implemented in a distributed computing environment such as a cloud computing environment. A cloud computing environment is advantageous in allowing computing power and data storage to be increased on demand to perform intensive analysis of copious amounts of data to provide timely predictions.

Processor 1530 is a processor configured to execute programs stored in memory 1532, such as supply forecast program 1538, maintenance forecast program 1540, market forecast program 1542 and predictive analytics program 1520. Supply forecast program 1538 includes instructions executable to use weather forecast data and predictive analytics methods to predict power supply availability to the thermal energy storage system. Maintenance forecast program 1540 includes instructions executable to use system data and predictive analytics methods to predict maintenance requirements for the thermal energy storage system.

Market forecast program 1542 includes instructions executable to use power market data and predictive analytics methods to predict power pricing values or trends for power used by or produced by the thermal energy storage system. Predictive analytics 1520 includes instructions executable to implement algorithms for analyzing data to make predictions. Algorithms within predictive analytics 1520 are used by programs 1538, 1540 and 1542.

Data storage 1534 stores data including weather data 1546, market data 1548, supply data 1550, thermal storage (TS) data 1552, and application (App.) data 1554. Data stored in data storage 1534 may be used by programs stored in memory 1532. Weather data 1546 may include data collected at the location of the power source for the thermal energy storage system along with broader-area weather information obtained from databases. Market data 1548 includes energy market data received from external data providers. Supply data 1550 includes data associated with the power source controlled by system 1506, and may include, for example, system configuration data and historical operations data. TS data 1552 includes data associated with the thermal energy storage system, and application data 1554 includes data associated with the application system controlled by control system 1504. Communications interface 1536 is configured to send data and messages to and from system 1502 as well as external databases and data sources.

Systems and components shown separately in FIGS. 15 through 17 may in other implementations be combined or be separated into multiple elements. For example, in an implementation for which an application system like a steam generator is closely connected with a thermal energy storage system, aspects of control systems 1502 and 1504 may be combined in the same system. Data and programs may be stored in different parts of the system in some implementations; a data collection or program shown as being stored in memory may instead be stored in data storage, or vice versa.

In other scenarios, systems 1502 or 1508 may contain fewer program and data types than shown in FIGS. 16 and 17. For example, one implementation of analytics system 1508 may be dedicated to energy-supply forecasting using weather data, while another implementation is dedicated to power market forecasting using market data, and still another implementation is dedicated to maintenance forecasting using system-related data. Other implementations of analytics system 1508 may include combinations of two of the three program types shown in FIG. 17, along with corresponding data types used by those program types, as discussed above. For example, one implementation of system 1508 may be configured for both energy-supply forecasting using weather data and power market forecasting using market data, but not for maintenance forecasting using system-related data. Another implementation of the system may be configured for both power market forecasting using market data and maintenance forecasting using system-related data, but not for energy-supply forecasting using weather data. Still another implementation of system 1508 may be configured for both energy-supply forecasting using weather data and maintenance forecasting using system-related data, but not for power market forecasting using market data.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible to by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

Figure 99:
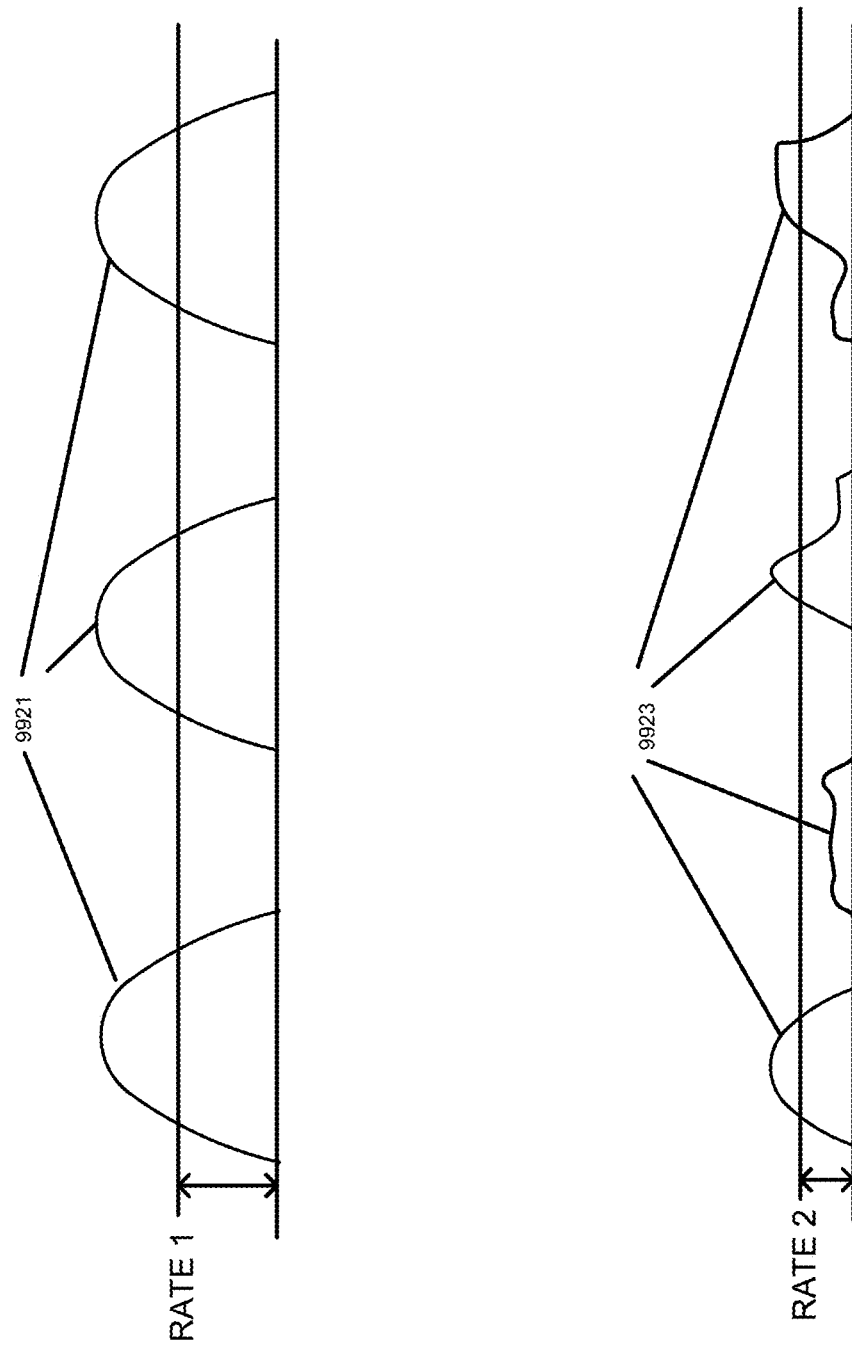
FIG. 99 illustrates a first forecast energy availability second forecast energy availability of multi-day availability according to the example implementations.

On the output, or load, side of a thermal energy storage unit, various actions may be initiated in response to a forecast-based prediction of an input energy shortfall affecting the output heat to a load. FIG. 99 illustrates a first forecast energy availability 9921 (a multi-day forecast of available VRE) and a first controller decision of heat delivery rate (shown as "RATE 1", and a second, lower forecast 9923 of multi-day availability of VRE and a second, lower chosen heat delivery rate (shown as "RATE 2"). In one implementation, the controller makes a current-day decision regarding heat delivery rate based on forecast energy availability in the current and coming days so as to avert a shutdown on a future day. In an implementation, a control system of the thermal energy storage system may alert an operator of the load industrial application of the upcoming shortfall, so that a decision can be made.

Figure 98:
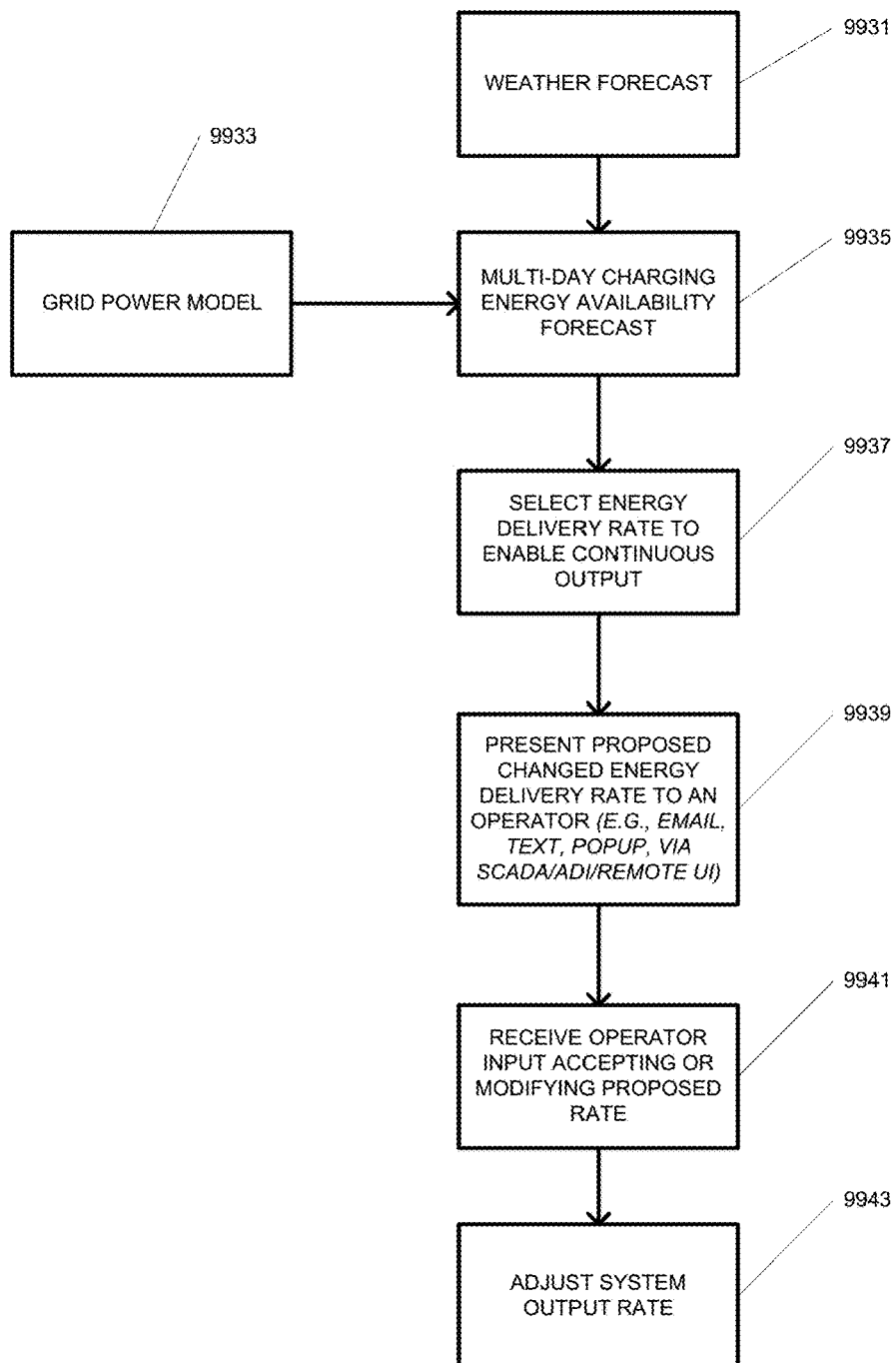
FIG. 98 illustrates process according to the example implementations.

FIG. 98 illustrates the process 9930. At 9935, a multi-day charging availability forecast is generated based on a grid power model 9933 and a weather forecast 9931. The energy delivery rate is selected at 9937 to enable continuous output. At 9939, The controller-selected output rate may be presented to an operator either as a notification via email, text message, or other indirect notification, or by a value or icon on a local or remote screen which shows and allows adjustment of the status and operation of the thermal energy storage unit or its associated heat use process; and at 9941 may receive responding operator input which accepts, rejects, or adjusts the amount or timing of rate adjustment. The information may cause the manual or automatic adjustment at 9943 of another heat source that supplies heat to the same process, as shown in FIG. 97, in such a manner as to achieve a desired overall relatively constant heat supply. Actions that may be taken on the load, or output, side of the thermal energy storage system include adjustment of operation of the load system so that it can operate with the predicted reduction in thermal energy available to it. Alternatively or in addition, the controller may provide commands for the output to be adjusted, and/or adjust the operation of the industrial output itself to compensate for the change in the expected available energy input, and hence the expected available output from the thermal energy storage system.

Another possible action in response to a forecast shortfall of input energy is to supplement the output from the thermal energy storage system with an alternate source of that output. In an implementation for which the heated fluid output from a thermal energy storage system is used to generate steam for an industrial process, for example, an alternate source of steam could be an additional steam generator using an alternate fuel source. The control system may provide signals to effectuate connection of the alternate output source to the load system in some implementations. Alternatively, the control system may send a message, such as an instruction or alert, to an operator or controller associated with the load system to indicate the need for connection to the alternate source.

In addition to ensuring sufficient output production by the thermal energy storage system to a load, forecast information is used to automatically control the thermal energy storage system to ensure its continued stable operation. For example, when a reduced amount of input power is predicted, the controller may in some implementations adjust the fluid flow rate through a thermal storage assemblage to lower the discharge rate from the assemblage so that the assemblage does not discharge to a point where the associated thermal storage unit shuts down.

As another example, the powering of the heater elements may be adjusted to a desired temperature for safety and efficiency, based on the forecast information. For example, if it is expected or forecast that during a future period, the amount of energy from the input source will be less than the expected amount of energy, the system can be configured to "supercharge", i.e. heat some or all of the bricks in one or more stacks to temperatures higher than normal operation temperatures—for instance, if the normal stack temperature is 1100° C., in case of an expected period of lower energy input, the system can be controlled to heat up to 1300° C. or more for a selected period of time. This can be accomplished by reducing the discharge from certain units and/or by increasing the temperatures of the heater elements.

If the forecast indicates an extended period of reduced energy input, such as due to several days of cloudiness, the lead-lag capability of the system explained below may also be modified, because the issue of hotspots and thermal runaway may be somewhat reduced due to the fact that the system will be operating at a temperature that is below the peak temperature. Additionally, in a thermal energy storage system with multiple thermal storage units, if the system cannot be run at full capacity, the controller may reduce or disable charging or completely shut off one or more of the units based on the forecast, such that only a subset of units are operating at full capacity, rather than have none of the units be able to operate at full capacity.

In contrast to a situation involving a forecast of reduced power, forecast information may show that the expected electricity availability will meet or exceed the expected amount of energy that is input into the thermal energy storage system. In some implementations, responses of a control system to a forecast of excess energy may include one or more of adjusting operation of the thermal energy storage system to improve system reliability, reducing the amount of input power to the thermal storage energy system, or increasing thermal power to the load. Adjusting operation of the thermal energy storage system may include reducing input power to its heater elements when input energy is available for longer periods, so that a corresponding thermal storage assemblage operates at a lower peak temperature while still delivering sufficient thermal energy output. Such reduction in peak temperature may increase reliability and lifetime of the system. Excess input power supply may allow heating elements to remain powered after a thermal storage assemblage has already been charged with thermal energy, allowing the heating elements to directly heated fluid flowing through a thermal storage assemblage without discharging the assemblage, possibly to use provided such heated fluid to another use.

A control system of the thermal energy storage system may cause an amount of energy that is input to the system to be reduced. The energy source or the thermal energy storage system may be coupled to a larger power grid, in which case a reduction in input energy to the thermal energy storage system may be implemented by transferring excess energy to the power grid, e.g., when there is low demand from the system and/or high demand from the power grid to meet other electrical needs. In the absence of a grid connection, a reduction in input energy may be implemented in some implementations by curtailing production from a portion of the energy source infrastructure, such as shutting down certain solar panels in a solar field or wind turbines at a wind farm.

Alternatively or in addition to control of the input power supply or thermal energy storage system operation parameters, a response to a forecast of an excess of input energy may be made at the output side of the thermal energy storage system. In an implementation for which electric power is produced at the output of the system (for example, by feeding heated fluid from a thermal storage unit to a steam generator, then passing the produced steam through a turbine), excess power may be transferred to a larger power grid if a grid connection is available, thus providing energy to the grid instead of storing it as heat in the system. In an implementation for which the output to the load is heated fluid, a property of the output fluid may be changed. For example, a higher temperature and/or flow rate of output fluid may be produced. For an implementation in which steam is produced at the output of the thermal energy storage system, a higher vapor quality of the steam may be provided during periods of increased input energy. In some implementations, altered output properties may provide enhanced cogeneration opportunities, through cogeneration systems and methods described elsewhere in this disclosure. The input and output control described above may be interactively controlled in combination, to advantageously adjust the operation of the system.

Thus, the controller can use inputs from the forecasting system to account for variations in input energy due to factors such as cloudiness in the case of solar energy, variability in wind conditions for wind generated electricity, or other variability in conditions at the power source. For example, the controller may allow for additional heating, or heating at a higher temperature, prior to a decrease in the forecast availability of input of electricity, based on the forecast information.

Additionally, maintenance cycles may be planned based on forecast weather conditions. In situations where the availability of renewable energy is substantially less than the expected energy, such as due to forecast information (e.g., rainy season, several days of low wind cycles, shorten solar day, etc.), maintenance cycles may be planned in advance, to minimize the loss of input energy.

Based on the received information, the control system determines and commands, via signals, charging elements, power supply units, heaters, discharge blowers and pumps for effective and reliable energy storage, charging, and discharging. For example, the command may be given to power source controllers for solar energy, wind energy, and energy from other sources. The control system 399 may also provide instructions to controllers which admit power to the entire heater array or to local groupings of heaters.

The control system may include or be in communication with a forecasting and analytics system to monitor real-time and forecasting data corresponding to one or more meteorological parameters associated with an area of interest (AOI) where the electrical energy sources are being installed. The meteorological parameters can include, without limitation, solar radiation, air temperature, wind speed, precipitation, or humidity. The control system, based on the monitored real-time and forecasting data of the meteorological parameters, may in some implementations switch the electrical connection of the system between VRE sources and other energy sources. For instance, when the weather forecast predicts that the availability of sunlight or wind will be lower than a predefined limit for upcoming days, then the control system may command the system to electrically couple the heating elements of the system to other energy sources to meet the demands of a load system for the upcoming days.

In another example implementation, the control system monitors real-time and forecast data regarding availability of VRE, and selects an energy discharge rate and command the system to operate at such rate, so as to allow the system to continuously produce energy during the forecast lower-input period. Continuous energy supply is beneficial to certain industrial processes, making it is undesirable for a thermal storage unit to completely discharge itself and shut down.

It is also beneficial to certain industrial processes for adjustments in energy supply to be made slowly, and to be made infrequently. Therefore, the control system in some implementations selects a new discharge rate based on a multi-hour or multi-day weather forecast and corresponding VRE production forecast, so as to be able to operate at a fixed rate for (for example) a 24-hour period, or a 48-hour period, or a 72-hour period, given that forecast VRE supply. The control system may additionally and frequently update the information regarding a VRE supply forecast, and may make further adjustments to energy discharge rate so as to meet demand without interruptions, optionally providing signals and interface mechanisms for operator input, adjustment or override as described above. Thus, the behavior of energy delivery is controlled based on the above explained parameters, including forecasting.

In addition to forecasting of an input condition such as the weather, forecasting aspects of the thermal energy storage system may also include forecasting of energy markets and available sources and prices of energy, along with supply and demand of the industrial applications at the output of the thermal energy storage system to tune the operation of system. The control system may use the forecast information to control one or more aspects of the thermal energy system, including input of electrical energy, temperature of various elements of the thermal energy storage system, quantity and quality of the output heat, steam, or fluid (including gas), as well as improving the operation of the associated industrial processes. For example, the input electricity may be received or purchased at a time when the cost of the electricity is lower, in conjunction with forecast information about the conditions at the electricity source, and may be output when the demand or pricing of the output from the thermal energy storage system, or of power produced using that output, is higher.

Additionally, in situations where there is variability across different time periods as to the forecast conditions, the control system may make the adjustments on a corresponding variable basis. For example, if the expected cost of the input electricity is higher on a first day as compared with a second day, the controller may control the various inputs and outputs and parameters of the thermal energy system to account for differences in conditions between the first day and the second day that are based on differences in the initial forecast. In addition to the foregoing aspects, predictive analytics may be used to more effectively plan for equipment maintenance and replacement cycles. For example, predictive analytics may be used in predicting when maintenance will be needed, based on historical data. These analytics may be used in conjunction with one or more of the above forecast aspects to provide for planned downtime, for example, to coincide with times when input power availability or pricing conditions make operation of the system less advantageous.

The foregoing controls may be provided to an operator that makes decisions based on the forecasting information and the operation of the control system. Alternatively, the control system may include some automated routines that provide decision support or make determinations and generate commands, based on the forecast information, in an automated or semi-automated manner.

Charging/Discharging Modes

As explained above, the system can be operated in a charging mode for storing electrical energy as thermal energy while simultaneously generating and supplying steam and/or electrical power for various industrial applications as required. The charging and discharging operations are independent of one another, and may be executed at the same time or at different times, with varying states of overlap as needed, e.g. to respond to actual and forecast energy source availability and to deliver output energy to varying load demands. The system can also be operated in a discharging mode for supplying the stored thermal energy for steam and/or electrical power generation, as well as other industrial applications. Optionally, the system may be used to provide heated gas to an industrial application directly without first producing steam or electricity.

A key innovation in the present disclosure is the charge-discharge operation of the unit in such a means as to prevent thermal runaway, by periodically cooling each element of the storage media well below its operating temperature. In one implementation, this deep-cooling is achieved by operating the storage media through successive charge and discharge cycles in which constant outlet temperature is maintained and each storage element is deep-cooled in alternate discharge cycles. The narrative below refers process flow diagrams 1700a-1700h in FIGS. 19A through 21 for charge and discharge, according to the example implementations.

Figure 19A:
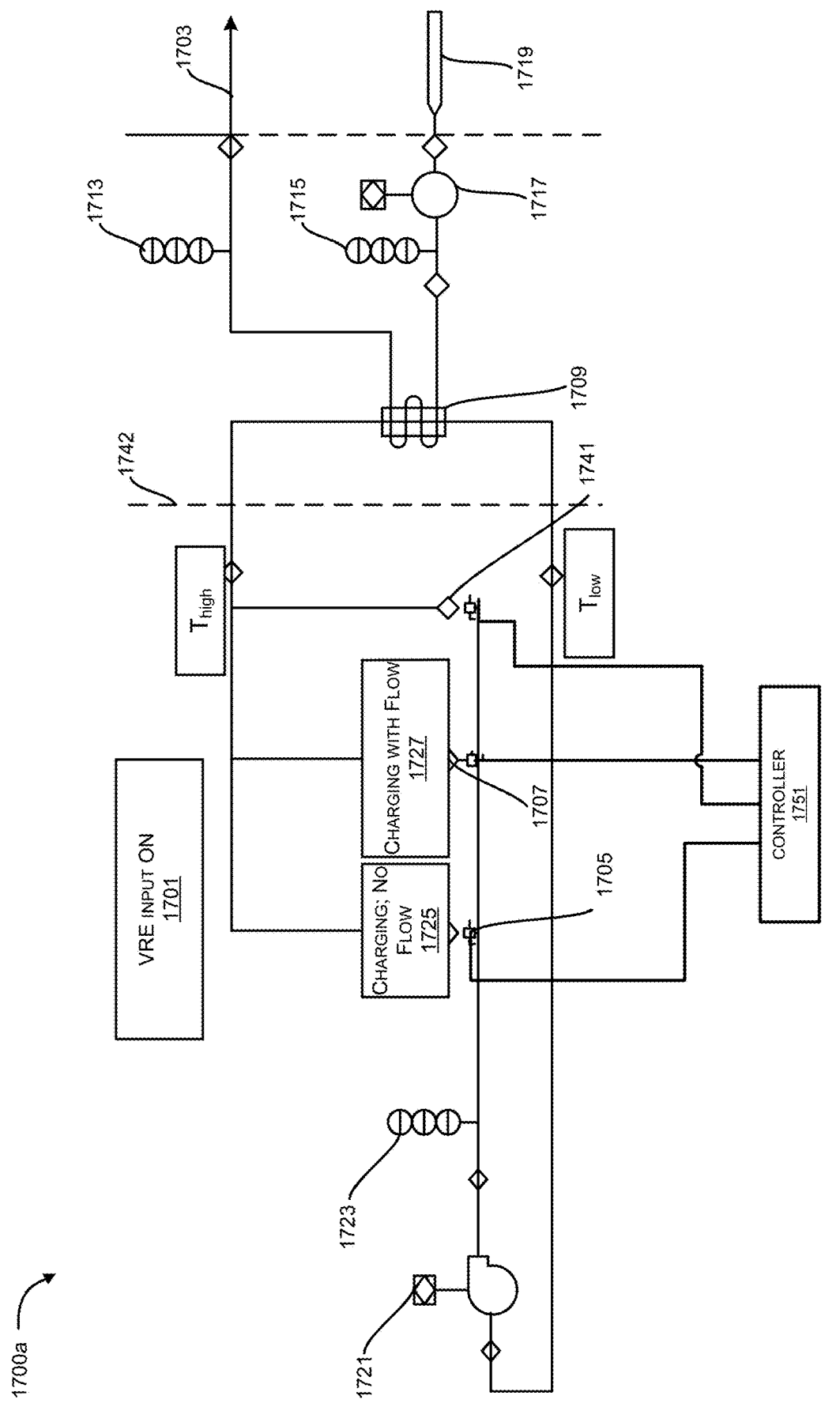
FIGS. 19A-19D, 20A-20C and 21 illustrate charge and discharge of the thermal energy storage system according to the example implementations.

At FIG. 19A, 1700a, a flow diagram associated with a first charging operating pattern is shown. At 1701, power is flowing from an input source of electrical energy such as from a VRE source and operating heaters within stacks 1725 and 1727. At 1703, an output of the storage array is shown as steam.

As shown at valves 1705 and 1707, the controller 1751 provides a signal for valve 1705 (a fluid flow control louver, damper, or other control device) to close for a first thermal storage array, and also provides a signal to a valve 1707 to be open for a second thermal storage array. Both units are heating, and flow through unit 1727 is providing flow to deliver heat to the steam generator.

With respect to the second unit 1727, the second unit is being charged, and flow is provided, as indicated by the valve 1707 being open. Thus, gas at the input temperature $T_{low}$ flows by way of the blower 1721, via the dynamic insulation, through the valve 1707 and through the thermal storage of unit 1727 to the upper fluid conduit. The gas is heated by the stacks of bricks to an output temperature equal to or above the desired fluid outlet temperature $T_{high}$, which may be a value such as 800° C.

A sensor 1742 may provide information to the controller 1751 about the temperature of the gas prior to entering the steam generator. The controller 1751 modulates the setting of valve 1741 to allow cooler air to mix with the air flowing through the stack of bricks to reduce the blended fluid temperature at point 1742 to the specified $T_{high}$ value. The hot outlet air continues to flow, including through the steam generator 1709, which is supplied with water 1719 as controlled by pump 1717, and cooled air at temperature $T_{low}$ is forced by blower 1721 through the dynamic insulation paths and back to the inlets of valves 1705, 1707 and 1741. Additional sensors may be provided throughout the system, such as at 1713 and 1715. The controller 1751 may also use the same communication and power lines to transmit commands to control; elements such as the valves 1705, 1707.

Figure 19B:
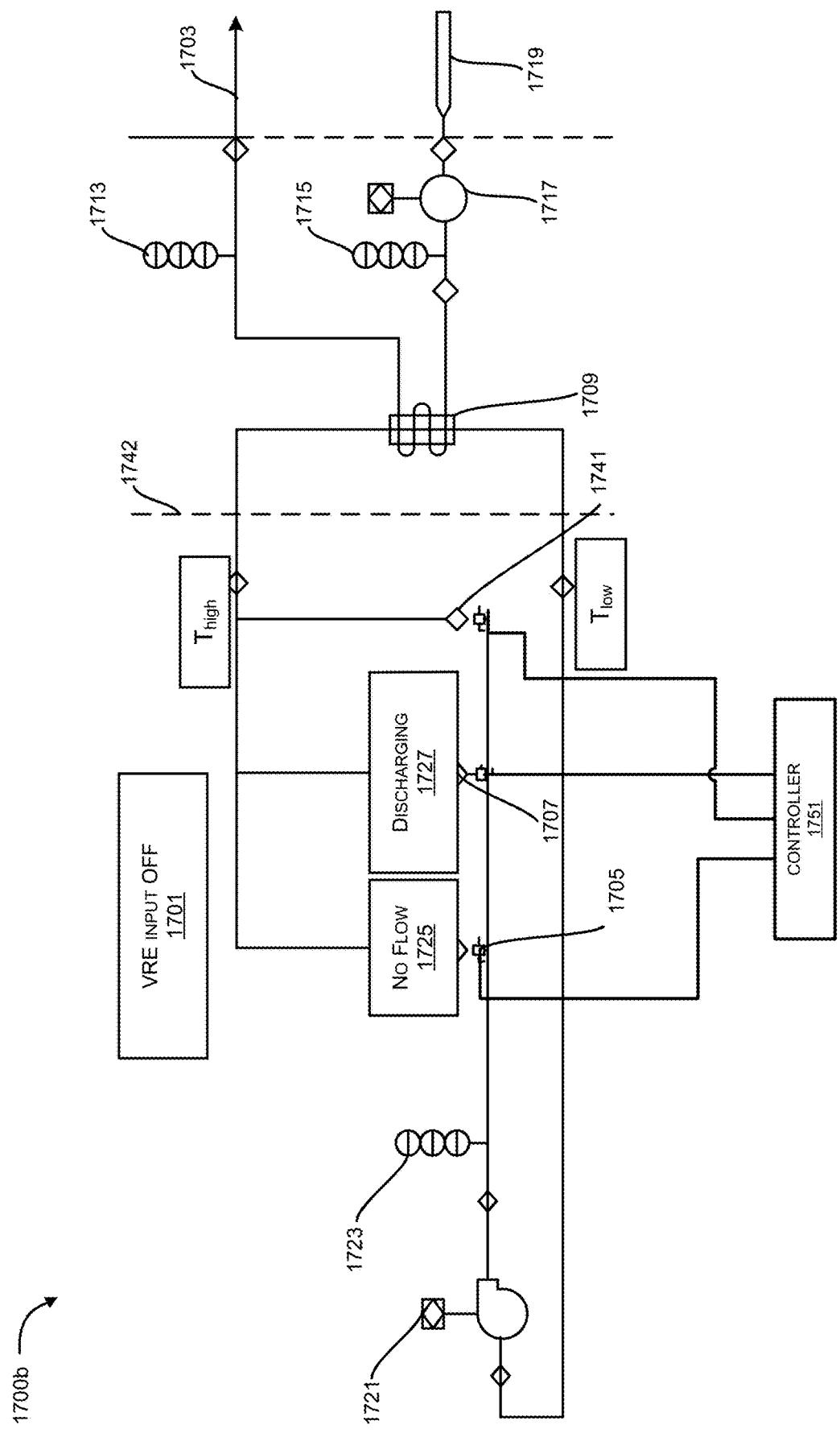

When charging stops, as for example occurs at the end of each solar day or each windy period, discharging continues. In FIG. 19B, flow diagram 1700b depicts an example first process flow for the discharging mode without concurrent charging. As shown herein, at the first unit 1725, the valve 1705 remains closed, based on the signal from the controller 1751. Thus, there is lower or no gas flow to the first unit associated with the valve 1705. On the other hand, the valve 1707 is open with respect to the second unit 1727, based on the signal from the controller 1751. Thus, the gas continues to flow through the unit 1727, and the controller 1751 continues to modulate the setting of valve 1741 to cause the proper amount of cooler air to mix with the air flowing through the stack of bricks to maintain the fluid temperature at point 1742 to the specified $T_{high}$ value. The hot gas continues to be discharged to the steam generator 1709, to generate the steam export 1703.

As each stack discharges, its outlet gas temperature remains roughly constant until approximately ⅔ of the usable heat has been delivered. At this point the outlet temperature from the stack will begin to drop, and continues dropping as discharge continues. The present innovation uses this characteristic to accomplish "deep cooling" as operation continues. The controller 1751 senses a reduction in the temperature at point 1742 and begins closing bypass valve 1741. By the time the outlet temperature from unit 1727 has reached $T_{high}$, valve 1741 reaches the fully closed position, and as temperature further drops it is no longer possible for unit 1727 to deliver heat at temperature $T_{high}$.

Figure 19C:
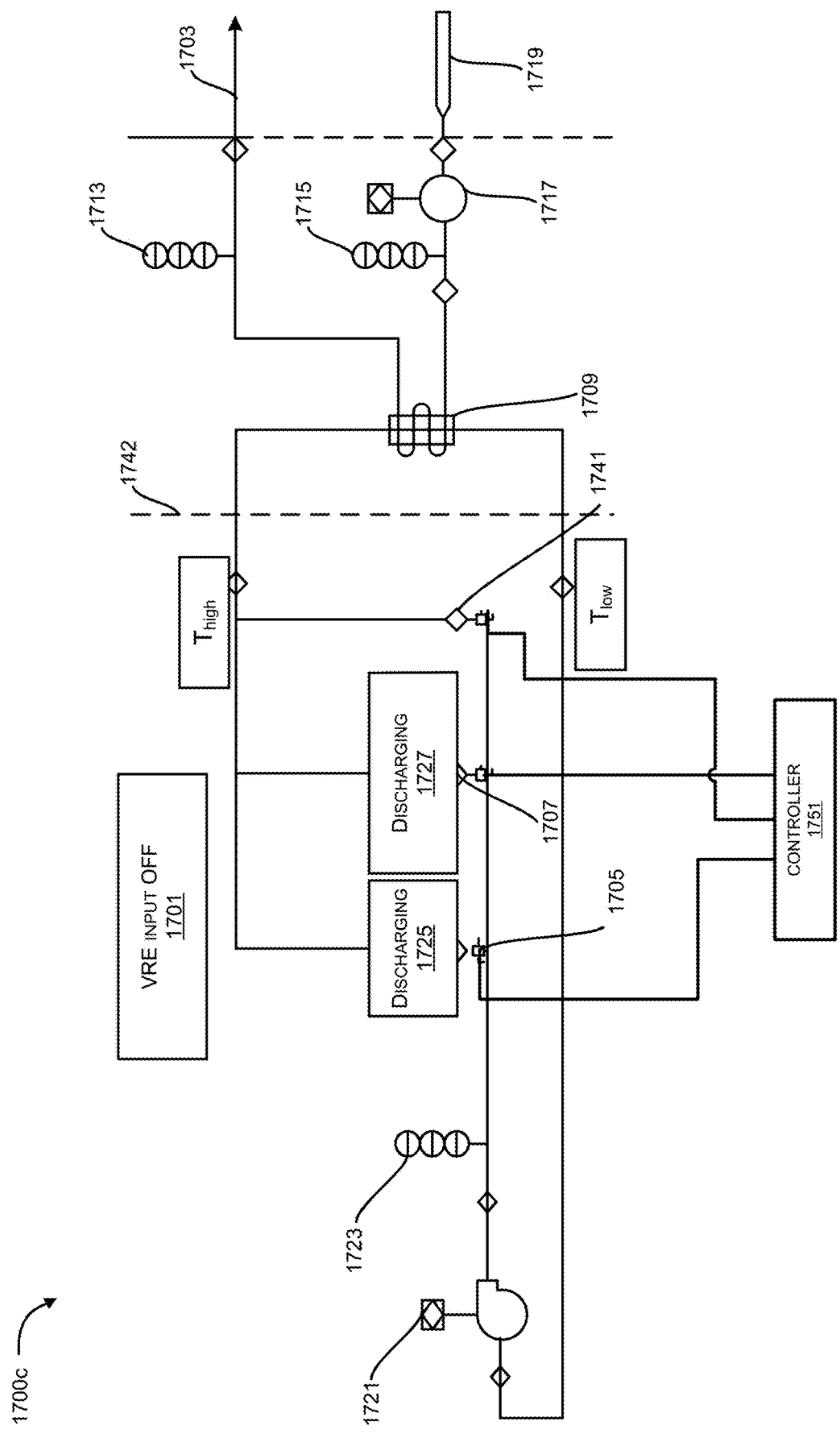

As shown at 1700c in FIG. 19C, the discharge process is modified to partially open the valve 1705 based on the signal from the controller 1751, so that the first unit 1725 begins discharging; its higher outlet temperature is now blended with air flowing through cooler stack 1727 to maintain outlet temperature $T_{high}$ at point 1742. The controller 1751 now modulates valves 1707 and 1705 to vary the flow through stacks 1725 and 1727 so as to maintain $T_{high}$ at point 1742. At this point in the discharge process, flow through stack 1727 emerges at temperature below $T_{high}$ and is blended with discharge from stack 1725 which is above $T_{high}$ in proportions to ensure outlet at 1742 is maintained at $T_{high}$. Thus, unit 1727 continues to be cooled by gas flow, and its outlet temperature continues to fall farther below $T_{high}$, while the temperature at 1742 is maintained at $T_{high}$ by blending with the higher-temperature air from stack 1725. As discharge of stack 1725 proceeds, its outlet gas temperature begins to drop, and controller 1751 begins to close valve 1707 in order to maintain temperature at 1742 at $T_{high}$.

Figure 19D:
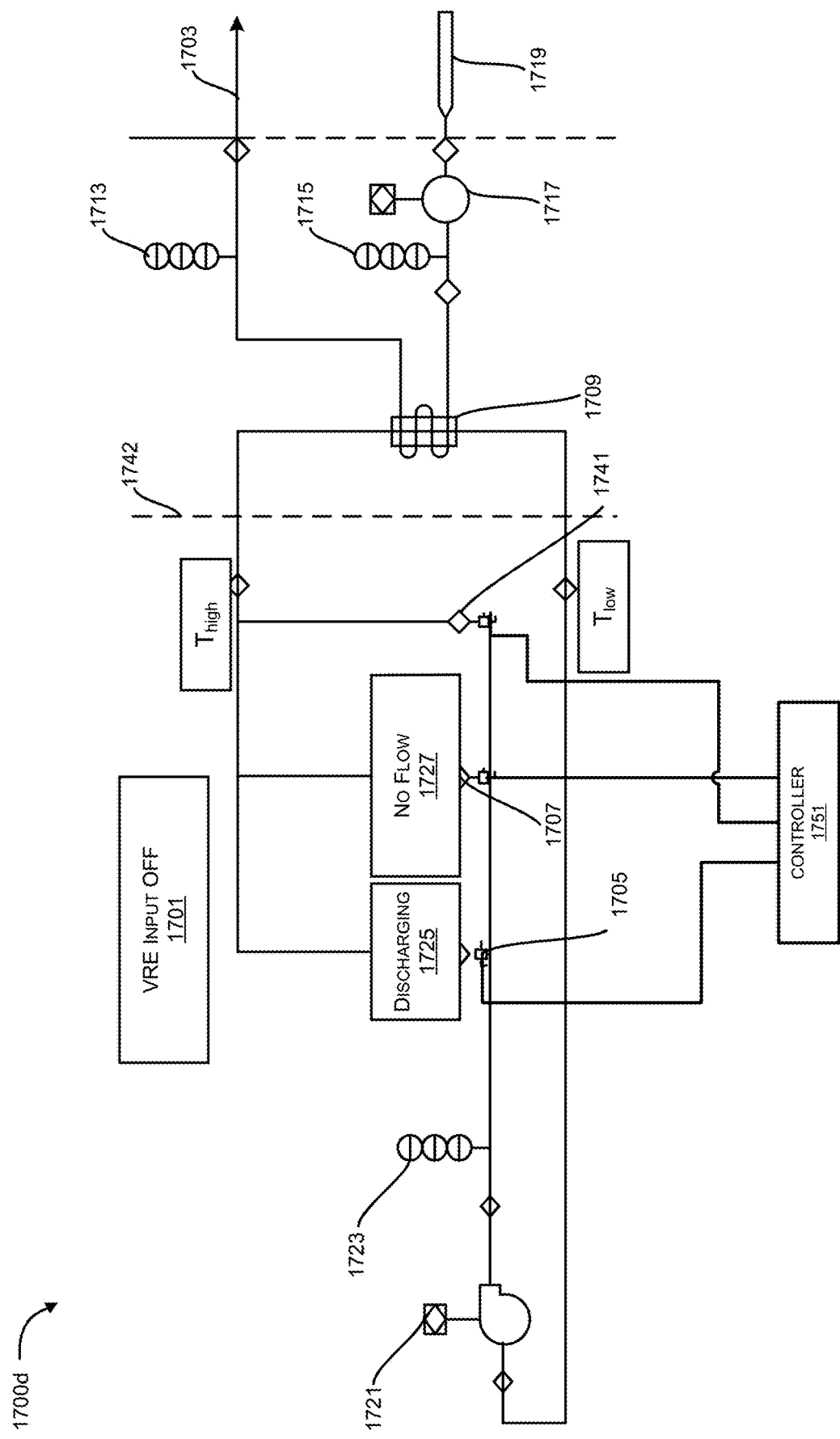

As shown in 1700d in FIG. 19D, valves 1707 and 1741 are closed at the point that the outlet temperature of stack 1725 has reached $T_{high}$. Note that at this point, the peak brick temperature in stack 1727 is far below the peak brick temperature in stack 1725—it has been "deep-cooled" below $T_{high}$, by continuing to supply flow during the discharge of stack 1727. The system would be fully "discharged"— unable to deliver further energy at temperature $T_{high}$—when the outlet temperature of stack 1725 drops below $T_{high}$.

Figure 20A:
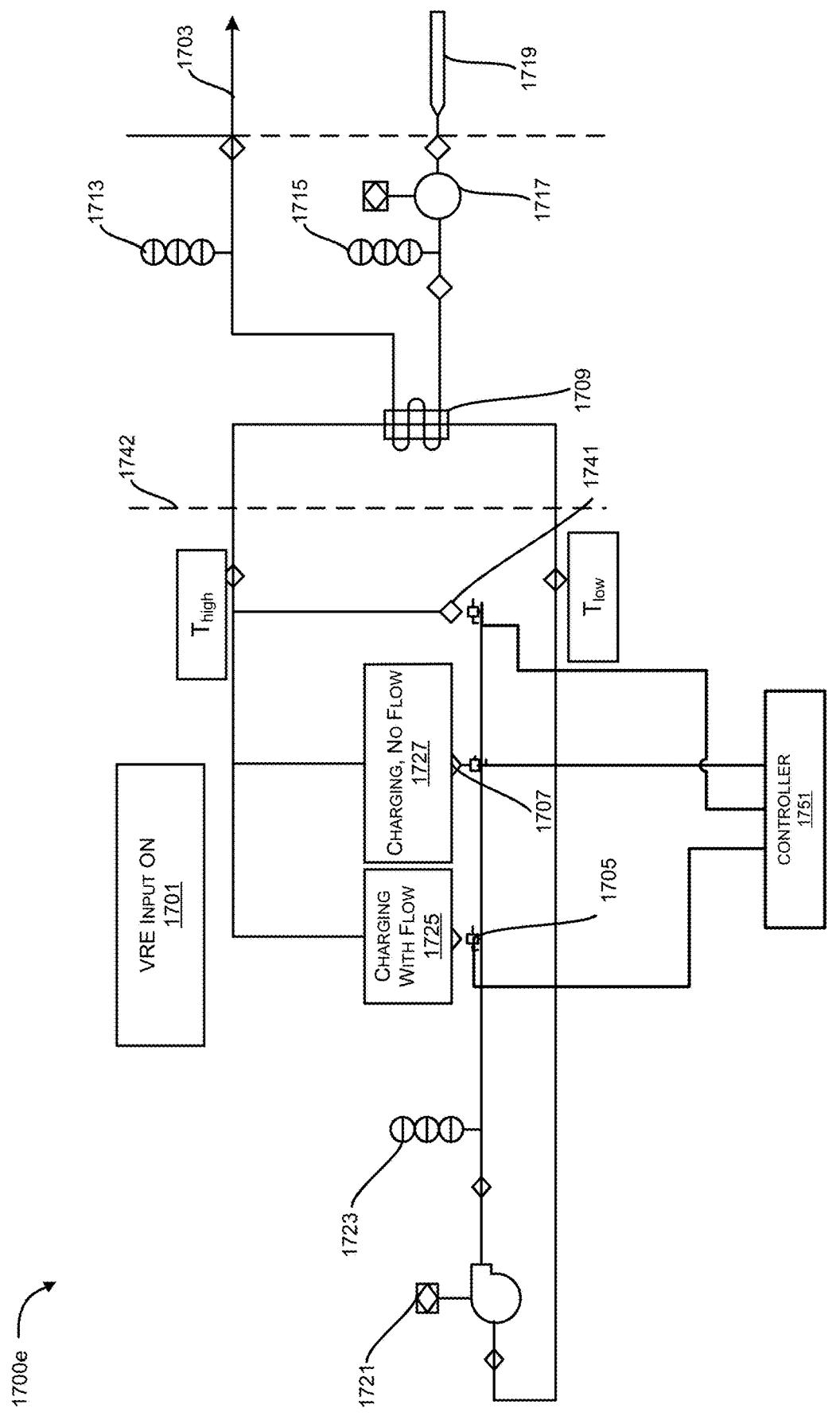

In some implementations, it is beneficial for controller actions to have chosen a rate of discharge such that when next charging begins—as at the beginning of the next solar day, for instance—the system is not yet fully discharged. 1700e in FIG. 20A shows the next charging period, in which discharging remains constant. Charging energy is again supplied by VRE into both stacks. Stack 1727, which has been deeply cooled, is charged without flow, and stack 1725 is being charged while providing flow to the system output. As the outlet temperature of stack 1725 rises, controller 1751 again begins to open valve 1741 to maintain the blended system outlet temperature at $T_{high}$.

Figure 20B:
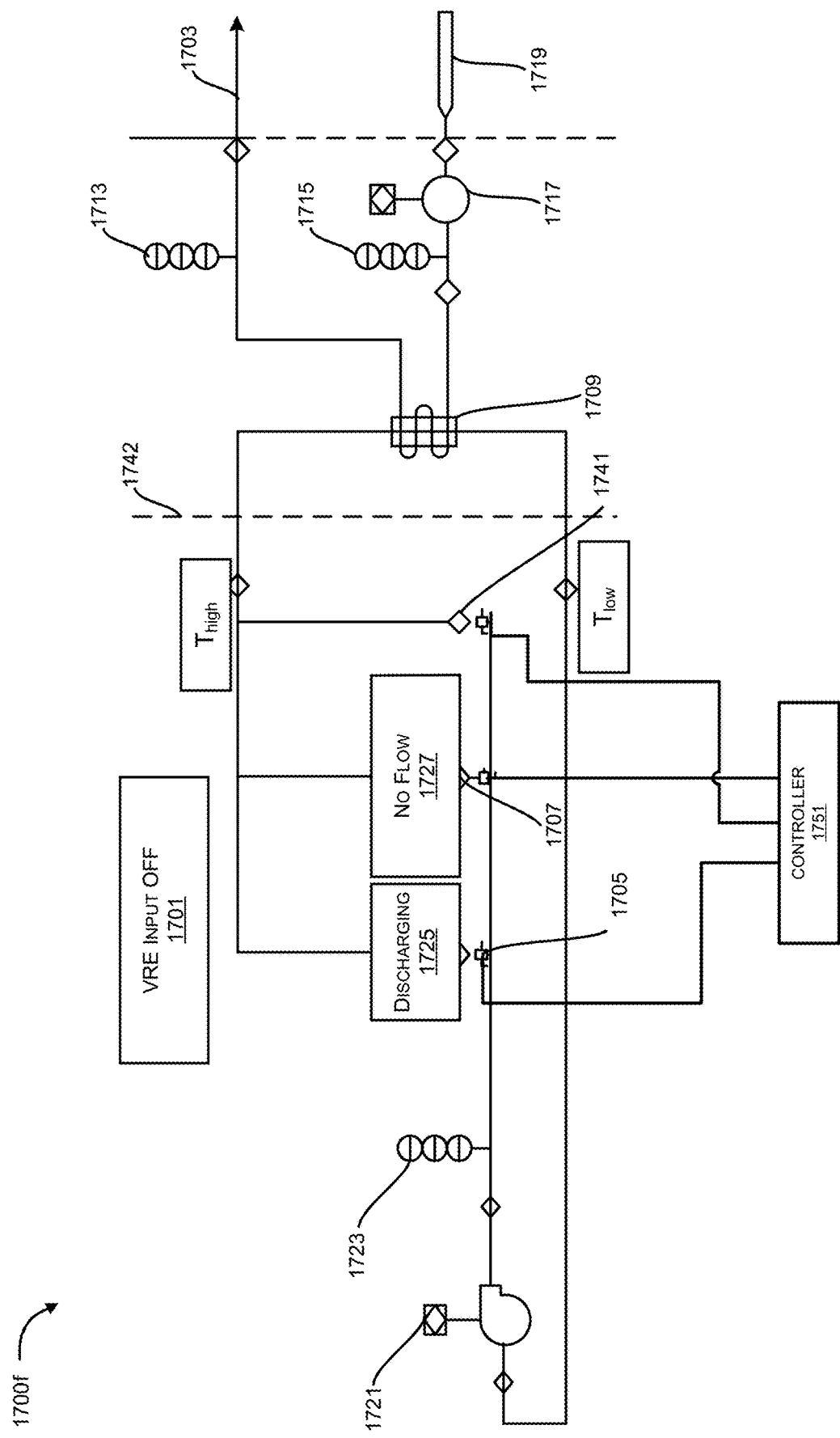
Figure 20C:
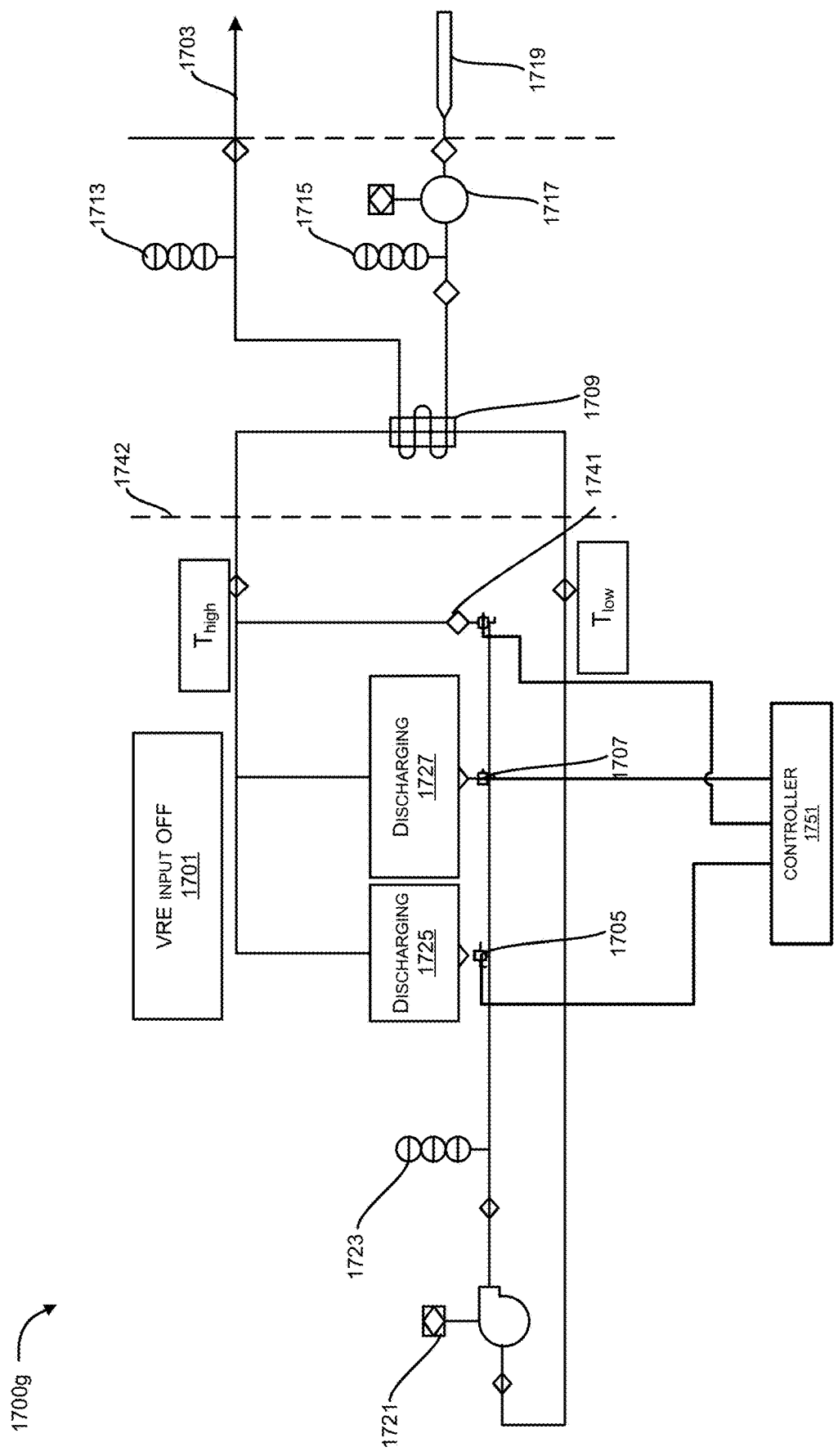
Figure 21:
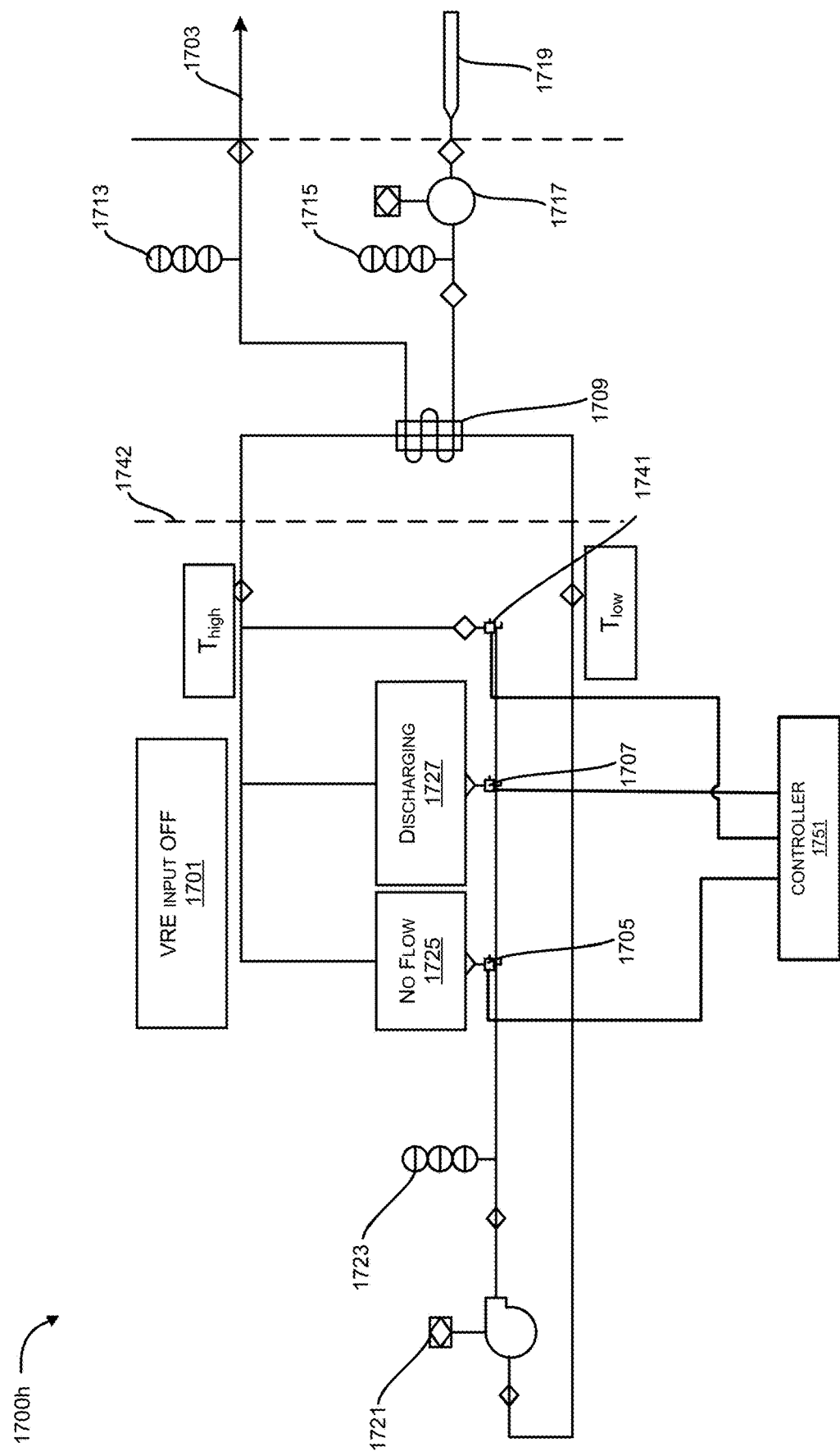

At the end of this period of charging (electricity supply is again off), both stacks are fully charged, and discharging continues as in 1700f as shown in FIG. 20B. Now stack 1725 is discharging while stack 1727 has no flow. As discharge proceeds and stack 1725's outlet temperature falls, controller 1751 first begins to close valve 1741, then begins to open valve 1707 as shown in 1700g in FIG. 20C. Discharging continues; as stack 1727's outlet temperature falls, controller 1751 progressively closes valve 1705, so that toward the end of the discharge cycle substantially all flow is coming through stack 1727 as shown in 1700h, FIG. 21. As the next charging cycle begins, the system is now in the state shown in 1700a in FIG. 19A.

Thus it will be understood that through actions of the controller responding to the measured and/or modeled state of charge of each stack, in successive charge/discharge cycles each stack is cooled to a gas outlet temperature of approximately $T_{high}$ in a first cycle and a gas outlet temperature substantially below $T_{high}$ in a second cycle. This alternating deep-cool operation effectively prevents thermal runaway. Those skilled in the art will recognize that this technique may be applied in larger systems with more than two independent stacks, for instance by organizing the system into pairs which operate as shown here in parallel or in series with other pairs; or by arranging more than two stacks in a deep-cool operating pattern.

Flow through the one or both of the stacks may be varied, as explained above. To avoid overheating and to control the output temperature, all or a portion of gas may be diverted by one or more baffles or flow control devices to a bypass 1741, controlled by the controller 1751, such that the inlet gas is mixed with the discharge gas of the stacks, to provide the output at a constant temperature or specified, non-constant temperature profile.

Figure 22:
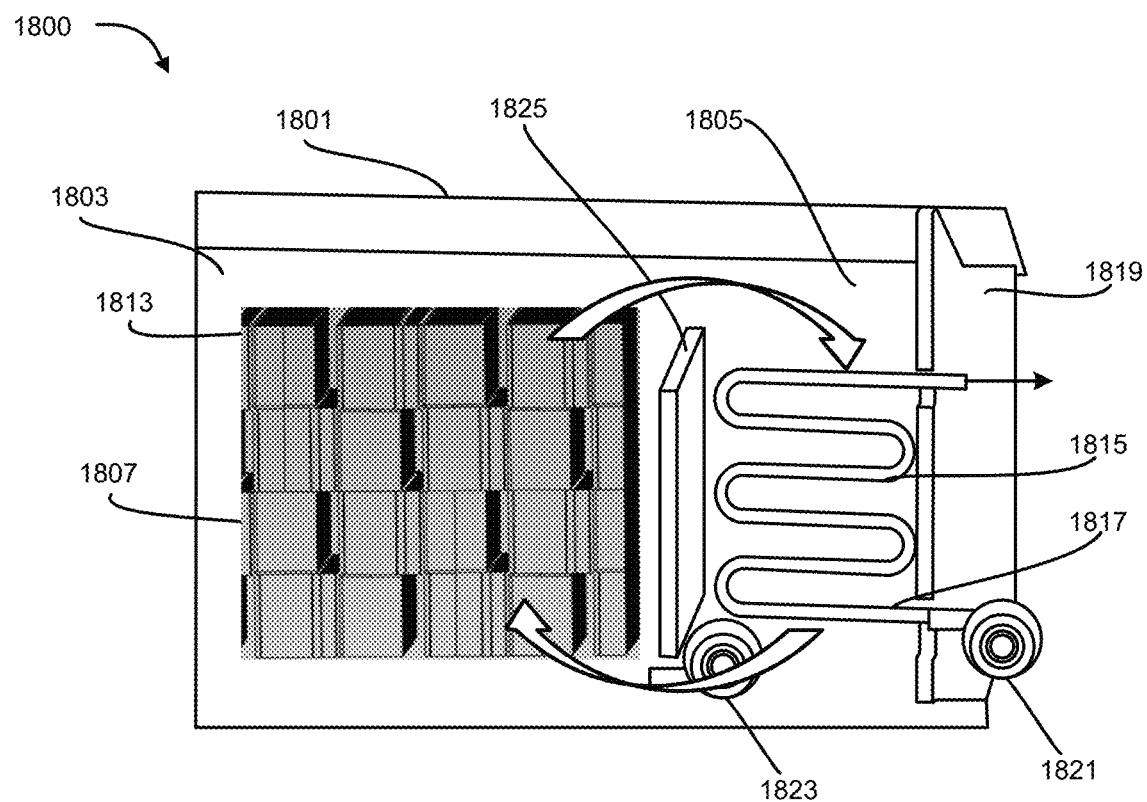
FIG. 22 illustrates the system during charge and discharge states according to the example implementations.

FIG. 22 also illustrates the charging and discharging modes of a system 1800, which includes thermal storage structure 1801 having first section 1803 and second section 1805. As has been described, system 1800 can be electrically connected to an electrical energy source, and can facilitate supplying this electrical energy to heating elements 1813 associated with at least some portion of thermal storage 1807 within first section 1803 during a charging mode. Heating elements 1813 may receive electrical energy at a controlled rate and emit thermal energy such that the bricks can absorb the emitted thermal energy and correspondingly become heated to some desired temperature. As a result, thermal storage 1807 can store the received electrical energy in the form of thermal energy.

As shown, system 1800 may also be required to simultaneously generate some combination of hot gas, supply steam and/or other heated fluid for various industrial applications. This output may be facilitated within second section 1805 within thermal storage structure 1801, which includes a pump 1821 that provides water to a first end 1817 of a conduit 1815. Accordingly, during a discharging mode, blower units 1823 can be actuated to facilitate the flow of a gas such as air from one end to the other of thermal storage 1807 (e.g., from the bottom to the top), and from there into second section 1805 such that the gas passing through the first section can be heated to absorb and transfer the thermal energy emitted by the heating elements 1813 and/or thermal storage. This flow of heated air passes into second section 1805, which allows conduit 1815 to convert the water flowing through the conduit 1815 into steam and facilitate outflow of the generated steam through a second end 1819 of conduit 1815.

Alternatively, during simultaneous charging and discharging, gas flow through thermal storage 1807 may be minimal or none, and all or a portion of gas from blowers 1823 may be diverted by one or more baffles or flow control devices, and may be heated by a separate bypass heater (not shown) to deliver inlet gas, such as inlet air, to the steam generator at a suitable temperature. This bypass mode of operation may be beneficial in achieving predefined temperature distributions in thermal storage and in mitigating the required power dissipation of the heating elements.

In some configurations, the only required output from the thermal storage structure is the output of hot gas (e.g., hot air) to an industrial process. Accordingly, a steam generator may either not be present or not used. In such configurations, a separate conduit connecting to a processing chamber may be provided to facilitate to delivery of the hot gas.

In another implementation, if the available electrical energy being received by the structure 1800 is low, then during charging mode, a smaller number of the total number of available heating elements 1813 receive the limited available electrical energy. Accordingly, only a portion of thermal storage is heated during charging mode. During discharging, gas can be passed largely through only the portion of thermal storage 1807 that has been heated. The heated gas thus continues to transfer the stored thermal energy to the conduit 1815 in order to keep the temperature of the gas at the conduit 1815 sufficiently high to maintain continuous and controlled steam production, thereby preventing any damages or failure in the steam production system.

Simultaneous Charge-Discharge Alternate Heater

Implementations discussed above have described the flow of a fluid such as air into a first section of a thermal storage structure that includes the thermal storage material itself, and from there into a second section of the thermal storage structure that includes an output device such as a steam generator.

Other fluid flows within the thermal storage structure are also contemplated. In some implementations, the system is configured to cause a heated air flow to be directed into the second section, without first having flowed through the first section. In such implementations, the system is configured to heat inlet air using a heater that is electrically connected to the electrical energy sources. In this manner, the air may be heated to a same temperature range that would be expected from heated air being output from the thermal storage. This mode may be utilized in charging mode, during which time the energy supply from the electrical energy source is likely to be plentiful, and therefore less costly. A heater powered by the input electrical energy receives inlet air (e.g., which may be ambient air, recirculated air, etc. that is cooler than the peak temperatures of air produced by the thermal storage), heats the inlet air, and directs it to the second section of the thermal storage structure, where it may pass over a conduit of an OTSG, for example. During this operation, the system may allow very little or no air to pass through the thermal storage such that charging is performed efficiently without discharging into the second section before discharging mode is initiated.

In another type of air flow, the thermal storage structure can be configured to facilitate the passive outflow of heated air from the housing due to the buoyancy effect of heated air. This may be used to provide intrinsic safety for people working in areas near the unit and for the equipment itself, without requiring active equipment or standby electric power sources to maintain safe conditions. For example, if pump or blower motors or drives fail, if control systems fail, or if the operating electric power supply fails, the present innovations include features that cause air to flow in such a manner as to provide ongoing cool temperatures at exterior walls, foundation, and connected equipment points. This type of operation can maintain the temperature of all parts of the system within safety limits and prevent any potential harm to people, the environment, other equipment or the components of the system from being thermally damaged.

Figure 18:
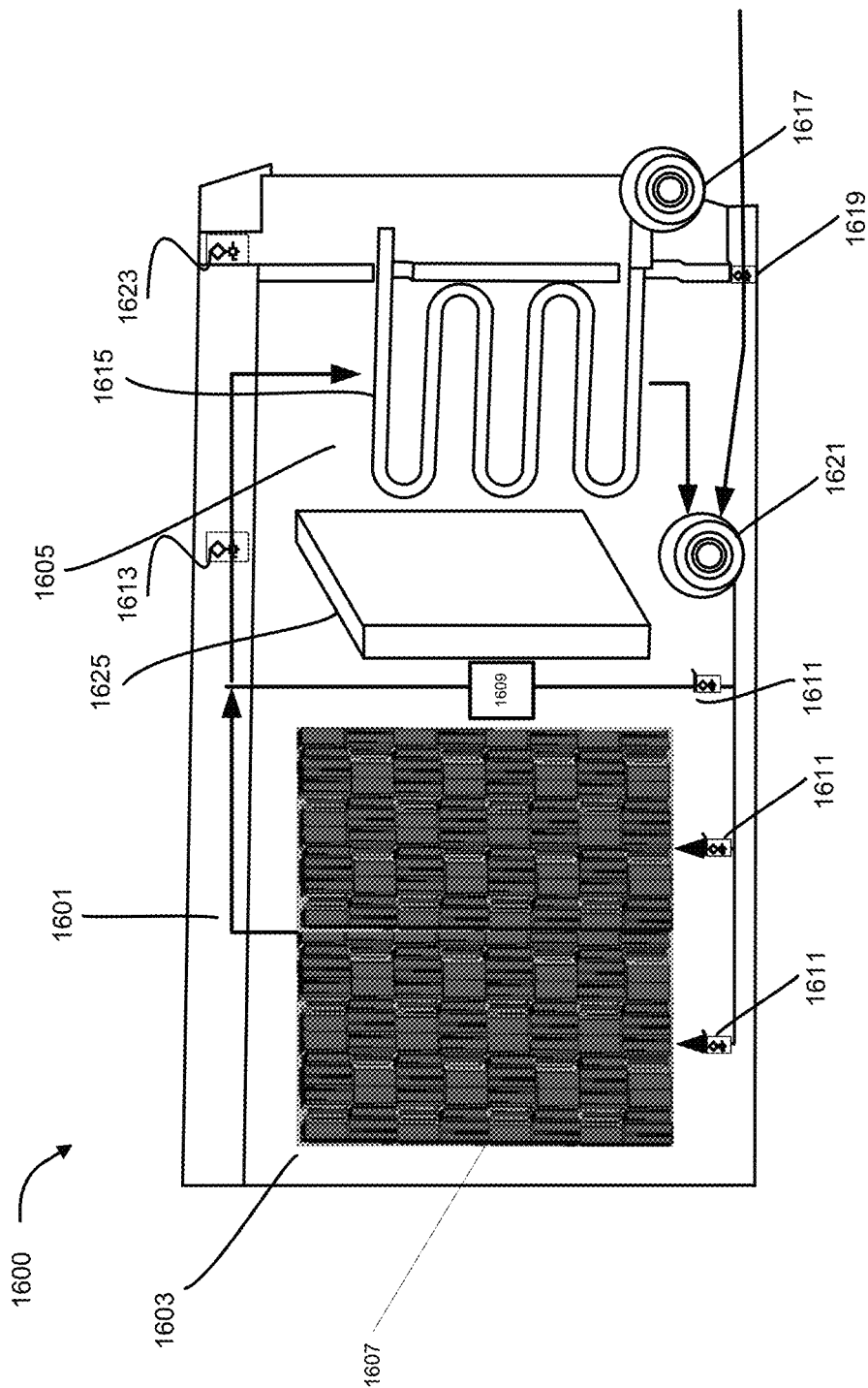
FIG. 18 illustrates an air bypass heater according to the example implementations.

FIG. 18 is a block diagram of a system 1600 that illustrates these air flows. As shown, thermal storage structure 1601 includes a first section 1603 that includes thermal storage blocks 1607, a second section 1605 that includes a steam generator 1615, and a thermal barrier 1625 separating the two sections. Further, as described above, insulation is provided with an air gap that allows for the dynamic insulation of thermal storage 1607.

A blower 1621 takes inlet air from louver 1619 and directs it to thermal storage blocks 1607. Air that has passed through the thermal storage blocks 1607 can then pass into second section 1605 during a discharging mode. As an example of another air flow, release valve 1623 may be controlled to allow for the release of hot air, and inlet valve 1619 may be opened to allow for the intake of ambient air, such as in the event of a need for quick shutdown or emergency. By suitable arrangement of the valve locations and air flow paths, a "chimney effect" or buoyancy-driven air flow may establish suitable air flow through the dynamic insulation and system inlets to maintain cool outer temperatures and isolate the steam generator or other high-temperature process from the storage core temperatures, without active equipment.

Auxiliary heater 1609 is a type of auxiliary heater that can be used to heat a portion of the fluid (such as air) moving through the thermal storage structure. As shown in FIG. 18, auxiliary heater is positioned in the thermal storage structure, but may also be located outside of the thermal storage array. In the case of the auxiliary heater 1609 being positioned in the thermal storage structure, the portion of the fluid may pass through the bypass described below with respect to FIGS. 19A-19D, 20A-20C and 21-33. Another type of auxiliary heater that may be used in some implementations is a heater positioned between the fluid output of a thermal storage medium and an inlet of a load system that the fluid is delivered to. Such a heater may be used in some embodiments to increase an output temperature of the fluid provided by a thermal storage structure.

These are just two examples of multiple possible fluid flows within system 1600. As has been described, system 1600 is configured to receive inlet fluid at inlet valve 1619. This fluid may variously be directed directly to the dynamic insulation or directly to thermal storage 1607. Optionally, the system can include one or more louvers 1611 positioned at the bottom of the stacks within first section 1603, and are configured such that the flow path of the fluid flowing through each of the storage arrays and thermal storage elements is as uniform as possible such that constant air pressure is maintained across each thermal element for efficient charging and discharging. Still further, inlet fluid may be directed to second section 1605 via auxiliary heater 1609, as controlled by a louver 1611 positioned between the blower 1621 and the auxiliary heater 1609, without passing through the dynamic insulation or thermal storage 1607.

Additionally, fluid flow from the top of the stacks within thermal storage 1607 may be provided to steam generator 1615 via a valve 1613 between first section 1603 and second section 1605. Valve 1613 can separate receive fluid flows produced from each of the stacks in thermal storage 1607. For example, in the case in which two stacks are used, valve 1613 can receive a first fluid flow from a first stack and a second fluid flow from a second stack. Valve 1613 can also receive a bypass fluid flow, which corresponds to fluid (such as from louver 1619) that has not passed through either the first or second stacks. As will be described below in the context of the lead-lag paradigm, valve 1613 is controllable by the control system to variously output no fluid, a combination of the first fluid flow and the bypass fluid flow, a combination of the second fluid flow and the bypass fluid flow, a combination of the first and second fluid flows, etc. In order to achieve an output fluid having a specified temperature profile. Louver 1619 can also be used to release cool fluid from the system instead of recirculating it to thermal storage 1607, in the event that the blower is not operational, for example.

While the foregoing example includes the bypass heater louvers, such as high-temperature louvers, these features are optional. Further, the bypass heater may have an advantage, in that it can reduce the required heater power within the array. In other words, the bypass heater may discharge heat during charging, without passing air through the array during charging.

Figure 35A:
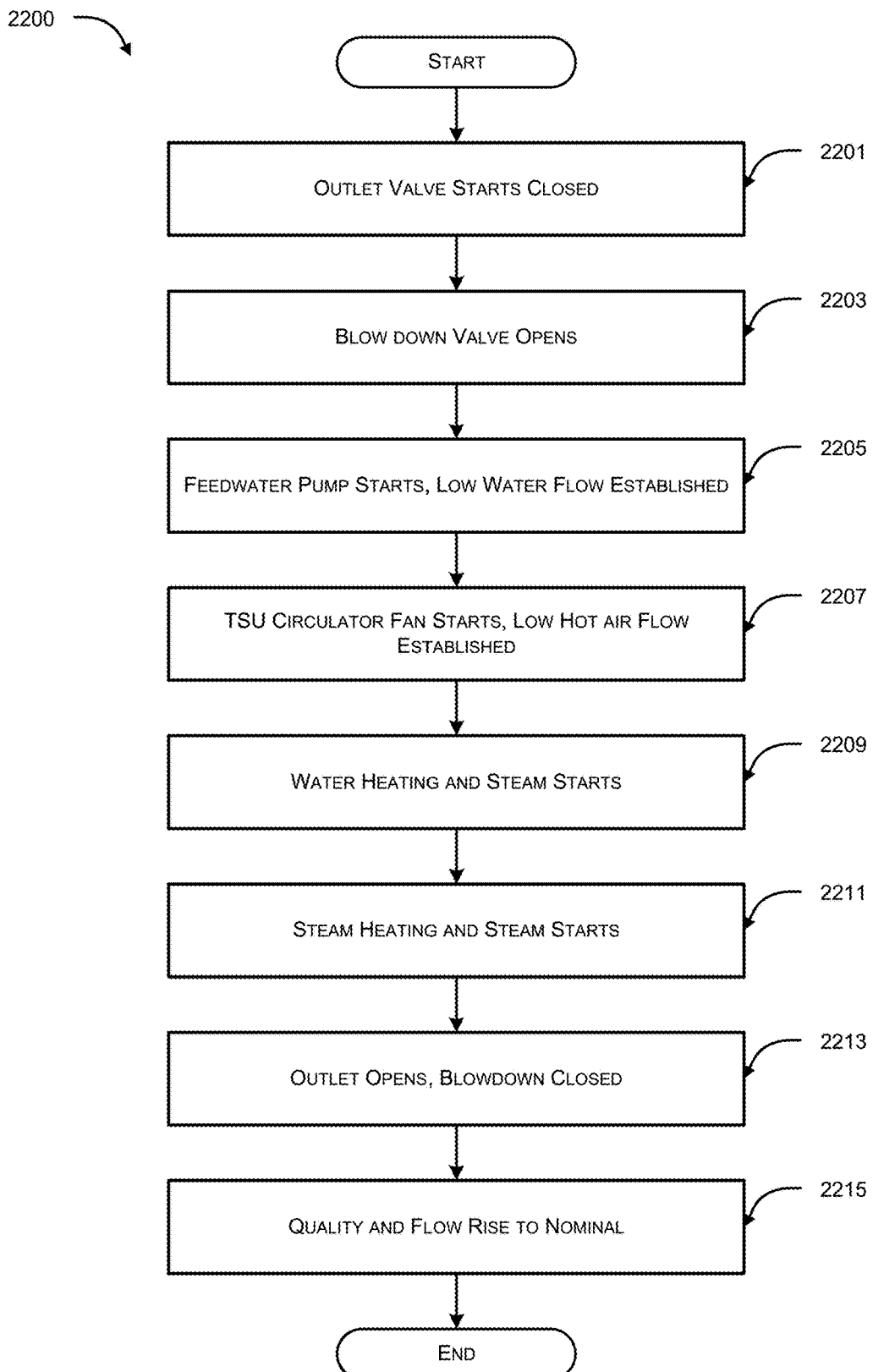
FIGS. 35(A)-(B) illustrate a flowchart associated with startup and shutdown according to the example implementations.
Figure 35B:
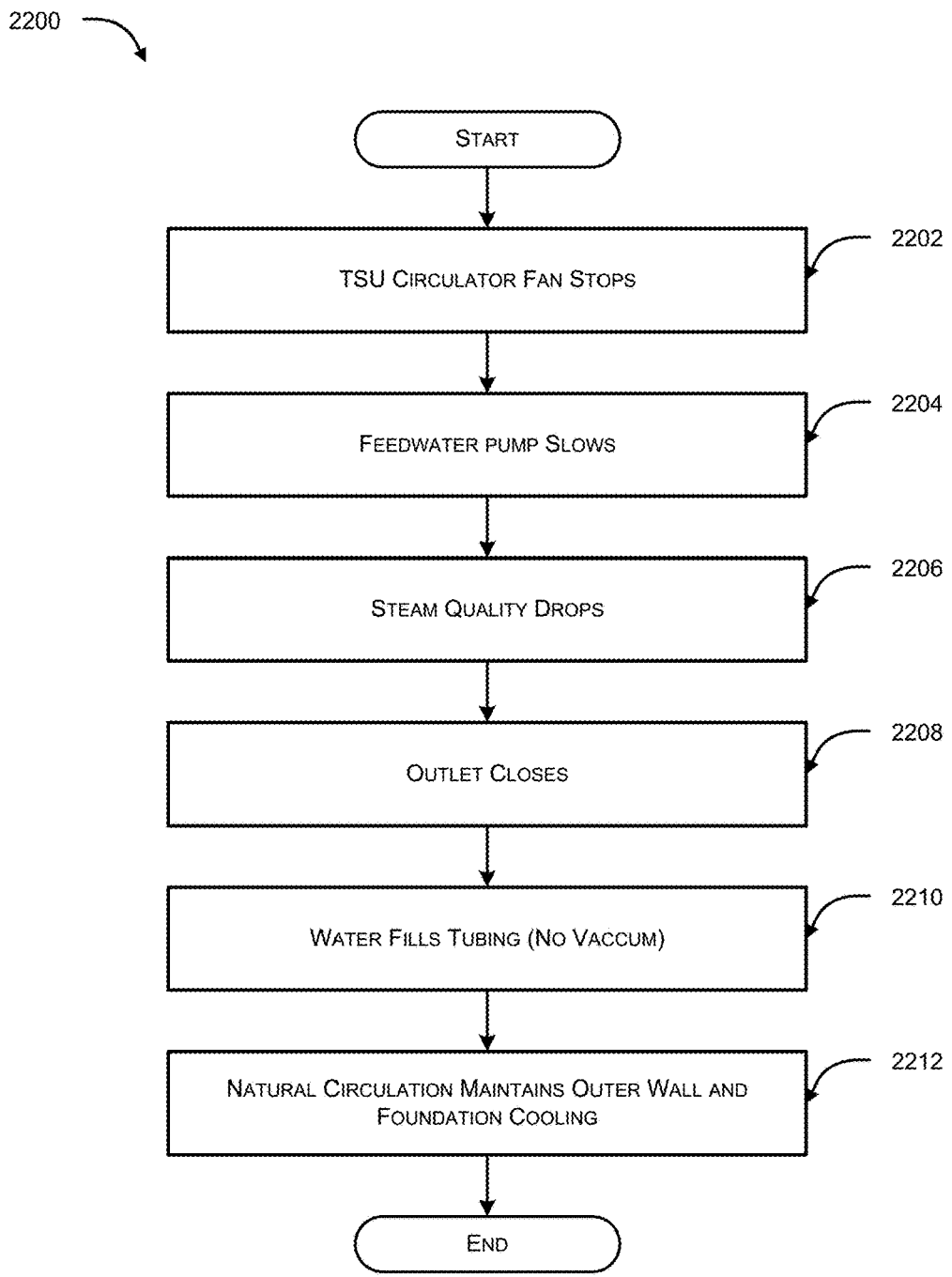

Note that various other control valves are contemplated, including those described below with reference to FIGS. 35(A)-(B).

These air flows and associated control structures may provide benefits in terms of safety and temperature regulation, in addition to the benefit of efficient charging and discharging.

The selection of charging and discharging modes may be made by a control system on an automatic schedule based on, for example, measurements of temperature or power distribution. Similarly, other features such as the hot air booster mode described above may also be controlled by the control system based on conditions detected within the thermal storage structure.

Such sensing may include measurements of radiation by cameras, spectrometers, or other devices, and may include remote measurements carried by optical waveguide systems including fiber optic, fixed reflector, and movable reflector systems; measurements of temperature based on measurements of resistance or current flow in heating elements; direct sensing of temperatures within the refractory array, within flow channels exiting the array, or by other sensing means or locations.

Next, the use of a particular type of discharging—"deep discharging"—is described.

Lead-Lag and Avoiding Thermal Runaway

Thermal energy storage systems are vulnerable to "thermal runaway" or "heat runaway" effects. The phenomenon may arise from imbalances in local heating by heating elements and imbalances in local cooling by heat transfer gas flow. Even small imbalances may be problematic, which are amplified across successive charge-discharge cycles. After several cycles, even small imbalances may result in large temperature differences which may be damaging to bricks and/or heaters, and/or severely limit the temperature range within which the system can be safely operated.

Figure 23:
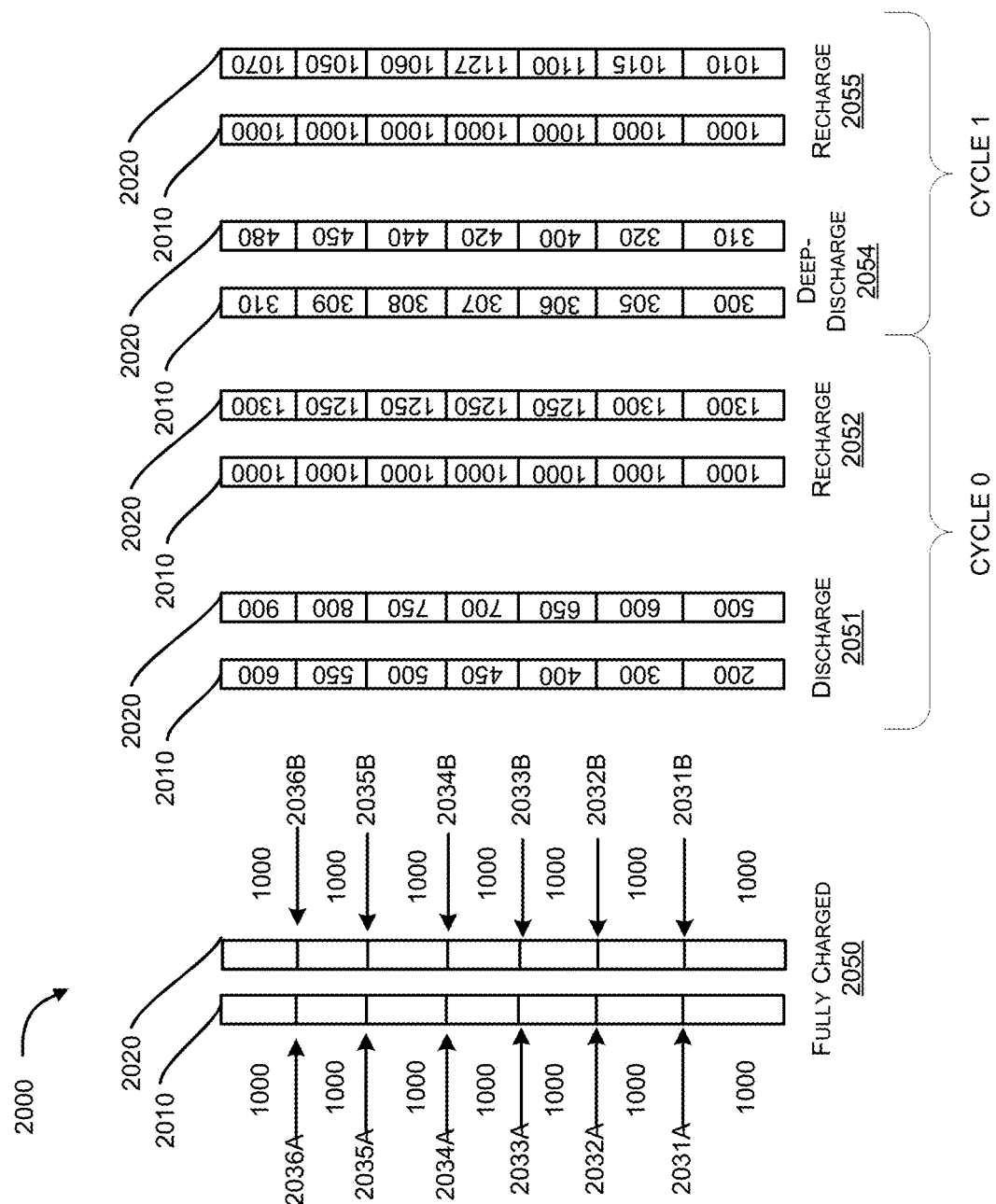
FIG. 23 illustrates a schematic view of thermal runaway according to the example implementations.

FIG. 23 provides an example 2000 illustrating how heating imbalances within heating storage arrays may lead to thermal runaway. For each of multiple points in time, example 2000 depicts temperatures associated with fluid flow conduits 2010 and 2020, each of which passes through a different thermal storage array. (For ease of reference, the arrays through which conduits 2010 and 2020 pass may be referred to as arrays 1 and 2, respectively). As shown, different portions or layers of the conduits are heated by different heating elements, indicated as heating element pairs 2031A-2036A and 2031B-2036B.

Point in time 2050 corresponds to an initial, fully charged state for both arrays 1 and 2. In this state, the conduits are heated to 1000° C. along each section of their lengths. In the case of solar energy input, such a state might to correspond to arrays at the end of a solar day. While the value of 1000° C. is included, this is just an example, and the temperature may be varied depending on factors such as applications or use points. For example, the conduits may be heated within a range of 800° C. to 1600° C., and more specifically, 900° C. to 1300° C., and even more specifically, 800° C. to 1100° C. Other factors that may impact the temperature include temperature impact on heater life, storage capacity, heating patterns, weather conditions, temperature, and heater materials. For example, a ceramic heater may have an upper conduit temperature range as high as 1500° C. to 1600° C., whereas other heaters may have a conduit temperature range of 600° C. to 700° C. The range of conduit temperatures may be varied vertically within the stack by varying the brick materials.

At the beginning of discharge period 2051 (e.g., dusk in the case of solar energy input) of the arrays, cooler heat transfer gas is introduced at the bottom of the arrays and flows upwards. During the charging period that has just concluded, heat has been added by heating elements 2031-2036, which may be oriented transverse to the fluid columns and grouped by horizontal position within the array. Ideally, the same input energy will have been supplied to all heating elements in each group, but in practice, individual heating units vary slightly in their resistance (and thus their power delivery). Similarly, local cooling flow rates will vary between conduits, given that individual channels vary in roughness, brick alignment, or are otherwise mismatched in their resistance to flow.

Here, example 2000 assumes that the flow rate in conduit 2020 is below the flow rate in 2010. Accordingly, portions of array 2 adjacent to conduit 2020 will exhibit higher temperatures than portions of array 1 adjacent to conduit 2020, due to the lower cooling flow. The result at the end of discharge period 2051 is shown in FIG. 23. Arrays 1 and 2 both exhibit a "thermocline" temperature distribution, as the bricks at the lower layers of arrays 1 and 2 are cooler than those at the upper layers. This phenomenon results from the discharge period being stopped when a particular outlet temperature (i.e., a temperature at the top of the array)— 600° C. in the case of array 1. Furthermore, due to the lower cooling flow in array 2, material temperatures around conduit 2020 in array 2 are roughly 300° C. higher than those around corresponding layers of conduit 2010 in array 1. For example, the top layer of array 1 is at 600° C., while the top layer of array 2 is at 900° C.

These variations in heating and cooling rates, unless managed and mitigated, can lead to runaway of mismatched storage element temperatures, and can lead to runaway temperatures that cause failures of heaters and/or deterioration of refractory materials within the array.

At the end of discharge period 2051, the control system determines how much energy to apply to each heating element group during a charging (or recharging) period in order to restore the full state of charge. But the control system may not have information about every temperature nonuniformity within every location within a set of thermal storage arrays. For example, there might be a limited number of sensors available, and thus temperature nonuniformities may be undetected. Sensors may also malfunction. In some implementations, the heating elements may be controlled by a model-based paradigm in which sensors are not used or are used in a limited fashion. The system may also not be configured to vary heating to a fine enough granularity to resolve every area of temperature nonuniformity. In example 2000, it is determined that heating elements 2031 are given enough total energy to raise the surrounding materials by 800° C., while heaters 2036 are given enough energy to raise their surrounding materials by 400° C.

At the end of a charging period 2052 that uses the above-noted heating parameters, the temperature differences at the end of discharge period 2051 remain. This is due to inefficient discharging of conduit 2020 relative to conduit

2010, and conduit 2020's higher residual temperature at the end of discharge period 2051. Accordingly, the amount of input energy received during charging period 2052 overheats conduit 2020 along its length by roughly 300 degrees. Note that over the course of a single discharge and charge cycle, temperatures along conduit 2020 are now 250-300° C. warmer as compared to fully charged state 250. If another cycle were repeated (that is, another discharge period followed by another charge period), the overheating of conduit 2020 would be even more pronounced. (The values shown in FIG. 23 are for example purposes; realistic temperature mismatches might grow more slowly, but could reach a critical level over repeated cycles.) This increase in temperature over time due to local temperature nonuniformities is thermal runaway, and can cause early failure of heating elements and shortened system life.

An effect that exacerbates this runaway is the thermal expansion of fluid flowing in the conduits. Hotter gas expands more, causing a higher outlet velocity for a given inlet flow, and thus a higher hydraulic pressure drop across the column. This effect may contribute to a further reduction of flow.

The present disclosure teaches several techniques that may be used to mitigate thermal runaway in a manner that achieves long-term, stable operation of the thermal energy storage system.

First, the height of the storage material stack and the physical measurements of the fluid flow conduits may be chosen in such a manner that the system is "passively balanced." Low fluid flow rates are selected for system discharge, and flow rates and conduit geometries are designed with a relatively low associated hydraulic pressure drop and long column length. In this configuration, the lower density of hotter gas will create a "stack effect," a relative buoyancy component to the flow rate, which increases fluid flow in hotter conduits. This mismatched cooling flow provides a balancing force to stabilize and limit temperature differences across the thermal storage array.

Second, a "deep-cool" sequencing is used to rebalance or level temperature differences among conduits. This concept can also be referred to as a deep discharge (also referred to as "deep-discharge"). Generally speaking, deep discharging refers to continuing discharge of one or more arrays until temperature nonuniformities within the array have reduced (such arrays can thus be said to have been "deeply discharged," which amounts to a thermal reset). The amount of discharge of an array might be measured in several ways, such as by a comparison of the array's total bulk temperature to that of the inlet gas temperature from inlet or bypass air admitted through an inlet valve. A deep discharge of an array may be contrasted with a partial discharge of the array, in that during a deep discharge, gas flows through the array for a longer period of time (and potentially with greater flow volume) than during a partial discharge. In some applications of a deep discharge, an array may be fully discharged to the inlet air temperature, which may also be referred to as bypass temperature. The operations sequence shown in FIGS. 19A-21 disclose one "deep discharge" method of operation.

Consider the effect of deep-discharge period 2054. By discharging arrays 1 and 2 more completely than in discharge period 2051 (e.g., by flowing gas over the arrays for a longer period of time), it can be seen that arrays 1 and 2 discharge more uniformly during deep-discharge period 2054. Temperatures in array 1 range between 300-310° C., while temperatures in array 2 range between 310-480° C. Accordingly, subsequent charging period 2055 results in a temperature distribution within both arrays 1 and 2 that more closely approximates starting point 2050, and thus greatly reduces thermal runaway within the thermal storage.

Deep discharging is thus an effective solution to the problem of thermal runaway within a thermal storage array. But thermal runaway is not the only constraint on the thermal energy storage systems contemplated in this disclosure. As noted, it is desirable for thermal energy storage systems to be able to provide a continuous or near-continuous supply of thermal energy for downstream processes. This requires that at least some media within the storage unit be at temperatures above the required delivery temperature. The present inventors have realized that while deep-discharge is desirable for thermal storage arrays, discharging all arrays in a system every discharge cycle is not possible, as it would create periods when no element within the system has sufficient temperature to meet outlet temperature requirements. Accordingly, the inventors have developed a paradigm of only periodically deep-discharging each thermal storage array in a set of one or more storage arrays. This approach meets the dual objectives of periodically performing a thermal reset of each thermal storage array and maintaining sufficient temperature within the thermal storage to meet outlet temperature specifications.

One specific implementation that is contemplated includes the use of two thermal storage arrays, and is referred to as the "lead-lag" technique. In this technique, the system deep-discharges each of the two thermal storage arrays every other discharge period. For example, array 1 would be discharged in discharge periods 0, 2, 4, etc. and array 2 would be discharged in discharge periods 1, 3, 5, etc.

Figure 24A:
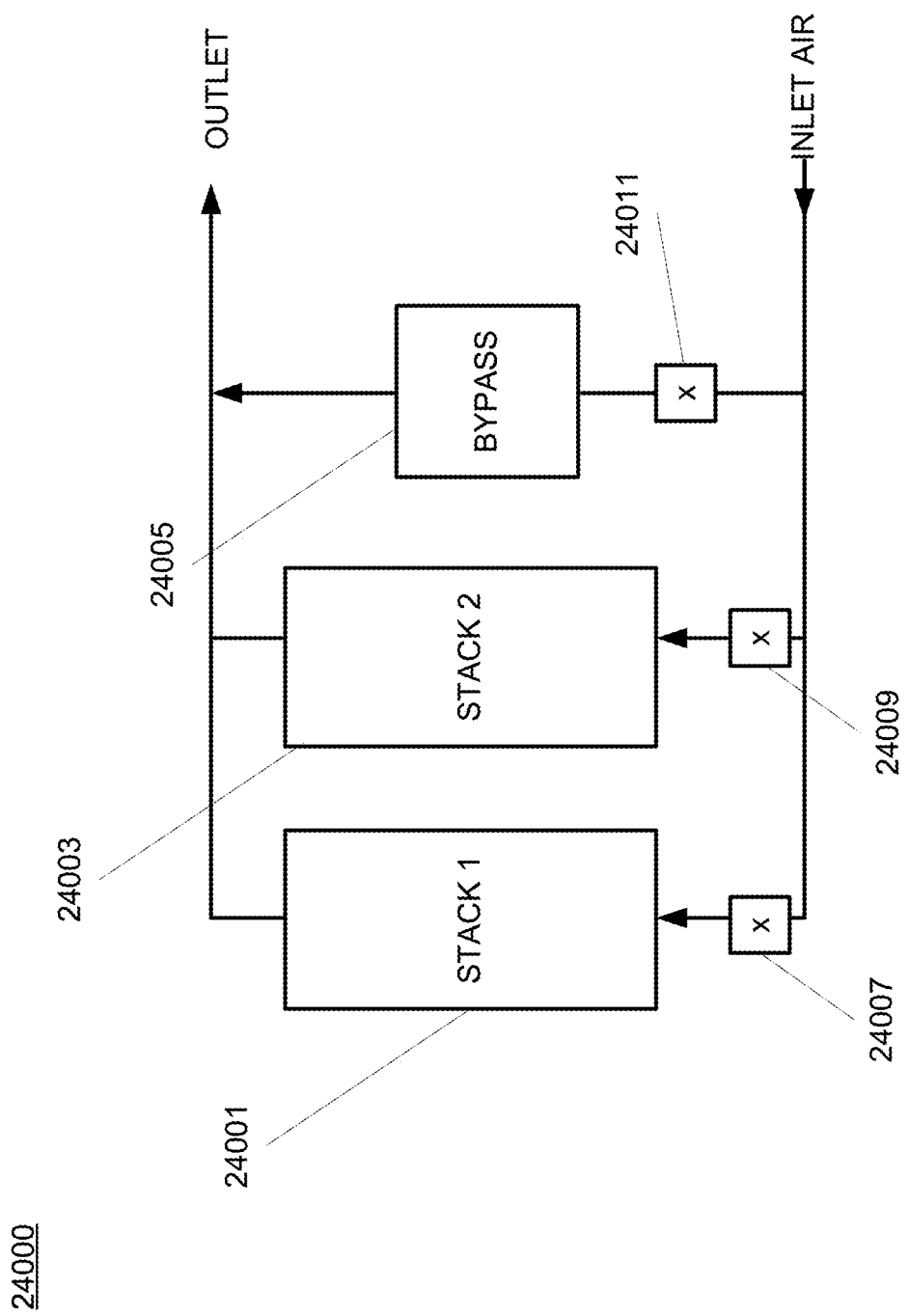
FIGS. 24A and 24-29 illustrate schematic views of lead-lag according to the example implementations.
Figure 24:
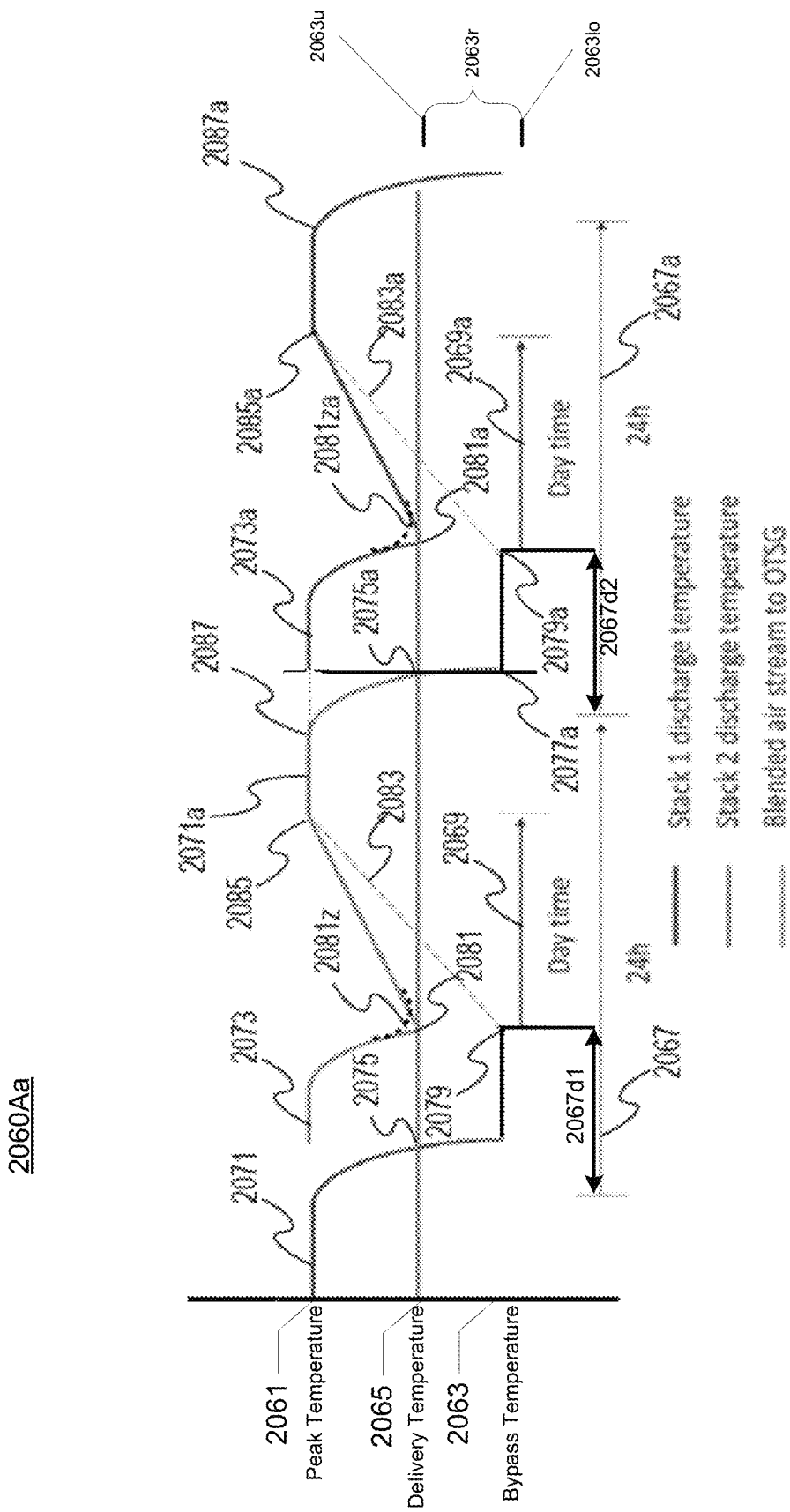
Figure 25:
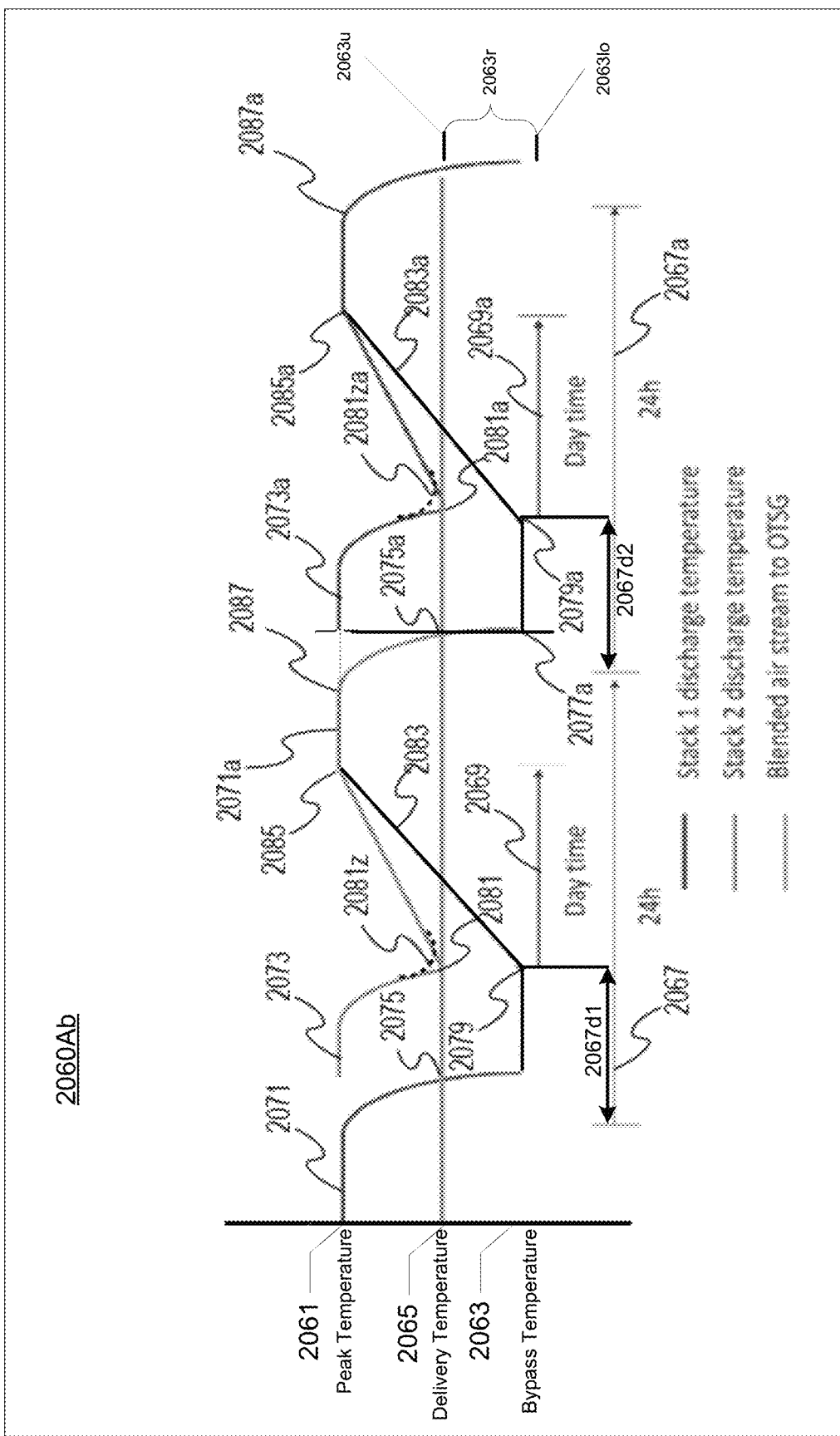

The process elements for a lead-lag operation are shown in FIGS. 19A through 21, and the conceptual lead-lag temperature profiles are shown in FIGS. 24 and 25, which illustrate the discharge temperature of a first stack and a second stack in a thermal energy storage system, as well as a temperature of a blended fluid flow that is provided as an output.

FIG. 24A illustrates an example configuration 24000 associated with the concept of lead-lag. More specifically, a first stack 24001 and a second stack 24003 are provided that are each configured to receive inlet fluid, as well as a bypass 24005, which is also configured to receive inlet fluid. Respective valves 24007, 24009, and 24011 control airflow into the first stack 24001, the second stack 24003 and the bypass 24005, based on inputs received from the controller, as explained above with respect to FIGS. 19-21. The control of the flow will be explained below with respect to FIGS. 24-33.

As shown in chart 2060Aa, temperature is shown along the vertical axis, while time is shown along the horizontal axis. A peak temperature 2061 of the first stack and the second stack are shown, along with bypass temperature 2063, which is the inlet gas temperature. Additionally, at 2065, a delivery temperature of the stream of blended output fluid flow is shown. The horizontal axis shows time, including 24-hour intervals 2067 and 2067a, as well as a solar day at 2069 and 2069a.

The peak temperature of the first stack is indicated by line 2071, while the peak temperature of the second stack is indicated by line 2073. As will be shown, the first stack and the second stack operate together such that the first stack is in a "lead" mode of operation when the second stack is in a "lag" mode of operation, and vice versa. During the first day, the first stack is cooled to a very low temperature relative to both peak temperature 2061 and delivery temperature 2065, while the second stack is cooled to a minimum required temperature to deliver the output at the delivery temperature 2065, which is shown here as a constant. On the second day, the second stack is cooled to the lower temperature while the first stack is cooled to the delivery temperature.

In short, in the case where two stacks are operating together, each stack may be deeply discharged to well below the delivery temperature every other discharge period. Similarly, in those discharge periods in which a given stack is not being deeply discharged, it is discharged from the peak discharge temperature to the delivery temperature (or a temperature approaching the delivery temperature). The cycling between the lead mode and the lag mode for a given stack is accomplished by the control system controlling the flow of fluid in each of the stacks. (In the lead mode, a given stack is deeply discharged, while in the lead mode, the given stack is discharged to a temperature at or above the delivery temperature.) The stack that is being deeply discharged may continue to be heated by having the resistive heating elements receive the electrical energy and emit heat; alternatively, the resistive heating elements may be switched to an off state.

At the leftmost position of the chart 2060Aa, the first stack and the second stack are both at the peak temperature 2061. This starting position may occur outside the solar day such as at midnight. Then, as indicated by line 2071, the first stack begins discharging. As the temperature of the first stack starts to fall and continues to fall to below the output delivery temperature, hot fluid from the second stack is blended as shown at 2073. As the temperature of the first stack continues to fall, the flow through the first stack is reduced and additional heated fluid is blended in from the second stack, in order to maintain delivery temperature 2065.

The first stack continues to discharge until it reaches or approaches a minimum temperature, which, in this example, corresponds to bypass temperature 2063 and represents a fully discharged state of the first stack. This minimum temperature is, in some cases such as in chart 2060A, a temperature that approximates the bypass temperature. The degree to which the minimum temperature approximates the bypass/inlet gas temperature may depend on factors such as the quality of heat transfer out of the bricks, as well as a difference between delivery temperature 2065 and peak temperature 2061. For example, if peak temperature 2061 were 1000° C. and delivery temperature 2065 were 900° Celsius, the amount of cool air that can be blended into the air that is 1000° C. is relatively small. Thus, minimum temperature 2063 to which the stack can be cooled may be higher, such as 800° C. On the other hand, if the delivery temperature 2065 were lower, such as 650° C., then the minimum temperature 2063 to which the stack can be deeply cooled may be lower, such as around 200° C. Thus, the lower delivery temperature 2065 is relative to peak temperature 2061, the lower minimum temperature 2077 can be set relative to bypass temperature 2063. Thus it is not necessarily the case that a stack must be discharged to the bypass temperature in order to achieve deep discharging. Rather, discharging may occur within a range of temperatures (a "deep-discharge temperature region") that is sufficient to reduce thermal runaway by reducing thermal nonuniformities. In some cases, the range of a deep-discharge temperature region for a particular use case is bounded on the upper end by the delivery temperature and on the lower end by the inlet gas temperature, the bounds including both the delivery temperature and inlet gas temperature (or bypass temperature) in the region. As noted, the bounds for this region for a particular situation will vary, for example based on the peak temperature and delivery temperature, and may be more specifically determined in some cases by monitoring the thermal behavior of the thermal storage arrays. Alternately, a deep-discharge temperature region may be determined via execution of a computer modeling program.

During the deep discharging of the first stack, the bypass valve may be turned off, such as by starting to close the louver on the bottom of the stacks as controlled by the control system, to accelerate the cooling process. At this point, the second stack is being used as the primary source of heated fluid to provide the blended stream at delivery temperature 2065. Further, as explained above, fluid may be flowed through the fluid bypass valve so that the fluid is provided at the inlet temperature to the blended stream. The fluid bypass may be used to bypass fluid directly to the blended fluid flow, in order to bring the temperature down at a time when both of the stacks become too hot, such as towards the end of the solar day.

As the second stack continues to discharge, its discharge temperature starts to approach the delivery temperature 2065, as shown at 2081. The discharge may be buffered, such that the minimum discharge temperature of the second stack is higher than the constant delivery temperature 2065, as shown at 2081z. This temperature of the second stack is the minimum temperature at which the blended stream can be provided at delivery temperature 2065. Here, the temperature of the first stack at 2079 is substantially cooler than the temperature of the second stack at 2081.

At this point, which is at or around the start of the solar day (e.g., dawn), the flow to the first stack is turned off at 2079, and the first stack begins to charge as shown by a broken line 2083 in FIG. 24. At this point, the heaters are on for both the first stack and the second stack. Because there is no fluid flow through the first stack, however, the slope of the line indicating heating is greater than that of the second stack, in which fluid flow is occurring.

Alternatively, as shown in 25, fluid continues to be trickled through the first stack as it increases its discharge temperature. The trickle may account for the possibility that the units are not sealed in such a manner that would permit 0% flow, and that the louvers permit a residual flow, such as 5% or the like. Further details of this approach are explained with respect to FIG. 28.

Returning to FIG. 24, after a period of charging, both the first stack and the second stack become fully charged by 2085, which, in this example, occurs during the solar day. In this example, the second stack continues to provide the hot fluid output at the peak temperature while the first stack continues to charge between 2085 and 2087. On the other hand, louvers of the first stack are fully closed at this point, such that there is essentially no fluid flow through the first stack.

At 2087, the roles of the first stack and the second stack are reversed, such that the second stack begins to discharge to a deeply discharged state while the first stack continues to provide the fluid for the blended stream, so as to maintain constant delivery temperature 2065. The remainder of the timeline shown in FIG. 24 is similar to that described for the first 24-hour interval.

At the end of the first 24-hour period cycle 2067 and the start of the second 24-hour period cycle 2067a (i.e., at 2087), the second stack and the first stack are both at peak temperature 2061. As can be seen at 2071a, the second stack begins discharging. As the temperature of the second stack starts to fall and continues to fall to below the delivery temperature, hot fluid from the first stack is blended at 2073a. As the temperature of the second stack continues to fall, the flow through the second stack is reduced and additional heated fluid is blended in from the first stack to maintain delivery temperature 2065.

The second stack continues to discharge, such as until it reaches a minimum temperature at 2077*a* or other discharge temperature.

During the deep discharging of the second stack, the bypass valve may be turned off, such as by starting to close the louvre on the bottom of the stacks as controlled by the control system, to accelerate the cooling process. At this point, the first stack is being used as the primary source of heated gas to provide the blended stream at delivery temperature 2065.

As the first stack continues to discharge, its discharge temperature starts to approach delivery temperature 2065, as shown at 2081*a*. The discharge may be buffered, such that the minimum discharge temperature of the second stack is higher than the constant delivery temperature 2065, as shown at 2081*za*. This temperature of the first stack is the minimum temperature (or approximately the minimum temperature) at which the blended stream can be provided at delivery temperature 2065. Here, the temperature of the second stack at 2079*a* is substantially cooler than the temperature of the first stack at 2081*a*.

At 2079*a*, which is at or around the start of the solar day, the flow to the second stack is turned off, and the second stack charges as shown by broken line 2083*a* of FIG. 24. At this point, the heaters are on for both of the second stack and the first stack.

Alternatively, as shown in FIG. 25, fluid continues to be trickled through the second stack as it increases its discharge temperature. The trickle may account for the possibility that the units are not sealed in such a manner that would permit 0% flow, and that the louvers permit a residual flow, such as 5% or the like. Further details of this approach are explained with respect to FIG. 28.

The first stack continues to provide the hot fluid at the peak discharge temperature while the second stack continues to charge between 2085*a* and 2087*a*. On the other hand, louvers of the second stack are fully closed at this point, such that there is essentially no fluid flow through the second stack.

This pattern of having a lead stack and a lag stack repeats (e.g., every 48 hours). Accordingly, the first discharge operation in discharge period of 2067*d*1 and the second discharge operation in successive discharge period 2067*d*2 can be repeated, such that the control system alternates between performing the first discharge operation (deep-discharging the first stack but not the second stack) and the second discharge operation (deep-discharging the second stack but not the first stack) over time, allowing the system to continuously provide an output fluid flow, and to do so while avoiding thermal runaway. This approach need not be limited to a first stack and a second stack, and may be used with more than two stacks (e.g., triples, quads, or the like) as will be described further below.

Figure 26:
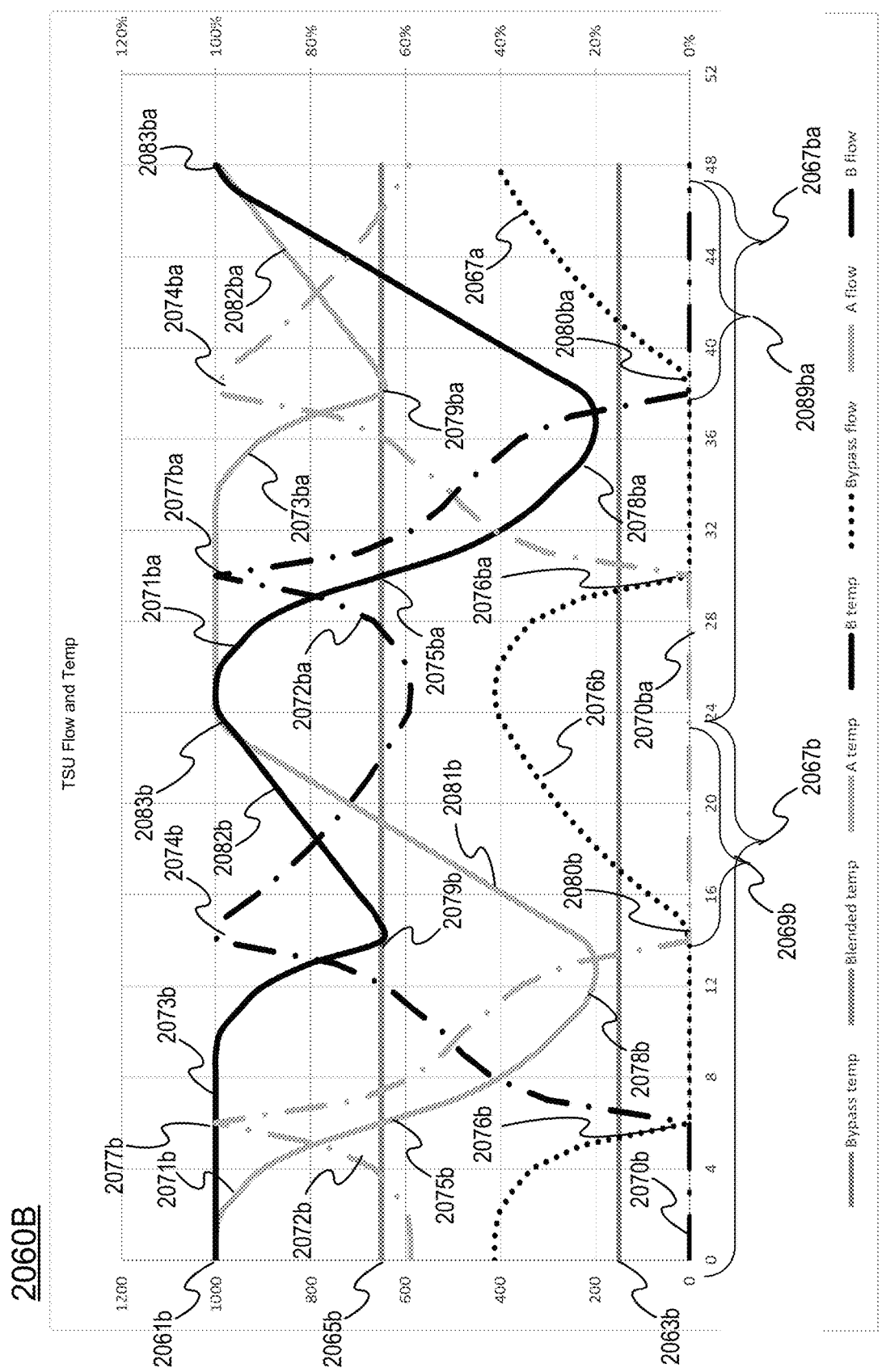

FIG. 26 provides a detailed illustration of the temperature and gas flow according to the lead-lag implementation. The common features with FIG. 24 are indicated with common reference numerals in chart 2060B, including a peak temperature 2061*b*, a bypass temperature 2063*b* and a delivery temperature 2065*b*. Further, a 24-hour period 2067*b* and a solar day 2069*b* are shown along the horizontal axis. Air flow is also indicated along the right side of FIG. 26. While the description accompanying FIG. 26 refers to hot air flow, it can also be generalized to refer to fluid flow.

At the left side of chart 2060B, the beginning of the timing shown is associated with an end of the solar day. At this point the first stack and the second stack are both at the peak temperature, in this case 1000° C. At 2071*b*, the first stack is discharging hot air at 1000° C., while the second stack is not discharging hot air as indicated at 2070*b*, with an air flow of 0%. As explained above, the discharge temperature may vary between 800° C. to 1600° C., depending on various factors. The temperature of the bricks approaches the temperature of the conduit, usually within 25° C. to 50° C. For example, the conduits may be heated within a range of 800° C. to 1600° C., and more specifically, 900° C. to 1300° C., and even more specifically, 800° C. to 1100° C. Other factors that may impact the temperature include temperature impact on heater life, storage capacity, heating patterns, weather conditions, temperature, and heater materials. For example, a ceramic heater may have an upper conduit temperature range as high as 1500° C. to 1600° C., whereas other heaters may have a conduit temperature range of 600° C. to 700° C. The range of conduit temperatures may be varied vertically within the stack by varying the brick materials. Both of the stacks contain very hot air at the end of the solar day; the bypass unit is flowing in air at the inlet air temperature as the deep-discharge temperature 2063*b*.

As the flow of the first stack increases from about 60% to 100%, e.g., 60% to 100%, of the total airflow as indicated by 2072*b*, the discharge temperature of the first stack starts to decrease at 2073*b*. As the discharge temperature of the first stack starts to decrease, the bypass flow is also decreased downward from about 40%, e.g., 40%, of the total air flow.

When the discharge temperature at the first stack falls below delivery temperature 2065*b*, as depicted at 2075*b*, the flow of the first stack is now 100% of the total airflow as indicated by 2077*b*, and the flow of the bypass and the second stack are both 0%, as indicated by 2076*b*. At this point, in order to maintain the delivery temperature of the blended air at 2065*b*, air flow is turned on to the second stack at 2076*b*.

As the air flow at the second stack increases and the air flow at the first stack decreases, the first stack continues to cool, but the rate of cooling slows as the flow through the second stack is reduced, as shown at 2078*b*. Conversely, as the air flow at the second stack increases, the second stack begins to cool, and as the air flow of the second stack approaches 100% of the total air flow at 2074*b*, the discharge temperature at the second stack starts to rapidly decrease until it reaches the constant delivery temperature as shown in 2079*b*. At this point, the air flow of the first stack is 0% as shown at 2080*b*.

Once the discharge temperature of the second stack reaches the minimum temperature at which the constant delivery temperature 2065B can be maintained (as indicated by 2079*b*), the airflow through the second stack is decreased, and the discharge temperature of the second stack correspondingly rises at 2082*b*. At the same time, because this is occurring during the late solar day, the bypass flow is used to prevent overheating at 2076*b*'. Further, because there is no flow through the first stack, the discharge temperature of the first stack increases rapidly as the first stack charges, as indicated by 2081*b*. At 2083*b*, the first stack and the second stack have discharge temperatures equal to or approaching peak temperature 2061*b*.

At 2083*b*, the 24-hour cycle is now complete. The first and second stacks now switch roles, such that the second stack will "lead" and undergo deep cooling, and the first stack will "lag" and act as the second stack did in the first 24-hour cycle. The bypass will continue to operate in a similar manner. A second 24-hour period 2067*ba* and a solar day 2069*ba* are indicated along the horizontal axis.

At the end of the first 24-hour period cycle 2067*b* and the start of the second 24-hour period cycle 2067*ba* (i.e., at 2087*ba*), the timing is associated with an end of the solar day. At this point the second stack and the first stack are at the peak temperature, in this case 1000° C. As shown at 2071*ba*, the second stack is discharging hot air at 1000° C., while the first stack is not discharging hot air as indicated at 2070*ba*, with an air flow of 0%. As before, the bypass unit is flowing in air at the inlet air temperature (deep-discharge temperature 2063*b*).

As the flow of the second stack increases from about 60% to 100%, or 60% to 100%, of the total airflow as indicated by 2072*ba*, the discharge temperature of the second stack starts to decrease at 2073*ba*. As the discharge temperature of the second stack starts to decrease, the bypass flow is also decreased downward from about 40%, or 40%, of the total air flow.

When the discharge temperature at the second stack falls below the constant delivery temperature 2065*b*, as depicted at 2075*ba*, the flow of the second stack is 100% of the total airflow as depicted at 2077*ba*, and the flow of the bypass and the first stack are both 0%, as depicted by 2076*ba*. At this point, in order to maintain the constant delivery temperature of the blended air at 2065*b*, air flow is turned on to the first stack at 2076*ba*.

As the air flow at the first stack increases and the air flow at the second stack decreases, the second stack continues to cool, but the rate of cooling slows as the flow through the first stack is reduced, as shown at 2078*ba*. Conversely, as the air flow at the first stack increases, the first stack begins to cool, and as the airflow of the first stack approaches 100% of the total airflow at 2074*ba*, the discharge temperature at the first stack starts to rapidly decrease until it reaches the constant delivery temperature as shown in 2079*ba*. At this point, the air flow of the second stack is 0% as shown at 2080*ba*.

Once the discharge temperature of the first stack reaches the minimum temperature at which delivery temperature 2065*b* can be maintained (i.e., at 2079*ba*), the air flow through the first stack is decreased, and the discharge temperature of the first stack correspondingly rises at 2082*ba*. At the same time, because this is occurring during the late solar day, the bypass flow is used to prevent overheating at 2076*ba*. Further, because there is no flow through the second stack, the discharge temperature of the second stack increases rapidly as the second stack charges, as indicated by 2081*ba*. At 2083*ba*, the second stack and the first stack have discharge temperatures equal to or approaching peak temperature 2061*b*.

Structures such as valves, blowers, louvers and other mechanisms needed to accomplish the above-described operations are operated in response to commands received from the control system. The control system is configured to generate the instructions based on a variety of information, including a combination of sensed information, forecast information, and historical information, as well as models developed based on, for example, artificial intelligence. For example, sensors may be provided to ensure that the system is safe, in combination with a physical model of how the system performs with different inputs in energy—this model may thus serve as a substitute for some sensors in various embodiments. In some cases, sensors may be expensive and may wear out or need replacement, and could cause additional problems. For example, a defective sensor may lead to system overheating. The model may take temperature inputs, and may allow for predictions based on parameters such as sunrise and weather. The model may be adjusted based on the industrial application for a variety of reasons, such as to optimize output temperature, energy output, or a combination thereof.

As has been described with reference to 2060B, the control system is configured to direct fluid flows (e.g., a first flow associated with the first stack, a second flow associated with the second stack, and a bypass flow that bypasses the first and second stacks) in order to deeply discharge the first stack but not the second stack during first discharge period 2069*bd*1 and to deeply discharge the second stack but not first stack during second discharge period 2069*bd*2. The operations of the first and second discharge periods may be performed repeatedly in successive discharge periods, alternating between the operations of 2069*bd*1 and 2069*bd*2. In the first discharge period, the second stack is discharged to a lesser degree than the first stack—to the current value of the specified temperature profile. Similarly, in the second discharge period, the first stack is also discharged to a lesser degree than the second stack—to the current value of the specified temperature profile. The specified temperature profile 2065*b* shown in FIG. 26 is a constant temperature profile, but such temperature profiles may vary, as will be described with respect to FIG. 29.

It is understood that these temperature and flow illustrations are just examples, and the actual values and shapes of curves may vary. As one simple example, the peak temperature may be reduced during summer. Some examples of variations are provided as follows.

Figure 27:
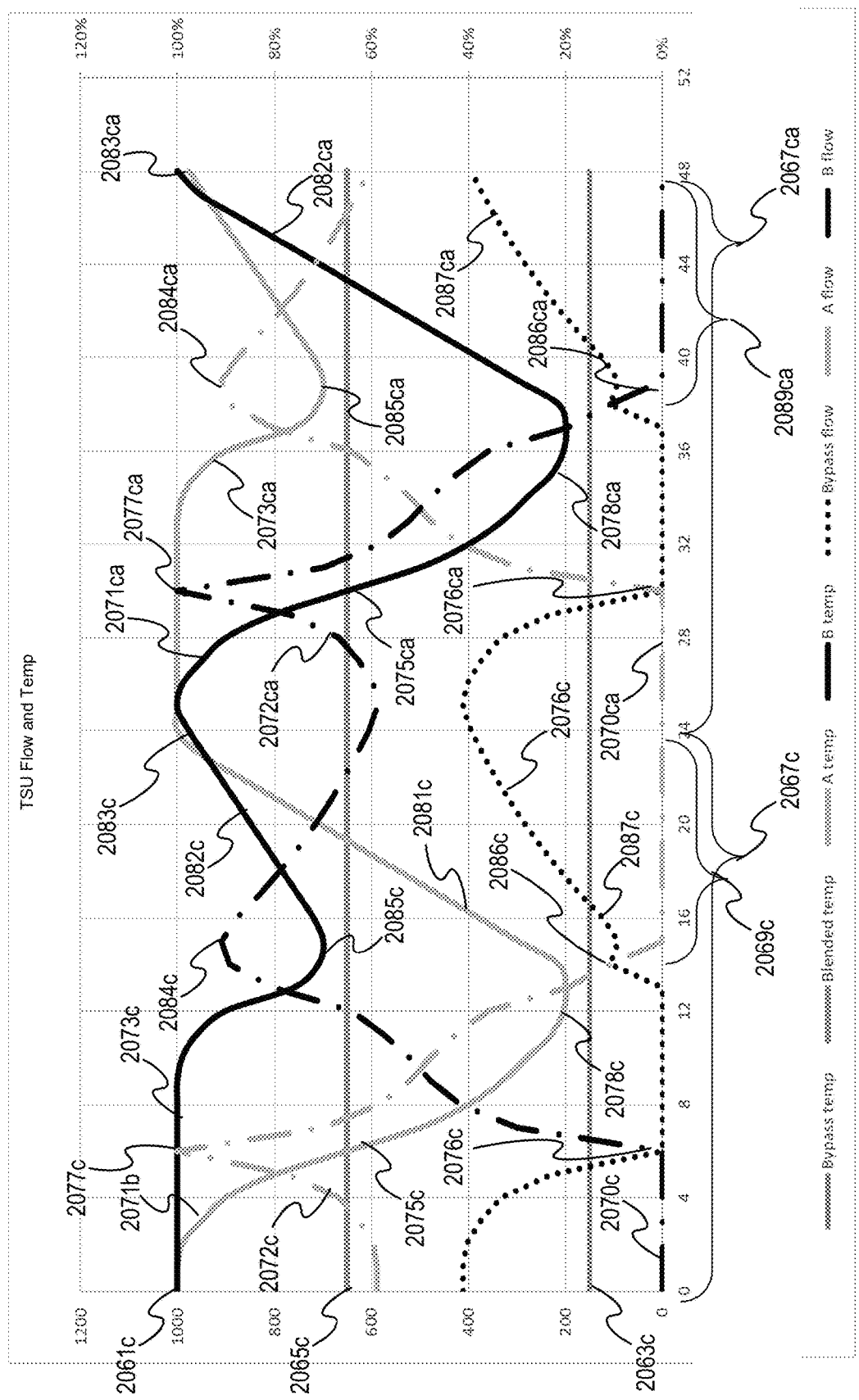

FIG. 27 provides a detailed illustration 2060C of a temperature and fluid flow according to the lead-lag implementation, accounting for incomplete discharge of the second stack, in order to have a buffer between the constant output temperature and the discharge temperature of the second stack at its lowest point in the cycle. The ability of the system to discharge the second stack to the constant output temperature depends on variables such as weather forecast, season, length of solar day. The practice of incomplete discharge thus avoids the undesirable discharge to below the constant output temperature. Features common to FIGS. 24-33 are given similar reference numerals.

Instead of having the temperature of the second stack fall precisely to output temperature 2065*c*, the temperature may fall to a buffered amount 2085*c* that is slightly higher than the constant output temperature 2065*c*. In other words, the second stack does not completely discharge, but only partially discharges. On the other hand, the first stack continues to have the same temperature and air flow pattern as in FIG. 26 as explained above.

The partial discharge may be accomplished by adjusting the flow 2084*c* of the second stack, so that it is less than 100% of the total flow, for example approximately 90%, e.g., 90%, of the total flow. To compensate for the 10% of the total flow, the bypass is opened when the desired second stack discharge (buffer) temperature 2085*c* is reached, as shown at 2086*c*. At 2087*c*, the bypass and the second stack air flow essentially follow the air flow as shown above in FIG. 26. The value of 10% is just an example, and may be varied depending on the discharge temperature, return air temperature, target heat content or target temperature of the output, the flow percentage through each stack, as well as the temperature of the stacks.

Similarly, during a second 24-hour cycle, the temperature of the first stack fall may fall to an amount 2085*c* that is slightly higher than constant output temperature 2065*c*.

Thus, the first stack only partially discharges. The second stack has the same temperature and air flow pattern as described in FIG. 26.

As with the first 24-hour period, the partial discharge may be accomplished by adjusting the flow 2084ca of the first stack, so that it is less than 100% of the total flow, for example approximately 90%, e.g., 90%, of the total flow. To compensate for the 10% of the total flow, the bypass is opened when the desired first stack discharge temperature 2085ca is reached, as shown at 2086ca. As explained above, the value of 10% is just an example, and may be varied depending on the discharge temperature, return air temperature, target heat content or target temperature of the output, the flow percentage through each stack, as well as the temperature of the stacks.

Accordingly, 2060C illustrates that the control system is configured maintain an output fluid flow at a specified constant temperature profile (2065c), while, in successive discharge periods 2069cd1 and 2069cd2, alternating between 1) deeply discharging the first stack while discharging the second stack to a first buffer temperature (2085c) above the specified temperature profile, and 2) deeply discharging the second stack while discharging the first stack to a second buffer temperature (2085ca) above the specified temperature profile.

Figure 28:
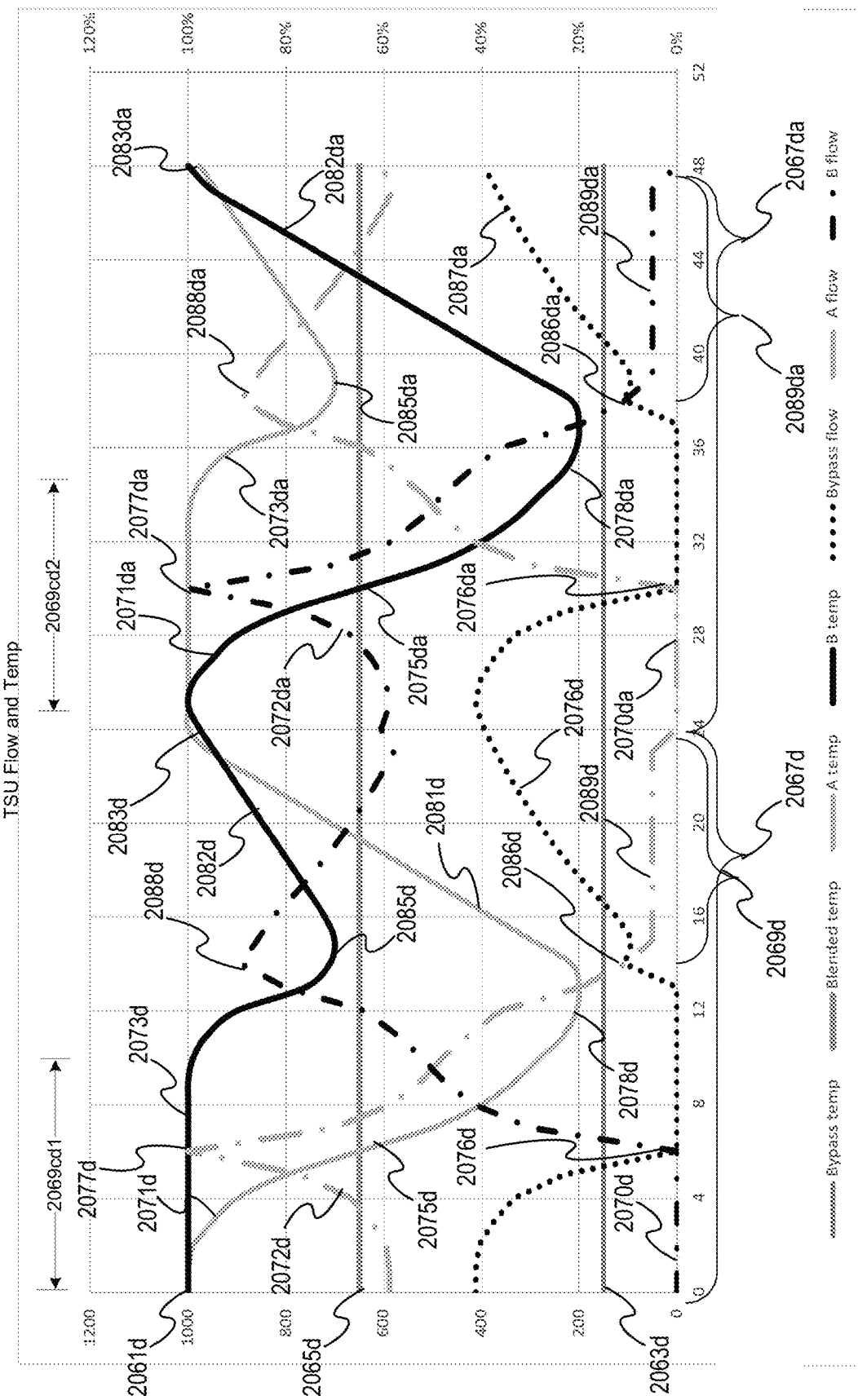

FIG. 28 provides a detailed illustration 2060D of a temperature and fluid flow according to the lead-lag implementation, accounting for charging of the low-flow lag stack, in which air continues to be trickled through the first stack as it increases its discharge temperature. The trickle may account for the possibility that the units are not sealed in such a manner that would permit 0% flow, and that the louvers permit a residual flow, such as 5% or the like. While the value of 5% is provided, it is noted that louvers generally cannot be closed 100%, but can approach being ~99%. The reason for this is because of thermal expansion tolerances, differences between materials in the louvers and bricks, and the like. The residual flow may approach 5%, and may vary during the period, as shown in FIG. 28. The louver is less open at beginning of charge to prevent entry of cooler air. As the charge progresses, the residual flow is increased, as warmer air has a less negative impact due to the entry of the cooler air. Over time, the residual flow may be increased to 5%, or even 10%. The upper bound may be defined based on when trickle flow becomes prohibitively large such that hot spot gets hotter, as an example. Features common to previous FIGS. 24-33 are given similar reference numerals.

As with the operation described in FIG. 27, the second stack undergoes partial discharge. But at the point at which the air flow of the second stack reaches a maximum, here about 90% as shown at 2088d, the air flow of the first stack is not completely shut off, but is instead kept at a very low rate or a trickle, such as about 5% or less (or in some cases, 10% or less), as shown at 2089d (thus operating in a "trickle mode"). To compensate for the flow at the first stack, the flow at the second stack is decreased, as can be seen in the drawings. The trickle in the first stack prevents hot spots, because due to the buoyancy of the air, the hot spots will take more flow to be cooled at low flow. As a result, the possibility of thermal runaway may be avoided or reduced.

Similarly, in the second 24-hour period, at the point at which the air flow of the first stack reaches a maximum, here about 90%, e.g., 90%, as shown at 2088da, the airflow of the second stack is not completely shut off, but is instead kept at a very low rate or a trickle, such as about 5% or less (for example, 5%), as shown at 2089da. To compensate for the flow at the second stack, the flow at the first stack is decreased, as can be seen in the drawings. Again, this mode may prevent or reduce the possibility of thermal runaway.

Accordingly, 2060D illustrates that the control system is configured to maintain a temperature 2065d of the output fluid flow according to a specified temperature profile (here, constant). This is accomplished by alternating, in successive discharge periods (2069dd1, 2069dd2), between 1) deeply discharging the first stack while discharging the second stack to a first buffer temperature (2085d) that is above the specified temperature, and 2) deeply discharging the second stack while discharging the first stack to a first buffer temperature (2085da) that is above the specified temperature. Furthermore, during discharge period 2069dd1, fluid flow is maintained to the first stack in a trickle mode, while during discharge period 2069dd2, fluid flow is maintained to the second stack in the trickle mode.

Figure 29:
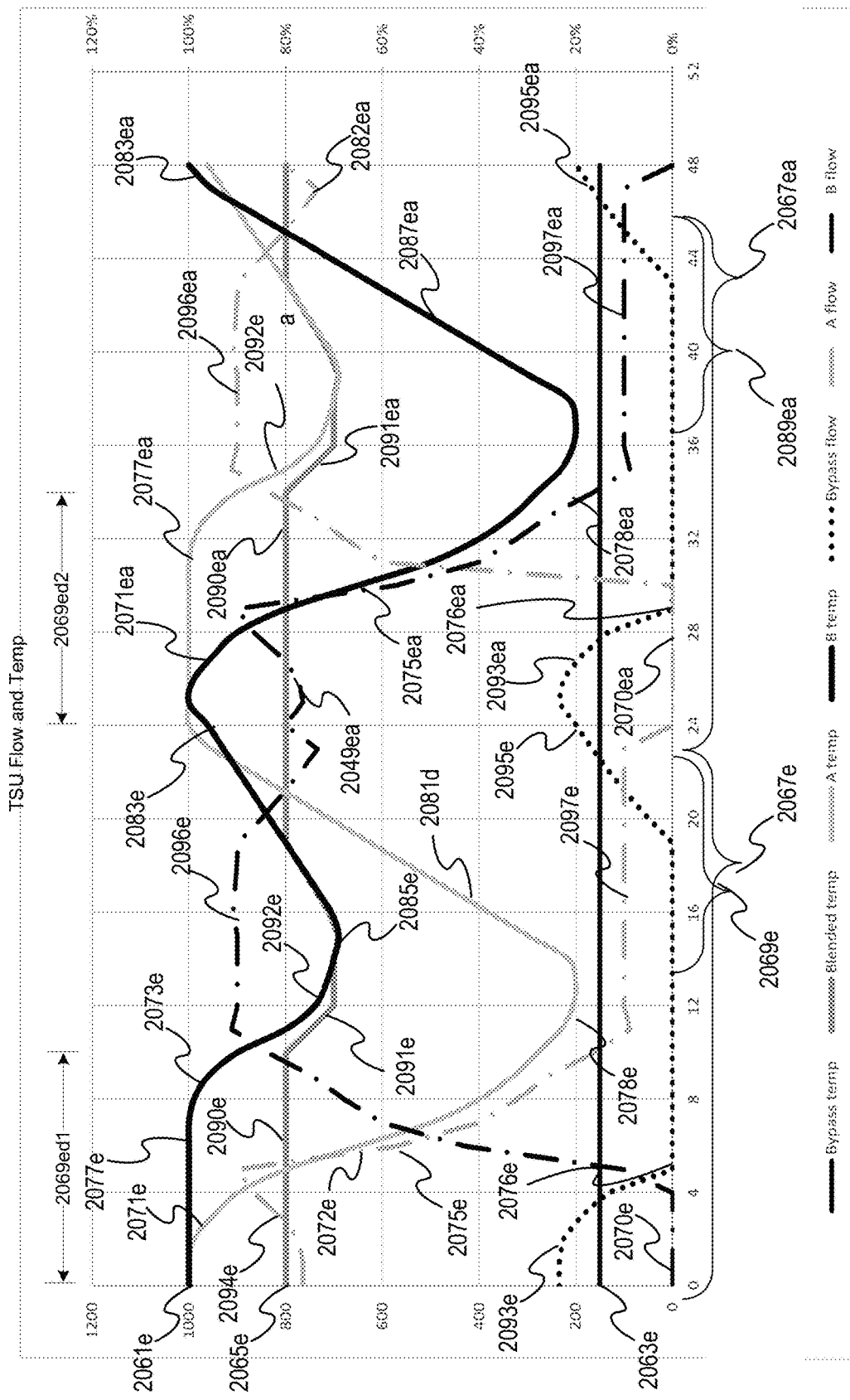

FIG. 29 provides a detailed illustration of a temperature and fluid flow according to the lead-lag implementation, accounting for variations in the delivery temperature to reduce parasitic drag. Again, features common to FIGS. 24-33 are given similar reference numerals.

As can be seen in the drawings, the output temperature may vary within an acceptable range or the industrial application. (In some cases, a "specified temperature profile" may be a constant temperature, but as shown in FIG. 29, the specified temperature profile is non-constant.) In this example, the initial constant temperature is 800° C. at 2090e. But the temperature is later varied to a lower temperature such as 700° C. at 2091e, by adjusting the flow as explained below.

As shown, in the first 24-hour cycle (2067e), instead of having the flow through the first stack be 100% of the total flow as in FIGS. 24-33, the flow peaks at about 90%, e.g., 90%, of the total flow as indicated by 2094E. Further, because the operating temperature is set at 800° C., the necessity of bypass air is reduced from the start as shown at 2093e (e.g., bypass air flow begins at approximately 20%, e.g., 20%, in FIG. 29 as compared to approximately 40%, e.g., 40%, in FIG. 28). Additionally, instead of having the flow in the first stack begin from 60% and increase to 100%, the flow here begins from about 75%, e.g., 75%, and increases to about 90%, e.g., 90%. To accommodate for the additional 10% of flow, additional air begins flowing through the second stack earlier than in previous examples. This, in turn, causes the second stack's discharge temperature to cool slightly earlier than previously described.

As noted above, the flow through the first stack is maintained at about 10%, e.g., 10%, during the charging phase of the first stack, as indicated by 2097e. When the output temperature is varied to about 700° C., e.g., 700° C., at 2091e, the discharge temperature of the second stack also approaches about 700° C., e.g., 700° C., at 2092e. Because the air flow of the first stack and the second stack are maintained at a relatively constant proportion during the charging phase (as indicated by 2096e and 2097e, respectively), the discharge temperatures of the first and second stack behave in a similar manner as in the above examples. During the latter part of the solar day, the bypass flow is increased at 2095e in order to cool the unit; the flow of the first and second stacks both decrease correspondingly.

In the second 24-hour cycle (2067ea), the constant temperature of 800° C. is also varied to 700° C. by adjusting the flow, as indicated by 2090ea and 2091ea. Again, instead of having the flow through the second stack be 100% of the total flow as in the above-described examples, the flow is instead only increased to about 90% of the total flow as indicated by 2094ea. Further, because the operating temperature is set at 800° C., the necessity of bypass air begins at a lower amount than in previous examples. Similarly, instead of having the flow in the second stack start from 60% and increase upward to 100%, the flow extends from about 75% to about 90%. To accommodate for the additional 10% of flow, additional air begins flowing through the first stack earlier than in previous examples. The first stack's discharge temperature thus cools slightly earlier than previously described.

As noted above, the flow through the second stack is maintained at about 10%, e.g., 10%, during the charging phase of the second stack, as indicated by 2097ea. When the output temperature is varied to about 700° C., e.g., 700° C., at 2091ea, the discharge temperature of the first stack also approaches about 700° C., e.g., 700° C., at 2092ea. Because the air flow of the second stack and the first stack are maintained at a relatively constant proportions (as indicated by 2096ea and 2097ea, respectively) the discharge temperatures of the first and second stack behave in a similar manner as in the above examples. During the latter part of the solar day, the bypass flow is increased at 2095ea in order to cool the unit; the flow of the first and second stacks both decrease correspondingly.

Accordingly, 2060E illustrates that different sets of flow parameters may be used during a discharge period to change a temperature of an output fluid flow having a non-constant temperature profile. Furthermore, the output fluid flow temperature may be maintained during a charging phase by keeping the fluid flows of the first and second stack at a relatively constant proportion.

To recap, deep discharging is the discharging of a thermal storage stack to a sufficient degree to reduce local temperature nonuniformities within the stack, and thus reduce, mitigate, or eliminate thermal runaway within the stack (and thus extends its life). In some cases, a period of deep discharging may result in a stack being discharged all the way to some temperature floor—namely, the temperature of the bypass fluid flow (the "bypass temperature"). As has been noted, the bypass flow is a flow of cooler fluid within the thermal storage structure—it may be based, for example, on a fluid flow that enters the thermal storage structure via an inlet valve. Accordingly, deep discharging may in some cases cause a stack to be discharged all the way to the bypass temperature or to a temperature approximately equal to the bypass temperature (say, within 10% of the bypass temperature).

But as noted above relative to FIG. 24, factors such as the peak temperature and delivery temperature affect the amount that a particular stack may be cooled within a discharge period. Further, it may be the case that any of a range of temperatures for a particular use case may effectuate deep discharge—e.g., deep-discharge temperature region 2063r. FIG-I-F is a block diagram 2098c1 that illustrates a range of temperatures that can be used to define different deep-discharge temperature regions for different situations.

As shown, the range of temperature has an upper bound of delivery temperature 2065u (here 600° C.), a lower bound of bypass temperature 2063lo (200° C.), and a midpoint temperature 2098m (400° C.), which is the midpoint between the delivery temperature and the bypass temperature. Another temperature reference is shown, 2098mm (300°), which represents a midpoint between the midpoint temperature and the bypass temperature, and thus may be referred to as a quartile temperature. Nine possible temperatures are shown: 500° C. (2098t1), 450° C. (2098t2), 360° C. (2098t3), 325° C. (2098t4), 275° C. (2098t5), 245° C. (2098t6), 215° C. (2098t7), 204° C. (2098t8), and 200° (2098t9).

Typically, the deep-discharge temperature region's upper bound will be below the delivery temperature. In the case in which the upper bound were at, say 550° C., all 9 temperatures 2098t1-9 would be within the deep-discharge temperature region. Alternately, if the deep-discharge temperature region's upper bound were defined to be substantially below the delivery temperature, this might exclude just temperature 2098t1 from the deep-discharge temperature region. Substantially below means at least 20% below, and in other cases could be defined to be 25%, below 30% below, 35%, 40%, 45%, and so on. Temperature 2098t2 is thus 25% below delivery temperature and could be included in the deep-discharge temperature region depending on how the range is defined relative to the delivery temperature. Note that the lower bound of the deep-discharge region can be set to the bypass temperature or some higher temperature as desired.

Another way of defining the deep-discharge temperature region is that the upper end of the deep-discharge temperature region is closer to the bypass temperature than to the delivery temperature, and the lower end of the deep-discharge temperature region is the bypass temperature. Referring to chart 2098c1, this would mean that the upper bound would be at midpoint temperature 2098m (400° C.) (and for purposes of this example, the upper bound could include midpoint temperature 2098m). This definition of the deep-discharge temperature region would include temperatures 2098t3-2098t9, and exclude temperatures 2098t1-2098t2.

Still another way of defining the deep-discharge temperature region is that the upper end of the deep-discharge temperature region is closer to the bypass temperature than to the midpoint temperature, and the lower end of the deep-discharge temperature region is the bypass temperature. Referring to chart 2098c1, this would mean that the upper bound would be at quartile temperature 2098mm (300° C.) (and for purposes of this example, the upper bound could include quartile temperature 2098mm). This definition would include temperatures 2098t5-2098t9, and exclude temperatures 2098t1-2098t4.

Still further, an upper bound of the deep-discharge temperature region could be defined as those temperatures that are approximately equal to the bypass temperature. Thus, with "approximately equal" meaning within 10% of the bypass temperature, this would include temperatures between 200 and 220° C., encompassing 2098t7-2098t9.

Figure 33:
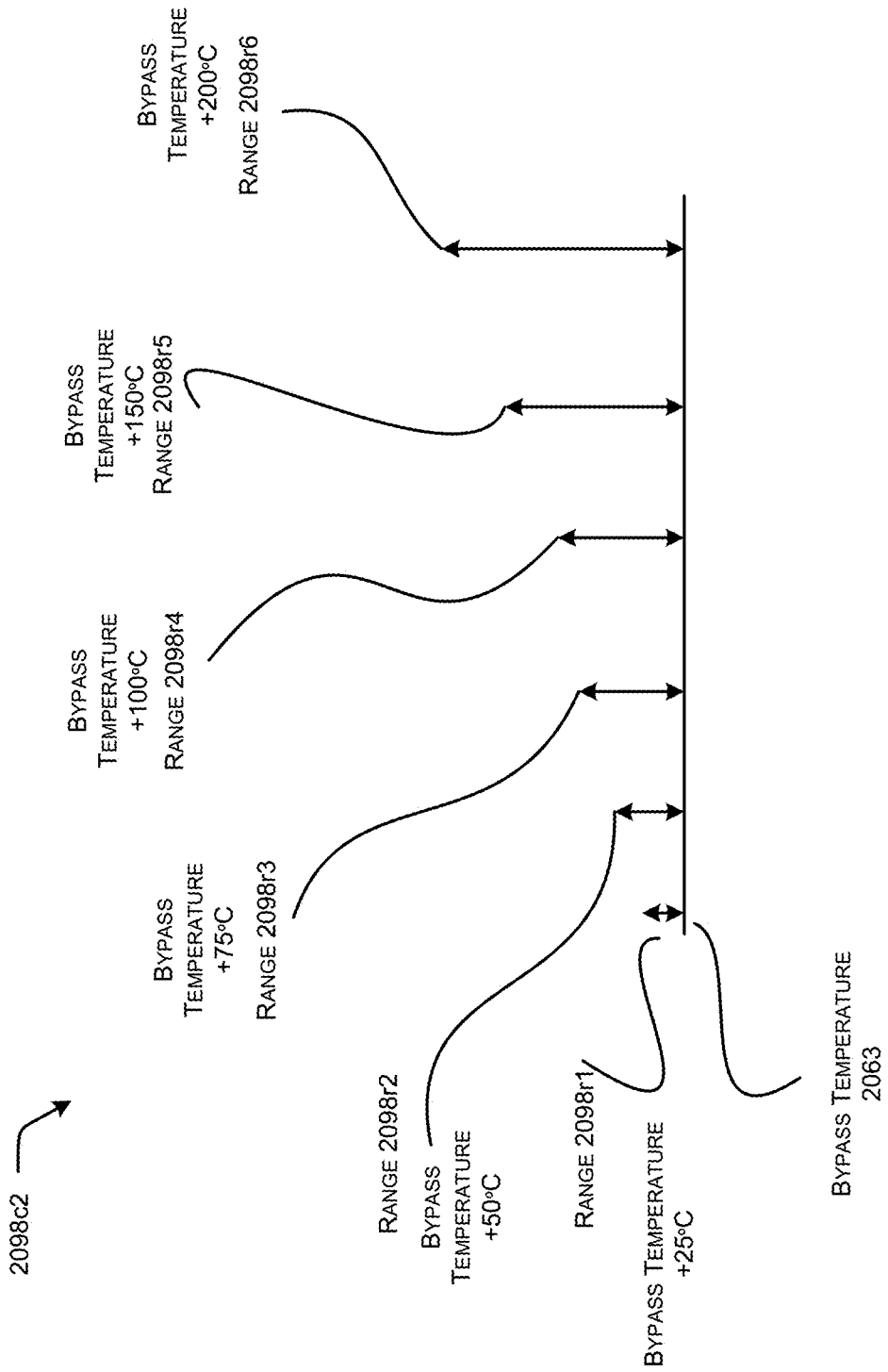
FIG. 33 is a table illustrating an example in which each of N storage arrays is deep-discharged multiple times and partially discharged once during every N discharge periods.

Yet another way of defining the deep-discharge temperature region is to define an absolute temperature range measured up from the bypass temperature. Several ranges of this sort are shown in FIG. 33. Range 2098r1 encompasses the bypass temperature 2063 up to temperatures 25° C. warmer. Thus, if the bypass temperature were 200° C., range 2098r1 would include 200° C., 225° C., and all temperatures in between. Similarly, range 2098r2 encompasses temperatures up to 50° C. warmer than the bypass temperature. Ranges 2098r3-r6 encompass temperatures up to 75° C., 100° C., 150° C., and 200° C. above the bypass temperature.

In a similar manner, although not shown, the upper bound of the deep-discharge temperature may also be defined by establishing a temperature distance measured down from the delivery temperature. For example, a first range might have an upper bound of the delivery temperature minus 100° C. and a lower bound of the bypass temperature. A second such range might have an upper bound of the delivery temperature minus 125° C. and a lower bound of the bypass temperature. A third such range might have an upper bound of the delivery temperature minus 150° C. and a lower bound of the bypass temperature. A fourth such range might have an upper bound of the delivery temperature minus 175° C. and a lower bound of the bypass temperature. A fifth such range might have an upper bound of the delivery temperature minus 200° C. and a lower bound of the bypass temperature. Other ranges are possible, such as a sixth range in which the upper bound of the deep-discharge temperature region is the 300° C. below the delivery temperature.

FIGS. 24 through 33 have described implementations in which each of two thermal storage arrays are deeply discharged every other discharge period. But this disclosure is not limited to the two-thermal-storage-array implementation. First of all, deep discharging may be performed when only a single thermal storage array is used. In such a configuration, the outlet temperature of the single thermal storage array is allowed to drop to a deep-discharge temperature region on a periodic basis or on an as-needed basis. In configurations with three or more groups, deep discharging may be performed less frequently.

The preceding Figures have described implementations in which each of two thermal storage arrays are deeply discharged every other discharge period. But this disclosure is not limited to the two-thermal-storage-array implementation. First of all, deep discharging may be performed when only a single thermal storage array is used. In such a configuration, the outlet temperature of the single thermal storage array is allowed to drop to a deep-discharge temperature region periodically—either at regular intervals or on an as-needed basis. In configurations with three or more groups, deep discharging may be performed less frequently.

Figure 30:
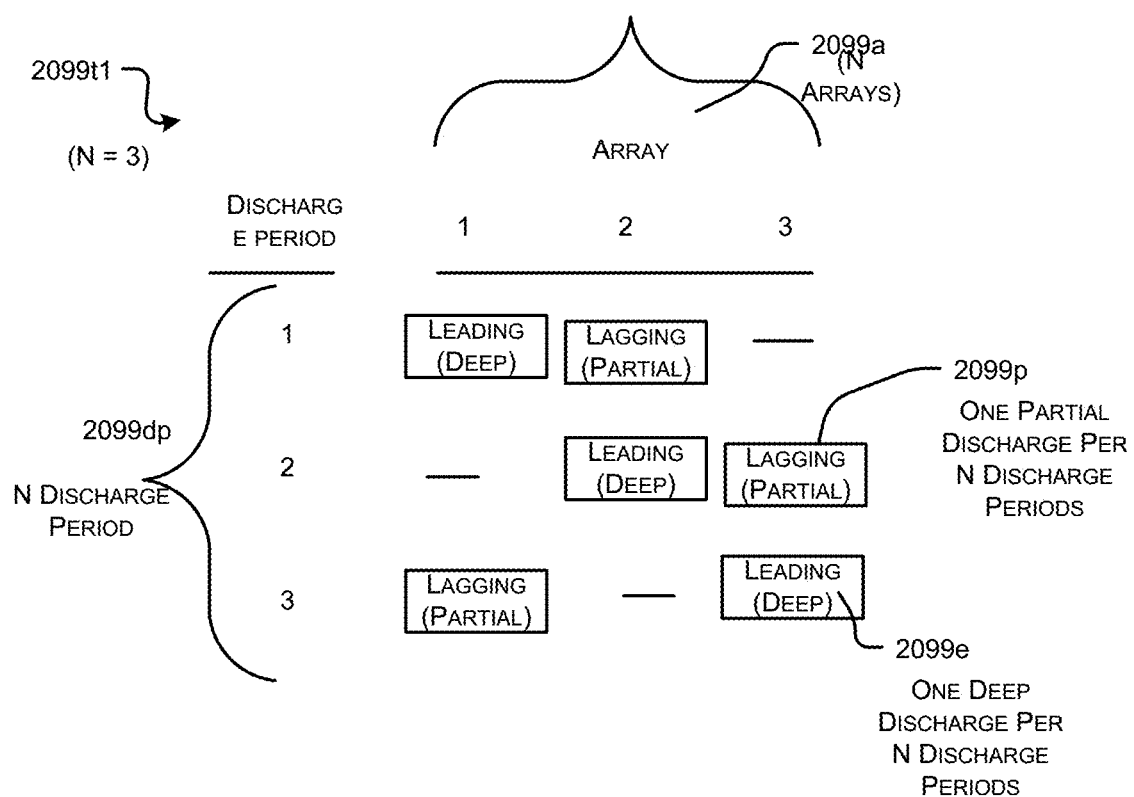
FIG. 30 is a block diagram illustrating definition of a deep-discharge temperature based its relative closeness to two reference temperatures.
Figure 31:
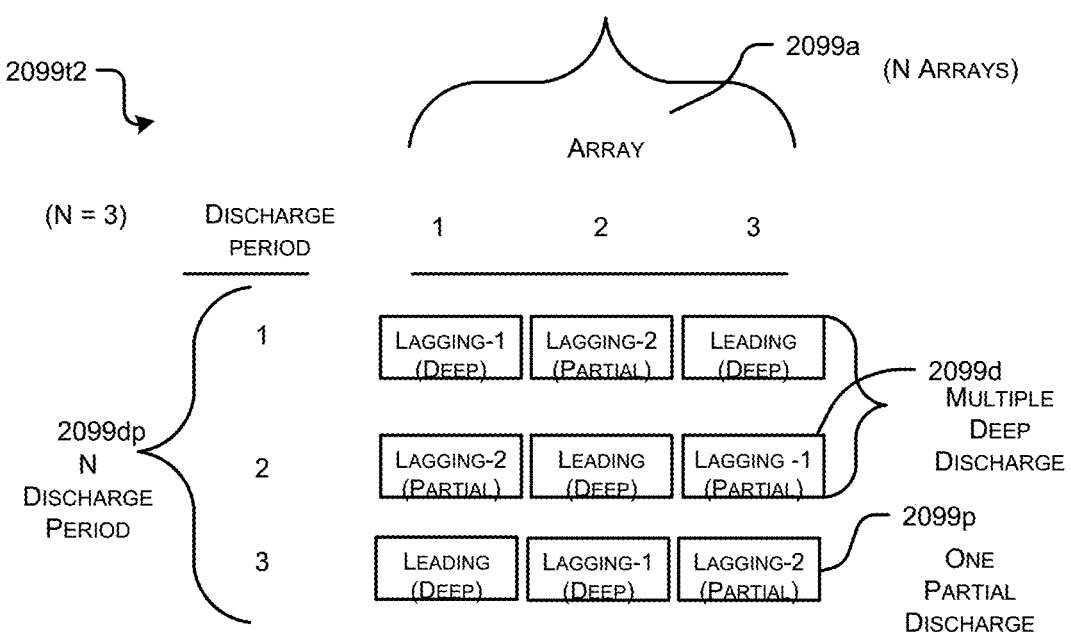
FIG. 31 is a block diagram illustrating definition of a deep-discharge temperature based on a difference from the bypass temperature.
Figure 32:
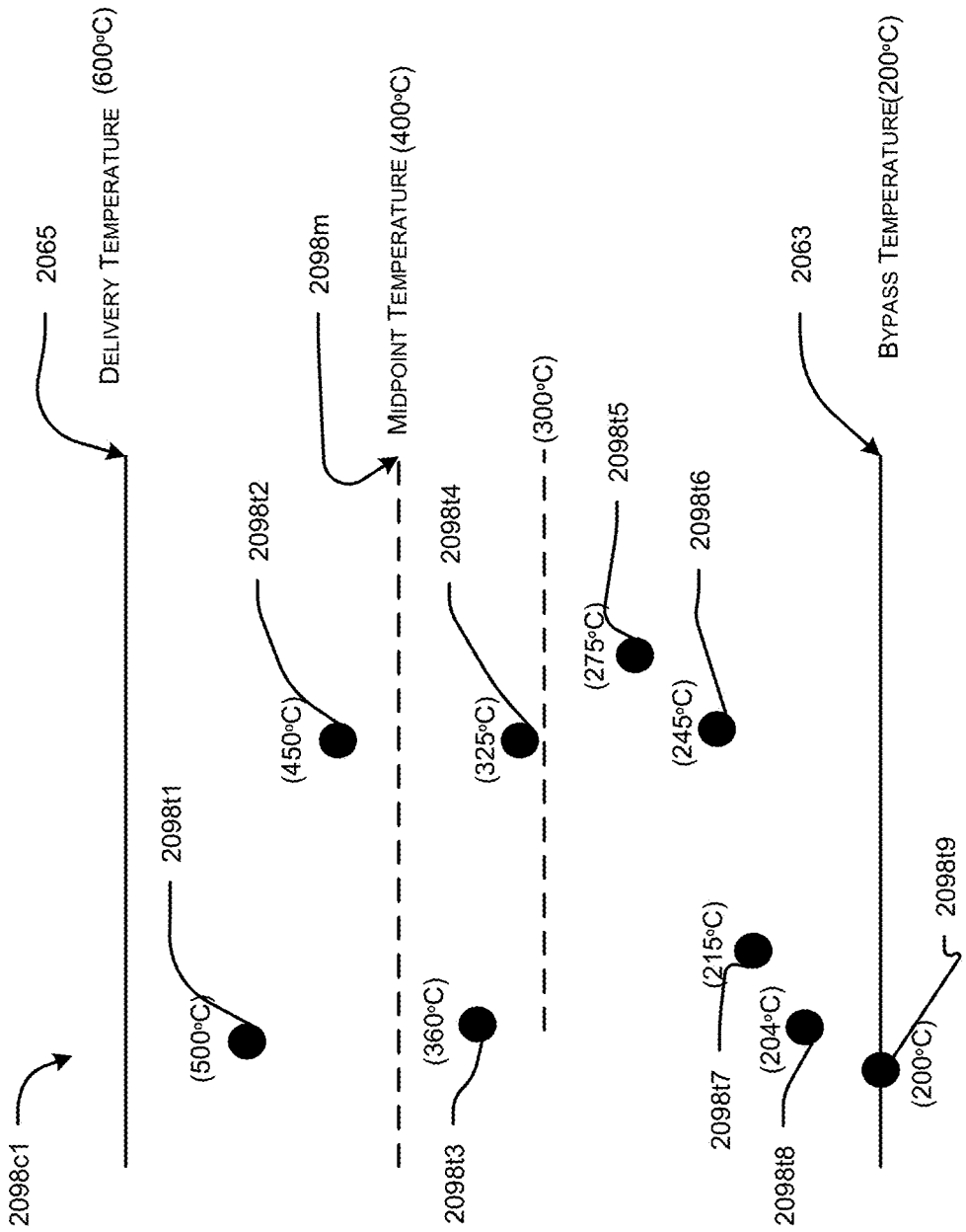
FIG. 32 is a table illustrating an example in which each of N storage arrays (N=3) is deep-discharged once during every N discharge periods.

FIG. 30 is a block diagram illustrating definition of a deep-discharge temperature based its relative closeness to two reference temperatures. FIG. 31 is a block diagram illustrating definition of a deep-discharge temperature based on a difference from the bypass temperature. FIG. 32 is a table illustrating an example in which each of N storage arrays (N=3) is deep-discharged once during every N discharge periods. FIG. 33 is a table illustrating an example in which each of N storage arrays is deep-discharged multiple times and partially discharged once during every N discharge periods.

Consider a configuration with N storage arrays. FIG. 30 illustrates an example 2099t1 in which each of the N thermal storage arrays 2099a is deep-discharged once during every N discharge periods (2099dp). As shown, N=3 and the three arrays are referred to arrays 1, 2, and 3. In discharge period 1, array 1 acts in a leading mode and array 2 acts in a lagging mode. Accordingly, array 1 is deeply discharged and array 2 is partially discharged. In a discharge period 2, array 2 acts in a leading mode (and thus is deeply discharged) and array 3 act sin a lagging mode (and is thus partially discharged) (2099p). Finally, in discharge period 3, array 3 acts in leading mode (deeply discharged) and array 1 acts in a lagging mode (partially discharged). Thus, two of the three stacks may discharge on a given day, while the other stack does not deep discharge on that day. However, this arrangement may be varied.

Thus, in one generalization of a thermal energy storage system with some number N thermal storage assemblages, one possible implementation is that each of the N assemblages (2099a) is deeply discharged once (2099e) every N discharge periods (2099dp).

Consider another embodiment illustrated by table 2099t2, in which N=3 and again involves arrays 1, 2, and 3 (2099a). At the end of a period of VRE availability (e.g. The end of daytime for solar-charged systems), arrays 1 and 2 may complete the day fully charged; full heat is applied, properly by zone, without significant gas flowing through their conduits. Array 3, however, is operated in a discharging mode with high gas flow in its conduits during charging.

Suppose that after charging stops, discharge period 1 begins, and array 3 begins to discharge to provide output fluid flow. During the discharge period, lower-temperature discharge fluid from array 3 is mixed with higher-temperature fluid of array 1 to deliver the output fluid flow. Array 3 deeply discharges by cooling to a temperature that is close to the return gas temperature. Then, when the discharge fluid temperature of array 1 begins to decrease, significant flow through array 3 is terminated, and flow through array 2 is initiated. Mixing of lower-temperature fluid from array 1 with higher-temperature fluid from array 2 also allows array 1 to deeply discharge. In this example, near the end of the discharge period, flow from array 1 is terminated, leaving only array 2 in operation. Thus, array 3 and array 1 both deeply discharge during discharge period 1, with array 2 partially discharging.

During the next cycle of discharging and charging, the operation of the arrays is rotated—thus, during discharge period 2, array 2 discharges first, followed by array 3, and then array 1. Arrays 2 and 3, but not array 1, are deeply discharged as a result. Similarly, during discharge period 3, array 1 discharges first, its high-temperature energy being mixed with other array discharges. As array 1 reaches its minimum usable outlet temperature, array 2 begins to add higher-temperature gas, until by the end of the discharge period, arrays 1 and 2 are deeply discharged and array 3 has a temperature profile similar to conduit 2010 at point in time 2051 in FIG. 23. This approach allows each thermal storage array to be deeply discharged two out of every three charging cycles.

The above-described processes have various advantages. For example, in the two-array implementation for a solar use case, each stack is deeply discharged every other day by flow control of the two stacks and a bypass; accordingly, variations in temperature that would otherwise arise from non-uniform heating or cooling in the stack and cause thermal runaway problems are avoided. Deeply discharging a stack causes it to thermally reset such that any nonuniformities that would otherwise cause thermal runaway are avoided or reduced. Further, parasitic drag may be avoided by use of a blended output temperature.

While the foregoing aspects are disclosed in the context of a thermal storage array having an internal resistive heating element to provide radiant heat transfer, the present disclosure is not limited to this configuration. For example, the lead-lag approach of having stacks operating in tandem with one stack in the lead mode and the other stack in the lag mode is also applicable in scenarios in which heat is externally delivered by gas.

In various implementations, the control system is configured to provide one or more control signals to control various aspects of the thermal energy storage system, including the louvers, the bypass valve and the fan or blower associated with the circulation of fluid through the thermal storage arrays. Additionally, instead of using a single blower for all thermal storage arrays, separate blowers may be provided for each of the airflows, such as the flow of air to the first stack, the flow of air to the second stack, etc. In such an alternative, the control system would control the blowers instead of controlling louvers. In other implementations, however, a combination of blowers and louvers may be used together to control the flow of air through the first stack, the second stack, and bypass to implement the lead-lag paradigm.

Operations Associated with System

The safe and effective start-up of an OTSG and steam network involves several challenges. All equipment must be brought to operating temperature safely, without discharging sub-temperature fluid, including water, into the system outlet, as such discharges can cause substantial "steam hammer" damage and safety risks. The present innovation addresses these matters to provide a safe, efficient start-up for an OTSG whose heat source is a thermal energy storage unit. FIGS. 35(A)-(B) illustrate an example flow 2200 of startup and shutdown sequences for the thermal energy storage system as described herein. This example flow shows the startup and shutdown of steam generation. While the operations associated with the startup and shutdown sequences are shown in a numerical order, in some cases the order of the operations may be modified, and some operations may overlap or be done concurrently instead of in sequential order.

At 2201, the outlet valve is in a closed position, or is set to a closed position. As explained above, sensors and communication devices associated with the control system may sense the position of the outlet valve, and if the outlet valve is not in the closed position, the control system may send a signal to the outlet valve, such that the outlet valve is transited to the closed position.

At 2203, the blowdown valve is opened. In a manner similar to that explained above with respect to 2201, the blowdown valve may be moved to the open position, if not already in the open position. A blowdown valve allows release of water and/or steam whose temperature or quality is below the temperature and/or quality required, without introducing the requirement of recirculation of fluid within the OTSG system.

At 2205, operation of a water pump is started, and low water flow is established. The conduits of the steam generator are now receiving water in liquid form.

At 2207, the operation of the fan associated with the thermal storage structure is started. For example, the fan may be the blower as explained above. Accordingly, a low hot air flow is established. Heat is thus introduced to the tubes. The previous establishment of water flow within the tubes prevents thermal damage.

At 2209, as the low hot air flows, and the low water flow is established through the steam generator, the water is heated, and steam starts to form from the heated water, as the water changes phase from liquid to gaseous form.

At 2211, as the hot air continues to flow and the heating of the steam generator continues, the pressure of the steam increases, and the vapor fraction or quality of the output steam rises.

At 2213, once the quality of the steam is above a threshold, such as 40%, the outlet of the steam generator opens and the blowdown valve closes. At this point, the steam may be output to the industrial application without the risk of introducing water or sub-quality steam into the application network.

At 2215, as the outlet opens and the steam generator continues to provide steam, the quality and flow of the steam rise to the required level for the industrial application associated with the output. This increase in flow rate may be at a rate chosen so as to allow the rate of change of other steam generators serving the same industrial load to reduce their flow rates proportionally; or at a rate chosen to match the declining steam production rate associated with shutting down a fuel-fired heater; or at another rate.

In some implementations, as steam or heat output from a thermal storage unit begins, a controller reduces the steam or heat output of one or more fuel-fired heaters (boilers, OTSGs, HRSGs, furnaces) which serve the same industrial process load, in such a manner as to maintain an approximately constant total steam supply to the industrial load.

Additionally, with respect to the shutdown sequence, at 2202, the fan transits from the on state to the off state. For example, the air blower may stop its operation.

At 2204, the water pump slows or reduces the flow of liquid water to the conduits of the steam generator.

At 2206, as the flow of heat slows, and the flow of water slows, the quality of steam drops. For example, the quality of steam may drop to a lower quality level, such as 50% or 60%.

At 2208, once the quality of steam has dropped below a prescribed level, the outlet valve returns to the closed position. Thus, the industrial application is no longer receiving steam, as the quality of steam has dropped below the necessary level for the industrial application.

At 2210, the water pump pumps water into the tubing so that the tubing or conduit of the outlet is completely filled with water.

At 2212, the natural circulation of air within the thermal storage structure continues to maintain the dynamic cooling associated with the outer wall invalidation, as explained above.

Advantages

The example implementations may have various advantages. For example, as explained above, there is a dynamic insulation approach, which provides passive cooling of the thermal storage structure. The incoming cool air absorbs the heat on the outside of the insulation layer, and is eventually passed into the lower portions of the stacks of bricks. As a result, the heat is not transferred to the outer surface of the thermal storage structure. The thermal storage structure can thus house equipment having a wider temperature tolerance. Further, there is lower risk of equipment damage, wear and tear, system failure, injury to the personnel, or other safety issue associated with the presence of heat at the surface of the outer container.

Further, the present disclosure contemplated the use of recirculated air to provide cooling for the thermal storage structure, thus eliminating or reducing the need for a secondary cooling system. During shutdown periods, passive buoyancy-induced flow continues so as to provide foundation cooling without backup power or special equipment. This provides an advantage over thermal energy storage systems using molten salt which require active cooling of the foundations of the molten salt tanks, provided by blowers that add to cost and to parasitic electric power consumption and require redundant diesel generator backups. By cooling the foundation as described in this disclosure, energy that was otherwise lost in prior systems is captured as useful energy, and thermal safety in all conditions is provided.

Additionally, there is an environmental benefit over previous approaches. Because the control system allows the thermal energy storage system to use the source electricity based on the daily supply and demand of energy, the source electricity that is produced when the supply exceeds the demand can be used for storage during the charging mode. When the demand exceeds the supply, the thermal energy storage system can discharge and provide electricity or outputs for other industrial applications to support the additional demand. This paradigm desirably reduces the need to use nonrenewable energy. Further, various industrial applications such as calcining, carbon capture and others may be performed using heat derived from renewable energy sources rather than nonrenewable sources. As a result, the generation of carbon dioxide or other greenhouse gases may be reduced.

Figure 34A:
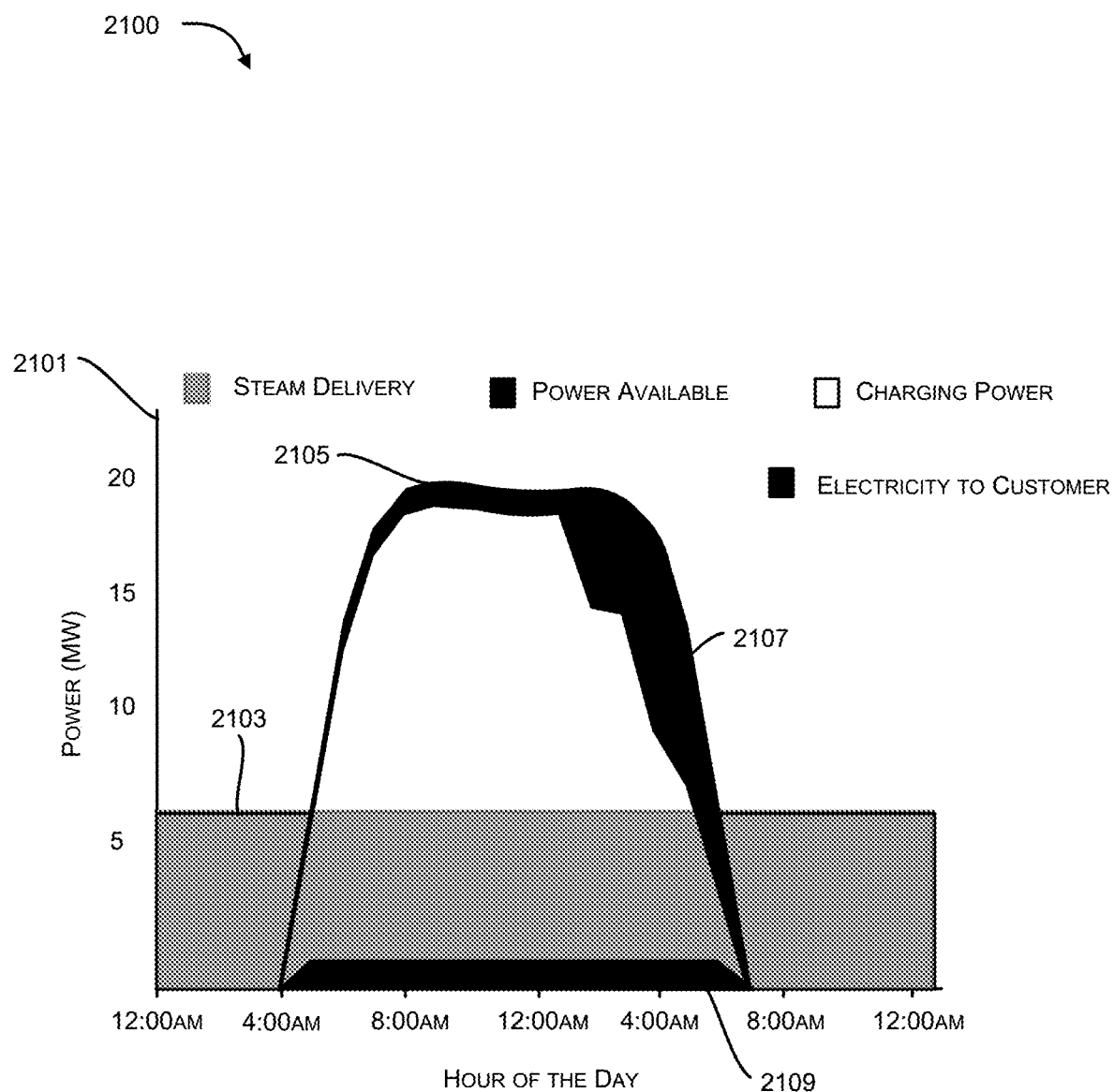

In terms of efficiency and cost, the various implementations described in the present disclosure provide a more efficient approach to managing energy input and output. FIGS. 34(A)-(C) illustrate various energy input and output curves 2100 associated with solar energy generation. In chart 2101, an example energy input and output graph over a daily period is shown. Curve 2105 shows the available power. For example, during the time of day when solar energy is available, such as between 4 AM and 8 PM, the available power is illustrated as 2105. At 2103, the available charging power is shown. As can be seen at 2107, the available charging power may reflect the power available. At 2103, steam delivery is shown, which reflects the energy that is output or produced. At 2109, the actual electricity generated to the customer by the solar energy is shown.

Charts 2111 and 2121 compare daily power profiles for different seasons. Chart 2111 illustrates a power profile during a winter day, while chart 2121 illustrates a power profile during a summer day. At points 2115 and 2117, it can be seen that on a winter day, the power available very roughly corresponds to the charging power. At 2125 and 2127, it can be seen that for a portion of the day the power available corresponds to the charging power, but during the afternoon of the summer day, the charging power is substantially lower than the available power. As explained above, the "day" is defined as a diurnal solar cycle that begins with the time of sunrise and ends with the time of sunset; it is understood that the time of sunrise and sunset can vary depending on physical location in terms of latitude and longitude, geography in terms of terrain, date, and season. At 2119 and 2129, the actual electricity generated to the customer by the solar energy is shown. At 2113 and 2123, steam delivery is shown, which reflects the energy that is output or produced.

At 2131 and 2141, a comparison is provided, for a summer day, of non-deferred charging at 2131, and deferred charging at 2141, such as associated with the example implementations. The elements of 2131 roughly correspond to the elements of 2121 and 2101. By comparison, at 2141, with deferred charging, it can be seen that the charging power 2147 can very roughly match the power available on a summer day during the afternoon periods. Thus, the example implementations can use deferred charging to use the available power more efficiently.

The lifetime of the system components and the efficiency of energy storage may benefit from maintaining the storage core at a lower temperature; however, doing so reduces the amount of energy storage capacity. A thermal energy storage system in which the electrical heaters are embedded within the storage media core causes the heaters to remain at the media temperature over extended periods; and the long-term temperature exposure of the heaters is a key factor in their operating life. An innovation presented here contributes to extended heater and equipment life, by mitigating the annual average temperature that heaters experience. In the case where the storage unit is operated to provide a continuous supply of heat from a variable source, a controller may choose a state of charge below "full charge" on a daily basis, based on forecast energy availability and planned energy demand. For example, in a system powered by solar energy, summer days are longer, so a smaller number of hours of stored energy are required; hence in midsummer the storage unit may be operated by a controller to remain at a lower temperature (or "partial charge") so as to extend system life and reduce thermal losses, without any reduction in energy delivered to system output. And, for example, in a system powered by solar energy, winter days have lower total energy available, so that the entire energy produced by an associated solar facility can be stored using only a portion of the storage capacity. A controller may operate the storage system in these conditions to maintain only partial charge, again so as to extend system life, without any loss of energy delivery at the system output. Various advantages are provided by other features of the overall system, including those relating to the arrangement of thermal storage arrays, as well as the constituent thermal storage blocks. Those features are the subject of the next Section.

Additionally, the present example implementations mitigate thermal stress effects in several ways. The present disclosure mitigates thermal stress arising from thermal expansion due to rapid heating and cooling by partitioning the storage media into bricks of a size and shape which enables rapid radiative heat transfer while maintaining thermal stress levels and patterns within the bricks below levels which induce prompt or gradual failures. Heat transfer flow conduits and flow rates are arranged such that turbulent flow of heat transfer gas provides relatively uniform cooling across the entire exposed heat transfer surface. The storage media bricks are arranged in an array that allows relative movement to accommodate expansion and contraction by individual elements. Also, the array is arranged such that cycles of thermal expansion align the elements of the array to preserve the integrity of the array structure, the integrity of the heating element conduits, and the integrity of the heat transfer gas conduits.

In some example implementations, individual bricks are designed such that their center of mass is close to a heating element, and an expanded surface area allows high contact with flowing air.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy.

Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

The present teaching is an advance in exploiting the physics of heat transfer to enable the cost-effective construction of thermal energy storage systems. Compared to prior art using solid media, designs according to the present disclosure reduce reliance on and improve the reliability of conductive heat transfer; deliver uniform high-temperature heat via convective heat transfer; and principally exploit direct radiative heat transfer, with heat radiating from a heating element and reradiating from heated storage materials ("radiation echoes") to heat other storage materials rapidly and uniformly.

All objects in the universe emit thermal radiation at a rate proportional to their absolute temperature to the fourth power. Specifically, per the Stefan-Boltzmann law, the total energy radiated per unit surface area of a black body per unit time is proportional to the fourth power of the black body's thermodynamic temperature (in kelvin). Accordingly, small differences in temperature cause large differences in the rate of thermal radiation.

All objects in the universe also absorb thermal radiation. For any two surfaces exposed only to each other, and absent any incoming or outgoing heat, the differences in temperature between such objects exposed to each other rapidly reduce until the objects are at the same temperature, and thus in radiation equilibrium.

It is desirable for a system based upon electrical heating elements that heat solid media to operate heaters at a relatively high power loading—that is, to operate with high wattage per square cm of surface area. Doing so reduces the amount of heating material and cost per unit of charging energy (cost per kW). However, heating element life varies inversely with temperature, so in order to maximize power loading while keeping heating element temperatures as low as practicable, it is accordingly desirable for heaters to radiatively expose materials of the lowest and most uniform surface temperatures possible.

In some existing designs, e.g. residential "storage heaters" and Stack disclose designs, heaters are exposed to only a relatively small surface area, for instance by being embedded in channels. Prior art based on Stack's teachings and related designs can be expected to suffer greatly from any nonuniformity in brick size, internal structure, or material composition, since the only means by which surface temperature is controlled is by internal conduction of heat away from the outer surface into the inner material.

Variations in aggregate content within the brick itself can contribute to varying thermal conductivity. Such variations in heat conduction will necessarily result in variations in surface temperature if incoming radiation is heating the surface, and such variations will be significant if thermal radiation is unable to carry away higher-temperature energy to lower-temperature regions. More significantly, any cracks formed within a brick can cause great reduction the thermal conductivity across the crack, and consequently if the brick is being radiatively heated this will reduce heat conduction away from the surface, and thus cause regions of higher surface temperature unless thermal radiation can carry away such energy. A design based on, e.g., the Stack design would experience large increases in surface temperature in both these cases, as only relatively small, local surface areas are in radiation communication due to the "channel" design concept. Mitigating these problems incurs costs. Because brick with higher thermal conductivity is more expensive than brick with lower thermal conductivity, and because electrical heating elements are expensive, previous teachings have had serious limitations in practically achievable temperatures and challenges in material usage (heater material usage per kW) and per kWh (storage material usage per kWh), due to requiring average temperatures be low enough to accommodate such local variations. Such previous designs are vulnerable to in-field failures arising from brick cracking contributing to heater failures. Any such crack formation would require reducing or ceasing the powering of heaters in the zone with cracking—as replacement heaters installed at that location would continue to experience such abnormal temperatures—and/or disassembly of the TSU and replacement of cracked bricks, both of which are quite impractical from a cost point of view. In consequence, units of such design would be vulnerable to degradation in their usable storage capacity and charging rate.

It is also desirable for systems that heat solid media to avoid high temperature gradients within the solid media, as differential expansion based on temperature results in stresses that may cause cracking or degradation of the media as it successively heats and cools during charging and discharging operations, with resulting large time-varying stress patterns. In designs in which heaters are exposed to only a relatively small surface area, only a relatively small fraction of the bulk material is heated by radiation, and a large proportion of the heating is accomplished via heat conduction within the material. As conductive heating is proportional to $\Delta T$ within the material, per Newton's law of cooling, the rapid heating required in VRE-charged storage media creates significant potential for such systems to experience degradation and cracking from thermally induced stresses. In this sense, a desired property for heater designs—high wattage per unit of surface area—is intrinsically in conflict with a desired property for brick designs—low wattage per surface area—when heaters are installed in channels or narrow passages such as taught by Stack and "storage heaters".

It is further desirable for systems that deliver high-temperature heat from solid media to achieve "thermocline" conditions during discharge, in which portions of the media are cooled to much lower temperatures—releasing more energy per kg of material—than other portions, which remain at high temperatures—thus allowing the delivery of relatively high continuous outlet temperatures throughout an extended period of discharging while the bulk of the storage media swings across a large change in temperature (ΔT). In service of this goal, convective heat transfer by flowing air which is heated effectively and comes into balance with local media temperature as it flows through successive regions of material is advantageous. An example of such effective thermocline design is the Cowper stove, which incorporates a plurality of long narrow vertical air passages within a brick array, inducing turbulent airflow within the passages and thus effective heat transfer between air and adjacent brick in each zone as air proceeds through the material. Provisions that prevent the transfer of heat via radiation from relatively hotter zones to cooler zones are desirable, as such downward vertical radiative heat flow would decrease the temperature differential between the bottom and the top of the thermocline, reducing its effectiveness and thus lowering the available stored energy per unit of material. The Cowper stove's narrow air passages limit the mutual radiative exposure of surfaces in the vertical axis (due to cos Θ), and thus the Cowper stove design satisfies both these criteria for effective thermocline design.

However, the Cowper stove design contains a liability. The air passages in Cowper stoves are comprised of many bricks stacked vertically within the unit, each of which has a plurality of passages which must be properly aligned with their corresponding passages in bricks above and below during assembly. Any misalignment during assembly, or due to cyclic thermal expansion and contraction during operation, causes blocking of flow through the passages. Any cracking or spalling of brick, or any introduction of foreign material that introduces material within a passage at any point causes the blockage of flow in the entire passage. In a Cowper stove design, in which the system is heated and cooled convectively, this causes a partial loss of heat storage capacity, as such region is neither effectively cooled nor effectively heated. However, in an electrically radiant heated energy storage unit, such blockages of airflow have greater consequence, as they cause large reductions in cooling during discharge, but no reductions in incoming thermal radiation from heaters. Accordingly, passage blocking can cause larger consequences in electrically heated energy storage units, because as discussed above, variations in unit temperature can contribute to premature heater or brick failures, and in consequence an entire unit may have to be operated at a lower temperature so that the peak temperatures associated with the nonuniformity do not exceed safe material operating temperatures.

Some designs, e.g. Siemens ETES, incorporate unstructured media with randomly distributed air passages, causing zones of higher and lower temperature air to mix, and allowing low-temperature air to bypass regions of high temperature solids without being heated, thus reducing thermocline effectiveness and increasing the amount of solid media required to deliver a given amount of thermal energy while maintaining a target outlet temperature, increasing storage media usage per kWh.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

Such a chamber structure further provides that a first portion of the heat that emanates from an electric heating element is absorbed by a given first brick surface and further transferred by conductive heat transfer within the brick, thus heating that brick; and another portion of the heat is absorbed by a second brick surface relatively closer to the heater than the first brick surface, raising the temperature of that second brick surface. Because the second brick surface grows hotter than brick surfaces farther away from the heater the second brick surface radiates heat to those farther brick surfaces due to the temperature differential. This process of radiation absorption of bricks, leading to temperature rise, and thence leading to increased thermal radiation, is referred herein as "reradiation." The reradiation of thermal energy throughout the brick stacks is an important factor in the rapid, even heating of bricks. The structure is arranged such that heating elements are radiatively exposed to passages that extend in a horizontal direction, achieving relatively uniform heating across a given horizontal layer tier of bricks, while inhibiting radiative heating from the heating elements in a vertical direction, thus achieving and allowing persistent of an advantageous vertical thermocline.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

By arranging the chambers with a relatively high aspect ratio and predominantly horizontal axis, thermal energy is transferred by multiple steps of reradiation to regions of brick that extend far from the heating element; and as the bulk storage temperature rises, the effect of the $°K^4$ (the fourth power of the thermodynamic temperature) thermal radiation drives a very strong "temperature leveling" effect. That is, the hotter the cell becomes, the smaller the differences between the hottest and coolest portions of the cell. As a result, the charging heat transfer within the brick array becomes more effective as temperature rises, and the entire media structure is heated to a uniform temperature with a much smaller total amount of heating element than would be required in a design without a radiative heat transfer structure. This is in sharp contrast to previous teachings, including Siemens and Stack, which can be expected to experience lower heat transfer effectiveness relying on conductive $\Delta T$, which diminishes as bulk storage media temperature rises.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

Equally important, the effect of any brick spalling, cracking, or the introduction of foreign materials within air passages is greatly minimized. An individual brick that experiences the blocking of a passage will experience reduced cooling during discharge cycles, and its surface and internal material will remain hotter than adjacent areas, and thus such an area will effectively store less energy, as energy storage is proportional to $\Delta T$. Because the surface of the brick is in radiative communication with other bricks via the open radiation chamber, radiation will transfer heat from such blocked-passage area to other bricks. Thus, the final $\Delta T$ experienced in a heating-cooling cycle for a design with open radiation cavities will be larger than the $\Delta T$ for any design, such as Cowper stoves or Stack, that does not incorporate this concept. The effect of any brick spalling, cracking, or introduction of foreign materials into an air passage is further minimized due to the flow of air in the vertical axis during discharge. The presence of the radiation chambers eliminates any effect of passage blocking in one brick from affecting flow within the brick above it or below it, since air freely mixes in the chambers between bricks. Similarly, misalignments between bricks in the vertical direction cannot cause air passage blockage, as the narrow air passages in bricks are not in contact, but separated by open chambers.

Overview

As explained in the foregoing discussion, a system for thermal energy storage is provided that includes an input of electrical energy from a supply, one or more thermal storage units, and a fluid output (which may be or include a gas), such as steam and/or heat, to an application. As explained above, the supply may be an energy source, such as one or more photovoltaic cells. Other energy sources may be employed in combination with or substitution for the photovoltaic cells.

The electrical power sources may be any one or a combination of VRE power sources including wind and solar power, less variable renewable sources including hydroelectric and geothermal power, or other power sources including thermal power plants powered by coal, oil, gas nuclear, or any other method of electrical power generation that might be apparent to a person of ordinary skill in the art.

The thermal storage units may each include one or more heating elements (e.g., resistive heating elements) controlled by switches that manage and enable the heating elements to receive the electrical energy from the input, and an energy storage structure such as a brick. A fluid movement system, (e.g., one or more blowers that may be oriented to push fluid unto the system or pull fluid from the system) directs fluid through fluid flow paths in the thermal storage units.

The energy storage structure includes tiers of thermal storage blocks. For example, a first tier of thermal storage bricks may be arranged in an alternating pattern, such that a gap is formed between adjacent or neighboring bricks. A second tier of bricks is positioned adjacent to the first tier, also in an alternating pattern with a gap formed between adjacent or neighboring bricks. The first tier of bricks and the second tier of bricks are positioned with respect to one another such that the gaps of the first tier bricks are adjacent to the second tier bricks, and the gaps of the second tier bricks are adjacent to the first tier bricks.

One or more of the first-tier bricks in the second-tier bricks may have airflow channels formed therein. More specifically, the airflow channels may be formed as apertures, holes, conduits or slots. For example, the airflow channels may be formed as an elongate slot, with a longer dimension being nonparallel to a surface of each brick that is adjacent to a gap. In some implementations it may be advantageous for the air channels to have their longer dimension substantially orthogonal to a surface of each brick that is adjacent to a gap. In other implementations it may be beneficial for the air channels to have their longer dimension substantially parallel to a surface of each brick that is adjacent to a gap.

Because the air channels have one axis of short dimension oriented as explained above, turbulent flow may be induced, contributing to effective heat transfer between air and the brick as it passes through the brick. Accordingly, a benefit of the slot arrangement may be a more effective cooling of each brick as air passes through the brick, and consequently a more effective thermocline during discharging.

The airflow channels and the gaps between adjacent or neighboring bricks are formed in such a manner as to create airflow paths. More specifically, a first air flow path extends through the airflow channels of a first-tier brick and a second-tier gap adjacent to the first tier brick, and a second air flow path extends through the airflow channels of the second-tier brick and a first tier gap adjacent to the second tier brick.

The heater or heating element, which may be a resistive heating element coupled to the input of electrical energy from the supply in a means which includes at least one control switch which may adjust input power to any fraction of the currently available power, is positioned adjacent to the first tier of bricks and the second tier of bricks. For example, the heating element may extend parallel to a longitudinal direction of the tiers of thermal storage bricks. According to one example implementation, the heating element extends laterally in a curvilinear pattern, between rows of the plurality of blocks.

According to one example implementation, the second tier may be positioned above the first tier, such that the airflow paths are substantially vertical. However, the example implementations are not limited thereto, and other spatial arrangements between the first tier and the second tier as may be understood by those skilled in the art may be used in substitution or combination with the substantially vertical air flow paths.

Further, while the foregoing example implementation discloses a first tier and a second tier, the present example implementation is not limited thereto. For example, one or more additional tiers may be incorporated with the first tier and the second tier, to form additional alternating patterns having gaps and airflow channels. Further, the bricks in each of the additional tiers may be positioned to form additional portions of the first and second airflow paths, such that the additional airflow paths extend through airflow channels of a brick, and through a gap of a tier adjacent, such as above or below, the brick.

In the foregoing multiple tiers of bricks, the dimensions of the bricks may be varied, such that the tiers at or closer to an upper portion of the stack may be larger in at least one dimension, such as height, as compared with bricks at or closer to a lower portion of the stack. By having such variation in the dimensions of the bricks, brick size may be optimized to account for greater weight loads near the lower portion of the stack, and/or higher air temperatures closer to the upper portion of the stack. Example, bricks in the upper layers may be taller than the bricks in the lower layers. The reason for this is because as gas is constantly flowing in at the bottom of the stack and cooling the lower levels, more heat power is needed per unit mass to heat the bricks near the bottom of the stack.

More specifically, the heat from the heating element is not only heating up the brick itself, but also heating the gas within the volume of the brick up to a desired temperature. Moving vertically toward the upper portion of the staff, the same heater may heat larger bricks, because the bricks do not have the same incoming air that needs to the heated as the bricks near the bottom of the stack. Moreover, the heaters have a certain amount of power that they are capable of outputting, such that the heaters at the upper and lower portions of the stack may have a heater with similar or same power output. Thus, the cavities may be taller towards the upper portion of the stack, because the entering air has already been heated by the bricks at the lower portion of the stack, and the energy from the heating elements is heating up the mass of the brick itself, as opposed to the air within the volume of the mass of the brick.

In some implementations, a control system for the heater elements is configured to power heater elements at one or more different levels independently, e.g., to output more or less energy depending on the height (e.g., tier) of the heater elements in the assemblage.

Multiple stacks of bricks may be arranged adjacent to one another to form a thermal storage unit. Similarly, multiple thermal storage units may be arranged adjacent to one another to form the thermal energy storage system.

Example implementations may also provide an efficient and reliable thermal storage system that involves use of multiple thermally conductive and absorbing bricks being stacked together to form thermal energy storage cells having sizes and material compositions chosen to mitigate thermal stresses. The thermal storage system may also maintain a constant temperature profile across the length of the cells (stacked bricks) thereby slowing temperature ramp, and reducing the generation of hot and cold hot spots, mechanical stress, thermal stress, and cracking in the bricks.

In some example implementations, the system may include multiple cells to form a thermal unit. The system may include multiple cells, each cell being made of multiple stacks. During charging, a controller may provide power flowing at different rates at different times selectively to individual heating elements or groups of elements so as to control the rate of heating of specific subsections of stacks, or specific stacks within the unit, or specific sections (e.g., specific bricks or sections of bricks within a stack.

For example, if only 60% of maximum energy capacity is anticipated during a specific charging cycle, only elements in 60% of stacks or in 60% of bricks in the system may be heated. The selective heating of specific heating elements may ensure that 60% of bricks achieve maximum temperature during the charging period, instead of heating all of the elements causing 100% of bricks being heated to 60% of maximum temperature.

Such a charging configuration may have various benefits and advantages. For example, the efficiency discharge of energy during a discharging operation may be substantially increased.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

With regard to the composition of the resistive heating element, if the resistive heating element is a resistive wire, it may be metallic. Further, the resistive heating element need not be limited to metallic wire, and may instead be formed from another material, such as a ceramic, including but not limited to silicon carbide, magnesium silicide, or may be formed from a combination of these and/or other materials.

Bricks and Stacks

Example implementations of the energy storage system include a housing comprising at least two sections (also referred to as cells) which may be fluidically coupled to each other. A first section may include one or more thermally conductive bricks of being stacked together with each other to form a thermal storage cell within the housing. Note that some blocks may be relatively large and include multiple portions (e.g., rectangularly-shaped brick portions). Thus, a given block may include portions on multiple tiers and may cover multiple chambers. A heating element may be suspended from a support within a passage within the array, or may mechanically form part of the array itself (as, for example, a conductive ceramic material formed as one or more bricks within the array), or may be positioned adjacent to the array (as, for example, a heating element such as a tungsten or xenon element encapsulated in a material which is at least partially transparent to electromagnetic radiation in the infrared and visible spectrum).

One or more of the bricks may include at least one channel extending longitudinally between two opposite ends of the bricks. Accordingly, at least one of the channels of each of the stacked bricks corresponding to one of the cells are in line with each other. Alternatively, such channels by be arranged such that adjacent bricks channels are arranged together to create a channel. A number of bricks may be stacked over one another to form an assemblage of the required height. The height of the cells may be selected considering the height of the housing. Further, the dimension of the bricks that are stacked over one another may be the same, or it may be different. For example, the bricks and an upper portion of the cell may have a greater height than the bricks at a lower portion of the cell.

The system includes at least one heater or heating element disposed within at least one of the channels corresponding to each of the bricks. Each of the heating elements may be electrically connected to one or more electrical power generation sources (also referred to as electrical energy sources), either individually or collectively, and may be configured to receive electrical energy from the electrical power generation sources and generate thermal energy, such that temperature of each of the heating elements reaches to a temperature.

The application of electrical power to the heating element may be controlled based on optimal heating conditions configured to reduce thermal stresses in the bricks. Such electrical control may be implemented by switches of various types, including electromechanical contactors and semiconductor devices including thyristor and transistor type devices including insulated-gate bipolar transistors (IGBTs). The control of electrical power to the heating element may be determined by a controller that takes into account values of currently available total energy from a VRE source or other parameters in determining a desired rate of charging. The controller may operate a switch multiple times per second in a control circuit whereby such operation of the switch enables a heater to receive one of many average power levels. The controller may operate a plurality of such switches in a pattern such that an incoming amount of total power is distributed uniformly or nonuniformly across a varying number of heaters whose total power demand (if all operated at full power concurrently) may exceed the incoming available power. For example, electrical energy may be controlled to keep the heating element a fixed temperature above the surrounding bricks to reduce thermal stresses. As the brick temperature increases, more electrical energy may be applied to the heating element to increase the temperature of the heating element to the maximum temperature achievable by the heating element. Therefore, heater elements at different vertical elevations within an assemblage of thermal storage blocks may be operated at different temperatures, as higher blocks will typically have a greater temperature.

Further, in some example implementations, the electrical power applied to the heating element may be gradually ramped in during generation to prolong the life of the heating element. The means of this ramping may include a controller commanding external power conversion devices, including solar inverters, to adjust their power delivery, and may include a controller commanding semiconductor switching devices including thyristors and IGBTs to rapidly switch in a time-varying pattern. Additional optimizations of the charging of the system may be achieved by controlling the application of electrical power to the heating element.

In an example implementation, bricks may be made of thermally conductive and absorbing materials having a composition and dimensions, such that thermal energy emitted by the corresponding heating elements, upon receiving the electrical energy, may heat each of the bricks and the corresponding cells up to the first predefined temperatures. Further, the cells may be configured within the housing such that there is a predefined gap between adjacent cells, to facilitate the flow of fluid through the cells.

Brick Structure and Shape

The structure and shape of the bricks is configured to repeatedly heat and cool for the purpose of storing energy. Energy input is provided in the form of electrical energy, which heats wires, filaments, rods, or other solid conductive materials to emit radiant thermal energy. The energy output is in the form of heat delivered in a circulating gas introduced at one portion of the structure, and which leaves another portion of the structure at a higher temperature. The structure includes refractory materials (e.g., bricks), which may be in the form of one or more cast or extruded shapes, and so arranged as to have an alternating sequence, along both vertical and horizontal axes. The structure includes a plurality of open chambers and bricks, with the bricks including air passages having at least one dimension which is much smaller than the other two dimensions. The passages are open to the chambers at its top and bottom surfaces, and are internally exposed to a radiating surface heated by electrical resistance. In the chambers, heat is transferred by thermal radiation from relatively hotter surfaces to relatively cooler surfaces.

FIG. 36 shows views 36000 of brick and stack structure and shape, a cutaway view 36001 and an isometric view 36003 of a chamber 36005 formed by the surfaces of adjacent bricks 36007 having channels 36009 formed as the slots 36011. The resistive heater 36013 provides the heat energy converted from electrical energy. One surface of the chamber 36003 includes an surface heated to a higher temperature by electrical energy (shown as solid lines with arrows), and other surfaces of the chamber exposed to thermal radiation from all internal surfaces (shown as broken lines with arrows).

Figure 37:
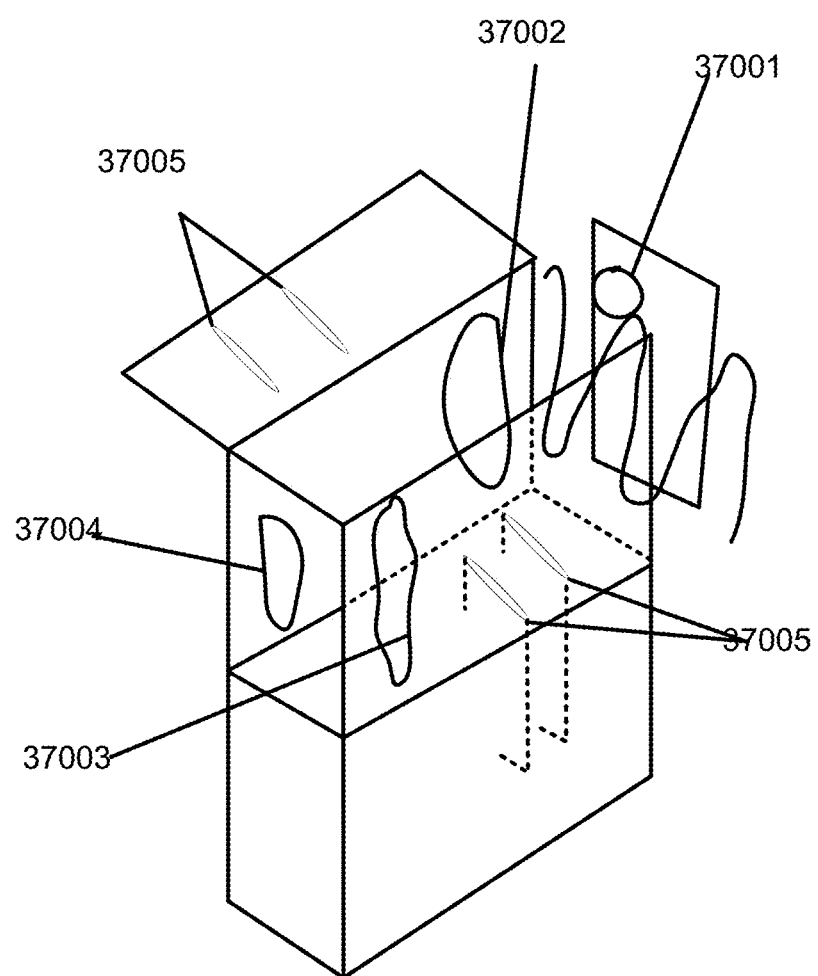

In more detail, as shown in FIG. 37, the structure 37000 comprised of refractory materials includes an inner chamber having a region directly heated by electric power radiating heat. A region 37001 receives higher radiative flux from the electric power heating element and is at a higher temperature, and is radiating thermal energy within the chamber that is absorbed by lower temperature surfaces of the chamber 37002, 37003, 37004 at different rates based on their angle and distance from the first radiant surface, and which consequently are heated to different temperatures by incoming radiation from region 37001. The second surface 37002 is at a higher temperature than the third surface 37003, which radiates thermal energy absorbed by the third surface 37003, reducing the temperature difference between them. A fourth surface 37004 is located farther from an electrical heating element and receives incoming radiation emitted by the electrical heating element, the first surface region 37001, and surface regions 37002 and 37003, as well as other surface areas.

The system as above, in which the brick materials whose respective surfaces form the walls of the chamber each have internal flow passages 37005, which allow air to flow, having at least one dimension that is substantially smaller than other dimensions, which causes the flowing air to have at least partly a turbulence pattern. Additionally, the system incorporates one or more regions below the first heated chamber, with air passages which enable flow upwards into the heated chamber, but so arranged as so block thermal radiation emitted by the heated chamber.

Figure 38:
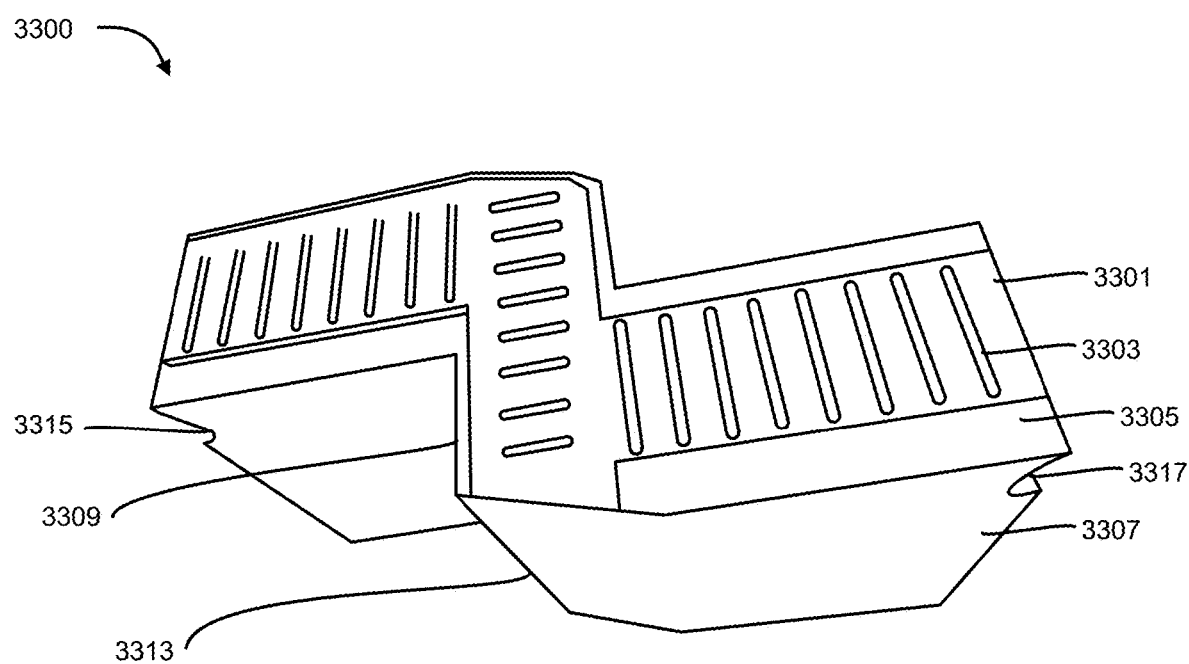
FIG. 38 illustrates a view of a brick according to the example implementations.

Electrical switches (not shown) control the operation of the electrical heaters under the command of a control system (not shown). Further, louvers and/or variable speed fans may control the rate of flow of air upwards within the air passages and chambers. FIG. 38 is a diagram 3300 illustrating an example brick 3301 according to some implementations. The brick 3301 is formed in a zigzag shape, having an upper surface including a region containing openings 3303 (which are slots in this example) which extend vertically through the brick 3301. Additionally, a seating portion 3305 is provided, such as that bricks 3301 may the stacked on top of each other and seated in a manner such that they do not laterally shift with respect to one another. Further, side portions 3307, 3313 in a longitudinal direction may be arranged with other bricks in a manner that creates chambers or cavities within the bricks. These radiative chambers may permit reradiation in various directions, including horizontal reradiation (e.g., charge the brick with radiation at 90 degrees to the vertical axis, such that radiation moves in the horizontal plane).

The structure of bricks and stacks may promote the flow of energy in the horizontal plane by giving radiation a free line of sight, or capability to radiatively move energy rapidly in the horizontal plane. This approach may reduce or avoid hot spots. Simultaneously, energy is discharged the vertical axis to the top of the stack. By allowing radiation to move freely in the horizontal plane but not substantially in the vertical axis, the thermocline may be maintained (and vertical reradiation from the point of discharge back down the stack is obstructed, such that the energy flows to the output in an intended manner).

The overall shape of the brick 3301 includes a first section that extends longitudinally in a first direction, a second section that is oriented orthogonally to the first section and extends longitudinally in a second direction, and a third section that extends longitudinally in the first direction. Thus, the brick 3301 has a zigzag appearance. Each of the sections has the openings 3303 in a repeated pattern extending along the upper center surface, framed by the seating portion 3305 along the periphery. The seating portions of the second section and third section are shown as 3309 and 3311, respectively. Additional recesses 3315 and 3317 are provided at opposite ends of the first and third sections of the brick 3301.

In the illustrated implementation, fluid flow slots are elongated in one horizontal direction. As shown, fluid flow slots may be oriented with their longer direction parallel to heater channels and perpendicular to radiation cavities at a given level.

Figure 39:
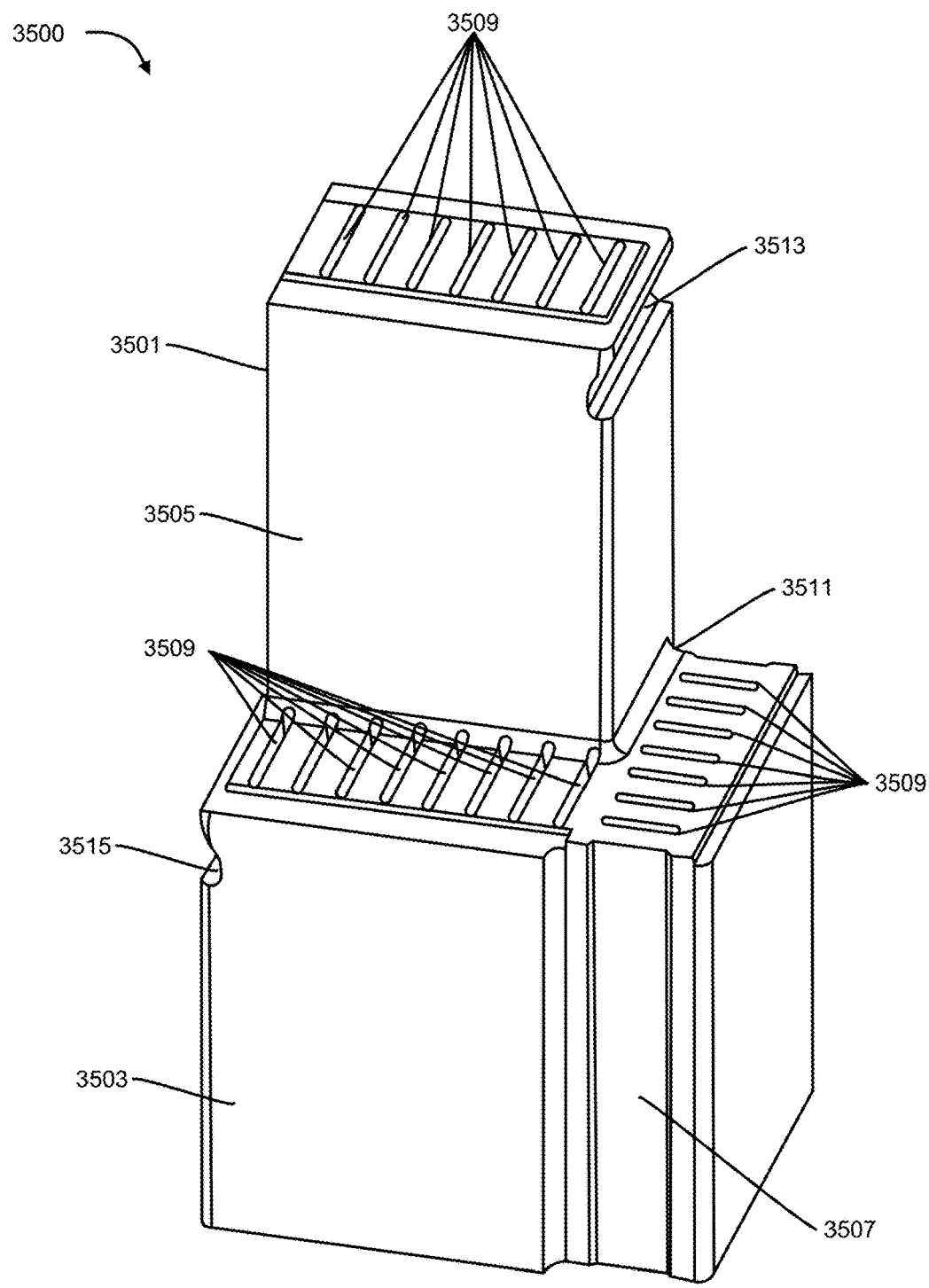
FIG. 39 illustrates a view of a brick according to the example implementations.

FIG. 39 illustrates a schematic perspective view 3500 of a brick 3501 according to another example implementation. While the brick 3301 shown in FIG. 38 has a common vertical profile across all of its sections, the brick 3501 is assembled in a manner such that there are sections of the brick at different vertical profiles. More specifically, the brick 3501 includes a first portion 3501, a second portion 3503 and a third portion 3507. These three portions 3501, 3503 and 3507 are connected at a junction 3511. Recesses 3513 and 3515 are provided to house the heating element. As explained above, the openings 3509 are provided in each of the portions 3501, 3503 and 3507. A chamber formed by the bottom surface of the first portion 3501, and side surfaces of the second and third portions 3503 and 3507, respectively. Similar seating portions are also formed in the brick 3501 as explained above. Thus, the bricks 3501 may be arranged in a stacked structure to form an assemblage, and multiple assemblage may be arranged to form a unit or cells, with a given TSU having one or more units or cells.

Figure 40:
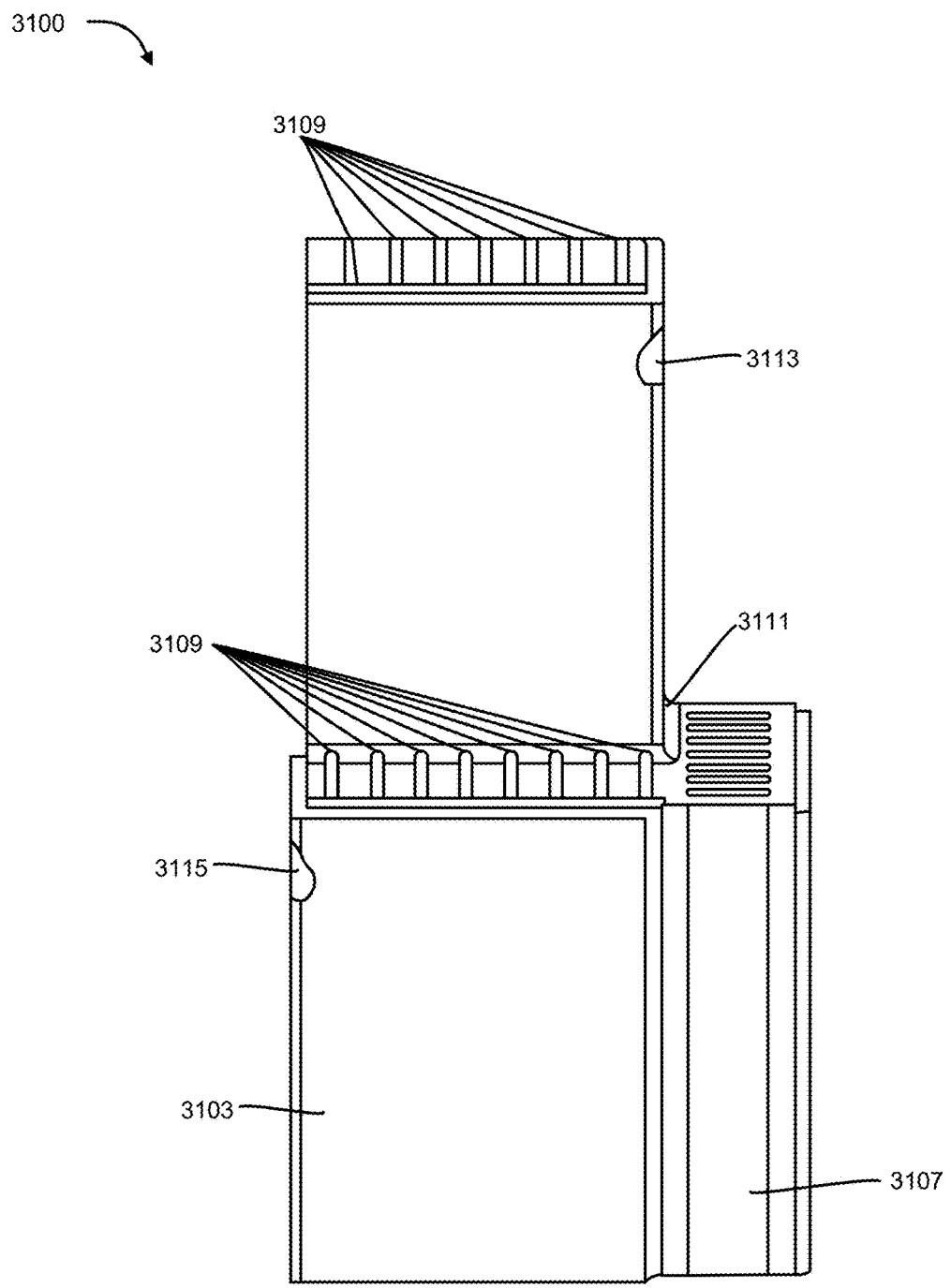
FIG. 40 illustrates a view of a brick according to the example implementations.

FIG. 40 illustrates a schematic perspective view 3100 of a brick 3101 according to the above example implementation. The perspective view is positioned to show the features of the brick 3101 from a side perspective. As explained above, the brick 3101 includes sections 3103, 3105 and 3107 that are connected to one another at a junction 3111. Slots 3109 and recesses 3113, 3115 are provided. Similar to the above a seating region is provided adjacent to the slots at the perimeter of the upper surfaces of the sections 3103, 3105 and 3107. The chamber formed by the sections 3103, 3105 and 3107 is directly behind section 3103, directly below section 3105, and directly to the left of section 3107 as illustrated. Other bricks 3101 may be positioned in a stacking or interlocking manner with respect to the brick 3101, to form additional sides of the chamber.

Figure 41:
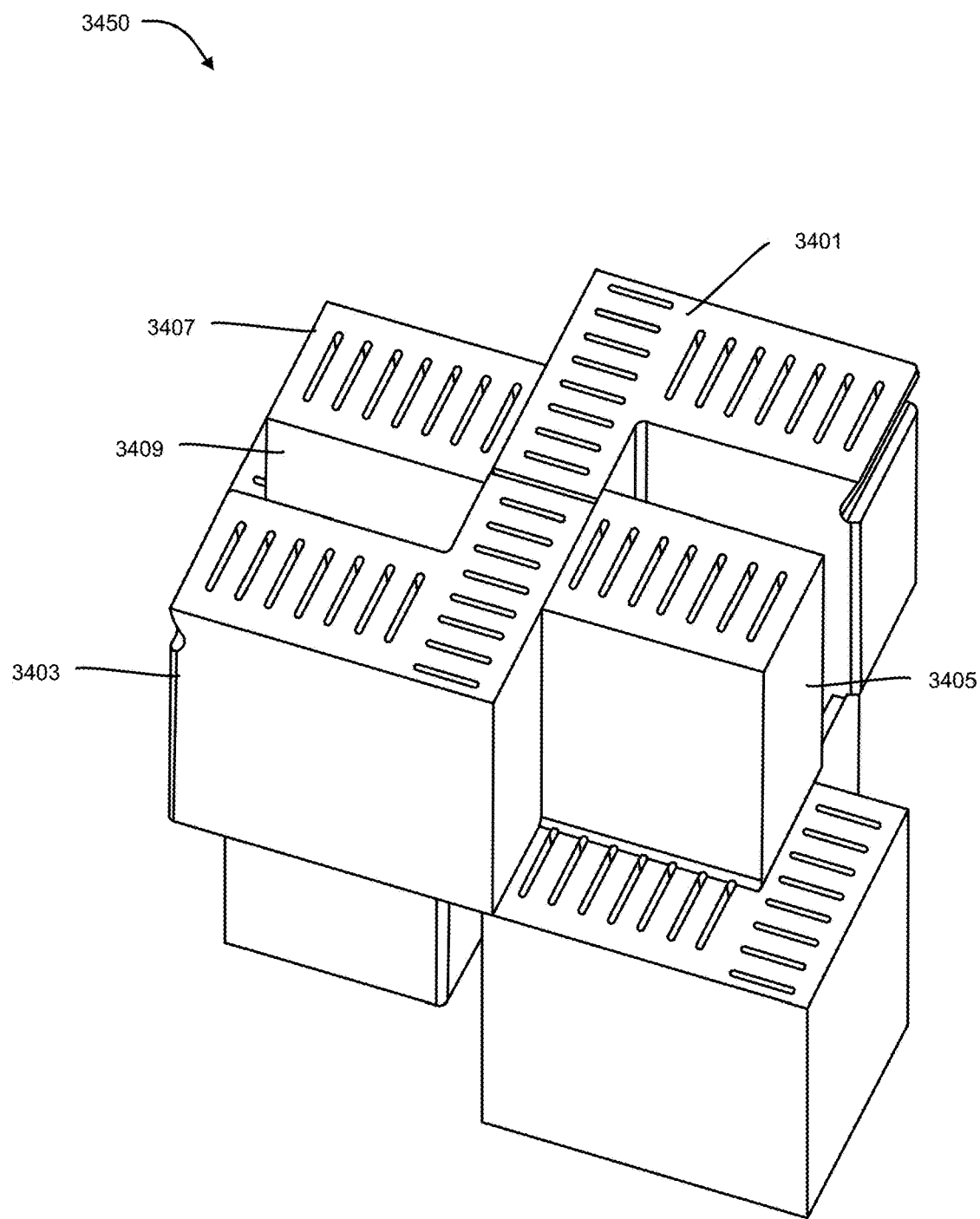
FIG. 41 illustrates interlocking bricks according to the example implementations.

FIG. 41 illustrates an isometric view 3450 of interlocking bricks according to the example implementations. More specifically, bricks 3401, 3403, 3405 and 3407 are arranged so that the seating regions of the bricks are arranged to interface with adjacent bricks. As explained above, this approach allows the bricks to be stacked in a manner that reduces the risk of misalignment or undesirable movement after the installation. At 3409, a chamber formed by the interlocking bricks is shown. Thus, the bricks, once interlocked, form the chamber that is substantially enclosed. In some implementations, an assemblage includes bricks oriented differently, e.g., with blocks rotated at different angles, some blocks upside-down, etc.

Example Assemblage and TSU Structure

Figure 42:
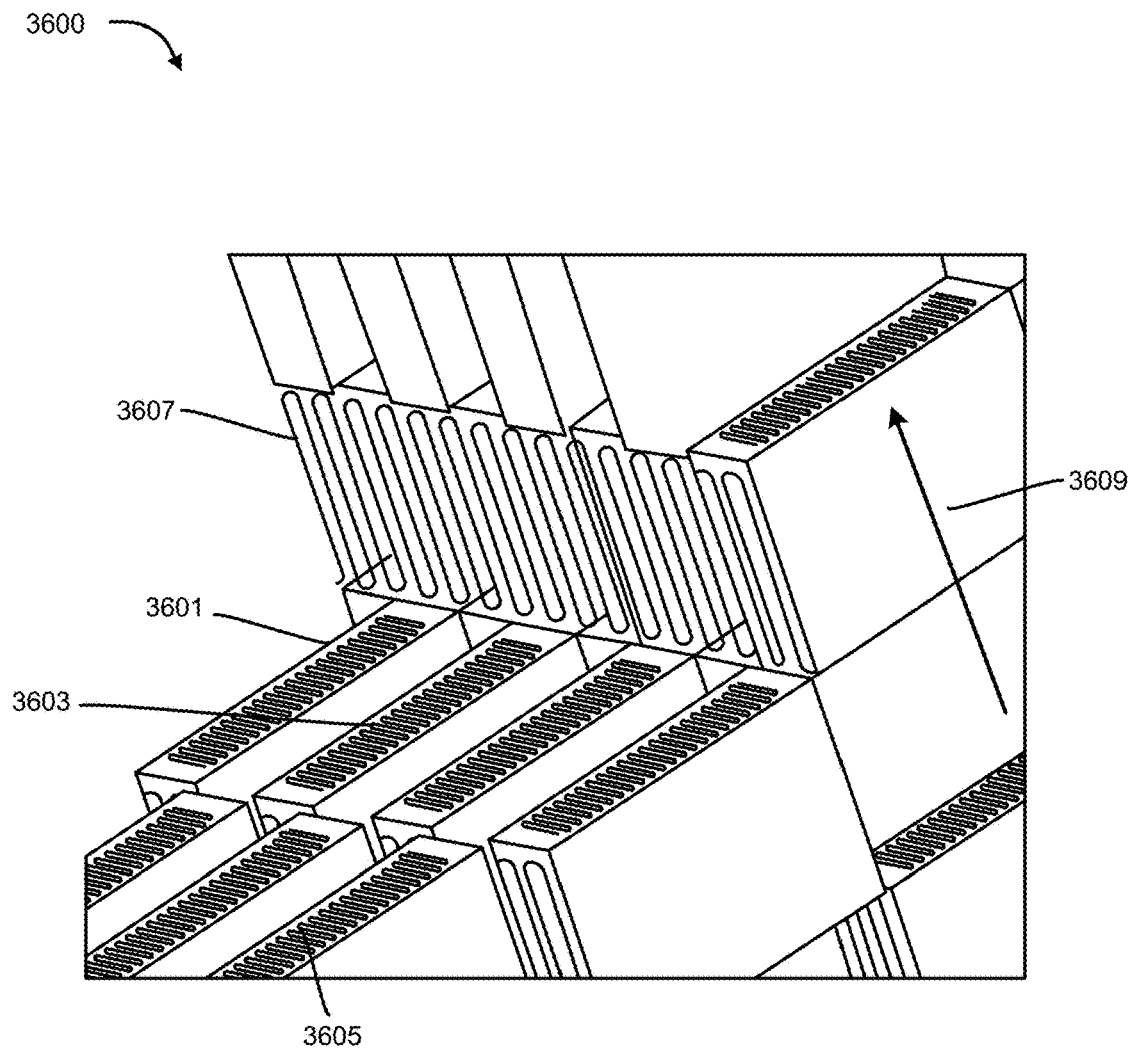
FIG. 42 illustrates an example refractory stack according to the example implementations.

FIG. 42 illustrates an example refractory stack 3600 according to some implementations. As shown in 3601, the bricks may be provided in an interlocking manner, as explained above with respect to FIGS. 40 and 41. Further, the chamber or cavity is formed at 3603. Slots or openings 3605 extend vertically through the bricks. As shown at 307, the resistive heating element is provided between some of the bricks. As illustrated, the resistive heating element 3607 appears as a wire that extends in a repeating curvilinear pattern horizontally with respect to the fluid flow 3609 of the stack 3600. Other configurations of the resistive heating wire 3607 may be substituted for the configuration illustrated, so long as the resistive heating element 3607 receives the electrical energy of the source as its input and generates heat energy during a charging mode of the TSU.

In some implementations, the blocks are stacked adjacent in vertical tiers such that fluid cannot flow between tiers of blocks in a horizontal direction, but flows only through vertical fluid pathways defined by fluid slots and radiation chambers. This may facilitate controlled, even heating in various implementations.

Figure 43:
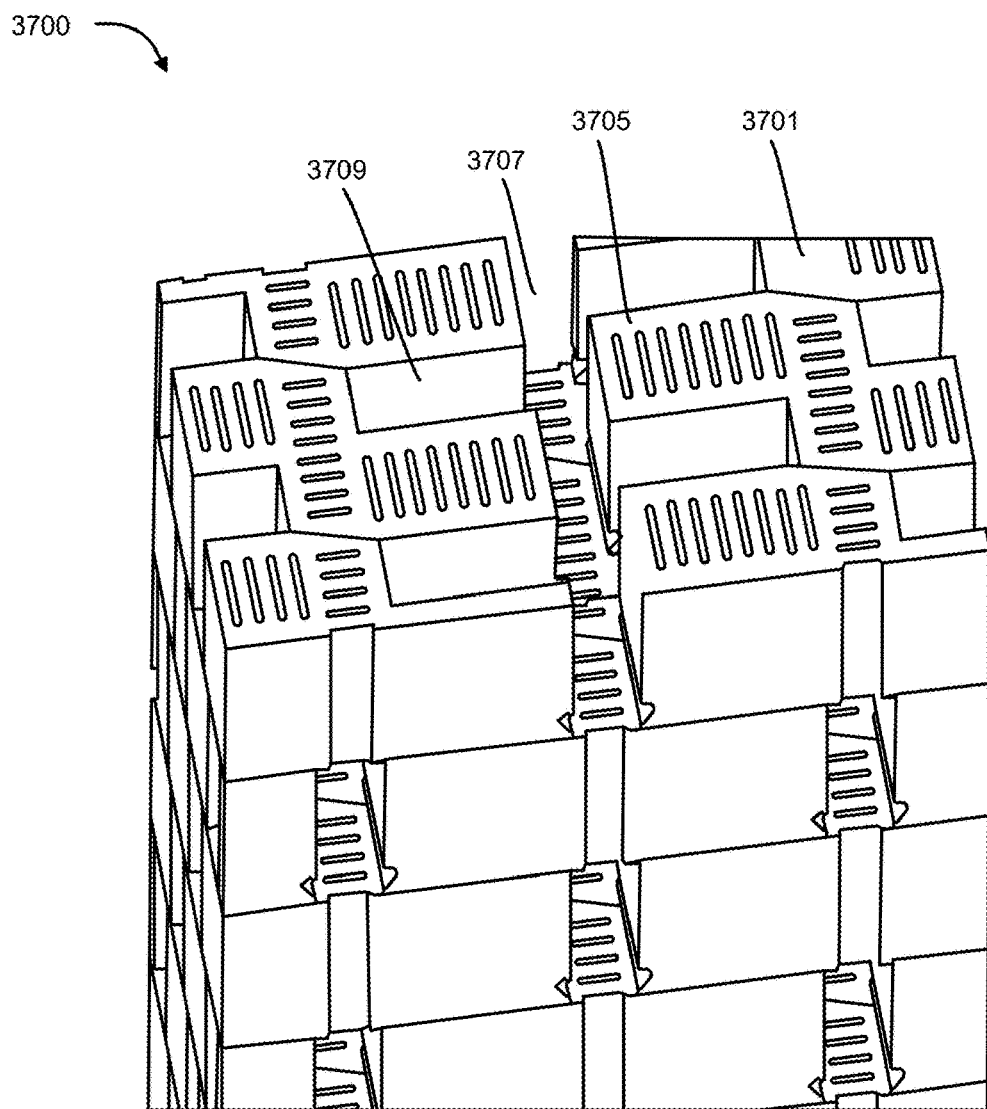
FIG. 43 illustrates an example perspective view of stacking of the bricks according to the example implementations.

FIG. 43 shows an isometric view 3700 of the stacking of the bricks according to an example implementation. As shown herein, bricks 3701 and 3705 are stacked with respect to one another to form the radiative chambers 3709. A heating element may extend through a space 3707 (also referred to as a channel) between some of the adjacent bricks.

Figure 44:
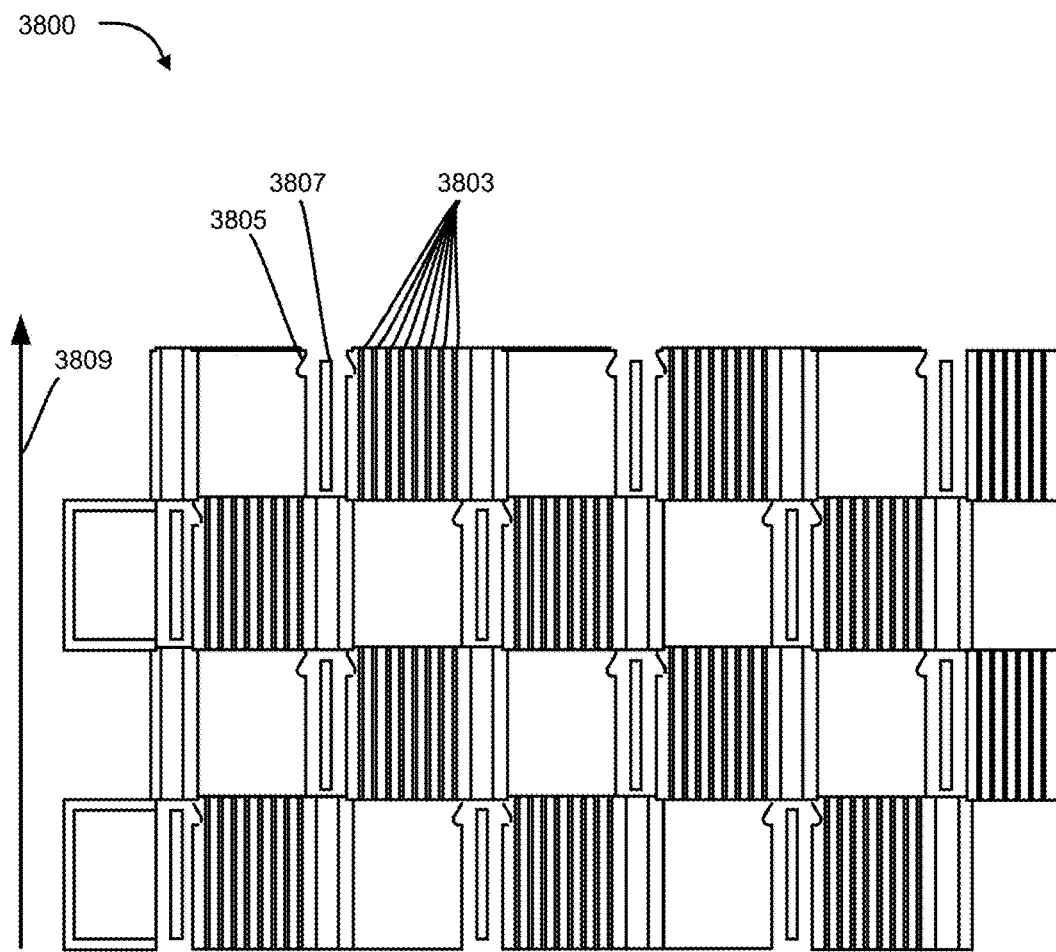
FIG. 44 illustrates an example side view of stacking of the bricks according to the example implementations.

FIG. 44 illustrates a side cutaway view 3800 of the stack of bricks according to the example implementation. For example, bricks 3801 are arranged in an interlocking manner with respect to one another. Some portions of the bricks have openings 3803, such as elongated slots that extend vertically through those portions of the bricks. An opening 3805 is provided between some of the bricks in a repeating pattern, both horizontally and vertically throughout the stack. The resistive heating element, depicted as 3807 is provided in the openings 3805. As the fluid flows vertically as shown at 3809, the fluid is heated. Although it is not illustrated in this drawing, the radiative chambers formed by the interlocking bricks, in conjunction with the openings 3805, provide for the absorption of heat radiated from the heating elements 3807, and further allow for conduction of heat within a block in various direction and reradiation of the heat in various directions. In particular, the heat may be reradiated in a horizontal direction.

Figure 45:
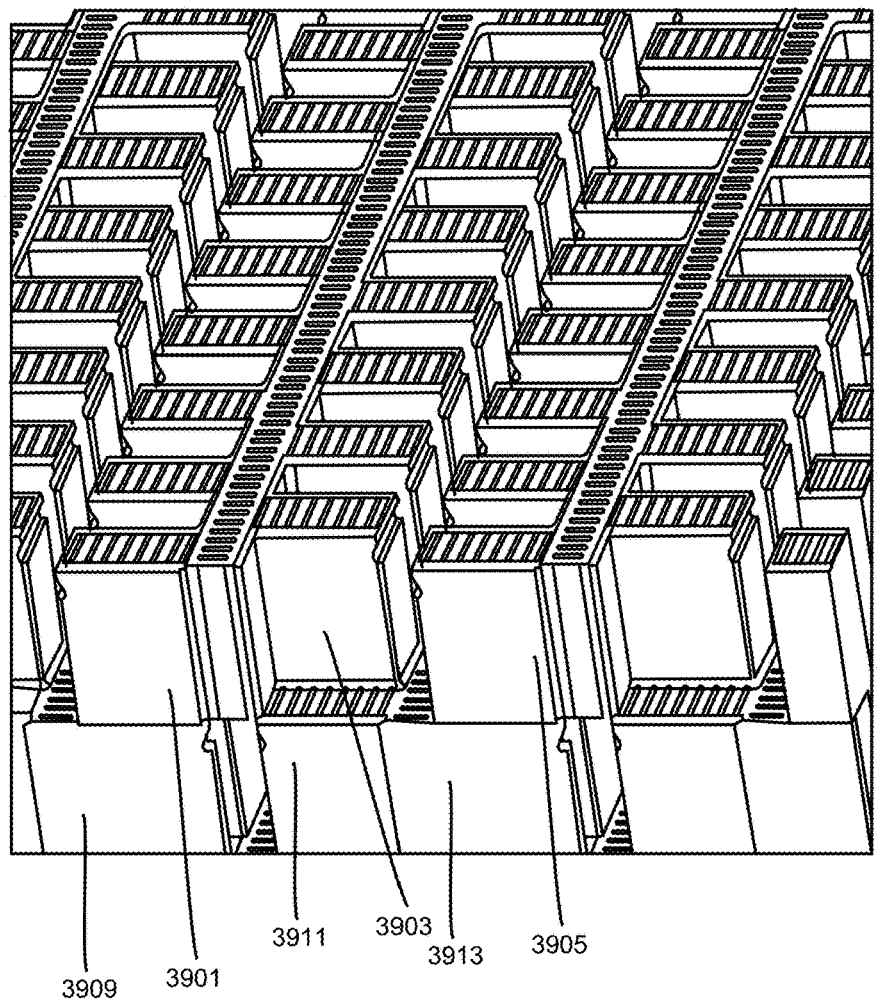
FIG. 45 illustrates an example upper perspective view of stacks of bricks arranged in rows according to the example implementations.

FIG. 45 illustrates an isometric view 3900 of the rows of stacked bricks according to the example implementations. More specifically, some of the bricks 3901, 3903 are interlocked with each other at a first level of the stack, and other portions of those same bricks at 3909 and 3911 are interlocked with one another and a second layer of the stack. Adjacent bricks 3913 may interlock with some of the bricks in the adjacent row. Other bricks 3905 may not interlock with some of the bricks in the adjacent row, and may instead be separated by the space in which the heating element is positioned.

By forming an interlocking pattern between bricks, the stack may be laterally supported on the sides. For example, separate bricks at 3909 and 3911 are spanned by a single brick at 3901 and 3903, to form the interlocking pattern with the underlying bricks. As explained above, an upper surface of the brick has slots in a central portion and a lip at the edge portion. The lip at the edge portion supports the load of another brick that is above the brick. Generally, lips or shelf portions on thermal storage blocks may interlock with other lips/shelves or with other block portions to prevent blocks from shifting laterally relative to one another. For example, in an earthquake, the bricks may not move because they are surrounded with other bricks that are interlocked using the lip structure. The lateral support may result in a more stable structure for the stack.

Additionally, the individual bricks may be formed at greater scale, with additional walls, rows, chambers, vertical levels, slots and the like used into a single block structure, such that multiple chambers are formed within the single block structure. The blocks may all be of the same size, or they may be of different sizes. For example, and as explained above, the height of bricks in the lower region of the stack may be less than the height of bricks in the upper region of the stack. By having larger structures, fewer structures are required to form a stack. Similarly, multiple bricks may be fused together prior to stacking, to have the same effect as a brick manufactured as a very large size and scale as a single block. In either case, a potential benefit of having fewer structures to form a stack is the ease of assembly, e.g., in requiring the fitting of less pieces to one another. Further, the approach with larger blocks may also avoid a potential disadvantage of assembling more and smaller bricks, in that the interlocked bricks that are stacked on top of each other may rub against one another during the thermal expansion, thus causing additional wear and tear. The larger bricks have a smaller surface area in contact with other bricks, which may result in less wear and tear.

In some implementations, the slots that are adjacent to the heating elements are parallel to the heating elements, while the slots that are above the heating elements are orthogonal to the heating elements. In these implementations, the slots may be perpendicular to a wall from which the energy will be radiatively received. As can be seen in the drawing, a long row of slots is formed above and parallel to the direction of the heating elements. The bricks have slots that are orthogonal to the long rows of slots, and those slots are spaced apart by the radiative chambers.

In some implementations, thermal storage blocks may be sized based on thermal conductivity. For example, in some implementations the thermal energy should be radiated into the brick with a certain thermal conductivity, within a certain amount of time, given the thermal mass. If the brick size is too large, the amount of time required for the energy to be radiated into the center portion of the brick may exceed the available time, and the central portion of the brick will not heat up in time for the charge and discharge cycles. On the other hand, if the chamber is dimensioned below a certain width, while the temperature may become more homogeneous, the chamber may become too narrow, which may cause problems with flow or structural integrity.

The overall shape of the blocks may also be varied. While the examples shown herein illustrate rectangular volumes with relatively flat walls and interlocking structures with orthogonally position structures formed above or below, the shape is not limited. For example, the bricks may be formed such that the overall shape is trapezoidal or oval instead of rectangular. Further, the wall need not be flat, and may be curved, serpentine or some other profile. Also, as an alternative to having slots in the bricks, the bricks may be configured to be stacked with substantially thinner elements to form gaps between the bricks, and alternating the bricks, to form the gaps as the equivalent of slots, such that the fluid passes between the bricks.

Additional Thermal Storage Block Examples

Figure 46:
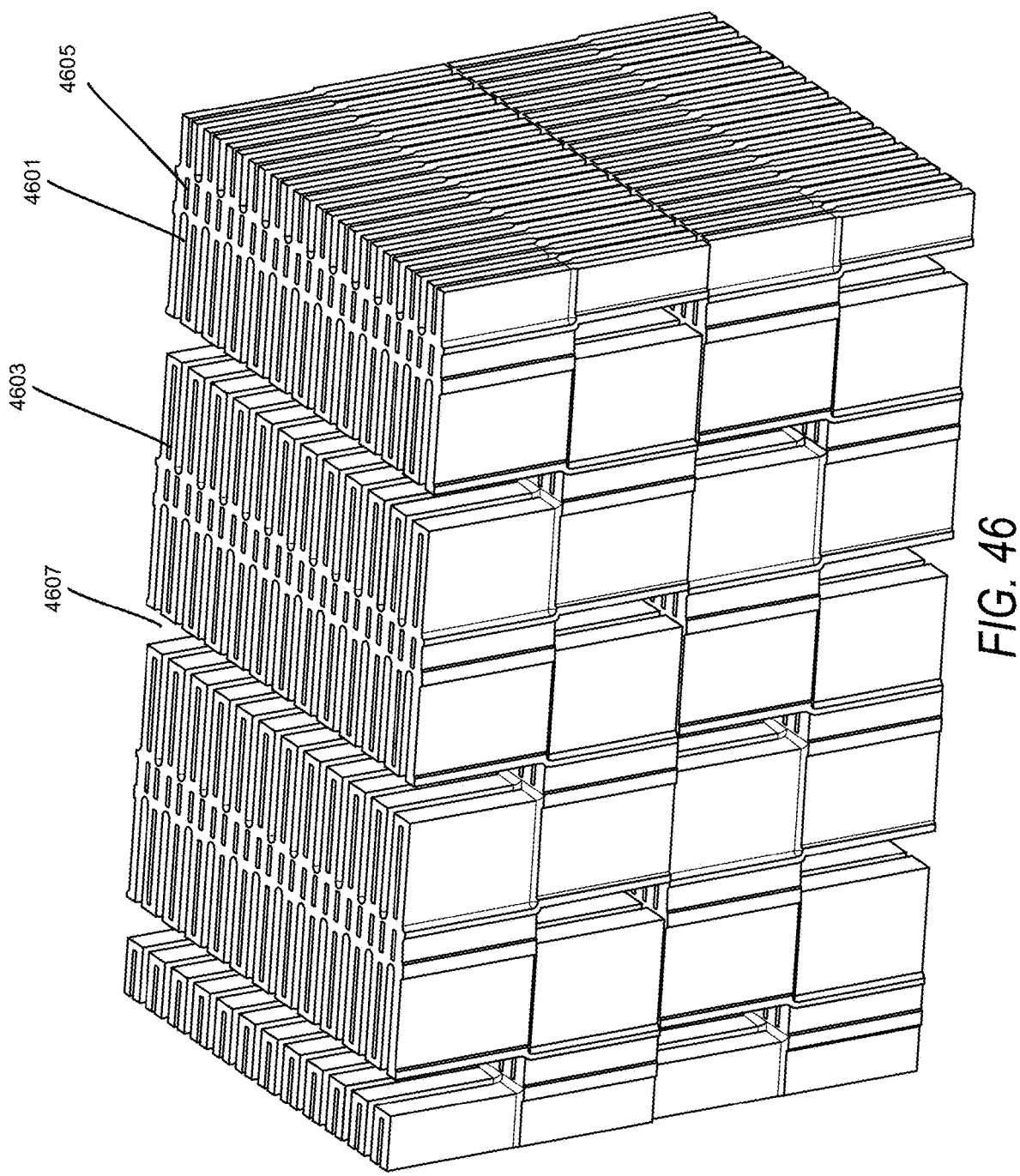
FIG. 46 is a diagram showing an isometric view of an assemblage of thermal storage blocks.

FIG. 46 is a diagram showing an isometric view of an assemblage of thermal storage blocks. In the illustrated example, the storage blocks define channels (e.g., channel 4607) in which heater elements are positioned. The channels may include horizontal slits for hanging heater elements. As shown, the blocks define multiple radiation cavities 4601 and multiple fluid flow slots 4603. The cavities and slots are arranged such that a given vertical fluid flow pathway includes alternating cavities and slots, with a cavity positioned above a slot that is in turn positioned above a cavity, and so on, until reaching the top of the assemblage. Thus, a given fluid pathway may include multiple cavities and multiple fluid flow slots, which may alternate. The volume defined by a given cavity is greater than the volume defined by a given fluid flow slot, in this example.

In the illustrated example, the blocks also include slots 4605 positioned above the channels for the heater elements. Fluid flow may also occur via these slots, e.g., due to movement caused by a blower or due to buoyancy of heated fluid. As shown, the heater channels 4607 are located adjacent to radiation cavities and orthogonal to the vertical direction of fluid flow, which may promote horizontal radiation and energy transfer. The heater elements may also heat the bricks via convection.

As shown, in some implementations the size of the radiation cavities is fairly large relative to the size of the block portions that bound the cavities. In some implementations, the area covered in a horizontal plane by a given radiation cavity is at least 40%, 60%, 70%, or 80% of the area of a surface of a portion of a thermal storage block that bounds the radiation cavity (where the area of the surface of the portion of the thermal storage block includes the area of any slots in the portion). The substantial size of the radiation cavities may facilitate even heating via radiated energy.

Figure 47:
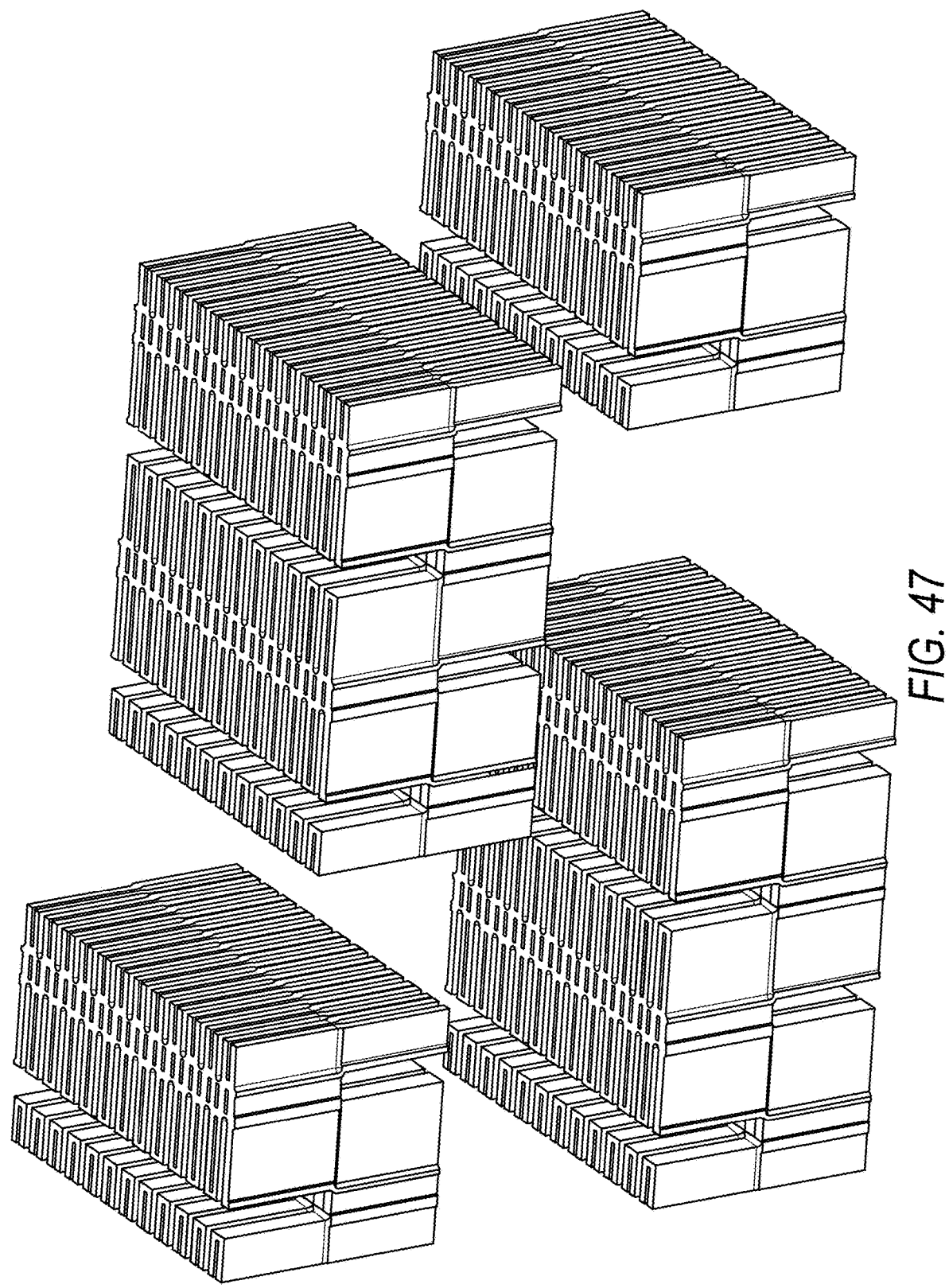
FIG. 47 is a diagram showing an exploded perspective view of the blocks of FIG. 46.

FIG. 47 is a diagram showing an exploded perspective view of the blocks of FIG. 46. As shown, blocks may have different sizes in a given stack. The blocks may be formed such that multiple blocks define a give radiation cavity or fluid flow slot. The relatively large size of the blocks in the illustrated implementation may reduce wear and tear due to friction forces between blocks caused by slight blocks movements or expansion/compression. Larger blocks may each include multiple radiation cavities and fluid flow slots and may also cover multiple cavities/slots on a lower level. Larger blocks may be manufactured as a whole (e.g., using a correspondingly-sized mold) or in sections and fused together. As shown, a given block may include radiation cavities and fluid flow slots at multiple vertical elevations. Generally, a given block may include multiple portions that each bound multiple radiation cavities and include one or more fluid flow slots.

Figure 48:
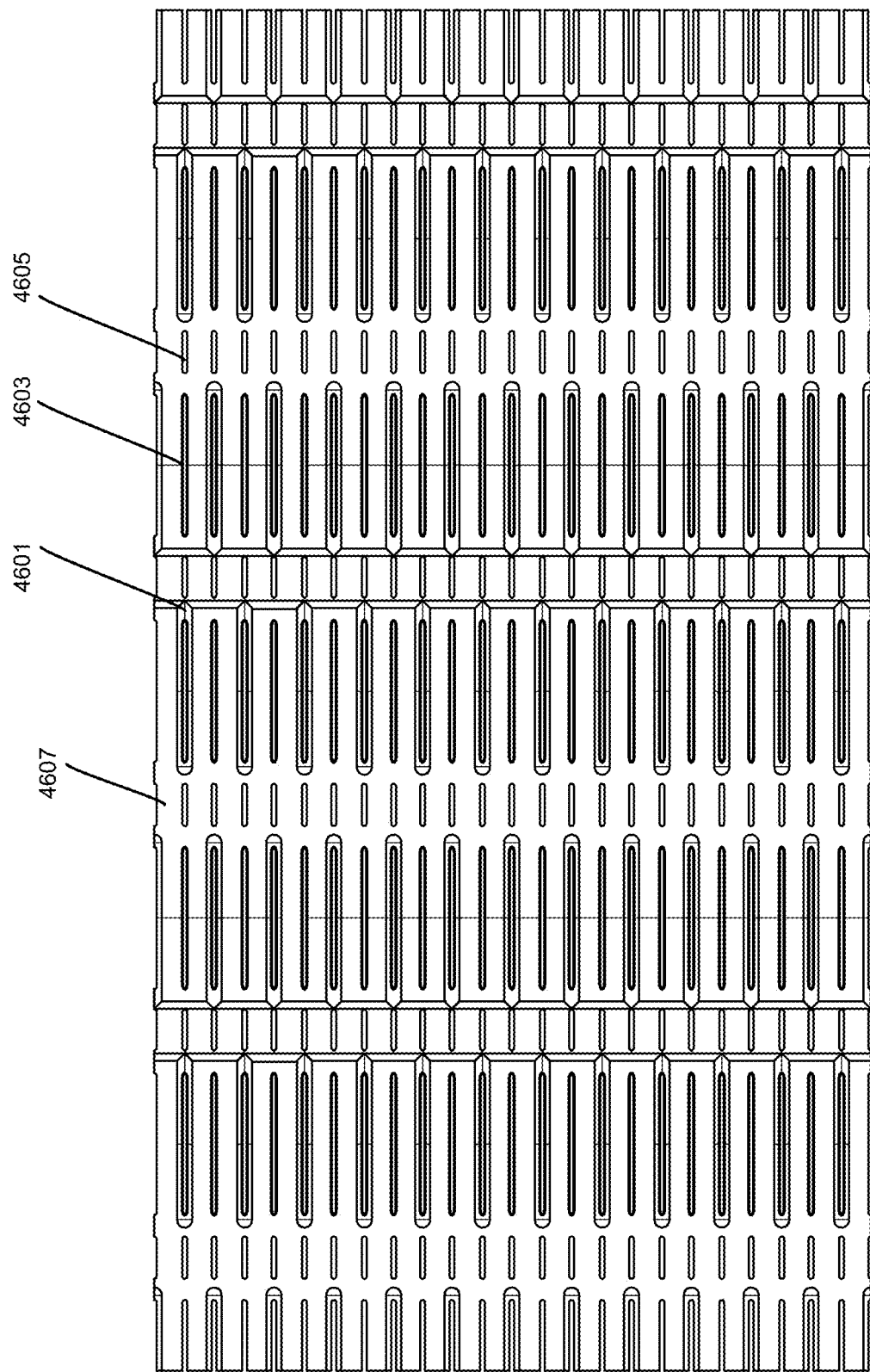
FIG. 48 is a diagram showing a top-down view of the blocks of FIG. 46, according to some implementations.

FIG. 48 is a diagram showing a top-down view of the blocks of FIG. 46, according to some implementations. As shown, the fluid flow pathways are formed by corresponding sets of radiation chambers 4601 and fluid slots 4603. This view also shows the slots 4605 positioned above and below heater element channels.

Figure 49:
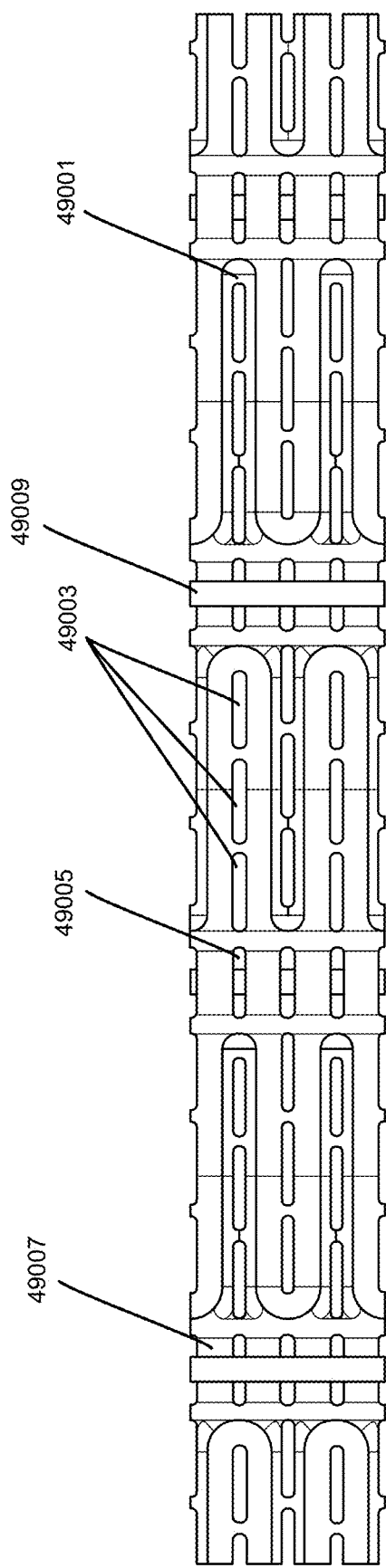
FIG. 49 is a diagram showing a top-down view of one or more thermal storage blocks, according to some implementations.

FIG. 49 is a diagram showing a top-down view of one or more thermal storage blocks, according to some implementations. In the illustrated example, the block(s) include heater channels 49007, heater elements 49009 positioned in the heater channels, heater slots 49005, radiation chambers 49001, and fluid flow slots 49003. In some implementations, the rounded corners of the radiation chambers may facilitate relatively uniform heating of the blocks.

Figure 50:
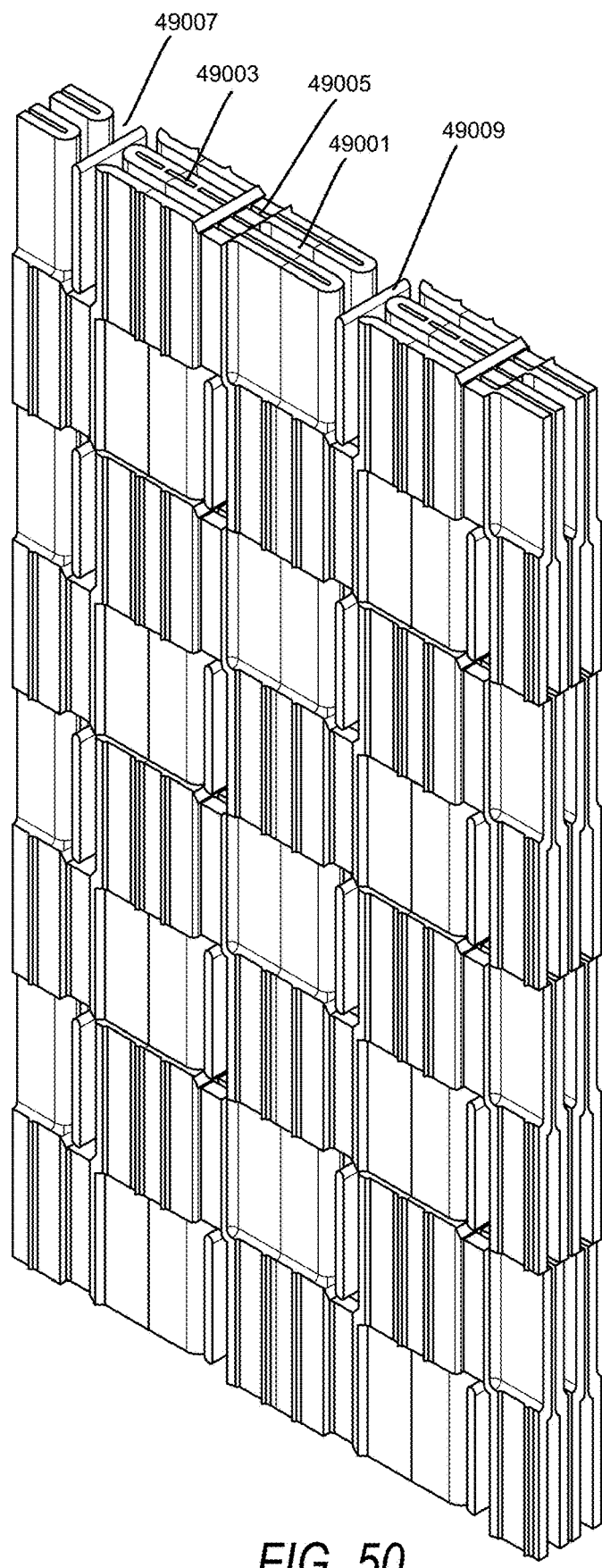
FIG. 50 is an isometric view of the block(s) of FIG. 49 according to the example implementations.
Figure 51:
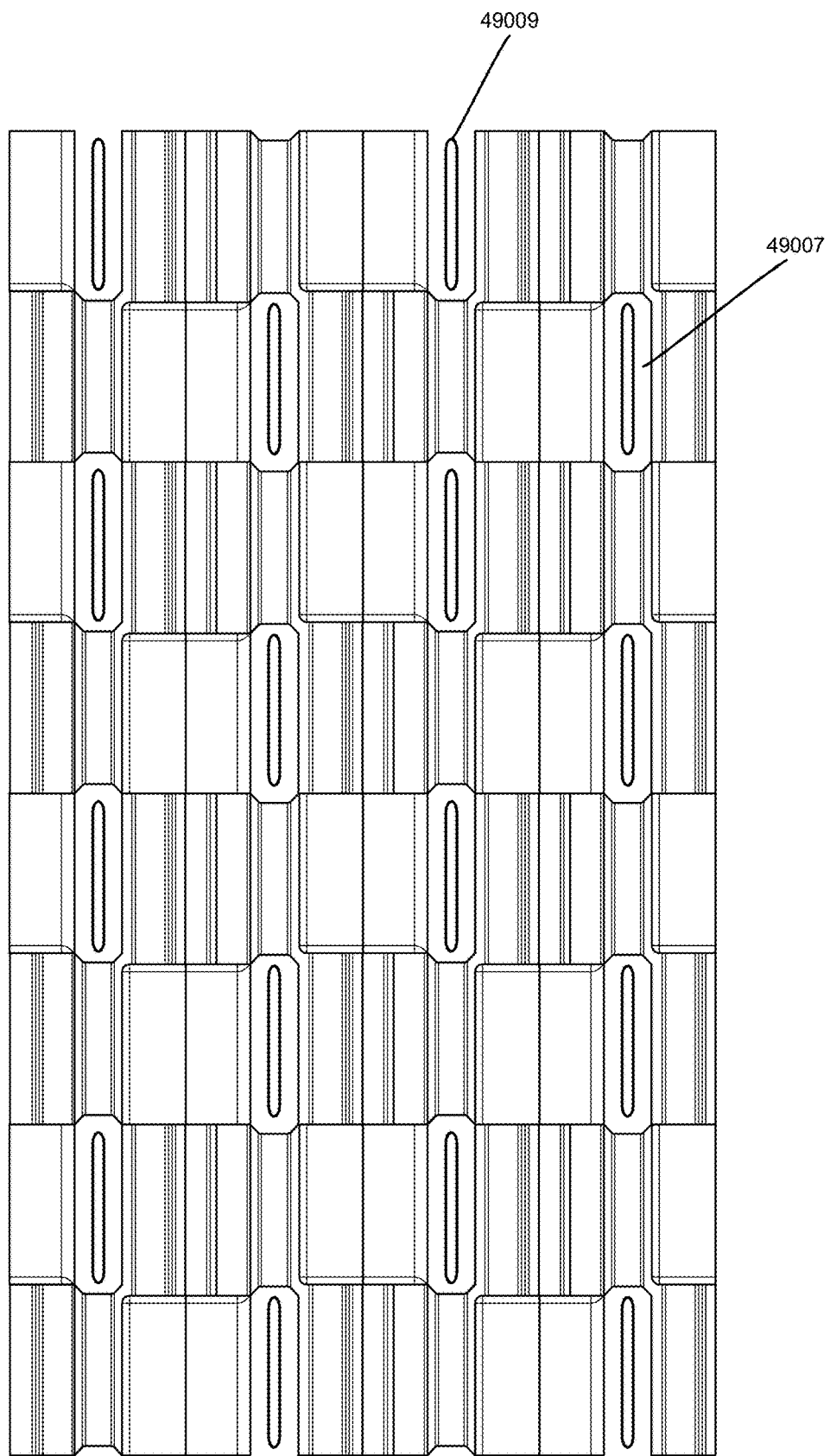
FIG. 51 is a side view of the block(s) of FIG. 49 according to the example implementations.

Note that the block(s) of FIG. 49-FIG. 51 are otherwise mostly similar to the blocks of FIG. 46 but with multiple fluid slots 49003 positioned above a given radiation cavity 49001. In these implementations, the stream of fluid passes through the multiple fluid flow slots from a corresponding radiation cavity (and in many cases, from the multiple fluid flow slots into another corresponding radiation cavity of the fluid pathway). This may provide additional structural stability and thermal storage density. Further, the smaller slots may reduce laminar flow in the slots, which may improve energy transfer.

FIG. 50 is an isometric view of the block(s) of FIG. 49 and FIG. 51 is a side view of the block(s) of FIG. 49.

Example Stacks and Thermal Storage Unit

Figure 52:
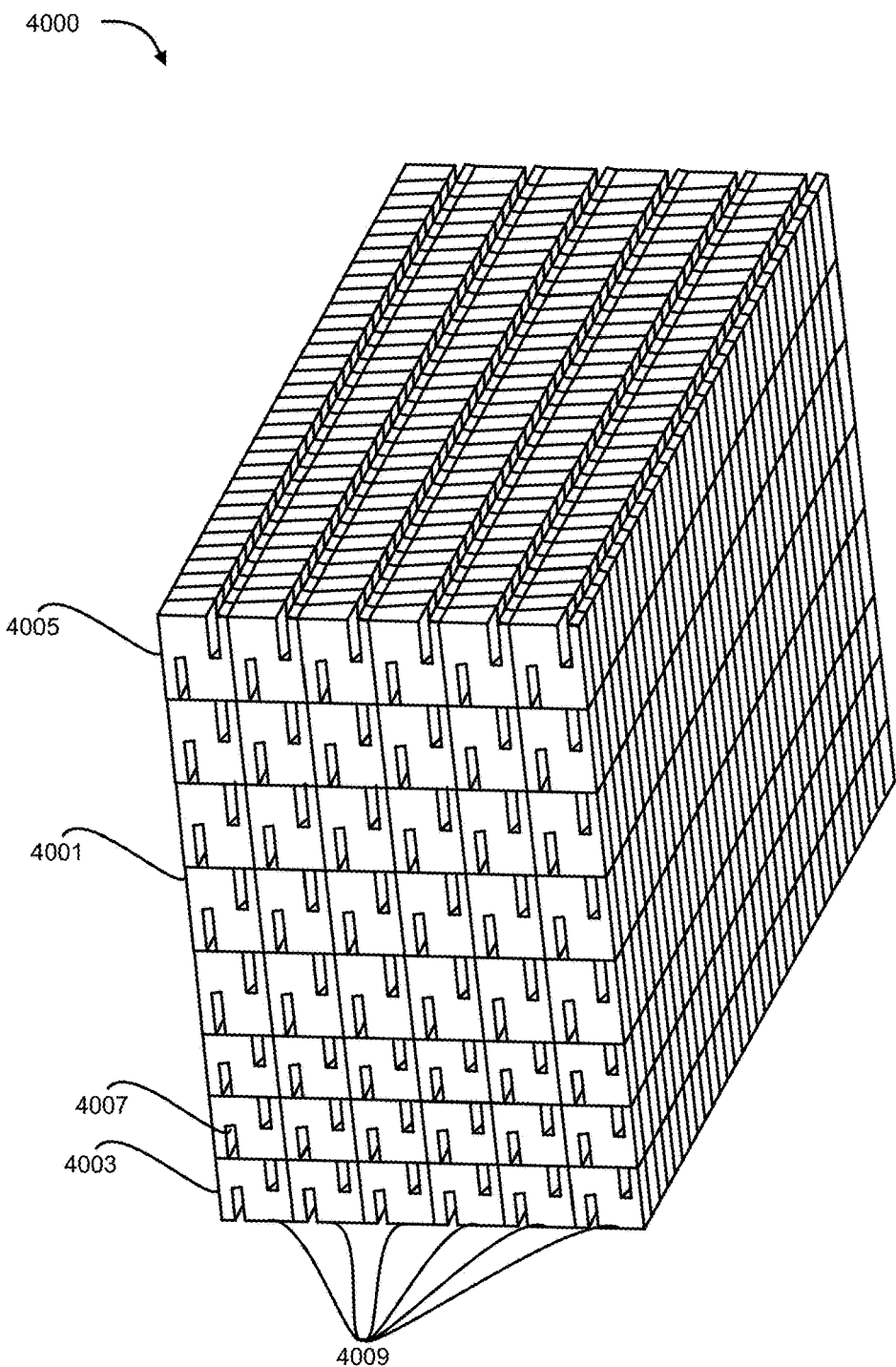
FIG. 52 illustrates an example stack of bricks with plural columns according to the example implementations.

FIG. 52 illustrates an isometric view 4000 of the stack 4001 of bricks (which may also be referred to as an assemblage) according to an example implementation. More specifically, columns 4009 of the bricks are provided. In this case, there are six columns. However, the number of columns is not specifically limited, and more or less columns may be formed in a stack. Additionally, the stack has a lower portion 4003 and an upper portion 4005. Bricks at the lower portion 4003 may have a smaller height as compared with bricks at the upper portion 4005 of the stack 4001. Openings 4007 for the resistive heating elements are also shown for reference.

Figure 53:
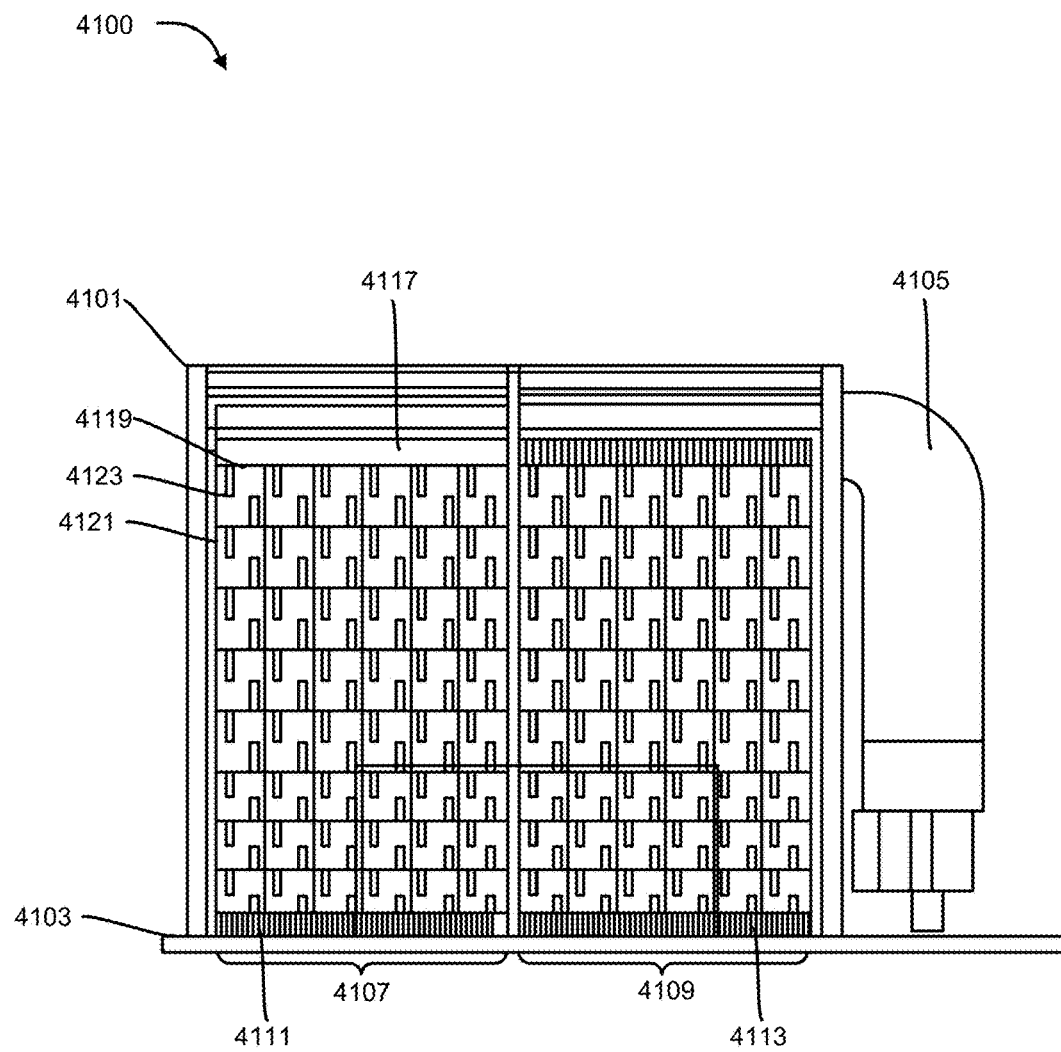
FIG. 53 illustrates a side view of the stacks of bricks and HRSG in the thermal energy storage system to the example implementations.

FIG. 53 illustrates a side view 4100 of an example system according to some implementations. An outer structure 4101 may include a frame that provides seismic protection, as well as an outer surface of the TSU itself. The outer surface of the TSU and the frame need not be built integrally or even connected with one another, but may optionally have such an arrangement. Additionally, a foundation 4103 is provided at a lower surface of the TSU. A steam generator 4105 is provided at an output of the TSU, as well as an air blower that is not illustrated.

The system may include multiple units 4107, 4109 that are individually controlled for discharge and charge, as explained above. Each of the units 4107, 4109 include stacks of bricks formed in columns 4119. The bricks 4121 may include a passage or opening 4123, through which the resistive heating element may pass.

Figure 54:
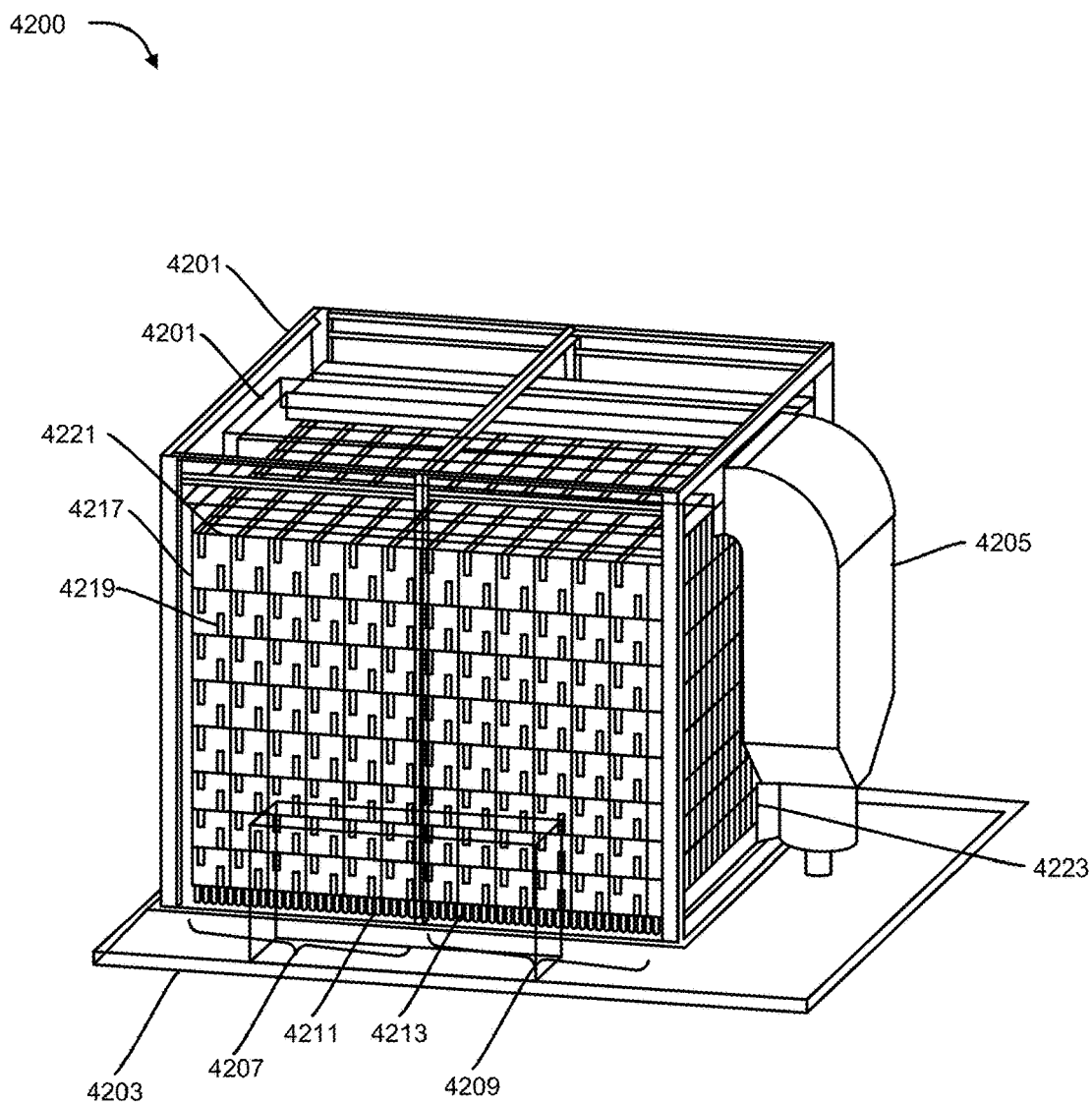
FIG. 54 illustrates an isometric view of the structure including the stacks of bricks and HRSG in the thermal energy storage system according to the example implementations.

At the lower portion of the units 4107, 4109, the flow of incoming fluid may be controlled by louvers 4111 and 4113, respectively. The louvers may be operated in conjunction with the hot fluid bypass, which is explained above with respect to the overall system. As also explained above, each unit 4107, 4109 is controlled independently, such that the louver 4111 is open while the louver 4113 is closed. Similarly, fluid dams or louvers may be provided at the upper portions, as depicted at 4115 and 4117, respectively FIG. 54 illustrates an isometric view 4200 of the system, with cutaways showing the system elements, according to the example implementations. More specifically, the structure 4201 may include the outer frame having seismic protection features, either integrally or separate from the outer surface of the TSU. A foundation 4203 and the steam generator 4205 are illustrated as well as the fluid blower 4223.

Each of the units 4207, 4209 may be separated by one or more brick support structures or walls having insulated properties. Thus, the controller may independently control the charge and discharge of each of the units 4207, 4209. Further, as explained above louvers 4211 and 4213 are provided to control the flow of input pair to the units 4207, 4209. As shown at 4215, the heated fluid is channeled to the steam generator 4205. For reference, each of the units 4207 includes multiple columns 4221 of stacked bricks 4217, including heating elements in a space at 4219.

Figure 55:
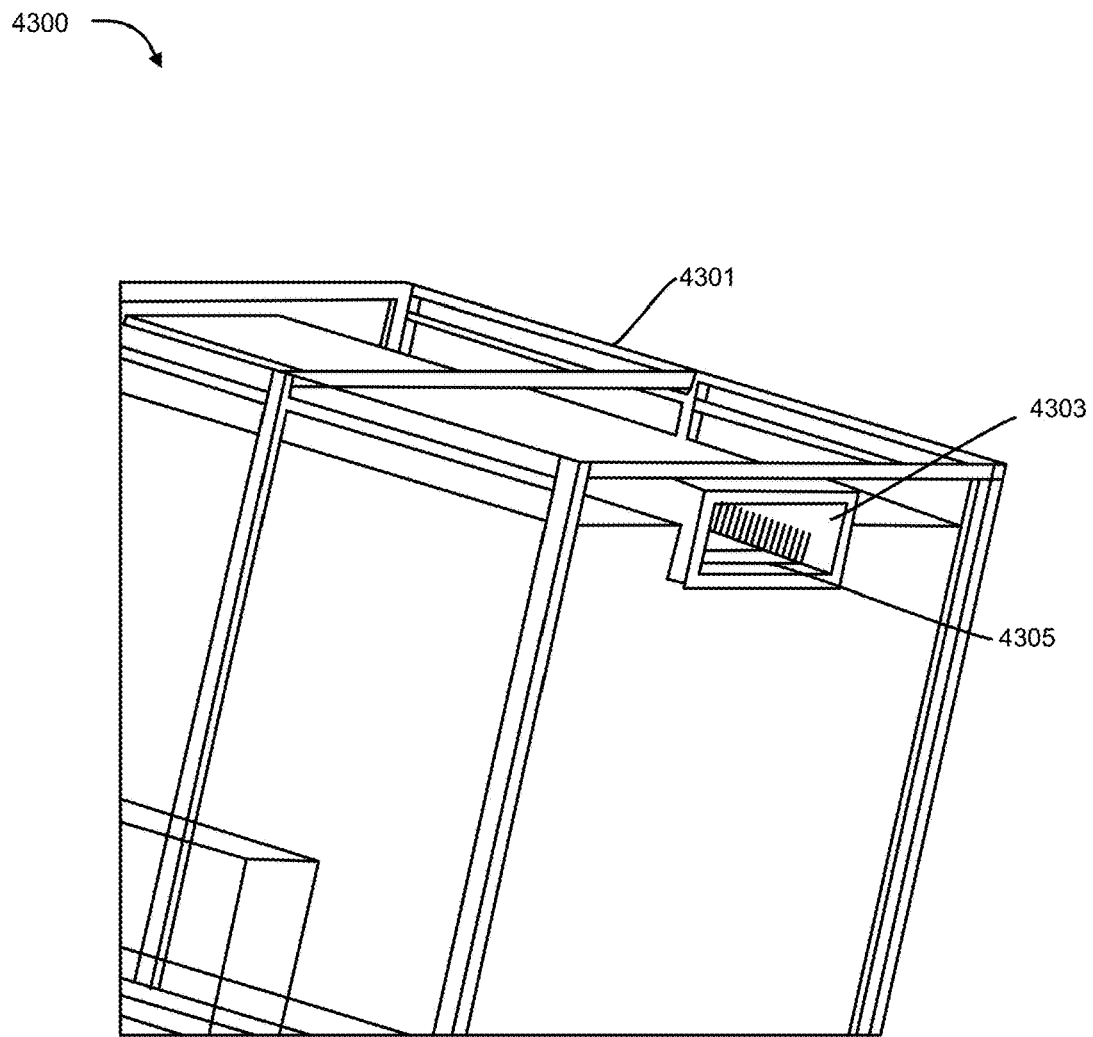
FIG. 55 illustrates an isometric view of the frame and the output region of stacks of bricks in the thermal energy storage system according to the example implementations.

FIG. 55 illustrates an isometric view 4300 of an outer structure 4301 of the TSU according to an example implementation. A duct or channel 4303 is provided to output the hot fluid to the steam generator, which is not shown. The hot fluid is channeled from the stacks of bricks in the units by way of passages 4305.

Figure 56:
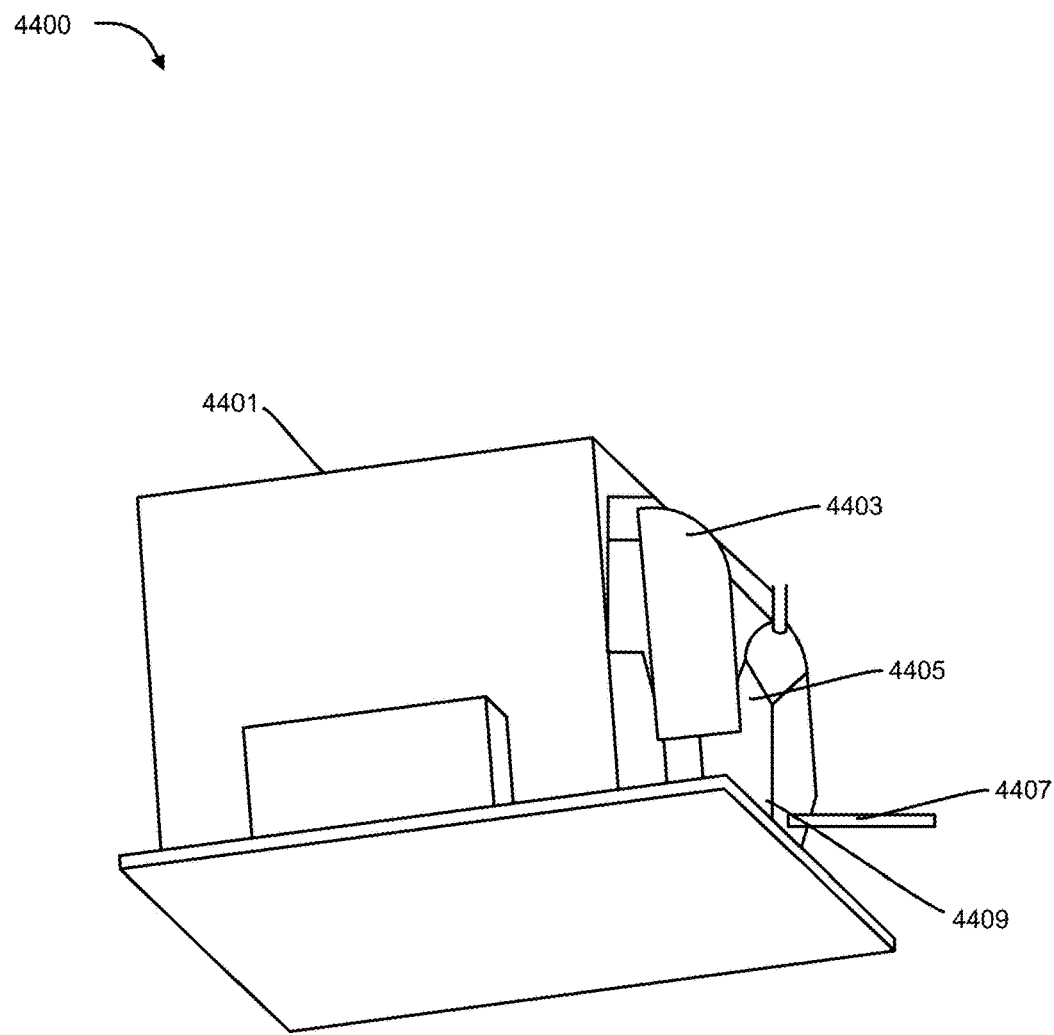
FIG. 56 illustrates an isometric view from below of the thermal energy storage system according to the example implementations.

FIG. 56 illustrates another perspective view 4400 of the thermal energy storage system according to the example implementations. It is understood that the stacks of bricks, units, dynamic insulation, and other structures and features described above are contained in the TSU 4401. The output of the TSU 4401 provides hot fluid to output 4403. The hot fluid is received at 4405 by a steam generator. However, additional structures may be provided such that the hot fluid is sent, either simultaneously or independently, directly to industrial application. Also shown is a water input 4407, which may pump water through the conduits of the steam generator 4405 based on water received as feedback from industrial application, or water from an external source. The fluid blower 4409, which provides the cooled fluid that is the byproduct of passing through the steam generator, or reuse in the TSU 4401, as circulated either by dynamic insulation or hot fluid bypass, as explained above.

Figure 57:
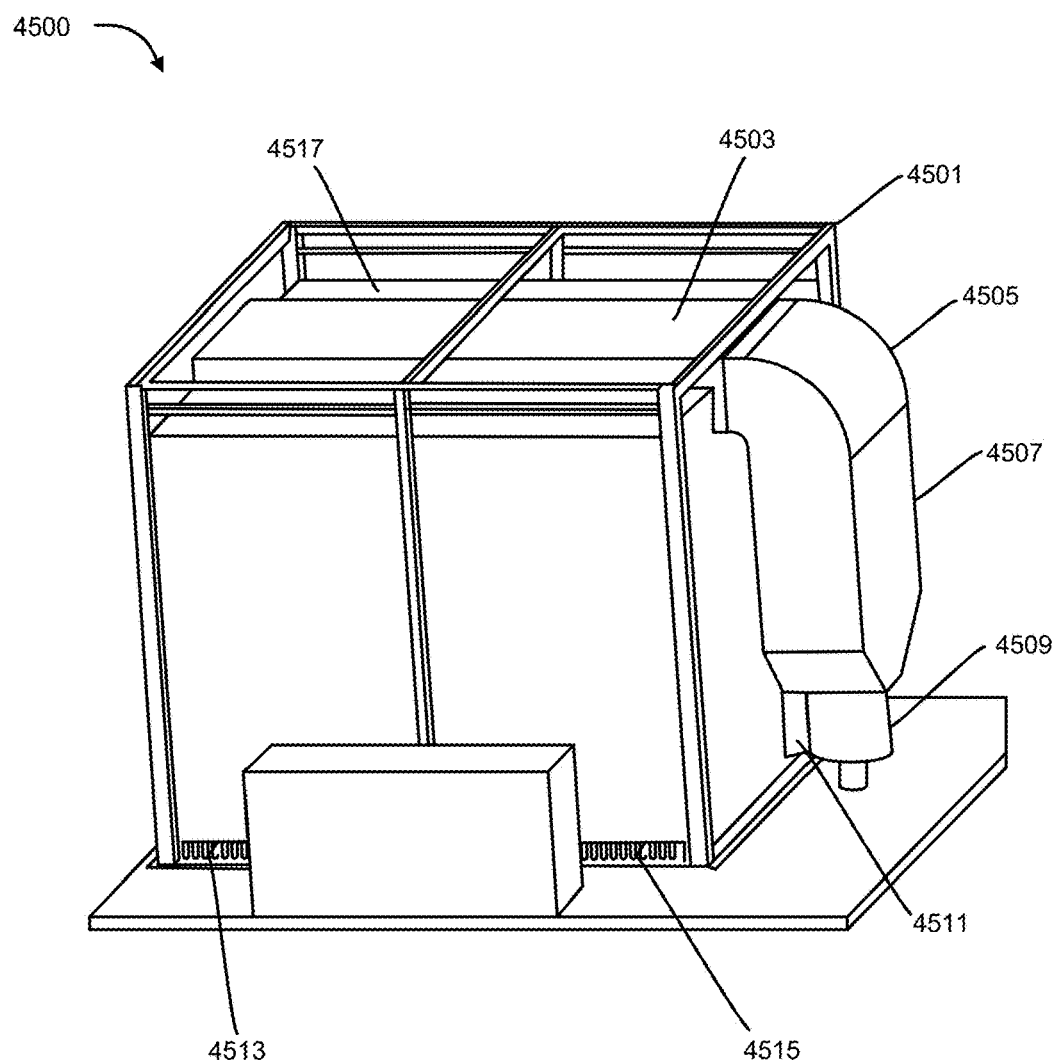
FIG. 57 illustrates an isometric view of the thermal energy storage system according to the example implementations.

FIG. 57 illustrates an isometric view 4500 of the thermal energy storage system according to an example implementation. As explained above, the system may be framed with seismic protection features, either separate or integral with the outer structure 4501. Between the outer structure 4501 and an insulation layer 4517, there is a fluid gap for dynamic insulation as discussed in detail below, having the flow controlled by louvers 4513 and 4515 at the entrance of the stacks. Further, a passage 4503 receives the heated fluid from the stacks of bricks and the units, and passes the heated fluid to an output, and a duct 4505, which provides the heat to be used in industrial applications such as a steam generator or as direct airport other industrial process. The output may be processed at 4507 at the steam generator. Additionally, at 4509, inputs of water and outputs of steam may be provided. The cooled fluid may be recirculated to the TSU by way of the blower 4511.

Example System with Dynamic Insulation and Failsafe Venting Techniques

In some implementations, the system uses dynamic insulation to advantageously improve insulation of a TSU, allow use of less expensive insulation materials, increase equipment life, or some combination thereof. In some implementations, the system uses a stream of fluid that will eventually pass through one or more assemblages of thermal storage blocks to first facilitate passive insulation. In some implementations, the fluid is recycled, e.g., from a steam generator.

Further, the system may advantageously use failsafe venting to avoid overheating in certain failure scenarios. The venting may also be used for temperature reduction to allow TSU maintenance. Disclosed dynamic insulation and failsafe venting techniques may be implemented independently (e.g., a system may use dynamic insulation but not failsafe venting or vice versa). In some implementations, however, the two techniques operate in a synergistic manner. For example, the failsafe venting may use the chimney effect to passively draw fluid through passageways through which fluid is normally directed by a blower for dynamic insulation.

Figure 58:
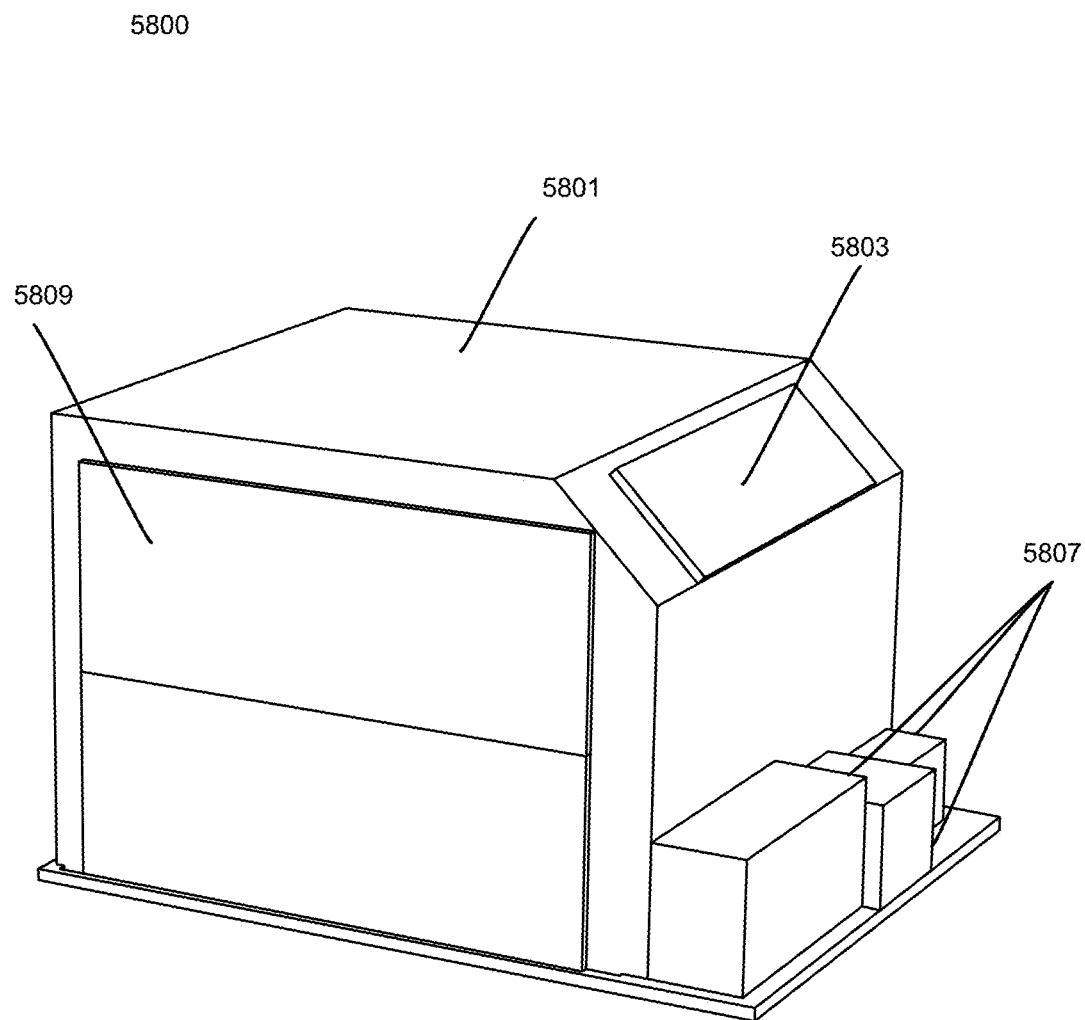
FIG. 58 provides an isometric view of another example thermal storage unit including failsafe vent panel, according to some implementations.

FIG. 58 provides an isometric view of another example thermal storage unit, according to some implementations. In the illustrated example, the thermal storage unit 5800 includes an outside enclosure 5801 an external vent closure 5803, side vents 5809, and components 5807. In some implementations, various vents may open to cool the unit for maintenance or to safely cool the unit in case of equipment failure. Examples of potential equipment failures include, without limitation: blower failures, power outages, water failures. Various elements utilized for dynamic insulation may also be used for passive cooling by the failsafe mechanism.

In some implementations, at least a portion of the steam generator is included within the outer enclosure 5801 (as shown in FIG. 58 through FIG. 62 and discussed in detail below). Other components 5807 located outside the outer enclosure may include other steam generator components such as a water pump, valves, an emergency pressure relief valve, etc. In some implementations, the portion of the steam generator in which heated fluid from the thermal storage blocks interacts with water tubes is included in the outer enclosure. In some implementations, this may advantageously allow fluid leaks in certain locations to occur within the outer enclosure, which may mitigate effects of those leaks relative to leaks to an exterior of the outer enclosure. Further, pressure differences within different parts of the unit may also mitigate effects of fluid leaks. Components 5807 may further include other components that are not part of the steam generator such as electrical components, cooling systems for electrical components, etc.

Figure 59:
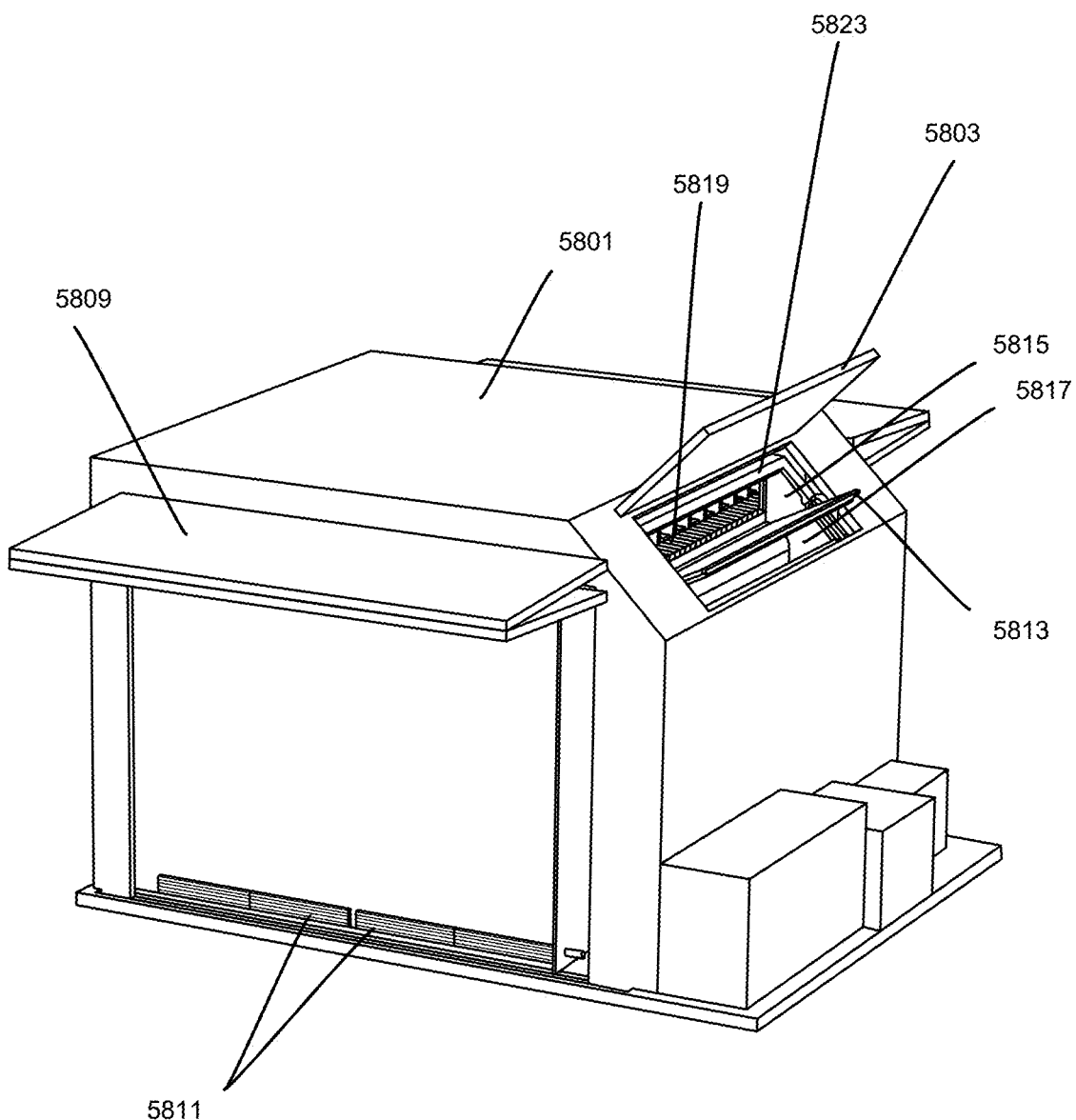
FIG. 59 provides an isometric view of the thermal storage unit with multiple vents closures open, according to some implementations.

FIG. 59 provides an isometric view of the thermal storage unit with multiple vents closures open, according to some implementations. Therefore, FIG. 59 may represent a maintenance or failsafe mode of operation. As shown, the thermal storage unit also includes an inner enclosure 5823 (shown in more detail in FIG. 60). The outer surface of the inner enclosure 5823 and the inner surface of the outer enclosure define a fluid passageway through which fluid may be conducted actively for dynamic cooling or passively for failsafe operation.

The inner enclosure 5823 includes two vents 5815 and 5817 which include corresponding vent closures in some implementations (portions of vent door 5813, in this example). In some implementations, vents 5815 and 5817 define respective passages between an interior of the inner enclosure 5823 and an exterior of the inner enclosure. When the external vent closure 5803 is open, these two vents are exposed to the exterior of the outer enclosure as well.

As shown, the vent 5815 may vent heated fluid from the thermal storage blocks conducted by duct 5819. The vent 5817 may allow entry of exterior fluid into the fluid passageway and eventually into the bottoms of the thermal storage block assemblies via louvers 5811 (the vent closure 5809 may remain closed in this situation). In some implementations, the buoyancy of fluid heated by the blocks causes it to exit vent 5815 and a chimney effect pulls external fluid into the outer enclosure via vent 5817. This external fluid may then be directed through louvers 5811 due to the chimney effect and facilitate cooling of the unit. Speaking generally, a first vent closure may open to output heated fluid and a second vent closure may open to input external fluid for passive venting operation.

During passive cooling, the louvers 5811 may also receive external fluid directly, e.g., when vent closure 5809 is open. In this situation, both vents 5815 and 5817 may output fluid from the inner and outer enclosures.

Vent door 5813 in the illustrated implementation, also closes an input to the steam generator when the vents 5815 and 5817 are open. This may prevent damage to steam generator components (such as water tubes) when water is cut off, the blower is not operating, or other failure conditions. The vent 5817 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

Figure 60:
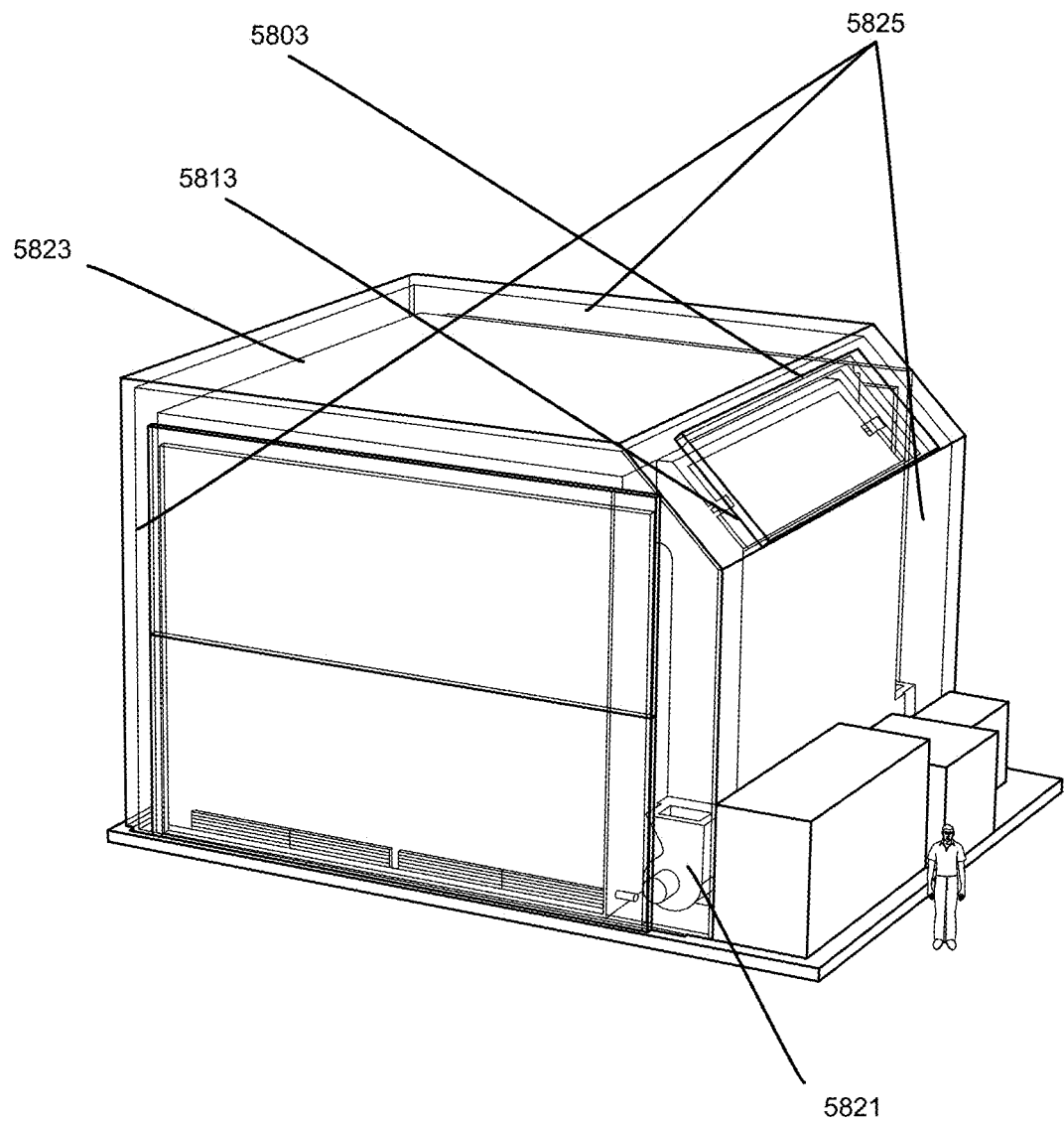
FIG. 60 provides an isometric view of the thermal storage unit with multiple vents closures closed and cutaways in the outer enclosure, according to some implementations.

When the vent door 5813 is closed (e.g., as shown in FIG. 60), it may define part of the fluid passageway used for dynamic insulation. For example, the fluid movement system may move fluid up along one wall of the inner enclosure, across an outer surface of the vent door 5813, across a roof of the inner enclosure, down one or more other sides of the inner enclosure, and into the thermal storage blocks (e.g., via louvers 5811). Louvers 5811 may allow control of fluid flow into assemblages of thermal storage blocks, including independent control of separately-insulated assemblages in some implementations.

Figure 61:
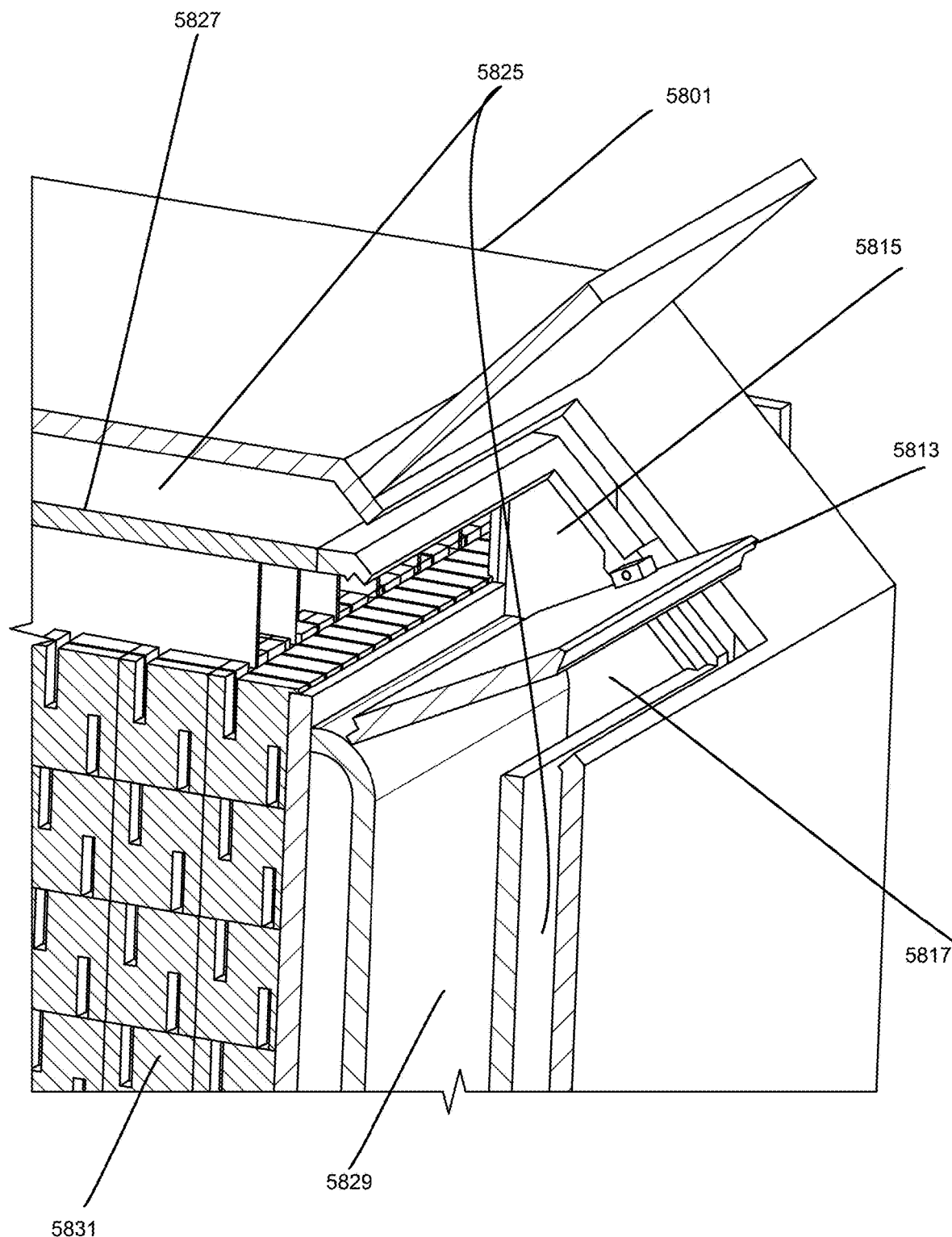
FIG. 61 provides a more detailed perspective view of the primary vent closure, according to some implementations.

In the closed position, vent door 5813 may also define an input pathway for heated fluid to pass from the thermal storage blocks to the duct 5819 and beneath the vent door 5813 into the steam generator to generate steam. FIG. 61 shows a passageway 5829 that is open when the vent door 5813 closes vents 5815 and 5817 for heated fluid to enter the steam generator.

In some implementations, one or more of vent door 5813, vent closure 5803, and vent closure 5809 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

As one example, the thermal storage unit may include a worm gear (not shown) configured to close a vent closure under electric power and an electric clutch configured to hold the vent closure in position. In some implementations, when the electric clutch is unpowered, the force of gravity pulls the vent closure open. In some implementations, the unit includes a counterweight configured to facilitate opening of one or more vent closures. In some implementations, the unit includes one or more resilient members, for example springs, configured to push or pull a vent closure open. In some implementations, one or more electrical switches are configured to control opening or closing of one or more vent closures. Further, one or more vent closures may be opened manually or based on manual control input, e.g., for maintenance mode.

In some implementations, one or more vent closures are opened while a fluid blower is operating, e.g., to rapidly cool the unit for maintenance.

FIG. 60 provides an isometric view of the thermal storage unit with multiple vents closures closed and cutaways in the outer enclosure, according to some implementations. As shown, the enclosures form multiple portions 5825 of a fluid passage between the inner enclosure 5827 and the outer enclosure 5801. Fluid may move along these portions when driven by the fluid movement system (e.g., a blower 5821) for dynamic insulation or passively during failsafe operation.

FIG. 61 provides a more detailed perspective view of the primary vent closure, according to some implementations. As shown passage 5829 leads into the steam generator and this input is closed off from the thermal storage blocks when the vent door 5813 is open, but opens allow passage of external fluid into the outer enclosure (including into passage 5825). FIG. 61 also shows an assemblage 5831 of thermal storage bricks.

Figure 62:
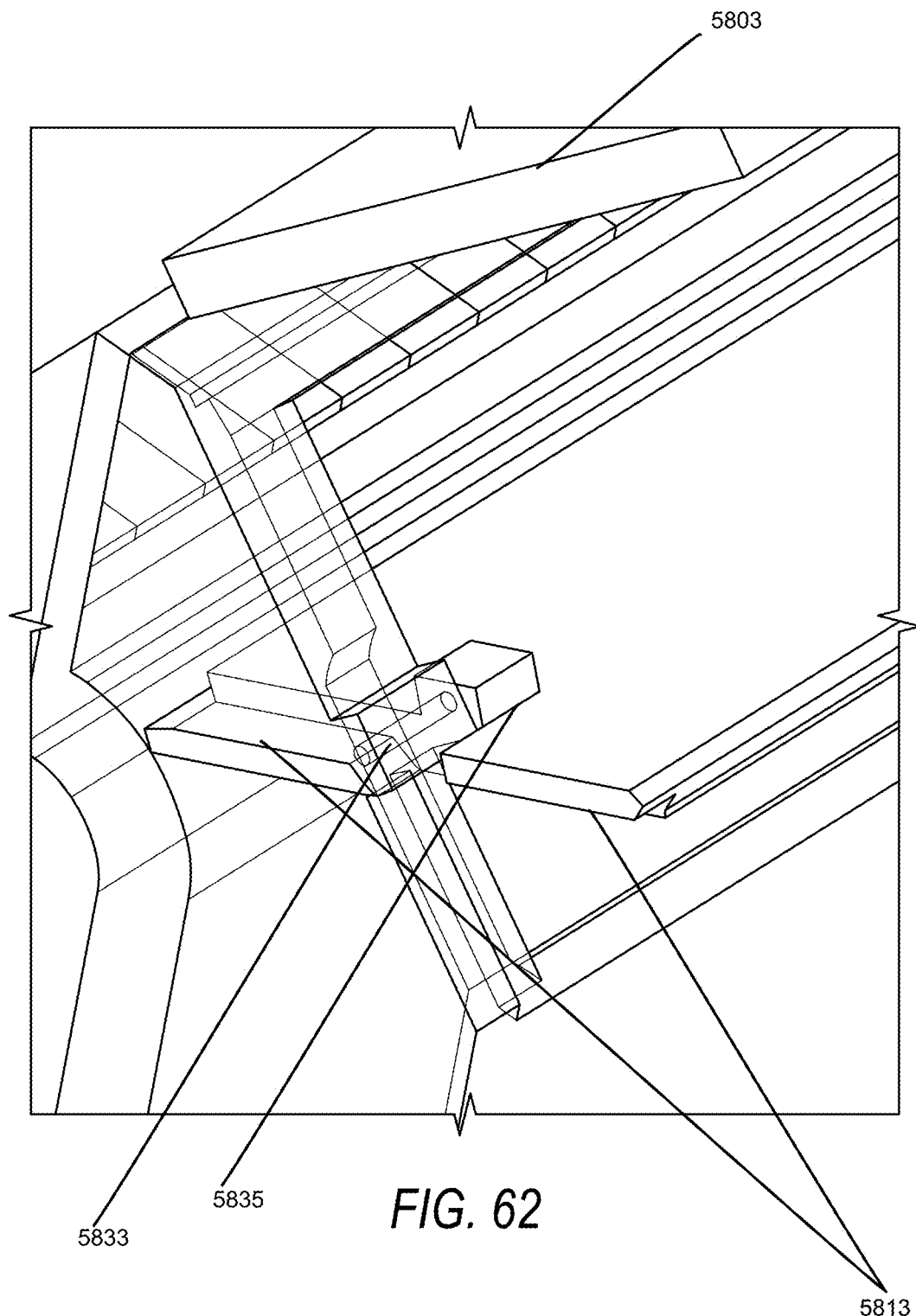
FIG. 62 provides a still more detailed perspective view of a hinge for the primary vent closure, according to some implementations.

FIG. 62 provides a still more detailed perspective view of a hinge for the primary vent closure, according to some implementations. In the illustrated example, the vent door 5813 includes a hinge formed by a cylinder 5833 and a slot in portion 5835 and is configured to rotate about the hinge. In some implementations, the hinge is not centered which may cause gravity to pull the door 5813 open when it is not held shut. As shown, the door 5813 may include various surfaces configured to provide a strong seal against one or more surfaces when open or closed.

As discussed above, dynamic insulation may be implemented in the TSU. The example system may also include passive failsafe safety features. When the system is switched off, thermal conduction might slowly heat up the foundation without passive venting features. One or more vents may create a chimney effect by allowing external fluid into the system, and allowing the hot fluid within the system to be vented upward out of the unit. This may allow the system fluid out at a slow rate without requiring a blower, due to the natural convective movement of fluid caused by the buoyancy of hot fluid rising through the columns. This buoyancy effect may pull cool fluid in and through the system as a passive safety measure, which opens the passage if power has been interrupted, and ensures that the system does not slowly overheat. This aspect of the example implementations may advantageously make the system intrinsically safe and allow the system to be placed in locations that may not be otherwise permitted if the exterior surfaces were unsafe (e.g., too hot) to the touch.

This passive cooling may prevent the bricks from reaching temperatures high enough to melt steel reinforcing structures that provide seismic reinforcement and structural support for the bricks. This reinforcing structure may be located within the unit but outside the dynamic insulation passageway.

The buoyancy of fluid may enable an automated flow of the fluid through at least one of the fluid pathways through thermal storage blocks from the bottom end of the cells to the upper end of the such that the fluid passing through the bricks and/or heating elements of the cells absorbs thermal energy from the brick and/or heating elements, even when the fluid blowing units fail to operate in case of power or mechanical failure, thereby maintaining the temperature of the unit outer walls and supports at or below their predefined temperatures. Such buoyancy-driven flow may be obtained by one or more movable panels or other ports which passively open at an upper location and a lower location within the system upon such component failure or power failure.

The design of such ports and fluid flow conduits may improve the intrinsic passive safety of the unit, ensuring that critical elements such as structural supports and safety-related elements such as external surfaces do not exceed their design limits, without active equipment or the requirement for supplied power. This configuration may allow the system to achieve a controlled, stable shutdown even in the event of unexpected mechanical failure, sensor failure, or power loss to the blowers or any other control system failure. This configuration may also facilitate controlled cooling for maintenance, passively or in conjunction with one or more active blowers.

Brick Materials

In some implementations, thermal storage blocks are made of a refractory material (e.g., castable) having high thermal conductivity and absorption capability. The brick may be made of a predefined composition of any or a combination of alumina, aggregates like magnetite or olivine, and binders. The material selection, sizing, and fraction of aggregate in binder may be chosen to optimize strength, thermal conductivity, temperature range, specific heat, and/or cost. For example, materials of higher thermal conductivity reduce temperature differences for given heat flux, and enable the use of fewer, larger bricks. Binder materials may be chosen which set during casting, or may be chosen as materials which are thermally fired prior to use or which change composition once heated in use.

The bricks may be manufactured using a mold. More specifically, the material may be provided in a powder form that is mixed with water, to achieve a consistency based on the amount of added water relative to the volume of power. The mixture is poured into a mold, and sets in the mold for a period of time. The mold is removed, and the set bricks are formed. Alternatively, the bricks may be manufactured using a brick press system or a brick extrusion system. Regardless of the method of fabrication, the bricks may be formed in a manner that reduces or eliminates unintended voids within solid block areas.

Figure 63:
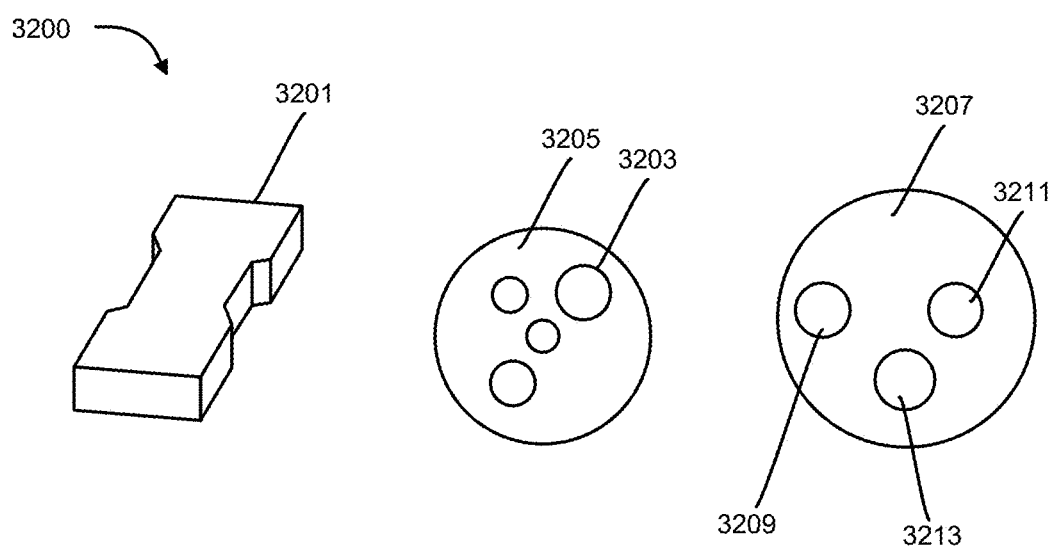
FIG. 63 illustrates a composition of a brick according to the example implementations.

FIG. 63 illustrates a composition 3200 of the brick 3201 according to the example implementations. An aggregate 3203, 3209 is provided in a binder 3205. Additionally, heat conductivity elements 3213, phase change materials 3211, and/or strengthening elements 3207 may also be included.

Brick elements may also include elements which improve the mechanical strength of the material, particularly in tension, such as needles or fibers or wires, and may include materials designed to change in physical ways that absorb and release heat, such as reversible thermochemical reactions or phase changes such as melting and freezing. These materials may be used selectively in some of the bricks, with different bricks having different compositions.

The predefined composition of the thermally conductive materials and the predefined dimension of the bricks being used, and the thermo-electrical attributes of the heating elements corresponding to each of the bricks, may be chosen such that each of the bricks corresponding to a cell may be heated uniformly so that a substantially constant temperature profile is maintained along the length (or height) of each of the cells for a predetermined time. The foregoing example implementation may have benefits and advantages, including slowing temperature ramp, as well as reducing the generation of hot and cold hot spots, mechanical stress, thermal stress, and cracking in the bricks. Further, the use of multiple bricks to form a single cell may facilitate larger channel surface area and lower heat flux per unit area.

Bricks—Pretreatment

Thermal storage blocks and other components may also benefit from pre-treatment and conditioning. For example, a brick may be exposed to one or more thermal cycle with controlled heating and cooling rates, either prior to installation or within the storage system prior to being put into service given that the initial cycles may have a larger impact on its mechanical properties than subsequent cycles.

Storage Unit Components/Integration

For the storage unit, shipping containers may be used, but are not limited thereto. For example, the storage unit may be on the order of 6 meters tall, housing the stacks of bricks. The containers include electronics and wires coupling the containers to the brick housing structure that is protected to avoid damage due to external elements such as rain. The electronics may remain at ambient temperature, allowing for the use of standard, off-the shelf components, and reliability. A steam generator is coupled to the storage system, and cool fluid flows over, under and around the stacks.

The heater elements may be integrated inside and with the brick to heat the storage media electrically during the charging period, such as during the day (or at a time that may be determined by other factors such as availability of electricity at a relatively lower cost). The structure houses a stack of bricks with fluid passages that run substantially vertically through them; the hot fluid exits through a duct at the top of the stack and adjacent to pipes, so as to convert water to steam. Cooler fluid may be recycled or may exit the back side of the structure, for example.

The unit may have, at an end, a wall with holes and the end of wires protruding and the jumpers to connect the wires from one side to the other. At the other end of the unit, the containers may be configured with a distribution of bus bars provided for electrical distribution to provide the power to the strings of wire heating elements. The bus bars are connected back to the controllers inside the containers.

The heating elements may be serviceable and replaceable, if needed, by sliding into and out of the openings passing through the building. Old elements, or elements that otherwise require servicing or replacement, may be pushed or pulled out and replaced with a new one without the need to move other elements such as the bus bars. Thus, the unit may be deenergized, the connections to the bus bar may be detached (e.g., unscrewed) from the container side, and the heating elements may be removed from the opposite side. New elements may be inserted from the opposite side and screwed into the bus bars from the container side, and the unit re-energized. During such a maintenance period, insulation may remain in place with the wire protruding through an insulating plug at the end.

The space between the inner and outer roof may contain the relatively cooler return fluid, and the inner enclosure may contain the very hot fluid coming off (e.g., exiting) the top of the stacks. An internal duct is provided that facilitates transport of the fluid through a duct through the steam generator, where the fluid exits. A fan located at the output of the steam generator may be placed in cold fluid, in the cavity between the inner and outer rooms. This configuration allows the fan to avoid needing to have the metallurgy required for higher temperature operations, and increases its reliability.

The hot fluid duct feeding into the steam generator may become expensive due to the high temperature of the fluid. It may also have a large pressure drop, since the fluid has expanded to multiple times the volume it was when it was cool. Thus, the hot fluid duct must be significantly larger than needed to handle the cool fluid. However, taking the fluid off at one side of the inner roof may reduce the cost of the high temperature duct for several reasons. For example, the quality of insulation that would otherwise be needed is not required, because any heat which is leaking out of that high temperature duct will warm the inlet fluid. Further, the hot fluid duct is very short and direct. A duct that needs to withstand such high temperatures is expensive, therefore limiting the length is beneficial. Further, the space between the inner roof and the outer roof may also include a divider, and a fan may be provided to control return fluid. On either side of this dividing wall, the return fluid is drawn back into the heating stack. Around the edges of the inner roof, a vertical duct is formed to allow the cooler fluid to descend to the bottom of the unit and return to the bottom of the brick stacks.

According to an example implementation, there is no other place (other than the duct connecting to the steam generator) where the outside of the unit experiences the full temperature of the system or the full temperature of the unit. This configuration may dramatically simplify the insulation in other locations and may dramatically reduce the losses and costs, at least because while there will be energy exiting this stack of bricks and through this wall, the incoming fluid is slightly preheated before it gets back to the stack of bricks.

The example implementation may be modified by optionally making it self-supporting and using a system of spacers to keep and maintain the spacing between the bricks. Conventionally, brick aspect ratio is chosen so that individual bricks do not topple in an earthquake, for example, by having a base width about 40%, e.g., 40%, of the height or greater. Spacers may be used to impart this stability on bricks that do not have the desired aspect ratio, but interlocking smaller bricks together to make a larger brick that has the desired stability. In this example, the spacers transfer forces from bricks above it and to the ones below and to the side through compression. This essentially makes the structure into a pyramid, an inherently self-supporting and stable structure, without the need for excessive wall bracing. The spacers may be made of a high temperature refractory or ceramic material and may also include features to interface with wire hangers.

Thermocline and Radiation Chamber

The first temperature of the bricks and the heating elements may be kept higher than the second temperature of the fluid for controlled discharge of thermal energy from the first section into the second section. For instance, the heating elements may be heated at a first predefined temperature of 1200° C. so that the bricks or cells also gets heated up to 1200° C., and fluid at 250° C. may be supplied through from the bottom end of the cells and heating elements, so that the fluid, upon absorbing thermal energy from the bricks and/or heating elements may attain the second temperature of 800° C. Further, the heated fluid of 800° C. may pass through the conduit such that the fluid inside the conduit may be converted into steam. Various structural aspects of the thermocline are provided below.

The bricks may be arranged to create a fluid passage between the bricks, in a repeating pattern. This results in the brick providing additional surface area for the heat in the brick to transfer to the fluid. The brick becomes a heat sink system. The fluid flow path is substantially vertically. Fluid comes into the bottom, goes up through these channels, gets heated as it goes up and escapes the top hot and goes into the roof area.

The bricks may optionally have a consistent amount of thermal mass along their length, to help maintain temperature uniformity and avoid significant narrowing that may cause hot spots. Optionally, the bricks may include a chamfer at the top and bottom, so that if the bricks are slightly misaligned, the fluid pathways are not closed. The fluid pathways may be relatively narrow and it may be important that the bricks are not offset from each other, which would close the fluid pathways and reduce the fluid flow. Accordingly, chamfers and other features at the top in the bottom of the bricks may have the advantage of preventing misalignment.

The bricks of the example may be stacked, such as in a stack six or more bricks high. Some of the bricks have a corresponding heating element that winds through and is hung from a feature in the structure. The bricks are spaced and designed such that they are self-supporting system.

From one slot for one set of heater wires to the next, a relatively small space, such as about 30 centimeters (for example, 30 centimeters), is required for the required performance because for the heating time available during the day, the dimension is limited by the conduction rate. Larger dimensions may result in sections of the brick not being efficiently used for thermal storage.

Optionally, the size of the fluid flow pathways may be adjusted to tune the fluid flow velocity in different areas, to counteract the temperature profile that already exists in the brick when it is heated. In other words, when the brick is heated, the side of the brick closest to the heater gets hottest and gets progressively cooler moving across the brick. If the energy is extracted equally from the whole system, the output fluid temperature would be a gradient reflecting the brick temperature gradient; hottest fluid near the wires and cooler fluid further from the heaters. Having larger pathways closer to the heater element may create less resistance to fluid flow, resulting in higher fluid velocity, and smaller channels further away from the heater element, which reduces fluid velocity in those regions, to obtain a more homogeneous fluid temperature. As the fluid traveling at higher velocity is in the pathway for less time and is in contact with the brick for less time, that fluid exits the pathway cooler than fluid traveling slower through the same section. The side of the brick with the bigger channels is hotter in the present example implementations; thus, size of these pathways may be tuned such that the fluid that comes out of the wide slots in the hottest part of the brick is nearly the same temperature as the fluid that comes out of the narrower slots in the lower temperature part of the brick.

Thus, by tuning the geometry of the brick and fluid pathways, the performance of the thermocline system may be improved and optimized to match the expected and desired charging and discharging characteristics. In addition to using differential fluid flow to even output temperature, by generally increasing or decreasing the overall fluid flow through the system, the temperature of the output fluid may be controlled.

According to some example implementations, the bricks are blocks that are separate and effectively have voids. These voids, which might be large voids, between the bricks in the stack create radiation chambers. In these example implementations, the energy may be transferred from the wire to the brick primarily by radiation energy transfer. When the wires get hot, the radiation contacts the brick and comes into radiative balance with a brick, where the brick is cooler than the wire trying to come up to temperature, and radiation from the brick cools the wire. Energy from the wire is thus exposed to more surface area of brick as compared with convective heating. The energy from this wire when it radiates down into this cavity energy penetrates into the cavity and becomes exposed to more surface and mass of brick, instead of just the surface right next to it, which gets a very high flux density and very high energy density. According to this example implementation, some bricks may radiatively heat each other after being heated by the wire. Thus, the system may achieve both direct and indirect radiant heating of brick surface as part of the heat transfer. This design allows the heater element wire to be further spread out.

Without radiative cavities designed to heat large surface of brick in this way, e.g., if conduction as the primary mechanism by which heat is being transferred, the design may be limited to a relatively small distance such as between 0.3 and 0.5 meters of space between wire curtains in some implementations, when matched to heating profiles for solar heating, as there is not enough time to heat the center of the mass of the bricks. By using radiation cavities, the wire curtain spacing may be spread out to more than 0.5 m and still efficiently utilize the entire mass of the brick. This allows for a reduction in the wire count. One benefit of this example implementation is that the total wire count may be reduced, for example, from 3,400 wires to potentially approximately 96 wires (for example, 96 wires) while transferring the same amount of energy as was being transferred from the 3,400 wires. Further, this example implementation, may use wire having a diameter in the range of 2.5 mm to 8 mm.

Design of Stack—Materials

During the course of normal operation of the thermal storage system, care may be taken to ensure that certain temperature ranges which may cause early failure are moved through quickly. For example, FeCrAl type alloys are known to embrittle if a significant amount of time is spent between 400-500° C. Different heating elements or bricks may have other sensitive temperature ranges where mechanical, thermal or physical properties are negatively affected. The control system may take this into consideration to avoid damaging the materials prematurely.

The thermal storage system may be designed in a way that some sections are made to handle higher temperatures. For example, a top section may comprise higher temperature rated heating elements, such as ones consisting of primarily SiC or MoSi2, and higher temperature rated brick, such as tabular alumina. Such a section could be heated, as required, to temperatures reaching 1500 C, 1600 C or higher. The geometry of bricks and wires may be different than those in another section of the thermal storage unit, to optimize performance, cost or mechanical stability. A second section of the storage, for example, in the lower part of the stack, could have lower temperature rated heating elements, such as metal heating elements in the FeCrAl class, and bricks that are a different material type, selected for cost, performance and mechanical properties as more load is placed on the bricks at the bottom.

Flow Mixing Structures

Additionally, the flow channel through the brick stack may be modified to facilitate or promote the mixing of gas. These modifications may reduce or eliminate hot spots and cool spots in the main stream. For example, the bricks may be structured (e.g., by fins or an arrangement of the slots) or assembled in a manner that directs the fluid to promote swirling or mixing of the fluid in the chambers, to improve heat transfer of the convection. Such mixing may even out temperature gradients, and have more even thermocline, and better performance, in addition to the benefits of radiative and reradiative heating, as explained above. This effect may be particularly advantageous at lower temperatures, or the beginning of the charge or late in the charge. Further, the greatest thermal gradient stress, which typically occurs most acutely at the beginning and end of the charge, is reduced.

Figure 64:
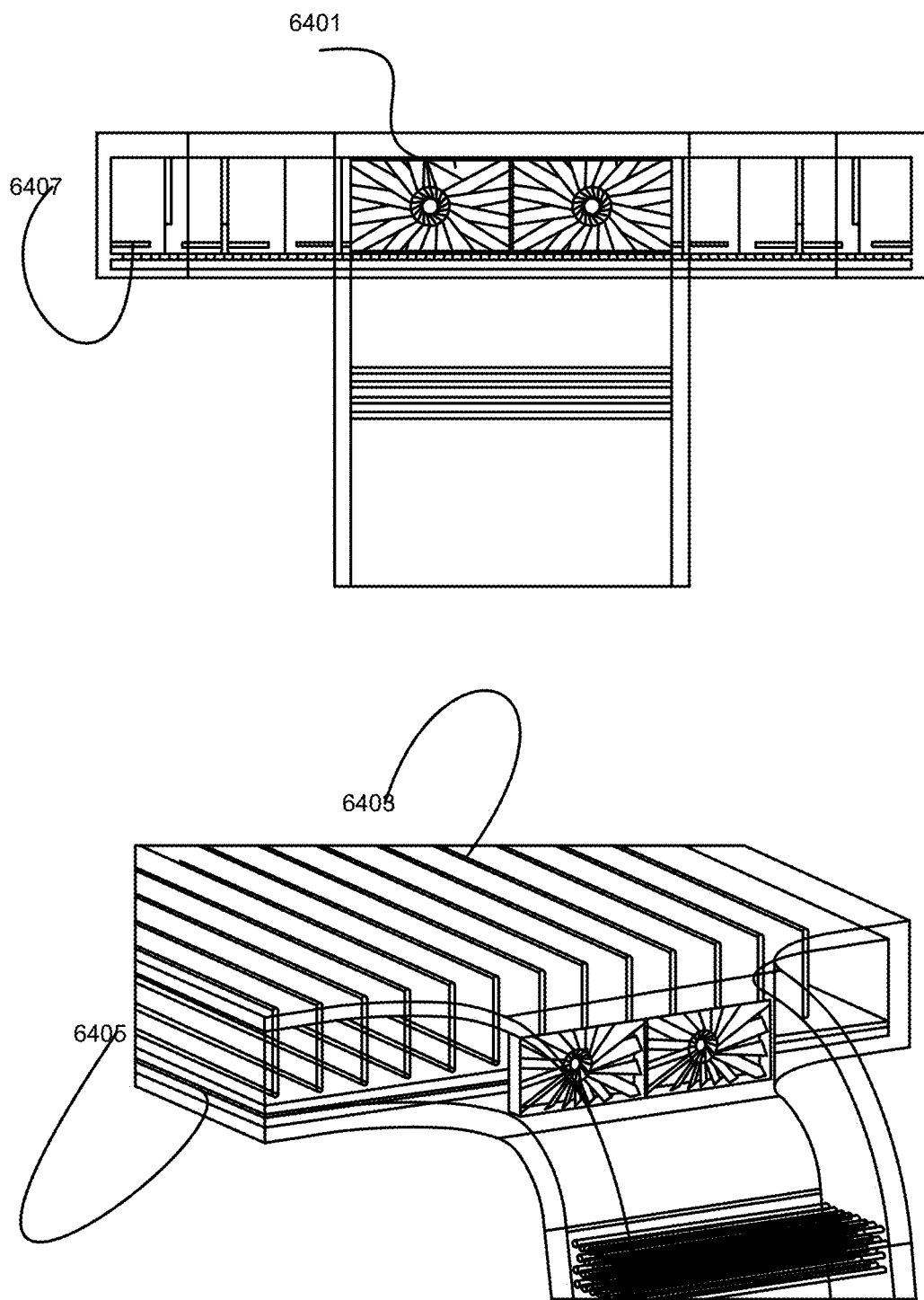
FIG. 64 shows a stationary auger and diverters according to the example implementations.
Figure 65:
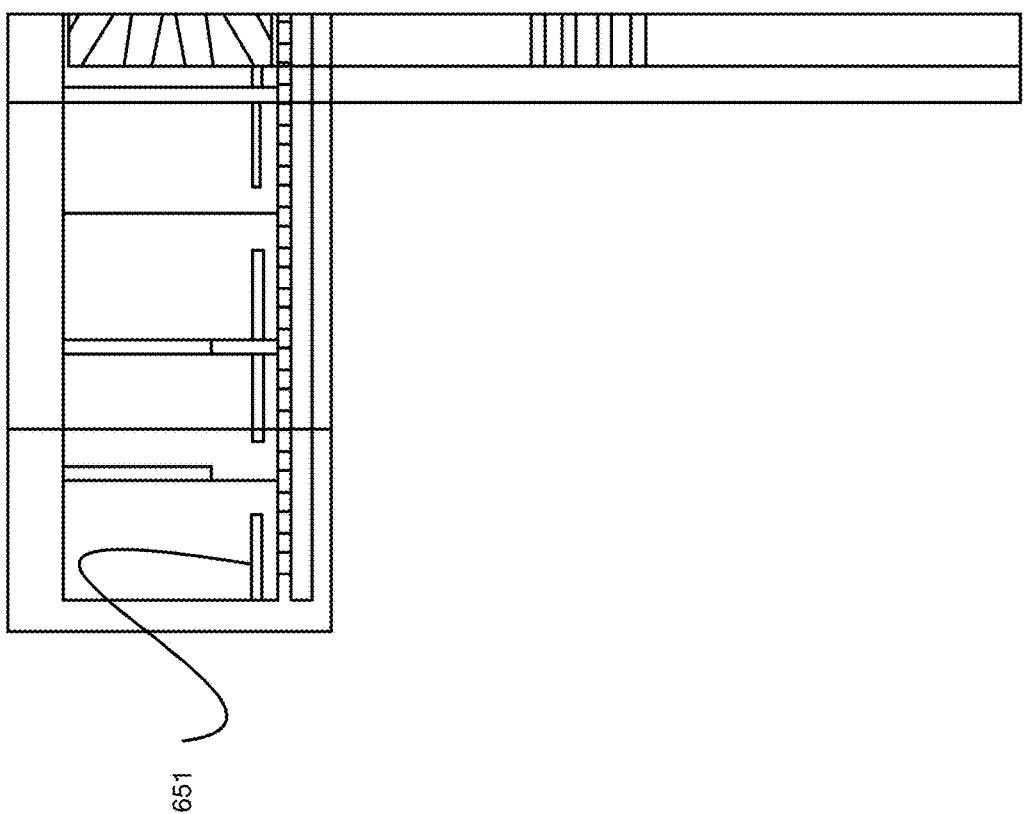
FIG. 65 shows the diverters with the above aspects of flow mixing according to the example implementations.

Additionally, cool bypass gas in the upper region of the stack may be blended by inducing swirl or turbulent flow, by a stationary auger or other feature at the top of the stack, with the gas discharged from the stacks, to obtain a more homogeneous temperature. For example, FIG. 64 shows a side view 6401 and an isometric view 6403 of a stationary auger 6405 at the top of the stacks, which may be used in combination with diverters 6407, to channelize and blend the output fluid flow. As shown in greater detail in FIG. 65, the diverters such as 651 at the top of the stacks divert the gas sideways instead of vertically, to create a swirl.

Heating Element

Traditional approaches may have problems and disadvantages associated with the heater for the thermal energy storage cells. For example, a traditional heater or heating element may experience problems and disadvantages such as mechanically induced chemical failure, which is also known as spalling. More specifically, scale growth may occur on the heater to a point where thermal stresses cause failure at an interface between the scale and the substrate. A result of the scale growth is flaking and loss of aluminum, until the aluminum reservoir reaches a critical point. Additionally, intrinsic chemical failure may occur when aluminum oxide breaks down, such that the aluminum migrates outward and the oxygen migrates inward, until the aluminum reservoir reaches a critical point.

As a result of the foregoing related art problems and disadvantages, a phenomenon known as "breakaway oxidation" may occur, where non-protective Cr2O3 (chromium oxide) and FexOy (iron oxide) scale quickly, and eventually lead to bulk oxidation and failure of the heating element. Thus, the reliability and lifetime of the heating element is substantially shortened.

As explained above, resistive heating elements are provided in channels that are formed between stacks of bricks at repeated horizontal and vertical positions in the units. The resistive heating elements receive electrical energy from the source, which may be a renewable or another source of variable electricity. The resistive heating elements release the electrical energy as heat, which is radiated to the stacks of bricks as explained above.

The resistive heating elements may be in the form of wire, which may be in the form of coils or wires, ribbons, or rods which pass through the stack in channels oriented in a direction parallel to heat transfer fluid flow or extend through the stack in channels transverse to heat transfer fluid flow.

According to an example implementation, coiled heating elements may be positioned in grooves running across the top and bottom of one or more bricks that may be stacked together. The heating elements may pass from one side of the unit to the other. With a jumper on one side and the coming back through the other side, an electrical circuit may be completed. The coils may be wired into series and parallel, to match the voltages that are being worked with.

This diameter of wire may reduce the resistance of the long wire string. As wire may be purchased on a mass basis, and thinner wire has additional processing costs, which may result in a cost savings of hundreds of thousands of dollars for one system, which is an added benefit. By using a thicker diameter wire, the overall life of the wire may be significantly increased because there is no longer cross-sectional wear from the heating or cooling of the wire, and the corrosion of the wire is much less rapid due to the larger cross section, even if the same corrosion rate. Further, increases of the wire diameter may further be feasible, potentially as high as 8 mm. One example implementation has features that restrict the heating elements from contacting the brick or each other, in case they undergo deformation. Such a feature could be a hook on multiple positions, for example, at the top and bottom extremes.

Figure 66A:
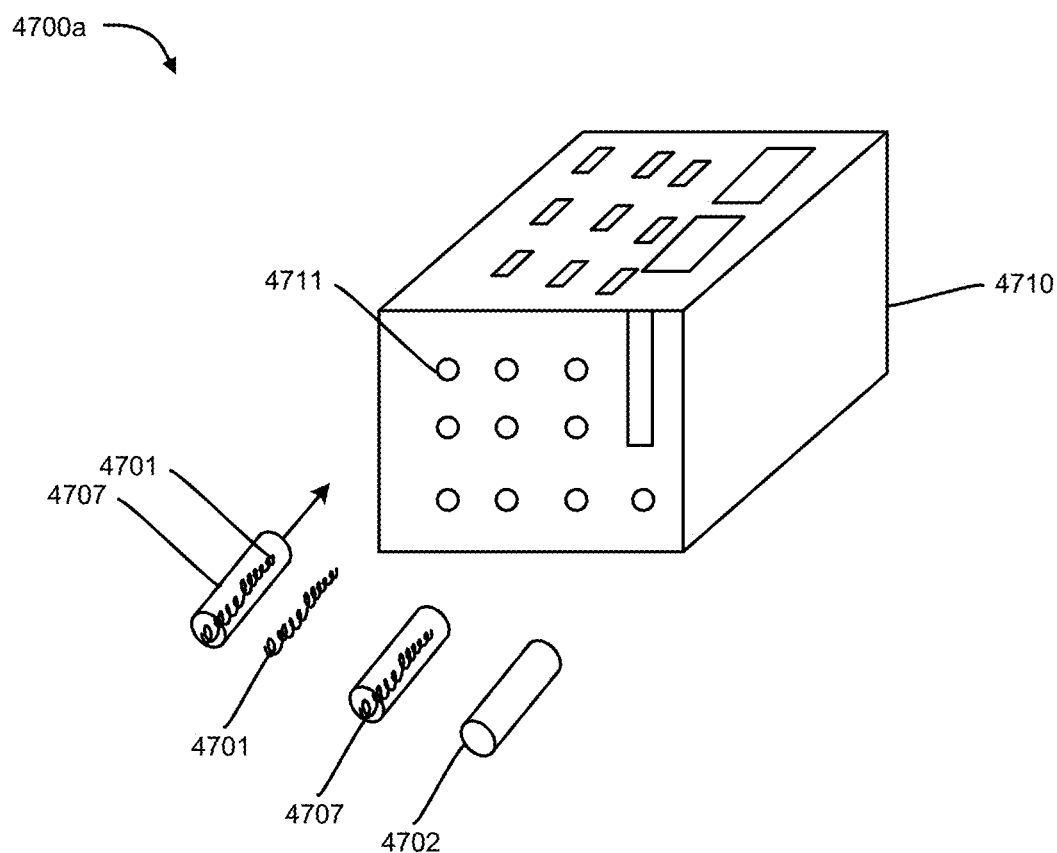
FIG. 66(A)-(C) illustrate various configurations of the resistive heating elements according to the example implementations.
Figure 66B:
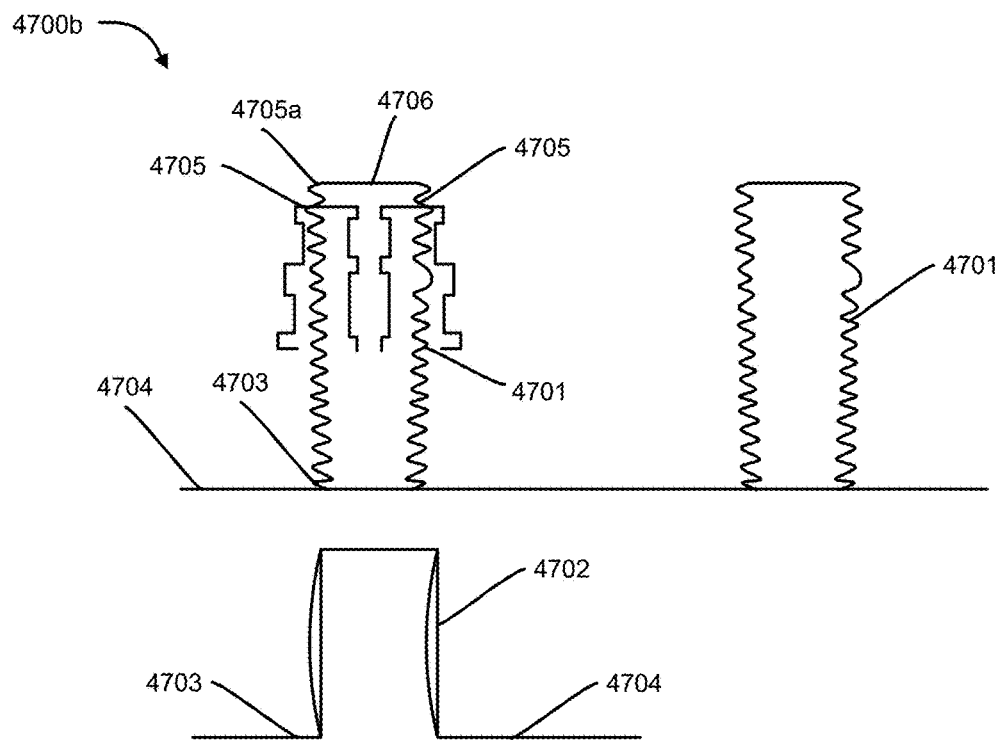
Figure 66C:
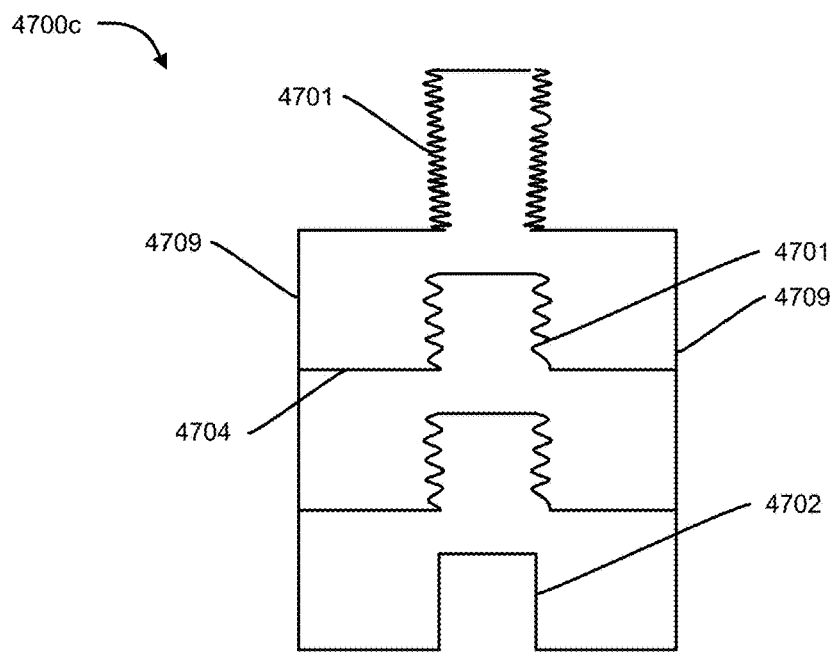

FIG. 66(A)-(C) illustrate various configurations of the resistive heating elements according to the example implementation. Resistance heaters may be individually wired, wired in groups that connect resistance heaters in series, in parallel, or in a combination of series and parallel.

As shown at 4700a, heaters 4701, 4702 extend through the refractory material. Heaters are installed into conduits 4711 after assembly of the refractory material, or during assembly of the material. Protective tubing 4707 may be used during installation and may be removed mechanically or melted or combusted by application of heat by the heater.

Electric power connections 4704 are joined to heaters at points 4703 with connections 4705a that prevent excessive heat build-up at connection points. Two or more heaters may be connected by successive connections 4705, 4706 before connection to power distribution 4704. As shown in the drawing at 4700, two coil-type heaters 4701 are connected by a connection 4706, followed by another two heaters in series along power connector 4704. Wire, rod, and ribbon-type heaters 4702 may be similarly connected.

As shown in 4700b, a refractory storage medium 4710, which may be the stacks of bricks, is provided with gaps or passages 4711 for the inclusion of the resistive heating elements. Further, the heaters may be of a ribbon type 4702, or a coil type 4701. Optionally, the heaters may be enclosed in a conduit 4707 as explained above.

As shown at 4700c, heaters 4701 with power connections 4704 are arranged with parallel links 4709 such that multiple heaters or series-sets of heaters are connected in parallel to a single power distribution connection. Operation of the power connections may be at voltages in the hundreds of volts to tens of thousands of volts. Voltages at or below 5 KV may be selected based on considerations such as safety, costs, and reliability.

In some exemplary implementations, the heater(s) or heating elements may be a resistance wire extending along the length of the channels of each brick, where each of the heating elements may have predefined electro-thermal attributes such as resistance, electrical conductivity, thermal conductivity, cross-section area, and the likes, such that each of the heating elements may be heated up to the predefined temperatures upon receiving electrical power from the electrical power sources.

Electrically, a loop may be formed by a heating wire that starts at an end of a first channel, passes through a jumper at the other end of the channel, and returns via another channel. Adjacent stacks of bricks may be phased apart (e.g., 3-phase, for adjacent stacks of bricks, such that the stacks forms a group, or cell). The group of stacks, or cell, may be resistance-matched so that the performance of the stacks is consistent with respect to one another. The entire two of groups may form a zone that is on a controller. Vertically, different zones (e.g., rows of stacks) may be on different controllers, and may thus be resistance-matched at a different resistance from different vertical levels.

Further, the resistive heaters may be controlled such that the stacks are heated in an uneven manner. More specifically, the upper portions of the stacks may be preferentially heated. The controllers may control the vertical layers of the stacks separately, such that the heaters on different layers of the stack may be turned on or turned off at different times. For example, the controllers for the upper layers of the stacks may turn on the heating elements of the upper layers of the stack in advance of the controllers for the middle or lower layers of the stack turning on those heating elements. Further, this approach takes into account the different in brick height and mass between the bricks at the lower layers, which have a lower height and mass, as compared with the bricks at the upper layers, which have a greater height and mass. Thus, the upper brick layers will have a hotter temperature than the lower brick layers, and the thermocline is maintained. The controller may set the temperature and the timing of the heating for the layers of the stack based on sensor feedback, or based on system models, to determine the temperature of the layers, or a combination thereof.

The above example implementation of the brick design may be modified by stretching the above design and the heater element vertically. Thus, instead of being a round spiral, the heater may be a flat coil which goes into the brick and this allows every wire to have more surface area and more exposure with the brick. This also allows the number of wires in the system to be reduced, which may have a benefit of lowering the cost of the heater elements.

A wire irradiating to a larger surface may allow for more watts per centimeter of energy to be pushed in. The larger the surface area, the more brick is heated, which may have substantial implications on the temperature of the wire, because the surface temperature of the brick that the wire is exposed to sets a limit. A top wire temperature has direct implications on its lifetime, and the brick wall temperature that the wire is exposed to determines how much energy flux can be safely pushed through the wire. Thus, the example implementation involves a brick volume, exposed surface area, and wire temperature.

According to an example implementation, service is provided for the heater wire by forming a tall system wound up and down vertically and heating the sides of two separate bricks. The bricks are formed with fluid flow channels, and are substantially taller than the bricks disclosed in the foregoing example implementations. Larger bricks with the substantially same efficiency may allow fewer parts to be manufactured, and for wires to be spaced out further. This example implementation may have the added benefit of reducing cost of materials and assembly. The bricks may be extruded, pressed or cast and are formed with channels for the fluid to flow through. These channels, or slots, may provide a superior surface to volume ratio over holes or other shapes. The slots may or may not extend all the way at the edge closest to the heating element to concentrate the thermal mass close to the elements so that the energy transfers quickly.

Figure 67:
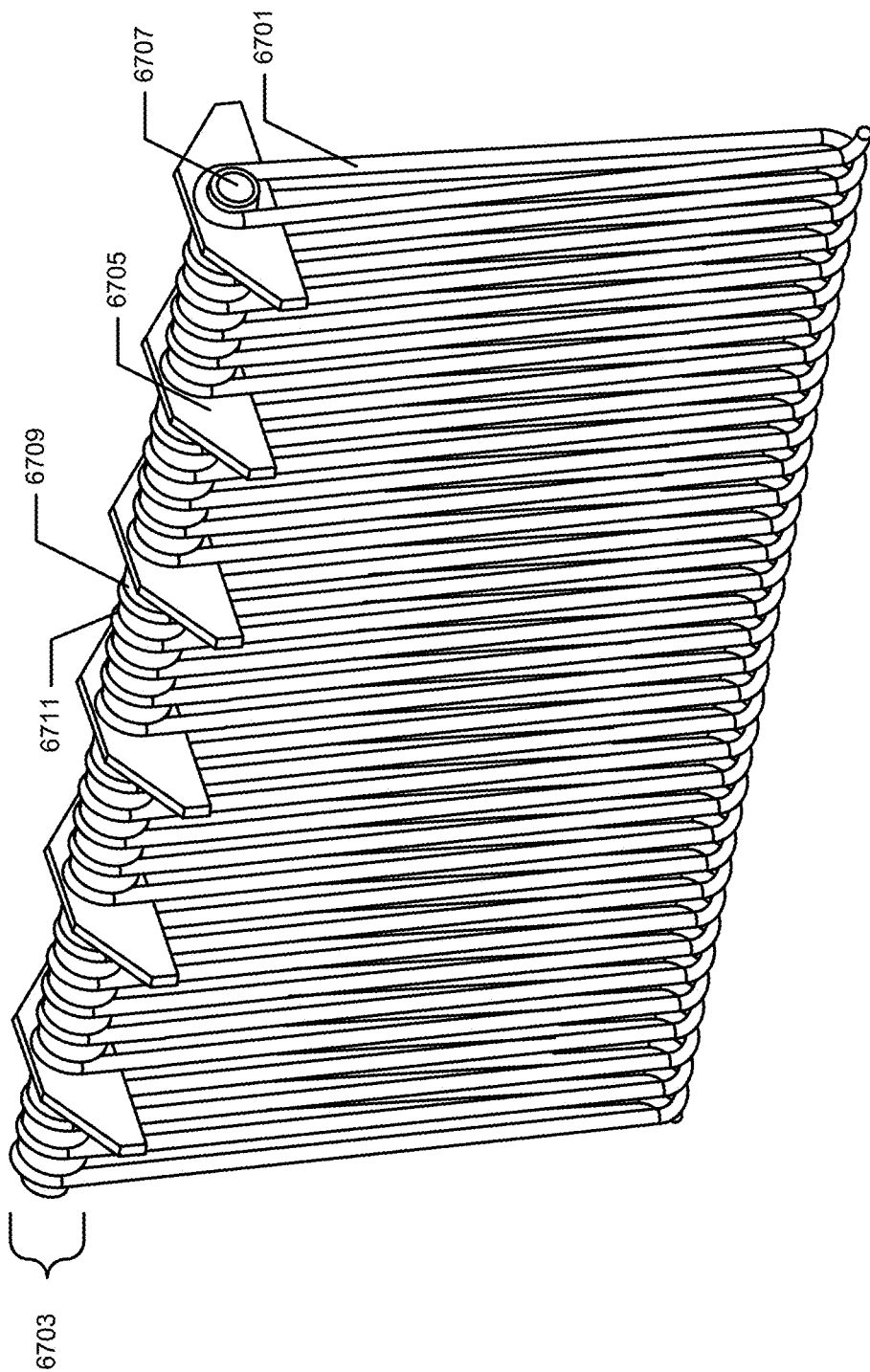
FIGS. 67, 68 and 69 illustrate various configurations of the resistive heating element according to the example implementations.

As shown in FIG. 67, the heating wire 6701 may be hanging from a rack 6703 that is held in place by the hangers 6705 and a rod 6707. Spacers 6709 are provided between the coils 6711 at the rod 6701, to prevent surfaces of the wire 6701 from touching. Optionally, spacers may be added at the middle or bottom (not shown). Further, the cross-section, geometry, or materials may be adjusted.

Figure 68:
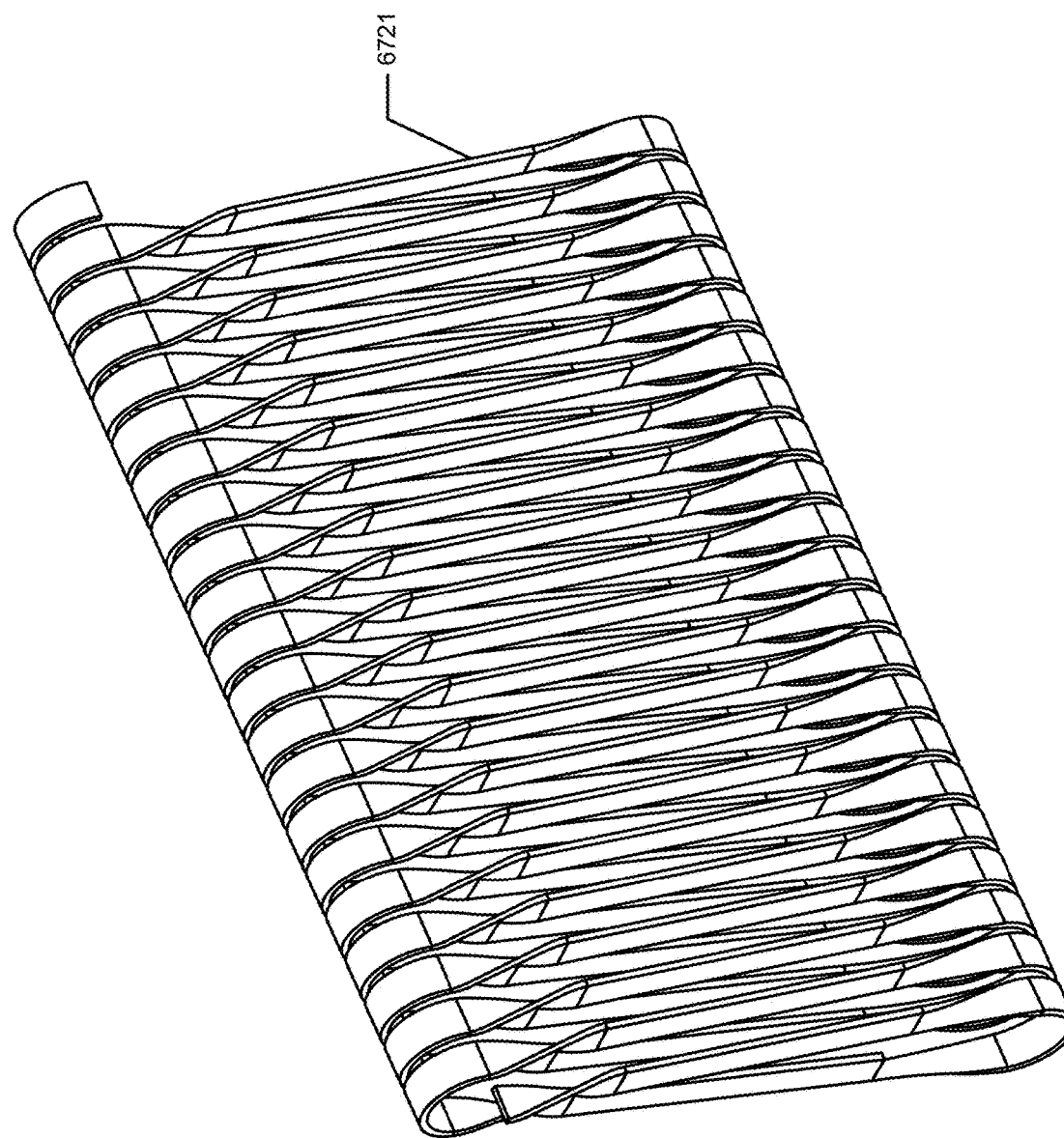
Figure 69:
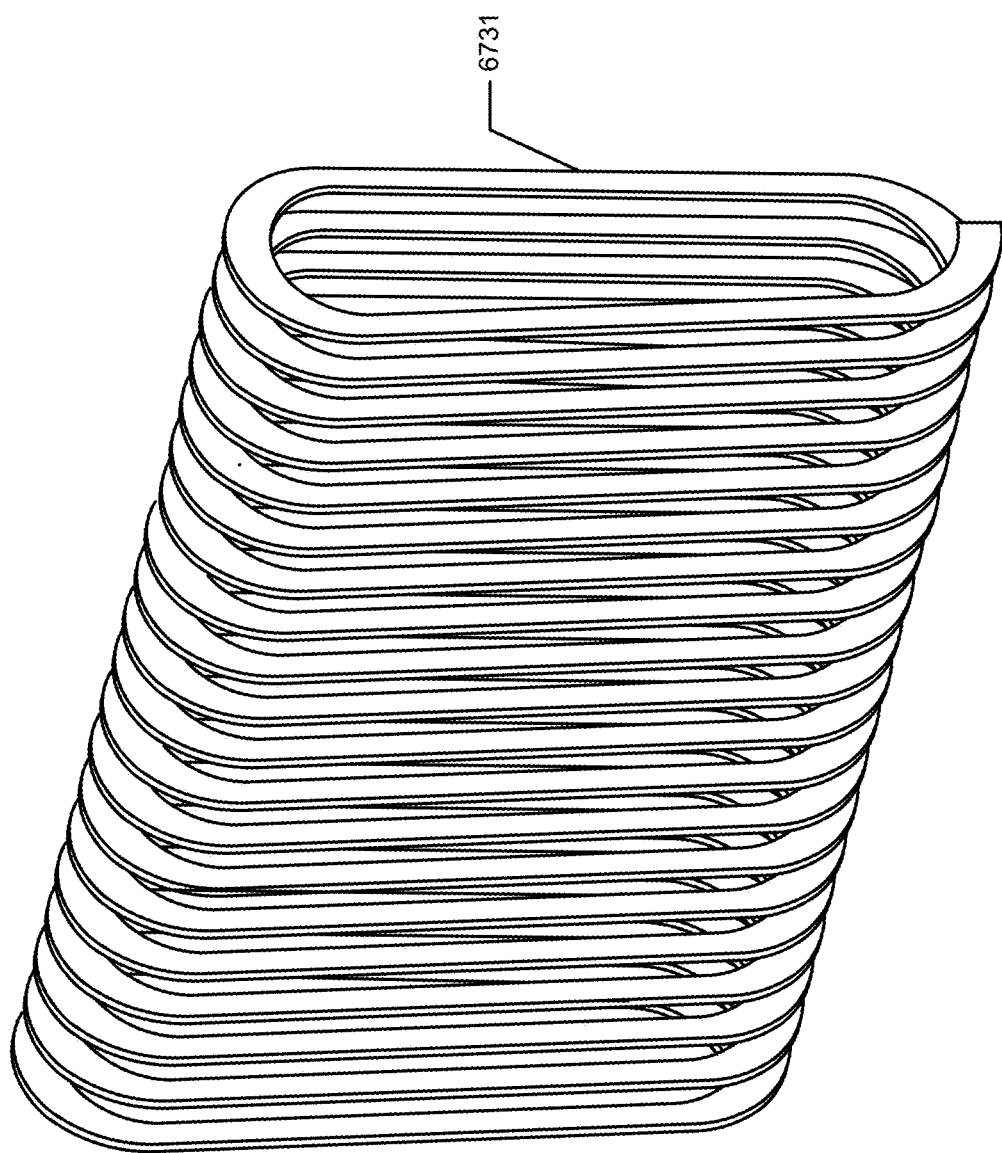

For example, a twisted ribbon 6721 as shown in FIG. 68, or a flat ribbon 6731 as shown in FIG. 69, may be provided. Similarly, the different heaters may be used at different vertical levels of the stack. For example, the heaters near the inlet flow at a lower portion of the stack may require a different design than the heaters near the discharge at the top of the stack, due to the different fluid flow conditions.

Coating Heating Elements

Other methods which may be employed to increase service life includes material pre-treatment and conditioning. For example, FeCrAl type heating elements are known to grow a protective, α-alumina scale on the surface which greatly reduces the rate of oxidation of the bulk material. However, at temperatures below 800-1000° C., a less protective form of alumina initially forms. To impart the protective effect of the dense α-alumina, the heater elements may be heated to a controlled temperature and duration above 1000° C. prior to being placed into service. This may be performed pre-installation or inside the thermal storage system post installation. The wires may also be pre-treated to change the surface chemistry for longer life.

For example, it is known that the aluminum reserve in the bulk FeCrAl material is an important limiting factor for oxidative failure. Because FeCrAl materials with aluminum fraction significantly higher than about 5%, e.g., 5%, are not suitable for hot processing, a process which adds additional aluminum may be beneficial. Such processes may include hot aluminizing, aluminum electro-plating, sol-gel processing and aluminum plating followed by anodizing. The surface treatment may also be made to increase the emissivity of the surface such that the average temperature of the heating element may be lower than without the treatment.

Replaceable Heating Elements

Individual heating elements may be configured to be removed and replaced without disassembly of the cell. For example, a broken or failed heating element may be pushed or pulled through the cell using a mechanical puller or pipe to remove and a replacement element placed in the cell using a pipe or other specific tool. As may be understood by a person of ordinary skill in the art, the resistivity of heating elements may change over time due to gradual physical effects from normal operation including wear, oxidation, and changing in metal crystal structure and alloying. In some example implementations, the replacement element may be sized or constructed to produce a resistivity that mirrors a projected resistivity of surrounding elements that may have degraded over during operation of the system.

For example, it may be anticipated that a portion of heating elements will fail within a prescribed time, such as 3 years, of operation, and replacement elements installed after three years may be designed with a resistivity that mirrors projected resistivity of the remaining original elements that are still operation but have changed resistivity over the period of operation. Similarly, different resistivities may be chosen for heating elements installed during later periods.

Control System

In various implementations the system includes a control unit or control system operatively coupled to disclosed elements such as the electrical energy sources, the heating elements, the air blowing units, the pumps, etc. In one implementation, the control unit is configured to enable the electrical coupling of the heating elements with the electrical energy sources. The control unit may switch the electrical connection of the heating elements between different electrical energy sources based on availability and cost per kWh of the electrical energy sources. During low load hours, the cost per kWh of non-renewable energy sources is generally relatively lower and sometimes negative. However, it may not be feasible for the non-renewable energy sources to switch off electrical power generation during these low load hours. Thus, during these low load hours, the control unit may electrically couple the system with an electrical energy source that is providing a lower cost per kWh of energy. The control unit may further control the air blowing units to enable controlled flow of fluid between any combination of one or more insulated cells that include thermal storage block assemblies and the outside environment, and also control one or more pumps to facilitate the controlled flow of fluid and steam through the conduit.

In an example implementation, system pumps and blowers are operable at variable flow rates, such that energy production and steam generation may be adjusted from a nominal full rate in steps or continuously down to a lower rate. Such minimum rate may be 10%, 20%, 30% of peak output, or another rate. The system controller may be configured to issue commands to adjust the flow rate of the input liquid pump and the blower so as to allow energy delivery at multiple rates automatically, based on manual commands, or both.

In another example implementation, the control unit may be in communication with a system associated with an electrical load or other industrial loads. The control unit may be configured to monitor the demand for hot fluid, steam or electrical power at the load, as well the available energy being stored in the system, and may accordingly charge the system by electrically connecting the heating elements to the electrical energy sources. For instance, when the control unit finds that the demand of the load is higher than the available energy currently stored in the system, then the control unit may electrically couple the heating elements of the system to the renewable or non-renewable energy sources to meet the demand of the load.

If the available electrical energy being received by the electrical energy sources is reduced, then during charging mode, the control unit may electrically connect heating elements associated with a predetermined number of cells among all the cells of the housing, such that only the heating elements of a proper subset of cells may receive the limited electrical energy and become heated, and the other heating elements or cells remain electrically disconnected from the electrical energy sources. Later, during discharging, the control unit may allow fluid to be passed through the heated cells to transfer the stored thermal energy to the conduit so the temperature of the fluid at the conduit remains at the delivery temperature, thereby reducing or preventing any damages or failure in the steam production system, and potentially maintaining continuous and controlled steam production.

The control system may generate a signal such as a command to activate one or more switching elements which in turn control source electrical energy input to resistive heating elements. The control system may directly or indirectly command the operation of active switches which selectively interrupt current flow so as to deliver a chosen average power. Such switching patterns may be carried out by thyristor-type switches which are continuously on or selectively commanded to switch so as to deliver a lower power by selectively conducting during chosen patterns of half-cycles.

A plurality of such switches may be chosen to operate in a pattern such that during each half-cycle of an AC current flow, the average load is constant. One such pattern would have the same or similar number of switches turned on during each half-cycle, even though any given switch might be turned on only once during a sequence of multiple cycles. Other switching patterns may be carried out by insulated-gate bipolar transistor (IGBT)-type switches which operate at frequencies higher than 120 Hz and which selectively conduct or block current in a pattern to provide continuous conduction or partial power whether incoming power is in the form of AC or DC.

The control system may determine switching decisions based in part on various parameters, such as the design of the heating element, including its resistance per unit length, its material surface area, its material of construction including its performance with temperature (temperature-related effects may include metal recrystallization and/or dealloying, oxidation, spalling, creep, thermal expansion, and wear) the temperature and size of the surface area surrounding the heating element, local temperatures along the entire heating element length (including support points or points of contact with solid media and points of electrical connection with other conductors), etc., or some combination thereof. Overtemperature at points of connection may be reduced or prevented by arranging regions of lower electrical resistance proximate to such connections, e.g., by winding multiple strands of wire together, changing conductor cross-section, making such connections outside high-temperature regions of the storage unit, or providing local heat-sink/cooling elements at such points.

Figure 70:
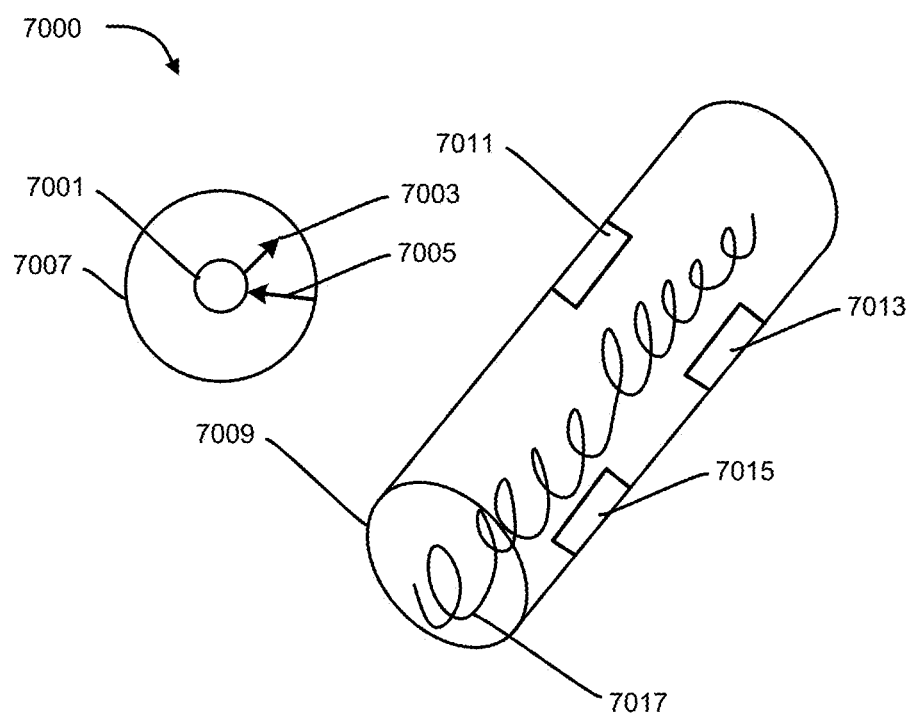
FIG. 70 illustrates configurations of the resistive heating element according to the example implementations.

FIG. 70 illustrates the resistive heating element 7000 according to an example implementation. The resistive heating element 7001 is positioned in a conduit 7003 having an outer wall having a surface temperature as indicated by 7007. The surface temperature 7007 depends on the bulk temperature distribution of the brick, its thermal conductivity, and the radiative heat flux. Switching decisions may be based in part on the design of the heating element 7009, including its resistance per unit length, its material surface area, its material of construction including its performance with temperature (temperature-related effects including metal recrystallization and/or dealloying, oxidation, spalling, creep, thermal expansion, and wear) the temperature and size of the surface area surrounding the heating element 7007, 7009, and local temperatures along the entire heating element length, including support points or points of contact with solid media 7011, 7013, 7015. The surface temperature of the heating element 7001, 7017 may depend on the wattage per unit surface area of heating element, the ambient air temperature around the element, whether or not air is flowing in the conduit in the region defined by 7003 and 7005, and the surface temperature of the enclosing material 7007. The surface temperature at 7007 depends on the bulk temperature distribution of the brick, its thermal conductivity, and the radiative heat flux; radiative heat transfer dominates. Since this is proportional to the difference of the temperatures in degrees Kelvin to the fourth power, as the refractory material approaches the maximum operating temperature of the heater, the power flowing through the heater should approach zero.

In one implementation, the surface temperature of the heating element depends on the wattage per unit surface area of heating element, the ambient air temperature around the element, whether or not air is flowing in the conduit, and the surface temperature of the enclosing material. The surface temperature depends on the bulk temperature distribution of the brick, its thermal conductivity, and the radiative heat flux. Radiative heat transfer may dominate in disclosed implementations. Because radiation transfer is proportional to the difference of the temperatures in degrees Kelvin to the fourth power, as the refractory material approaches the maximum operating temperature of the heater, the power flowing through the heater should approach zero.

In some implementations the control system algorithms include models of the thermal storage unit. These models approximately simulate the temperature at various points within the storage unit, as well as instantaneous and forecast temperatures based on heater power input. Accordingly, heater life is advantageously preserved, by incorporating weather and seasonal inputs into the controller, including the use of forecasting.

The models may adapt to changes in the configuration of the storage unit, including the presence of missing or failed heaters or heater controllers, the presence of blocked heat transfer channels, the presence of scale formation in the steam generation section, or other operating/maintenance matters.

In one implementation, the control system confirms and compares simulation models to select measurements of temperatures, flows, and power levels at various points within the system. The control system may consider the models in control calculations governing power to the heating elements. For example, wall temperatures may be a limiting factor in the current input power allowable for a given heater, with limits calculated based on peak refractory temperature and peak wire temperature. A constant-wattage (constant-Q heat flux) charging may not be feasible without the heater temperature significantly exceeding the refractory temperature.

The control system responding to such constraints may command charging wattage (e.g., Q heat flux) patterns in time during charging, where initial low-rate heating establishes heat conduction patterns, charging is raised to high rates for part of the charging time, and charging rate drops as material temperature rises, such that the final top temperature is approached asymptotically at slow rates, without exceeding top heater temperatures.

Heat transfer fluid may be flowing in the adjacent fluid conduits during charging, allowing charge plus discharge operation concurrently. In some example implementations, heat transfer fluid may be flowing in the conduit that carries the heater element. The resistance per unit length of the heating element may vary, and/or the heat production per unit length may vary, so that (for example) a conduit which has heat transfer fluid flowing axially along the heater may require less heat near the fluid outlet than near the fluid inlet.

Advantages

In addition to those advantages described above in Section I, the example implementations relating to thermal blocks and assemblages may also afford various advantages relative to traditional approaches. For example, traditional approaches commonly suffer from uneven heat distribution, wear and tear due to the heating and cooling cycles of the bricks, and safety and maintenance issues. The implementations within this disclosure, however, attempt to mitigate various such problems by applying radiative heating (including horizontal radial radiation within the radiation chambers) in combination with fluid flow pathways, to produce a distribution of heat that is more uniform than that achieved by traditional heating techniques. As a result, problems and disadvantages associated the art may be overcome, such as inefficient power storage, degradation, damage and breakdown of various elements (e.g., the heating element, the bricks, the enclosures, etc.), unsafe hotspots, etc.

Disclosed dynamic insulation techniques may advantageously improve insulation efficiency, reduce insulation costs, or both relative to traditional techniques. Further, disclosed passive cooling techniques may improve the safety of the thermal storage system. Various disclosed techniques may reduce maintenance complexity relative to traditional techniques.

The storage media blocks may be arranged in an assemblage that allows relative movement to accommodate expansion and contraction by individual elements. Also, the array is arranged such that cycles of thermal expansion align the elements of the array to preserve the integrity of the array structure, the integrity of the heating element conduits, and the integrity of the heat transfer gas conduits.

Further, because the heat is more evenly stored, waste of heat is also reduced or avoided. Additionally, the example implementations may have another benefit, in that it may be easier to maintain and replace the heater modules, heating elements, and bricks. Further, the example implementations have increased efficiency. For example, the brick and stack configurations disclosed herein may produce an increase in the ΔT of the bulk material over the course of charging and discharging to allow the bricks to store more megawatt hours per kilogram of material, as compared with current designs.

III. DC/DC Conversion

In many power transfer systems, alternating current (AC) is employed to transfer power from a generating source to a load. In such systems, passive equipment and transformers need to be energized for the system to work, resulting in the circulation of reactive energy. Additionally, the transfer of AC over distances can result in losses due to impedance of transmission lines coupled between the generating source and the load. In some cases, the power generated may be intermittent. For example, when the generating source is photovoltaic cells, the power being transferred is based on the illumination of the photovoltaic cells, which can vary over the course of the day. As the power drops, the efficiency of the AC transfer system can be further degraded.

To improve the efficiency of such power transfers, direct current (DC) transfer can be employed which use multiple input DC voltages to generate a higher voltage for transmission. In some cases, the transmit voltage can be decomposed into multiple smaller voltages at the load end of the transfer system. As described below, the losses associated with converting DC sources to AC for transfer can be eliminated due to lower inductive and eddy current losses. Additionally, ohmic resistive loads can be lower further improving efficiency.

Figure 71:
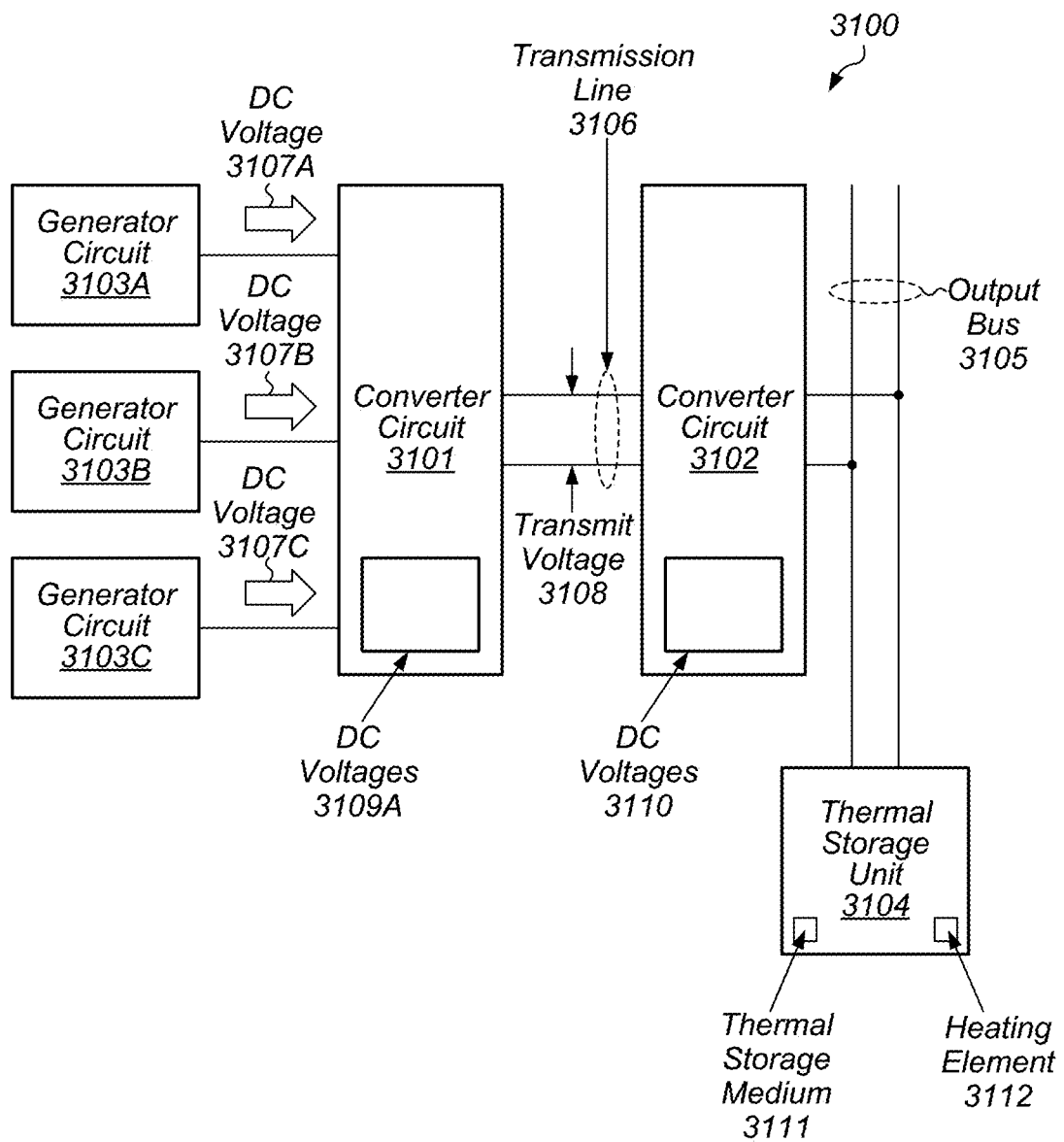
FIG. 71 is a block diagram of an implementation of a power transmission system for a renewable energy source.

A block diagram of such a thermal storage system the employs DC power transfer is depicted in FIG. 71. As illustrated power transfer system 3100 includes generator circuits 3101A-C, converter circuit 3101, converter circuit 3102, and thermal storage unit 3104.

Generator circuits 3103A-C are configured to generate DC voltages 3107A-C, respectively. In various implementations, generator circuits 3103A-C may employ renewable energy sources such as solar or wind. DC voltages 3107A-C may, in some implementations, be time-varying voltages. For example, in some cases, the respectively levels of DC voltages 3107A-C may be based on variation in illumination of photovoltaic panels. Although only three generator circuits are depicted in the implementation of FIG. 71, in other implementations, any suitable number of generator circuits may be employed.

As described below, converter circuit 3101 includes multiple sub-converter circuits, each including a first input circuit and a first output circuit. The first input circuit is configured to receive one of DC voltages 3107A-C. The first output circuit is galvanically isolated from the first input circuit and is configured to generate a corresponding one of DC voltages 3109A. Converter circuit 3101 is configured to combine DC voltages 3109A to generate transmit voltage 3108.

As described below, converter circuit 3102 also includes multiple sub-converter circuits, each including a second input circuit and a second output circuit. The second input circuit is configured to receive, via transmission line 3106, a portion of transmit voltage 3108. The second output circuit is galvanically isolated from the second input circuit and configured to generate a corresponding one of DC voltages 3110 derived from the portion of transmit voltage 3108 received by the second input circuit. Converter circuit 3102 is configured to combine DC voltages 3110 on output bus 3105. It is noted that, in some implementations, DC voltages 3110 may be coupled, in parallel, onto output bus 3105.

Thermal storage unit 3104 includes heating element 3111 coupled to output bus 3105. In various implementations, heating element 3111 is positioned to heat thermal storage medium 3112 using power received via output bus 3105. As described elsewhere in the specification, thermal storage unit 3104 may be implemented using a variety of different thermal storage mediums.

Figure 72:
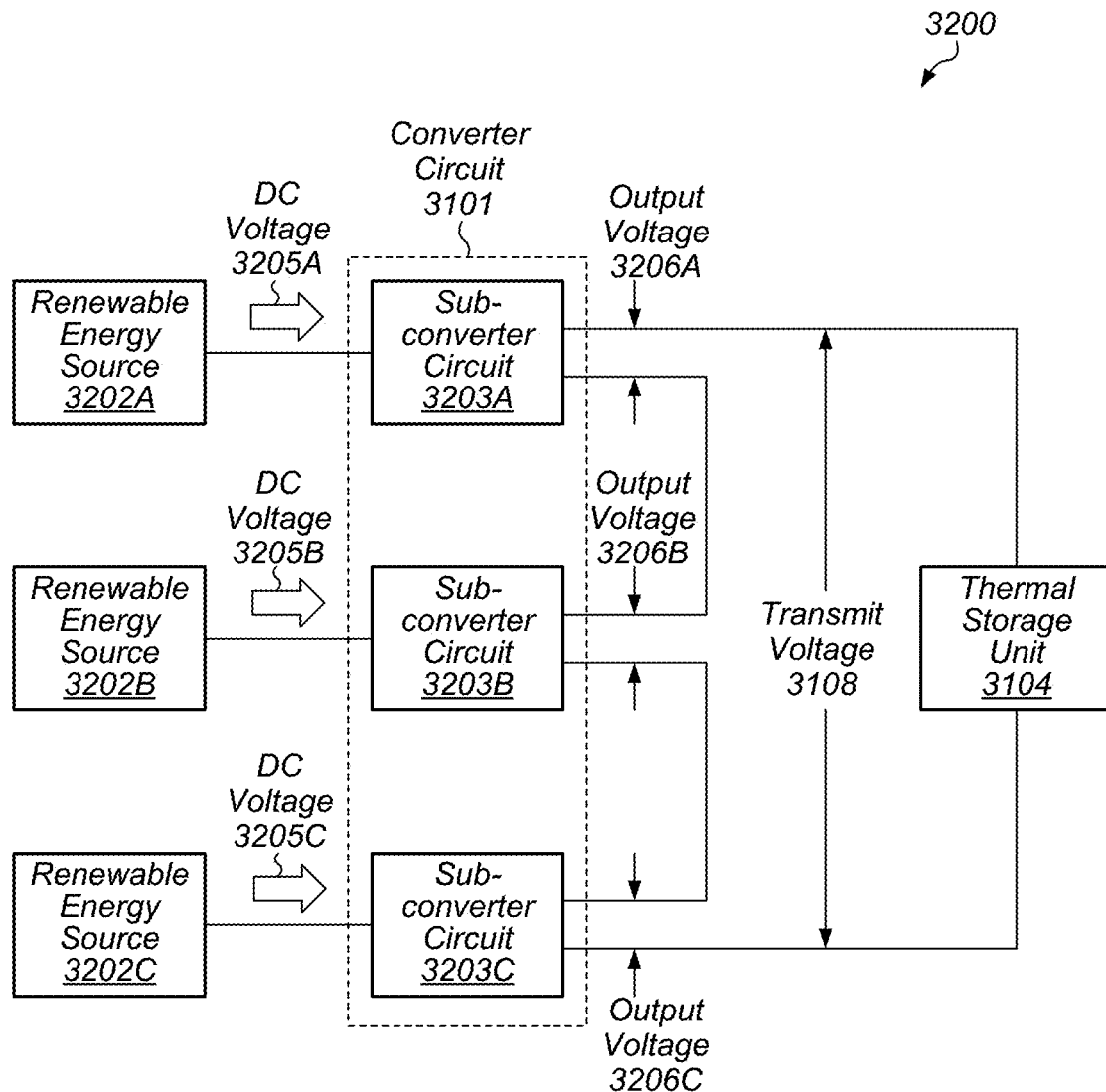
FIG. 72 is a block diagram of an implementation of power transmission system for a renewable energy source.

In some cases, voltages from multiple energy sources can be combined into a transmit voltage that may be used directly by a load. A block diagram of an implementation of power transmission system for a renewable energy source system is depicted in FIG. 72. As illustrated, power transmission system 3200 includes converter circuit 3101, renewable energy sources 3202A-C, and thermal storage unit 3104. Converter circuit 3101 includes sub-converter circuits 3203A-C.

Renewable energy sources 3202A-C are configured to generate DC voltages 3205A-C, respectively. In various implementations, renewable energy sources 3202A-C may be implemented using photovoltaic cells, wind turbines, or any other suitable renewable energy source. DC voltages 3205A-C may, in some implementations, vary in time due to the intermittent nature of illumination of the photovoltaic cells, the absence of wind, and the like. Although only three renewable energy sources are depicted in the implementation of FIG. 72, in other implementations, any suitable number of renewable energy sources may be employed.

Sub-converter circuits 3203A-C are configured to receive DC voltages 3205A-C, respectively. In various implementations, sub-converter circuits 3203A-C are configured to generate output voltages 3206A-C using corresponding ones of DC voltages 3205A-C. As described below, sub-converter circuits 3201A-C include respective input circuits and output circuits that are galvanically isolated by corresponding transformers.

Sub-converter circuits 3203A-C are coupled in series to combine output voltages 3206A-C to generate transmit voltage 3108. In various implementations, transmit voltage 3108 is a sum of output voltages 3206A-C. By coupling sub-converter circuits 3203A-C in series, a voltage larger than any of one of DC voltages 3205A-C can be generated to aid in the transmission of power to thermal storage unit 3104. Moreover, coupling sub-converter circuits 3203A-C in series eliminate the need to detect failures in any of renewable energy sources 3202A-C. If any one of renewable energy sources 3202A-C stops generating its corresponding one of DC voltages 3205A-C, the corresponding one of sub-converter circuits 3203A-C generates a zero output voltage which still allows the generation of transmit voltage 3207 by adding the output voltages of the remaining ones of sub-converter circuits 3203A-C.

Although converter circuit 3201 is depicted as including only three sub-converter circuits, in other embodiments, any suitable number of sub-converter circuits may be employed. In some cases, the number of sub-converter circuits included in converter circuit 3101 may correspond to a number of renewable energy sources. Alternatively, multiple renewable energy sources may be wired together and a number of sub-converter circuits may be based on a desired magnitude of transmit voltage 3108.

Thermal storage unit 3104 includes heating element 3108 configured to heat thermal storage medium 3109 using transmit voltage 3107. In various embodiments, thermal storage unit 3104 may be coupled to the output of up-converter circuit 3101 using a high-voltage DC cable capable of handling the current drawn by thermal storage unit 3104 at the value of transmit voltage 3107. As described elsewhere in the specification, thermal storage unit 3104 may be implemented using a heating element which can be used to heat a variety of different thermal storage mediums.

Figure 73:
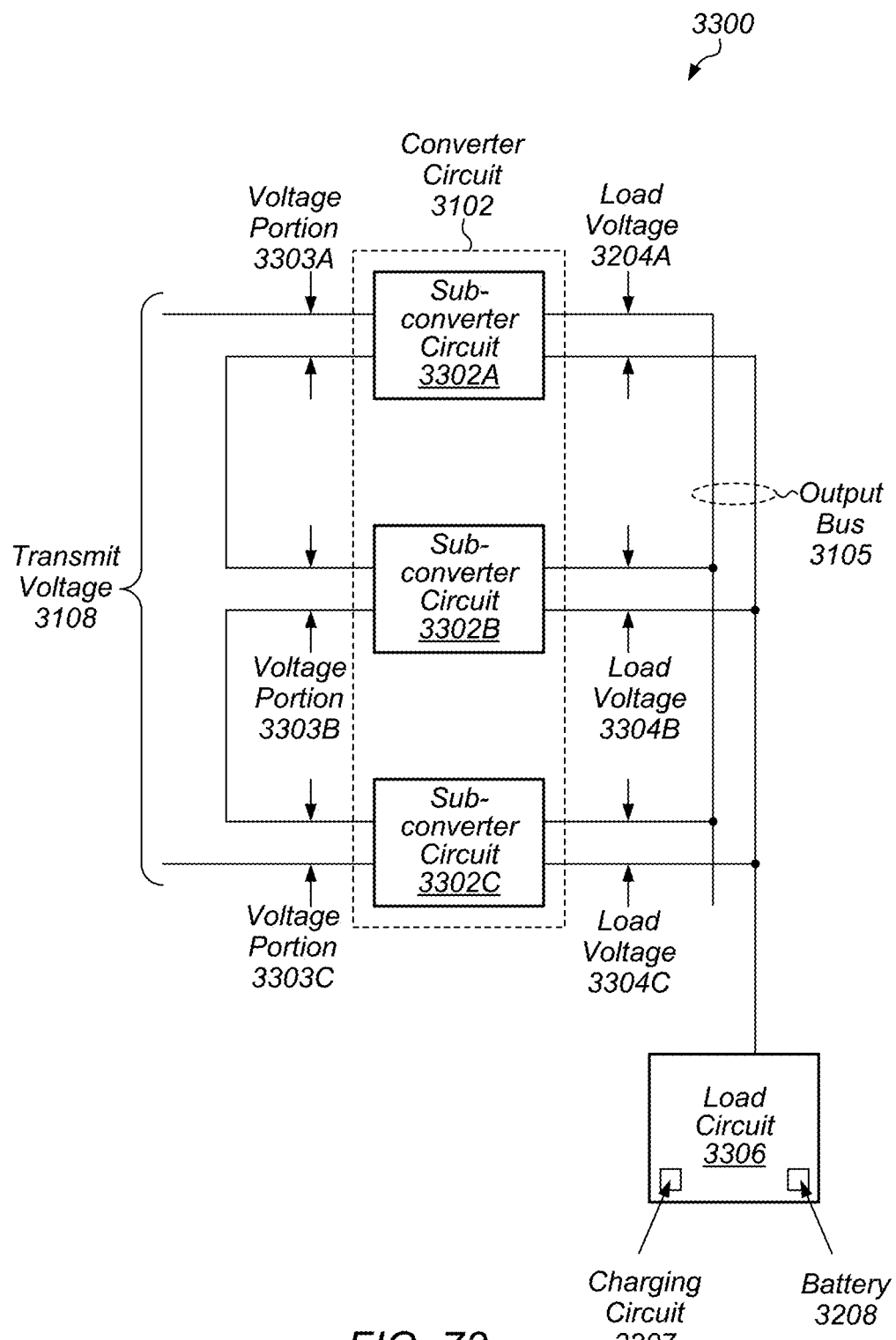
FIG. 73 is a block diagram of an implementation of power receiver system for a transmitted direct current voltage.

Turning to FIG. 73, a block diagram of an embodiment of a power receiver system for a transmitted direct current voltage is depicted. As illustrated, power receiver system 3300 includes converter circuit 3102, and load circuit 3306.

Converter circuit 3102 includes sub-converter circuits 3302A-C that are coupled in series across transmit voltage 3108. It is noted that while sub-converter circuits 3302A-C are depicted as being across transmit voltage 3108, in other embodiments, sub-converter circuits 3302A-C may be coupled across any suitable DC voltage. By coupling sub-converter circuits 3302A-C in series, transmit voltage 3108 is divided into voltage portions 3303A-C, with corresponding inputs of each of sub-converter circuits 3302A-C being exposed to only a portion of transmit voltage 3108. In the illustrated embodiment, since there are three sub-converter circuits, each of voltage portions 3303A-C is a third of the value of transmit voltage 3108. Using series-coupled sub-converter circuits may, in various embodiments, allow for the use of lower voltage components in sub-converter circuits 3302A-C, thereby saving cost and circuit complexity.

Sub-converter circuits 3302A-C are configured to receive corresponding ones of voltage portions 3303A-C. For example, sub-converter circuit 3302A is configured to receive voltage portion 3303A, while sub-converter circuit 3302B is configured to receive voltage portion 3303B. Sub-converter circuits 3302A-C are further configured to generate, using corresponding ones of voltage portions 3303A-C, corresponding ones of load voltages 3304A-C. As with sub-converter circuits 3203A-C, sub-converter circuits 3302A-C include input and output circuits that are galvanically isolated from each other. Use of such isolation may prevent possible damaging currents flowing directly from cables carrying transmit voltage 3108 to load circuit 3306.

Although converter circuit 3102 is depicted as including only three sub-converter circuits, in other embodiments, any suitable number of converter circuits may be employed. In some cases, the number of sub-converter circuits included in converter circuit 3102 may be based on a value of transmit voltage 3108 and desired values of load voltages 3304A-C. For example, if smaller values are desired for load voltages 3304A-C, additional sub-converter circuits may be employed to split transmit voltage 3108 into a larger number of smaller portions.

Load circuit 3306 is coupled to output bus 3105 and is configured to perform a function or operation using a voltage level of output bus 3105. It is noted that load circuit 3306 may be any suitable circuit or unit that employs a DC voltage to perform a function or operation. In various embodiments, load circuit 3306 may be part of a thermal storage unit (e.g., thermal storage unit 3104) while, in other cases, load circuit 3306 may be part of an electric vehicle charging system, or other battery charging system. For example, load circuit 3306 may include charging circuit 3207 configured to charge battery 3208 using power received via output bus 3105.

Figure 74:
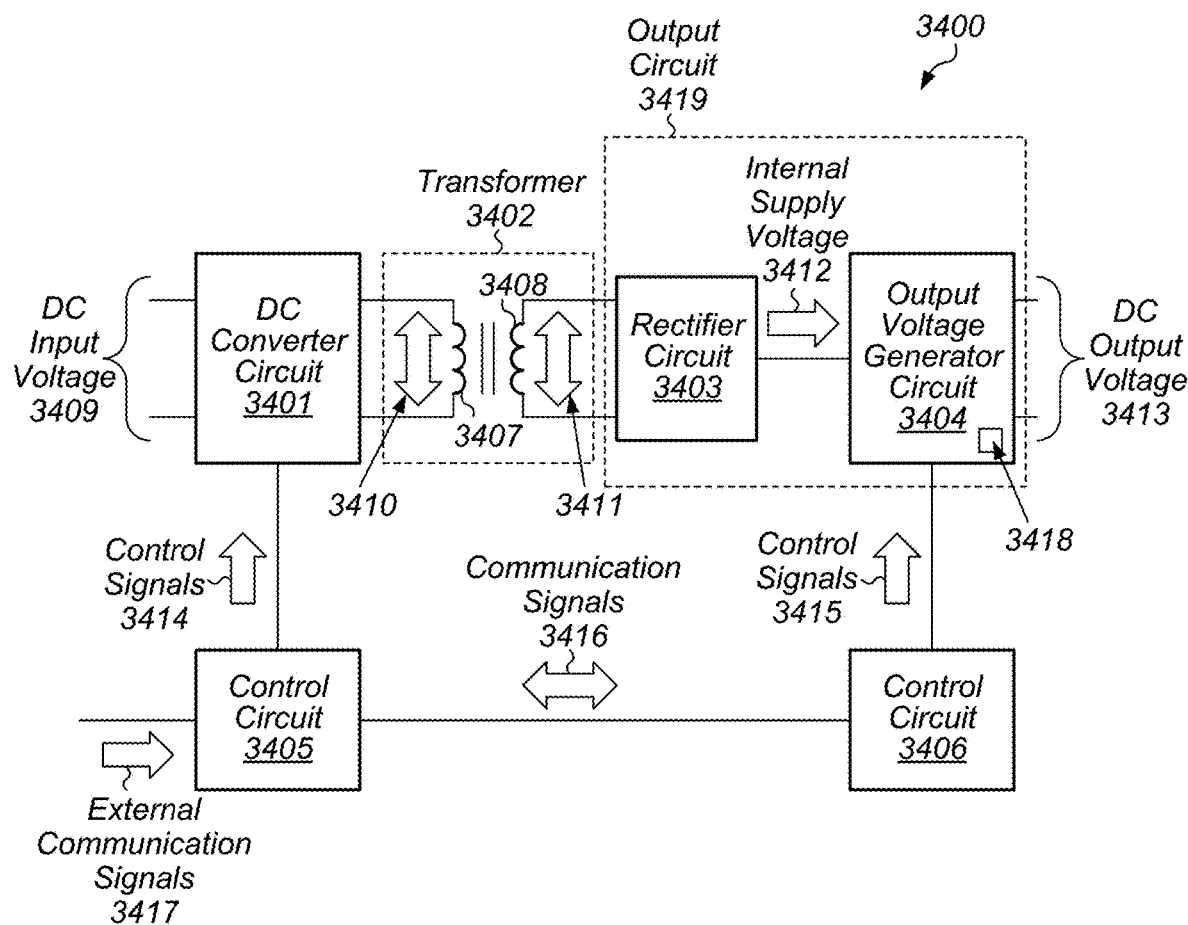
FIG. 74 is a block diagram of an implementation of a converter circuit.

Turning to FIG. 74 a block diagram of an embodiment of a sub-converter circuit is depicted. As illustrated, sub-converter circuit 3400 includes DC converter circuit 3401, transformer 3402, output circuit 3419, control circuit 3405, and control circuit 3406. Output circuit 3419 includes rectifier circuit 3403 and output voltage generator circuit 3404. In various embodiments, sub-converter circuit 3400 may correspond to any of sub-converter circuits 3203A-C or sub-converter circuits 3302A-C.

DC converter circuit 3401 is configured to receive DC input voltage 3409. In various embodiments, DC input voltage 3409 may correspond to any of DC voltages 3205A-C, or voltage portions 3303A-C. DC converter circuit 3401 is further configured to generate current 3410 in primary coil 3407 included in transformer 3402 using DC input voltage 3409 and based on control signals 3414. In some embodiments, current 3410 is an alternating current, and to generate current 3410, DC converter circuit 3401 may be further configured to switch the polarity of DC input voltage 3409 relative to the terminals of primary coil 3407 in order to change the direction of current 3410 through primary coil 3407. In various embodiments, a frequency of such switching may be based on at least one of control signals 3414.

In various embodiments, DC converter circuit 3401 is magnetically coupled to output circuit 3419 by transformer 3402. Since the DC converter circuit 3401 is coupled magnetically to output circuit 3419, no current can flow between DC converter circuit 3401 and output circuit 3419 thereby galvanically isolating the two circuits.

As current 3410 flows in primary coil 3407, a time-varying magnetic field is generated by primary coil 3407. The time-varying magnetic field induces current 3411 in secondary coil 3408 of transformer 3402. It is noted that due to the time-varying nature of the magnetic field, current 3411 may also be an alternating current. To enhance the inductive coupling between primary coil 3407 and secondary coil 3408, the respective windings of primary coil 3407 and secondary coil 3408 may be wound around a common core of ferrous material.

To provide additional granularity for the level of transmit voltage 3108, transformer 3402 may be used to change the value of DC output voltage 3413 relative to DC input voltage 3409. By adjusting the number of turns (or "windings") of primary coil 3407 relative to the number of turns of secondary coil 3408, the magnitude of current 3411 can be adjusted, either up or down, relative to the magnitude of current 3410. For example, if the number of turns of secondary coil 3408 is greater than the number of turns of primary coil 3407, then the magnitude of current 3411 will be greater than the magnitude of current 3410. Different values of current 3411 can result in different values of DC output voltage 3413.

Since current 3411 is an alternating current, it must be converted to a DC voltage (or "rectified") before it can be used by output voltage generator circuit 3404. Rectifier circuit 3403 is configured to generate internal supply voltage 3412 using current 3411 flowing in secondary coil 3408. In various embodiments, rectifier circuit 3403 may be implemented with multiple diodes to maintain a charge on a load capacitor in order to generate internal supply voltage 3412.

Output voltage generator circuit 3404 is configured to generate DC output voltage 3413 using internal supply voltage 3412 and based on control signals 3415. In various embodiments, DC output voltage 3413 may correspond to any of output voltages 3206A-C or load voltages 3304A-C. Output voltage generator circuit 3404 may, in some embodiments, include inductive choke 3418, which may be used to couple one instance of converter circuit 3400 to another instance of converter circuit 3400 as depicted in the embodiment of FIG. 72. In various embodiments, output voltage generator circuit 3404 may be implemented using a buck converter circuit or any other suitable circuit.

Control circuit 3405 is configured to generate control signals 3414. Such signals may include timing and enable signals for DC converter circuit 3401. In various embodiments, control circuit 3405 may be configured to generate control signals 3414 using external communication signals 3417 and communication signals 3416. In various embodiments, external communication signals 3417 may be sent to and received from another sub-converter circuit or a master control circuit included in a power transfer system. It is noted that the transmission of external communication signals 3417 and communication signals 3416 may be performed using optical circuits to provide electrical isolation between control circuit 3405, control circuit 3406, and any external control circuits. In various embodiments, control circuit 3405 may be implemented using a processor configured to execute software or program instructions, a microcontroller, other suitable state machine.

Control circuit 3406 is configured to generate control signals 3415, which may include timing and enable signals for output voltage generator circuit 3404. In various embodiments, control circuit 3406 may be configured to generate control signals 3415 using communication signals 3416 received from control circuit 3405. Control circuit 3406 may also be configured to send information regarding the operation and status of output voltage generator circuit 3404 to control circuit 3405 via communication signals 3416. In various embodiments, control circuit 3406 may be implemented using a processor configured to execute software or program instructions, a microcontroller, other suitable state machine.

Figure 75:
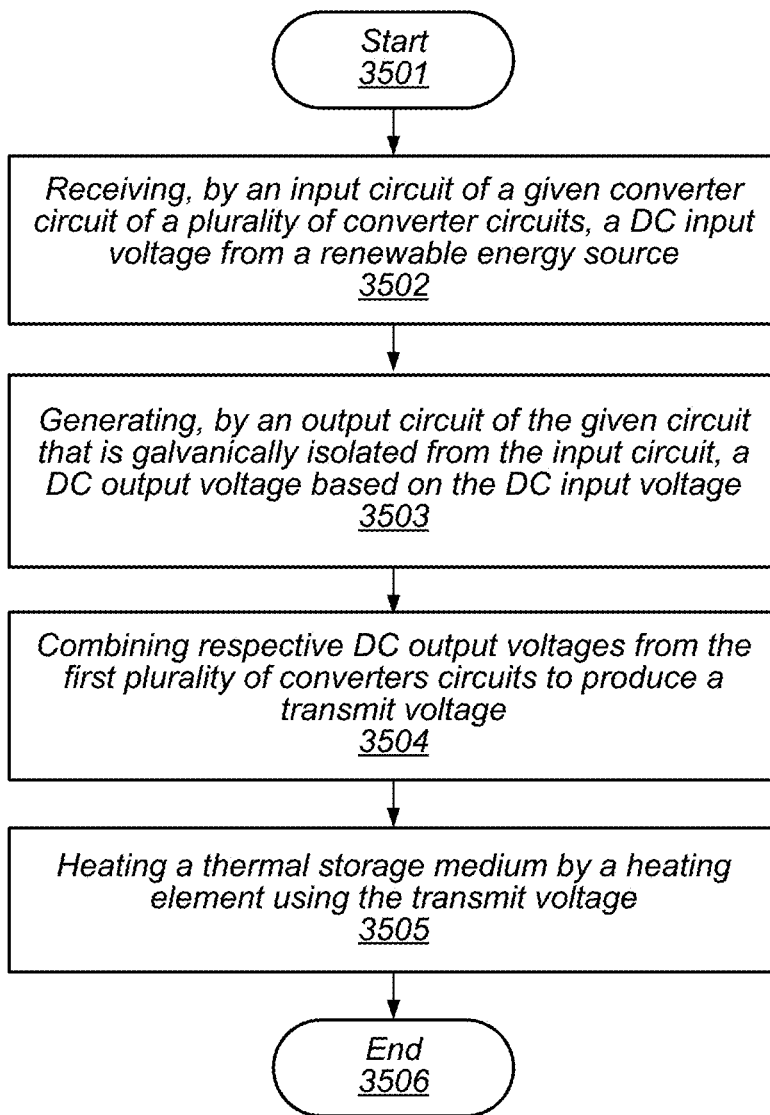
FIG. 75 is a flow diagram depicting an implementation of a method for operating a DC power transfer system.

Turning to FIG. 75, a flow diagram depicting an embodiment of a method for operating a DC power transfer system is illustrated. The method, which may be applied to various DC power transfer systems including DC power transfer system 3400, begins in block 3501.

The method includes receiving, by an input circuit of a given converter circuit of a first plurality of converter circuits, a DC input voltage from a renewable energy source (block 3502). In some embodiments, the method further includes generating, by a plurality of photovoltaic panels, the DC input voltage.

The method also includes generating, by an output circuit of the given converter circuit that is galvanically isolated from the input circuit, a second plurality of DC output voltage based on the DC input voltage (block 3503). In various embodiments, generating the DC output voltage includes inducing, by the given converter circuit using the DC input voltage, a first current in a primary coil of a transformer included in the given converter circuit. In such cases, the method also includes generating, by the given converter circuit using a second current in a secondary coil of the transformer, the DC output voltage. In various embodiments, the second current in the secondary coil is based on the first current in the primary coil of the transformer.

In some embodiments, the method may further include inducing the second current in the secondary coil based on the first current, a first number of turns on the primary coil, and a second number of turns on the secondary coil. The method may, in various embodiments, also include rectifying, by the given converter circuit, the second current to generate an internal supply voltage. In such cases, the method may further include generating, by the given converter circuit, the DC output voltage using the internal supply voltage.

The method further includes respective DC output voltages from the first plurality of converter circuits to produce a transmit voltage (block 3504). In some embodiments, the method includes adding the respective DC voltages to produce the transmit voltage. In various embodiments, coupling the first plurality of converter circuits includes coupling a first output of a first converter circuit to a particular node using a first inductive choke, and coupling a second output of a second converter circuit to the particular node using a second inductive choke.

The method also includes heating a thermal storage medium by a heating element using the transmit voltage (block 3505). In some embodiments, the method also includes receiving, by a second plurality of converter circuits coupled in series, the transmit voltage. The method may further includes generating, by the second plurality of converter circuits using corresponding portions of the transmit voltage, a plurality of DC output voltages, and combining the plurality of DC output voltages on a common power bus. The method concludes in block 3506.

Vehicle Charging Applications

The above described DC/DC converter can be used for a DC vehicle fast charging application. This example circuit illustrates how it is possible for a standard 500 MAC cable to transport 2MW. Existing charging stations are connected to AC grid and either have their own substation or are connected to a bigger substation at 5060 Hz and low voltage. To pull 2MW, a very high current is required (4,000 amps) exceeding the limits of the grid capacity.

By being able to transfer power using DC allows 1-2 MW power transfer at a much lower current allowing battery charging in 10-15 minutes to 80%, similar to a gas station stop. The DC/DC converter shown above may allow this high-speed DC charging. This structure uses multiple PV array microgrids as input, for example, and the DC/DC converters shown can provide high power and economical charging stations. Additionally, the charging station may also include on-site storage of the PV generated power using standard cabling.

Thus, relatively small conductors at substantial voltage can be used to power a set of charging ports that can operate independently or in parallel.

Power Transportation Applications

If a PV panel connected with an inverter that is converting to AC and using a transformer to step up to a higher voltage to transfer it over a distance, then at the destination such as a charging station, battery or storage system, there is a transformer or some sort of rectifier. When such a system is running at peak solar capacity, the losses of the inverters and the transformers and the energizing losses of that AC system the eddy current and the inductive losses add to just under 90 percent efficiency. However, when the system is running at low power, the losses remain similar and the net efficiency drops substantially.

Conversely, when doing a DC based system using the DC/DC converters described herein, losses are significantly lower since inductive or eddy current losses are not present in DC and ohmic resistive loads are lower. Thus, the efficiency increases slightly at low loads.

Thus, these chained DC/DC converter systems can have applications in fields such as power transportation, vehicle charging, customer applications, solar fields connected to lithium battery systems among others, including a thermal storage system. This may significantly reduce ohmic losses in solar fields because wiring would be running at higher voltage and may reduce ohmic and AC losses between solar fields and batteries or solar field batteries and charging stations. Many microgrids will have these same issues because reliability of that microgrid and its efficiency change if its frequency is decoupled from the main grid.

The DC/DC converter designs and implementations create the opportunity to run a fully DC microgrid, particularly at high voltage. For example, a 25 kV DC microgrid around a site and solar facilities can mean batteries can run at ultra-high efficiency. Some loads may be directly DC connected and some loads may be connected via inverters designed for power point loads. There may also be gateway inverters or rectifiers that gateway to an AC grid but the microgrid is not phase locked to the grid would mean that grid instabilities can't take it down. The value of 25 kV is just provided as an example, and other values may be used instead.

With AC systems, there is a need to energize all the passive equipment and transformers thus circulating a lot of reactive energy, and transferring AC over distances can additionally incur losses with line impedances and power bouncing.

DC power sharing over medium distances can be done very effectively using this DC/DC converter design, may enable more effective energy storage, more efficient energy transportation, using medium voltage DC for example up to 50 miles.

Further, the DC/DC converter design eliminates the transformers and allows building that voltage by scaling them in series, which can be essentially lossless. This is made possible by each cluster being fully galvanically isolated, with two separate controllers (master/slave control). Further, there may also be top level-level power management to prevent excessive voltage rise in the main conductor if power demand on the load drops.

In addition to the controller in each device (DC/DC converter) there may also be one overall controller that will be in charge of those conversions and conversion stages to set limits to those devices and how they can behave (limit power; limit current; limit voltage) to set boundary conditions.

Thus, voltage sharing can be based on the idea of power sharing because if sharing power is started, then logically the voltage will be shared across those devices and the system will experience the same voltage drop on the input, same voltage drops on the output.

The high voltage DC/DC conversion allows for very high efficiency connection of solar fields with suitable distance to loads such as a heated brick energy storage unit that can be coupled to electrolyzers and used for electric vehicle charging. Further, the system could have integrated hydrogen production and electric power generation from hydrogen and further have integration of lithium-ion batteries. The system can also be coupled to drive desalination to produce a completely off-grid facility or military base that is self-powering for its domestic loads, its heat loads and its vehicles.

IV. Industrial Applications

The above-described thermal energy storage system provides a stable output of heat from electrical energy that may be supplied from a renewable source. The stable output of heat may be provided to various industrial applications, to address art problems, as explained below.

The ultrahigh temperatures capable of a radiatively heated thermal energy system 100 allow for application in a wide range of industrial processes. In particular, for processes that require ultrahigh temperatures, for example in glass production and metallurgical applications, such a high temperature thermal energy storage system powered by renewable energy provides the possibility of operating entirely or in large part from renewable energy around the clock, providing a path toward zero carbon processes.

A. Material Activation

1. Problems to be Solved

Cement production is one of the largest sources of global carbon emissions, responsible for as much as 8% of global $CO_2$ emissions. The carbon emission from cement production, however, has been growing more quickly than fossil fuel production. The unmet need to decarbonize the manufacture of cement is thus becoming even more of a critical requirement to achieve reductions in global $CO_2$ emissions in order to stabilize Earth's climate.

Cement is typically made from limestone and clay (or shale). These raw materials are mined, then crushed to a fine powder. The blended raw material ("raw feed" or "kiln feed" or "meal") is heated in a rotary kiln where the blended raw material reaches a temperature of about 1400° C. to 1500° C., e.g., 1400° C. to 1500° C. In its simplest form, the rotary kiln is a tube that may be, for example, 200 meters long and 6 meters in diameter, with a long flame at one end. The raw feed enters the kiln at the cool end and gradually passes down to the hot end, then falls out of the kiln and cools down. In the initial stages at lower temperature (e.g., 70-600° C., and more specifically, 70-350° C.), free water evaporates from the raw feed, clay-like minerals and dolomite decompose into their constituent oxides, producing calcium carbonate, magnesium oxide and carbon dioxide.

Over intermediate temperatures (650-1050° C.), some calcium carbonate reacts with silica to form belite ($Ca_2SiO_4$) and carbon dioxide. Remaining calcium carbonate decomposes to calcium oxide and $CO_2$. At the hottest regions (1300-1450° C.) of the kiln, partial melting takes place and belite reacts with calcium oxide to form alite (Ca3O.SiO4). The rotary kiln is used in more than 95% of modern world cement production.

The material exiting the kiln, referred to as "clinker", is typically composed of rounded nodules. The hot clinker falls into a cooler, which may be designed to recover some of its heat, and cools to a temperature suitable for storage (or is directly passed to the cement mill where it is ground to a fine powder). Gypsum or other materials may be ground together with the clinker to form the final cement product.

The hottest end of the rotary kiln heated by a combination of recovered heat from the hot clinker and burning of fuels is at the exit of the clinker. The heated gas travels in a direction counter to the clinker process. The exhaust gas exits where raw feed enters the rotary kiln.

A majority of cement production uses a separate precalciner to increase production and efficiency for a given cement kiln. The precalciner is a suspension preheater which allows some of the energy required for the process to be burned at its base. The precalciner allows more thermal processing to be accomplished efficiently in the preheater, greatly increasing throughput for a given sized rotary kiln tube.

Depending on the system design, a precalciner can output feed that is 40-95% calcined, at high end, leaving the primary role of the rotary kiln for sintering. The input gas to the precalciner may be preheated by the hot air recovered from cooling clinkers, in addition to the fuel burned. The hot gases exiting the top of the precalciner are often used for drying raw materials. This process, however, tends to be intermittent, thereby wasting heat when the rawmill is stopped.

In some cement production systems, a bypass between the kiln inlet and the precalciner may be installed to extract the dust containing materials potentially damaging to equipment and to final product quality. The collected material, referred to as the cement kiln bypass dust (CBPD), can be approximately 2%, e.g., 2%, of the total clinker production by weight and consists primarily of calcium oxide, a key component of clinker, as well as salts such as KCl and other contaminants. CBPD is usually landfilled at a cost.

CBPD mainly includes already decarbonized calcium oxide. A recent study has shown that temperatures of approximately 900-1200° C., e.g., 900-1200° C., can transform CBPD into valuable clinker components such as belite, mayenite, alite and ferrite at lower temperatures than in the rotary kiln (assisted by other components in CBPD while vaporizing and removing contaminants such as KCl) leaving behind a cementitious product free from a majority of the undesired contaminants which are initially present.

In a traditional cement plant, fuel and oxygen are fired to provide heat into the clinker kiln. This fuel may be in the form of solid media such as refuse or coal (or may be natural gas) introduced along with combustion air into the kiln. At the outlet of the kiln, a stream of hot combustion gases provides a portion of the heat used to preheat the meal and then calcine the meal; the balance of that heat may be supplied by combustion of a fuel and/or heat recovered from hot clinker cooling. The process of calcination consumes about 20-75%, e.g., 20-75%, of thermal energy from fuel depending on precalciner design and operation.

The term "calcination" broadly refers to a process in which a solid chemical compound is heated to a controlled, high temperature in a controlled environment in the presence of little to no oxygen to remove impurities and/or to incur thermal decomposition to a desired product. The term calcination has traditionally referred to a process for decomposing limestone (or calcium carbonate) into quicklime (calcium oxide) and carbon dioxide. This reaction is widely used in industry given that limestone is an abundant mineral and that quicklime is used in the production of cement, mortar, plaster, paint, steel, paper and pulp as well as in the treatment of water and flue gases.

Other calcination processes include the dehydroxylation (i.e., removal of crystalline water) of gypsum used in producing building materials and other products and the dehydroxylation of alumina used in producing aluminum metal and other products. Another calcination process is the dehydroxylation of clay minerals, which may be used for the activation of clay for use as a supplementary cementitious material (SCM) in a cement mixture, such as alongside Portland cement. Clay mineral activation differs from its limestone counterpart in that the reaction releases water (—OH groups) instead of $CO_2$.

Different calcination reactions require different operating conditions (e.g., temperature, environment compositions, etc.) to expose minerals to heat and drive calcination. Over time, different designs have been developed, including shaft furnaces, rotary kilns, multiple hearth furnaces, and fluidized bed reactors. Many associated processes have also been developed including internal radiant heating via fuel combustion within a kiln or reactor, internal convective heating via hot gas flow within a kiln or reactor, or external heating of a kiln or reactor. These traditional modes are referred to as soak-calcination processes, given that the material takes several minutes to hours in the reaction chamber to become fully activated.

Flash calcination is another approach, which is more rapid than the soak process, and takes place in a reactor that uses gases at velocities and temperatures creating gas-particle interactions including entrainment and suspension, so as to drive effective heat transfer and encourage chemical reactions. Systems using this principle commonly introduce a gas that has been heated via combustion of a fuel (including direct exhausted combustion products) and/or a gas that may be heated from cooling the products of calcination (or recovered from other heat sources, at the bottom of a reaction chamber in an up-flow configuration). The gas temperature may commonly range from 600° C. to 1100° C. In one implementation, raw clay material to be processed is finely divided and is fed into a chamber above the hot gas injection point. Upward flowing hot gases interact with raw material and may suspend the raw material through the chamber where the particles are quickly heated by the flowing gases.

Additional sources of heat may be incorporated within (or without) the chamber, including fuel combustion devices or additional hot gas introduction ports, to maintain a desired temperature profile or ambient gas composition. As the material exits the chamber, it has been heated to the desired state of calcination (or activation). The gas composition within the chamber may be selected to perform a function of controlling the quality of the product. For example, oxygen may be excluded or there may be a reducing atmosphere zone for quality control of the product. The material to be processed may contain iron that will become oxidized in non-reducing environments and cause the product to change color which may not be desired. This atmosphere reduction zone may be enforced via injection of reducing gases or supplied via supplemental burners in which any oxygen in the air is reduced via injected fuel. After heating and calcination, the material is then rapidly cooled, often by air in cooling cyclones or another form of air quench. Water can also be used as a cooling fluid in certain processes. The product is cooled to 100° C. to 200° C.

Some attempts have been made to analyze clay calcination in gas suspension heaters in order to determine the effect of operating conditions. In one example, a kaolinite particle feed was added above a burner and passed through the chamber with and without supplemental burners along the channel. Convection was the dominant form of heat transfer in the process where an ideal gas supply temperature was about 900° C., e.g., 900° C., without supplemental burners.

In these approaches, internal resistive heaters cannot be used to replace a burner in the calciner. The technical reason is that it is extremely hard to heat the large gas volume needed for gas suspension purely via resistive heaters, as the space and cost required would be too large. Additionally, the resistive heaters may experience degradation due to the particulate matter present in a calcination process.

2. Calciner Heated by Electric Power from Thermal Energy Storage

The present disclosure describes example implementations that involve the replacement of fired fuel and/or hot gas generators with a novel high-temperature thermal energy storage (TES) system. Example implementations cover multiple embodiments of a material activation system with different degrees of integration into material activation processes, which may be used to produce quicklime in some implementations or other activated materials such as activated clay or alumina. Example implementations relate to a novel TES system's integration with a material heating system using any of a variety of calciner/kiln configurations. In some implementations, the integration could be with an existing plant where the TES system and all process modifications are retrofitted to an existing material activation system. In other implementations, a new material activation system is built in which the material heating system is designed around the thermal energy storage system.

In one implementation, a thermal storage system may be used as a replacement for existing hot gas generators in material activation processes. Accordingly, one or more thermal energy storage arrays may provide hot gas as the primary heat transfer fluid for convective heat transfer demands of the material heating system. These demands may include the drying, preheating, cooling, or calciner heating and may be filled via direct tie-in to a thermal storage unit. Gas of any composition may be either recirculated through the TES system after use or fanned in from ambient air, to be used at higher temperatures in the process.

In various implementations, the material activation system includes the above-disclosed thermal energy storage system transferring heat into air, into $CO_2$, into $CO_2$ with a small air fraction, into gases which vary in composition with time (e.g., a dominant gas with a second gas such as air or $O_2$ being present at a different concentration during some fraction of operating hours), and/or into gases arising from an interconnected industrial process, such as mineral calcination. In a further implementation, a small amount of hydrogen or other reducing gas may be included with the carbon dioxide. Example implementations may also include provisions for tolerating, separating, and/or removing entrained particulate matter in a structure such that periodic cleaning maintains long-term performance of the TES system.

In some implementations, carbon dioxide is used as the heat transfer fluid to deliver heat into the material activation process and is then combined with additional carbon dioxide released by calcination. Accordingly, no carbon dioxide separation processes are required (other than condensing any water which results from the combustion of fuel). In another example implementation, thermal energy storage systems employed in the process can heat multiple different gases or gas mixtures for use in the material activation system.

Example implementations as disclosed herein can be considered with regard to two subclasses. In the first subclass, a TES system directly supplies heat in the form of a heated fluid (such as air, $CO_2$, gaseous combustion products, or a combination of multiple gases), replacing a combustion-based hot gas generator for some or all of its typical applications in a material activation process. These applications include, but are not limited to, drying raw material (such as limestone, clay, bauxite, or raw meal), aiding in reactor start up and cool down (getting a reactor to auto ignition temperature (600° C. to 1500° C.)), and preheating raw material (such as limestone, clay, bauxite, raw meal, or a mixture) to desired reactor operating conditions (400 to ° 1000° C.). Implementations in this first subclass may apply to combustion-based material heating systems such as fuel-fired calciner/kilns, where all auxiliary heat needs other than the burners in the calciner/kiln are provided by thermal energy stored in the TES system.

The second subclass is a more highly integrated process in which the TES system is used to supply thermal energy/heat in the material activation process and combustion may be used in moderation (if at all) to provide suitable atmosphere control for the desired reaction. Example implementations include different process configurations of the TES system integration. In various implementations, one or more high temperature TES units supply heat directly or indirectly to the calciner or kiln reactors as well as dryers and pre-heaters.

In implementations that employ direct heat transfer, the fluid used as the heat transfer medium in the TES system is being supplied directly to the raw material in the calciner and then recirculated back to the TES system after coming into direct contact with the raw material. In implementations that employ indirect heat transfer, the fluid used in the TES system does not come into direct, physical contact with the material in the material heating system. Rather, in some implementations, the fluid in the TES system is used to transfer thermal energy via a heat exchanger into a secondary fluid that comes into contact the material. In other implementations, the fluid used in the TES system may indirectly heat the raw material without the presence of a secondary fluid by heating the walls of the calciner or kiln reactor system, with the heated walls transferring heat to the raw material on the other side of the wall via conduction and radiation. This "indirect" heating mode of thermal storage operation can also be used in applications other than calcination or kiln reactors, including but not limited to biomass drying or food processing. The secondary fluid may be in the liquid state in some implementations.

There is also a combination of direct and indirect heating modes for the TES system fluid where the higher temperature TES system fluid exchanges heat indirectly with a secondary fluid (with a gas-to-gas heat exchanger, for example) and additionally raises the temperature of the secondary fluid stream via direct injection by a bypass configured to inject a portion of the higher temperature fluid from the TES system into the secondary fluid provided to the material heating system. This can be useful for atmosphere control within the material heating system (and within the TES system as well in some implementations). The secondary fluid mixed with some of the TES fluid is then exposed directly to the raw material of the material activation process to supply heat. After supplying heat, this secondary fluid may be treated to remove undesired components that were added to the stream via contact with the raw material such as water, undesired emissions (SOx, NOx, CO, etc. . . . ), and particulate matter. Some or all of this treated secondary fluid may be used to fill other auxiliary heat demands such as drying or preheating or treating or cooling demands (oftentimes, raw material must be cooled after reactions in the calciner/kiln reactor zones). Some or all of the secondary fluid may be returned to the heat exchanger where the stream can be reheated.

In some implementations, a small portion of the heat may also be supplied via supplementary combustion in the material activation process. This may raise the temperature of the gaseous heat transfer stream depending on the specific operating conditions associated with the combustion. Generally, the fuel would be combusted 'fuel rich' meaning that there is more fuel than stoichiometric oxygen in the reaction. The primary reason for this fuel rich combustion is atmosphere control as clay, for example, requires slightly reducing systems to not oxidize the iron in the clay and hence prohibit 'color change'. For example, the amount of oxygen may be reduced, and the iron in the clay may be reduced. The TES system may, however, require slightly oxidizing conditions for nominal operation. The supplementary combustion would remove the small amount of oxygen and create color reducing conditions for the clay. The final product to be output is activated clay, which is used instead of clinker to make cement.

There are several relevant calcination processes that are covered by the material activation system described herein. Different processes often demand different operating conditions (temperature, pressure, residence time, gaseous composition in the calciner, etc. . . . ) although various components of the material activation system may be shared amongst different processes.

Figure 76:
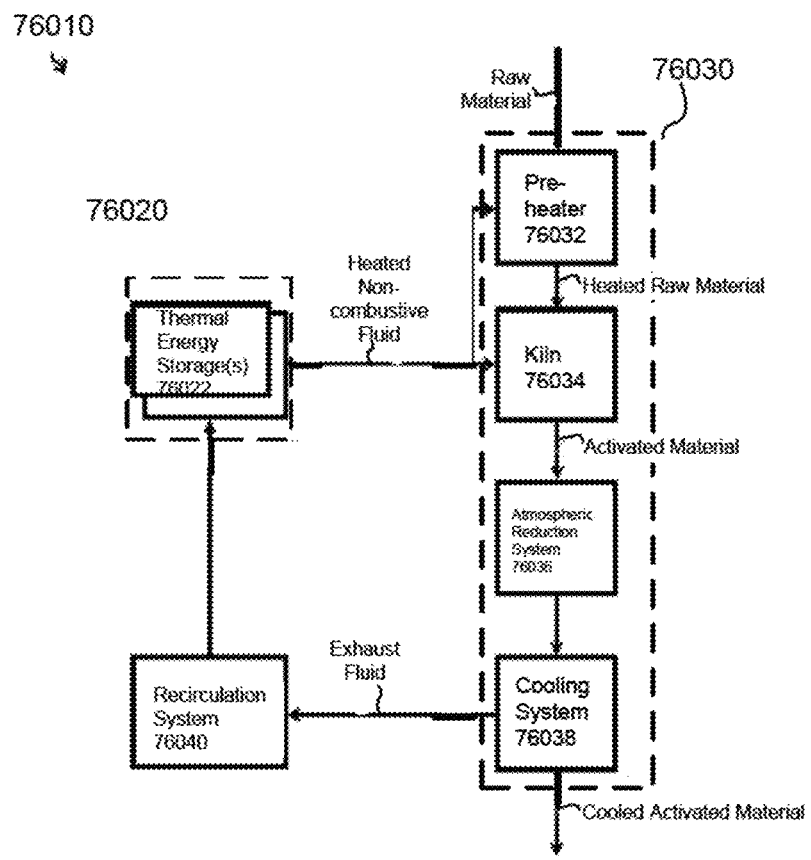
FIG. 76 illustrates a material activation system according to an example implementation.

FIG. 76 illustrates an example implementation of a material activation system 76010 described herein. As shown, material activation system 76010 includes a TES system 76020, a material heating system 76030, and a recirculation system 76040. TES system 76020 includes one or more thermal energy storages 76022. Material heating system 76030 includes a pre-heater/precalciner 76032, kiln/calciner 76034, atmosphere reduction system 76036, and a cooling system 76038. In other implementations, material activation system 76010 may include more (or fewer) components than shown; components may also be arranged differently.

As discussed in greater detail in other sections, TES system 76020 is configured to store thermal energy derived from an energy source. In some implementations, this energy source is a renewable energy source (e.g., wind, solar, hydroelectric, etc.) or some other form of variable energy source. Thermal energy storages 76022 within TES system 76020 may include heating elements configured to heat a storage medium using electricity from the energy source. These heating elements may include any of the various examples described herein including, for example, thermal resistors, ceramic resistors, etc. The storage medium may include any of various examples described herein such as brick, stone, etc.

To facilitate extraction of thermal energy from the heated storage medium, blowers may be used that are configured to heat a non-combustive fluid (e.g., carbon dioxide, nitrogen, air, or others discussed previously) by circulating the non-combustive fluid through the heated storage medium. As noted above, the use of non-combustive fuel stands in contrast to prior combustion-based systems that rely on a combustive fluid (e.g., natural gas, propane, methane, etc.) to provide energy. In various implementations, TES system 76020 is configured to provide this circulated non-combustive fluid to the material heating system to facilitate activating a raw material. In some implementations, TES system 76020 is configured to provide the circulated non-combustive fluid to the material heating system at a temperature within a range of from 600° C. to 1100° C.; however, the fluid may have a different temperature in other implementations.

Material heating system 76030, in general, is configured to apply thermal energy to a raw material to produce an activated material. Techniques described with respect to the material heating system may be employed with respect to any of various material activation processes. As discussed above, in some implementations, material heating system 76030 is a calcination system configured to perform a calcination process that removes carbon dioxide from a supply of calcium carbonate to produce calcium oxide. In other implementations, material heating system 76030 is configured to perform a dehydroxylation process (i.e., use of heat energy to remove molecularly bound water) that removes hydroxide from clay minerals to produce activated clay. In other implementations discussed below with FIG. 83, material heating system 76030 is configured to implement a single stage of the Bayer process that includes a calcination step which transforms bauxite to produce aluminum oxide as the activated material.

In various implementations, material heating system 76030 is configured to receive thermal energy derived from the non-combustive fluid provided by TES system 76020. As previously discussed, the provided fluid may be used in a direct heating implementation in which material heating system 76030 brings the provided fluid into contact with the material. The provided fluid may alternatively be used in an indirect heating implementation in which a heat exchanger is configured to receive the circulated non-combustive fluid from TES system 76020, transfer heat from the circulated non-combustive fluid into a second fluid, and provide the heated second fluid to material heating system 76030 for applying the thermal energy to the raw material. In a mixed fluid implementation, material activation system 76010 may further include a bypass configured to inject a portion of the circulated non-combustive fluid received from TES system 76020 into the second fluid provided to material heating system 76030. In some implementations in which TES system 76020 is unable to supply enough thermal energy for material heating system 76030, material activation system 76010 may further include a burner (or some other combustion based energy source) configured to supply combustion energy to the material heating system in addition to the thermal energy supplied by the TES system.

Pre-heater 76032 is configured to apply thermal energy derived from the circulated non-combustive fluid to heat the raw material to a first temperature before providing the heated raw material to the kiln for heating to a second temperature. In some implementations in which the Bayer process is performed, pre-heater 76032 is configured to implement a first stage of the Bayer process that includes heating the bauxite to a temperature within a range from 300° C. to 480° C. and at a first pressure within a range of 6 bar to 8 bar. In the illustrated implementation, the thermal energy applied by pre-heater 76032 is received from TES system 76020; however, in other implementations, some or all of this thermal energy may be obtained from an exhaust fluid output by kiln 76034.

Kiln 76034, in various implementations, is the primary component responsible for applying thermal energy to a raw material to produce an activated material. Kiln 76034 may be implemented using any suitable techniques such as flash calcination, rotary kiln, or others discussed above. For example, in some implementations, kiln 76034 is configured to apply the received thermal energy by injecting the raw material via a first inlet of the kiln and injecting, via a second inlet underneath the first inlet, the heated non-combustive fluid in an up-flow configuration that suspends the raw material within the kiln in order to more efficiently heat the material. In one implementation in which the Bayer process is performed, kiln 76034 is configured to implement a second stage of the Bayer process that includes elevating a temperature of the bauxite within a temperature range from 750° C. to 950° C. and a second pressure lower than the first pressure.

Atmosphere reduction system 76036 is configured to reduce an amount of oxygen in contact with the activated material produced in kiln 76034 before the material is cooled. In implementations that produce activated clay, the removal of oxygen may prevent the activated clay from becoming discolored due to oxidation of any iron present in the clay. In one implementation, atmosphere reduction system 76036 includes a burner that combusts a rich fuel mixture to produce carbon monoxide to absorb any excess oxygen. In some implementations, atmosphere reduction system 76036 may not be used as either the activated material may not react with oxygen or the fluid in contact with the material may already include a low oxygen content, such as in a direct heating implementation in which carbon dioxide is used as the non-combustive fluid.

Cooling system 76038 is configured to receive the activated material of the material heating system and reduce a temperature of the activated material. Cooling system 76038 may employ any suitable techniques such as using cooling cyclones or other techniques noted above. In some implementations, the exhaust fluids are collected from cooling system 76038 for recirculation by recirculation system 76040.

Recirculation system 76040, in general, is configured to recover thermal energy that has not been consumed by the material activation process. In the illustrated implementation, this recovery includes recirculating exhaust fluid output from material heating system 76030 to TES system 76020.

In implementations that produce carbon dioxide as a biproduct of the material activation process, recirculation system 76040 may recirculate produced carbon dioxide to TES system 76020 for use as the non-combustive fluid. In various implementations, recirculation system 76040 includes a filter configured to remove particulate from the exhaust fluid prior to the exhaust fluid being provided to the TES system.

As noted above and discussed in more detail below, in some implementations excess thermal energy may be used for various other purposes. For example, material activation system 76010 may include a steam cycle system that includes a heat exchanger configured to produce steam from thermal energy recovered from material heating system 76030 and a steam turbine configured to generate electricity from the produced steam.

Figure 77:
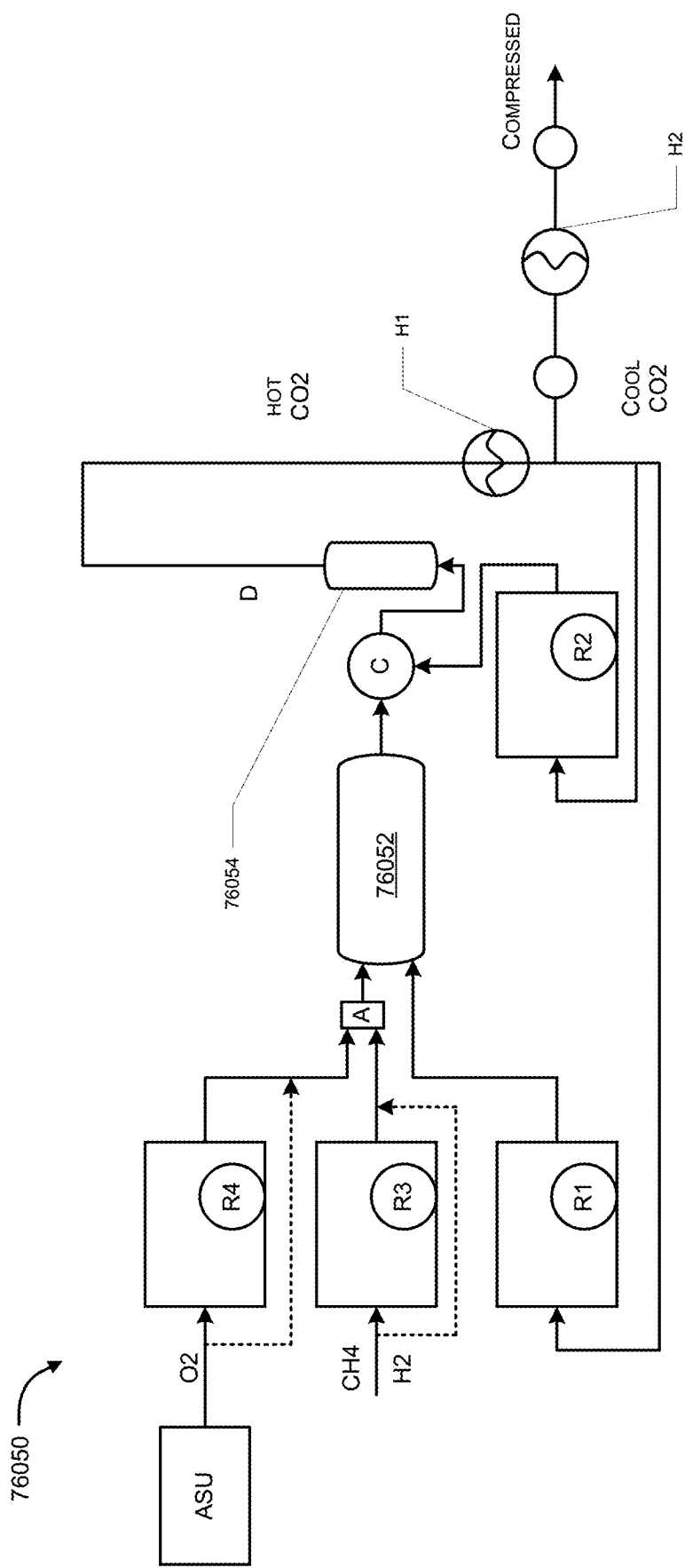
FIG. 77 illustrates a calciner with the thermal energy storage system according to an example implementation.

FIG. 77 illustrates another implementation 76050 of a material activation system using electrically heated thermal energy storages R1-R4. The overall process uses carbon dioxide as the principal heat transfer medium through the kiln/calciner and precalciner. No air, nitrogen, or excess oxygen is introduced into the kiln, and as a result, the $CO_2$ that is evolved by the calcination reaction is mixed with $CO_2$ that was supplied as the process heat carrier and any $CO_2$ produced by fuel combustion, so that the gas stream at point D, the exit of the preheater calciner unit, is nearly pure $CO_2$, potentially with some water if fuel is combusted. This $CO_2$ stream in part or whole, is optionally used to dry raw materials, increasing its moisture content and is partly cooled and compressed-/-pumped away, and partly recirculated to the thermal energy storages R1 and R2 to carry further heat into the process. Each thermal energy storages R1 and R2 accepts a $CO_2$ stream at a lower temperature and heats that $CO_2$ stream to a very high exit temperature by passing it through a series of conduits in solid material which has been heated by electrical energy (e.g., the "storage media core"). Thus, a closed carbon dioxide cycle heat transfer is provided.

By choosing appropriate materials for heating elements and heat storage media, the heat transfer gas may be selected among a wide range of compositions, including but not limited to any of, or any mixture of, air, N2, O2, $CO_2$, H2O, and other gases or gas mixtures. Optionally, a minimum level of oxygen may be included, depending on the composition of the resistive heating element. In addition to carbon dioxide as explained above, in combination with a fraction of hydrogen gas or other reducing gas, nitrogen may also be used. A benefit of using nitrogen is that it is inert and the primary gas present in atmospheric air. Certain gases interact with metallic heaters in such a manner as to limit their operating temperatures. Heating materials which form protective oxide scales are compatible with the continuous or intermittent presence of oxygen. Other heaters, including conductive ceramics and encapsulated heaters, enable higher operating temperatures and selection of atmospheres which are oxidizing or reducing.

The $CO_2$ stream is passed directly through the thermal energy storage as the principal heat transfer fluid. The solid media is heated by intermittently available renewable or grid electricity, and relatively continuously delivers a high temperature stream of $CO_2$ which may be at 1000° C. or higher temperature and may deliver a significant fraction or all of the process energy required by kiln 76052 and preheater/calciner units. Each "unit" referred to may include one or multiple units to meet charging, discharging or other requirements. The thermal energy storage may not deliver high enough temperature or energy to the kiln 76052. The combustion of some fuel may supplement the energy flow and boost the temperature to what the process requires. Therefore, the heating process may optionally be a hybrid of heat derived from renewable electricity and heat derived from fuel combustion.

In one example implementation, this fuel combustion directly releases its combustion gases into the kiln, avoiding the expense of heat exchangers. Those combustion gases include principally or only carbon dioxide and water because an air separation unit has delivered a relatively pure stream of oxygen. In some example implementations, a stoichiometric or near stoichiometric amount of oxygen may be used in burning of the fuel to create a stream of syngas (i.e., synthetic gas) containing a desired amount of carbon monoxide.

The produced syngas may be used in a separate water gas shift reactor system to produce hydrogen and carbon dioxide, which can be used directly as fuel or separated and productized. Accordingly, nitrogen is not introduced into the gas stream flowing through the kiln, which may yield an additional benefit of avoiding nitrogen oxide formation at high temperature and making obsolete the non-catalytic reduction requirement (i.e., injection of ammonia solution into the kiln), avoiding unnecessary heating of a bystander gas such that a $CO_2$ separation technology is not needed in the process to separate $CO_2$ from nitrogen.

The combustion oxygen stream is optionally preheated to high temperatures, such as 800° C. or higher, by a thermal storage unit R4 in which oxygen is directly flowing through the thermal storage media core. Optionally, the oxygen stream may be mixed with recycled flue gas (predominantly $CO_2$) to control the flame temperature and heat output of the combustion process. In another example implementation, the oxygen stream is mixed with both or either of flue gas (predominantly $CO_2$) and/or gaseous fuel before entry into the kiln combustion system.

By tuning the quantity of $CO_2$ mixed into the fuel stream, the heating profile can be controlled in a way to adjust, for example, fuel consumption, product production, quality and system configuration to allow retrofitting of existing kilns. The fuel, whether methane, propane, hydrogen, or other fuel, optionally combined with recycled $CO_2$ stream, may be preheated by a separate thermal energy storage R3 in which the fuel gas flows directly through the thermal energy storage core.

This preheating allows the heat released by combustion to deliver only the high temperature heat, with lower temperature heat needed to heat the oxygen and fuel provided by captured thermal energy. The construction materials used in thermal energy storages R3 and R4 may be the same as those in storages R1 and R2 or may be different so as to tolerate the gas composition(s), temperature requirement or to improve performance, cost, durability, chemical interactions or other parameters.

In one implementation, the result of the foregoing example operations is that between storage R1 and combustion of fuel and oxygen optionally heated by storages R3 and R4, high temperature $CO_2$ streams deliver the kiln heat required by the kiln reaction steps. The kiln exhaust gas stream is comprised principally of $CO_2$ (potentially with $H_2O$ from combustion, if any). This gas stream is optionally combined with another superheated $CO_2$ stream carrying high temperature heat at point C and introduced into the calcination and preheating process 76054, heated by thermal energy storage R2. In the calcination process, additional $CO_2$ is released, and thus a higher volume of $CO_2$ flows at D. The gas stream at D may be cleaned of particulate matter by, for example, a cyclone separator and/or ceramic filter.

The gas stream is divided, with one portion returned to thermal energy storages R1 and R2 where it is reheated to continue to deliver heat into the process, and another portion partially cooled and extracted as captured $CO_2$.

In one implementation, a control system matches the rate of $CO_2$ extraction and compression to the rate of $CO_2$ production in the calciner. That control system may use measurements of the relative gas pressure in the various process units or other ordinary means to control the rate of gas extraction. Two heat exchangers H1 and H2 are shown which may cool the $CO_2$ by releasing heat to the environment or may cool the $CO_2$ and use the heat for another purpose, for example drying of raw material or heating input $CO_2$ stream for R2. This example operation allows for energy recovery even when the rawmill is not operational, as they tend to run intermittently to ensure a surplus of raw material to keep the kiln running continuously.

Alternatively, a separate TES system (not illustrated) may be coupled to the rawmill operation such that the drying process is powered from the thermal energy storage. The thermal energy storage may be charged convectively by exhaust at D or electrically. The cooled $CO_2$ may be compressed, captured and stored or used for another purpose. Because the stream almost entirely consists of $CO_2$ and potentially water, water removal through a condenser would produce a pure stream of $CO_2$ ready for compression. Optionally, a relatively inexpensive $CO_2$ purification unit may be used. In comparison, MEA absorption requires a considerable amount of energy for regeneration and fans and pumps.

Figure 78:
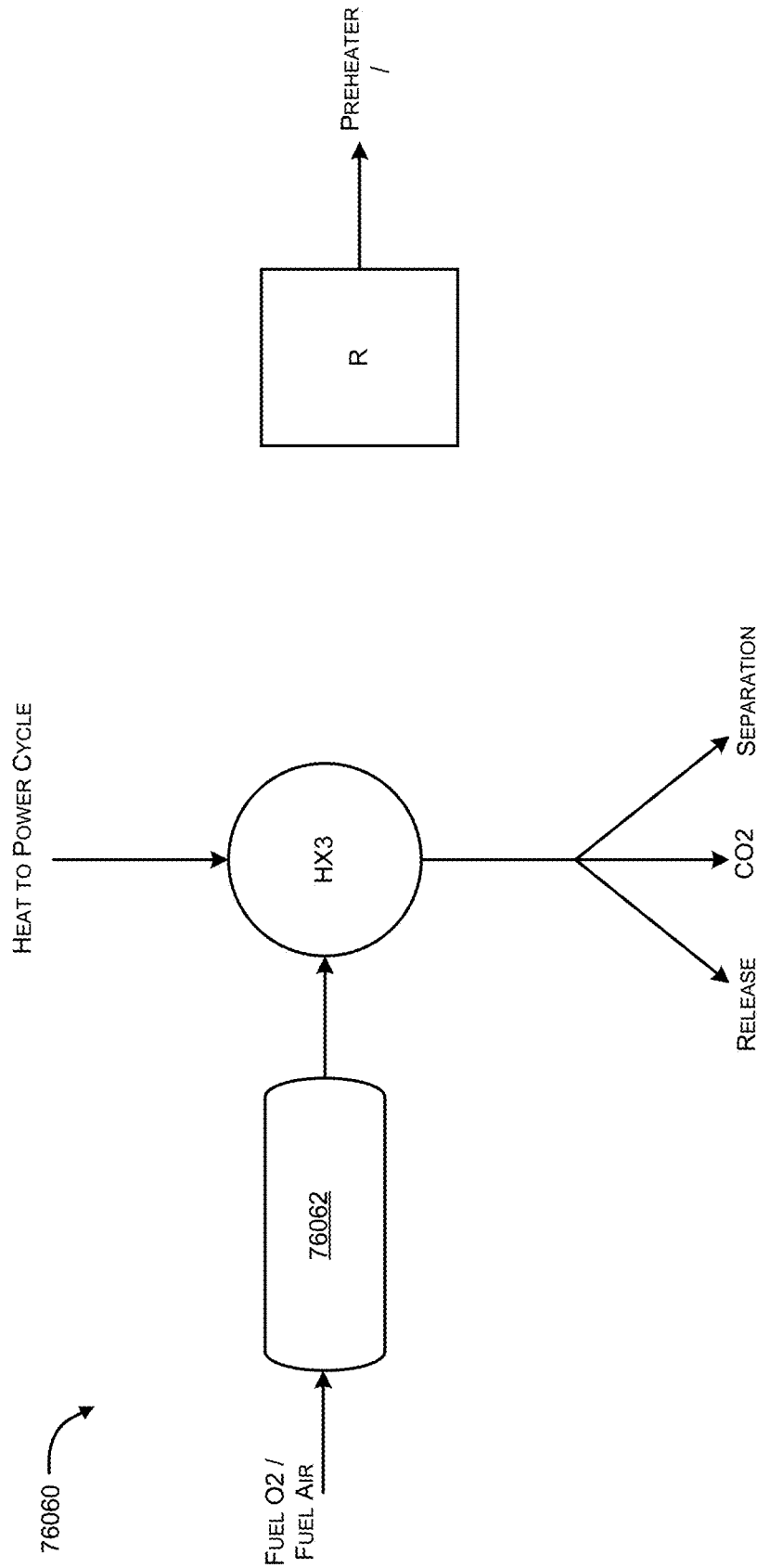
FIG. 78 illustrates a calciner with the thermal energy storage system according to an example implementation.

FIG. 78 illustrates an example implementation 76060 of a kiln 76062 and precalciner R decoupled system. The hot exhaust air from the rotary kiln is decoupled from the preheat/precalciner inlet. The heat recovered from the cooler for the hot clinker may or may not be fed into the precalciner.

In another optional example implementation, thermal storage system R2 or another heat system provides heat for the treatment of cement kiln bypass dust (CBPD) to increase product yield, reduce carbon emission and reduce costs associated with landfilling or otherwise disposing of the material. The separated or addition of salts may be beneficial as additives to the main material stream to lower the processing temperatures, reducing the energy and temperature requirement to form the desired product, potentially further reducing the need for fuel fired heat topping and allowing renewable energy to power a larger fraction of the cement production process.

Figure 79:
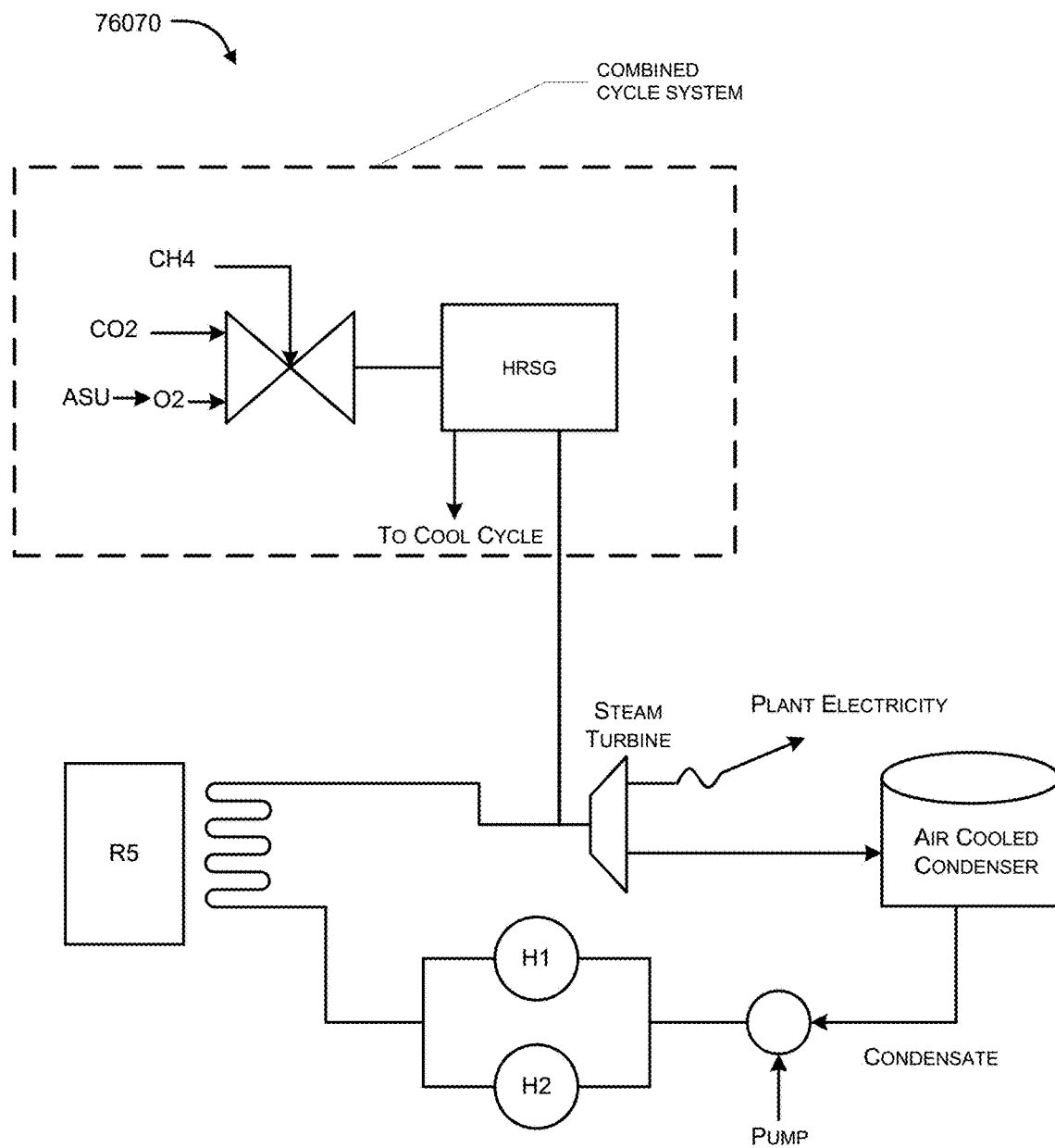
FIG. 79 illustrates an integrated fuel-fired and renewable heat and power system powering a calciner with the thermal energy storage system according to an example implementation.

FIG. 79 shows an implementation 76070 that uses waste heat from cement production process exhaust to provide economizer heat in a thermal cycle power generation system. As shown, an electrically heated thermal energy storage R5 may produce superheated steam, supercritical carbon dioxide, or another heated working fluid driving a turbine power generation cycle. An electrically charged thermal energy storage unit delivers a high pressure, high temperature stream—superheated steam, carbon dioxide, or another working fluid—driving a turbine which powers the generation of some or all of the electricity used at the facility relatively continuously. The thermal generation cycle reject-heat flows to an air- or water-cooled condenser, and the cooled condensate or return gas is then pumped to high pressure.

Heat exchangers H1 and H2, which capture heat from the carbon dioxide streams, may release heat into the feedwater or inlet gas stream for the power generation cycle, thus capturing that otherwise waste heat as a heat recovery economizer in the power cycle. In various implementations, that power cycle may be a simple steam turbine cycle, an organic Rankine cycle, a supercritical carbon dioxide ($sCO_2$) cycle, or it may be a combined cycle power generation system, including a combustion turbine whose exhaust is captured to drive a second thermal cycle.

In one example implementation, the combustion turbine is oxyfuel blown and its exhaust gas $CO_2$ is introduced back to the overall $CO_2$ cycle, eliminating any separate $CO_2$ emissions from the power generation. The thermal energy storage R5 may be integrated into that combined cycle as shown. In one example implementation, supercritical carbon dioxide is used as the working fluid inside the heat storage unit and can directly run a $sCO_2$ power cycle or be used for another application.

The $CO_2$ stream extracted from the cement manufacturing process may be used for multiple purposes, including geologic sequestration, carbonation of supplementary cementitious materials, or as an element in the production of synthetic fuels.

Another example implementation includes a steam cycle for continuous power generation and additional heat recovery. In such an implementation, hot air from the cooling cyclones or a screw heat exchanger in contact with the hot calcined product exchanges heat with pressurized, recycled water from the steam cycle and some makeup water. This cooled gas/air is either released to the environment, used in the drying part of the process, or introduced as cool gas in a TES system. The preheated water is turned into steam via heat exchange with a TES system. This may be the same TES system involved in the calcination process or a supplementary unit. The air side of this heat exchange is circulated back into the TES system to reduce waste heat. The steam is then expanded in a steam turbine, generating electricity for the plant. The steam downstream of the steam turbine may exchange heat one last time with air or gas for use in the drying process before being mixed with any feed water makeup, pressurized and recirculated in the cycle.

Figure 80:
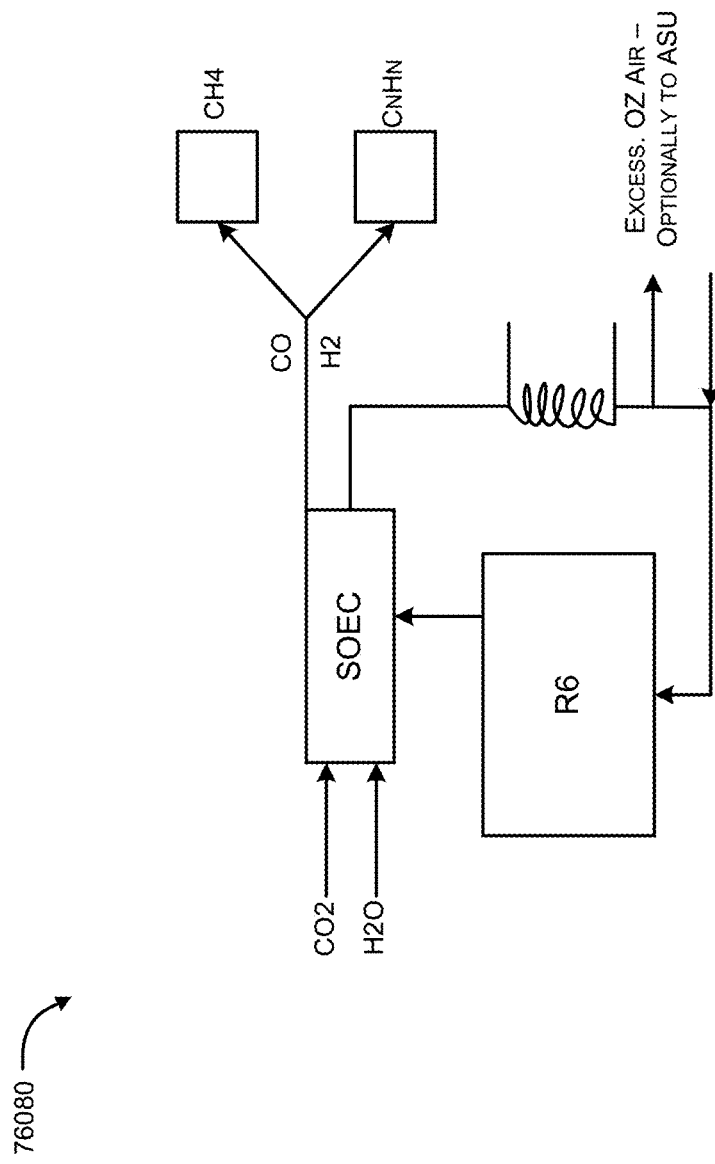
FIG. 80 illustrates a solid-oxide electrolyzer co-electrolyzing $CO_2$ and water, connected to a Sabatier and/or Fischer-Tropsch apparatus integrated with a calciner and with a thermal energy storage system according to an example implementation.

FIG. 80 shows an integration 76080 of a solid oxide electrolyzer whose operation is maintained by heat stored in a thermal energy storage R6, and whose operation may be advantageously efficient by being maintained at beneficial temperature, with the thermal energy storage providing thermal energy that is absorbed in an endothermic electrolysis reaction.

Such a solid oxide electrolyzer may electrolyze water to produce hydrogen or may co-electrolyze a flow of steam and carbon dioxide, such that its outlet products are carbon monoxide and hydrogen, or syngas. The relative flow of $CO_2$ and $H_2O$ may be so adjusted as to produce the desired proportions in the syngas of carbon monoxide to hydrogen. The desired syngas composition may also be attained by controlling the combustion and stoichiometry of the fuel fired inlet. The syngas may be used for a variety of purposes, including the drive of Sabatier or Fischer-Tropsch reactions to make various hydrocarbon molecules, or a water gas shift reaction producing $H_2$ which may be used as fuels or feedstocks in other industrial processes.

The solid oxide electrolyzer (SOEC) may be integrated with thermal energy storage R6 in gas contact with the fluid flowing through the thermal storage core, where that circulating fluid is air. In one implementation, the SOEC may be swept by air at a higher temperature, such as 830° C., and the air exiting from the SOEC may be at a lower temperature such as 800° C. The heat in that air is then captured by a heat recovery unit to generate steam or heat another working fluid for another purpose. That heated fluid may for example be integrated into the electric power cycle previously described. The operation for the SOEC releases oxygen into the air sweep.

To manage overall oxygen concentration, relatively cooler air coming from the heat recovery unit is partially released, and ambient make up air is partially drawn into the thermal energy storage. This released gas is oxygen enhanced air. This stream may be supplied to an air separation unit, an alternative feedstock to the air separation unit, storage unit or fuel firing units shown on FIGS. 77 through 79 as a means of mitigating their electric power consumption and improving their output. Hydrogen or oxygen produced may be stored in tanks or underground caverns for future use or sale.

Figure 81:
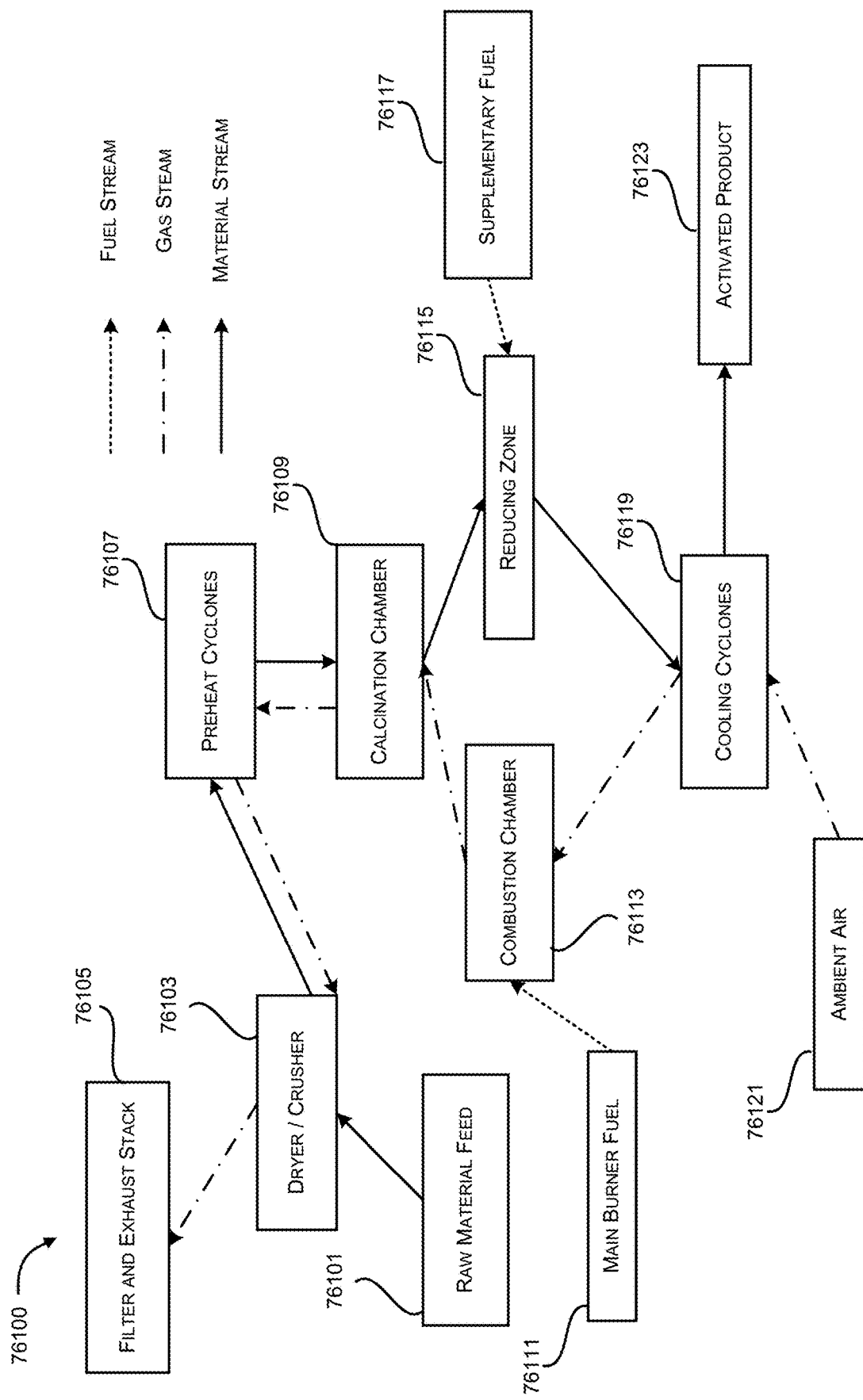
FIG. 81 illustrates schematic diagrams of a material activation process.

As shown in FIG. 81, combustion-based approaches 76100 may be associated with implementations of a calcination process. In one implementation, the raw material, such as the clay minerals, is provided at 76101. The raw material is fed to a dryer/crusher at 76103. At 76107, the crushed and dried clay is fed to preheat cyclones 76107. At 76109, the product that was fed through the cyclones and preheated with hot gas at 76107 is provided to a calcination chamber 76109. The calcination chamber 76109 is heated with hot gas provided from a combustion chamber 76113, which is provided by fuel from a burner 76111. The gas steam may also be provided to the preheater cyclones 76107, dryer/crusher 76103 and filter and exhaust stack 76105. At 76115, the product is reduced in a reducing zone 76115, which may be powered by supplementary fuel 76117. Then, the reduced product is provided to cooling cyclones 76119, where ambient air 76121 is provided for cooling. An activated material, such as activated clay for making cement, is provided at 76123.

Figure 82:
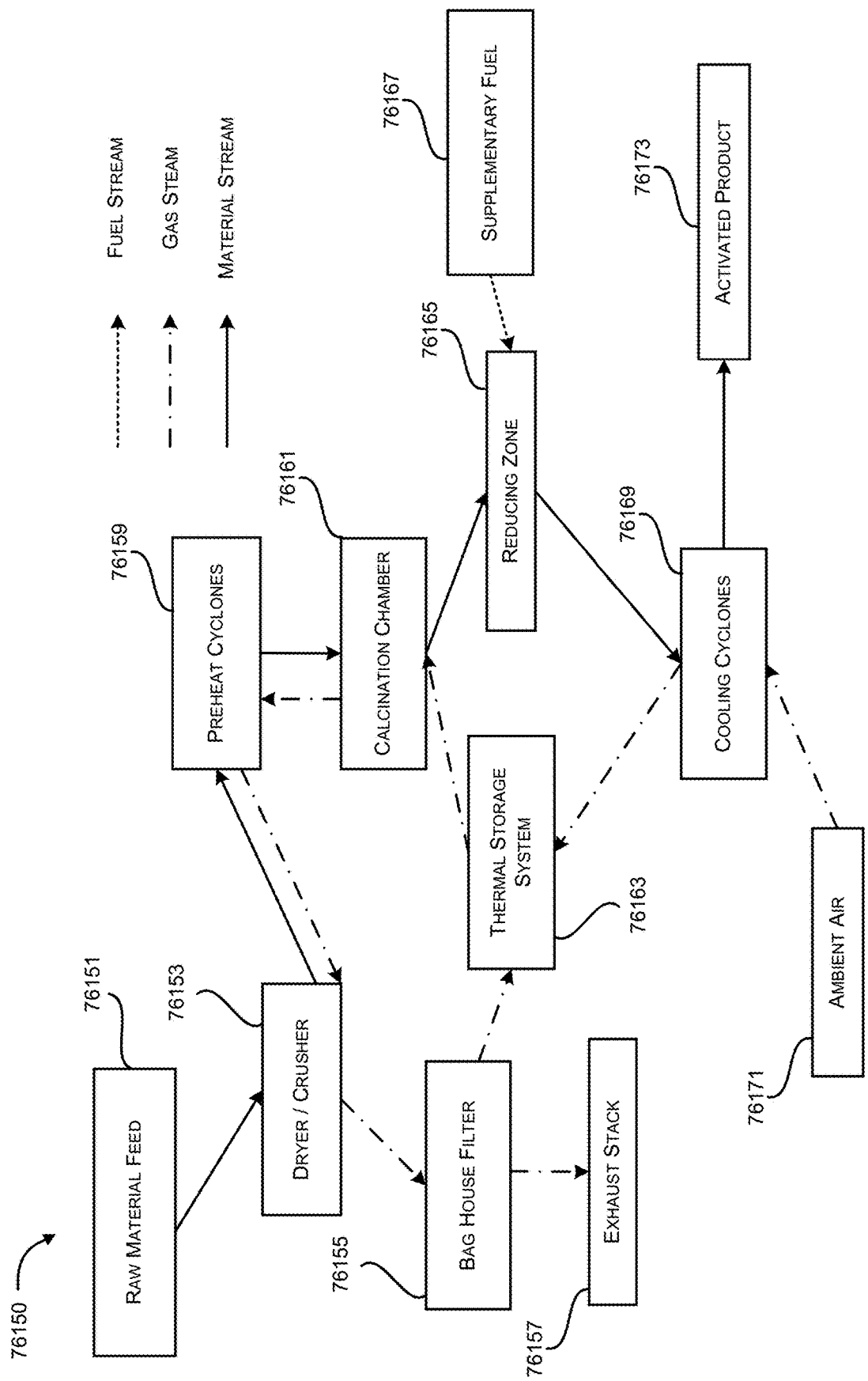
FIG. 82 illustrates schematic diagrams of various implementations of a material activation process with a thermal energy storage system according to an example implementation.

The foregoing approach is modified by the integration 76150 of a thermal energy storage system as shown in FIG. 82. Elements having similar or same depictions as FIG. 81 are not repeated. More specifically, instead of using fuel to provide air via combustion, the thermal energy storage system 76163 provides hot gas heated by radiative heating from electrical energy. Thus, it is not necessary to use fuel for combustion. Accordingly, the above-mentioned problems associated with moisture from the combustion process may be avoided. Additionally, a baghouse filter 76155 is used as an output of the dryer/crusher 76153, and the gas byproduct of the baghouse filter 76155 is provided to an exhaust stack 76157 and to the thermal storage system 76163 as an input. The byproduct gas from the cooling cyclones 76169 is also provided as an input to the thermal energy storage system 76163. The structures and operations associated with the other features, such as the dryer/crusher 76153, preheat cyclones 76159, the calcination chamber 76161, the reducing zone 76165, the supplementary fuel 76167, the cooling cyclones 76169, and ambient air 76171, are similar to those explained above with respect to the other approaches. In one implementation, the raw material, such as the clay minerals, is provided at 76151. An activated material, such as activated clay for making cement, is provided at 76173.

As noted above, the TES system may be used to provide heat into the calcination step of the Bayer alumina process. Additionally, the heat inputs into other parts of the process may also replace fuel, including the fuel that is provided at the mine, at the lime kiln, and at the steam generator that provides energy to operate these modules.

With respect to the calciner stage, art approaches perform calcination in two stages: a first stage at a lower temperature associated with a decomposer and steam separation to perform partial, and a second stage at a higher temperature than the first stage, but at a lower temperature than would be required if calcination was performed in a single stage. The first stage may be at a temperature such as 350° C., and the second stage may be in the range of 750° C. to 950° C. The two-stage calcination process provides energy efficiency advantages over a single stage calcination process. Similar to clay calcination, a fuel is provided as an input to the first calcination stage and the second calcination stage. The heat that is output from calcination may be provided for reading and waste heat recovery, with the remaining heat being expelled after water cooling via stack gas output.

Conventional calcination involves heating the cooled, wet gibbsite to 950° C.-1100° C. to remove free and crystalline moisture in the gibbsite, which is derived from bauxite. Art approaches have used a rotary kiln or calciner using heat from combustion. According to some art approaches, the material first enters a high-pressure calcination step (e.g., the decomposer), for example at 6-8 bar and 300° C.-480° C., and removes all the free moisture (e.g., drying) and activates a significant portion of the gibbsite to alumina. These mechanisms produce water vapor as effluent. The partially calcined material passes through a pressure reducer to the lower pressure calcination stage. This occurs at ambient pressure and relatively lower temperatures of 850° C.-950° C. Fuel and air that is preheated in the cooling of the product material is combusted in a gas suspension calciner. The heat from the flue gas is further recovered by being passed into a steam generator/superheater where is exchanges heat with recycled steam from the first stage, recycled steam from other steps in the Bayer process, or makeup water to supply the first calcination step (or decomposer) with superheated steam.

These approaches may have problems and disadvantages. For example, when steam is used as a heat transfer medium in calcination stage, it is necessary to account for the plant balance, as the extremely high mass flow of superheated high-pressure steam must be filtered and cleaned before recirculating to other areas of the plant. The theoretically more favorable heat balance from collecting high temperature moisture from the decomposer also translates to a more complex, integrated process. The large mass flow leads to art problems in supplying the correct quantity of superheated steam. The steam generator/superheater is a major area for concern, both from the thermodynamic and operating standpoint. Additional fuel must be fired in this step. Additionally, buildup in process equipment is one of the largest issues in the concept, as the recirculated steam often must be cleaned and filtered of particulate matter before interacting with the steam generator and superheater.

To address these problems and disadvantages, the thermal energy storage system described above supplies heat to recirculating process steam, and may be integrated with heat recovery apparatuses to address art plant balance problems. For example, heat from the hot flue gases of the second gas suspension calciner may be utilized to supply a portion of the heat to either the thermal storage working fluid medium (e.g., gas-to-gas heat exchangers) or the process steam (e.g., gas to liquid heat exchanger). This will allow the plant greater flexibility in energy management as well as maintenance to fix solid buildup in heat transfer equipment. The thermal battery may be external to the plant and may either supply steam externally with an attached steam generator or supply steam indirectly, passing hot gases through existing or new heat exchangers replacing the duty of combustion gas products.

In another example implementation, the thermal storage relates to a fully integrated process where the thermal batteries replace all combustion on site. This implementation includes the above-described approach, with supplying all or the majority of the heat to the second calcination stage. The temperature of the partially calcined material is brought to near ambient pressure (from the high-pressure stage 1) and put in direct contact with hot flue gases bringing the temperature to 850-950 C. This reduced temperature range allows the heat from fired fuels to be replaced by high temperature stored heat.

In some example implementations, the primary working fluid of the thermal energy storage system would contact the material to be calcined. In other example implementations, this heating may occur indirectly, where the primary working fluid of the thermal battery does not directly contact the material. The hot gas would be blown through the calciner at sufficiently high velocities to achieve desired level of suspension and activation. The gas effluent would leave the chamber at a high temperature to be used in the steam generation and superheating of the process steam used in the first stage of calcination as well as any other steam needs in the system.

Figure 83:
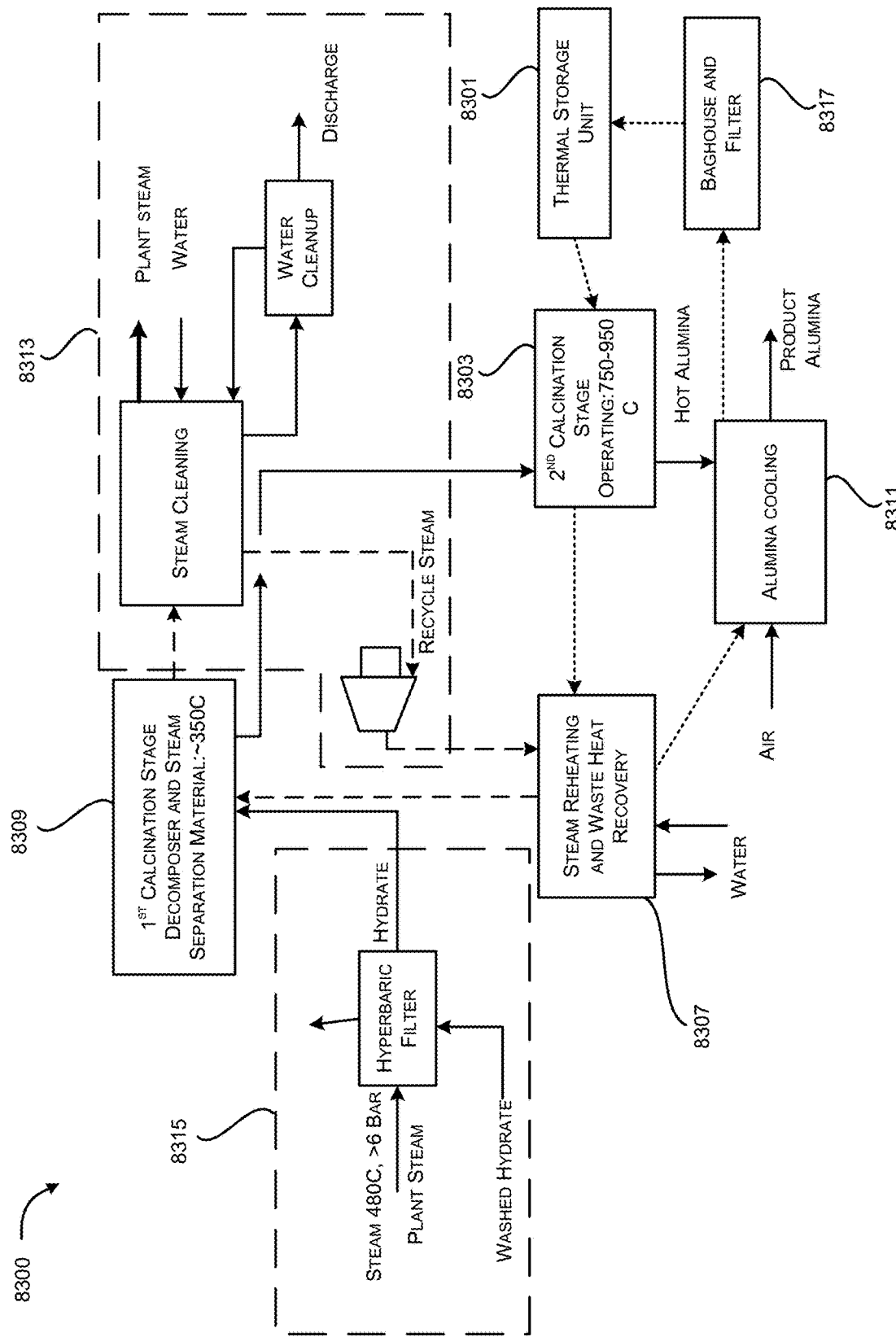
FIG. 83 illustrates schematic diagrams of various implementations of a calciner for the Bayer process, including the calcination step, with the thermal energy storage system according to an example implementation.

As shown in FIG. 83, a calciner process 8300 associated with aluminum production according to the example implementations has several modifications to prior approaches. The thermal energy storage 8301 provides a heat input to the second calcination stage 8303. Thus, instead of using fuel to generate that heat, such as by combustion in other approaches, the heat is provided as hot gas from the TES system as explained above. A high volume of high temperature hot gas is provided as an input to the second calcination stage at its operating temperature. Thus, it is not necessary to provide preheated air from alumina cooling 8311, as may be required in prior approaches.

The output byproduct of the second calcination stage 8303 is slightly cooled gas that can be used for the heat recovery steam generator 8307, instead of the additional fuel and air that may be present in the prior approaches. The steam output from the steam generator 8307 is provided to the first calcination unit 8309 at the temperature of the first calcination unit 8309, which may provide the recycled steam flow and solids as in the prior art. Additionally, instead of expelling excess heat or waste heat from the steam generator as a set gas, the heat byproduct of the steam generator is the gas that has passed through a heat recovery zone, and is injected into the alumina cooling cyclones 8311, along with ambient air. The byproduct heat from the alumina cooling cyclones is provided, through a baghouse and filter 8317, as the recirculated gas for the input of the thermal storage unit.

According to an alternative implementation, the TES system may only be used for providing the heat for the steam generator, so that the existing infrastructure of the alumina processing facility can be used without substantial modification.

The example material activation system may have various benefits and advantages. For example, because the output of the waste heat recovery is recirculated as an input to the thermal energy storage, emission of heat through the stack is avoided. Thus, unnecessary heat emissions to the atmosphere can be avoided. Additionally, by using the incoming heat from the TES system, it is not necessary to use fossil fuel to provide the input heat. Further, because the combustion aspect of generating heat is removed, the free moisture in the input combustion stream is eliminated, which avoids the problems introduced by the presence of that moisture, particularly with respect to the calcination of clay, as explained above. The example implementation also has a benefit of more favorable thermodynamics and lower maximum temperatures.

3. Advantages Over Prior Systems

The material activation system described herein may have various advantages and benefits over prior calcination implementations. For example, the material activation system may reduce or eliminate carbon dioxide emissions associated with cement manufacturing, by running partially or exclusively on renewable electricity using thermal energy storage arrays heated by electric power.

Further, the modularity of the thermal energy storages and applicability in various parts of the cement production process allows for stepwise electrification, retrofitting and hybridization with fuel firing. Integration of thermal energy storage allows low cost, low carbon intensity, low capacity factor electricity to operate various processes in cement production or other industrial applications at high annual capacity factors that may be nearly equivalent to operation with fossil fuels.

The material activation system described herein also addresses problems associated with moisture in clay. Clay is generally a very moist substance as it is often acquired in wet areas with relatively large amounts of both free moisture and crystal water in the structure of the mineral. The fuel consumption in the activation rises dramatically with the amount of free moisture present in the clay, due mostly to energy being wasted on a water phase change. This problem is further compounded by additional water vapor produced in combustion. The TES system, however, overcomes this problem as combustion is not the primary form of heat transfer. Not relying on combustion also allows the thermal storage system to have a higher degree of freedom in operating conditions since the air flow rate will not dramatically change the gas composition inside the reactor chamber.

Another benefit to switching from combustion to electrically heated and stored energy is that, in clay activation, there exists an upper bound temperature at about 950° C., e.g., 950° C. where the clay mineral structure is destroyed to mullite and loses all of its desired qualities for use as an SCM. In combustion-driven processes, temperature profiles inside of reactors are much harder to control than with a fixed temperature gas heat source that is much easier to control and monitor.

By decoupling the hot exhaust air from the rotary kiln from the preheater/precalciner inlet, one or more multiple potential benefits may be achieved. By decoupling the gas flow between the kiln and precalciner, gas flow and heating rates can be independently controlled to optimize each process. For example, in an air-through system, the amount of fuel that can be burned at the calciner can be limited due to excessive gas flow rates that can cool the flame temperature. Also, the heated exhaust gas from the kiln can be captured and used for alternative purposes, such as providing thermal energy to a power cycle to generate electricity.

Further, the hot exhaust from the kiln may contain significant amounts of undesirable components such as alkali salts, which evaporate in the hotter sections of the kiln. These undesirable components may cause damage to equipment, cause clogging in the precalciner as it cools and reduce quality of the product as it recirculates. By decoupling the kiln and precalciner, the undesirable byproducts can be kept out of the precalciner and potentially captured. Additionally, heat required for the precalciner can be provided from a TES system powered by renewable energy or other sources, and optionally supplemented by a fuel fired source.

As another benefit, the kiln and precalciner can be run on different gas makeups in some implementations. For example, the kiln may be heated by an oxyfuel energy source with added methane, resulting in a gas makeup consisting of predominantly $CO_2$ and $H_2O$. This makeup avoids side reactions such as that of air nitrogen with oxygen, producing nitrogen oxides. Carbon dioxide and water can be utilized in processes described elsewhere in this disclosure. The precalciner can be run on air flowing through the thermal energy storage as it may be less expensive and may not have the problem of nitrogen gas reactions. The type of gas and combination of storage versus fuel energy source can be independently adjusted and potentially optimized in some embodiments.

The use of carbon dioxide has various benefits and advantages. For example, carbon dioxide does not require an air separator and has thermal properties that are more conducive to heat transfer. Carbon dioxide also has a higher emissivity at high temperatures. Further, carbon dioxide is inert and does not combust, which as stated at the benefit involved. Because the carbon dioxide does not react with the resistive heaters, there is less oxidation or wear and tear on the resistive heaters of the thermal energy storages. The byproduct gas is recirculated as input fluid for the TES system, and carbon dioxide is not released into the atmosphere, which has an environmental benefit of reducing greenhouse gases.

Prior approaches do not include an integrated process that uses hot gases generated from electric resistive heaters to supply all of the heat for a calcination process. Further, these approaches do not include an integrated process that uses a TES system that charges from electricity and discharges heated fluid directly into a flash-calcination process as the main mode of heat supply. Additionally, the material activation system may recirculate waste gases from the material heating system back to the TES system. This recirculated fluid may also have a desired composition to meet reaction and quality needs.

B. Electrolysis

The gas that is output from the TSU may be provided as the input for various industrial applications. One type of industrial application that uses and benefits from a continuous stream of heat at a constant temperature is electrolysis. The thermal energy storage system receiving electric power that can flow into a heat storage system (e.g., taking air in at 200° C. and delivering air in a range between 600° C. and 900° C. (such as 860° C.) when discharged for electrolysis). As explained below, art electrolysis systems can be improved by combination with the above described thermal energy storage system.

1. Problems to be Solved

Solid oxide electrolyzers according to conventional designs receive an input of heated gas and water in the form of superheated steam. The gas is heated prior to input to the solid oxide electrolyzer by an electric resistive heater, a fuel heater, or the like. The use of an electric resistive heater or fuel heater for this purpose may have various problems and disadvantages. For example, fuel heaters may consume fossil fuels such as natural gas, which is expensive and causes pollution. Electric heaters powered directly by VRE sources cause problems with changing temperatures and limited operating periods.

There are several types of fuel cells that take hydrogen or a mix of gases and make electric power, such as molten carbonate electrolyzer fuel cells, and solid oxide fuel cells. Such fuel cells use essentially the same as electrolyzers in reverse. However, solid oxide fuel cells have problems and disadvantages because the oxidation causes localized heating and issues with cell life. Solid oxide fuel cells require their inlet reactants and the fuel cell assembly to be maintained at particular temperatures. The operation of fuel cells delivers energy partly in the form of electrical energy and partly as heat. Further, solid oxide fuel cells require a recuperator (e.g., high temperature heat generator) to make use of a portion of the heat generated by the fuel cell. However, a substantial portion of the heat so generated is not used, which results in inefficiencies.

2. Reversible Solid Oxide Unit

Solid oxide electrolyzers may include an electrolyzer producing hydrogen by using electrical energy to break apart the molecular bonds and drive apart the elemental ions that into separate outlet streams. Solid oxide electrolyzers have a porous cathode with a porous electrolyte that is catalytic when operated at temperatures at or above 830° C., and thermal energy is contributing to cracking those bonds. A solid oxide fuel cell is typically 40-50% efficient at taking fuel energy and making electric energy, with the rest of the energy being released as heat at around 850° C., e.g., 850° C. to 860° C., e.g., 860° C., in some cases, which are slightly higher temperatures than the optimal operational point for the solid oxide electrolyzer. A system may incorporate one or more solid oxide electrolyzers and one or more solid oxide fuel cells; a single solid oxide unit may operate reversibly as an electrolyzer or fuel cell.

Figure 84:
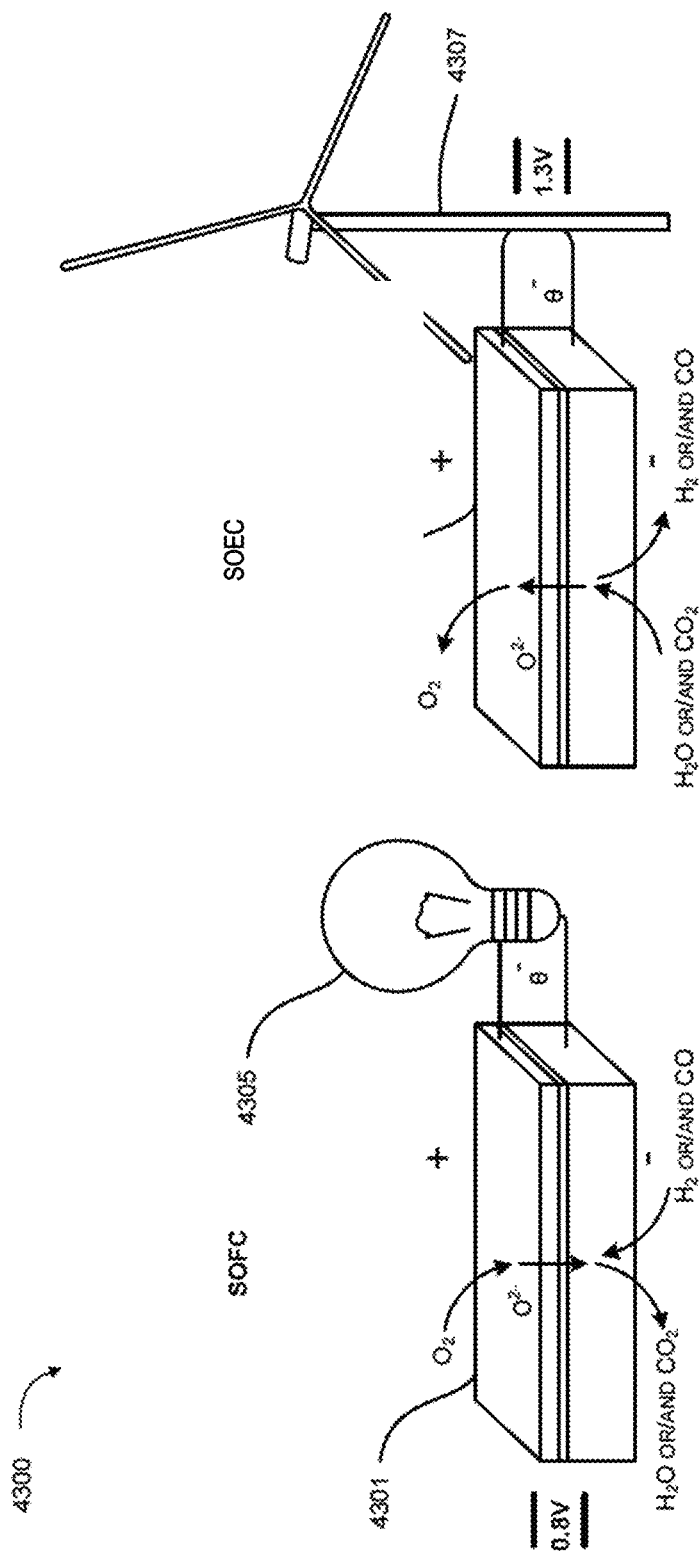
FIG. 84 provides an illustration of a solid oxide unit as a fuel cell and as an electrolyzer according to the example implementations.

FIG. 84 provides an illustration 4300 of the solid oxide unit as a fuel cell 4301 and as an electrolyzer 4303. The solid oxide fuel cell at 4301 receives as its input a gas such as hydrogen or carbon monoxide. The hydrogen or carbon monoxide is combined with oxygen enriched gas across a potential to output electrical energy 4305 and either water or carbon dioxide, depending on whether hydrogen or carbon monoxide, respectively, is the input. Similarly, as shown in the solid oxide electrolysis cell 4303, water or carbon dioxide is provided as an input along with heat in the form of hot fluid from the thermal energy storage system, which obtains its energy from an electrical source such as the renewable wind source 4307 as illustrated. The output is hydrogen gas or carbon monoxide, depending on whether water or carbon dioxide was the input, as well as oxygen enriched gas as a byproduct.

Figure 85:
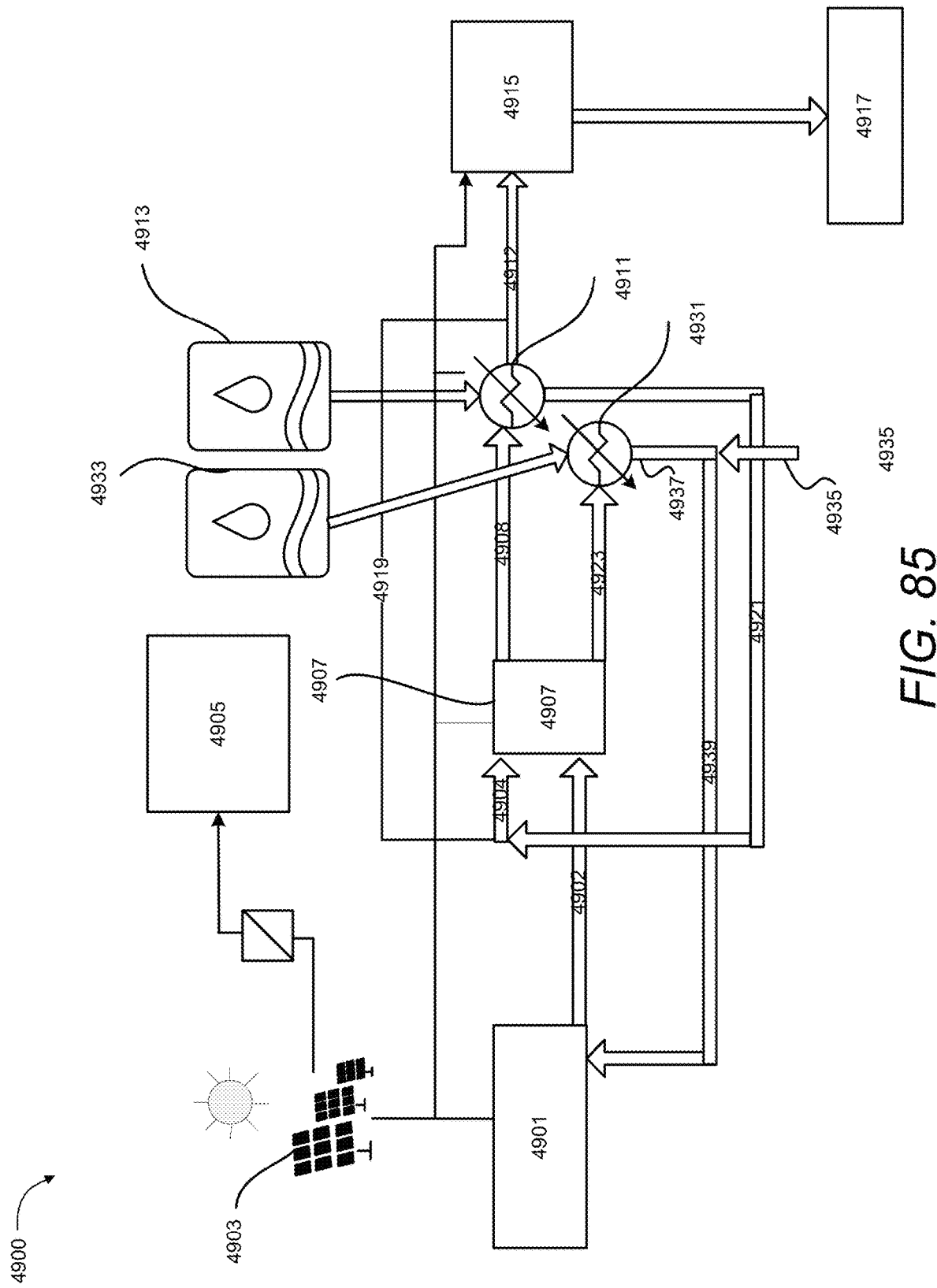
FIG. 85 illustrates the electrolysis mode according to the example implementations.

FIG. 85 illustrates the electrolysis mode 4900 of the example implementation. The thermal energy system 4901 receives electrical energy from a source, such as a VRE source 4903, and/or from another source, either locally or via an electricity grid 4905. The electricity source 4903 may also be coupled to other elements of the solid oxide electrolysis system, for example, to provide electrical potential for the electrolysis reaction. Fluid 4902 (e.g., hot air) is output from the thermal energy storage system 4901 and provided to the solid oxide electrolysis cell 4907. Fluid 4902 may be at a temperature between 800° C. and 900° C. (such as 850° C.). Solid oxide electrolysis cell 4907 may also receive steam 4904, which may be at a temperature near fluid 4902 (for example, 830° C.). The solid oxide electrolysis cell 4907 may receive electricity from the electricity source 4903 and generate as its output hydrogen as the product gas 4908 along with oxygen enriched hot fluid 4923 as a byproduct.

The product gas 4908 (e.g., hydrogen) is cooled via a heat exchanger. The heat exchanger may reject heat to the environment or, more efficiently, may deliver heat to a thermal load, such as a once-through steam generator (OTSG) 4911, as its input. The product gas flows through the heat exchangers of the OTSG 4911, which is supplied by cold water from a source 4913. As the product gas 4908 is cooled by the heat exchanger/OTSG 4911, much of its carried water is condensed, becoming condensed product gas 4912. The condensed product gas 4912 is primarily provided to a hydrogen processing unit 4915, which in turn provides the hydrogen gas in a storage ready form to storage 4917. A portion of the condensed product gas is recirculated at 4919 to be mixed with the input steam 4904. In one implementation, steam 4904, or a portion of the steam, may be the output of the OTSG 4911, as shown at 4921.

In a manner similar to that explained above for OTSG 4911, another OTSG 4931 may be provided, having water supplied from a source 4933. As previously discussed, the OTSG 4931 may be any heat exchanger heating a fluid, including a recirculating boiler with or without superheat, or a unit that heats circulating air, $CO_2$, oil, water, or salt. The OTSG 4931 receives the oxygen enriched hot fluid, and outputs the cooled fluid at 4937. In some implementations, the OTSG 4931 may receive another stream of hot fluid from the thermal energy system 4901 so as to adjust the temperature or heat flow of the combined stream to a more useful condition. The cooled, oxygen-enriched fluid 4937 may be mixed with ambient or preheated air at 4935, to adjust the composition of oxygen to a desired level. The adjusted fluid 4939 may be provided as an input gas to the thermal energy storage system 4901.

Figure 86:
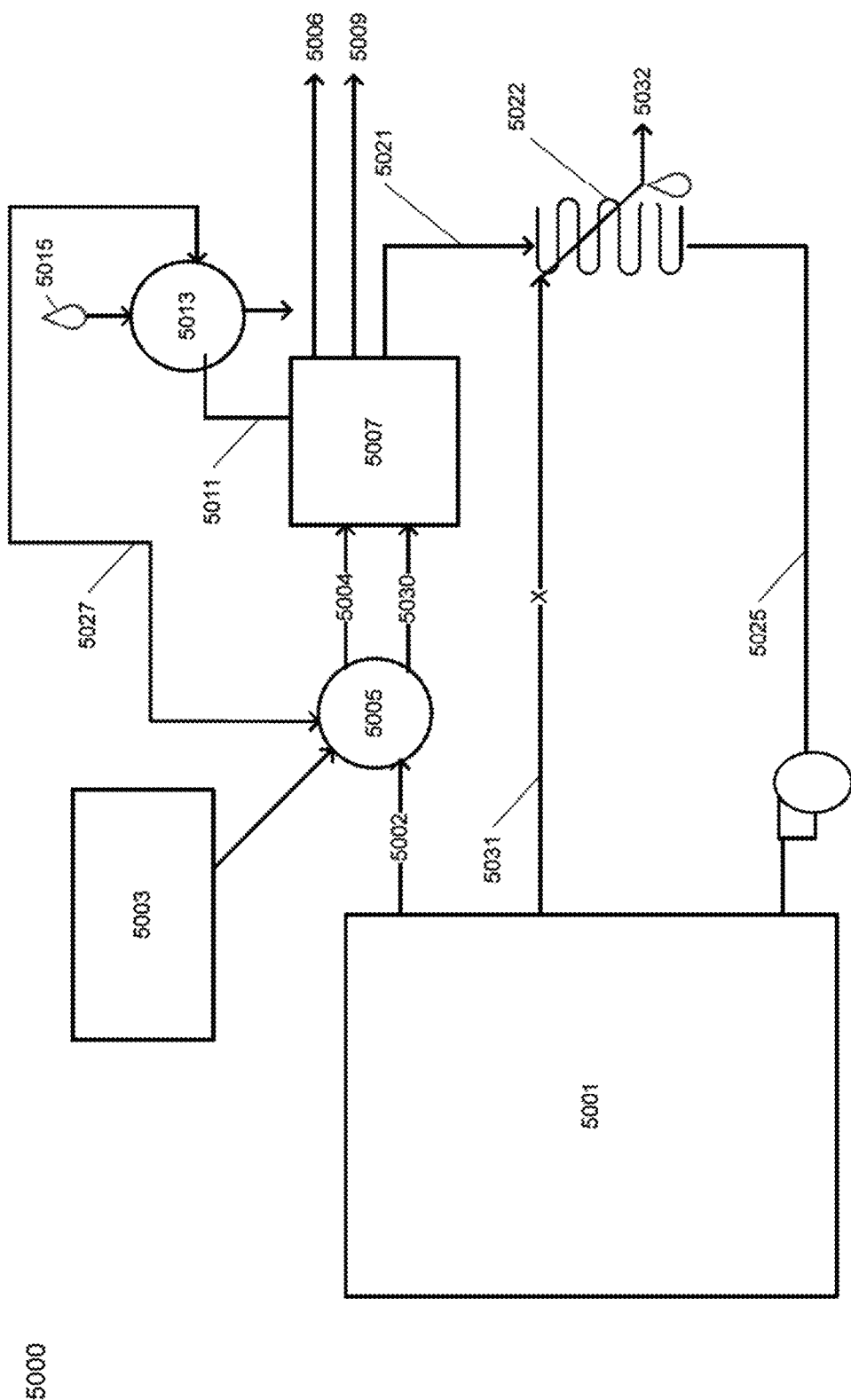
FIG. 86 illustrates the fuel cell mode according to the example implementations.

FIG. 86 illustrates the fuel cell mode 5000 according to an example implementation. The thermal energy storage system 5001 provides air or oxygen as shown at 5002, such as explained above with respect to the electrolysis mode. Separately, a supply of hydrogen 5003 is provided. The hydrogen is heated up via the single pass heat exchanger 5005 by the hot fluid from the thermal energy storage system. Optionally, a small amount of steam may be mixed in with the hydrogen gas to avoid degradation of the solid oxide unit. The fluid from the thermal energy storage system may be provided at a temperature that is lower than that of the electrolysis mode, such as 650° C. or in a range between 600° C. and 700° C.

In the fuel-cell mode of operation, the air 5030 may provide a cooling effect in solid oxide fuel cell 5007. The air 5002 from the thermal energy storage system 5001 and the heated hydrogen from the hydrogen storage 5003 are input as shown by 5004 and 5030 respectively to the solid oxide fuel cell 5007. As its output, the solid oxide fuel cell 5007 generates direct current electricity at 5006. In one implementation, the direct current electricity is provided to an inverter to convert to an alternating current power output, which can be provided to any use 5009 (which may, e.g., be a power grid). Additional outputs of the solid oxide fuel cell 5007 include water and hydrogen as a product fluid at 5011, and heated, oxygen-depleted air at 5021. The product fluid at 5011 is provided to heat exchanger 5013, which cools the product fluid by heating another fluid which may be water, air, or another fluid received as shown at fluid source 5015.

The output includes export steam, which may be provided as an input to an industrial application that requires steam, such as a steam turbine as explained above. Additionally, residual hydrogen may be recirculated, by way of a heat exchanger 5005, to the solid oxide fuel cell 5007, as shown at 5027. The oxygen-depleted fluid 5021, optionally supplemented with other hot fluid from the storage 5031, is provided as the heating gas for the heat exchanger 5013, and subsequently provided as the input fluid for the thermal energy storage system 5001, as shown at 5025. It is noted that the solid oxide fuel cell 5007 generates electricity and heat. Thus, the input fluid from the thermal energy storage system 5001, which is at about 650° C., e.g., 650° C. in this example, is provided as cooling air for the solid oxide fuel cell 5007.

Figure 87:
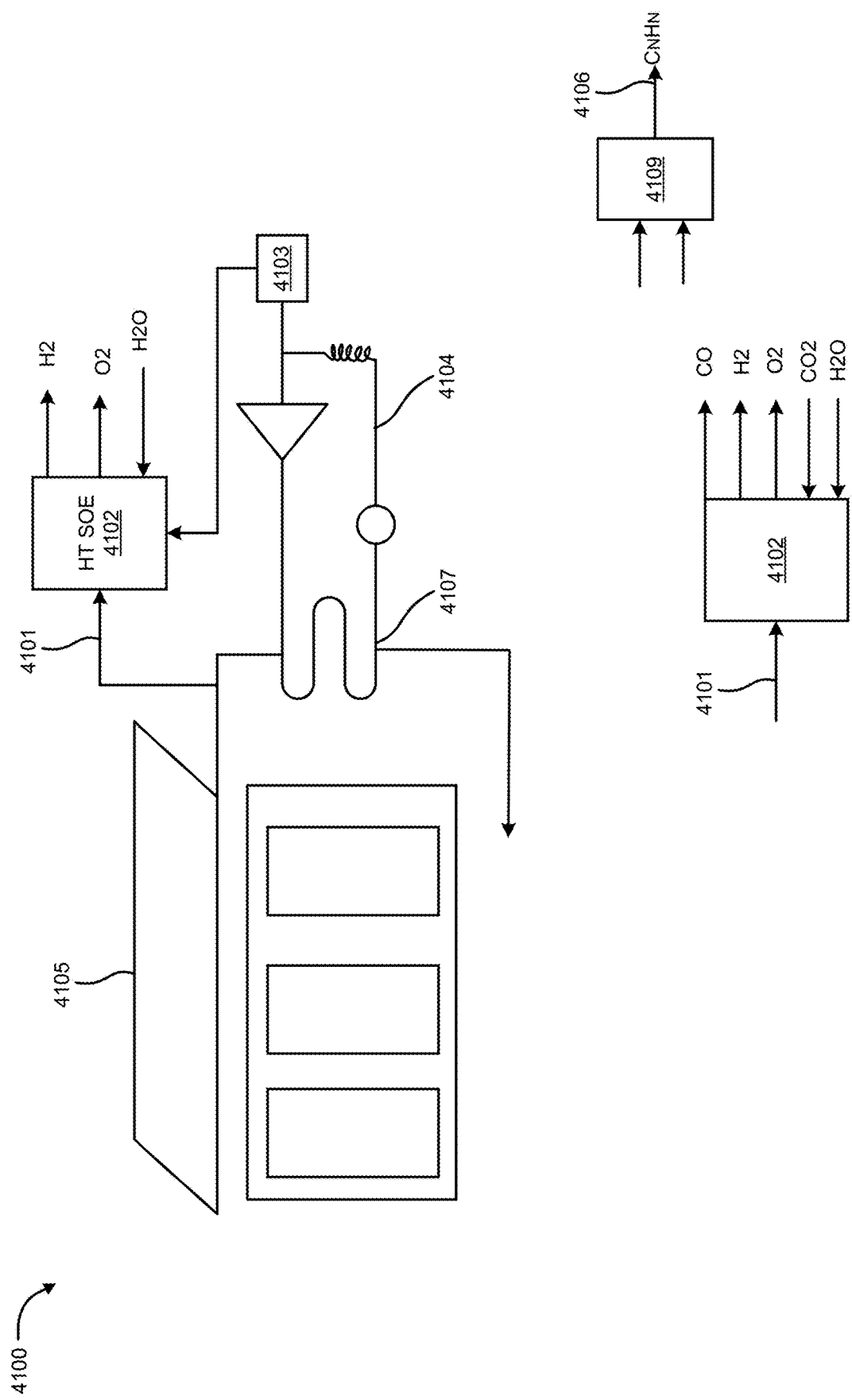
FIG. 87 illustrates an example system used to power the production of hydrogen and/or hydrocarbon fuels by delivering both heat and power to drive a high-temperature solid-oxide electrolyzer, according to the example implementations.

FIG. 87 illustrates an example system 4100 used to power the production of hydrogen and/or hydrocarbon fuels by delivering both heat and power to drive a high-temperature solid-oxide electrolyzer. Solid-oxide electrolyzers can reduce the electrical energy input needed per unit of hydrogen by harnessing thermal energy to drive the breaking of chemical bonds. Relatively higher total efficiency may be achieved by directing a portion 4101 of the high-temperature stored heat from thermal energy storage system 4105 as high-temperature heat to an electrolyzer 4102 which is also fully or partially powered by electricity 4103 generated by a thermal generation process 4104. Thermal generation process 4104 may include, for example, a Rankine cycle or supercritical $CO_2$ cycle.

In some implementations, the electrolyzer 4102 may co-electrolyze water and $CO_2$ (separate electrolyzers may also be used to electrolyze water and $CO_2$) with all or a portion of the resulting syngas directed to a methanation or Fischer-Tropsch type conversion unit 4109. Unit 4109 may make a synthetic gaseous or liquid hydrocarbon fuel, shown at 4106. Additionally, a once-through steam generator (OTSG) 4107 may be provided as a condenser that cools the output fluid of the solid oxide electrolysis unit 4102 and provides the steam as an input to the solid oxide electrolysis unit 4102. The byproduct hot fluid is recirculated back to the thermal energy storage system 4105 as an input fluid.

As explained above, the electrolyzer is reversible as a fuel cell. Thus, when the renewable input power such as the photovoltaic array is unavailable or when electricity is needed by the grid, hydrogen can be fed to the fuel cell and water, electricity, and heat can be output from the system. The heat is at a high enough temperature that the heat can be used to produce steam or utilized in another industrial process. Accordingly, less heat is extracted out of the heat storage unit as it is replaced with what would otherwise be waste heat coming from the fuel cell.

Alternatively, the gas flow can be reversed, and heat can be put convectively back into heat storage. Thus, when the system is performing co-generation and running heat, the waste heat from the fuel cell can be used to either displace energy that would otherwise have been discharged from heat storage or be returned to heat storage.

The efficiency in the electrolyzer dramatically improves when using hot fluid from the thermal energy storage system. Further, if none of the outlet steam is being used, the captured heat can be repurposed. For example, hydrogen is produced in one implementation, with a fraction being sold and another fraction being used for power generation. The waste heat from power generation may be recaptured and used to reduce the electricity used for electrolysis during the next period, such as the next day. Further, in some example implementations, one or both of the convective waste heat from the fuel cell and input electric heat may be used to charge the thermal storage unit.

In one implementation, the system may incorporate 1) a solar array or other intermittent electricity source; 2) a combination electrolyzer/fuel cell-heat storage unit; and 3) a lithium-ion battery and an electric vehicle charging station and a hydrogen filling station. This system can be used to store energy as hydrogen that may participate in providing the off-hours electricity for EV charging but is also available for dispensing to vehicles as hydrogen charging.

Figure 88:
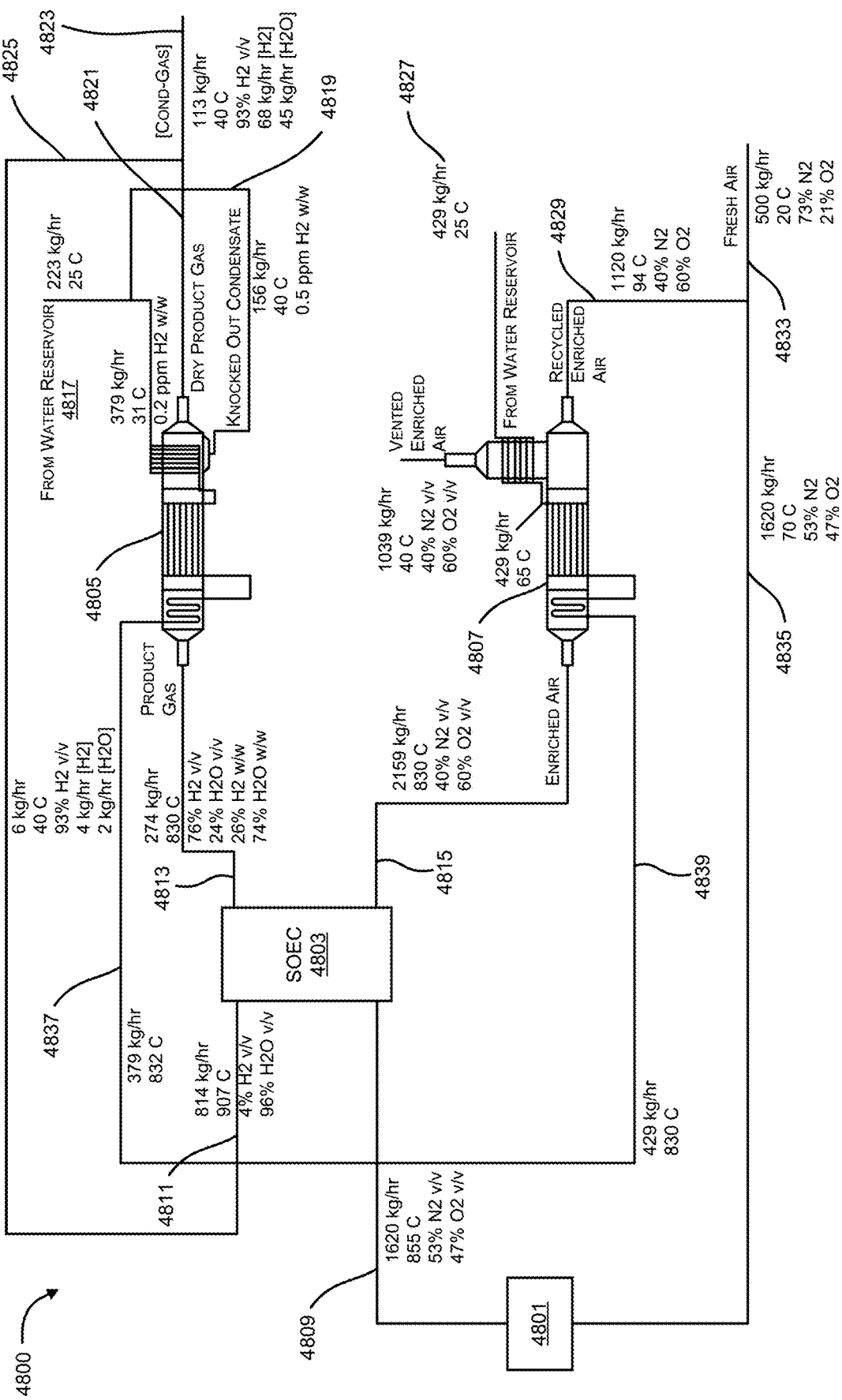
FIG. 88 illustrates a reversible solid oxide electrolysis system 4800 according to the example implementations.

FIG. 88 illustrates a reversible solid oxide electrolysis system 4800 according to an example implementation. The thermal energy storage system 4801 provides hot fluid (e.g., hot gas) 4809 at its output. As shown in this example, the composition of the fluid is 53% nitrogen gas and 47% oxygen gas, at a temperature of 855° C. and a flow rate of 1620 kg per hour. However, the composition of the oxygen or nitrogen can be adjusted based on the operating parameters of the solid oxide cell 4803. For instance, the gas may have an oxygen volume percentage between 25% and 60%. Additionally, the temperature or flow rate may be varied. For example, the temperature may be between 800° C. and 900° C. or the flow rate may be between 1500 kg/hr. and 2000 kg/hr.

The hot fluid 4809 is provided to a solid oxide unit 4803. In this case, the solid oxide unit is a two-way reversible unit. For example, solid oxide unit 4803 can operate in electrolysis mode, which produces an endothermic reaction, or in fuel cell mode, which produces an exothermic reaction. The solid oxide unit 4803 is currently described in electrolysis mode.

The solid oxide cell 4803 in electrolysis mode receives the hot fluid 4809 from the thermal energy storage system 4801. Because the solid oxide unit 4803 in electrolysis mode operates such that the internal resistance does not generate enough heat to overcome the endothermic reaction, the solid oxide unit 4803 is operating in thermal neutral voltage mode. Although it is not shown, each of the cells receives an electrical input at 1.28 V. Other voltages may also be possible such as a voltage in a range between 1 volt and 3 volts. In various embodiments, hot fluid 4809 is passed through the solid oxide cells as a sweep fluid (e.g., sweep gas).

In addition to the hot fluid 4809 (e.g., sweep fluid) provided by the thermal energy storage unit, a reaction fluid (e.g., steam mixed with hydrogen) 4811 is also provided as an input to solid oxide unit 4803. In this example, the reaction fluid 4811 is provided having 96% water and 4% hydrogen gas, at a superheated temperature of 807° C. and at a flow rate of 814 kg per hour. The percentage of water, temperature, or flow rate of reaction fluid 4811 may be varied. In various implementations, the temperature of reaction fluid 4811 is at a temperature below hot fluid 4809 but at a temperature above 800° C. In some implementations, the flow rate of reaction fluid 4811 is balanced with the flow rate of hot fluid 4809 to provide desired reaction results in solid oxide unit 4803.

The reaction fluid 4811 is provided to the solid oxide unit 4803. As a result of the reaction in the solid oxide cell, the water molecule is split and the resulting ions form oxygen gas and hydrogen gas. At the same time, the sweep gas (e.g., hot fluid 4809) pulls the oxygen off of the air electrode as the water comes in on the cathode and strips the oxides off of the water.

As outputs, the solid oxide cell in electrolysis mode produces product fluid 4813 as well as oxygen enriched fluid 4815 (e.g., oxygen enriched air). In certain implementations, the temperature of the product gas is near a temperature of the oxygen enriched fluid. Both fluids may be at a temperature between a temperature of the reaction fluid and a temperature of the hot fluid 4809. In the illustrated embodiment, the product fluid 4813 is 76% hydrogen and 24% water by volume, which corresponds to 26% hydrogen and 74% water by weight. The temperature of the product fluid 4813 is 830° C. and it is provided at a flow rate of 274 kg per hour. The enriched fluid 4815 is a composition of 60% oxygen and 40% nitrogen by volume, at a temperature of 830° C., and at a flow rate of 2159 kg per hour. The composition, temperature, and flow rate of the product fluid 4813 and enriched fluid 4815 may vary based on the operating conditions of the system.

For product fluid 4813, a thermal load such as an OTSG 4805 including heat condensers is provided. OTSG 4805 uses water to cool and condense the hydrogen gas. More specifically, the product fluid 4813 enters the OTSG 4805, where it is exposed to water that is run through pipes. The source of the water for the OTSG 4805 is a water reservoir 4817, where the water is provided at a relatively cool temperature such as 25° C. As the water passes through the various condensers, the water becomes more and more heated from the exit to the entrance of the condenser. More specifically, the water reservoir 4817 provides the clean water and condensate to a first stage of the heat exchanger, where the product fluid is at its coolest point of the three heat exchangers.

The water then flows to a second heat exchanger that is upstream of the first heat exchanger, and the product fluid is warmer than at the first heat exchanger. At the third heat exchanger, the product fluid 4813 is incoming, and is at its hottest point. While the heat exchangers of the condenser are shown as having three stages, the heat exchanger may be varied to have more or fewer stages as a matter of design choice.

As a result of the heat exchange, the condenser operates as the OTSG 4805, because as the water absorbs the heat from the hot hydrogen product fluid 4813, the water is converted to steam, and the steam is provided to the input of the solid oxide unit at a temperature of around 830° C., e.g., 830° C. The steam is then provided as 4837 and input to the solid oxide unit at 4811. Because the solid oxide unit 4803 is sensitive to contamination, the source 4817 of the water for the condenser is purified water. Optionally, the purified water may be combined with the condensate output 1819 of the condenser.

As the hydrogen passes through the condenser, water is removed from the hydrogen gas as condensate due to the hot hydrogen gas passing over the cool pipes of the condenser. The output 4821 of the condenser is dry product fluid, namely dry hydrogen gas. The hydrogen gas is provided to an industrial application at 4823, as explained above.

At 4825, some of the hydrogen gas (e.g., knock-off hydrogen gas having some water mixed in) is fed back into the input of the solid oxide unit 4803 in combination with the steam that is formed at the output of the condenser as explained above. The hydrogen gas is combined with steam at the input of the solid oxide because 100% steam cannot be input to the solid oxide unit due to degradation issues. Optionally, the gas that is output from the thermal energy storage system may be provided at a temperature based on a parameter of the solid oxide electrolyzer, such as the operating temperature.

Because the thermal energy storage system provides the constant flow of heated fluid 4809 at the temperature required for the solid oxide cell in electrolysis mode, there is no need for electric resistive heaters as in prior systems. Thus, the solid oxide cell 4803 may be provided and used without a heater. However, electric resistive heaters (or other heaters) may be optionally added, to provide temperature adjustments or calibration at the entrance of the solid oxide unit.

As the oxygen enriched fluid 4815 is input to the OTSG 4807, the water from the water reservoir 4827 interacts with the enriched fluid, in a manner similar to that described above for the product fluid. Thus, heat is transferred to the water that passes through the heat exchangers. Such water is output as steam at 4839 and provided to the input of the solid oxide unit as part of reaction fluid 4811 along with the steam from the product fluid condenser and the recirculated hydrogen gas. The enriched fluid may also be vented at 4831.

The enriched fluid is output at 4829. The enriched fluid is output to the atmosphere as air at standard atmospheric composition at 4833. Additionally, oxygen enriched fluid may be recycled at 4835 after blending with atmospheric air, such that the composition of the fluid is 53% nitrogen and 47% oxygen, for example. This fluid is provided as an input to the thermal energy storage system 4801, where it is heated in the thermal storage arrays and provided as an output to the solid oxide unit as hot fluid at 4809, as explained above. Further, the blending of the oxygen enriched fluid with atmospheric air also has a benefit for the thermal energy storage system 4801, in that problems and disadvantages associated with having oxygen enriched fluid in the thermal energy storage system, such as potential oxidation of components, are avoided.

Additionally, the temperature of the heat that is generated by the thermal energy storage system may be provided to the solid oxide unit at a temperature that is thermally neutral. In other words, because the hot fluid 4809 is provided at an elevated temperature, such as 855° C., the system is in an isothermic condition, and the system does not have any net heat demands. In other words, the chemical reactions in the solid oxide unit 4803 will cool the system, whereas the only resistance within the thermal energy storage system is from the heating elements that generate heat from electrical energy. The result is that there is no net temperature change and a substantially lower energy cost. Accordingly, there is cost savings in that it is not necessary to add additional resistive heaters or fuel meters to the solid oxide unit to heat the incoming air. However, it should be noted that the electrolyzer need not be operated at the isothermal temperature and may instead use heat that is generated at a higher or lower temperature.

As noted above, the solid oxide unit is reversible, such that it can be used as an electrolyzer, as explained above, or as a fuel cell. The fuel cell operation may include, using the structures as explained above, with the thermal energy storage unit providing oxygenated enriched fluid that is combined with compressed hydrogen to produce direct current electricity and water, as described herein.

Additionally, in some implementations, when the solid oxide unit is not operating the hot fluid 4809 generated by the thermal energy storage system may continue to be provided through the solid oxide unit. The benefit of flowing such hot fluid through the solid oxide unit when the system is not in use is that the ramping down during the cooling process and the ramping up during the heating process before and after active operation (e.g., thermal cycling), respectively, is avoided. Additionally, the wear and tear on the unit during those processes is also avoided and, in addition, the time and cost of cooling and heating of the various components is reduced (such as the ceramic inside the solid oxide unit). Further, it is possible to switch loads, between the different modes of operation (such as electrolyzer and fuel cell), without shutting down and warming up the unit. In some implementations, the solid oxide unit may continue to be heated by hot fluid 4809 at temperatures around those utilized during fuel cell operations.

The composition of the fluid flowing within the thermal energy storage unit may be adjusted by the extraction of oxygen enriched fluid 4829 and/or the introduction of ambient fresh air. The oxygen enriched fluid extracted may be used for another purpose, including the purification and supply of oxygen for a commercial purpose.

In addition, hydrogen and oxygen production may be coupled with other processes such as hydrogenation of $CO_2$ or CO to make liquid fuels or remediation of contaminated groundwater contamination using oxygen. Excess heat, such as from a Fischer-Tropsch process, could be used to convectively charge or pre-heat fluid for the thermal storage unit. Other electrolysis processes benefitting from renewable electricity or thermal energy can also be coupled to the storage system. As an example, a direct co-electrolysis of $CO_2$ in combination with the water-gas shift reaction and steam to produce syngas, which can further be processed in a Fischer-Tropsch reactor for conversion to hydrocarbons, is optimal at a temperature serviceable from a renewable energy storage unit, as described above, and powered using the DC architecture described previously.

Nickel-based electrodes may also be utilized to obtain methanation of carbon monoxide (e.g., Sabatier reaction), with the ratios of various component products being controlled by temperature, pressure, and concentration of components in equilibrium. It may be particularly valuable to locate a facility that combines energy storage, Fischer-Tropsch, Sabatier, and co-electrolysis processes at a biorefinery (such as an ethanol refinery (that has a large supply of biogenic $CO_2$ available from the fermenter) or another processing facility such as a renewable diesel refinery (which has $CO_2$ streams arising from process units and has fuel production equipment that can purify the products arising from the Fischer-Tropsch reaction).

The system may also be used in industrial loads such as renewable diesel refineries, petroleum refineries, or oil fields where there is very high value for hydrogen that is participating in the chemical process. There is also very high value for 24-hour, zero carbon electric power. For instance, instead of producing hydrogen and power at low efficiency, this set of systems allows conversion of essentially every kilowatt hour that comes into the system either leaving as a kilowatt hour of enthalpy and hydrogen or a kilowatt hour of heat or a kilowatt hour of electricity with very high efficiency (for example, 96 percent total system efficiency).

In various implementations, fluids that are flowing in and out of the heat storage unit can be directly coupled with the fluids that are flowing across one side of the electrolyzer (e.g., the oxygen side). As such integration of a directly heated contact and a directly cooled contact may assist with integration of the fuel cell.

In addition to being connected to the solid oxide electrolysis cell, the thermal energy storage system having electric power that can flow into a heat storage system taking fluid in at 200° C. and delivering fluid at a temperature of 800° C.--1600° C. when discharged as explained above, such as the system disclosed above, can perform district heating, driving of turbines, cogeneration, or other industrial uses. For example, in the case of the solid oxide fuel cell mode, the heat generated in the process of making electricity from a hydrogen input may be used as an industrial output for a steam generator in one implementation. Further, the excess electricity generated by the steam generator may be combined with the electricity provided from the source, such as the renewable source, as the electrical input for the thermal heaters of the thermal energy storage system according to the example implementations.

3. Advantages Over Prior Systems

The solid oxide unit of the example implementations may have various benefits and advantages over prior designs. For example, the solid oxide unit described herein receives stored heat from the thermal energy storage system as its input, instead of requiring an external heater, such as an electrical resistive heater or a fuel fired heater. Thus, the cost of operation may be reduced and the amount of pollution may also be reduced.

Further, while art approaches may burn the oxygen byproduct at the output of the solid oxide unit to generate heat for the heater that the input of the solid oxide unit, the example implementations do not require heat to be generated at the input of the solid oxide unit. Thus, the byproduct air is provided to the heat exchanger, without burning off the oxygen.

The enhanced concentration of oxygen in the flow may contribute to reductions in the cost of secondary oxygen separation. Such solid oxide electrolyzer integration with thermal energy storage has benefits including significantly enhanced efficiency in the conversion of electrical energy to energy and hydrogen and enabling such high efficiency electrolyzers to be combined and used effectively with variable supplies of renewable electricity. Accordingly, charging may be intermittent while temperature is held constant without continuous use of electrical power.

Also, a portion of the energy in the electrolytic process in this manner is supplied by stored heat. It is beneficial to do this because the time at which electricity may be captured and stored may be separated from the time at which electricity is captured and used for electrolysis. When electric power is available, the electric power can be used to heat charge the storage system and also drive electrolysis to convert water to hydrogen. Existing electrolyzers cost around $500-600/kW, whereas heat storage systems may be significantly less expensive. Heat storage may be less expensive on a per kilowatt basis than electrolyzer stacks and it may therefore be less costly to pull power in at a very high rate during periods of lower-cost power availability and apportion the power between the heat storage and the electrolyzer. The electrolyzer can be made to run longer and the peak load or the peak power can be dropped quickly into heat storage. Thus, there is a matching of electrolyzer capacity factor and cost against the availability of variable renewable electricity

C. Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g. wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e. with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 6, in some example implementations, the thermal energy storage structure 503 can be integrated directly with a steam power plant to provide an integrated cogeneration system 500 for a continuous supply of hot air, steam and/or electrical power for various industrial applications. Thermal storage structure 503 may be operatively coupled to electrical energy sources 501 to receive electrical energy and convert and store the electrical energy in the form of thermal energy. In some implementations, at least one of the electrical energy sources 501 may comprise an input energy source having intermittent availability. However, electrical energy sources 501 may also include input energy sources having on-demand availability, and combinations of intermittent and on-demand sources are also possible and contemplated. The system 503 can be operatively coupled to a heat recovery steam generator (HRSG) 509 which is configured to receive heated air from the system 503 for converting the water flowing through conduits 507 of the HRSG 509 into steam for the steam turbine 515. In an alternative implementation, HRSG 509 is a once-through steam generator in which the water used to generate steam is not recirculated. However, implementations in which the water used to generate steam is partially or fully circulated as shown in FIG. 6 are also possible and contemplated.

A control unit can control the flow of the heated air (and more generally, a fluid) into the HRSG 509, based on load demand, cost per KWH of available energy source, and thermal energy stored in the system. The steam turbine 515 can be operatively coupled to a steam generator 509, which can be configured to generate a continuous supply of electrical energy. Further, the steam turbine 515 can also release a continuous flow of relatively lower-pressure 521 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind resources are available.

The use of electrothermal energy storage may provide local benefits in such locations to grid operators, including switchable electricity loads to stabilize the grid; and intermittently available grid electricity (e.g. during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g. brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 503 may be directly integrated to industrial processing systems in order to directly deliver heat to a process without generation of steam or electricity. For example, thermal storage structure 503 may be integrated into industrial systems for manufacturing lime, concrete, petrochemical processing, or any other process that requires the delivery of high temperature air or heat to drive a chemical process. Through integration of thermal storage structure 503 charged by VRE, the fossil fuel requirements of such industrial process may be significantly reduced or possibly eliminated.

The control unit can determine how much steam is to flow through a condenser 519 versus steam output 521, varying both total electrical generation and steam production as needed. As a result, the integrated cogeneration system 500 can cogenerate steam and electrical power for one or more industrial applications.

If implemented with an OTSG as shown in FIG. 4 instead of the recirculating HRSG shown in FIG. 6, the overall integrated cogeneration system 500 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 503 can power the integrated heat recovery steam generator (HRSG) 509. A closed air recirculation loop can minimize heat losses and maintain overall steam generation efficiency above 98%.

The HRSG 509 can include a positive displacement (PD) pump 511 under variable frequency drive (VFD) control to deliver water to the HRSG 509. Automatic control of steam flow rate and steam quality (including feed-forward and feed-back quality control) can be provided by the TSOTG 500. In an exemplary example implementation, a built-in Local Operator Interface (LOI) panel operatively coupled to system 500 and the control unit can provide unit supervision and control. Further, thermal storage structure 503 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 500 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 507 in an alternative once-through configuration of the HRSG 509 can be exposed to high-temperature air generated by the thermal storage structure 503, in which preheating and evaporation of the feedwater can take place consecutively. Water can be forced through the conduits of HRSG 509 by a boiler feedwater pump, entering the HRSG 509 at the "cold" end. The water can change phase along the circuit and may exit as wet steam at the "hot" end. In one implementation, steam quality is calculated based on the temperature of air provided by the thermal storage structure 503, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower temperature flows across the conduits which carry the highest steam quality flow.

Returning to FIG. 6, various implementations are contemplated in which a fluid movement device moves fluid across a thermal storage medium, to heat the fluid, and subsequently to an HRSG such as HRSG 509 for use in the generation of steam. In one implementation, the fluid is air. Accordingly, air circulation through the HRSG 509 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 509 can be fluidically coupled to a steam turbine generator 515, which upon receiving the steam from the HRSG 509, causes the production of electrical energy using generator 517. Further, the steam gas turbine 515 in various embodiments releases low-pressure steam that is condensed to a liquid by a condenser 519, and then de-aerated using a deaerator 513, and again delivered to the HRSG 509.

An exemplary configuration specification of one implementation of a cogeneration system using an OTSG for steam generation is provided below.

| Parameter | Value |
| --- | --- |
| Nominal Steam Delivery | 5,000 barrels per day |
| Steam Quality (nominal) | 80%; (60%-96%) |
| Max Charging Rate | 70 MW |
| Energy Storage | 350 MWh |
| Energy Output from Storage | 15 hours at max rate |
| Storage Loss Rate | 1% per day |
| Outlet Pressure | 900 to 2200 psig (per spec) |
| Inlet Pressure | 50 psig (PD pump) or per spec |
| Running Power | Per outlet pressure, up to 450 kW |
| Dimensions | 35 × 60 ft (11 × 18 m) |
| Installation | Outdoor |

Figure 89:
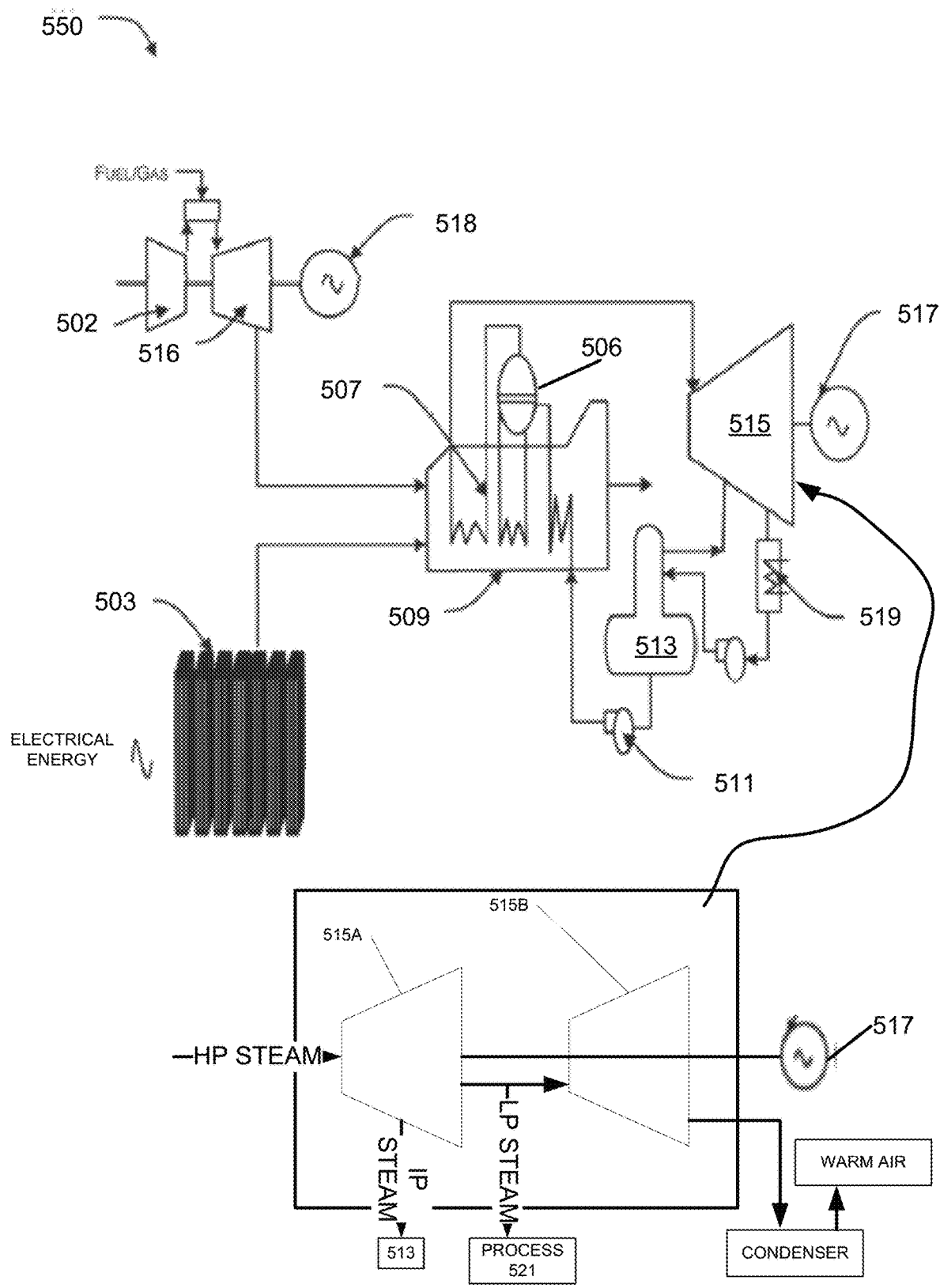
FIG. 89 illustrates a system 550 integrated with a combined cycle power plant to provide a thermal storage for operation of a steam power plant including optional cogeneration according to the example implementations.

Referring to FIG. 89, in some example implementations, an integrated cogeneration system 500 as shown in FIG. 6 is coupled to a fuel-powered generator to provide a thermal storage integrated combined cycle plant 550 for efficient and reliable operation of a steam power plant. A combined cycle power plant may include a gas powerplant including a compressor 502 that mixes air into a fuel stream. The fuel and air mixture are then burnt in an expansion turbine 516, to generate pressurized exhaust, which is provided to a generator 518 to produce electrical energy. Further, the combined cycle plant may transfer the exhaust gas to a heat recovery steam generator (HRSG) 509. The HRSG 509 may include a positive displacement (PD) pump 511 under variable frequency drive (VFD) control to deliver water to the HRSG 509. When operating as part of a fuel-powered cycle, HRSG 509 uses the thermal energy of the exhaust gas from turbine 516 to convert the water into steam. Output of the HRSG 509 can be operatively coupled to a steam turbine generator 515, which upon receiving the steam from the HRSG 509, produces electrical energy using generator 517.

Further, the steam gas turbine 515 releases low-pressure steam that is condensed to a liquid by a condenser 519, and then de-aerated using a deaerator 513, and again delivered to the HRSG 509. For example, as shown in the expanded view, the steam turbine generator 515 receives high pressure steam from the HRSG 509. At a first turbine 515A that is powered by the high pressure steam, intermediate pressure steam is output to the deaerator 513, which may remove the oxygen from the steam, and provide as its output liquid fluid to the input of the HRSG 509 via PD pump 511. An output of the first turbine 515A may be low pressure steam, which is provided to an industrial process. A second turbine 515B that is powered by the remaining pressurized steam also generates electricity, and provides low pressure steam as its output to a condenser. An output of the condenser may be warm air, which may be used for an industrial process, such as grain drying or the like.

The thermal storage integrated combined cycle plant 550 can include the thermal energy storage structure 503 being fluidically coupled to the HRSG 509 of the combined cycle power plant. In one implementation, the heated air (at a predefined temperature) for the HRSG is provided by the thermal storage structure 503 alone or in combination with the exhaust emitted by the gas turbine 516. A control unit can control the flow of any combination of the heated air (from thermal storage structure 503) and exhaust gas by the gas turbine 516 into the HRSG 509, based on, for example, factors including load demand, availability and cost per KWH of available energy sources, cost per KWH for the operation of the combined cycle power plant, and thermal energy stored in the thermal storage structure 503.

In other example implementations, thermal storage structure 503 and a coal power plant may be integrated with a steam power plant through the HRSG 509 to provide another example implementation of a thermal storage integrated combined cycle plant for efficient and reliable operation of a steam power plant. The heated air being provided by thermal storage structure 503, alone or in combination with the exhaust emitted by the coal power plant can be supplied to the HRSG 509 for converting the water into steam for the steam turbine. A control unit may control the flow of any combination of the heated air (from the thermal storage structure) and exhaust gas by the coal power plant into the HRSG, based on, for example, factors including load demand, availability and cost per KWH of an available energy source, cost per KWH for the operation of the coal power plant, and thermal energy stored in the thermal storage structure.

Figure 90:
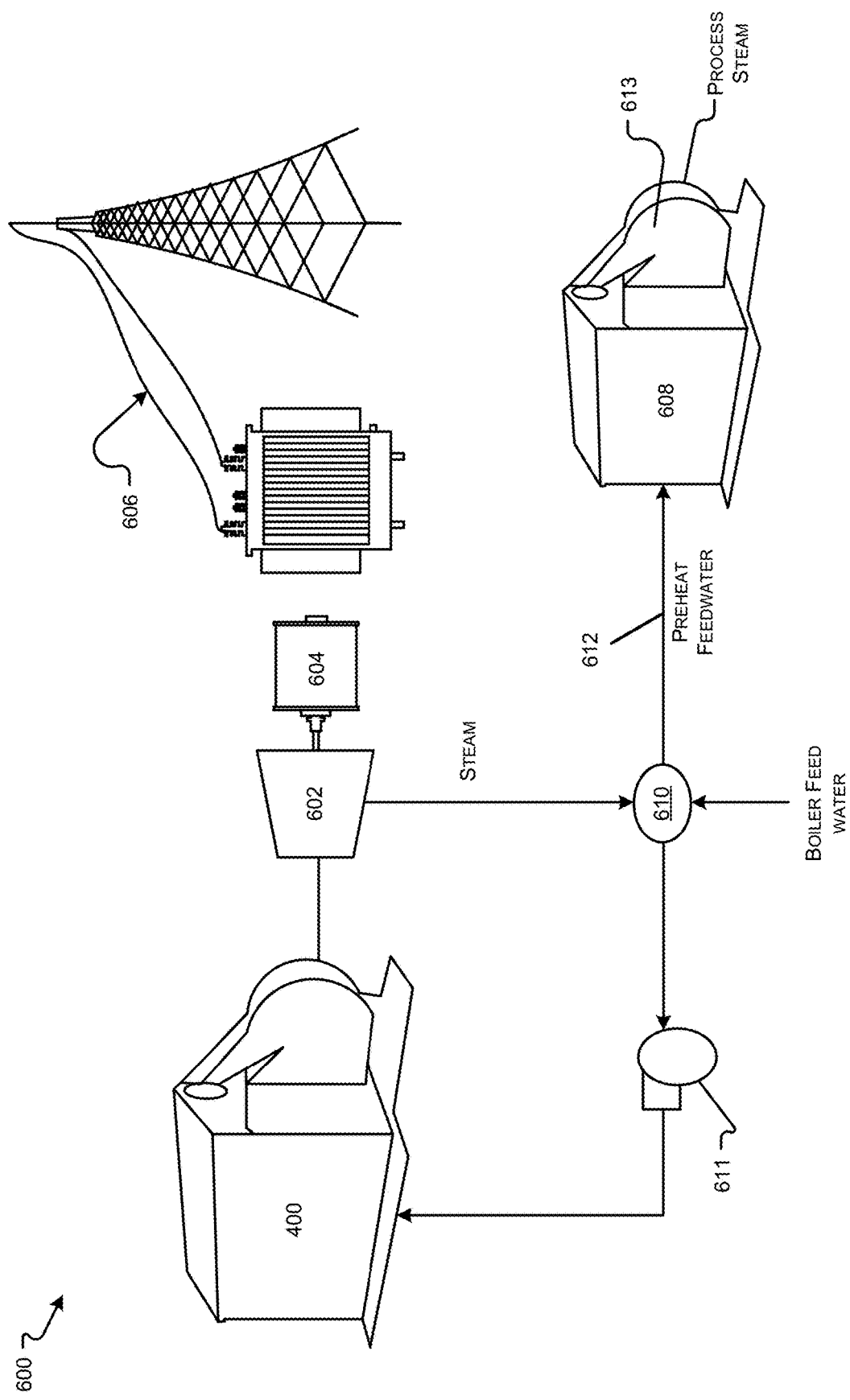
FIG. 90 illustrates integrated cogeneration system capable of delivering high-pressure steam as well as electric power according to the example implementations.

Referring to FIG. 90, an integrated cogeneration system capable of delivering high-pressure steam as well as electric power may be configured as shown in one implementation. A thermal storage structure 400 as described in FIG. 4 may be configured with an integrated HRSG that delivers high-pressure, optionally superheated steam that flows through a steam turbine 602 that drives an electric generator 604, which may be electrically coupled to local electrical loads or an electrical grid 606 to maintain and/or provide a continuous supply of electrical power at a load. All or a portion of the exhaust steam from the steam turbine may flow through a heat exchanger 610 which cools the steam into condensate which is returned for reheating by pump 611. The heat exchanger 610 transfers the heat into a flow of water 612 which is directed through another HRSG 613 in thermal storage structure 608, which provides steam for an industrial process. The heat transferred by heat exchanger 610 increases the steam production by HRSG 613 by preheating the inlet water. This accomplishes high-efficiency cogeneration of electric power and process steam, even when the required steam is at high temperatures and pressures, by capturing low-temperature thermal energy from the waste steam of turbine 602 into the feedwater of HRSG 613.

Referring to FIG. 87 as discussed above, in some implementations a thermal energy storage system may be used to power the production of hydrogen and/or hydrocarbon fuels by delivering both heat and power to drive a high-temperature solid-oxide electrolyzer. Solid-oxide electrolyzers can reduce the electrical energy input needed per unit of hydrogen by harnessing thermal energy to drive the breaking of chemical bonds. Relatively higher total efficiency may be achieved by directing a portion 4101 of the high-temperature stored heat from VRE as high-temperature heat to an electrolyzer 4102 which is also fully or partially powered by electricity 4103 generated by a thermal generation process 4104, such as a Rankine cycle or supercritical $CO_2$ cycle. In some implementations, electrolyzer 4102 may co-electrolyze water and $CO_2$, or separate electrolyzers may electrolyze water and $CO_2$, with all or a portion of the resulting syngas directed to a methanation or Fischer-Tropsch type conversion unit 4105 so as to make a synthetic gaseous or liquid hydrocarbon fuel.

Figure 91:
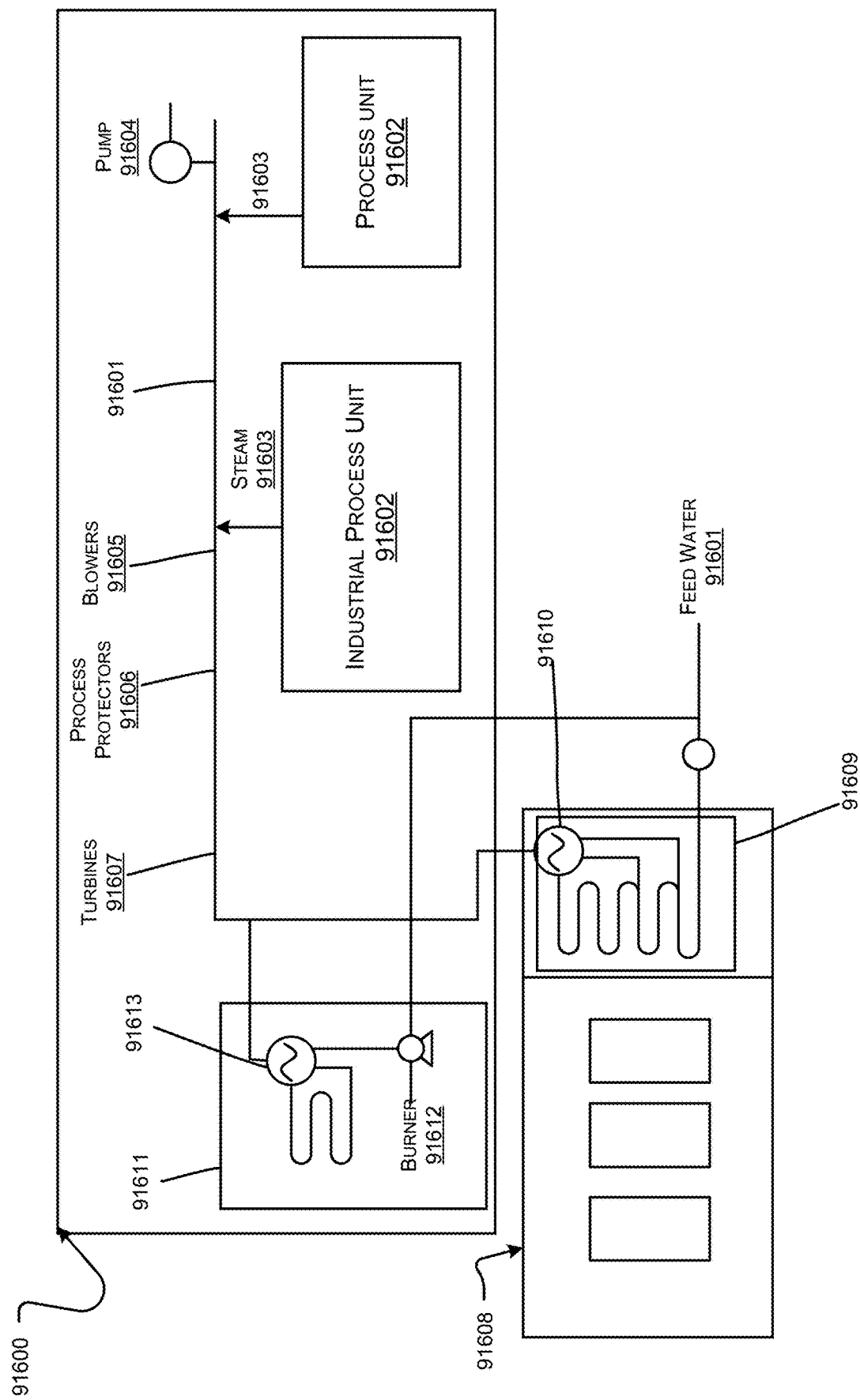
FIG. 91 illustrates an industrial process plant integrated with a thermal energy storage system according to the example implementations.

In one implementation, stored VRE and an HRSG are coupled to an industrial process facility in such a manner as to eliminate gas combustion in auxiliary, emergency, or backup boilers. Referring to FIG. 91, an industrial process plant such as a refinery, petrochemical plant, or other process plant 91600 may have one or more steam distribution networks 91601 that provide steam to process units such as pumps 91604, blowers 91605, process reactors 91606, turbines 91607, or other uses. In one implementation, the continuous operation of the steam network is required for the safe operation of the plant, including during startup and shutdown operations.

Some industrial process units 91602, principally those with exothermic reactions, may generate all or a portion of the steam 91603 in the network during normal operation. In some implementations, however, for the safe and effective operation of the plant other sources of steam must be instantly available in the event of the shutdown of one such unit 91602. In some prior implementations gas-fired or oil-fired boilers 91611 have been used. In some implementations such equipment must be maintained at operating temperature continuously in order to be able to immediately increase its firing rate to provide the steam necessary in such a shutdown event. Such units may employ a conventional recirculating design with a steam drum 91613 which is open to the main steam network, and the heat necessary to keep the drum warm may be provided by excess steam produced by the process units 91602. However, the firebox or burner portion of the boiler must also be kept warm in some implementations, and this is commonly done by operating the burner 91612 continuously at a low firing rate. This is a source of continuous $CO_2$ and other pollutants.

In the depicted implementation of a thermal energy storage system, the thermal storage unit 91608 has an HRSG with recirculating drum boiler process 91609, where the drum is again open to the steam header 91601 and the HRSG section is kept warm by excess steam. The thermal storage unit may maintain its temperature via its insulation, with low energy losses. The storage unit may be charged by a directly-connected VRE source, or may be rapidly or slowly charged from an electricity grid or a local power generation source, in such a manner as to minimize energy cost. The storage unit is configured to instantly (within seconds) begin high-rate steam production from storage, and operate until storage capacity is exhausted. In this implementation the fuel-fired boiler 91611 may be left in a "cold storage" configuration, burning no fuel, until a shutdown requires its operation. The operating time of the thermal storage unit provides an extended time period to properly start and warm up the fuel-fired boiler before placing it into service for outages that extend beyond the discharge period of the storage unit.

Other Energy Usage Applications

Figure 92:
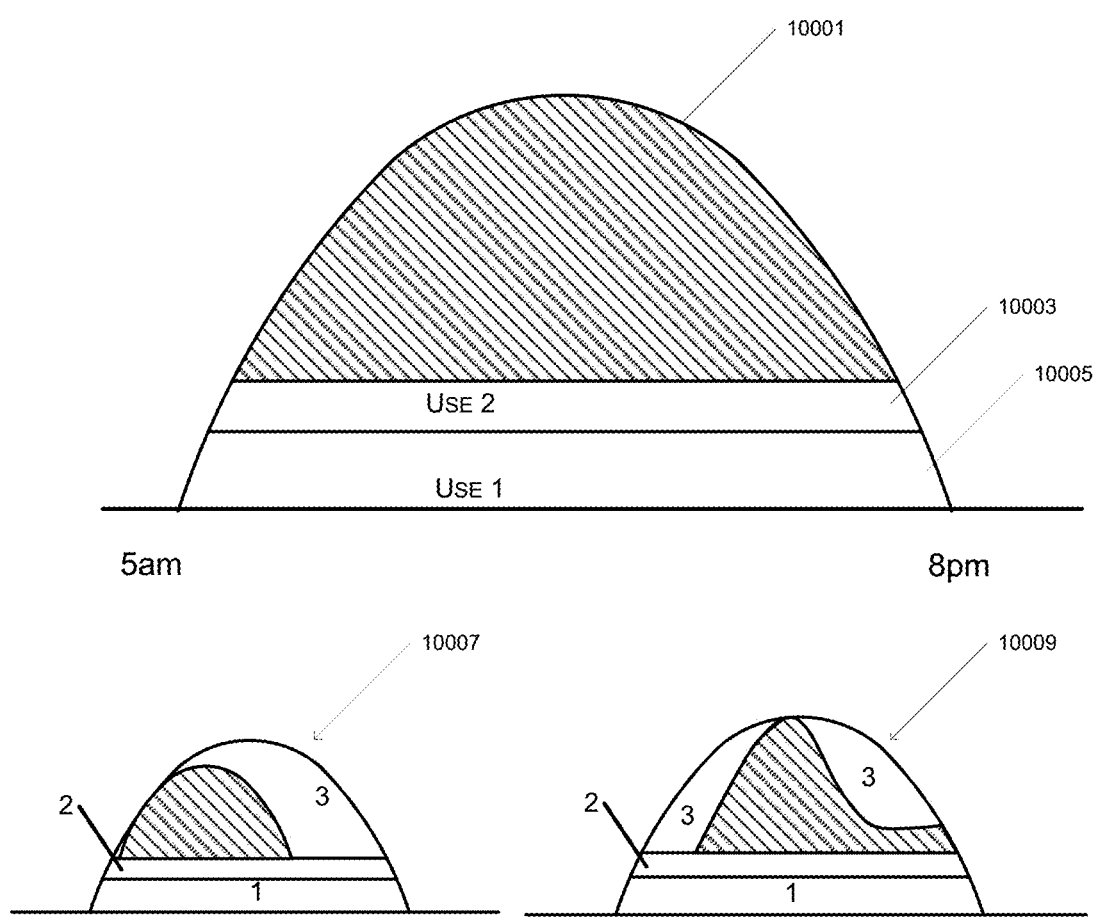
FIG. 92 illustrates a process for apportioning variable renewable electricity to multiple uses on a typical day.

FIG. 92 is a schematic illustration 10000 that shows the availability of electricity from a solid oxide generation facility on a typical day. The illustration shows potential uses for available electric power. In one implementation, use 1 is the local consumption of relatively high-price electricity used at the industrial facility itself. As power production from a solar facility begins in early morning, the electricity is supplied to that highest value use first as the available solar electricity production rises.

More specifically, the time of operation or charging may be controlled in such a manner as to optimize other economic value, such as the supply of electricity to a grid at periods of high price or high value. Curve 10001 represents available energy during a solar day between the beginning of the solar day and the end of the solar day. While the times of 5 AM and 8 PM are shown by way of example, it is understood that the time will vary, depending on the location and time of year.

Curve 10001 shows the solar energy increasing from the beginning of the solar day to a maximum level and then decreasing towards the end of the solar day. Within the available solar energy, the chart illustrates that there may be multiple uses of the solar energy.

As shown in the additional charts, a first use 1 and a second use 2, as explained above, are shown. Additionally, outside factors 3, such as grid storage, capacity, energy supply, pricing variations due to energy markets or the like may influence the availability and demand of the solar energy for charging the thermal energy storage system. A control system, as described above, may incorporate these factors into determinations and recommendations to the operator regarding the operation of the thermal energy storage system, such as the charging and discharging of the stacks. Accordingly, the thermal energy storage system may dispatch energy for multiple purposes or uses from the output of the thermal energy storage system, while taking into account these factors.

As shown in the first additional chart at scenario 10007, less solar energy may be available for the thermal energy storage system later in the solar day. Alternatively, as shown in the second additional chart at 10009, less solar energy may be available for charging the thermal energy storage system during the early portion and the middle to later portion of the day. Other variations may exist, as would be understood by those skilled in the art.

For example, use 1 (represented by region 10005) may be a local electric load in one implementation. This may represent the electricity provided to a local area by a photovoltaic array. Additionally, other uses such as use 2 (represented by region 10003) may also use the available solar energy. As indicated by the shaded region, the remaining solar energy is available to charge a thermal energy storage system connect to the solar energy source exhibiting the energy profile of curve 10001.

In one implementation, use 2 is a second-high value use, which may be and industrial process such as electrolysis. Use 2 is then fully powered for as long as possible while excess energy beyond that needed for use 1 is available. As electricity production rises further later in the day, electricity is available for other purposes, including charging a thermal energy storage device, and/or participating in the supply of electricity, for example, to an electricity grid, where electricity may be valued at very different prices at different times. This system may be operated in such a way that, for example, electric power to a thermal storage unit may be turned off and electric power instead released to the grid as desired based upon demand, pricing or other factors, and/or power may be brought from the grid to power a storage unit or for one of other possible uses depending upon local grid conditions.

Self-Sufficient Off Grid Infrastructure

In some implementations, use of high voltage DC/DC conversion allows for very high efficiency connection of solar fields with suitable distance to loads such as a thermal energy storage unit that can be coupled to electrolyzers and used for electric vehicle charging. Further, a thermal energy storage system may have integrated hydrogen production in some implementations, with electric power generation from hydrogen and also have integration of lithium-ion batteries. A thermal energy storage system can also be coupled to drive desalination to produce a completely off-grid facility or military base that is self-powering for its domestic loads, its heat loads and its vehicles.

Refiring of Steam Plants

Since outlet temperatures from a thermal energy storage unit are higher than gas turbine outlet temperatures in some implementations, outlet from a thermal storage structure can fire the same HRSGs as a gas turbine, potentially cutting the storage unit cost by about, e.g., 40%. In some implementations, nearly all the off-specification operation of thermal plants can be reduced or eliminated by coupling to a thermal storage unit as disclosed herein. Combined cycle gas turbine (CCGT) plants were designed to run at nominal output at high capacity factor, but may not be operated in this way if connected to a power grid with variable load. In California, for example, such plants may spend significant time as "spinning reserve"—running at idle so as to be able to respond to load changes. CCGT plants may also do daily start-stop operation requiring warmup of all components to bring the plant to ready-to-operate condition and spend significant time in a "load-following" mode of throttling generation in response to load. Such reserve and warmup operations are approximately 0% fuel efficient, and there is tension between fuel cost (dictating warming the plant as fast as possible) and operations and maintenance (O&M) cost (dictating warming the plant slowly to cause less stress damage). This load-following operation in CCGT plants results in efficiency losses of at least 5% and sometimes 15%.

Integrating thermal energy storage systems such as those in the example implementations disclosed herein with thermal plants may address the efficiency problems describe above. About, e.g., 90% of a plant's warmup process can be powered by intermittent renewable generation stored in a thermal storage unit. HRSG and steam turbine (ST) preheat energy is a significant factor in many plants. A "part spinning reserve" configuration can be achieved where a thermal energy storage unit fully powers the operating steam turbine, from idle to full power, so the plant can respond instantly with up to about, e.g., 40% of nominal output running completely zero-carbon, and can add then add the gas turbine (GT) in around 10 minutes.

Thermoelectrochemical Converters

Thermoelectrochemical converters are solid-state devices that utilize the electrochemical potential of a gas pressure applied throughout a membrane electrode assembly to convert heat into electricity via gas compression and expansion. A thermoelectrochemical converter that utilizes the electrochemical potential of a hydrogen pressure differential applied across a proton conductive membrane is known. The system consists of two membrane electrode assemblies (MEA) to convert heat into electricity via hydrogen compression and expansion. One stack is operated at a relatively low temperature and coupled to a heat sink, and the other stack is operated at a relatively high temperature and coupled to a heat source. Hydrogen gas circulates in a closed system. The net electrical power or voltage that can be achieved increases as the temperature differential between the two MEA stacks increases.

Thermophotovoltaic (TPV) Cogeneration

Thermophotovoltaic (TPV) energy conversion is a process of converting thermal radiation to electricity directly and includes a thermal emitter and a photovoltaic diode cell. The temperature of the thermal emitter needed varies based on system but typically ranges from about 900° C. to about 1300° C., e.g., 900° C. to 1300° C. At these TPV temperatures, radiation is radiated mostly in the form of near infrared and infrared frequencies. The photovoltaic diodes absorb some of the radiation and converts them into electricity. In art, a thermophotovoltaic cell with >29% power conversion efficiency was achieved, at an emitter temperature of 1207 C with potential for further efficiency improvement. Such a TPV system may allow for efficient cogeneration for heat and electricity.

The thermal emitter may be, for example, a graphite heated by resistive heating and operated with an inert atmosphere to prevent the oxidation of graphite. Indium gallium arsenide (InGaAs) or silicon (Si) type PV cells can be used for example to generate electricity.

The high temperature thermal storage system disclosed herein can be effectively coupled with a thermophotovoltaic cogeneration, offering benefits including but not limited to the following:

The high temperatures combined with the storage technology matches well with high efficiency TPV systems which utilize thermal radiation to generate electricity Unlike other thermal storage systems relying largely on convective heat transfer, the "radiative echo chamber" concept described herein can work in concert with convective heat transfer to get radiation out of the thermal storage assembly or array. In one implementation, the arrays include relatively inexpensive materials with mediocre thermal transfer medium to keep costs low. The radiation chambers in effect increase the surface area from which energy can be extracted, allowing for faster discharge rates without rapidly degrading top temperatures.

Extremely high storage temperatures above 2000° C. are practically achievable with a thermal storage system of the kind described herein. Such temperatures allow for the use of lower cost, more available but higher bandgap cells using silicon semiconductors for TPV.

Inert gas compatible with the emitter (e.g. graphite) and TPV system can be used directly as the heat exchange fluid in the thermal storage system decreasing complexity and cost.

An optional feature may include movable shields or other means to shield or block the incoming radiation at the TPV cells during the time that the thermal storage system is being charged. This allows the cells to remain cool, reduce the design cooling load and extend cell lifetime. During periods when the thermal storage system is being heated electrically coincides with periods of low cost or abundant electrical supply, making TPV operation unnecessary.

In one example implementation, the lower temperature heat arising from cooling during charging and then during power generation is used for another purpose, such as steam generation, water preheating, supercritical $CO_2$ heating for power generation or for industrial process heat. This heat can be blended with hotter air coming from the storage core or segregated (e.g., introduced into another heat exchanger which e.g., supplies preheat for a process that also employs high-temperature heat, or used for another process). This would further increase the total efficiency of energy use for a combined heat and power application, examples of which are disclosed in other parts of this application, such as cement and glass production.

The combination of high temperature thermal storage and TPV described herein could unlock significant value even in a pure electric power storage application. TPV can be used as a "topping" cycle and steam turbine as a "bottoming" cycle, resulting in high electricity-to-electricity efficiencies approaching 50%. The TPV component could provide "instant" services including load following, frequency and voltage regulation with rapid (e.g. millisecond) response times. The combined thermal storage-TPV system would function similarly to a lithium ion battery for part of the electric power output, providing grid stability value, with an added benefit of a long-term storage unit at a significantly lower cost and size.

Thermoelectrochemical Converters Run by High Temperature Thermal Storage System

As described above, the net efficiency of a thermoelectrochemical system can be increased by increasing the temperature differential between the two membrane electrode assemblies (MEA). Implementations of a thermal energy storage system disclosed herein can be coupled to the hot end of a thermoelectrochemical converter to provide near constant or constant high temperature heat. In the present example implementation, a heat exchanger in the high temperature outlet of the thermal storage system is coupled to the high temperature MEA in the thermoelectrochemical conversion system, at temperatures between 500° C. and 1200° C. The remaining heat may be used to generate steam in a Heat Recovery Steam Generator, for example, or used for another industrial application. In another example implementation, the high temperature portion of the thermoelectrochemical converter may be coupled to the heated gas from the secondary heat outlet (i.e. from cooling the high temperature energy sources) to generate electricity while the primary heat outlet (i.e., the highest temperatures, for example, at 1600° C.) is used for industrial applications such as power generation or cement production. Such cogeneration of heat and power could have combined efficiency of nearly 90% because waste heat from the thermoelectrochemical electric generation can be used for industrial purposes.

In some example implementations, the environment is used as the heat sink. In other example implementations, the cool side of the thermoelectrochemical converter could use the feedwater to the HRSG as the heat sink, raising the temperature of the feedwater, recovering that energy for steam generation useful for a steam power cycle or industrial processes. Preheating of thermal exchange fluid in this way can be applied to other processes, including, for example, the cement production process. A cooled stream of $CO_2$ may first be used as the heat sink for the thermoelectrochemical converter, raising the temperature of $CO_2$, when is then heated to operational temperatures of the cement kiln, preheater or precalciner. The heat/power balance allows retention of very high efficiency of heat and power cogeneration with high temperature heat loads for industrial processes.

Electric Booster

Figure 93:
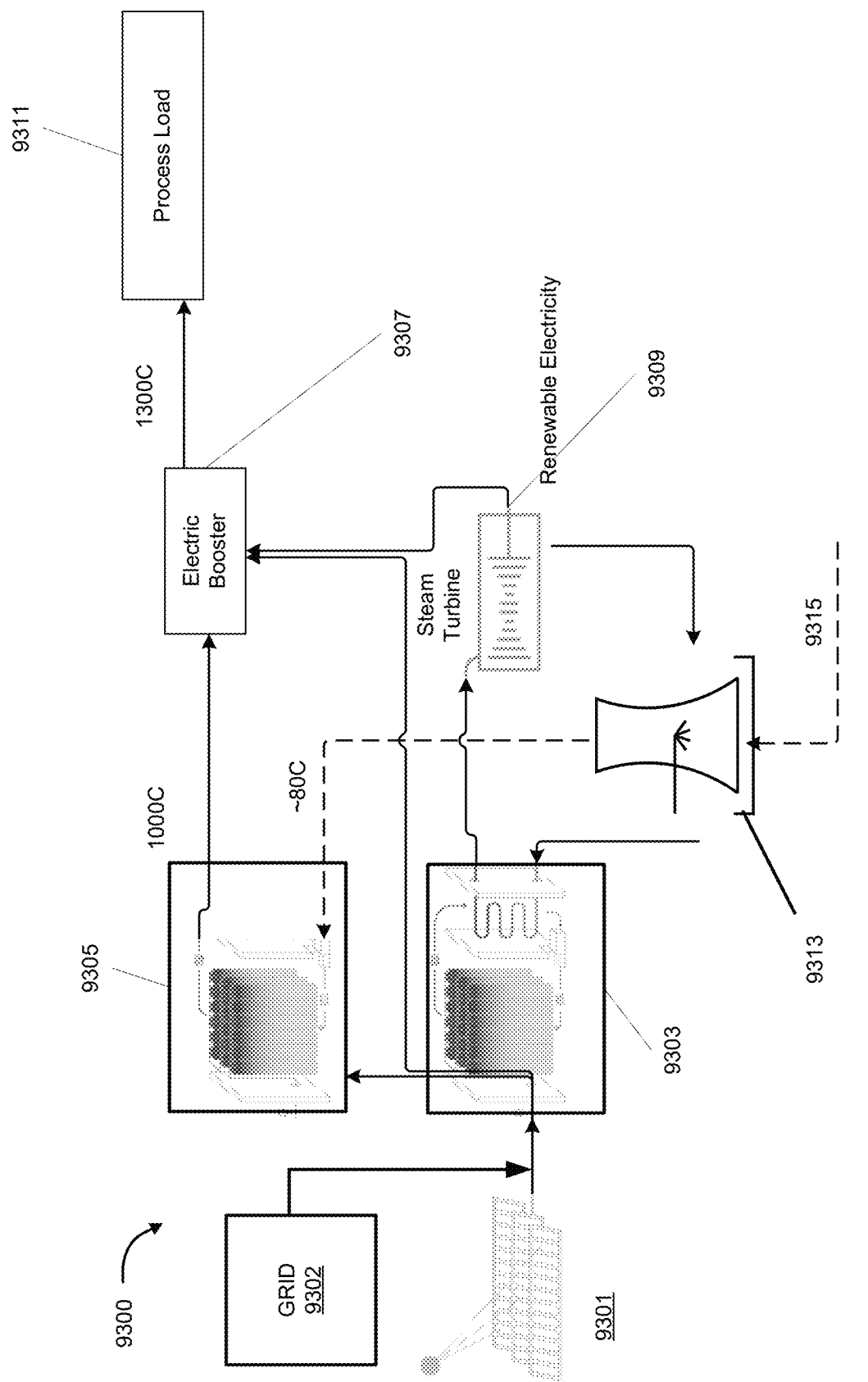
FIG. 93 illustrates an electric booster according to the example implementations.

FIG. 93 shows an example implementation 9300 of the thermal energy storage system that includes an electric booster 9307 that is configured to boost the temperature of a fluid output to meet a requirement of an end use. In this example, electricity is provided from a source 9301, such as an off-grid solar array or other VRE, to first and second thermal storage units 9303, 9305, referred to here as heat batteries. The electricity may be provided as DC current or AC current.

While the energy source 9301 is shown as an off-grid renewable source of energy, and more specifically, solar photovoltaic cells, other renewable sources could be used in substitution or combination, such as wind. Further, grid electricity 9302 could be used in substitution or combination with the off-grid source of electricity. The electricity from the energy source 9301 is used to provide the electrical energy as inputs to the first and second heat batteries 9303 and 9305, as well as for the electric booster 9307. The first and TSUs 9303 and 9305 can include single stacks, double stacks or more, or some combination; the TSU's 9303 and 9305 do not have to contain the same number of stacks. In one embodiment, either or both of the TSUs 9303 and 9305 can include six stacks.

The first heat battery 9303 can be configured to store electricity as heat, to provide heated fluid as an input to an HRSG, or to provide steam to a steam turbine 9309. Alternatively, an OTSG may be used instead of the HRSG.

The second heat battery 9305 provides hot fluid as an output for use in an industrial application, such as in a cement kiln or steel production, referred to here as a process load 9311, also referred to as a drying load. It may be the heat battery 9305 provides the fluid at a temperature of 1000° C., which is below the drying load requirement, which for a given application may be much higher, such as 1300° C.

Different fluids may be used in the first and second heat batteries 9303, 9305. For example, air may be used as the fluid for the first heat battery 9303 to power the steam turbine 9309, while $CO_2$ is used as the fluid for the second heat battery 9305, as needed for a particular industrial process. For example, in the case of the industrial process being a calciner, a closed loop is provided in which the fluid is recaptured for input to the heat battery 9305. The temperature of the return air is such that the air does not require preheating. In other industrial applications, an open loop may be provided, such that atmospheric air 9315 is preheated by the condenser 9313.

To raise the temperature of the heated fluid to the drying load requirement, the electric booster 9307 is provided at the discharge of the hot fluid. Accordingly, hot fluid output from the second heat battery 9305 passes through the booster heater 9307, and then to the process load 9311, at the required temperature for the industrial process.

In the second heat battery 9305, the fluid may be air, $CO_2$, or other fluid, depending on the industrial application at an output temperature, such as 1000° C.-1100° C. Further, the byproduct fluid of the industrial process may be recirculated as the input fluid to the heat battery 9305, depending on the industrial process.

The electric booster 9307 may be an electric resistance heater that boosts the fluid temperature from the maximum output of the heat battery 9305 to the temperature required by the process load 9311. Example of the types of industrial applications that would require high temperature fluid input for the process load 9311 include calcining, steel production, ethylene production, and steam methane reforming of hydrogen. The electric booster 9307 may be an industrial electric furnace, and may optionally include fins or other structures to transfer electrical resistance heat to the air. The heaters of the electric booster may be metallic (e.g., resistive coil), ceramic or other known materials. The stream of fluid output from the first heat battery 9305 is heated by direct contact with the heaters of the electric booster 9307.

When the energy source 9301 is available, it may provide the electricity for the electric booster 9307, as shown in FIG. 93 by the output line from source 9301 to the booster 9307. For example, the solar array can provide power to the booster heater when solar energy is available. Alternatively, when solar energy is not available, or available only in limited quantity, the steam turbine 9309 provides all or a needed, supplemental portion of the electricity to the electric booster 9307.

The byproduct fluid from the steam turbine may be cooled by passing through a condenser 9313, such as a cooling tower, before being condensed to a liquid state, and provided as an input to the steam generator of the heat battery 9303. Optionally, the condenser 9313 may serve as a preheater to heat incoming air 9315, for use as the input to the second heat battery 9305. In other words, the condenser 9313 is a heat exchanger that transfers heat from the byproduct fluid (e.g., low-pressure steam) from the steam turbine 9309 to the input fluid 9315. As a result, the input fluid to the heat battery 9305 is preheated.

While FIG. 93 illustrates separate first and second heat batteries 9303 and 9305, a single heat battery could instead be used. For example, hot air fluid could be streamed off and diverted from a single heat battery with multiple stacks, such that some portion of the hot fluid is provided to the process and the remainder of the hot fluid is provided to a steam generator. Such an approach might be used when the heat battery is charged from the grid, and economically optimized such that the heat battery charging is carried out at a time of low electricity prices, e.g., below some predetermined price, and the same electricity is provided to the electric booster. According to this approach, the steam turbine 9309 is used as a backup, on an as-needed basis.

3. Advantages Over Prior Systems

Stored high-temperature energy introduced as heated air into biomass combustion and gasification processes can make substantial contributions to the effective and safe operation of such facilities. This may cause various improvements in air emissions associated both with oxides of nitrogen and unburned fuel, ability to handle biomass fuels that are wetter during certain times, as well as improvements in plant reliability and capacity factor, particularly during periods of uncertain or limited biomass supply, reductions in corrosion due to shifts in operating point, ability to operate the plant during periods of limited or no fuel ability, ability to operate the plant as an energy storage facility.

Various Cogeneration Implementations

Thus, in accordance with the above, a number of cogeneration system implementations are possible and contemplated, a number of examples of which are now provided.

In one implementation, a cogeneration apparatus includes a thermal storage assemblage 4100) including a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks. The cogeneration apparatus further includes a plurality of heater elements positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities. A fluid movement system is configured to direct a stream of fluid through the fluid pathways to heat the fluid to a specified temperature range, wherein the fluid movement device is configured to provide the heated fluid in the specified temperature range to a solid oxide electrolysis system configured to extract hydrogen from water and output the heated fluid at a lower temperature. A steam generator configured to receive the lower temperature fluid from the electrolysis system convert input feed water into steam. In various implementations, the steam generator is a once-through steam generator, and may also be a heat recovery steam generator. The steam generator includes a plurality of conduits coupled to receive the input feed water, wherein selected ones of the conduits are arranged to mitigate scale formation and overheating. In certain implementations, ones of the plurality of conduits are arranged in the steam generator transversely to a path of flow of the lower temperature fluid. The thermal storage assembly comprises an enclosure containing the plurality of thermal storage blocks and a thermal barrier separating a first subset of the plurality of thermal storage blocks from a second subset of the plurality of thermal storage blocks. The fluid movement system is configured to direct the stream of fluid through the fluid pathways of one of the first and second subsets of thermal concurrent with an electricity source adding heat to another one of the first and second subset. In some implementations, the fluid comprises oxygen and nitrogen. Various sources of electricity may be used to charge the thermal storage assemblage. In one implementation, the thermal storage assemblage is configured to store thermal energy generated by a conversion of input electricity from an first input energy supply, the first input energy supply having intermittent availability. Implementations are further contemplated in which the thermal storage assemblage is further configured to store thermal energy generated by a conversion of input electricity from an second input energy supply configured to provide electricity on demand.

In yet another implementation, a cogeneration apparatus includes a thermal storage assemblage having a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks. The implementation further includes a plurality of heater elements positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities. A fluid movement system is configured to direct a stream of fluid through the fluid pathways to heat the fluid to a specified temperature range. A steam generator is configured to receive the fluid to convert input feed water into input steam having a first pressure. A steam turbine configured to receive the input steam and provide output steam at a second pressure that is less than the first pressure. Such implementations may further include a second fluid movement device configured to move the output steam to an industrial plant for use in an industrial process.

The steam generator, in various implementations, is a once-through steam generator. The steam generator includes a plurality of conduits coupled to receive the input feed water, wherein selected ones of the conduits are arranged to mitigate scale formation and overheating. Ones of the plurality of conduits are arranged in the steam generator transversely to a path of flow of the lower temperature fluid.

With regard to the industrial process, a number of different processes are possible and contemplated. In one implementation, the industrial process comprises producing petroleum-based fuels. In another implementation, wherein the industrial process comprises producing biofuels. In yet another implementation, the industrial process comprises producing diesel fuels. In still a further implementation, the industrial process comprises drying grains. These industrial processes are provided here as examples, and do not constitute an exhaustive list of possible industrial processes that may be used with the various implementations. The present disclosure contemplates a wide variety of industrial processes beyond the examples given here. It is further noted that implementations are possible and contemplated wherein the steam turbine is configured to cause an electrical generator to provide electricity to the industrial process.

In yet another possible implementation, a cogeneration apparatus includes a thermal storage assemblage having a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks. A plurality of heater elements is positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities. A fluid movement system is configured to direct a stream of a first fluid through the fluid pathways to heat the first fluid to a specified temperature range. A first steam generator is configured to, using the first fluid, convert input feed water into steam. A steam turbine configured to cause generation of electricity using the steam. The implementation also includes a preheater configured to, using waste heat from the steam turbine, preheat feed water provided to a second steam generator.

In an implementation, the first steam generator is a heat recovery steam generator, and may also be (or alternatively be) a once-through steam generator. Various implementations also include a condenser coupled to the steam turbine, wherein the condenser is configured to condense steam received from the steam turbine into water a recirculation pump configured to provide, as feed water to the first steam generator, water produced by the condenser. The second steam generator in various implementations is configured to generate steam using a second fluid from a second storage medium configured to store thermal energy. The preheater in various implementations is configured to output a third fluid to the thermal storage assemblage.

A further implementation of a cogeneration apparatus includes a thermal storage assemblage) including a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks. A plurality of heater elements is positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities. A fluid movement system is configured to direct a stream of fluid through the fluid pathways to heat the fluid to a specified temperature range. A steam generator is configured to receive the fluid to convert input feed water into input steam. Various implementations also include a measurement unit configured to determine a measured steam quality value of steam output from the steam generator. A controller is configured to cause the cause the fluid movement system to direct the stream of fluid, and further configured to use the measured steam quality as feedback to adjust a flow rate of the fluid to maintain the measured steam quality within a specified steam quality range.

In some implementations, the measurement unit includes a separator configured to separate steam output from the steam generator from water vapor output from the steam generator, wherein the measurement unit is configured to determine the measured steam quality based on fraction of the water vapor output from the steam generator relative to the steam output from the steam generator. Implementations are further possible and contemplated in which the measurement unit is configured to determine the steam quality based on a flow velocity of steam output from the steam generator and a mass flow rate of the input feed water. With regard to the steam generator, implementations are possible and contemplated in which the steam generator is a once-through steam generator. The controller of such implementations may be configured to cause delivery of steam in accordance within a specified range of steam delivery rates. Accordingly, the controller is configured to specify the range of steam delivery rates based on forecast information. Various types of forecast information are possible and contemplated as a basis for the controller to specify the range of steam delivery rates. In various implementations, the forecast information includes weather forecast information. Implementations in which the forecast information includes expected electricity rates are also possible and contemplated. Similarly, implementations in which the forecast information includes expected steam demand are contemplated. It is noted that the controller may use one or more types of the forecast information mentioned here, while other types of forecast information not explicitly discussed herein may also be used in various implementations.

In still another implementation, a cogeneration system includes a storage medium configured to store thermal energy generated by a conversion of input electricity from an input energy supply, the input energy supply having intermittent availability. A fluid movement device is configured to move fluid through the storage medium to heat the fluid to a specified temperature, the fluid comprising oxygen and nitrogen, wherein the fluid movement device is configured to provide the fluid at the specified temperature to a solid oxide cell electrolysis system that converts water to hydrogen and enriches the fluid with oxygen. Such implementations may also include a once-through steam generator configured to, using the fluid received from the electrolysis system convert input feed water into steam.

These implementations may further include a steam turbine configured to cause an electrical generator to generate of electricity using steam received from the steam generator.

With regard to thermal storage, the thermal storage unit may comprise a plurality of bricks. A controller in an implementation is configured to cause the fluid movement device to move fluid at a particular rate. Further contemplated in various implementations is a measurement unit configured to measure a parameter of steam output from the steam generator. The controller is configured to adjust the particular rate based on the measurement of the parameter of steam output. Meanwhile, the measurement unit in various implementations comprises a separator configured to measure a quality of the steam output from the steam generator by separating the steam into a liquid phase and a vapor phase. Alternatively, implementations in which the measurement unit is configured to measure a velocity of steam output from the steam generator are also possible and contemplated. The controller is configured to control an amount of fluid moved through the storage medium based on a weather forecast. The controller may also be configured to control and amount of fluid moved through the storage medium based on an expected difference in electricity costs on a first day and a second day.

Various types of electrical sources may comprise the intermittent energy supply in various implementations. In one implementation, the intermittent energy supply comprises a thermophotovoltaic generation system configured to convert thermal radiation into electrical energy. The intermittent energy supply may also, or alternatively, comprise a wind turbine configured to generate electricity. The intermittent energy supply may also a solar energy source configured to convert solar energy into electricity, which may be used singularly or with various ones of the other types mentioned herein.

The fluid movement device in one implementation comprises a closed fluid recirculation loop. Implementations may a pump, and wherein the pump is configured to force the input feed water through one or more conduits of the steam generator. With regard to the steam generator, one or more conduits may be provided in which feed water flows. In such implementations, the one or more conduits may be mounted in the steam generator transversely to a path fluid flow.

In yet another implementation, a cogeneration system include a storage medium configured to store thermal energy generated by a conversion of input electricity from an input energy supply, the first input energy supply having intermittent availability. A first fluid movement device is configured to move fluid through the storage medium to heat the fluid to a specified temperature. A once-through steam generator is configured to, using the fluid, convert input feed water into an input steam having a first pressure. The system may include a steam turbine configured to provide an output steam at a second pressure that is less than the first pressure. A second fluid movement device may in various implementations is configured to move the output steam to an industrial plant for use in an industrial process.

The steam turbine in various implementations is configured to cause generation of electricity by an electrical generator. The electrical generator is configured in some implementations to provide electricity to a power grid.

Various types of industrial processes are possible and contemplated in accordance with the above. In one implementation, the industrial process comprises production of biofuels. In another implementation, the industrial process comprises production of petroleum-based fuels. In yet another implementation, the industrial process comprises production of diesel fuels. Implementations in which the industrial process comprises drying of grains are also possible and contemplated. The disclosure contemplates industrial processes other than those measured here that may also benefit from use of an implementation of the cogeneration system/apparatus per this disclosure.

The cogeneration system in various implementations includes a controller configured to cause the steam generator to generate steam at a specified steam quality based on steam quality. The steam quality may be calculated by a comprising a measurement unit configured to determine the steam quality based on separation of steam and water vapor output from the steam generator. In another implementation, the steam quality may be calculated by a measurement unit configured to determine the steam quality based on measurements of steam outlet flow and feed water input flow. The steam quality may, in various implementations, be affected by the rate at which fluid is moved through the storage device. Accordingly, implementations are possible an contemplated in which the controller is configured to control a rate at which fluid is moved through the storage medium by the first fluid movement device. In some implementations, the storage medium comprises a plurality of bricks.

Yet another implementation of a cogeneration system includes a first storage medium configured to store thermal energy generated by a conversion of input electricity from an input energy supply, the input energy supply having intermittent availability. The system further includes a fluid movement device configured to move fluid through the storage medium to heat the fluid to a specified temperature. A first steam generator is configured to, using the fluid, convert first input feed water into steam. A steam turbine is configured to, using the steam, cause an electrical generator to generate electricity. Implementations may further include a preheater configured to, using waste heat from the steam turbine, preheat second feed water provided to a second steam generator.

The steam generator in one implementation is a once-through steam generator. However, implementations in which the steam generator performs at least some recirculation of feed water are also possible and contemplated. Accordingly, some implementations include a condenser configured to receive at least a portion of the steam from the steam turbine and configured to condense the portion of steam into third feed water, while a recirculation pump is configured to provide the third feed water to the first steam generator.

In various implementations, the steam generator is a heat recovery steam generator. The measurement of steam quality output by the steam generator may be performed in various implementations, which may thus include a measurement unit configured to determine a measured output steam quality and a controller configured to adjust a current output steam quality to within a specified range using the measured output steam quality as feedback. In such implementations, the controller is configured to cause fluid movement device to adjust a rate of fluid flow through the storage medium in accordance with the feedback and the specified range of steam quality.

D. Carbon Removal

1. Problems to be Solved

Carbon dioxide is the largest contributor to global greenhouse gas emissions, with fossil fuel use being the primary source of carbon. About 20% of emissions come from industrial processes, which primarily involve fossil fuel combustion for energy. In the U. S. alone, greenhouse gas emissions totaled 6,577 million metric carbon tons of carbon dioxide equivalents. At least 16 states and Puerto Rico have enacted legislation establishing reduction requirements for greenhouse gas (GHG) emissions. California, for example, has implemented GHG emissions reduction targets through SB32, which requires that the state Air Resource Board (CARB) ensure GHG emissions reductions to 40% below 1990 levels by 2030.

These forces, combined with falling renewable energy prices, have driven a boom in renewables adoption, thus increasing the challenge of balancing energy supply and demand with added intermittent energy supply. Renewable energy curtailment has steadily increased, and oversupply conditions are expected to occur more often going forward. At the same time, in order to respond quickly to sudden losses of generation and/or unexpected changes in load, there may be greater need for expensive spinning and other operating reserves.

In addition, the energy produced through renewable means, for example, solar and wind, typically does not match the demand. Accordingly, the value of efficient solutions for energy storage has become increasingly clear in order to continue increasing renewable fraction in our energy supply. Energy storage is able to provide backup power or heat when traditional sources of energy (e.g., grid electricity) are lost or interrupted. Energy stored as high temperature heat has multiple advantages, including higher energy density, lower cost, increased flexibility for use in industrial high temperature applications as well as for producing power. Decarbonization may be particularly difficult for industrial processes requiring very high temperatures, such as above 1000° C.

Existing industrial heat processes are generally fired by fossil fuels, sometimes with enriched oxygen atmosphere for applications requiring very high temperatures, for example greater than 1500° C. Such processes cannot be switched to an intermittent renewal source because of the need for continuous, high temperature heat. Meanwhile, some governments around the world limit greenhouse gas emissions. For example, in Europe, the EU emissions trading system (EU ETS) uses a cap-and-trade method to limit carbon emissions. Carbon dioxide prices are expected to significantly increase in the future.

At the end of 2019, the average price of carbon dioxide in Europe was €25/ton. Germany has announced prices in the range of €55-65 per ton after 2026 and by 2050, carbon dioxide prices in the range of €100-€150 per ton is expected. In the European cement industry alone, which emitted 117 megatons of $CO_2$ in 2018, the current cost of the emission is approximately €3 billion. Globally, energy-related $CO_2$ emissions were around 33 gigatons in 2019.

Therefore, there is significant unmet need for technologies that can significantly reduce carbon emissions in industry, such as using renewable electricity. However, for very high temperature operations such as cement, glass, power and steel production, there are no reliable ways to achieve the high temperatures needed by using only intermittent energy sources.

Processes for separating carbon dioxide gas from exhaust gases that are generated by combustion of fuels may require a continuous flow of heat and electricity. Exhaust gases may increase during time periods of high demand, when generated electricity costs are highest, and therefore, not desirable for use in a carbon capture process. Alternatively, use of renewable sources of electricity are intermittent, and therefore not reliable for generating the required continuous flow of heat and electricity. It is noted that use of "continuous source of heat and electricity" is not intended to imply zero variation in temperature and/or electrical power. Rather the term "continuous," as used herein, indicates that the source of heat and/or electricity are capable of providing a sufficient amount of electricity and heat to maintain proper operation of a carbon dioxide separation process.

Calcium Looping is one example of a $CO_2$ capture technology that is based on cyclic calcination/carbonation reaction of, for example, CaO. CaO reacts with $CO_2$ to generate $CaCO_3$. The forward reaction is called carbonation, and is exothermic, where $CO_2$ is captured onto the sorbent. The reverse reaction, calcination, is endothermic and releases a pure stream of $CO_2$ which can be captured, compressed and stored. Such a cycle may include an intermediate step of hydration to increase the cycle life of the sorbent. The calcination reaction (releasing of $CO_2$) requires high temperatures above 900° C. whereas the carbonation reaction (adsorption of $CO_2$) requires temperatures around 600-700° C. Intermediate hydration reactions may occur at temperatures 100-200° C.

While calcium looping with $CO_2$ and sometimes other gases such as SO2 is an important technology to decrease the carbon footprint, the large energy requirement, often met by burning fossil fuels in a pure stream of oxygen, poses additional challenges toward reducing the carbon intensity of the process.

There is an unmet need for a high temperature thermal energy storage system powered by renewable electricity that can provide the energy required to run such a process, making the calcium looping process carbon negative.

2. Carbon Capture

While calcium looping offers promising methods for capturing and storing $CO_2$, the requirement in existing technologies for high temperature heat provided by a fuel stream combined with pure oxygen reduces the overall carbon capture efficiency. Such technologies may further require an air separator which adds cost and complexity to the system.

Figure 94:
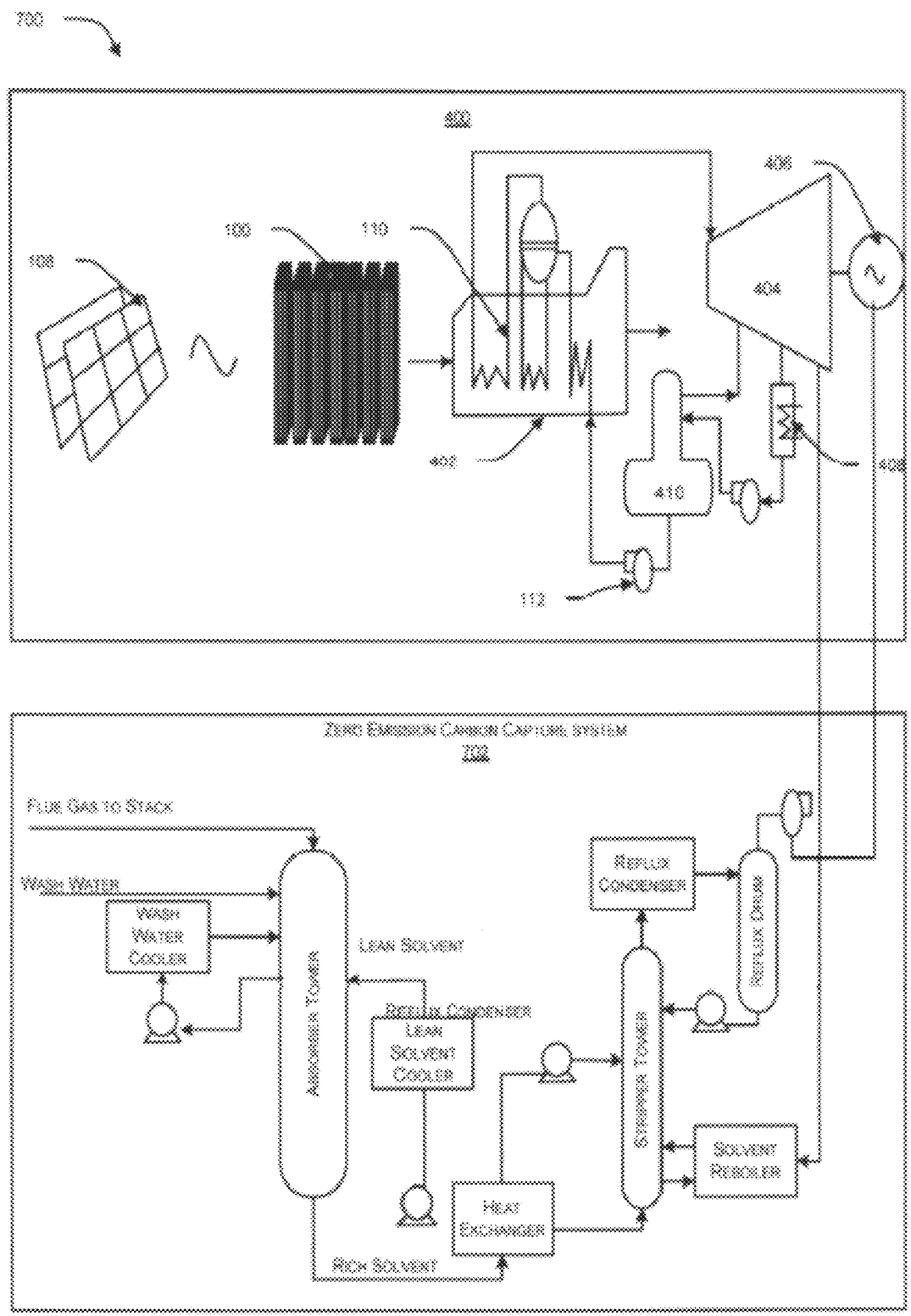
FIG. 94 illustrates integrated cogeneration system associated with carbon capture, according to the example implementations.

The problem of generating constant power and heat from an intermittent power source for use in a calcium-looping carbon dioxide separation process may be resolved by charging thermal storage units when the intermittent power source is available and generating the heat and power from the thermal storage units. Use of such thermal storage units may allow for continuous generation of heat and electricity from an inconsistent power source. Referring to FIG. 94, a high temperature thermal energy storage system powered by renewable electricity disclosed herein which uses some of the $CO_2$ generated as the thermal exchange fluid running through an example implementation system 100 eliminates the need for additional fuel or a pure oxygen stream. High temperature heat can be used for the regeneration cycle, mid-range temperature heat for the carbonation cycle, and low temperature heat can be used for the hydration reaction or to pre-heat the $CO_2$ stream entering the storage system. A truly carbon-negative calcium looping process can be coupled to any $CO_2$ producing processes and may have particular benefit in the cement production industry which can use spent calcium oxide to augment feedstock into the cement production process.

One application of the heated brick storage system is to drive a cryogenic carbon removal process. In one case, the unit is used to power a continuous electric power generation source which in turn drives a carbon dioxide separation process, which uses cryogenic effects, compressing and cooling $CO_2$ to reduce its temperature until it becomes a solid, or in some embodiments a liquid. A supply of the electrical energy needed to drive that process is derived from energy supplied by a turbine generator whose input heat can be provided by a thermal energy storage unit.

Many carbon capture processes, such as calcium looping, rather than purely using electric power (like the cryogenic process described above) also use thermal energy. The thermal energy may be used to regenerate a solid or liquid medium which captures carbon dioxide, then releases it (by being regenerated), and then is used again for one or more cycles to capture further carbon dioxide. Thermal energy from a heat storage unit described above can provide renewable based energy for this process.

High temperature heat may drive one implementation of a calcination process, in a multi-step chemical reaction which involves the repeated conversion of a calcium oxide to calcium carbonate using captured carbon dioxide, and then calcination to release the carbon dioxide. Such reactions take place at high temperatures, and high temperature heat from a heat storage unit described above can power this process, followed by the use of the remaining lower temperature heat to drive an electrical generator, via a turbine heat-to-work process, including steam, $CO_2$ or Rankine cycle processes.

Such heat may be supplied as lower grade heat from the outlet of a turbine generator, into which high grade heat is supplied by a thermal storage unit, such that some portion of energy is used in the form of electricity to drive pumps, and another portion of energy, in the form of heat, is used to drive regeneration. Both forms of energy may be supplied in an efficient manner using high temperature thermal energy storage.

Referring to FIG. 94, in some example implementations, the integrated cogeneration system 400 can be configured to provide thermal and electrical energy necessary to drive a carbon capture and sequestration process. The processes of $CO_2$ separation from exhaust gases and $CO_2$ capture directly from ambient air (Direct Air Capture, or DAC) commonly use processes where a capture media, which may be an absorbent liquid, an adsorbent solid, or a chemically reactive solid is exposed to flue gas or other $CO_2$-containing gas streams at a first temperature, then heated to a second temperature which causes the selective release of the $CO_2$ into another fluid conduit, followed by a cooling of the capture media and its re-use in another cycle of capture and release.

Stored thermal energy derived from VRE may provide a continuous supply of the necessary heat to drive this process. High-temperature air, or other type of fluid, may be directed to calcine or otherwise regenerate a high-temperature capture media. In one, steam may be directly supplied by an HRSG to drive a capture process element such as an amine solvent reboiler or adsorbent regenerator. In addition, or in place of steam from an HRSG, lower-pressure extracted steam from a steam turbine power cycle may be directed to provide heat to a solvent reboiler.

Electrical power generated by a steam turbine, organic Rankine cycle turbine, or supercritical CO2 turbine may provide electric power to drive the CO2 capture and compression equipment. Thus stored VRE may provide all energy necessary to drive a zero-emission carbon capture system 702 to enable separation of CO2 from exhaust gases or ambient air.

One example of using thermal storage units in a carbon capture process includes a carbon dioxide capture system that is configured to separate carbon dioxide from exhaust gases using, for example, a calcium looping process as described above.

Figure 100:
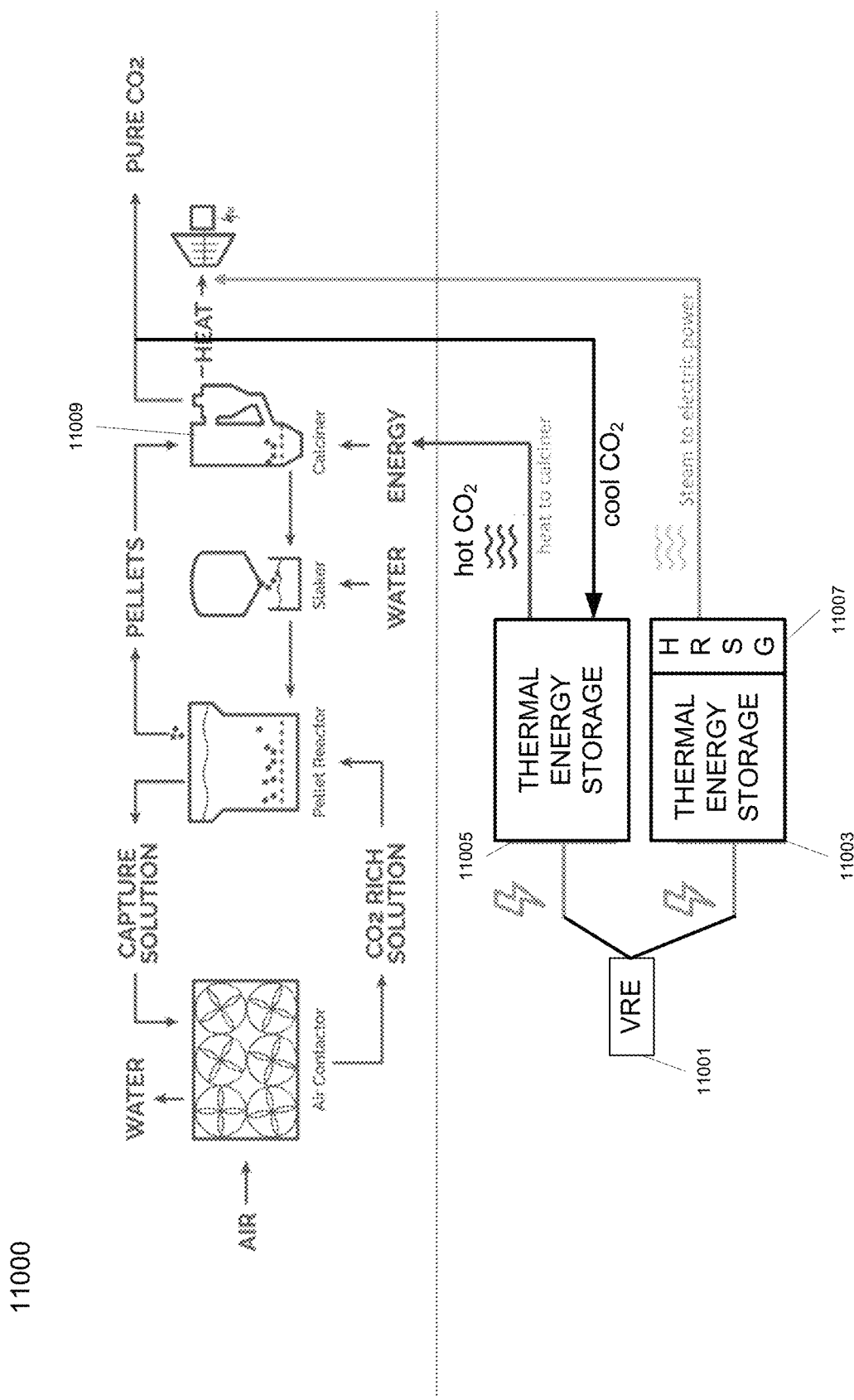
FIG. 100 illustrates a direct air capture approach according to the example implementations.

FIG. 100 illustrates a direct air capture approach 11000 according to the example implementations. A thermal storage system is included that is configured to convert input electricity from an input energy supply to stored thermal energy, the input energy supply having intermittent availability, e.g., from VRE 11001, such as a renewable energy source. The example further includes a power generation system, including thermal energy storage 11003 that provides hot fluid to an HRSG 11007, that is configured to convert the stored thermal energy to output electricity. This output electricity is provided to the carbon dioxide capture system. The carbon dioxide capture system is configured to operate using the provided electricity. In some embodiments, the thermal storage system includes a thermal energy storage 11007 that is configured to heat a storage medium using the input electricity from the input energy supply (VRE 11001), as well as a blower that is configured to circulate fluid through the heated storage medium, as explained above. The power generation system, in some embodiments, may include a heat exchanger that is configured to generate steam using circulated fluid, and a steam turbine that is configured to generate the supplied electricity from the produced steam.

The carbon dioxide capture system may include thermal energy storage 11005, which is configured to use a portion of stored thermal energy as heat to separate the carbon dioxide from the exhaust gases. For example, the heat may be used as part of a calcination cycle at calciner 11009 used to release carbon dioxide from an adsorbent material that has been used to capture the carbon dioxide. The thermal energy storage system, in some implementations, is configured to generate the output electricity in a substantially continuous manner, thus allowing the carbon dioxide capture system to be operational as needed.

An example method for operating a thermal energy storage system is presented in FIG. 95. Method 5100 includes, at block 5110, converting, by a thermal energy storage system, input electricity from an intermittently availability energy supply to stored thermal energy. For example, a renewable energy source, such as solar or wind, may be used to generate electricity which, in turn, is used to power heating elements that supply heat to a storage medium. At block 5120, method 5100 includes providing stored thermal energy from the thermal energy storage system to a steam turbine to generate electricity. The heated storage medium may be used to supply heat to a boiler that drives an electricity generator (e.g., a steam-powered generator). Heat may be transferred, via a suitable fluid, from the storage medium to a heat exchanger that heats the boiler. Method 5100 further includes, at block 5130, providing the generated electricity and heat from the thermal energy storage system to a carbon dioxide capture system that separates carbon dioxide from exhaust gases, wherein the output electricity and heat is provided at least at times when the energy supply is not available. Any suitable type of carbon dioxide capture process, such as a calcium looping process or cryogenic process, may be used. Use of a thermal storage system may allow the stored heat to be used at times when the energy source is not available, in addition to times when the energy supply is available.

Figure 96:
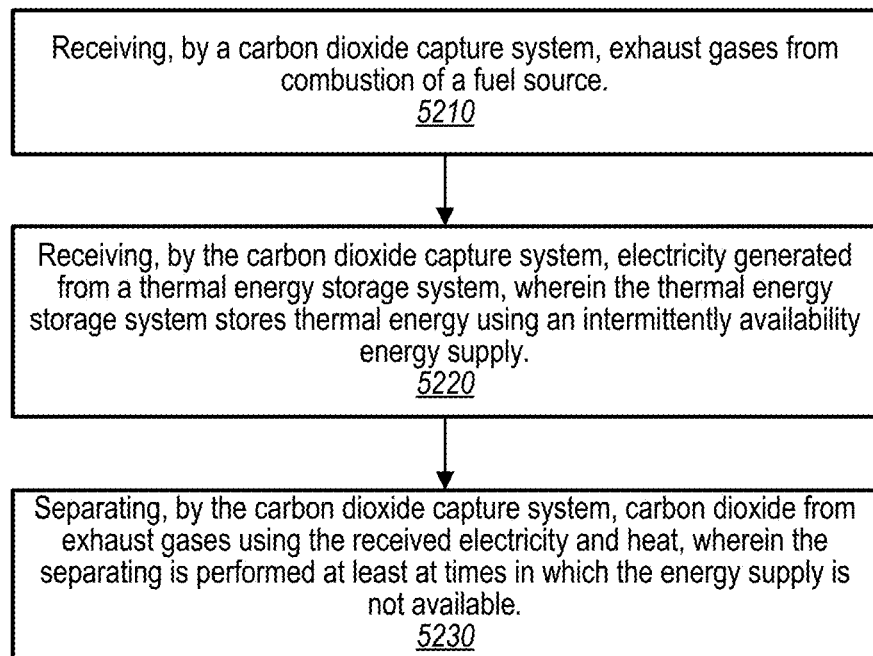
FIG. 96 is a flow diagram depicting an implementation of a method for operating a carbon dioxide capture system.

An example method for operating a carbon dioxide capture system is shown in FIG. 96. Method 5200 includes, at block 5210, receiving, by a carbon dioxide capture system, exhaust gases from combustion of a fuel source. The carbon dioxide capture system may include an absorber tower through which, exhaust gases flow, the exhaust gases coming from a furnace that is used to burn fossil fuels. At block 5220, method 5200 further includes receiving, by the carbon dioxide capture system, electricity generated from a thermal energy storage system. In the present example, power for the carbon dioxide capture system is provided by an intermittent source, such as renewable energy sources. The thermal energy storage system stores thermal energy using the intermittently availability energy supply. Method 5200 further includes, at 5230, separating, by the carbon dioxide capture system, carbon dioxide from exhaust gases using the received electricity and heat. Any suitable type of carbon dioxide capturing process may be used, including the processes disclosed herein. In some implementations, the carbon dioxide capture system may use both electricity and heat from the thermal energy storage system. The separating is performed at least at times in which the energy supply is not available. Since an intermittent energy source is used to supply the thermal energy storage system, this thermal energy storage system is capable of providing continuous heat to be used by the carbon dioxide capture system as a heat source and/or to generate electricity.

3. Advantages of Disclosed Implementations

The example implementations related to carbon capture may have various advantages and benefits relative to traditional techniques. For example, the approaches described herein may address oversupply issues, as well as promote additional carbon capture for very high temperature industrial applications.

For example, use of thermal storage units may allow use of electricity generated by the combustion of fuels. During time periods of low electricity demand, power generated from combustible fuels is used to charge thermal storage units. During time periods of high electricity demand, charging of the thermal units is ceased and the carbon capture process is powered by the charged thermal storage units. Accordingly, the thermal units may be charged when electricity costs are low and the produced electricity, therefore, has less value. During the time periods of high electricity demand, the produced has greater value and can be sold to an electrical grid rather than being routed to the carbon capture process.

E. Additional Industrial Applications

1. Renewable Desalination

Desalination processes traditionally run continuously and a significant amount of the world's desalination currently comes from membrane systems. The vast majority of the desalination in some regions (e.g., the Middle East), however, uses older thermal desalination technology that is coupled to a combined cycle power station. The combined cycle power station may have a combustion turbine and a steam turbine which outputs, for example, 70° C. condensation, which powers either a multi-stage flash or a multi-effect distillation production system. This may reduce the steam turbine electricity output by a few percent but may significantly reduce the electricity used to make water by desalination. In one example one ton of input steam makes four tons to seven tons of output water.

In some use cases, the power station remains running to keep desalination operational even when there is no other demand for the electricity generated by the power station, which results in power being wasted. With more renewable energy coming online, this may be an increasingly pressing problem.

By incorporating a heat storage system in accordance with example implementations, these problems may be addressed. The heat storage system may have an outlet temperature hotter than the outlet temperature of the combustion turbine. Thus, the heat storage system may be connected to a heat recovery steam generator with a separate air inlet port, or a steam generator of the heat storage system may be run to make water, firing no natural gas. The heat storage system may be charged by PV or run from grid power to absorb what would otherwise be over generation in the daytime and transition to true zero carbon water.

Thus, this system may be used to buffer peak electricity and provide level load power. If the combustion turbine is not been de-installed, during periods of high electricity demand, such as during a hot summer day, the combustion turbine remains available and thermal storage can be additionally deployed to run the steam turbine above nominal if desired.

One challenge in certain geographical regions (e.g., in the Middle East) is that a combustion turbine may produce around 18% less electricity on a hot day than it would on a cold day due to the lower combustion air density on the hot day. The disclosed heat storage system may be used to bring this steam mass flow and/or temperature back up when power from the turbine is drooping. All that can be electric so base load water can be made, but also includes its built-in topping power for peak electricity demand.

The heated brick energy storage systems described herein may be capable of producing higher output temperatures which may allow direct integration into existing desalination systems or may serve as the basis for a dedicated desalination system.

One beneficial element of these heated brick heat storage systems is that they may be retrofitted into existing plants to capture what would otherwise be overgeneration in the system. It should be noted that the disclosed heat storage system, coupled with a combined cycle power station can also drive a reverse osmosis system or other industrial processes, which may require round the clock power, with renewable energy.

2. Glass Production

Glass production typically requires temperatures ranging from 1500-1700° C. in a melting furnace where raw materials transform through a sequence of chemical reactions to form molten glass. The melting process represents over half of energy use in glass production. The metal bath may require temperatures from 1100° C. to around 600° C. at the outlet before the molten glass is annealed at 600° C. In some traditional implementations, the thermal energy required for glass production is provided by fossil fuel combustion and in some cases, electrical heating. Glass production is thus a highly energy-intensive process and global demand continues to increase for glass. According to the International Energy Agency, the container and flat glass industries (which combined account for 80% of glass production) emit over 60 megatons of $CO_2$ per year (IEA 2007) and energy use accounts for about 15% of total glass production costs.

Glass melting furnaces are complemented by a set of heat recovery regenerators which recover heat from the end of a melt furnace and use it to pre-heat the combustion air, e.g., to 900-1200° C. prior to the temperature being raised further through the burner to about 1700° C., e.g., 1700° C.

The high temperature energy storage system disclosed herein may have the capability to provide all thermal needs of the glass production system, including the high temperature melt furnace. In one example implementation, glass regenerators can be replaced by high temperature thermal energy storage systems disclosed herein to provide high temperature air or another gas and eliminate the need for a burner.

Because glass production is a round-the-clock process, an energy storage system may be used in one implementation to replace a significant amount of the input energy with intermittent renewable energy. The reduction or elimination of combustion gases may also reduce the amount of undesirable combustion products in the glass furnace. Nitrogen or another gas can be used in a closed loop through the high temperature thermal energy storage system, and into the float tank, reducing cost of air separation and reducing the production of undesirable side product of nitrogen oxides (NOx) produced by thermal reaction of nitrogen and oxygen in air.

In an alternative example implementation, the heated air from existing regenerators can be fed into the high temperature thermal energy storage system disclosed herein which then produces output fluid at a temperature utilized by the melt furnace. This may also reduce or eliminate need for a burner and additional combustion of fossil fuels.

3. Iron and Steel Production

Traditionally, crude steel is made using blast furnaces. Steelmaking may require high temperatures, such as approximately 1600° C., e.g., 1600° C. Every ton of steel produced in 2018 emitted on average 1.85 tons of carbon dioxide including agglomeration, iron- and steelmaking, casting and hot rolling, and accounts for approximately 30% of the global industrial $CO_2$ emissions. Therefore, there is a substantial unmet need for reduction of the carbon intensity of steelmaking. The European steel industry aims to reduce $CO_2$ emission by 80-95% by 2050 to meet the requirements of the Paris Agreement. Such drastic reduction may be difficult or impossible to achieve using traditional equipment.

Direct reduction processes used with an electric arc furnace may provide a pathway for substantial $CO_2$ emission reduction in the steel industry. Use of natural gas as the reducing agent reduces $CO_2$ emissions by approximately ⅓ compared to the traditional blast furnace route. Using renewable $H_2$ as a reducing agent further reduces emissions. However, the process may be thermally unfavorable due to the endothermic nature of the reaction between hydrogen and iron oxide.

For example, 800 m^3 (STP)/t DRI (cubic meters at standard temperature and pressure per metric ton of direct reduced iron) of hydrogen may be necessary for operation with hydrogen alone. The reduction process itself needs 550 m^3 (STP)/t DRI, whereas 250 m^3 STP/t DRI of hydrogen is required as fuel for the gas heater. An additional ~50 m^3(STP)/t DRI of natural gas may be needed in order to maintain the temperature and carbon content of the DRI. The temperature reduction from the hydrogen reaction can be compensated by the addition of natural gas. The exothermic reaction is between iron oxide and CO. In comparison, natural gas process requires approximately 259 m^3 STP/t DRI.

The ultrahigh temperatures produced by the thermal energy storage system of the example implementations may reduce carbon emissions from the steelmaking process. The ability to obtain some of the highest temperatures of the steelmaking operation near 1600-2000° C. means that thermal process heat needs in the blast furnace can be met using a renewable-energy-charged thermal storage system around the clock as described above. In addition, the gas composition heated inside the thermal storage unit may be tuned/selected to further increase production efficiency, to retrofit fossil fuel systems to a direct reduction process without the need for significant equipment modification, or both. In other words, a traditional system may be relatively simply retrofitted to be electrified using intermittent electricity sources such as a PV system. For example, hydrogen or natural gas can directly be used as the heat exchange fluid which is heated by the thermal storage system and also to directly reduce the ore into steel.

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

While foregoing example implementations may refer to "air", including $CO_2$, the inventive concept is not limited to this composition, and other fluid streams may be substituted therefor for additional industrial applications. For example but by way of limitation, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

Subject Matter of Claims for Future Examination

Following are sets of claims relating to various embodiments according to the present disclosure. Claim set 1 matches the set of claims 1-56 as filed herein for examination. Claim sets 2-7 include independent claims matching the independent claims as filed herein for examination beginning with claim 57. The dependent claims in claim sets 2-7, and claims sets 8-9, are reserved for examination in future applications.

The claims below can be grouped as follows:

Claims 1-56 include, inter alia, claims relating to physical structures of systems according to the present disclosure including bricks, stacks, heating apparatus, radiation chambers and related structures and processes, including once-through steam generators.

Claims 57-297 include, inter alia, claims relating to control processes, method and structures, including those relating to charging, discharging, deep discharging, and integrations of systems with variable renewable electricity systems and industrial processes.

Claims 298-321 include, inter alia, claims relating to electronic designs and processes for systems according to the present disclosure, including DC-DC conversion systems and techniques.

Claims 322-352 include, inter alia, claims relating to application of systems and methods according to the present disclosure to calcining and other industrial processes.

Claims 353-594 include, inter alia, claims relating to application of systems and methods according to the present disclosure to solid-state electrolysis systems and processes.

Claims 595-629 include, inter alia, claims relating to application of systems and methods according to the present disclosure to cogeneration systems.

Claims 630-635 include, inter alia, claims relating to application of systems and methods according to the present disclosure to selective application of discharge energy to different uses and processes based upon demand and other criteria.

Claim 636 describes various specific components and characteristics of a TES system.

Claims 637-643 include, inter alia, claims relating to application of systems and methods according to the present disclosure to carbon capture processes.

Introductory comments are provided to some of the claims below to highlight features and advantages of those claims.

Bricks with Radiation Chambers: Radiative Heating Via Radiation Cavities and Convective Discharging/Heating Via Air Movement, as Well as Internal Conduction, More Evenly Distributes Heat Through the Assemblage of Blocks.

1. A system for thermal energy storage and delivery, comprising:

a thermal storage assemblage (4100) including a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks;

a plurality of heater elements (3607) positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities; and a fluid movement system (213, 4223) configured to direct a stream of fluid through the fluid pathways.

Radiation in a Direction Different from Fluid Movement.

2. The system of claim 1, wherein at least some of storage blocks are positioned such that heater elements positioned adjacent to some of the radiation cavities emit heat primarily in a radiation direction that is different than a fluid flow direction through corresponding fluid pathways.

3. The system of claim 2, wherein the radiation direction is substantially orthogonal to the fluid flow direction.

Fluid Pathways Oriented in a Vertical Direction.

4. The system of claim 2, wherein the fluid flow direction through the fluid pathways is substantially vertical and at least some of the heater elements are horizontally adjacent to some of the radiation cavities.

5. The system of claim 2, wherein the heater elements, the storage blocks and the radiation cavities are configured to provide a substantially vertical thermocline wherein an upper portion of the thermal storage assemblage is at a higher temperature than a lower portion of the thermal storage assemblage.

Each Radiative Cavity Having Multiple Slots.

6. The system of claim 1, wherein at least one of the fluid pathways includes multiple fluid flow slots that open to a particular radiation cavity and the stream of fluid passes through the multiple fluid flow slots from the particular radiation cavity.

Alternating Cavities.

7. The system of claim 1, wherein a fluid pathway includes multiple cavities and multiple fluid flow slots, is oriented for substantially vertical fluid flow, and includes alternating radiation cavities and sets of one or more fluid flow slots in the vertical direction.

Slots May Receive Radiation Indirectly.

8. The system of claim 1, wherein the fluid flow slots are positioned such that radiative energy from the heater elements arrives at the fluid flow slots indirectly by reradiation via one or more radiation cavities.

Slots are Elongated. The Shape of the Openings Reduces the Amount of Laminar Flow, which May Keep Fluid within the Openings at a More Uniform Temperature.

9. The system of claim 1, wherein the fluid flow slots are elongate with a longer dimension and a shorter dimension.

Slot Orientation, e.g., for Zigzag Blocks. The Direction of the Openings May Avoid Blocking Conductive Transfer Through the Bricks Resulting from Absorbing Radiation in the Cavities.

10. The system of claim 8, wherein fluid flow slots of at least one thermal storage block are oriented with their longer dimension in multiple different directions.

Upper Blocks Taller. The Upper Part of the Stack is Hotter, so Larger Bricks May Handle the Heat Better. Smaller Bricks at the Bottom May Also Provide More Structural Stability.

11. The system of claim 1, wherein thermal storage blocks are positioned in multiple tiers, wherein the height of radiation cavities and fluid flow slots in a first tier is less than the height of radiation cavities and fluid flow slots in a second tier that is higher than the first tier.

Control Heater Elements Based on Vertical Height Optimal Heater Element Energy May Vary Based on Temperature, and the Stop of the Stack is Typically Hotter than the Bottom. This May Increase Thermal Retention Efficiency.

12. The system of claim 1, further comprising:

control circuitry configured to provide energy to the heater elements;

wherein thermal storage blocks are positioned in multiple tiers; and wherein the control circuitry is configured to provide different amounts of energy to the heater elements in at least some of the multiple tiers.

Independent Vent Control for Insulated Sets of Stacks. This May Facilitate Separate Charge/Discharge of Cells in a TSU.

13. The system of claim 1, wherein the thermal storage assemblage includes:

multiple stacks of thermal storage blocks, including a first set of stacks (4107) that is thermally isolated from a second set of stacks (4109); and vents (4111, 4113) located under the first set of stacks and the second set of stacks and configured to be independently controlled to direct flow of the stream of fluid into the first set of stacks and the second set of stacks.

Cavities are Larger than Slots. Larger Radiation Cavities that would be Needed for Airflow May Facilitate Uniform Radiative Heating.

14. The system of claim 1, wherein the volumes of at least some radiation cavities are greater than neighboring sets of one or more fluid flow slots of a given fluid pathway.

Larger Blocks May Reduce Costs of Block Construction and Reduce Friction Damage Between Blocks in a Stack. Certain Shapes May Also Provide Structural Safety, e.g., in Case of Seismic Events.

15. The system of claim 1, wherein at least one of the thermal storage blocks bounds multiple radiation cavities and multiple openings that are at least partially defined by one or more other thermal storage blocks.

Tall Blocks.

16. The system of claim 1, wherein a thermal storage block includes radiation cavities and fluid flow slots at multiple vertical elevations.

Small Slots Above Heating Elements May Improve Overall Fluid Flow and Even Heat Distribution.

17. The system of claim 1, wherein at least some of the thermal storage blocks include fluid flow slots in a block portion positioned above at least one of the heater elements.

Failsafe Vent.

18. The system of claim 1, wherein the thermal storage assemblage includes:

an enclosure;

wherein the enclosure includes a first vent with a first vent closure, the first vent forming a passage between an interior of the enclosure and an exterior, wherein the apparatus is configured to maintain the first vent closure in a closed position during an operating condition of the fluid movement system; and a failsafe mechanism configured to open the first vent closure in response to a nonoperating condition of the fluid movement system.

Dynamic Insulation May Allow Use of Less Expensive Insulation, Improve Equipment Life, or Both.

19. The system of claim 1, wherein the thermal storage assemblage includes:
a first enclosure having an interior surface;
a second enclosure having an exterior surface, the second enclosure positioned within the first enclosure, wherein the thermal storage blocks are positioned in the second enclosure; and
a fluid passage bounded by the exterior surface and the interior surface and in communication with the fluid pathways, wherein the fluid movement system is configured to direct the stream of fluid through the fluid passage and then through the fluid pathways.

Interlocking Shelf Portions May Improve Structural Stability and Reduce Friction Damage.

20. The system of claim 1, wherein the thermal storage blocks include shelf portions (3305) that interlock when the thermal storage blocks are positioned in a stack.

Cavity and Slot Heights are Substantially the Same.

21. The system of claim 1, wherein the radiation cavities and fluid flow slots at a given vertical elevation have substantially the same height.

22. The system of claim 1, further comprising:
an outlet (4303) configured to output gas heated by the thermal storage assemblage.

23. The system of claim 1, wherein the heater elements are connectable to receive energy from one or more energy sources of the following list of energy sources: solar, wind, hydroelectric and geothermal.

24. The system of claim 1, wherein the heater elements are also configured to heat the thermal storage blocks via conduction.

25. The system of claim 1, wherein the fluid includes one or more gases.

26. The system of claim 1, wherein the fluid is air.

27. The system of claim 1, wherein the fluid movement system includes a blower configured to direct the stream of fluid.

Failsafe Venting

28. A thermal storage unit (4100), including:
a first enclosure;
a thermal storage assemblage comprising a plurality of thermal storage blocks within the first enclosure;
a plurality of heater elements positioned within the assemblage and configured to heat the plurality of thermal storage blocks;
a fluid movement system configured to direct a stream of fluid through fluid pathways in the plurality of thermal storage blocks;
wherein the first enclosure defines an interior and an exterior and includes a first vent with a first vent closure, the first vent forming a first passage between the interior and the exterior; and
a failsafe mechanism configured to maintain the first vent closure in a closed position during an operating condition of the fluid movement system and to open the first vent closure in response to a nonoperating condition of the fluid movement system.

Second Vent is Open to Air Input, Allowing Passive Cooling Using the Chimney Effect, which Draws Cooler Fluid into the Bottom of the Stacks and Prevents Overheating.

29. The thermal storage unit of claim 28, wherein the first enclosure includes a second vent having a second vent closure and forming a second passage between the interior and the exterior, the second passage being configured to allow passage of the fluid to the first passage; and
wherein the failsafe mechanism is configured to open the second vent closure in response to the nonoperating condition of the fluid movement system to allow passage of external fluid through the second vent into the interior via the second passage, through the first passage and out of the first enclosure through the first vent.

30. The thermal storage unit of claim 29, wherein the first passage is configured to permit flow of internal heated fluid out of the first enclosure by buoyancy of the internal heated fluid and to permit entry of the external fluid into the first passage as the internal heated fluid flows out of the first enclosure.

Rotating Door.

31. The thermal storage unit of claim 29, wherein the first vent closure and the second vent closure are different portions of a vent door, wherein the thermal storage unit is configured to rotate the vent door to close the first and second vents during the operating condition of the fluid movement system.

Block Input to Steam Generator.

32. The thermal storage unit of claim 30, further comprising:
a steam generator including an input comprising a duct and configured to receive fluid heated by the thermal storage blocks via the duct;
wherein the failsafe mechanism is configured to close the duct in response to the nonoperating condition of the fluid movement system.

Vent Door Used to Block the Steam Generator Input.

33. The thermal storage unit of claim 32, wherein the first vent closure is positioned to close the duct when the first vent closure is open for the first vent.

Open Exterior Input to Steam Generator.

34. The thermal storage unit of claim 32, wherein the second vent forms a passage from the exterior into the input of the steam generator.

Failsafe Passively Draws Fluid Through Dynamic Insulation Passage.

35. The thermal storage unit of claim 33, further comprising:
a second enclosure having an interior surface, wherein the first enclosure is positioned within the second enclosure;
a fluid passage bounded by an exterior surface of the first enclosure and the interior surface and in communication with the fluid pathways;
wherein the fluid movement system, during the operating condition, is configured to direct the stream of fluid through the fluid passage before directing the stream of fluid through the fluid pathways;
wherein the first vent closure defines a portion of the fluid passage in the closed position; and
wherein the open position of the first and second vent closures in the nonoperating condition of the fluid movement system is configured to allow passage of external fluid through the second vent into the interior via the second passage, through the first passage and out of the first enclosure through the first vent.

Passive Fluid Movement Through Inactive Blower.

36. The thermal storage unit of claim 35, wherein the open position of the first and second vent closures in the nonoperating condition of the fluid movement system draws fluid from the exterior through the fluid passage via a nonoperating blower of the fluid movement system.

Door for Outside Enclosure.

37. The thermal storage unit of claim 35, further comprising a third vent having a third vent closure, wherein the third vent is included in the second enclosure and forms a passage between the interior of the second enclosure and its exterior, wherein the failsafe mechanism is configured to open the third vent closure in response to the nonoperating condition of the fluid movement system.

Steam Generator being Positioned Inside Enclosure Helps Keep Leaks Internal, Reducing the Impact of Leaks in the Steam Generator.

38. The thermal storage unit of claim 35, wherein at least a portion of the steam generator that receives heated fluid via the duct is included in the second enclosure.

39. The thermal storage unit of claim 28, wherein the failsafe mechanism is configured to hold the first vent cover in a closed position using electrical power during the operating condition.

Clutch/Gravity Implementation of Failsafe Door Opening Mechanism.

40. The thermal storage unit of claim 39, wherein the failsafe mechanism includes a worm drive gear configured to close the first vent cover and an electrical clutch configured to hold the first vent cover in the closed position, wherein the first vent cover is configured to open due to gravitational force when the electrical clutch is not powered.

Alternative Implementation of Failsafe Mechanism.

41. The thermal storage unit of claim 39, wherein the failsafe mechanism includes an electrical switch and a motor.

Dynamic Insulation—Apparatus

42. A thermal storage unit (4100), including:
a first enclosure having an interior surface;
a thermal storage assemblage comprising a plurality of thermal storage blocks positioned in a second enclosure having an exterior surface, the second enclosure positioned within the first enclosure, wherein the thermal storage blocks include fluid pathways;
a plurality of heater elements positioned within the assemblage and configured to heat the thermal storage blocks; and
a fluid passage bounded by the exterior surface and the interior surface and in communication with the fluid pathways; and
a fluid movement system configured to direct a stream of fluid through the fluid passage and the fluid pathways.

Details on where the Passage Directs Fluid.

43. The thermal storage unit of claim 42, wherein the fluid movement system is configured to direct the stream of fluid upward along a wall of the second enclosure, across a roof of the second enclosure, down along one or more other walls of the second enclosure, then into bottom openings of the fluid pathways of the thermal storage blocks.

Bottom Louvers Control Flow into Stacks.

44. The thermal storage unit of claim 42, further comprising:
louvers configured to independently control flow of fluid from the fluid passage into different sets of fluid pathways.

Failsafe Vents Use Dynamic Insulation Pathway for Failsafe Venting, Improving Safety of the System without Requiring Separate Venting Passages or Powered Mechanisms.

45. The thermal storage unit of claim 42,
wherein the second enclosure includes:
a first vent with a first vent closure, the first vent forming a first passage between an interior of the first enclosure and an exterior, wherein the thermal storage unit is configured to maintain the first vent closure in a closed position during an operating condition of the fluid movement system; and a second vent having a second vent closure and forming a second passage between the interior and the exterior;

wherein the thermal storage unit includes a failsafe mechanism configured to open the first and second vent closures in response to a nonoperating condition of the fluid movement system; and
wherein the open position of the first and second vent closures in the nonoperating condition of the fluid movement system are configured to allow passage of external fluid through the second vent into the interior via the second passage, through the first passage, through the fluid pathways and out of the first enclosure through the first vent.

46. The thermal storage unit of claim 45, wherein the first and second vent closures form a portion of the fluid passage when in the closed position.

Pressure Differential Between Dynamic Insulation Pathway and Stacks Reduces Impact of Internal Leaks.

47. The thermal storage unit of claim 42, wherein the thermal storage unit is configured to operate in one or more states in which fluid pressure in the fluid passage is greater than fluid pressure within the second enclosure.

Source of Fluid for Dynamic Insulation.

48. The thermal storage unit of claim 42, wherein the stream of fluid includes recycled fluid from a steam generator that generates steam using heated fluid from the thermal storage blocks.

Methods Including Radiation Cavities, Dynamic Insulation

49. A method, comprising:
heating a stack of thermal storage blocks in a thermal storage unit (TSU) that includes a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks;
wherein the heating is performed by a plurality of heater elements (3607) positioned within at least some of the thermal storage blocks and adjacent to some of the radiation cavities, via energy radiated into multiple ones of the radiation cavities and onto surfaces that bound the respective radiation cavities within the at least one thermal storage block; and
directing fluid through the TSU such that a stream of fluid passes through the TSU, including through the fluid pathways.

Radiative Transfer in Cavities Improves Heat Distribution Relative to Implementations without Radiation Cavities (e.g., which Might Receive Radiation Along One Wall of a Thermal Storage Brick).

50. The method of claim 49, wherein at least three surfaces of a radiation cavity receive energy radiated from a heater element.

51. The method of claim 50, wherein the fluid flow slots receive radiative energy from the heater element indirectly by reradiation via one or more radiation cavities.

Induced Turbulent Flow in Elongated Slots.

52. The method of claim 49, wherein one or more of the plurality of openings are elongated and shaped to introduce turbulent flow of the fluid directed through the one or more of the plurality of openings.

53. An apparatus, comprising:
a thermal storage unit (TSU) (4100) including a plurality of thermal storage means, wherein at least some of the thermal storage means include multiple radiation cavities and multiple fluid flow slots, wherein some of the radiation cavities and some of the fluid flow slots are configured to define fluid pathways through the thermal storage means;

heater means (3607) positioned within at least some of the thermal storage means and adjacent to some of the radiation cavities, wherein the heater is configured to heat at least one of the thermal storage means via energy radiated into multiple ones of the radiation cavities and onto surfaces that bound the respective radiation cavities within the at least one thermal storage means;

fluid movement means (213, 4223) for directing a stream of fluid through the TSU, including through the fluid pathways.

Radiation Chamber.

54. An apparatus, comprising:

one or more thermal storage blocks that define a radiation chamber and a fluid flow slot positioned above the radiation chamber to define a fluid pathway in a first direction;

a heater element positioned adjacent to the radiation chamber in a second, different direction, wherein the radiation chamber is open on at least one side to the heater element; and a fluid movement system configured to direct a stream of fluid through the fluid pathway in the first direction.

Alternating "Checkerboard" Pattern of Blocks and Radiation Cavities at a Given Tier Facilitates Rapid and Uniform Heat Distribution.

55. A system for thermal energy storage and delivery, including:

a plurality of thermal storage blocks positioned to define:

a first tier that includes an alternating pattern of block portions, with radiation cavities between neighboring block portions;

a second tier that includes an alternating pattern of block portions, with radiation cavities between neighboring block portions, wherein second-tier block portions are positioned adjacent first-tier radiation cavities, and second-tier radiation cavities are positioned adjacent first-tier block portions;

fluid flow slots formed in some of the block portions of the thermal storage blocks, the fluid flow slots and radiation cavities positioned to form multiple fluid flow paths through the system;

a plurality of heating elements positioned adjacent multiple ones of the radiation cavities in the first and second tiers and configured to heat the plurality of thermal storage blocks via energy radiated into multiple ones of the cavities and onto surfaces that bound the radiation respective cavities within the thermal storage blocks; and a blower configured to direct a stream of fluid through the multiple fluid flow paths.

56. The system of claim 55, wherein the heater elements, the storage blocks and the radiation cavities are configured to provide a substantially vertical thermocline wherein an upper portion of the thermal storage assemblage is at a higher temperature than a lower portion of the thermal storage assemblage.

Lead-Lag Process and Deep Discharge to Prevent Thermal Runaway

Deep Discharge.

57. A thermal energy storage system (10) configured to produce an output fluid flow (20), the thermal energy storage system comprising:

a first assemblage (14A) of first thermal storage blocks (13A) and a second assemblage (14B) of second thermal storage blocks (13B), the first and second thermal storage blocks configured to store thermal energy; and a control system (15) configured to:

direct fluid flows during a first discharge period (2067*d*1) such that the first assemblage, but not the second assemblage, is discharged to within a deep-discharge temperature region (2063*r*); and direct fluid flows during a second discharge period (2067*d*2) such that the second assemblage, but not the first assemblage, is discharged to within the deep-discharge temperature region.

58. The thermal energy storage system of claim 57, wherein the control system is configured, during successive discharge periods (2067*d*1, 2067*d*2), to alternate between:

directing fluid flows to discharge the first assemblage, but not the second assemblage, to within the deep-discharge temperature region; and directing fluid flows to discharge the second assemblage, but not the first assemblage, to within the deep-discharge temperature region.

59. The thermal energy storage system of claim 57, wherein the control system is configured to:

maintain the output fluid flow at a specified temperature profile (2065*b*); and in successive discharge periods (2069*bd*1, 2067*bd*2), alternate between:

discharging the first assemblage to within the deep-discharge temperature region while discharging the second assemblage to a current value (2079*b*) of the specified temperature profile (2065*b*); and discharging the second assemblage to within the deep-discharge temperature region while discharging the first assemblage to the current value (2079*ba*) of the specified temperature profile (2065*b*); and 60. The thermal energy storage system of claim 57, wherein the control system is configured to:

maintain the output fluid flow at a specified temperature profile (2065); and in successive discharge periods (2069*cd*1, 2069*cd*2), alternate between:

discharging the first assemblage to within the deep-discharge temperature region while discharging the second assemblage to a first buffer temperature (2085*c*) above the specified temperature profile; and discharging the second assemblage to within the deep-discharge temperature region while discharging the first assemblage to a second buffer temperature (2085*ca*) above the specified temperature profile.

61. The thermal energy storage system of claim 60, wherein the control system is configured to:

maintain the output fluid flow at a specified temperature profile; and in successive discharge periods (2069*d*, 2069*da*), alternate between:

discharging the first assemblage to within the deep-discharge temperature region while 1) discharging the second assemblage to the first buffer temperature (2085*d*) and 2) maintaining fluid flow to the first assemblage in a trickle mode (2089*d*); and discharging the second assemblage to within the deep-discharge temperature region while 1) discharging the first assemblage to the second buffer temperature (2085*da*) and 2) maintaining fluid flow to the second assemblage in the trickle mode (2089*da*).

62. The thermal energy storage system of claim 61, wherein, in the trickle mode, fluid flow to a given assemblage being deeply discharged is greater than 0% and less than 10% of a maximum possible flow to the given assemblage.

63. The thermal energy storage system of claim 57, wherein the control system is configured to:

use a first set of flow parameters during a first discharge period (2069ed1) to maintain the output fluid flow at a first temperature (2090e) specified by a non-constant temperature profile (2065e);
use a second, different set of flow parameters during the first discharge period (2069ed1) to maintain the output fluid flow at a second, different temperature (2091e) specified by the non-constant temperature profile; and
maintain the output fluid flow at second, different temperature during a first charging period (2069ec1) by keeping a first fluid flow for the first assemblage at a relatively constant proportion to a second fluid flow for the second assemblage.

64. The thermal energy storage system of claim 57, further comprising:
an inlet valve configured to admit a bypass fluid flow that bypasses the first and second assemblages during discharge periods, the bypass fluid flow having a bypass temperature that is lower than a delivery temperature of the output fluid flow; and
wherein the control system is configured to use the bypass fluid flow to produce the output fluid flow during discharge periods.

65. The thermal energy storage system of claim 64, wherein discharging a given one of the first or second assemblages to within the deep-discharge temperature region includes cooling the given assemblage to a discharge temperature approximately equal to the bypass temperature.

66. The thermal energy storage system of claim 64, wherein:
an upper end temperature of the deep-discharge temperature region is substantially below a delivery temperature of the output fluid flow; and
a lower end temperature of the deep-discharge temperature region is below the upper end temperature and is equal to the bypass temperature.

67. The thermal energy storage system of claim 64, wherein:
an upper end temperature of the deep-discharge temperature region is closer to the bypass temperature than to the delivery temperature; and
a lower end temperature of the deep-discharge temperature region is below the upper end temperature and is equal to the bypass temperature.

68. The thermal energy storage system of claim 64, wherein:
a midpoint temperature is midway between the bypass temperature and the delivery temperature;
an upper end temperature of the deep-discharge temperature region is closer to the bypass temperature than to the midpoint temperature; and
a lower end temperature of the deep-discharge temperature region is below the upper end temperature and is equal to the bypass temperature.

69. The thermal energy storage system of claim 57, wherein the control system is configured to monitor thermal discharge information for the first and second assemblages in order to determine bounds of the deep-discharge temperature region.

70. The thermal energy storage system of claim 57, wherein the control system is configured to determine bounds of the deep-discharge temperature region based on a computer program that models behavior of the first and second assemblages.

71. The thermal energy storage system of claim 64, wherein the control system is configured to produce the output fluid flow by causing:
mixing, during an initial portion of the first discharge period, of a first fluid flow from the first assemblage with the bypass fluid flow;
mixing, during a subsequent portion of the first discharge period, of the first fluid flow with a second fluid flow from the second assemblage;
mixing, during an initial portion of the second discharge period, of the second fluid with the bypass fluid flow; and
mixing, during a subsequent portion of the second discharge period, of the second fluid flow with first fluid flow.

72. The thermal energy storage system of claim 71, wherein the control system is configured to:
initiate the subsequent portion of the first discharge period based on a current temperature of the first fluid flow falling below the delivery temperature; and
initiate the subsequent portion of the second discharge period based on a current temperature of the second fluid flow falling below the delivery temperature.

73. The thermal energy storage system of claim 57, wherein the control system is configured to maintain the output fluid flow at a constant temperature, including during the first and second discharge periods.

74. The thermal energy storage system of claim 57, wherein the control system is configured to maintain the output fluid flow according to a specified, non-constant temperature profile.

75. The thermal energy storage system of claim 64, wherein the control system is configured to use the bypass fluid flow to cool the first and second assemblages during a charging period.

Alternate Discharging Below Delivery Temperature.

76. A thermal energy storage system configured to produce an output fluid flow, the thermal energy storage system comprising:
a first assemblage of first thermal storage blocks and a second assemblage of second thermal storage blocks, the first and second thermal storage blocks configured to store thermal energy; and
a control system configured to:
direct fluid flows during a first discharge period to perform a first discharge operation in which the first assemblage, but not the second assemblage, is discharged below a delivery temperature of the output fluid flow; and
direct fluid flows during a second, successive discharge period to perform a second discharge operation in which the second assemblage, but not the first assemblage, is discharged below the delivery temperature.

77. The thermal energy storage system of claim 76, wherein the control system is configured to control an inlet valve configured to admit a bypass fluid flow that bypasses the first and second assemblages during discharge periods, the bypass fluid flow having a bypass temperature that is less than the delivery temperature.

78. The thermal energy storage system of claim 77, wherein the control system is configured to:
perform the first discharge operation such that the first assemblage is discharged to a first discharge temperature that is closer to the bypass temperature than to the delivery temperature; and
perform the second discharge operation such that the second assemblage is discharged to a second discharge temperature that is closer to the bypass temperature than to the delivery temperature.

79. The thermal energy storage system of claim 77, wherein the control system is configured to:
perform the first discharge operation such that the first assemblage is discharged to a first discharge temperature that is closer to the bypass temperature than to a midpoint temperature midway between the delivery temperature and the bypass temperature; and
perform the second discharge operation such that the second assemblage is discharged to a second discharge temperature that is closer to the bypass temperature than to the midpoint temperature.

80. The thermal energy storage system of claim 77, wherein the control system is configured to:
perform the first discharge period such that the first assemblage is discharged to a first discharge temperature that is approximately equal to the bypass temperature; and
perform the second discharge period such that the second assemblage is discharged to a second discharge temperature that is approximately equal to the bypass temperature.

81. The thermal energy storage system of claim 78, wherein the control system is configured to cause the first and second discharge operations to be performed alternately in successive discharge periods.

82. The thermal energy storage system of claim 78, wherein the thermal energy storage system is configured to produce the output fluid flow according to a non-constant temperature profile.

83. The thermal energy storage system of claim 78, wherein the control system is configured to:
perform the first discharge operation by discharging the first assemblage below the delivery temperature, and then initiating fluid flow to the first assemblage in a trickle mode; and
perform the second discharge operation by discharging the second assemblage below the delivery temperature, and then initiating fluid flow to the second assemblage in the trickle mode.

Preventing Thermal Runaway by Discharge Operation.

84. A thermal energy storage system, comprising:
a first assemblage of first thermal storage blocks and a second assemblage of second thermal storage blocks, the first and second thermal storage blocks configured to store thermal energy; and
a control system configured to:
direct fluid flows to the first and second assemblages to produce an output fluid flow;
during a first discharge period, perform a first discharge operation by discharging the first assemblage sufficiently to prevent thermal runaway while discharging the second assemblage to at or above a delivery temperature of the output fluid flow; and
during a second, successive discharge period, perform a second discharge operation by discharging the second assemblage sufficiently to prevent thermal runaway while discharging the first assemblage to at or above the delivery temperature.

85. The thermal energy storage system of claim 84, wherein the control system is configured to:
perform the first discharge operation by initiating discharge of the first assemblage at a beginning of the first discharge period and initiating discharge of the second assemblage after a first discharge temperature of a first fluid flow produced by the first assemblage drops below the delivery temperature; and perform the second discharge operation by initiating discharge of the second assemblage at a beginning of the second discharge period and initiating discharge of the first assemblage after a second discharge temperature of a second fluid flow produced by the second assemblage drops below the delivery temperature.

86. The thermal energy storage system of claim 85, wherein the control system is configured to cause the first and second discharge operations to be performed alternately in successive discharge periods.

87. The thermal energy storage system of claim 85, wherein the control system is configured to perform the first and second discharge operations by initiating a fluid flow to a given assemblage in a trickle mode after discharging the given assemblage to prevent thermal runaway.

Deep Discharge with Bypass Fluid Flow During First and Second Discharge Periods.

88. A thermal energy storage system configured to produce an output fluid flow, the thermal energy storage system comprising:
a first assemblage of first thermal storage blocks and a second assemblage of second thermal storage blocks, the first and second thermal storage blocks configured to store thermal energy; and
a control system configured to:
cause, during a first portion of a first discharge period, a first fluid flow produced from the first assemblage to be mixed with a bypass fluid flow that bypasses the first and second assemblages;
cause, during a second, subsequent portion of the first discharge period, the first fluid flow to be mixed with a second fluid flow produced from the second assemblage, such that the first assemblage, but not the second assemblage, is deeply discharged during the first discharge period;
cause, during a first portion of a second discharge period, the second fluid flow to be mixed with the bypass fluid flow; and
cause, during a second, subsequent portion of the second discharge period, the second fluid flow to be mixed with the first fluid flow such that the second assemblage, but not the first assemblage, is deeply discharged during the second discharge period.

89. The thermal energy storage system of claim 88, wherein the control system is configured to alternate, in successive discharge periods, between:
deeply discharging the first assemblage but not the second assemblage; and
deeply discharging the second assemblage but not the first assemblage.

90. The thermal energy storage system of claim 89, wherein the control system is configured to initiate a fluid flow to a given one of the first and second assemblage in a trickle mode after deeply discharging the given assemblage.

Method of Deep Discharge.

91. A method, comprising:
receiving, by a thermal energy storage system that includes a first assemblage of first thermal storage blocks and a second assemblage of second thermal storage blocks, input energy from a renewable energy source;
using, by the thermal energy storage system, the input energy to create thermal energy that is stored in the first and second thermal storage blocks;
directing, by the thermal energy storage system, fluid flows to create an output fluid flow that is continuous over one or more periods of unavailability of the renewable energy source by:

performing, in a first discharge period, a first discharge operation that deeply discharges the first assemblage, but not the second assemblage; and performing, in a second discharge period, a second discharge operation that deeply discharges the second assemblage, but not the first assemblage.

92. The method of claim 91, wherein the fluid flows include a first flow produced from the first assemblage, a second flow produced from the second assemblage, and a bypass flow produced that bypasses the first and second assemblages during discharge periods, the bypass flow having a bypass temperature that is lower than a delivery temperature of the output fluid flow.

93. The method of claim 92, wherein deeply discharging a given one of the first and second assemblages includes discharging to a discharge temperature that is closer to the bypass temperature than the delivery temperature.

94. The method of claim 92, wherein deeply discharging a given one of the first and second assemblages includes discharging to a discharge temperature that is closer to the bypass temperature than to a midpoint temperature midway between the delivery temperature and the bypass temperature.

95. The method of claim 92, wherein deeply discharging a given one of the first and second assemblages includes discharging to a discharge temperature that is approximately equal to the bypass temperature.

96. The method of claim 92, wherein deeply discharging a given one of the first and second assemblages during a given discharge period includes:

initiating discharge of the given assemblage at a beginning of the given discharge period; and initiating discharge of the other one of the first and second assemblages after a discharge temperature of a given fluid flow produced by the given assemblage drops below the delivery temperature; and continuing discharge of the given assemblage after initiating discharge of the other assemblage.

97. The method of claim 92, wherein deeply discharging a given one of the first and second assemblages constitutes discharging the given assemblage to a discharge temperature that is no higher than 25° C. above than the bypass temperature.

98. The method of claim 92, wherein deeply discharging a given one of the first and second assemblages constitutes discharging the given assemblage to a discharge temperature that is no higher than 50° C. above the bypass temperature.

99. The method of claim 92, wherein deeply discharging a given one of the first and second assemblages constitutes discharging the given assemblage to a discharge temperature that is no higher than 75° C. above than the bypass temperature.

100. The method of claim 92, wherein deeply discharging a given one of the first and second assemblages constitutes discharging the given assemblage to a discharge temperature that is no higher than 100° C. above than the bypass temperature.

101. The method of claim 92, wherein deeply discharging a given one of the first and second assemblages constitutes discharging the given assemblage to a discharge temperature that is no higher than 150° C. above than the bypass temperature.

102. The method of claim 92, wherein deeply discharging a given one of the first and second assemblages constitutes discharging the given assemblage to a discharge temperature that is no higher than 200° C. above than the bypass temperature.

103. The method of claim 93, wherein performing the first discharge operation includes discharging the second assemblage to the delivery temperature, and wherein performing the second discharge operation includes discharging the first assemblage to the delivery temperature.

104. The method of claim 93, wherein performing the first discharge operation includes discharging the second assemblage to a first buffer temperature above the delivery temperature, and wherein performing the second discharge operation includes discharging the first assemblage to a second buffer temperature that is above the delivery temperature.

105. The method of claim 93, wherein performing the first discharge operation includes initiating fluid flow to the first assemblage in a trickle mode after deeply discharging the first assemblage, and wherein performing the second discharge operation includes initiating fluid flow to the second assemblage in the trickle mode after deeply discharging the second assemblage.

106. The method of claim 105, wherein fluid flow in the trickle mode for a given assemblage is greater than 0% and no more than 10% of a maximum fluid flow for the given assemblage.

107. The method of claim 92, further comprising changing flow rates for the first flow, the second flow, and the bypass flow to account for a change in the delivery temperature.

108. The method of claim 92, further comprising using the bypass flow to cool the first and second assemblages at a latter portion of a charging period.

109. The method of claim 93, further comprising:

alternating, in successive discharge periods, between performing the first discharge operation and the second discharge operation.

Method with Discharge Temperature Closer to Bypass Temperature than to Delivery Temperature.

110. A method, comprising:

receiving, by a thermal energy storage system that includes a first assemblage of first thermal storage blocks and a second assemblage of second thermal storage blocks, input energy from a renewable energy source;

using, by the thermal energy storage system, the input energy to create thermal energy that is stored in the first and second thermal storage blocks;

directing, by the thermal energy storage system, fluid flows to create an output fluid flow, the fluid flows including a first fluid flow produced from the first assemblage, a second fluid flow produced from the second assemblage, and a bypass fluid flow that bypasses the first and second assemblages during discharge periods, the bypass fluid flow having a bypass temperature that is lower than a delivery temperature of the output fluid flow;

discharging, during a first discharge period, the first assemblage, but not the second assemblage, to a first discharge temperature that is closer to the bypass temperature than to the delivery temperature; and discharging, during a second discharge period, the second assemblage, but not the first assemblage, to a second discharge temperature that is closer to the bypass temperature than the delivery temperature.

111. The method of claim 110, wherein the first and second discharge temperatures are closer to the bypass temperature than to a temperature midpoint that is midway between the bypass temperature and the delivery temperature.

112. The method of claim 110, wherein the first and second discharge temperatures are approximately equal to the bypass temperature.

113. The method of claim 110, wherein discharging the first assemblage during the first discharge period includes initiating fluid flow to the first assemblage in a trickle mode after discharging the first assemblage to the first discharge temperature; and wherein discharging the second assemblage during the second discharge period includes initiating fluid flow to the second assemblage in the trickle mode after discharging the second assemblage to the second discharge temperature.

Method with Discharge to Reduce Thermal Runaway.

114. A method, comprising:
receiving, by a thermal energy storage system that includes a first assemblage of first thermal storage blocks and a second assemblage of second thermal storage blocks, input energy from a renewable energy source;
using, by the thermal energy storage system, the input energy to create thermal energy that is stored in the first and second thermal storage blocks;
controlling fluid flows to the first and second assemblages to produce an output fluid flow at temperatures within a selected temperature range, wherein the controlling causes:
during a first discharge period, discharging the first assemblage in a manner sufficient to reduce thermal runaway in the first thermal storage blocks while discharging the second assemblage to a temperature at or above the selected temperature range; and
during a second, successive discharge period, discharging the second assemblage in a manner sufficient to reduce thermal runaway in the second thermal storage blocks while discharging the first assemblage to a temperature at or above the selected temperature range.

115. The method of claim 114, wherein discharging the first assemblage during the first discharge period includes initiating fluid flow to the first assemblage in a trickle mode after deeply discharging the first assemblage, and wherein discharging the second assemblage during the second discharge period includes initiating fluid flow to the second assemblage in the trickle mode after deeply discharging the second assemblage.

116. The method of claim 114, wherein discharging the first and second assemblages to reduce thermal runaway is performed based on measured thermal data for the first and second assemblages.

117. The method of claim 114, wherein discharging the first and second assemblages to reduce thermal runaway is performed based on a modeling of thermal data for the first and second assemblages.

System with a Given Stack Discharge Temperature Closer to Bypass Temperature than to Delivery Temperature and Lower than Other Stack's Discharge Temperature.

118. A thermal energy storage system configured to produce an output fluid flow having a delivery temperature, the thermal energy storage system comprising:
a first assemblage of first thermal storage blocks and a second assemblage of second thermal storage blocks, the first and second thermal storage blocks configured to store thermal energy; and
an inlet valve;
a control system configured to:

cause the inlet valve to admit a bypass fluid flow that bypasses the first and second assemblages, the bypass fluid flow having a bypass temperature that is lower than the delivery temperature;
during a first discharge period, perform a first discharge operation in which the first assemblage is discharged to a first discharge temperature that is (a) closer to the bypass temperature than to the delivery temperature, and (b) lower than a second discharge temperature of the second assemblage; and
during a second, successive discharge period, perform a second discharge operation in which the second assemblage is discharged to a third discharge temperature that is (a) closer to the bypass temperature than to the delivery temperature and (b) lower than a fourth discharge temperature of the first assemblage.

119. The thermal energy storage system of claim 118, wherein the control system is configured to alternate between performing the first discharge operation and the second discharge operation in successive discharge periods.

120. The thermal energy storage system of claim 119, wherein the second and fourth discharge temperatures of the first and second discharge periods, respectively, correspond to the delivery temperature.

121. The thermal energy storage system of claim 119, wherein the second discharge temperature corresponds to a first buffer temperature above the specified delivery temperature, and wherein the fourth discharge temperature corresponds to a second buffer temperature above the specified delivery temperature.

122. The thermal energy storage system of claim 121, wherein:
the first discharge operation further includes maintaining a first trickle fluid flow to the first assemblage after discharging the first assemblage to the first discharge temperature; and
the second discharge operation further includes maintaining a second trickle fluid flow to the second assemblage after discharging the second assemblage to the second discharge temperature.

123. The thermal energy storage system of claim 122, wherein:
the first trickle fluid flow is less than 10% of a maximum fluid flow for the first assemblage; and
the second trickle fluid flow is less than 10% of a maximum fluid flow for the second assemblage.

124. The thermal energy storage system of claim 118, wherein the first discharge temperature and the second discharge temperature are closer to the bypass temperature than to a temperature midpoint that is midway between the bypass temperature and the delivery temperature.

System with Deep Discharge to Reduce Temperature Nonuniformities.

125. A thermal energy storage system, comprising:
one or more assemblages of thermal storage blocks, wherein each assemblage is configured to store heat generated from received electrical energy as thermal energy; and
a control system configured to:
direct fluid flows to the one or more assemblages to produce an output fluid flow, and
cause each of the one or more assemblages to be periodically deeply discharged to reduce temperature nonuniformities within the one or more assemblages.

126. The thermal energy storage system of claim 125, wherein the one or more assemblages is made up of a single assemblage, and wherein the control system is configured to cause the single assemblage to periodically be deeply discharged on an as-needed basis.

127. The thermal energy storage system of claim 125, wherein the one or more assemblages is made up of a single assemblage, and wherein the control system is configured to cause the single assemblage to periodically be deeply discharged at regularly occurring intervals.

128. The thermal energy storage system of claim 125, wherein the one or more assemblages are a plurality of N assemblages, and wherein the control system is configured to cause each of the N assemblages to be deeply discharged once every N discharge periods.

129. The thermal energy storage system of claim 125, wherein the output fluid flow has a specified temperature profile, wherein the one or more assemblages are a plurality of N assemblages, and wherein the control system is configured to cause each of the N assemblages to be deeply discharged at least once every N discharge periods and partially discharged to a current value of the specified temperature profile at least once every N discharge periods.

130. The thermal energy storage system of claim 125, wherein the one or more assemblages includes a first assemblage and a second assemblage, and wherein the control system is configured to alternate, in successive discharge periods, between:
  deeply discharging the first assemblage and partially discharging the second assemblage to a current value of the specified temperature profile; and
  deeply discharging the second assemblage and partially discharging the first assemblage to the current value of the specified temperature profile.

131. The thermal energy storage system of claim 125, wherein the control system is configured to open an inlet valve to admit a bypass fluid flow that is mixed with other fluid flows to produce the output fluid flow, the output fluid flow having a delivery temperature and the bypass fluid flow having a bypass temperature, and wherein the one or more assemblages are deeply discharged to be closer to the bypass temperature than to the delivery temperature.

132. The thermal energy storage system of claim 125, wherein the control system is configured to provide supply a trickle fluid flow to a given assemblage after the given assemblage has been deeply discharged.

Method with Deep Discharge to Reduce Temperature Nonuniformities.

133. A method, comprising:
  receiving, at a thermal storage structure, input electrical energy from a renewable energy source;
  using, by thermal storage structure, the received input electrical energy to heat heating elements within one or more assemblages of thermal storage blocks;
  directing fluid flows to the one or more assemblages to produce an output fluid flow having a delivery temperature; and
  deeply discharging each of the one or more assemblages periodically to reduce temperature nonuniformities.

134. The method of claim 133, wherein the one or more assemblages comprise a plurality of N assemblages, and wherein each of the N assemblages is deeply discharged once every N discharge periods.

135. The method of claim 134, wherein each of the N assemblages is deeply discharged at least once every N discharge periods and partially discharged at least once every N discharge periods.

136. The method of claim 133, wherein the one or more assemblages include a first assemblage and a second assemblage, and wherein the method further comprises alternating, in successive discharge periods, between:
  deeply discharging the first assemblage and partially discharging the second assemblage; and
  deeply discharging the second assemblage and partially discharging the first assemblage.

137. The method of claim 136, wherein the partially discharging constitutes discharging to the delivery temperature of the output fluid flow.

138. The method of claim 133, wherein the fluid flows include flows from each of the one or more assemblages and a bypass fluid flow from an inlet valve that bypasses the one or more assemblages during discharge periods, the bypass fluid flow having a bypass temperature that is lower than the delivery temperature.

139. The method of claim 138, wherein the one or more assemblages are deeply discharged to discharge temperatures that are closer to the bypass temperature than to the delivery temperature.

140. The method of claim 138, wherein the one or more assemblages are deeply discharged to discharge temperatures that are closer to the bypass temperature than to a temperature midpoint that is midway between the bypass temperature and the delivery temperature.

141. The method of claim 136, further comprising causing a trickle fluid flow to be provided to a given assemblage during a discharge period after the given assemblage has been deeply discharged.

142. The method of claim 138, wherein deeply discharging a given assemblage constitutes discharging to temperatures that are no higher than 25° C. above than the bypass temperature.

143. The method of claim 138, wherein deeply discharging a given assemblage constitutes discharging to temperatures that are no higher than 50° C. above than the bypass temperature.

144. The method of claim 138, wherein deeply discharging a given assemblage constitutes discharging to temperatures that are no higher than 75° C. above than the bypass temperature.

145. The method of claim 138, wherein deeply discharging a given assemblage constitutes discharging to temperatures that are no higher than 100° C. above than the bypass temperature.

146. The method of claim 138, wherein deeply discharging a given assemblage constitutes discharging to temperatures that are no higher than 150° C. above than the bypass temperature.

147. The method of claim 138, wherein deeply discharging a given assemblage constitutes discharging to temperatures that are no higher than 200° C. above than the bypass temperature.

Thermal Energy Storage System Including Steam Generator with Feedback Control. The System Allows Control of the Temperature and Flow Rate of Heated Fluid, and Hence the Amount of Heat Delivered to the Steam Generator, Allowing the Steam Quality to be Precisely Controlled Using Feedback.

148. A thermal energy storage system, comprising:
  a storage medium (14, 209) configured to store thermal energy obtained using an input energy supply from an energy source (2, 201);
  a fluid movement device (213, 4223) configured to move fluid through the storage medium and discharge the stored thermal energy from the storage medium into the fluid;

a once-through steam generator (1419) configured to receive the fluid (20) from the storage medium and to exchange heat from the fluid with water from a water source to produce steam; and a control system (15, 1502) configured to
measure a value indicating steam quality of the steam; and
based on the measured value, control a flow rate of the fluid received by the steam generator.

149. The thermal energy storage system of claim 148, further comprising one or more instruments configured to detect the value indicating steam quality of the steam, and wherein the control system is configured to measure the value by interfacing with the instruments.

150. The thermal energy storage system of claim 148, wherein the one or more instruments are configured to detect an inlet flow velocity of water at an inlet of the steam generator and an outlet flow velocity of steam at an outlet of the steam generator.

151. The thermal energy storage system of claim 149, further comprising a vapor-liquid separator configured to separate the steam into a liquid component and a vapor component, and wherein the one or more instruments are configured to detect a liquid component heat value and a vapor component heat value.

152. The thermal energy storage system of claim 148, wherein the control system is configured to measure an inlet flow velocity of water at an inlet of the steam generator and an outlet flow velocity of steam at an outlet of the steam generator.

153. The thermal energy storage system of claim 148, further comprising a vapor-liquid separator configured to separate the steam into a liquid component and a vapor component, and wherein the control system is configured to measure a liquid component heat value and a vapor component heat value.

154. The thermal energy storage system of claim 148, further comprising an adjustable fluid restricting device, and wherein the control system is configured to send control signals to the adjustable fluid restricting device based on the measured value.

155. The thermal energy storage system of claim 154, wherein the adjustable fluid restricting device comprises a louver.

156. The thermal energy storage system of claim 154, wherein the adjustable fluid restricting device comprises a valve.

157. The thermal energy storage system of claim 148, wherein, if the measured value of steam quality indicates a decrease in steam quality, the control system is configured to increase a flow rate of the fluid.

The Control of Flow Rate and Temperature Provided by the Thermal Energy Storage System Allows Control of Output Steam Parameters Using Flow Rate.

158. The thermal energy storage system of claim 148, wherein the control system is configured to:
prior to measuring the value indicating steam quality, receive a target steam parameter;
obtain an inlet water temperature at an inlet of the steam generator; and
based on the target steam parameter and the inlet temperature, determine an initial flow rate for the fluid received by the steam generator.

159. The thermal energy storage system of claim 158, wherein the target steam parameter comprises a target steam quality.

160. The thermal energy storage system of claim 158, wherein the target steam parameter comprises a target steam delivery rate.

161. The thermal energy storage system of claim 158, wherein the controller is configured to obtain the inlet water temperature by measuring the inlet water temperature.

162. The thermal energy storage system of claim 148, wherein the steam generator comprises a once-through steam generator.

163. The thermal energy storage system of claim 148, wherein the energy source is a source of intermittent availability.

164. The thermal energy storage system of claim 148, wherein the energy source comprises a solar energy source.

165. The thermal energy storage system of claim 148, wherein the energy source comprises a wind-powered energy source.

Thermal Energy Storage System Method of Operation Controls the Temperature and Flow Rate of Heated Fluid, and Therefore the Amount of Heat Delivered to the Steam Generator, Allowing the Steam Quality to be Precisely Controlled Using Feedback.

166. A method of storing and delivering thermal energy, comprising:
receiving input energy from an energy source (2, 201);
storing thermal energy obtained using the input energy in a storage medium (14, 209);
moving fluid through the storage medium to heat the fluid;
delivering the heated fluid (20) to a once-through steam generator (1419) configured to generate steam by exchanging heat from the fluid with water from a water source;
obtaining a steam quality value of the steam; and
based on the steam quality value, providing a feedback signal for adjusting a rate of delivering the heated fluid to the steam generator.

167. The method of claim 166, wherein obtaining the steam quality value comprises:
separating the steam into liquid phase and vapor phase components; and
independently monitoring heat of the liquid phase and vapor phase components.

168. The method of claim 166, wherein obtaining the steam quality value comprises:
measuring an outlet flow velocity of the steam at an outlet of the steam generator; and
measuring an inlet flow velocity of the water at an inlet of the steam generator.

169. The method of claim 166, wherein providing a feedback signal comprises providing the signal to a controllable element is configured to adjust a flow rate of the fluid through the storage medium.

170. The method of claim 169, wherein the controllable element comprises a louver.

171. The method of claim 169, wherein the controllable element comprises a valve.

Control of Flow Rate and Temperature Provides Control of Output Steam Parameters on a Feedforward Basis.

172. The method of claim 166, further comprising, prior to obtaining the steam quality value of the steam:
receiving a target parameter for the steam;
obtaining an inlet water temperature at an inlet of the steam generator; and
based on the target steam parameter and the inlet temperature, determining an initial rate for delivering the heated fluid to the steam generator.

173. The method of claim 172, wherein receiving a target parameter comprises receiving a target steam quality.

174. The method of claim 172, wherein receiving a target parameter comprises receiving a target steam delivery rate.

175. The method of claim 172, wherein obtaining an inlet water temperature comprises measuring the inlet water temperature.

Control of Steam Quality Using Flow Rate from Thermal Storage.

176. The method of claim 166, wherein the steam generator comprises a once-through steam generator.

177. The method of claim 166, wherein the energy source is a source of intermittent availability.

178. The method of claim 166, wherein the energy source comprises a solar energy source.

179. The method of claim 166, wherein the energy source comprises a wind-powered energy source.

System Configured to Control Flow Rate and Temperature to Control Output Steam Parameters on a Feed Forward Basis.

180. A thermal energy storage system, comprising:
a storage medium (14, 209) configured to store thermal energy obtained using an input energy supply from an energy source (2, 201);
a fluid movement device (213, 4223) configured to move fluid through the storage medium and discharge the stored thermal energy from the storage medium into the fluid;
a steam generator (1419) configured to receive the fluid (20) from the storage medium and to exchange heat from the fluid with water from a water source to produce steam; and
a control system (15, 1502) configured to
receive a target steam parameter,
obtain an inlet water temperature at an inlet of the steam generator; and
based on the target steam parameter and the inlet temperature, determine an initial flow rate for the fluid received by the steam generator.

181. The thermal energy storage system of claim 180, wherein the target steam parameter comprises a target steam quality.

182. The thermal energy storage system of claim 180, wherein the target steam parameter comprises a target steam delivery rate.

183. The thermal energy storage system of claim 180, wherein the controller is configured to obtain the inlet water temperature by measuring the inlet water temperature.

System Configured Control Temperature and Flow Rate of Heated Fluid, and Therefore the Amount of Heat Delivered to the Steam Generator, Allowing the Steam Quality to be Precisely Controlled Using Feedback.

184. The thermal energy storage system of claim 180, wherein the control system is configured to:
measure a value indicating steam quality of the steam; and
based on the measured value, control an ongoing flow rate of the fluid received by the steam generator.

185. The thermal energy storage system of claim 184, further comprising one or more instruments configured to detect the value indicating steam quality of the steam, and wherein the control system is configured to measure the value by interfacing with the instruments.

186. The thermal energy storage system of claim 185, wherein the one or more instruments are configured to detect an inlet flow velocity of water at an inlet of the steam generator and an outlet flow velocity of steam at an outlet of the steam generator.

187. The thermal energy storage system of claim 185, further comprising a vapor-liquid separator configured to separate the steam into a liquid component and a vapor component, and wherein the control system is configured to measure a liquid component heat value and a vapor component heat value.

188. The thermal energy storage system of claim 184, further comprising an adjustable fluid restricting device, and wherein the control system is configured to send a control signal to the adjustable fluid restricting device based on the measured value.

189. The thermal energy storage system of claim 188, wherein the adjustable fluid restricting device comprises a louver.

190. The thermal energy storage system of claim 188, wherein the adjustable fluid restricting device comprises a valve.

191. The thermal energy storage system of claim 180, wherein the steam generator comprises a once-through steam generator.

192. The thermal energy storage system of claim 180, wherein the energy source is a source of intermittent availability.

193. The thermal energy storage system of claim 180, wherein the energy source comprises a solar energy source.

194. The thermal energy storage system of claim 180, wherein the energy source comprises a wind-powered energy source.

195. A method of storing and delivering thermal energy, comprising:
receiving input energy from an energy source (2, 201);
storing thermal energy obtained using the input energy in a storage medium (14, 209);
moving fluid through the storage medium to heat the fluid;
delivering the heated fluid (20) to steam generator (1419) configured to generate steam by exchanging heat from the fluid with water from a water source;
receiving a target parameter for the steam;
obtaining an inlet water temperature at an inlet of the steam generator; and
based on the target steam parameter and the inlet temperature, determining an initial rate for delivering the heated fluid to the steam generator.

196. The method of claim 195, wherein receiving a target parameter comprises receiving a target steam quality.

197. The method of claim 195, wherein receiving a target parameter comprises receiving a target steam delivery rate.

198. The method of claim 195, wherein obtaining the inlet water temperature comprises measuring the inlet water temperature.

199. The method of claim 195, further comprising, subsequent to determining the initial rate:
obtaining a steam quality value of the steam; and
based on the steam quality value, providing a feedback signal for adjusting an ongoing rate of delivering the heated fluid to the steam generator.

200. The method of claim 199, wherein obtaining a steam quality value comprises:
separating the steam into liquid phase and vapor phase components; and
independently monitoring heat of the liquid phase and vapor phase components.

201. The method of claim 199, wherein obtaining a steam quality value comprises:
measuring an outlet flow velocity of the steam at an outlet of the steam generator; and measuring an inlet flow velocity of the water at an inlet of the steam generator.

202. The method of claim 199, wherein providing a feedback signal comprises providing the signal to a controllable element configured to adjust a flow rate of the fluid through the storage medium.

203. The method of claim 202, wherein the controllable element comprises a louver.

204. The method of claim 202, wherein the controllable element comprises a valve.

205. The method of claim 195, wherein the steam generator comprises a once-through steam generator.

206. The method of claim 195, wherein the energy source is a source of intermittent availability.

207. The method of claim 195, wherein the energy source comprises a solar energy source.

208. The method of claim 195, wherein the energy source comprises a wind-powered energy source.

System Combining the Outputs of Two Thermal Storage Mediums while Separately Controlling Flow Through them Allows a Specified Output Property of the Delivered Fluid to be Maintained.

209. A thermal energy storage system, comprising:
a first storage medium (14, 209) configured to store thermal energy obtained using an input energy supply from an energy source (2, 201);
a second storage medium (14, 209) configured to store thermal energy obtained using the input energy supply;
a fluid movement device (213, 4223) configured to move fluid through the first and second storage mediums to heat the fluid and provide the heated fluid (20) to a load system (22); and
a control system (15, 1502) configured to separately control movement of the fluid through the first and second storage mediums to maintain a specified property of the heated fluid.

210. The thermal energy storage system of claim 209, wherein the specified property comprises a temperature of the heated fluid.

211. The thermal energy storage system of claim 209, wherein the specified property comprises a thermal energy of the heated fluid.

212. The thermal energy storage system of claim 209, wherein the specified property comprises a flow rate of the heated fluid.

213. The thermal energy storage system of claim 209, further comprising:
a first adjustable fluid restricting device configured to adjust a rate of fluid flow through the first storage medium; and
a second adjustable fluid restricting device configured to adjust a rate of fluid flow through the second storage medium.

214. The thermal energy storage system of claim 213, wherein the control system is configured to separately send control signals to the first and second adjustable fluid restricting devices.

215. The thermal energy storage system of claim 213, wherein the first and second adjustable fluid restricting devices comprise louvers.

216. The thermal energy storage system of claim 213, wherein the first and second adjustable fluid restricting devices comprise valves.

217. The thermal energy storage system of claim 209, wherein the load system comprises a steam generator.

218. The thermal energy storage system of claim 217, wherein the steam generator comprises a once-through steam generator.

219. The thermal energy storage system of claim 209, wherein the load system comprises an electrolysis reactor.

220. The thermal energy storage system of claim 209, wherein the load system comprises a material activation system.

221. The thermal energy storage system of claim 220, wherein the material activation system comprises a calciner.

222. The thermal energy storage system of claim 209, wherein the energy source is a source of intermittent availability.

223. The thermal energy storage system of claim 209, wherein the energy source comprises a solar energy source.

224. The thermal energy storage system of claim 209, wherein the energy source comprises a wind-powered energy source.

Method Combining the Outputs of Two Thermal Storage Mediums while Separately Controlling Flow Through them Allows a Specified Output Property of the Delivered Fluid to be Maintained.

225. A method of storing and delivering thermal energy, comprising
receiving input energy from an energy source (2, 201);
storing thermal energy obtained using the input energy in a first storage medium (14, 209) and a second storage medium (14, 209);
moving fluid through the first and second storage mediums to heat the fluid;
delivering the heated fluid (20) to a load system (22); and
separately controlling flow rates of the fluid through the first and second storage mediums to maintain a specified property of the heated fluid.

226. The method of claim 225, wherein the specified property comprises a temperature of the heated fluid.

227. The method of claim 225, wherein the specified property comprises a thermal energy of the heated fluid.

228. The method of claim 225, wherein the specified property comprises a flow rate of the heated fluid.

229. The method of claim 225, wherein separately controlling flow rates of the fluid through the first and second storage mediums comprises sending separate control signals to first and second adjustable fluid restricting devices associated with the first and second storage mediums, respectively.

230. The method of claim 229, wherein the first and second adjustable fluid restricting devices comprise louvers.

231. The method of claim 229, wherein the first and second adjustable fluid restricting devices comprise valves.

232. The method of claim 225, wherein the load system comprises a steam generator.

233. The method of claim 232, wherein the steam generator comprises a once-through steam generator.

234. The method of claim 225, wherein the load system comprises an electrolysis system.

235. The method of claim 234, wherein the load system comprises a material activation system.

236. The method of claim 235, wherein the material activation system comprises a calciner.

237. The method of claim 225, wherein the energy source is a source of intermittent availability.

238. The method of claim 225, wherein the energy source comprises a solar energy source.

239. The method of claim 225, wherein the energy source comprises a wind-powered energy source.

Use of Forecast Information Regarding Energy Source Availability Allows the System to Adjust its Received Energy, Helping to Maintain Consistent Operation.

240. A thermal energy storage system, comprising:
a storage medium (14, 209) configured to store thermal energy obtained using input energy from an energy source (2, 201);
a fluid movement device (213, 4223) configured to move fluid through the storage medium to heat the fluid and provide the heated fluid (20) to a load system (22); and
a control system (15, 1502) configured to:
receive forecast information regarding availability of the energy source; and
based on the forecast information, control a heated fluid discharge rate.

241. The thermal energy storage system of claim 240, wherein the control system is configured to communicate with an energy source control system.

242. The thermal energy storage system of claim 241, wherein the control system is configured to send to the energy source control system a request or instruction to reduce an amount of input energy supplied by the source when the forecast information indicates an increase in availability of the energy source.

243. The thermal energy storage system of claim 241, wherein the control system is configured to send to the energy source control system a request or instruction to transfer excess energy to an available power grid when the forecast information indicates an increase in availability of the energy source.

244. The thermal energy storage system of claim 241, wherein the control system is configured to send to the energy source control system a request or instruction to curtail a portion of the energy source's production when the forecast information indicates an increase in availability of the energy source.

245. The thermal energy storage system of claim 240, wherein the control system is configured to connect to an available power grid to obtain additional input energy when the forecast information indicates a decrease in availability of the energy source.

246. The thermal energy storage system of claim 240, wherein the control system is configured to connect to an alternate energy source when the forecast information indicates a decrease in availability of the energy source.

247. The thermal energy storage system of claim 240, wherein the control system is configured to receive the forecast information from an energy source control system.

248. The thermal energy storage system of claim 240, wherein the control system is configured to receive the forecast information from an analytics system external to the control system.

249. The thermal energy storage system of claim 240, wherein the energy source is a source of intermittent availability.

250. The thermal energy storage system of claim 240, wherein the energy source comprises a solar energy source.

251. The thermal energy storage system of claim 240, wherein the energy source comprises a wind-powered energy source.

Use of Forecast Information Regarding Energy Source Availability Allows the System to Adjust its Received Energy, Helping to Maintain Consistent Operation.

252. A method of storing and delivering thermal energy, comprising:
receiving input energy from an energy source (2, 201);
storing in a storage medium (14, 209) thermal energy obtained using the input energy;
moving fluid through the storage medium to heat the fluid for delivery to a load system (22);
receiving forecast information regarding availability of the energy source; and
based on the forecast information, controlling a heated fluid discharge rate.

253. The method of claim 252, wherein altering the amount of input energy comprises communicating with a control system for the energy source.

254. The method of claim 253, wherein communicating with the control system for the energy source comprises sending a request or instruction to reduce an amount of input energy supplied by the source when the forecast information indicates an increase in availability of the energy source.

255. The method of claim 253, wherein communicating with the control system for the energy source comprises sending a request or instruction to transfer excess energy to an available power grid when the forecast information indicates an increase in availability of the energy source.

256. The method of claim 253, wherein communicating with the control system for the energy source comprises sending a request or instruction to curtail a portion of the energy source's production when the forecast information indicates an increase in availability of the energy source.

257. The method of claim 252, wherein altering the amount of input energy comprises connecting to an available power grid to obtain additional input energy when the forecast information indicates a decrease in availability of the energy source.

258. The method of claim 252, wherein altering the amount of input energy comprises connecting to an alternate energy source when the forecast information indicates a decrease in availability of the energy source.

259. The method of claim 252, wherein receiving forecast information comprises receiving information from a control system of the energy source.

260. The method of claim 252, wherein receiving forecast information comprises receiving information from an analytics system.

261. The method of claim 250, wherein the energy source is a source of intermittent availability.

262. The method of claim 252, wherein the energy source comprises a solar energy source and/or a wind-powered energy source.

Use of Forecast Information Regarding Energy Source Availability Allows the System to Adjust an Operating Parameter, which can Help to Maintain Consistent Operation and Improve System Reliability and Component Lifetime (e.g., when Excess Energy is Available so that Heating Element Temperatures can be Reduced).

263. A thermal energy storage system, comprising:
a storage medium (14, 209) configured to store thermal energy obtained using input energy from an energy source (2, 201);
a fluid movement device configured to move fluid through the storage medium to heat the fluid and provide the heated fluid (20) to a load system (22); and
a control system (15, 1502) configured to
receive forecast information regarding availability of the energy source, and
based on the forecast information, adjust an operating parameter of the thermal energy storage system.

264. The thermal energy storage system of claim 263, wherein the input energy is electrical energy, and further comprising a heating element configured to convert a portion of the input energy to a portion of the thermal energy.

Supercharging the Thermal Storage Medium Allows the Specified Output Temperature or Energy of the System to be Maintained Through a Period of Lower Energy Source Availability.

265. The thermal energy storage system of claim 264, wherein the control system is configured to operate the heating element at an increased electrical power level during a period of availability of the energy source, when the forecast information indicates an upcoming reduction in availability of the energy source.

Reduced Heater Power Level when Power is Expected to be Available for a Longer Time than Normal Allows Reliable Output to be Maintained while Reducing Stress on the Heating Elements and Storage Medium.

266. The thermal energy storage system of claim 264, wherein the control system is configured to operate the heating element at a decreased electrical power level during a period of availability of the energy source, when the forecast information indicates an upcoming increase in availability of the energy source.

267. The thermal energy storage system of claim 263, further comprising an auxiliary heater system configured to heat at least a portion of the fluid at a location outside of the storage medium, wherein the control system is configured to direct excess input energy to the auxiliary heater system during a period of energy availability.

When a High Amount of Input Energy is Forecast, Using Excess Energy to Heat the Fluid Using an Auxiliary Heater while Reducing the Thermal Energy in the Storage Medium May Reduce Wear and Tear on the Storage Medium and its Heating Elements.

268. The thermal energy storage system of claim 267, wherein the forecast information indicates an upcoming increase in availability of the energy source and the control system is configured to reduce an amount of thermal energy stored in the storage medium commensurately with an increase in thermal energy provided by the auxiliary heater system.

When a Low Amount of Input Energy is Forecast, Using the Auxiliary Heater May Allow a Delay in when the Thermal Storage Will Need to be Discharged, which Helps to Provide Continuous Power During the Low Input Energy Period.

269. The thermal energy storage system of claim 267, wherein the forecast information indicates an upcoming decrease in availability of the energy source and the control system is configured to maintain or increase an amount of thermal energy stored in the storage medium during the period of energy availability.

270. The thermal energy storage system of claim 267, wherein the auxiliary heater system comprises a heater positioned along a bypass line configured to convey a portion of the fluid to the load system without passing the portion through the storage medium.

271. The thermal energy storage system of claim 267, wherein the auxiliary heater system comprises a heater positioned along an outlet line between an outlet of the storage medium and an inlet of the load system.

272. The thermal energy storage system of claim 263, wherein the control system is configured to adjust a flow rate of the fluid through the storage medium based on the forecast information.

273. The thermal energy storage system of claim 263, wherein the control system is configured to reduce a flow rate of the fluid through the storage medium when the forecast information indicates an upcoming decrease in availability of the energy source.

274. The thermal energy storage system of claim 263, wherein the control system is configured to receive the forecast information from an energy source control system.

275. The thermal energy storage system of claim 263, wherein the control system is configured to receive the forecast information from an analytics system external to the control system.

276. The thermal energy storage system of claim 263, wherein the forecast information relates to relative time periods of energy source availability and unavailability.

277. The thermal energy storage system of claim 263, wherein the forecast information relates to a relative magnitude of energy available from the energy source.

278. The thermal energy storage system of claim 263, wherein the energy source is a source of intermittent availability.

279. The thermal energy storage system of claim 263, wherein the energy source comprises a solar energy source.

280. The thermal energy storage system of claim 263, wherein the energy source comprises a wind-powered energy source.

Use of Forecast Information Regarding Energy Source Availability Allows the System to Adjust an Operating Parameter, which can Help to Maintain Consistent Operation and in Some Cases Improve System Reliability and Component Lifetime (e.g., when Excess Energy is Available so that Heating Element Temperatures can be Reduced).

281. A method of storing and delivering thermal energy, comprising:
receiving input energy from an energy source (2, 201);
storing in a storage medium (14, 209) thermal energy obtained using the input energy;
moving fluid through the storage medium to heat the fluid for delivery to a load system (22);
receiving forecast information regarding availability of the energy source; and
based on the forecast information, adjusting an operating parameter associated with moving the fluid through the storage medium.

Supercharging the Thermal Storage Medium Allows the Specified Output Temperature or Energy of the System to be Maintained Through a Period of Lower Energy Source Availability.

282. The method of claim 281, wherein adjusting an operating parameter comprises, during a period of availability of the energy source when the forecast information indicates an upcoming reduction in availability of the energy source, operating at an increased electrical power level a heating element associated with the storage medium.

Reduced Heater Power Level when a High Amount or Duration Input Energy is Forecast to be Available Allows the Same Output to be Maintained while Reducing Stress on the Heating Element and Storage Medium.

283. The method of claim 281, wherein adjusting an operating parameter comprises, during a period of availability of the energy source when the forecast information indicates an upcoming increase in availability of the energy source, operating at a decreased electrical power level a heating element associated with the storage medium.

284. The method of claim 281, wherein adjusting an operating parameter comprises, during a period of energy source availability, directing excess energy to an auxiliary heater system configured to heat at least a portion of the fluid at a location outside of the storage medium.

When a High Amount of Input Energy is Forecast, Using Excess Energy to Heat the Fluid Using an Auxiliary Heater while Reducing the Thermal Energy in the Storage Medium May Reduce Wear and Tear on the Storage Medium and its Heating Elements.

285. The method of claim 284, wherein adjusting an operating parameter comprises, when the forecast indicates an upcoming increase in availability of the energy source, reducing an amount of thermal energy stored in the storage medium commensurately with an increase in thermal energy provided by the auxiliary heater system.

When a Low Amount of Input Energy is Forecast, Using the Auxiliary Heater May Allow a Delay in when the Thermal Storage Will Need to be Discharged, which Helps to Provide Continuous Power During the Low Input Energy Period.

286. The method of claim 284, wherein adjusting an operating parameter comprises, when the forecast indicates an upcoming decrease in availability of the energy source, controlling a heated fluid discharge rate to maintain energy output over a determined period of time.

287. The method of claim 284, wherein the auxiliary heater system comprises a heater positioned along a bypass line configured to convey a portion of the fluid to the load system without passing the portion through the storage medium.

288. The method of claim 284, wherein the auxiliary heater system comprises a heater positioned along an outlet line between an outlet of the storage medium and an inlet of the load system.

289. The method of claim 281, wherein adjusting the operating parameter comprises adjusting a flow rate of the fluid through the storage medium based on the forecast information.

290. The method of claim 281, wherein adjusting the operating parameter comprises reducing a flow rate of the fluid through the storage medium when the forecast information indicates an upcoming decrease in availability of the energy source.

291. The method of claim 281, wherein receiving forecast information comprises receiving the forecast information from an energy source control system.

292. The method of claim 281, wherein receiving forecast information comprises receiving the forecast information from an analytics system.

293. The method of claim 281, wherein the forecast information relates to relative time periods of energy source availability and unavailability.

294. The method of claim 281, wherein the forecast information relates to a relative magnitude of energy available from the energy source.

295. The method of claim 281, wherein the energy source is a source of intermittent availability.

296. The method of claim 281, wherein the energy source comprises a solar energy source.

297. The method of claim 281, wherein the energy source comprises a wind-powered energy source.

DC-DC Conversion Systems and Methods

DC-DC Conversion Allows for a Lower-Loss Method of Power Transmission than Conventional AC Power Transfer Due to Smaller Eddy Currents and Lower Resistances in the System as the Power Generated by the Generator Circuits Varies in Time.

298. A thermal storage system, including:
a thermal storage medium (3111);
a heating element (3112) positioned to heat the thermal storage medium; and
a power transfer system (3103A-C, 3101, 3102), comprising:
a plurality of generator circuits (3103A-C) configured to generate a plurality of time-varying direct current (DC) voltages;
a first converter circuit (3101) that includes a plurality of first converter circuits (3203A-C), each first converter circuit including:
a first input circuit (3401) configured to receive one of the time-varying DC voltages, and a first output circuit (3419) galvanically isolated from the input circuit and configured to generate a first corresponding DC voltage derived from the time-varying DC voltage received by the first input circuit, wherein the first converter circuit is configured to combine the first corresponding DC voltages of the first output circuits to generate a transmit voltage and drive a transmission line; and
a second converter circuit (3102) that includes a plurality of second converter circuits, each second converter circuit including:
a second input circuit (3401) configured to receive a portion of the transmit voltage, and a second output circuit (3419) galvanically isolated from the second input circuit and configured to generate a second corresponding DC voltage derived from the portion of the transmit voltage received by the second input circuit; and
a common power bus (3105) coupled to the second output circuits and to the heating element;
wherein the second converter circuit is configured to deliver the second corresponding DC voltages of the second output circuits to the heating element via the common power bus.

299. The thermal storage system of claim 298, wherein each first converter circuit further includes a transformer, and wherein the first input circuit is further configured to induce, using the time-varying DC voltage received by the first input circuit, a first current in a primary coil of the transformer, and wherein the first output circuit is further configured to generate the first corresponding DC voltage using a second current induced in a secondary coil of the transformer.

300. The thermal storage system of claim 299, wherein to generate the first corresponding DC voltage, the first output circuit is further configured to:
rectify the second current to generate an internal supply voltage; and
generate the first corresponding DC voltage using the internal supply voltage.

301. The thermal storage system of claim 298, wherein the plurality of generator circuits includes a plurality of photovoltaic cells configured to generate the plurality of time-varying DC voltages based on an illumination of the photovoltaic cells.

Power Transfer System: Maintains the Voltage Across any One of the Converter Circuits Smaller, Allowing for Smaller and Less Expensive Components; Allows for the Creation of a Larger Transmission Voltage without Using a Traditional Step-Up Transformer which could Create Additional Power Transfer Losses; and Prevents the Draw of Excessive Current from the Generator Circuits by the Power Transfer System.

302. A power transfer system, comprising:
a plurality of generator circuits (3103A-C) configured to generate a plurality of time-varying direct current (DC) voltages;

a first converter circuit (3101) that includes a plurality of first converter circuits (3203A-C), each first converter circuit including:

a first input circuit (3401) configured to receive one of the time-varying DC voltages, and a first output circuit (3419) galvanically isolated from the input circuit and configured to generate a first corresponding DC voltage derived from the time-varying DC voltage received by the first input circuit, wherein the first converter circuit is configured to combine the first corresponding DC voltages of the first output circuits to generate a transmit voltage and drive a transmission line (3106); and a second converter circuit (3102) that includes a plurality of second converter circuits, each second converter circuit including:

a second input circuit (3401) configured to receive a portion of the transmit voltage, and a second output circuit (3419) galvanically isolated from the second input circuit and configured to generate a second corresponding DC voltage derived from the portion of the transmit voltage received by the second input circuit, wherein the second converter circuit is configured to deliver the second corresponding DC voltages of the second output circuits on a common power bus; and a load (3104) coupled to the common power bus.

303. The power transfer system of claim 302, wherein each first converter circuit further includes a transformer, and wherein the first input circuit is further configured to induce, using the time-varying DC voltage received by the first input circuit, a first current in a primary coil of the transformer, and wherein the first output circuit is further configured to generate the first corresponding DC voltage using a second current induced in a secondary coil of the transformer.

304. The power transfer system of claim 303, wherein to generate the first corresponding DC voltage, the first output circuit is further configured to:

rectify the second current to generate an internal supply voltage; and generate the first corresponding DC voltage using the internal supply voltage.

305. The power transfer system of claim 302, wherein the load includes a heating element configured to receive the second corresponding DC voltages via the common power bus to heat a thermal storage medium.

306. The power transfer system of claim 305, wherein the load includes an electric vehicle charger configured to charge at least one battery using the second corresponding DC voltages.

Apparatus Allows for the Creation of a Larger Transmission Voltage without Using a Traditional Step-Up Transformer which could Create Additional Power Transfer Losses, and Prevents the Draw of Excessive Current from the Generator Circuits by the Power Transfer System.

307. An apparatus, comprising:
a first plurality of converter circuits (3203A-C), each converter circuit including:
an input circuit (3401) configured to receive a direct current (DC) input voltage from a renewable energy source; and
an output circuit (3419) galvanically isolated from the input circuit and configured to generate a DC output voltage derived from the DC input voltage;
wherein the output circuits of the first plurality of converter circuits are coupled in series to combine respective DC output voltages to produce a transmit voltage; and a thermal storage unit (3104) including a heating element (3112) configured to receive the transmit voltage to heat a thermal storage medium (3111).

308. The apparatus of claim 307, wherein each converter circuit further includes a transformer, and wherein the input circuit is further configured to induce, using the DC input voltage, a first current in a primary coil of the transformer, and wherein the output circuit is further configured to generate the DC output voltage using a second current induced in a secondary coil of the transformer.

309. The apparatus of claim 308, wherein to generate the DC output voltage using the second current, the output circuit is further configured to:

rectify the second current to generate an internal supply voltage; and generate the DC output voltage using the internal supply voltage.

310. The apparatus of claim 307, wherein the renewable energy source includes a plurality of photovoltaic cells configured to generate the DC input voltage based on an illumination of the photovoltaic cells.

Method Allows for the Creation of a Larger Transmission Voltage without Using a Traditional Step-Up Transformer which could Create Additional Power Transfer Losses, and Prevents the Draw of Excessive Current from the Generator Circuits by the Power Transfer System.

311. A method, comprising:

receiving, by an input circuit (3401) of a given converter circuit of a plurality of converter circuits (3203A-C), a direct current (DC) input voltage from a renewable energy source (3202A-C);

generating, by an output circuit (3419) of the given circuit that is galvanically isolated from the input circuit, a DC output voltage derived from the DC input voltage;

combining respective DC output voltages by coupling the output circuits of the first plurality of converter circuits in series to produce a transmit voltage (3108); and heating a thermal storage medium (3104) by a heating element (3112) using the transmit voltage.

312. The method of claim 311, further comprising adding the second plurality of DC voltages to generate the transmit voltage.

313. The method of claim 311, wherein generating the DC output voltage includes:

inducing, by the input circuit using the DC input voltage, a first current in a primary coil of a transformer included in the given converter circuit; and generating, by the output circuit using a second current in a secondary coil of the transformer, the DC output voltage, wherein the second current in the secondary coil is based on the first current in the primary coil of the transformer.

314. The method of claim 313, further comprising:

rectifying, by the output circuit, the second current to generate an internal supply voltage; and generating, by the output circuit, the DC output voltage using the internal supply voltage.

Apparatus: Maintains the Voltage Across any One of the Converter Circuits Smaller, Allowing for Smaller and Less Expensive Components; Allows for the Creation of a Larger Transmission Voltage without Using a Traditional Step-Up Transformer which could Create Additional Power Transfer Losses; and Prevents the Draw of Excessive Current from the Generator Circuits by the Power Transfer System.

315. An apparatus, comprising:
a plurality of first converter circuits (3203A-C), each first converter circuit including:

a first input circuit (3401) configured to receive a direct current (DC) input voltage from a renewable energy source; and a first output circuit (3419) galvanically isolated from the first input circuit and configured to generate a DC output voltage derived from the DC input voltage, wherein the output circuits of the first plurality of converter circuits are coupled in series to combine respective DC output voltages to produce a transmit voltage;

a plurality of second converter circuits (3302A-C) coupled in series across the transmit voltage to generate a plurality of voltage portions, wherein each second converter circuit includes:

a second input circuit (3401) configured to receive a corresponding portion of the plurality of voltage portions; and a second output circuit (3419) galvanically isolated from the second input circuit and configured to generate, using the corresponding portion, a DC load voltage; and a thermal storage unit (3104) configured to heat a thermal storage medium (3111) using respective DC load voltages from the second plurality of converter circuits.

316. The apparatus of claim 315, wherein each first converter circuit further includes a transformer, and wherein the first input circuit is further configured to induce, using the DC input voltage, a first current in a primary coil of the transformer, and wherein the first output circuit is further configured to generate the DC output voltage using a second current induced in a secondary coil of the transformer.

317. The apparatus of claim 316, wherein to generate the DC output voltage, the first output circuit is further configured to:

rectify the second current to generate an internal supply voltage; and generate the DC output voltage using the internal supply voltage.

318. The apparatus of claim 315, wherein the renewable energy source includes a plurality of photovoltaic cells configured to generate the DC input voltage based on an illumination of the photovoltaic cells.

Apparatus Allows for the Creation of a Larger Transmission Voltage without Using a Traditional Step-Up Transformer which could Create Additional Power Transfer Losses, and Prevents the Draw of Excessive Current from the Generator Circuits by the Power Transfer System.

319. An apparatus, comprising:
a first plurality of converter circuits (3202A-C), each converter circuit including:
a first input circuit (3401) configured to receive a direct current (DC) input voltage from a DC voltage source; and
a first output circuit (3419) galvanically isolated from the first input circuit and configured to generate a DC output voltage based on the DC input voltage; and
wherein the first plurality of converter circuits are coupled in series such that the DC output voltages are combined to produce a transmit voltage (3108).

320. The apparatus of claim 319, further comprising a load unit including an electric vehicle charger configured to charge at least one battery using the transmit voltage.

321. The apparatus of claim 320, further comprising:
a second plurality of converter circuits (3302A-C) coupled in series across the transmit voltage, wherein each of the second plurality of converter circuits includes:
a second input circuit (3401) configured to receive a corresponding portion the transmit voltage; and a second output circuit (3419) galvanically isolated from the second input circuit and configured to generate, using the corresponding portion of the transmit voltage, a DC load voltage; and a load unit (3306A-B) including an electric vehicle charger configured to charge at least one battery (3208) using at least one of the plurality of DC load voltages.

Calcination Systems and Methods
Calcium Carbonate Calcination.

322. A calcination system, comprising:
a thermal energy storage (TES) system configured to store thermal energy derived from a renewable energy source, wherein the TES system includes:
a heating element configured to heat a storage medium using electricity from the renewable energy source; and
a blower configured to heat a non-combustive fluid including carbon dioxide by circulating the non-combustive fluid through the heated storage medium;
the calcination system further comprising a calciner configured to release carbon dioxide from a supply of calcium carbonate within the calciner, by:
receiving thermal energy obtained from the heated non-combustive fluid; and
applying the received thermal energy to the calcium carbonate.

323. The calcination system of claim 322, wherein the calciner is configured to apply the received thermal energy by:
injecting calcium carbonate via a first inlet of the calciner; and
injecting, via a second inlet underneath the first inlet, the heated non-combustive fluid in an up-flow configuration that suspends the injected calcium carbonate within the calciner.

324. The calcination system of claim 322, further comprising:
a heat exchanger configured to:
heat a second fluid by transferring thermal energy from the heated non-combustive fluid into the second fluid; and
wherein the calciner is configured to apply the received thermal energy by:
injecting the heated second fluid into the calciner to heat the calcium carbonate.

325. The calcination system of claim 322, further comprising:
a recirculation system configured to:
recover, from the calciner, carbon dioxide produced by the calcination process; and
recirculate the recovered carbon dioxide to the TES system for inclusion in the non-combustive fluid.

326. The calcination system of claim 322, further comprising:
a pre-heater configured to:
receive additional thermal energy obtain from the heated non-combustive fluid;
apply the additional thermal energy to heat calcium carbonate to a first temperature; and
provide the heated calcium carbonate to the calciner for heating to a second temperature that is higher than the first temperature.

Material Activation System.

327. A material activation system, comprising:
a thermal energy storage (TES) system configured to store thermal energy derived from an energy source, by:

heating a storage medium using energy from the renewable energy source; and
circulating a non-combustive fluid through the heated storage medium; and
a material heating system configured to:
receive thermal energy derived from the circulated non-combustive fluid; and
apply the received thermal energy to a raw material to produce an activated material.

328. The material activation system of claim 327, wherein the material heating system is configured to:
receive the circulated non-combustive fluid at a first inlet in the material heating system;
inject the raw material via a second inlet positioned above the first inlet in the material heating system; and
direct the fluid in an up-flow configuration such that the raw material is suspended in the material heating system.

329. The material activation system of claim 327, further comprising:
a heat exchanger configured to:
receive the circulated non-combustive fluid from the TES system;
transfer heat from the circulated non-combustive fluid into a second fluid; and
provide the heated second fluid to the material heating system for applying the thermal energy to the raw material.

330. The material activation system of claim 329, further comprising:
a bypass configured to inject a portion of the circulated non-combustive fluid received from the TES system into the second fluid provided to the material heating system.

331. The material activation system of claim 327, further comprising:
a pre-heater configured to:
apply thermal energy derived from the circulated non-combustive fluid to heat the raw material to a first temperature; and
provide the heated raw material as an input to the material heating system for heating to a second temperature.

332. The material activation system of claim 327, further comprising:
a recirculation system configured to:
recirculate an exhaust fluid output from the material heating system to the TES system as an input.

333. The material activation system of claim 332, further comprising:
a cooling cyclone configured to:
receive the activated material from the material heating system; and
reduce a temperature of the activated material; and
wherein the recirculation system is configured to:
collect, from the cooling cyclone, the exhaust fluid for recirculation.

334. The material activation system of claim 333, wherein the recirculation system includes:
a filter coupled between the material heating system and the TES system, wherein the filter is configured to remove particulate from the exhaust fluid prior to the exhaust fluid being provided to the TES system.

335. The material activation system of claim 327, wherein the material heating system is configured to perform a calcination process that transforms calcium carbonate as the raw material into calcium oxide as the activated material for cement production.

336. The material activation system of claim 335, further comprising a recirculation system configured to recirculate carbon dioxide produced by the calcination process to the TES system for use as the non-combustive fluid.

337. The material activation system of claim 327, wherein the material heating system is configured to perform a dehydroxylation process that removes hydroxide from clay minerals as the raw material to produce activated clay as the activated material.

338. The material activation system of claim 337, further comprising:
an atmosphere reduction system coupled to the material heating system and configured to reduce an amount of oxygen in contact with the activated clay.

339. The material activation system of claim 327, wherein the material heating system is configured to implement a Bayer process that transforms bauxite as the raw material to produce aluminum oxide as the activated material.

340. The material activation system of claim 339, wherein the material heating system is configured to:
Implement a first stage of the Bayer process that includes heating the bauxite to a temperature within a range from 300° C. to 480° C. and at a first pressure within a range of 6 bar to 8 bar;
implement a second stage of the Bayer process that includes elevating a temperature of the bauxite within a temperature range from 750° C. to 950° C. and a second pressure lower than the first pressure; and
recirculate, from the second stage to the first stage, the thermal energy derived from the circulated non-combustive fluid.

341. The material activation system of claim 327, further comprising:
a burner configured to supply combustion energy to the material heating system in addition to the thermal energy supplied by the TES system.

342. The material activation system of claim 327, further comprising:
a steam cycle system that includes:
a heat exchanger configured to produce steam from thermal energy recovered from the material heating system; and
a stream turbine configured to generate electricity from the produced steam.

343. The material activation system of claim 327, wherein the TES system is configured to:
provide the circulated non-combustive fluid to the material heating system at a temperate within a range of from 600° C. to 1100° C.

344. The material activation system of claim 327, wherein the non-combustive fluid is carbon dioxide.

345. The material activation system of claim 327, wherein the storage medium includes brick.

346. The material activation system of claim 327, wherein the heating element includes one or more ceramic resistive heaters.

Method of Material Activation.

347. A method for material activation, comprising:
receiving, by a thermal energy storage (TES) system of a material activation system, energy supplied by an energy source;
storing, by the TES system, the received energy as thermal energy by heating a storage medium with the received energy;

providing, by the TES system to a material heating system of the material activation system, the stored thermal energy by circulating a non-combustive fluid through the heated storage medium; and implementing, by the material heating system, a material activation process that includes applying the provided thermal energy to a raw material to produce an activated material.

348. The method of claim 347, further comprising:

recovering, by the material activation system, thermal energy from an output of material heating system; and recirculating, to the TES system, a fluid including the recovered thermal energy.

349. The method of claim 347, wherein the martial activation process produces calcium oxide and carbon dioxide from calcium carbonate; and wherein the method further comprises:
recirculating, by the material activation system, the carbon dioxide to the TES system for use as the non-combustive fluid.

350. The method of claim 347, wherein the martial activation process produces activated clay and hydroxide from clay minerals; and wherein the method further comprises:
reducing, by an atmosphere reduction zone of the material activation system, an amount of oxygen in contact with the activated clay.

Material Activation System.

351. A material activation system, comprising:
a non-combustive means for heating a storage medium using energy from a variable energy source;
a means for transferring thermal energy from the storage medium to a fluid; and
a means for applying the transferred thermal energy from the fluid to a raw material to produce an activated material.

Calcination System.

352. A calcination system, comprising:
a thermal energy storage (TES) system configured to store thermal energy derived from an energy source, wherein the TES system includes:
a heating element configured to heat a storage medium using electricity from the energy source; and
a blower configured to heat a non-combustive fluid by circulating the non-combustive fluid through the heated storage medium;
the calcination system further comprising a calciner configured to remove carbon dioxide from a supply of calcium carbonate within the calciner, by:
receiving thermal energy obtained from the heated non-combustive fluid; and
applying the received thermal energy to the calcium carbonate.

System Using Thermal Energy Storage Discharge for a Solid Oxide Electrolysis System to Efficiently Produce Hydrogen from Electrolysis of Water.

353. A system, comprising:
a thermal energy storage (TES) system (4801) configured to store thermal energy derived from a renewable energy source (4903), wherein the TES system includes:
a storage medium configured to store thermal energy; and
a heating element configured to heat the storage medium using electricity from the renewable energy source; and
a fluid movement system (213, 4223) configured to move a fluid through the storage medium to heat the fluid to a temperature in a specified temperature range; and an electrolysis system (4803), wherein the electrolysis system includes:
a plurality of solid oxide cells (4803) configured to electrolyze water to produce hydrogen when an electric potential is provided to the solid oxide cells; and
a sweep path across the solid oxide cells, wherein the sweep path is configured to circulate the fluid from the fluid movement system to transfer heat to the solid oxide cells.

354. The system of claim 353, wherein the fluid comprises a mixture of oxygen and nitrogen.

355. The system of claim 353, wherein the fluid has a volume percentage of oxygen that is above 25% and below 60%.

356. The system of claim 353, wherein a volume percentage of hydrogen in a product fluid produced by electrolysis is greater than a volume percentage of hydrogen in the water provided to the solid oxide cells.

357. The system of claim 353, wherein the water provided to the solid oxide cells comprises water and hydrogen.

358. The system of claim 353, wherein the water comprises at least 90% water.

359. The system of claim 353, wherein the specified temperature range is 800° C. to 900° C.

360. The system of claim 353, wherein the water is at a temperature below the temperature of the fluid but above 800° C.

361. The system of claim 353, wherein the fluid has a flow rate of at least 1500 kg/hr.

362. The system of claim 353, wherein the fluid has a flow rate between 1500 kg/hr and 2000 kg/hr.

363. The system of claim 353, wherein hydrogen produced by electrolysis is at a temperature above a temperature of the water.

364. The system of claim 353, wherein the electric potential provided to the solid oxide cells is between 1 volt and 3 volts.

365. The system of claim 353, wherein the fluid provides an amount of heat sufficient to maintain electrolysis of water in the solid oxide cells.

366. The system of claim 353, further comprising a steam generator (4805) configured to condense the hydrogen and generate steam by exchanging heat from the hydrogen with water.

367. The system of claim 353, wherein at least some of the steam generated by the steam generator (4805) is configured to be recirculated to the solid oxide cells.

368. The system of claim 367, wherein the recirculated fluid includes at least some hydrogen gas.

369. The system of claim 368, wherein at least some of the condensed hydrogen is configured to be stored.

370. The system of claim 353, wherein the fluid is enriched with at least some of oxygen produced by the electrolysis of water in the solid oxide cells.

371. The system of claim 370, wherein the oxygen enriched fluid has a volume percentage of oxygen above the volume percentage of oxygen in the fluid.

372. The system of claim 370, wherein a temperature of the hydrogen is near a temperature of the oxygen enriched fluid.

373. The system of claim 370, wherein the oxygen enriched fluid includes oxygen and nitrogen.

374. The system of claim 370, wherein a temperature of the oxygen enriched fluid is between a temperature of the water and a temperature of the fluid.

375. The system of claim 370, wherein the oxygen enriched fluid is provided to the thermal energy storage system.

376. The system of claim 370, further comprising a steam generator (4807) configured to generate steam by exchanging heat from the oxygen enriched fluid with water.

377. The system of claim 353, wherein the water comprises water and carbon dioxide.

378. The system of claim 377, wherein the water and carbon dioxide is configured to be converted to carbon monoxide and hydrogen by electrolysis in the solid oxide cells.

379. The system of claim 378, further comprising a syngas conversion system (4109) configured to produce a synthetic hydrocarbon fluid from the produced hydrogen and carbon monoxide.

Method Using Thermal Energy Storage Discharge for a Solid Oxide Electrolysis System to Efficiently Produce Hydrogen from Electrolysis of Water.

380. A method, comprising:
heating a storage medium using heating elements that convert electricity from a renewable energy source (4903) to heat;
circulating a fluid through the storage medium to heat the fluid to a temperature in a specified temperature range;
circulating the fluid across a plurality of solid oxide cells (4803);
providing water to the solid oxide cells (4803); and
providing an electric potential to the solid oxide cells (4803) to electrolyze the water and generate hydrogen.

381. The method of claim 380, wherein the fluid comprises a mixture of oxygen and nitrogen.

382. The method of claim 380, wherein the fluid has a volume percentage of oxygen that is above 25% and below 60%.

383. The method of claim 380, wherein a volume percentage of hydrogen in a product fluid produced by electrolysis is greater than a volume percentage of hydrogen in the water provided to the solid oxide cells.

384. The method of claim 380, wherein the water provided to the solid oxide cells comprises water and hydrogen.

385. The method of claim 380, wherein the water comprises at least 90% water.

386. The method of claim 380, wherein the specified temperature range is 800° C. to 900° C.

387. The method of claim 380, wherein the water is at a temperature below the temperature of the fluid but above 800° C.

388. The method of claim 380, wherein the fluid has a flow rate of at least 1500 kg/hr.

389. The method of claim 380, wherein the fluid has a flow rate between 1500 kg/hr and 2000 kg/hr.

390. The method of claim 380, wherein hydrogen produced by electrolysis is at a temperature above a temperature of the water.

391. The method of claim 380, wherein the electric potential provided to the solid oxide cells is between 1 volt and 3 volts.

392. The method of claim 380, wherein the fluid provides an amount of heat sufficient to maintain electrolysis of water in the solid oxide cells.

393. The method of claim 380, further comprising providing the hydrogen to a steam generator (4805) to condense the hydrogen and generate steam by exchanging heat from the hydrogen with water.

394. The method of claim 393, further comprising adding a recirculated fluid to the water provided to the solid oxide cells, wherein the recirculated fluid includes at least some of the steam generated by the steam generator.

395. The method of claim 394, wherein the recirculated fluid includes at least some hydrogen gas.

396. The method of claim 393, further comprising storing at least some of the condensed hydrogen.

397. The method of claim 380, wherein the electrolysis of water produces oxygen, and wherein the fluid is enriched with at least some of the produced oxygen.

398. The method of claim 397, wherein a temperature of the hydrogen is near a temperature of the oxygen enriched fluid.

399. The method of claim 397, wherein the oxygen enriched fluid has a volume percentage of oxygen above the volume percentage of oxygen in the fluid.

400. The method of claim 397, wherein the oxygen enriched fluid includes oxygen and nitrogen.

401. The method of claim 397, wherein a temperature of the oxygen enriched fluid is between a temperature of the water and a temperature of the fluid.

402. The method of claim 397, further comprising providing the oxygen enriched fluid to the thermal energy storage system, and:
implementing the oxygen enriched fluid in continued operation of the thermal energy storage system; or
implementing the oxygen enriched fluid in the conversion of the input electricity to stored thermal energy.

403. The method of claim 397, further comprising providing the oxygen enriched fluid to a steam generator (4807) to generate steam by exchanging heat from the oxygen enriched fluid with water.

404. The method of claim 380, wherein the water provided to the solid oxide cells comprises water and carbon dioxide.

405. The method of claim 404, wherein the water and carbon dioxide is converted to carbon monoxide and hydrogen by electrolysis in the solid oxide cells.

406. The method of claim 405, further comprising providing the hydrogen and carbon monoxide to a syngas conversion system (4109) to produce a synthetic hydrocarbon fluid.

System Using Stored Thermal Energy in a Fuel Cell System to Convert Hydrogen to Electricity and Water.

407. A system, comprising:
a thermal energy storage (TES) system (5001) configured to store thermal energy derived from a renewable energy source (4903), wherein the TES system includes:
a storage medium configured to store thermal energy; and
a heating element configured to heat the storage medium using electricity from the renewable energy source; and
a fluid movement system (213, 4223) configured to move a fluid through the storage medium to heat the fluid to a temperature in a specified temperature range; and
a fuel cell system (5007), wherein the fuel cell system includes:
a plurality of solid oxide cells (5007) configured to generate electricity and water when hydrogen is provided to the solid oxide cells; and
a sweep path across the solid oxide cells (5007), wherein the sweep path is configured to circulate the fluid from the fluid movement system to remove heat from the solid oxide cells.

408. The system of claim 407, wherein the fluid comprises a mixture of oxygen and nitrogen.

409. The system of claim 407, wherein the fluid has a volume percentage of oxygen that is above 25% and below 60%.

410. The system of claim 407, wherein the specified temperature range is 600° C. and 700° C.

411. The system of claim 407, wherein the fluid has a flow rate of at least 1500 kg/hr.

412. The system of claim 407, wherein the fluid has a flow rate between 1500 kg/hr and 2000 kg/hr.

413. The system of claim 407, further comprising a heat exchanger (5013) configured to heat hydrogen fed to the solid oxide cells with the fluid.

414. The system of claim 407, wherein the hydrogen provided to the solid oxide cells includes at least some steam.

415. The system of claim 407, wherein the fluid is configured to maintain a temperature of the solid oxide cells.

416. The system of claim 407, wherein the electricity generated is direct current electricity.

417. The system of claim 407, wherein at least a portion of the residual hydrogen from the solid oxide cells is configured to be recirculated to the solid oxide cells.

418. The system of claim 407, wherein at least a portion of the fluid that sweeps through the solid oxide cells is provided to the TES system.

Method Using Stored Thermal Energy in a Fuel Cell System to Convert Hydrogen to Electricity and Water.

419. A method, comprising:
heating a storage medium using heating elements that convert electricity from a renewable energy source (4903) to heat;
circulating a fluid through the storage medium to heat the fluid to a temperature in a specified temperature range;
circulating the fluid across a plurality of solid oxide cells (5007);
providing hydrogen to the solid oxide cells (5007); and
generating electricity and water from the solid oxide cells (5007).

420. The method of claim 419, wherein the fluid comprises a mixture of oxygen and nitrogen.

421. The method of claim 419, wherein the fluid has a volume percentage of oxygen that is above 25% and below 60%.

422. The method of claim 419, wherein the specified temperature range is 600° C. and 700° C.

423. The method of claim 419, wherein the fluid has a flow rate of at least 1500 kg/hr.

424. The method of claim 419, wherein the fluid has a flow rate between 1500 kg/hr and 2000 kg/hr.

425. The method of claim 419, further comprising heating hydrogen fed to the solid oxide cells with the fluid in a heat exchanger (5013).

426. The method of claim 419, further comprising adding steam to the hydrogen provided to the solid oxide cells.

427. The method of claim 419, wherein the fluid removes heat from the solid oxide cells.

428. The method of claim 419, wherein the electricity generated is direct current electricity.

429. The method of claim 419, further comprising recirculating at least a portion of the residual hydrogen produced from the solid oxide cells to the solid oxide cells.

430. The method of claim 419, further comprising providing at least a portion of the fluid that sweeps through the solid oxide cells to the storage medium.

System in which Solid Oxide Cells are Reversible to be Used for Either Electrolysis or Fuel Cell Operations, Allowing Fluid to be Constantly Provided to the Cells to Maintain the Cells at Elevated Temperatures while Switching Between Modes of Operation.

431. A system, comprising:
a thermal energy storage (TES) system (4801) configured to store thermal energy derived from a renewable energy source (4903), wherein the TES system includes:
a storage medium configured to store thermal energy; and
a heating element configured to heat the storage medium using electricity from the renewable energy source; and
a fluid movement system (213, 4223) configured to move a fluid through the storage medium to heat the fluid to a temperature in a specified temperature range; and
a plurality of solid oxide cells (4803), wherein the solid oxide cells are configured to:
electrolyze water to produce hydrogen when an electric potential is provided to the solid oxide cells;
generate electricity and water when hydrogen is provided to the solid oxide cells; and
a sweep path across the solid oxide cells, wherein the sweep path is configured to circulate the fluid from the fluid movement system to transfer heat between the fluid and the solid oxide cells.

432. The system of claim 431, wherein the fluid has a volume percentage of oxygen that is above 25% and below 60%.

433. The system of claim 431, wherein a volume percentage of hydrogen in a product fluid produced by electrolysis is greater than a volume percentage of hydrogen in the water provided to the solid oxide cells.

434. The system of claim 431, wherein the water provided to the solid oxide cells comprises water and hydrogen.

435. The system of claim 431, wherein the water for electrolysis comprises at least 90% water.

436. The system of claim 431, wherein the specified temperature range is 800° C. to 900° C.

437. The system of claim 431, wherein the specified temperature range is 600° C. and 700° C.

438. The system of claim 431, wherein the water for electrolysis reaction is at a temperature below the temperature of the fluid but above 800° C.

439. The system of claim 431, wherein the fluid has a flow rate of at least 1500 kg/hr.

440. The system of claim 431, wherein the fluid has a flow rate between 1500 kg/hr and 2000 kg/hr.

441. The system of claim 431, wherein hydrogen produced by electrolysis is at a temperature above a temperature of the water for electrolysis.

442. The system of claim 431, wherein the electric potential provided to the solid oxide cells for electrolysis is between 1 volt and 3 volts.

443. The system of claim 431, wherein the fluid provides an amount of heat sufficient to maintain electrolysis of water in the solid oxide cells.

444. The system of claim 431, wherein the electrolysis of water produces oxygen, and wherein the fluid is enriched with at least some of the produced oxygen.

445. The system of claim 444, wherein the oxygen enriched fluid has a volume percentage of oxygen above the volume percentage of oxygen in the fluid.

446. The system of claim 444, wherein a temperature of the hydrogen produced by electrolysis is near a temperature of the oxygen enriched fluid produced by electrolysis.

447. The system of claim 444, wherein the oxygen enriched fluid includes oxygen and nitrogen.

448. The system of claim 444, wherein a temperature of the oxygen enriched fluid is between a temperature of the water for electrolysis and a temperature of the fluid.

449. The system of claim 444, wherein the oxygen enriched fluid is configured to be provided to the thermal energy storage system, and wherein the thermal energy storage system is configured to:

implement the oxygen enriched fluid in continued operation of the thermal energy storage system; or implement the oxygen enriched fluid in the conversion of the input electricity to stored thermal energy.

System Providing Heated Fluid for Electrolysis, the Heat being Provided from a High-Efficiency TES System and Used to Increase Efficiency of Electrolysis Reaction.

450. A thermal energy storage (TES) system (4801), comprising:

a storage medium configured to store thermal energy; and a heating element configured to heat the storage medium using electricity from a renewable energy source (4903); and a fluid movement system (213, 4223) configured to move a fluid through the storage medium to heat the fluid to a temperature in a specified temperature range and provide the fluid to a solid oxide electrolysis system (4803) that converts water to hydrogen.

451. The system of claim 450, wherein the fluid comprises a mixture of oxygen and nitrogen.

452. The system of claim 450, wherein the fluid has a volume percentage of oxygen that is above 25% and below 60%.

453. The system of claim 450, wherein a volume percentage of hydrogen in a product fluid produced by electrolysis is greater than a volume percentage of hydrogen in the water provided to the solid oxide cells.

454. The system of claim 450, wherein the specified temperature range is 800° C. to 900° C.

455. The system of claim 450, wherein the fluid has a flow rate of at least 1500 kg/hr.

456. The system of claim 450, wherein the fluid has a flow rate between 1500 kg/hr and 2000 kg/hr.

457. The system of claim 450, wherein the fluid provides an amount of heat sufficient to maintain electrolysis of water in the solid oxide cells.

Method Providing Heated Fluid for Electrolysis, the Heat being Provided from a High-Efficiency TES System and Used to Increase Efficiency of Electrolysis Reaction.

458. A method, comprising:

heating a storage medium using heating elements that convert electricity from a renewable energy source (4903) into heat;

circulating a fluid through the storage medium to heat the fluid to a temperature in a specified temperature range; and providing the fluid to a solid oxide electrolysis system (4803) that converts water to hydrogen.

459. The method of claim 458, wherein the fluid comprises a mixture of oxygen and nitrogen.

460. The method of claim 458, wherein the fluid has a volume percentage of oxygen that is above 25% and below 60%.

461. The method of claim 458, wherein the specified temperature range is 800° C. to 900° C.

462. The method of claim 458, wherein the fluid has a flow rate of at least 1500 kg/hr.

463. The method of claim 458, wherein the fluid has a flow rate between 1500 kg/hr and 2000 kg/hr.

464. The method of claim 458, wherein the fluid provides an amount of heat sufficient to maintain electrolysis of water in the solid oxide cells.

465. The method of claim 458, further comprising receiving at least some oxygen enriched fluid from solid oxide cells in the thermal energy storage system, the method further comprising:

implementing the oxygen enriched fluid in continued operation of the thermal energy storage system; or implementing the oxygen enriched fluid in the conversion of the input electricity to stored thermal energy.

System Providing Heated Fluid for Electrolysis, the Heat being Provided from a High-Efficiency TES System and Used to Increase Efficiency of Electrolysis Reaction.

466. A thermal energy storage (TES) system (5001), comprising:

a storage medium configured to store thermal energy;

a heating element configured to heat the storage medium using electricity from a renewable energy source (4903); and a fluid movement system (213, 4223) configured to move a fluid through the storage medium to heat the fluid to a temperature in a specified temperature range and provide the fluid to a solid oxide fuel cell system (5007) that generates electricity and water from hydrogen.

467. The system of claim 466, wherein the fluid comprises a mixture of oxygen and nitrogen.

468. The system of claim 466, wherein the fluid has a volume percentage of oxygen that is above 25% and below 60%.

469. The system of claim 466, wherein the specified temperature range is 600° C. and 700° C.

470. The system of claim 466, wherein the fluid has a flow rate of at least 1500 kg/hr.

471. The system of claim 466, wherein the fluid has a flow rate between 1500 kg/hr and 2000 kg/hr.

472. The system of claim 466, wherein the fluid is configured to maintain a temperature of the solid oxide cells.

473. The system of claim 466, wherein at least a portion of the fluid that sweeps through the solid oxide cells is recirculated to the storage medium.

Method Using Stored Thermal Energy in a Fuel Cell System to Convert Hydrogen to Electricity and Water.

474. A method, comprising:

heating a storage medium using heating elements that convert electricity from a renewable energy source (4903) into heat;

circulating a fluid through the storage medium to heat the fluid to a temperature in a specified temperature range; and providing the fluid to a solid oxide fuel cell system (5007) that generates electricity and water from hydrogen.

475. The method of claim 474, wherein the fluid comprises a mixture of oxygen and nitrogen.

476. The method of claim 474, wherein the fluid has a volume percentage of oxygen that is above 25% and below 60%.

477. The method of claim 474, wherein the specified temperature range is 600° C. and 700° C.

478. The method of claim 474, wherein the fluid has a flow rate of at least 1500 kg/hr.

479. The method of claim 474, wherein the fluid has a flow rate between 1500 kg/hr and 2000 kg/hr.

480. The method of claim 474, wherein the fluid removes heat from the solid oxide cells.

481. The method of claim 474, further comprising providing at least a portion of the fluid that sweeps through the solid oxide cells to the storage medium.

Electrolysis System Providing Heated Fluid for Electrolysis, the Heat being Provided from a High-Efficiency TES System and Used to Increase Efficiency of Electrolysis Reaction.

482. An electrolysis system, comprising:

a plurality of solid oxide cells (4803) configured to electrolyze water to produce hydrogen when an electric potential is provided to the solid oxide cells; and a sweep path across the solid oxide cells (4803), wherein the sweep path is configured to circulate a fluid received from a thermal energy storage system (4801), wherein the fluid is heated by circulating the fluid through a storage medium storing thermal energy generated by conversion of input electricity from a renewable energy source, and wherein the fluid is heated to a temperature in a specified temperature range.

483. The system of claim 482, wherein the fluid comprises a mixture of oxygen and nitrogen.

484. The system of claim 482, wherein the fluid has a volume percentage of oxygen that is above 25% and below 60%.

485. The system of claim 482, wherein a volume percentage of hydrogen in a product fluid produced by electrolysis is greater than a volume percentage of hydrogen in the water provided to the solid oxide cells.

486. The system of claim 482, wherein the water provided to the solid oxide cells comprises water and hydrogen.

487. The system of claim 482, wherein the water comprises at least 90% water.

488. The system of claim 482, wherein the specified temperature range is 800° C. to 900° C.

489. The system of claim 482, wherein the water is at a temperature below the temperature of the fluid but above 800° C.

490. The system of claim 482, wherein the fluid has a flow rate of at least 1500 kg/hr.

491. The system of claim 482, wherein the fluid has a flow rate between 1500 kg/hr and 2000 kg/hr.

492. The system of claim 482, wherein hydrogen produced by electrolysis is at a temperature above a temperature of the water.

493. The system of claim 482, wherein the electric potential provided to the solid oxide cells is between 1 volt and 3 volts.

494. The system of claim 482, wherein the fluid provides an amount of heat sufficient to maintain electrolysis of water in the solid oxide cells.

495. The system of claim 482, further comprising a steam generator (4805) configured to condense the hydrogen and generate steam by exchanging heat from the hydrogen with water.

496. The system of claim 495, wherein at least some of the steam generated by the steam generator is configured to be recirculated to the solid oxide cells.

497. The system of claim 496, wherein the recirculated fluid includes at least some hydrogen gas.

498. The system of claim 495, wherein at least some of the condensed hydrogen is configured to be stored.

499. The system of claim 482, wherein the fluid is enriched with at least some of oxygen produced by the electrolysis of water in the solid oxide cells.

500. The system of claim 499, wherein the oxygen enriched fluid has a volume percentage of oxygen above the volume percentage of oxygen in the fluid.

501. The system of claim 499, wherein a temperature of the hydrogen is near a temperature of the oxygen enriched fluid.

502. The system of claim 499, wherein the oxygen enriched fluid includes oxygen and nitrogen.

503. The system of claim 499, wherein a temperature of the oxygen enriched fluid is between a temperature of the water and a temperature of the fluid.

504. The system of claim 499, wherein the oxygen enriched fluid is provided to the thermal energy storage system (4801).

505. The system of claim 499, further comprising a steam generator (4807) configured to generate steam by exchanging heat from the oxygen enriched fluid with water.

506. The system of claim 482, wherein the water comprises water and carbon dioxide.

507. The system of claim 506, wherein the water and carbon dioxide are configured to be converted to carbon monoxide and hydrogen by electrolysis in the solid oxide cells.

508. The system of claim 506, further comprising a syngas conversion system (4109) configured to produce a synthetic hydrocarbon fluid from the produced hydrogen and carbon monoxide.

Electrolysis Method Providing Heated Fluid for Electrolysis, the Heat being Provided from a High-Efficiency TES System and Used to Increase Efficiency of Electrolysis Reaction.

509. A method of electrolysis, comprising:
circulating a fluid across a plurality of solid oxide cells (4803), wherein the fluid has been heated by a storage medium storing thermal energy generated by conversion of input electricity from a renewable energy source (4903);
providing water to the solid oxide cells (4803); and
providing an electric potential to the solid oxide cells (4803) to electrolyze the water and generate hydrogen.

510. The method of claim 509, wherein the fluid comprises a mixture of oxygen and nitrogen.

511. The method of claim 509, wherein the fluid has a volume percentage of oxygen that is above 25% and below 60%.

512. The method of claim 509, wherein a volume percentage of hydrogen in a product fluid produced by electrolysis is greater than a volume percentage of hydrogen in the water provided to the solid oxide cells.

513. The method of claim 509, wherein the water provided to the solid oxide cells comprises water and hydrogen.

514. The method of claim 509, wherein the water comprises at least 90% water.

515. The method of claim 509, wherein the specified temperature range is 800° C. to 900° C.

516. The method of claim 509, wherein the water is at a temperature below the temperature of the fluid but above 800° C.

517. The method of claim 509, wherein the fluid has a flow rate of at least 1500 kg/hr.

518. The method of claim 509, wherein the fluid has a flow rate between 1500 kg/hr and 2000 kg/hr.

519. The method of claim 509, wherein hydrogen produced by electrolysis is at a temperature above a temperature of the water.

520. The method of claim 509, wherein the electric potential provided to the solid oxide cells is between 1 volt and 3 volts.

521. The method of claim 509, wherein the fluid provides an amount of heat sufficient to maintain electrolysis of water in the solid oxide cells.

522. The method of claim 509, further comprising providing the hydrogen to a steam generator (4805) to condense the hydrogen and generate steam by exchanging heat from the hydrogen with water.

523. The method of claim 522, further comprising adding a recirculated fluid to the water provided to the solid oxide cells, wherein the recirculated fluid includes at least some of the steam generated by the steam generator.

524. The method of claim 523, wherein the recirculated fluid includes at least some hydrogen gas.

525. The method of claim 522, further comprising storing at least some of the condensed hydrogen.

526. The method of claim 509, wherein the electrolysis of water produces oxygen, and wherein the fluid is enriched with at least some of the produced oxygen.

527. The method of claim 526, wherein the oxygen enriched fluid has a volume percentage of oxygen above the volume percentage of oxygen in the fluid.

528. The method of claim 526, wherein a temperature of the hydrogen is near a temperature of the oxygen enriched fluid.

529. The method of claim 526, wherein the oxygen enriched fluid includes oxygen and nitrogen.

530. The method of claim 526, wherein a temperature of the oxygen enriched fluid is between a temperature of the water and a temperature of the fluid.

531. The method of claim 526, further comprising providing the oxygen enriched fluid to a thermal energy storage system (4801), and:
implementing the oxygen enriched fluid in continued operation of the thermal energy storage system; or
implementing the oxygen enriched fluid in the conversion of the input electricity to stored thermal energy.

532. The method of claim 526, further comprising providing the oxygen enriched fluid to a steam generator (4807) to generate steam by exchanging heat from the oxygen enriched fluid with water.

533. The method of claim 509, wherein the water provided to the solid oxide cells comprises water and carbon dioxide.

534. The method of claim 533, wherein the water and carbon dioxide are converted to carbon monoxide and hydrogen by electrolysis in the solid oxide cells.

535. The method of claim 534, further comprising providing the hydrogen and carbon monoxide to a syngas conversion system (4109) to produce a synthetic hydrocarbon fluid.

System Providing Heated Fluid for Electrolysis, the Heat being Provided from a High-Efficiency TES System and Used to Increase Efficiency of Electrolysis Reaction.

536. A fuel cell system comprising:
a plurality of solid oxide cells (5007) configured to generate electricity and hydrogen from water; and
a sweep path across the solid oxide cells (5007), wherein the sweep path is configured to circulate a fluid received from a thermal energy storage system (5001), wherein the fluid is heated by circulating the fluid through a storage medium storing thermal energy generated by conversion of input electricity from a renewable energy source (4903), and wherein the fluid is heated to a temperature in a specified temperature range.

537. The system of claim 536, wherein the fluid comprises a mixture of oxygen and nitrogen.

538. The system of claim 536, wherein the fluid has a volume percentage of oxygen that is above 25% and below 60%.

539. The system of claim 536, wherein the specified temperature range is 600° C. and 700° C.

540. The system of claim 536, wherein the fluid has a flow rate of at least 1500 kg/hr.

541. The system of claim 536, wherein the fluid has a flow rate between 1500 kg/hr and 2000 kg/hr.

542. The system of claim 536, further comprising a heat exchanger (5013) configured to heat hydrogen fed to the solid oxide cells with the fluid.

543. The system of claim 536, wherein the hydrogen provided to the solid oxide cells includes at least some steam.

544. The system of claim 536, wherein the fluid is configured to maintain a temperature of the solid oxide cells.

545. The system of claim 536, wherein the electricity generated is direct current electricity.

546. The system of claim 536, wherein at least a portion of the residual hydrogen from the solid oxide cells is configured to be recirculated to the solid oxide cells.

547. The system of claim 536, wherein at least a portion of the fluid that sweeps through the solid oxide cells is provided to the storage medium.

Method Providing Heated Fluid for Electrolysis, the Heat being Provided from a High-Efficiency TES System and Used to Increase Efficiency of Electrolysis Reaction.

548. A method, comprising:
circulating a fluid across a plurality of solid oxide cells (5007), wherein the fluid has been heated by a storage medium storing thermal energy generated by conversion of input electricity from a renewable energy source (4903);
providing hydrogen to the solid oxide cells (5007); and
generating electricity and water from the solid oxide cells (5007).

549. The method of claim 548, wherein the fluid comprises a mixture of oxygen and nitrogen.

550. The method of claim 548, wherein the fluid has a volume percentage of oxygen that is above 25% and below 60%.

551. The method of claim 548, wherein the specified temperature range is 600° C. and 700° C.

552. The method of claim 548, wherein the fluid has a flow rate of at least 1500 kg/hr.

553. The method of claim 548, wherein the fluid has a flow rate between 1500 kg/hr and 2000 kg/hr.

554. The method of claim 548, further comprising heating hydrogen fed to the solid oxide cells with the fluid in a heat exchanger (5013).

555. The method of claim 548, further comprising adding steam to the hydrogen provided to the solid oxide cells.

556. The method of claim 548, wherein the fluid removes heat from the solid oxide cells.

557. The method of claim 548, wherein the electricity generated is direct current electricity.

558. The method of claim 548, further comprising recirculating at least a portion of the residual hydrogen produced from the solid oxide cells to the solid oxide cells.

559. The method of claim 548, further comprising providing at least a portion of the fluid that sweeps through the solid oxide cells to the storage medium.

Apparatus for Cogeneration Using Heat from Solid Oxide Electrolyzes to Generate Steam and Reducing Waste of Energy.

560. An apparatus comprising:
a thermal storage assemblage (4100) including a plurality of thermal storage blocks, wherein at least some of the thermal storage blocks include multiple fluid flow slots, wherein at least some of the fluid flow slots are configured to define fluid pathways through the thermal storage blocks;
a plurality of heater elements (3607) positioned within the thermal storage assemblage, wherein each of the plurality of heater elements is configured to heat at least one of the thermal storage blocks;
a fluid movement system (213, 4223) configured to direct a stream of fluid through the fluid pathways to heat the fluid to a specified temperature range, wherein the fluid movement device is configured to provide the heated fluid in the specified temperature range to a solid oxide electrolysis system configured to extract hydrogen from water and output the heated fluid at a lower temperature; and a steam generator configured to receive the lower-temperature fluid from the electrolysis system convert input feed water into steam.

561. The apparatus of claim 560, wherein the steam generator is a once-through steam generator.

562. The apparatus of claim 560, wherein the steam generator is a heat recovery steam generator.

563. The apparatus of claim 560, wherein the steam generator includes a plurality of conduits coupled to receive the input feed water, wherein selected ones of the conduits are arranged to mitigate scale formation and overheating.

564. The apparatus of claim 563, wherein ones of the plurality of conduits are arranged in the steam generator transversely to a path of flow of the lower temperature fluid.

565. The apparatus of claim 560, wherein the thermal storage assembly comprises:

an enclosure containing the plurality of thermal storage blocks; and a thermal barrier separating a first subset of the plurality of thermal storage blocks from a second subset of the plurality of thermal storage blocks.

566. The apparatus of claim 565, wherein the fluid movement system is configured to direct the stream of fluid through the fluid pathways of one of the first and second subsets of thermal concurrent with an electricity source adding heat to another one of the first and second sub set.

567. The apparatus of claim 560, wherein the fluid comprises oxygen and nitrogen.

568. The apparatus of claim 560, wherein the thermal storage assemblage is configured to store thermal energy generated by a conversion of input electricity from an first input energy supply, the first input energy supply having intermittent availability.

569. The apparatus of claim 568, wherein the thermal storage assemblage is further configured to store thermal energy generated by a conversion of input electricity from an second input energy supply configured to provide electricity on demand.

Apparatus for Cogeneration to Use Steam Output from a Steam Turbine in an Industrial Process, Reducing Waste of Energy.

570. An apparatus comprising:

a thermal storage assemblage (4100) including a plurality of thermal storage blocks, wherein at least some of the thermal storage blocks include multiple fluid flow slots, wherein at least some of the fluid flow slots are configured to define fluid pathways through the thermal storage blocks;

a plurality of heater elements (3607) positioned within the thermal storage assemblage, wherein each of the plurality of heater elements is configured to heat at least one of the thermal storage blocks;

a fluid movement system (213, 4223) configured to direct a stream of fluid through the fluid pathways to heat the fluid to a specified temperature range;

a steam generator configured to receive the fluid to convert input feed water into input steam having a first pressure;

a steam turbine configured to receive the input steam and provide output steam at a second pressure that is less than the first pressure; and a second fluid movement device configured to move the output steam for use in an industrial process.

571. The apparatus of claim 570, wherein the steam generator is a superheat boiler.

572. The apparatus of claim 570, wherein the steam generator includes a plurality of conduits coupled to receive the input feed water, wherein selected ones of the conduits are arranged to mitigate scale formation and overheating.

573. The apparatus of claim 572, wherein ones of the plurality of conduits are arranged in the steam generator transversely to a path of flow of the lower temperature fluid.

574. The apparatus of claim 570, wherein the industrial process comprises producing petroleum-based fuels.

575. The apparatus of claim 570, wherein the industrial process comprises producing biofuels.

576. The apparatus of claim 570, wherein the industrial process comprises producing diesel fuels.

577. The apparatus of claim 570, wherein the industrial process comprises drying grains.

578. The apparatus of claim 570, wherein the steam turbine is configured to cause an electrical generator to provide electricity to the industrial process.

Apparatus Providing Heat from Thermal Storage Assemblage to Generate Steam for a Turbine with Turbine Waste Heat being Used to Preheat Feed Water for a High-Pressure Once-Through Steam Generator.

579. An apparatus comprising:

a thermal storage assemblage (4100) including a plurality of thermal storage blocks, wherein at least some of the thermal storage blocks include multiple fluid flow slots, wherein at least some of the fluid flow slots are configured to define fluid pathways through the thermal storage blocks;

a plurality of heater elements (3607) positioned within the thermal storage assemblage, wherein each of the plurality of heater elements is configured to heat at least one of the thermal storage blocks;

a fluid movement system (213, 4223) configured to direct a stream of a first fluid through the fluid pathways to heat the first fluid to a specified temperature range;

a first steam generator configured to, using the first fluid, convert input feed water into steam;

a steam turbine configured to cause generation of electricity using the steam; and a preheater configured to, using waste heat from the steam turbine, preheat feed water provided to a second steam generator.

580. The apparatus of claim 579, wherein the first steam generator is a heat recovery steam generator.

581. The apparatus of claim 579, wherein the second steam generator is a once-through steam generator.

582. The apparatus of claim 579, further comprising a condenser coupled to the steam turbine, wherein the condenser is configured to condense steam received from the steam turbine into water.

583. The apparatus of claim 582, further comprising a recirculation pump configured to provide, as feed water to the first steam generator, water produced by the condenser.

584. The apparatus of claim 579, wherein the second steam generator is configured to generate steam using a second fluid from a second storage medium configured to store thermal energy.

585. The apparatus of claim 579, wherein the preheater is configured to output a third fluid to the thermal storage assemblage.

Apparatus Using Heat from Thermal Storage Assemblage to Generate Steam with Feedback to Maintain Steam Quality.

586. An apparatus comprising:

a thermal storage assemblage (4100) including a plurality of thermal storage blocks, wherein at least some of the thermal storage blocks include multiple fluid flow slots, wherein at least some of the fluid flow slots are configured to define fluid pathways through the thermal storage blocks;

a plurality of heater elements (3607) positioned within the thermal storage assemblage, wherein each of the plurality of heater elements is configured to heat at least one of the thermal storage blocks;

a fluid movement system (213, 4223) configured to direct a stream of fluid through the fluid pathways to heat the fluid to a specified temperature range;

a steam generator configured to receive the fluid to convert input feed water into input steam;

a measurement unit configured to determine a measured steam quality value of steam output from the steam generator; and a controller configured to cause the cause the fluid movement system to direct the stream of fluid, and further configured to use the measured steam quality as feedback to adjust a flow rate of the fluid to maintain the measured steam quality within a specified steam quality range.

587. The apparatus of claim 586, wherein the measurement unit includes a separator configured to separate steam output from the steam generator from water vapor output from the steam generator, wherein the measurement unit is configured to determine the measured steam quality based on fraction of the water vapor output from the steam generator relative to the steam output from the steam generator.

588. The apparatus of claim 586, wherein the measurement unit is configured to determine the steam quality based on a flow velocity of steam output from the steam generator and a mass flow rate of the input feed water.

589. The apparatus of claim 586, wherein the steam generator is a once-through steam generator.

590. The apparatus of claim 586, wherein the controller is configured to cause delivery of steam in accordance within a specified range of steam delivery rates.

591. The apparatus of claim 590, wherein the controller is configured to specify the range of steam delivery rates based on forecast information.

592. The apparatus of claim 591, wherein the forecast information includes weather forecast information.

593. The apparatus of claim 591, wherein the forecast information includes expected electricity rates.

594. The apparatus of claim 591, wherein the forecast information includes expected steam demand.

Cogeneration System Using Heat from Electrolysis Process to Generate Steam Input to a Once-Through Steam Generator.

595. A system comprising:

a storage medium configured to store thermal energy generated by a conversion of input electricity from an input energy supply, the input energy supply having intermittent availability;

a fluid movement device configured to move fluid through the storage medium to heat the fluid to a specified temperature, the fluid comprising oxygen and nitrogen, wherein the fluid movement device is configured to provide the fluid at the specified temperature to a solid oxide cell electrolysis system that converts water to hydrogen and enriches the fluid with oxygen; and a once-through steam generator configured to, using the fluid received from the electrolysis system convert input feed water into steam.

596. The system of claim 595, further comprising a steam turbine configured to cause an electrical generator to generate of electricity using steam received from the steam generator.

597. The system of claim 595, wherein the thermal storage unit comprises a plurality of bricks.

598. The system of claim 595, further comprising a controller configured to cause the fluid movement device to move fluid at a particular rate.

599. The system of claim 598, further comprising a measurement unit configured to measure a parameter of steam output from the steam generator.

600. The system of claim 598, wherein the controller is configured to adjust the particular rate based on the measurement of the parameter of steam output.

601. The system of claim 598, wherein the measurement unit comprises a separator configured to measure a quality of the steam output from the steam generator by separating the steam into a liquid phase and a vapor phase.

602. The system of claim 598, wherein the measurement unit is configured to measure a velocity of steam output from the steam generator.

603. The system of claim 598, wherein the controller is configured to control an amount of fluid moved through the storage medium based on a weather forecast.

604. The system of claim 598, wherein the controller is configured to control and amount of fluid moved through the storage medium based on an expected difference in electricity costs on a first day and a second day.

605. The system of claim 595, wherein the intermittent energy supply comprises a thermophotovoltaic generation system configured to convert thermal radiation into electrical energy.

606. The system of claim 595, wherein the intermittent energy supply comprises a wind turbine configured to generate electricity.

607. The system of claim 595, wherein the intermittent energy supply comprises a solar energy source configured to convert solar energy into electricity.

608. The system of claim 595, wherein the fluid movement device comprises a closed fluid recirculation loop.

609. The system of claim 595, further comprising a pump, and wherein the pump is configured to force the input feed water through one or more conduits of the steam generator.

610. The system of claim 609, wherein the one or more conduits mounted in the steam generator transversely to a path fluid flow.

System for Cogeneration Using Steam Output from a Steam Turbine in an Industrial Process, Reducing Waste of Energy.

611. A system comprising:

a storage medium configured to store thermal energy generated by a conversion of input electricity from an input energy supply, the first input energy supply having intermittent availability;

a first fluid movement device configured to move fluid through the storage medium to heat the fluid to a specified temperature;

a once-through steam generator configured to, using the fluid, convert input feed water into an input steam having a first pressure;

a steam turbine configured to provide an output steam at a second pressure that is less than the first pressure; and a second fluid movement device configured to move the output steam for use in an industrial process.

612. The system of claim 611, wherein the steam turbine is configured to cause generation of electricity by an electrical generator.

613. The system of claim 612, wherein the electrical generator is configured to provide electricity to a power grid.

614. The system of claim 611, wherein the industrial process comprises production of biofuels.

615. The system of claim 611, wherein the industrial process comprises production of petroleum-based fuels.

616. The system of claim 611, wherein the industrial process comprises production of diesel fuels.

617. The system of claim 611, wherein industrial process comprises drying of grains.

618. The system of claim 611, further comprising a controller configured to cause the steam generator to generate steam at a specified steam quality based on steam quality.

619. The system of claim 618, further comprising a measurement unit configured to determine the steam quality based on separation of steam and water vapor output from the steam generator.

620. The system of claim 618, further comprising a measurement unit configured to determine the steam quality based on measurements of steam outlet flow and feed water input flow.

621. The system of claim 618, wherein the controller is configured to control a rate at which fluid is moved through the storage device by the first fluid movement device.

622. The system of claim 611, wherein the storage medium comprises a plurality of bricks.

System for Cogeneration Using Steam Output from a Steam Turbine is Input to a Steam Generator, Reducing Waste of Energy.

623. A system comprising:
a first storage medium configured to store thermal energy generated by a conversion of input electricity from an input energy supply, the input energy supply having intermittent availability;
a fluid movement device configured to move fluid through the storage medium to heat the fluid to a specified temperature;
a first steam generator configured to, using the fluid, convert first input feed water into steam;
a steam turbine configured to, using the steam, cause an electrical generator to generate electricity; and
a preheater configured to, using waste heat from the steam turbine, preheat second feed water provided to a second steam generator.

624. The system of claim 623, wherein the second steam generator is a once-through steam generator.

625. The system of claim 623, further comprising a condenser configured to receive at least a portion of the steam from the steam turbine and configured to condense the portion of steam into third feed water.

626. The system of claim 625, further comprising a recirculation pump configured to provide the third feed water to the first steam generator.

627. The system of claim 623, wherein the steam generator is a heat recovery steam generator.

628. The system of claim 623, further comprising:
a measurement unit configured to determine a measured output steam quality; and
a controller configured to adjust a current output steam quality to within a specified range using the measured output steam quality as feedback.

629. The system of claim 628, wherein the controller is configured to cause fluid movement device to adjust a rate of fluid flow through the storage medium in accordance with the feedback and the specified range of steam quality.

Method for Optimizing Use of Available VRE.

630. A method for controlling the distribution of electrical power derived from a renewable energy source received at a power management facility, including the steps of:
determining a first demand for a first use of the power, and providing a first portion of the power to the first use;
determining a second demand for a second use of the power and, if a first excess amount of power is available once the first portion has been provided to the first use sufficient to meet the first demand, providing a second portion of the first excess amount of power to the second use; and
if a second excess amount of power is available once the second portion has been provided to the second use sufficient to meet the second demand, providing the second excess amount of power to a third use.

631. The method of claim 630, wherein:
the first use is electrical demand of an industrial facility; and
the second use is an electrolysis process for producing hydrogen.

632. The method of claim 630, wherein the third use includes providing at least a portion of the second excess amount of power to a thermal charging apparatus of a thermal storage unit.

633. The method of claim 630, wherein the third use includes providing at least a portion of the second excess amount of power to an electrical power grid.

634. The method of claim 630, wherein the third use includes providing at least a portion of the second excess amount of power to a thermal charging apparatus of a thermal storage unit.

635. The method of claim 630, wherein the third use includes providing at least a portion of the second excess amount of power to a thermal charging apparatus of a thermal storage unit, and further including the steps of:
determining whether the thermal storage unit has been fully charged, and if so, providing a remaining portion of the second excess amount of power to an electrical power grid.

Configurations of TES System Components.

636. A system for thermal energy storage and delivery, comprising:
a thermal storage assemblage including a plurality of thermal storage blocks, wherein at least some of the thermal storage blocks include multiple radiation cavities and multiple fluid flow slots, wherein some of the radiation cavities and some of the fluid flow slots are configured to define fluid pathways through the thermal storage blocks;
a plurality of heater elements positioned within the thermal storage assemblage and adjacent to at least some of the radiation cavities, wherein each of the plurality of heater elements is configured to heat at least one of the thermal storage blocks via energy radiated into multiple ones of the radiation cavities and onto surfaces that bound the respective radiation cavities; and
a fluid movement system configured to direct a stream of fluid through the fluid pathways;
with any one or more of the following components or characteristics:
(a) the heater element pathway includes one or more slots configured to hang a heater element;
(b) the thermal storage blocks include shelf portions that interlock when the thermal storage blocks are positioned in a stack;
(c) the thermal storage blocks include multiple substantially rectangular portions that each include multiple openings to other tiers and that bound different cavities of one or more tiers;

(d) one or more stacks of thermal storage blocks in the TSU are positioned using space elements;

(e) the thermal storage blocks of the first and second tiers are stacked without spacing between tiers; and (f) at least half of a surface of at least a portion of a particular thermal storage block thermal storage material is not an opening, i.e. there relatively small slits through the brick, compared to the size of the radiation cavity.

Carbon Capture

637. A system that includes:

a carbon dioxide capture system configured to separate carbon dioxide from exhaust gases;

a thermal storage system configured to convert input electricity from an input energy supply to stored thermal energy, the input energy supply having intermittent availability; and a power generation system configured to:
convert a portion of the stored thermal energy to output electricity via a turbine; and
provide the output electricity and turbine waste heat to the carbon dioxide capture system;
wherein the carbon dioxide capture system is configured to operate using the provided electricity and heat.

638. The system of claim 637, wherein the thermal storage system includes:
a heating element configured to heat a storage medium using the input electricity from the input energy supply; and
a blower configured to circulate fluid through the heated storage medium.

639. The system of claim 637 or 638, wherein the power generation system includes:
a heat exchanger configured to generate steam using circulated fluid; and
a steam turbine configured to generate the supplied electricity from the produced steam.

640. The system of any one of claims 637 to 639, wherein the carbon dioxide capture system is configured to use a portion of stored thermal energy as heat to separate the carbon dioxide from the exhaust gases.

641. The system of any one of claims 637 to 640, wherein the thermal energy storage system is further configured to generate the output electricity in a substantially continuous manner.

642. A method that includes:
converting, by a thermal energy storage system, input electricity from an intermittently availability energy supply to stored thermal energy;
converting, by the thermal energy storage system and a turbine, the stored thermal energy to output electricity; and
providing, by the thermal energy storage system, the output electricity to a carbon dioxide capture system that separates carbon dioxide from exhaust gases, wherein the output electricity is provided at least at times when the energy supply is not available.

643. A method that includes:
receiving, by a carbon dioxide capture system, exhaust gases from combustion of a fuel source;
receiving, by the carbon dioxide capture system, electricity and heat generated from a thermal energy storage system and turbine, wherein the thermal energy storage system stores thermal energy using an intermittently availability energy supply; and
separating, by the carbon dioxide capture system, carbon dioxide from exhaust gases using the received electricity and heat, wherein the separating is performed at least at times in which the energy supply is not available.

What is claimed is:

1. An apparatus comprising:
a first thermal storage assemblage including a plurality of thermal storage blocks, wherein at least some of the thermal storage blocks include multiple fluid flow slots, wherein at least some of the fluid flow slots are configured to define fluid pathways through the thermal storage blocks;
a plurality of heater elements positioned within the first thermal storage assemblage, wherein each of the heater elements is configured to heat at least one of the thermal storage blocks;
a first fluid movement system configured to direct a stream of first fluid through the fluid pathways to heat the first fluid to a specified temperature range;
a first steam generator configured to receive the first fluid to convert input feed water into input steam having a first pressure;
a steam turbine configured to receive the input steam and provide output steam at a second pressure that is less than the first pressure;
a steam movement system configured to supply the output steam for use in an industrial process; and
a solid oxide electrolysis system configured to extract hydrogen from water and output the heated fluid, wherein the fluid movement system is configured to provide the heated fluid in the specified temperature range to the solid oxide electrolysis system prior to providing the fluid to the first steam generator.

2. The apparatus of claim 1, wherein the first steam generator is a superheat boiler.

3. The apparatus of claim 1, wherein the first steam generator includes a plurality of conduits coupled to receive the input feed water, wherein at least a subset of the conduits are arranged to mitigate scale formation and overheating.

4. The apparatus of claim 3, wherein the subset of the conduits are arranged in the first steam generator transversely to a path of flow of the first fluid.

5. The apparatus of claim 1, wherein the industrial process comprises producing one or more of petroleum-based fuels, biofuels, and diesel fuels, or drying grains.

6. The apparatus of claim 1, wherein the first steam generator is a once-through steam generator or a heat recovery steam generator.

7. The apparatus of claim 1, wherein the fluid comprises oxygen and nitrogen.

8. The apparatus of claim 1, wherein the first thermal storage assemblage comprises:
an enclosure containing the thermal storage blocks; and
a thermal barrier separating a first subset of the thermal storage blocks from a second subset of the thermal storage blocks.

9. The apparatus of claim 1, wherein the fluid movement system is configured to direct the stream of fluid through the fluid pathways of a first subset of the thermal storage blocks while providing heat from an electricity source to a second subset of the thermal storage blocks.

10. The apparatus of claim 1, wherein the first thermal storage assemblage is configured to store thermal energy generated by a conversion of input electricity from a first input energy supply, wherein the first input energy supply has intermittent availability.

11. The apparatus of claim 10, wherein the first thermal storage assemblage is further configured to store thermal energy generated by a conversion of input electricity from a second input energy supply configured to provide electricity on demand.

12. An apparatus comprising:
a first thermal storage assemblage including a plurality of thermal storage blocks, wherein at least some of the thermal storage blocks include multiple fluid flow slots, wherein at least some of the fluid flow slots are configured to define fluid pathways through the thermal storage blocks;
a plurality of heater elements positioned within the first thermal storage assemblage, wherein each of the heater elements is configured to heat at least one of the thermal storage blocks;
a first fluid movement system configured to direct a stream of first fluid through the fluid pathways to heat the first fluid to a specified temperature range;
a first steam generator configured to receive the first fluid to convert input feed water into input steam having a first pressure;
a steam turbine configured to receive the input steam and provide output steam at a second pressure that is less than the first pressure; and
a steam movement system configured to supply the output steam for use in an industrial process; and
a second thermal storage assemblage configured to store thermal energy, wherein a second steam generator is configured to generate steam using heated fluid from the second thermal storage assemblage,
wherein the industrial process includes a preheater configured to provide waste heat from the steam turbine to preheat feed water for the second steam generator.

13. The apparatus of claim 12, wherein the first steam generator is a superheat boiler.

14. The apparatus of claim 12, wherein the first steam generator includes a plurality of conduits coupled to receive the input feed water, wherein at least a subset of the conduits are arranged to mitigate scale formation and overheating.

15. The apparatus of claim 12, further comprising:
a solid oxide electrolysis system configured to extract hydrogen from water and output the heated fluid, wherein the fluid movement system is configured to provide the heated fluid in the specified temperature range to the solid oxide electrolysis system prior to providing the fluid to the first steam generator.

16. The apparatus of claim 12, wherein the first steam generator is a once-through steam generator or a heat recovery steam generator.

17. The apparatus of claim 12, further comprising a condenser coupled to the steam turbine, wherein the condenser is configured to condense steam received from the steam turbine into liquid water.

18. The apparatus of claim 12, wherein the second steam generator is a once-through steam generator.

19. The apparatus of claim 12, wherein the preheater is configured to output steam condensate to the first thermal storage assemblage.

20. The apparatus of claim 14, wherein the subset of the conduits are arranged in the first steam generator transversely to a path of flow of the first fluid.

21. The apparatus of claim 17, further comprising a recirculation pump configured to provide, as feed water to the first steam generator, the liquid water produced by the condenser.

22. The apparatus of claim 12, wherein the industrial process comprises producing one or more of petroleum-based fuels, biofuels, and diesel fuels, or drying grains.

23. An apparatus comprising:
a first thermal storage assemblage including a plurality of thermal storage blocks, wherein at least some of the thermal storage blocks include multiple fluid flow slots, wherein at least some of the fluid flow slots are configured to define fluid pathways through the thermal storage blocks;
a plurality of heater elements positioned within the first thermal storage assemblage, wherein each of the heater elements is configured to heat at least one of the thermal storage blocks;
a first fluid movement system configured to direct a stream of first fluid through the fluid pathways to heat the first fluid to a specified temperature range;
a first steam generator configured to receive the first fluid to convert input feed water into input steam having a first pressure;
a steam turbine configured to receive the input steam and provide output steam at a second pressure that is less than the first pressure;
a steam movement system configured to supply the output steam for use in an industrial process,
wherein the fluid movement system is configured to direct the stream of fluid through the fluid pathways of a first subset of the thermal storage blocks while providing heat from an electricity source to a second subset of the thermal storage blocks.

24. The apparatus of claim 23, wherein the first steam generator is a superheat boiler.

25. The apparatus of claim 23, wherein the first steam generator includes a plurality of conduits coupled to receive the input feed water, wherein at least a subset of the conduits are arranged to mitigate scale formation and overheating.

26. The apparatus of claim 25, wherein the subset of the conduits are arranged in the first steam generator transversely to a path of flow of the first fluid.

27. The apparatus of claim 23, wherein the industrial process comprises producing one or more of petroleum-based fuels, biofuels, and diesel fuels, or drying grains.

28. The apparatus of claim 23, wherein the first steam generator is a once-through steam generator or a heat recovery steam generator.

29. The apparatus of claim 23, further comprising a solid oxide electrolysis system configured to extract hydrogen from water and output the heated fluid, wherein the fluid movement system is configured to provide the heated fluid in the specified temperature range to the solid oxide electrolysis system prior to providing the fluid to the first steam generator.

30. The apparatus of claim 23, wherein the fluid comprises oxygen and nitrogen.

31. The apparatus of claim 23, wherein the first thermal storage assemblage comprises:
an enclosure containing the thermal storage blocks; and
a thermal barrier separating the first subset of the thermal storage blocks from the second subset of the thermal storage blocks.

32. The apparatus of claim 23, wherein the first thermal storage assemblage is configured to store thermal energy generated by a conversion of input electricity from a first input energy supply, wherein the first input energy supply has intermittent availability.

33. The apparatus of claim 32, wherein the first thermal storage assemblage is further configured to store thermal energy generated by a conversion of input electricity from a second input energy supply configured to provide electricity on demand.

* * * * *